US012042988B2

(12) United States Patent
Bromberg et al.

(10) Patent No.: US 12,042,988 B2
(45) Date of Patent: Jul. 23, 2024

(54) ADDITIVE MANUFACTURING APPARATUSES AND METHODS

(71) Applicant: General Electric Company, Schenectady, NY (US)

(72) Inventors: Vadim Bromberg, Niskayuna, NY (US); John Sterle, Clifton Park, NY (US); Victor Fulton, Amelia, OH (US); Tyler Andrew Griffith, Norwood, OH (US); Peter Douglas Lueschen, Covington, KY (US); Carlos H. Bonilla, Lebanon, OH (US); Joseph L. Smolenski, Singerlands, NY (US); Timothy Francis Andrews, Sharonville, OH (US); Younkoo Jeong, Clifton Park, NY (US); Jacob Mayer, Cincinnati, OH (US); Kwok Pong Chan, Nisayuna, NY (US); Mary Kathryn Thompson, Fairfield Township, OH (US); Ruben E. Fairman, Forest Park, OH (US)

(73) Assignee: General Electric Company, Schenectady, NY (US)

(*) Notice: Subject to any disclaimer, the term of this patent is extended or adjusted under 35 U.S.C. 154(b) by 262 days.

(21) Appl. No.: 17/608,798

(22) PCT Filed: May 22, 2020

(86) PCT No.: PCT/US2020/034244

§ 371 (c)(1),
(2) Date: Nov. 4, 2021

(87) PCT Pub. No.: WO2020/237161

PCT Pub. Date: Nov. 26, 2020

(65) Prior Publication Data

US 2022/0314545 A1 Oct. 6, 2022

Related U.S. Application Data

(60) Provisional application No. 62/852,034, filed on May 23, 2019, provisional application No. 62/852,030,
(Continued)

(51) Int. Cl.
*B29C 64/364* (2017.01)
*B22F 10/14* (2021.01)
(Continued)

(52) U.S. Cl.
CPC ............ *B29C 64/165* (2017.08); *B22F 10/14* (2021.01); *B22F 12/17* (2021.01); *B22F 12/226* (2021.01);
(Continued)

(58) Field of Classification Search
CPC .................................................... B29C 64/364
See application file for complete search history.

(56) References Cited

U.S. PATENT DOCUMENTS 4,034,219 A 7/1977 Louden et al.
4,680,895 A 7/1987 Roestenberg
(Continued)

FOREIGN PATENT DOCUMENTS

CN 204366039 U 6/2015
CN 106862570 A 6/2017
(Continued)

OTHER PUBLICATIONS

International Search Report and Written Opinion for application PCT/US2020/034254 mail date Aug. 24, 2020 (14 pages).
(Continued)

*Primary Examiner* — Timothy Kennedy
(74) *Attorney, Agent, or Firm* — Dinsmore & Shohl LLP

(57) ABSTRACT

Additive manufacturing apparatuses, components of additive manufacturing apparatuses, and methods of using such
(Continued)

manufacturing apparatuses and components are disclosed. An additive manufacturing apparatus may include a recoat head for distributing build material in a build area, a print head for depositing material in the build area, one or more actuators for moving the recoat head and the print head relative to the build area, and a cleaning station for cleaning the print head.

15 Claims, 135 Drawing Sheets

Related U.S. Application Data filed on May 23, 2019, provisional application No. 62/851,913, filed on May 23, 2019, provisional application No. 62/851,907, filed on May 23, 2019, provisional application No. 62/851,953, filed on May 23, 2019, provisional application No. 62/851,957, filed on May 23, 2019, provisional application No. 62/951,919, filed on May 23, 2019, provisional application No. 62/851,946, filed on May 23, 2019.

(51) Int. Cl.

| | |
|---|---|
| ***B22F 12/00*** | (2021.01) |
| ***B22F 12/17*** | (2021.01) |
| ***B22F 12/63*** | (2021.01) |
| ***B29C 64/165*** | (2017.01) |
| ***B29C 64/209*** | (2017.01) |
| ***B29C 64/218*** | (2017.01) |
| ***B29C 64/236*** | (2017.01) |
| ***B29C 64/245*** | (2017.01) |
| ***B29C 64/264*** | (2017.01) |
| ***B29C 64/295*** | (2017.01) |
| ***B29C 64/35*** | (2017.01) |
| *B22F 12/53* | (2021.01) |
| *B22F 12/90* | (2021.01) |
| *B33Y 10/00* | (2015.01) |
| *B33Y 30/00* | (2015.01) |
| *B33Y 40/10* | (2020.01) |
| *B33Y 40/20* | (2020.01) |

(52) U.S. Cl.

CPC ............ *B22F 12/63* (2021.01); *B29C 64/209* (2017.08); *B29C 64/218* (2017.08); *B29C 64/236* (2017.08); *B29C 64/245* (2017.08); *B29C 64/264* (2017.08); *B29C 64/295* (2017.08); *B29C 64/35* (2017.08); *B29C 64/364* (2017.08); *B22F 12/53* (2021.01); *B22F 12/90* (2021.01); *B33Y 10/00* (2014.12); *B33Y 30/00* (2014.12); *B33Y 40/10* (2020.01); *B33Y 40/20* (2020.01)

(56) References Cited

U.S. PATENT DOCUMENTS

| | | | |
|---|---|---|---|
| 4,722,824 | A | 2/1988 | Wiech, Jr. |
| 4,853,717 | A | 8/1989 | Harmon et al. |
| 5,204,055 | A | 4/1993 | Sachs et al. |
| 5,234,636 | A | 8/1993 | Hull et al. |
| 5,387,380 | A | 2/1995 | Cima et al. |
| 5,610,824 | A | 3/1997 | Vinson et al. |
| 5,672,579 | A | 9/1997 | Diaz et al. |
| 5,810,988 | A | 9/1998 | Smith, Jr. et al. |
| 5,847,283 | A | 12/1998 | Finot et al. |
| 5,902,537 | A | 5/1999 | Almquist et al. |
| 5,997,128 | A | 12/1999 | Lou et al. |
| 6,007,318 | A | 12/1999 | Russell et al. |
| 6,146,567 | A | 11/2000 | Sachs et al. |
| 6,158,838 | A | 12/2000 | Capurso |
| 6,159,085 | A | 12/2000 | Hara |
| 6,164,751 | A | 12/2000 | Griffin et al. |
| 6,241,337 | B1 | 6/2001 | Sharma et al. |
| 6,372,178 | B1 | 4/2002 | Tseng |
| 6,375,874 | B1 | 4/2002 | Russell et al. |
| 6,406,122 | B1 | 6/2002 | Sharma et al. |
| 6,416,850 | B1 | 7/2002 | Bredt et al. |
| 6,454,811 | B1 | 9/2002 | Sherwood et al. |
| 6,497,471 | B1 | 12/2002 | Gargir |
| 6,595,618 | B1 | 7/2003 | Roy et al. |
| 6,596,224 | B1 | 7/2003 | Sachs et al. |
| 6,764,636 | B1 | 7/2004 | Allanic et al. |
| 6,896,839 | B2 | 5/2005 | Kubo et al. |
| 6,899,777 | B2 | 5/2005 | Vaidyanathan et al. |
| 6,986,654 | B2 | 1/2006 | Imiolek et al. |
| 6,989,115 | B2 | 1/2006 | Russell et al. |
| 7,037,382 | B2 | 5/2006 | Davidson et al. |
| 7,225,803 | B2 | 6/2007 | Boyadjieff |
| 7,291,002 | B2 | 11/2007 | Russell et al. |
| 7,296,990 | B2 | 11/2007 | Devos et al. |
| 7,387,359 | B2 | 6/2008 | Hernandez et al. |
| 7,389,154 | B2 | 6/2008 | Hunter et al. |
| 7,435,368 | B2 | 10/2008 | Davidson et al. |
| 7,520,740 | B2 | 4/2009 | Wahlstrom et al. |
| 7,665,636 | B2 | 2/2010 | Ederer et al. |
| 7,686,995 | B2 | 3/2010 | Davidson et al. |
| 7,690,909 | B2 | 4/2010 | Wahlstrom |
| 7,700,020 | B2 | 4/2010 | Nielsen et al. |
| 7,736,578 | B2 | 6/2010 | Ederer |
| 7,790,093 | B2 | 9/2010 | Shkolnik et al. |
| 7,824,001 | B2 | 11/2010 | Fienup et al. |
| 7,897,074 | B2 | 3/2011 | Batchelder et al. |
| 7,962,238 | B2 | 6/2011 | Shkolnik et al. |
| 7,979,152 | B2 | 7/2011 | Davidson |
| 8,017,055 | B2 | 9/2011 | Davidson et al. |
| 8,033,812 | B2 | 10/2011 | Collins et al. |
| 8,105,527 | B2 | 1/2012 | Wahlstrom |
| 8,167,395 | B2 | 5/2012 | Fienup et al. |
| 8,185,229 | B2 | 5/2012 | Davidson |
| 8,862,260 | B2 | 10/2014 | Shkolnik et al. |
| 8,979,244 | B2 | 3/2015 | Kritchman et al. |
| 8,997,799 | B2 | 4/2015 | Hodson et al. |
| 9,193,164 | B2 | 11/2015 | Kritchman et al. |
| 9,403,322 | B2 | 8/2016 | Das et al. |
| 9,415,443 | B2 | 8/2016 | Ljungblad et al. |
| 9,434,838 | B2 | 9/2016 | Jung et al. |
| 9,446,448 | B2 | 9/2016 | Mccoy et al. |
| 9,561,622 | B2 | 2/2017 | Das et al. |
| 9,586,364 | B2 | 3/2017 | El-Siblani et al. |
| 9,757,831 | B2 | 9/2017 | Ederer et al. |
| 9,912,915 | B2 | 3/2018 | Sinclair |
| 9,956,612 | B1 | 5/2018 | Redding et al. |
| 9,962,767 | B2 | 5/2018 | Buller et al. |
| 10,000,009 | B2 | 6/2018 | Maier |
| 10,022,794 | B1 | 7/2018 | Redding et al. |
| 10,022,795 | B1 | 7/2018 | Redding et al. |
| 10,029,440 | B2 | 7/2018 | Satoh |
| 10,073,434 | B1 | 9/2018 | Hollander |
| 10,232,443 | B2 | 3/2019 | Myerberg et al. |
| 2001/0050448 | A1 | 12/2001 | Kubo et al. |
| 2002/0079601 | A1 | 6/2002 | Russell et al. |
| 2002/0089081 | A1 | 7/2002 | Fong |
| 2004/0145623 | A1 | 7/2004 | Choi |
| 2004/0160472 | A1 | 8/2004 | Khalid et al. |
| 2004/0173946 | A1 | 9/2004 | Pfeifer et al. |
| 2004/0263557 | A1 | 12/2004 | Premnath et al. |
| 2006/0098040 | A1 | 5/2006 | Kang |
| 2006/0246222 | A1 | 11/2006 | Winkler |
| 2007/0077323 | A1 | 4/2007 | Stonesmith et al. |
| 2008/0190905 | A1 | 8/2008 | Heinlein |
| 2008/0200104 | A1 | 8/2008 | Chuang |
| 2008/0241404 | A1 | 10/2008 | Allaman et al. |
| 2010/0151136 | A1 | 6/2010 | Davidson et al. |
| 2011/0074866 | A1 | 3/2011 | Imamura et al. |
| 2011/0190923 | A1 | 8/2011 | Matsui et al. |
| 2012/0274701 | A1 | 11/2012 | Zhou et al. |
| 2013/0000553 | A1 | 1/2013 | Hoechsmann et al. |
| 2014/0092172 | A1 | 4/2014 | Ikoshi et al. |

(56) References Cited

U.S. PATENT DOCUMENTS

| | | | |
|---|---|---|---|
| 2014/0220168 | A1 | 8/2014 | Perez et al. |
| 2015/0145177 | A1 | 5/2015 | El-Siblani et al. |
| 2015/0151973 | A1 | 6/2015 | Lee et al. |
| 2015/0258706 | A1 | 9/2015 | Okamoto et al. |
| 2015/0266242 | A1 | 9/2015 | Comb et al. |
| 2015/0273762 | A1 | 10/2015 | Okamoto |
| 2015/0343533 | A1 | 12/2015 | Park et al. |
| 2016/0039207 | A1 | 2/2016 | Kritchman et al. |
| 2016/0067929 | A1 | 3/2016 | Park |
| 2016/0075085 | A1 | 3/2016 | Sasaki |
| 2016/0151973 | A1 | 6/2016 | Jover et al. |
| 2016/0214320 | A1 | 7/2016 | Sasaki et al. |
| 2016/0221263 | A1 | 8/2016 | Din et al. |
| 2016/0221269 | A1 | 8/2016 | Okamoto et al. |
| 2016/0325496 | A1 | 11/2016 | De Pena et al. |
| 2016/0325503 | A1 | 11/2016 | Mironets et al. |
| 2016/0332380 | A1 | 11/2016 | De Pena et al. |
| 2016/0361874 | A1 | 12/2016 | Park et al. |
| 2016/0368054 | A1 | 12/2016 | Ng et al. |
| 2016/0368214 | A1 | 12/2016 | Sasaki et al. |
| 2017/0014911 | A1 | 1/2017 | Ng et al. |
| 2017/0021569 | A1 | 1/2017 | Puigardeu Aramendia et al. |
| 2017/0056974 | A1 | 3/2017 | Miyashita et al. |
| 2017/0072644 | A1 | 3/2017 | Ng et al. |
| 2017/0095980 | A1 | 4/2017 | Kritchman et al. |
| 2017/0100937 | A1 | 4/2017 | Ohnishi |
| 2017/0115594 | A1 | 4/2017 | Martin |
| 2017/0136695 | A1 | 5/2017 | Versluys et al. |
| 2017/0203513 | A1 | 7/2017 | Chanclon et al. |
| 2017/0217104 | A1 | 8/2017 | Cortes I Herms et al. |
| 2017/0239889 | A1 | 8/2017 | Ganapathiappan et al. |
| 2017/0239932 | A1 | 8/2017 | Knecht et al. |
| 2017/0252975 | A1 | 9/2017 | Park |
| 2017/0259456 | A1 | 9/2017 | Sasaki et al. |
| 2017/0305142 | A1 | 10/2017 | Yamaguchi |
| 2017/0318186 | A1 | 11/2017 | Morovic et al. |
| 2017/0326792 | A1 | 11/2017 | Paternoster et al. |
| 2017/0334138 | A1 | 11/2017 | Vilajosana et al. |
| 2017/0341365 | A1 | 11/2017 | De Lajudie et al. |
| 2017/0355137 | A1 | 12/2017 | Ederer et al. |
| 2017/0368756 | A1 | 12/2017 | Sanz Ananos et al. |
| 2018/0001559 | A1 | 1/2018 | Paternoster et al. |
| 2018/0004192 | A1 | 1/2018 | Perret et al. |
| 2018/0009157 | A1 | 1/2018 | Gutierrez et al. |
| 2018/0009167 | A1 | 1/2018 | Alejandre et al. |
| 2018/0011475 | A1 | 1/2018 | Donovan et al. |
| 2018/0071820 | A1 | 3/2018 | Natarajan et al. |
| 2018/0079137 | A1 | 3/2018 | Herzog et al. |
| 2018/0126632 | A1 | 5/2018 | Bonatsos et al. |
| 2018/0141271 | A1 | 5/2018 | Gunther et al. |
| 2018/0154480 | A1 | 6/2018 | Bai et al. |
| 2018/0193947 | A1 | 7/2018 | Harding et al. |
| 2018/0200791 | A1 | 7/2018 | Redding et al. |
| 2018/0236549 | A1 | 8/2018 | Spears et al. |
| 2018/0311898 | A1 | 11/2018 | Schwarzbaum et al. |
| 2018/0326660 | A1 | 11/2018 | Gifford et al. |
| 2018/0326662 | A1* | 11/2018 | Günther ................ B29C 64/268 |
| 2018/0339467 | A1 | 11/2018 | Donovan et al. |
| 2018/0370213 | A1 | 12/2018 | Gold et al. |
| 2019/0001571 | A1 | 1/2019 | Stockett et al. |
| 2019/0022752 | A1 | 1/2019 | Twelves, Jr. et al. |
| 2019/0091766 | A1 | 3/2019 | Kasperchik et al. |
| 2019/0111619 | A1 | 4/2019 | Schalk et al. |
| 2019/0118468 | A1 | 4/2019 | Bobar et al. |
| 2019/0126554 | A1 | 5/2019 | Iwase |
| 2020/0130263 | A1* | 4/2020 | Günther ................ B29C 64/209 |
| 2022/0234287 | A1* | 7/2022 | Culubret Cortada ........................ B29C 64/364 |

FOREIGN PATENT DOCUMENTS

| | | | |
|---|---|---|---|
| CN | 107175827 | A | 9/2017 |
| CN | 107364126 | A | 11/2017 |
| CN | 108165961 | A | 6/2018 |
| CN | 108927491 | A | 12/2018 |
| EP | 1018429 | A1 | 7/2000 |
| EP | 1108546 | A1 | 6/2001 |
| EP | 1270185 | A1 | 1/2003 |
| EP | 1440803 | A1 | 7/2004 |
| EP | 1946907 | A2 | 7/2008 |
| EP | 2543514 | A2 | 1/2013 |
| EP | 3168035 | A1 | 5/2017 |
| EP | 3205483 | A1 | 8/2017 |
| EP | 3486008 | A1 | 5/2019 |
| GB | 2550341 | A | 11/2017 |
| GB | 2568518 | A | 5/2019 |
| JP | H11157087 | A | 6/1999 |
| JP | 2001334582 | A | 12/2001 |
| JP | 2003508246 | A | 3/2003 |
| JP | 2003211687 | A | 7/2003 |
| JP | 2005319650 | A | 11/2005 |
| JP | 2008086846 | A | 4/2008 |
| JP | 2014065179 | A | 4/2014 |
| JP | 2014527481 | A | 10/2014 |
| JP | 2015174338 | A | 10/2015 |
| JP | 2015182428 | A | 10/2015 |
| JP | 2015193184 | A | 11/2015 |
| JP | 2016093909 | A | 5/2016 |
| JP | 2016107543 | A | 6/2016 |
| JP | 2016141151 | A | 8/2016 |
| JP | 2017508063 | A | 3/2017 |
| JP | 2018503543 | A | 2/2018 |
| JP | 2018516774 | A | 6/2018 |
| JP | 2018520029 | A | 7/2018 |
| JP | 2018523595 | A | 8/2018 |
| JP | 2018526527 | A | 9/2018 |
| WO | 20010117783 | A1 | 3/2001 |
| WO | 2015100085 | A2 | 7/2015 |
| WO | 2015151832 | A1 | 10/2015 |
| WO | 2017023281 | A1 | 2/2017 |
| WO | 2017177603 | A1 | 10/2017 |
| WO | 2017196337 | A1 | 11/2017 |
| WO | 2018026011 | A1 | 2/2018 |
| WO | 2018072975 | A1 | 4/2018 |
| WO | 2018091007 | A1 | 5/2018 |
| WO | 2018143953 | A1 | 8/2018 |
| WO | 2018194688 | A1 | 10/2018 |
| WO | 2018231205 | A1 | 12/2018 |
| WO | 2019027405 | A1 | 2/2019 |
| WO | 2019027431 | A1 | 2/2019 |
| WO | 2019059099 | A1 | 3/2019 |
| WO | 2019066781 | A1 | 4/2019 |
| WO | 2019194795 | A1 | 10/2019 |
| WO | 2020237161 | A1 | 11/2020 |

OTHER PUBLICATIONS

International Search Report and Written Opinion for application PCT/US2020/034261 mail date Jan. 29, 2021 (32 pages).

Japanese Office Action for Application No. 2021-567071 dated Nov. 29, 2022 (8 pages).

International Search Report and Written Opinion for application PCT/US2020/034144 mail date Jan. 13, 2021 (22 pages).

International Search Report and Written Opinion for application PCT/US2020/034207 mail date Sep. 1, 2020 (16 pages).

International Search Report and Written Opinion for application PCT/US2020/034205 mail date Nov. 13, 2020 (23 pages).

Japanese Patent Office Action for Application No. 2021-567073 dated Dec. 6, 2022 (5 pages).

International Search Report and Written Opinion for application PCT/US2020/034189 mail date Oct. 1, 2020 (24 pages).

International Search Report and Written Opinion for application PCT/US2020/034204 mail date Sep. 2, 2020 (15 pages).

International Search Report and Written Opinion for application PCT/US2020/034244 mail date Nov. 12, 2020 (23 pages).

Hewlett Packard Thermal Inkjet Printhead information sheet, undated (1 page).

International Search Report and Written Opinion for application PCT/US2020/034145 mail date Dec. 1, 2020 (21 pages).

International Search Report and Written Opinion for application PCT/US2020/034259 mail date of Dec. 1, 2020 (23 pages).

(56) References Cited

OTHER PUBLICATIONS

International Search Report and Written Opinion for application PCT/US2020/034142 mail date Aug. 20, 2020 (15 pages).
International Search Report and Written Opinion for application PCT/US2020/034141 mail date Aug. 20, 2020 (27 pages).
Mercedes-Benz USA: "Magic Vision Control—Mercedes-Benz Windshield Wipers", YouTube, dated Nov. 21, 2013 (Nov. 21, 2013), pp. 1-1, XP054980752, Retrieved from the Internet: URL:https://www.youtube.com/watch?v=07AZHk kLR0k [retrieved on Aug. 5, 2020] 0:13-0:40.
International Search Report and Written Opinion for application PCT/US2020/034140 mail date Nov. 27, 2020 (21 pages).
Hewlett Packard HP LaserJet Pro M404 Series information sheet, undated, https://www8.hp.com/h20195/v2/GetPDF.aspx/4AA7-4955EEP.pdf (5 pages).
"Solution Preparation Guidelines" The Sekisui Chemical Group, httpswww.sekisui-sc.comwp-contentuploadsSelvoIPVOH_SolutionPreparationGuidelines_EN.pdf.
Cooke et al., "Process Intermittent Measurement for Powder-Bed Based Additive Manufacturing" National Institute of Standards and Technology, Gaithersburg, MD 208991, Institute for Research in Electronics and Applied Physics, University of Maryland, College Park, MD 20742-3511., Aug. 17, 2011.
Hong et al., "Solvent Effect on Structural Change of Poly(vinyl alcohol) Physical Gels" Journal of Applied Polymer Science • Sep. 1998, DOI: 10.1002/(SICI)1097-4628(19980919)69:123.0.CO;2-U.
Shanjani et al., "Material Spreading and Compaction in Powder-Based Solid Freeform Fabrication Methods: Mathematical Modeling" Department of Mechanical and Mechatronics Engineering, University of Waterloo, 200 University Avenue West Waterloo, ON N2L 3G1, Canada, Sep. 10, 2008.
Sparrow, "Evonik, Voxeljet partner to develop 3D-printing systems for series production of finished plastic parts", Plastics Today, Nov. 10, 2019, https://www.plasticstoday.com/3d-printing/evonik-voxeljet-partner-develop-3d-printing-systems-series-production-finished-plastic.
"Advanced DLP for Superior 3D Printing" EnvisionTec, Mar. 9, 2017.
European Patent Office Action for Application No. 20735467.1 dated Mar. 16, 2023 (4 pages).
European Patent Office Action for Application No. 20732377.5 dated Mar. 9, 2023 (5 pages).

* cited by examiner

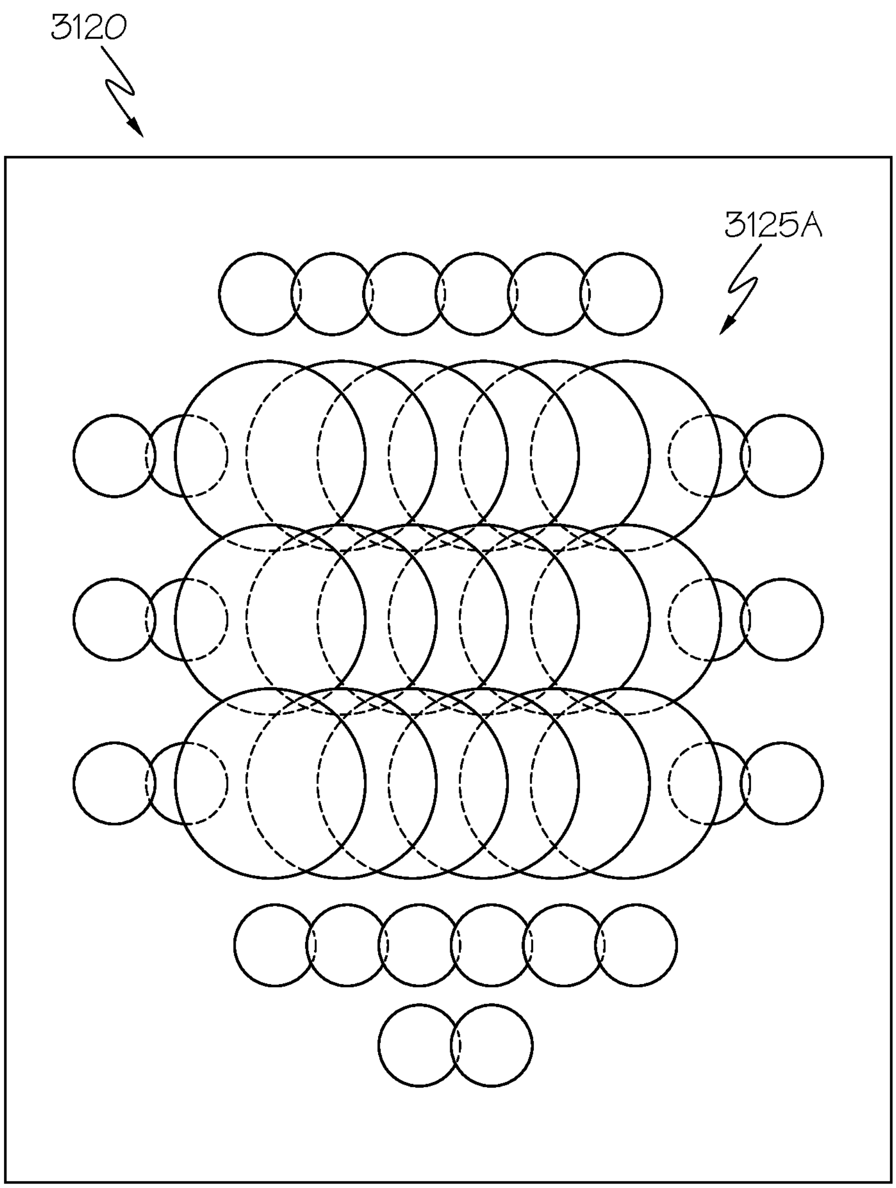
FIG. 78D
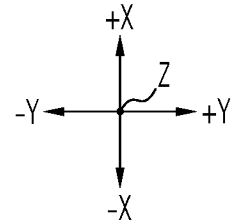

ADDITIVE MANUFACTURING APPARATUSES AND METHODS

CROSS REFERENCE TO RELATED APPLICATIONS

The present application is a National Phase Entry of PCT/US2020/034244 filed May 22, 2020 and entitled "Additive Manufacturing Apparatuses and Methods" and which claims the benefit of U.S. Provisional Patent Application Ser. No. 62/851,919 filed May 23, 2019, and entitled "Additive Manufacturing Apparatuses and Methods," U.S. Provisional Patent Application Ser. No. 62/852,034 filed May 23, 2019, and entitled "Cleaning Systems for Additive Manufacturing Apparatuses and Methods for Using the Same," U.S. Provisional Patent Application Ser. No. 62/852,030 filed May 23, 2019, and entitled "Cleaning Fluids for Use in Additive Manufacturing Apparatuses and Methods for Monitoring Status and Performance of the Same," U.S. Provisional Patent Application Ser. No. 62/851,913 filed May 23, 2019, and entitled "Build Receptacles for Additive Manufacturing Apparatuses and Methods for Using the Same," U.S. Provisional Patent Application Ser. No. 62/851,907 filed May 23, 2019, and entitled "Actuator Assemblies for Additive Manufacturing Apparatuses and Methods for Using the Same," U.S. Provisional Patent Application Ser. No. 62/851,953 filed May 23, 2019, and entitled "Additive Manufacturing Recoat Assemblies Including Sensors and Methods for Using the Same," U.S. Provisional Patent Application Ser. No. 62/851,957 filed May 23, 2019, and entitled "Printing Assemblies and Methods for Using the Same," and U.S. Provisional Patent Application Ser. No. 62/851,946 filed May 23, 2019, and entitled "Additive Manufacturing Apparatuses and Methods for Using the Same," the entirety of each of which is incorporated by reference herein.

FIELD

The present specification generally relates to additive manufacturing apparatuses and methods for using the same.

TECHNICAL BACKGROUND

Additive manufacturing apparatuses may be utilized to "build" an object from build material, such as organic or inorganic powders, in a layer-wise manner. Existing additive manufacturing apparatuses may not meet demands in terms of efficiency, throughput, and/or quality.

Accordingly, a need exists for alternative additive manufacturing apparatuses and components thereof that improve efficiency, throughput, and/or quality.

SUMMARY

In an aspect, a method of building an object by additive manufacturing comprises pre-heating a deposition region of a build chamber to a pre-heat temperature; distributing a layer of build material on a build platform positioned within the build chamber with a recoat assembly moving in a coating direction; depositing a layer of binder material on the layer of build material; irradiating the layer of build material with an energy source coupled to the recoat assembly; adjusting a position of the build platform such that a portion of build material and binder is within a curing region of the build chamber, wherein the curing region of the build chamber is below the deposition region of the build chamber; heating the curing region of the build chamber to a curing temperature, wherein the curing temperature is greater than the pre-heat temperature; curing the binder within the curing region of the build chamber; and distributing a new layer of build material above the portion of build material and binder on the build platform.

In another aspect, a method of building an object by additive manufacturing comprises: moving a recoat assembly over a build material with a recoat head actuator, the recoat head actuator comprising a recoat motion axis, whereby actuation of the recoat head actuator along the recoat motion axis in a first recoat direction causes the recoat assembly to move in the first recoat direction, and wherein the recoat assembly comprises a first roller and a second roller that is spaced apart from the first roller; rotating the first roller of the recoat assembly in a counter-rotation direction, such that a bottom of the first roller moves in the first recoat direction; contacting the build material with the first roller of the recoat assembly, thereby fluidizing at least a portion of the build material; irradiating, with a front energy source coupled to a front end of the recoat assembly, an initial layer of build material positioned in a build area; subsequent to irradiating the initial layer of build material, spreading the build material on the build area with the first roller, thereby depositing a second layer of the build material over the initial layer of build material; subsequent to spreading the second layer of the build material, irradiating, with a rear energy source positioned rearward of the front energy source, the second layer of build material within the build area; and depositing a binder material on the second layer of build material with a print head coupled to a print head actuator, the print head actuator comprising a print motion axis whereby the binder material is deposited with the print head by actuating the print head actuator along the print motion axis in a first print direction opposite the first recoat direction, wherein the recoat motion axis and the print motion axis are parallel to one another and spaced apart from one another in a vertical direction.

In another aspect, a method for forming an object with an additive manufacturing system comprises a supply platform, a cleaning station, and a build area horizontally positioned between the cleaning station and the supply platform, wherein the cleaning station comprises a binder purge bin and a cleaning station vessel having cleaning fluid therein and comprising a wet wipe cleaner section, and a dry wipe cleaner section, the method comprising: distributing a new layer of build material on the build area with a recoat assembly coupled to a recoat head actuator, the recoat head actuator comprising a recoat motion axis whereby actuation of the recoat head actuator along the recoat motion axis in a first recoat direction causes the recoat assembly to distribute the new layer of build material on the build area; depositing a binder material on the new layer of build material with a print head coupled to a print head actuator, the print head actuator comprising a print head motion axis whereby the binder material is deposited with the print head by actuating the print head actuator along the print head motion axis in a first print direction opposite the first recoat direction, where the recoat motion axis and the print head motion axis are parallel to one another and spaced apart from one another in a vertical direction; passing the print head over the binder purge bin to facilitate discharge of contaminants from the print head via backpressure; introducing the print head to the wet wipe cleaner section so that cleaning fluid is applied to the print head by a wet wipe member; and introducing the print head to the dry wipe cleaner section so that cleaning fluid is removed by a dry wipe member and the print head is thereby cleaned.

In another aspect, a method of building an object by additive manufacturing comprises: distributing a layer of build material on a build platform with a recoat head that is coupled to a recoat head actuator configured to move the recoat head along a longitudinal axis during distribution of the layer of build material; depositing binder through select ones of a plurality of jet nozzles of a printing head onto the layer of build material as the printing head traverses a first pass trajectory along a longitudinal axis in a first direction; indexing the printing head along a latitudinal axis to a second pass trajectory by an index distance; depositing binder through select ones of the plurality of jet nozzles of the printing head as the printing head traverses the second pass trajectory along a longitudinal axis in a second direction opposite the first direction; and distributing a new layer of build material above the layer of build material and binder on the build platform.

Additional features and advantages of the additive manufacturing apparatuses described herein, and the components thereof, will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

Figure 58A:
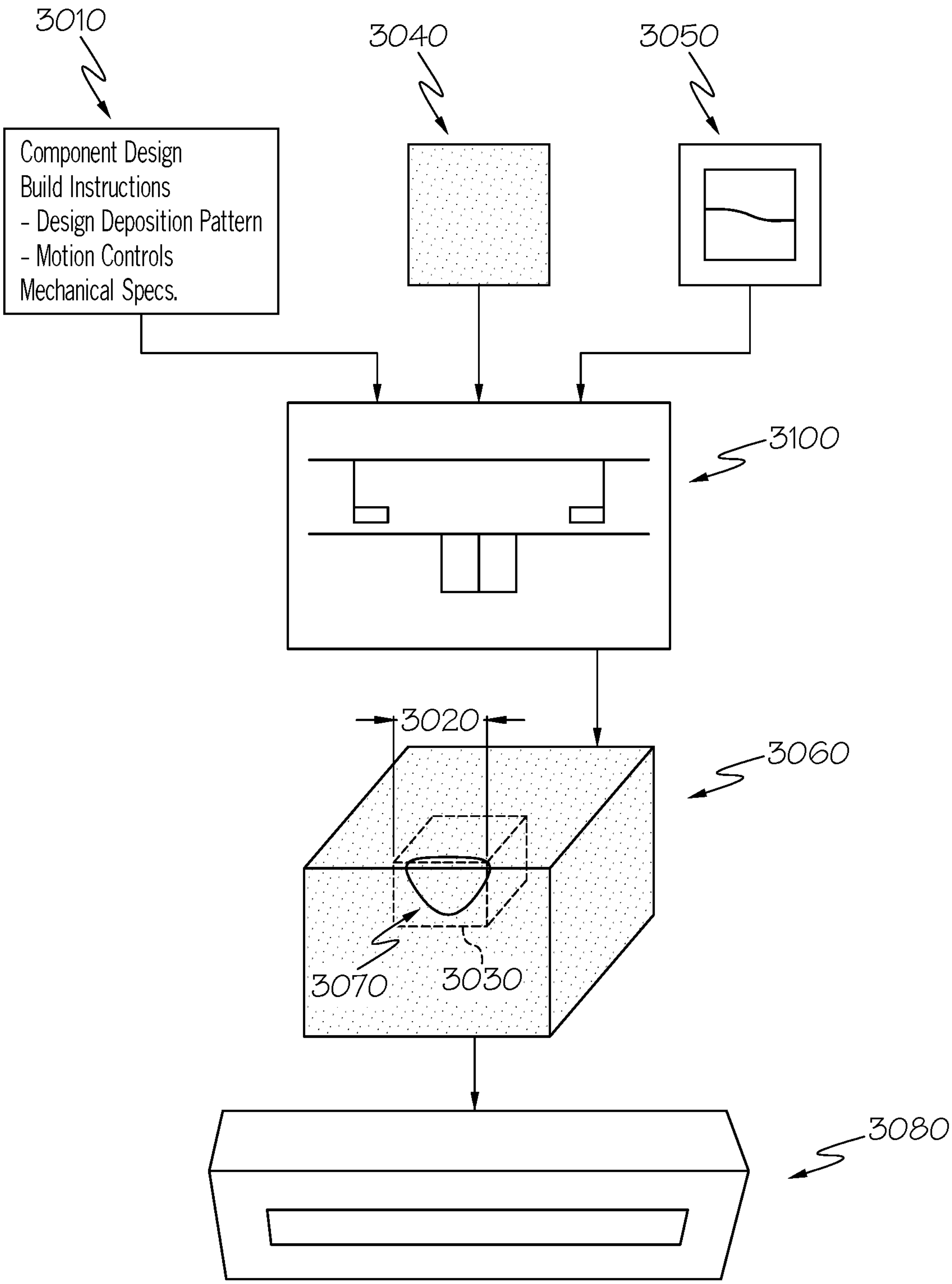
FIG. 58A depicts an illustrative process flow diagram for building a component using manufacturing apparatuses and manufacturing methods according to one or more embodiments shown and described herein.
Figure 58B:
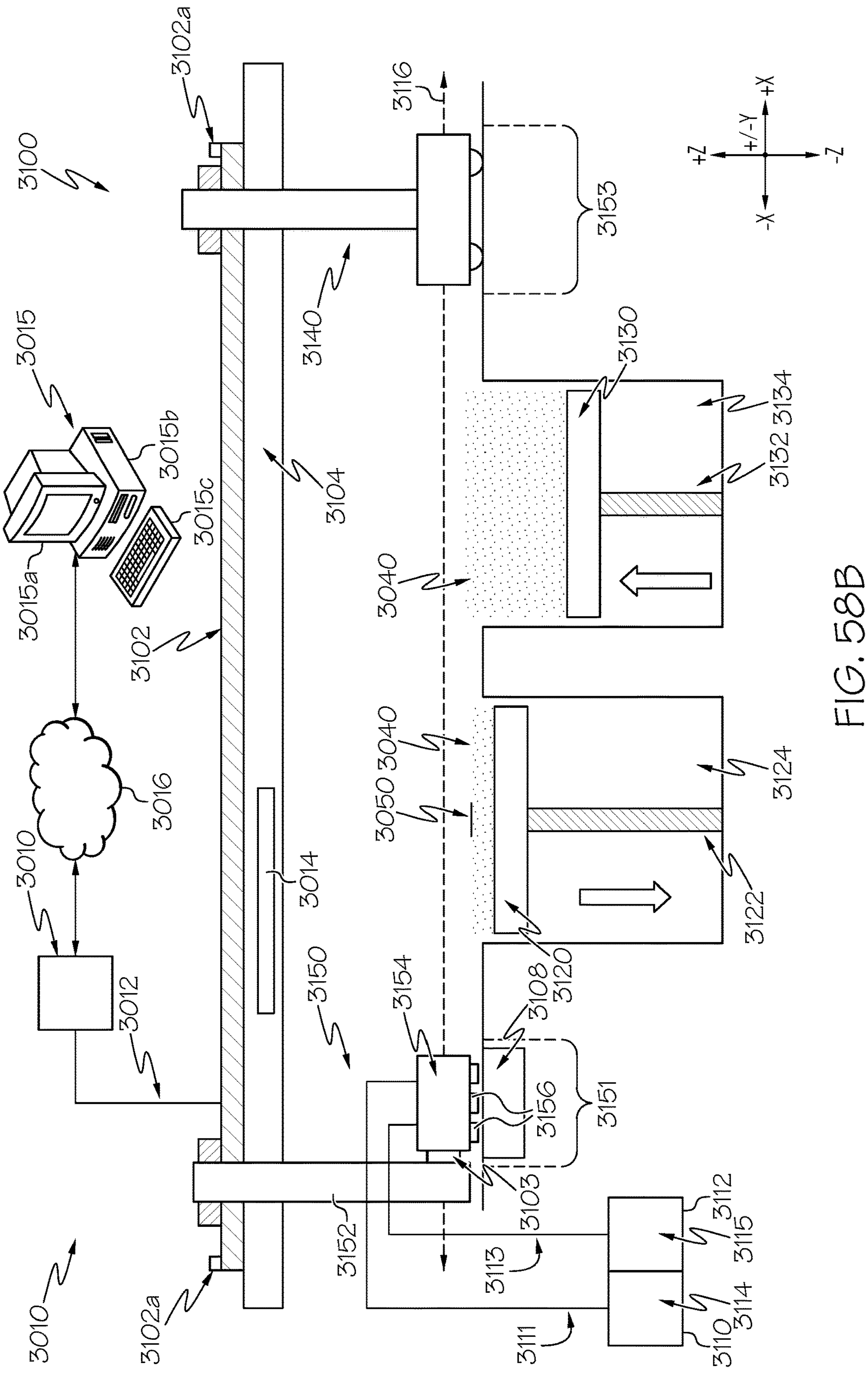
FIG. 58B schematically depicts a manufacturing apparatus according to one or more embodiments shown and described herein.
Figure 74A:
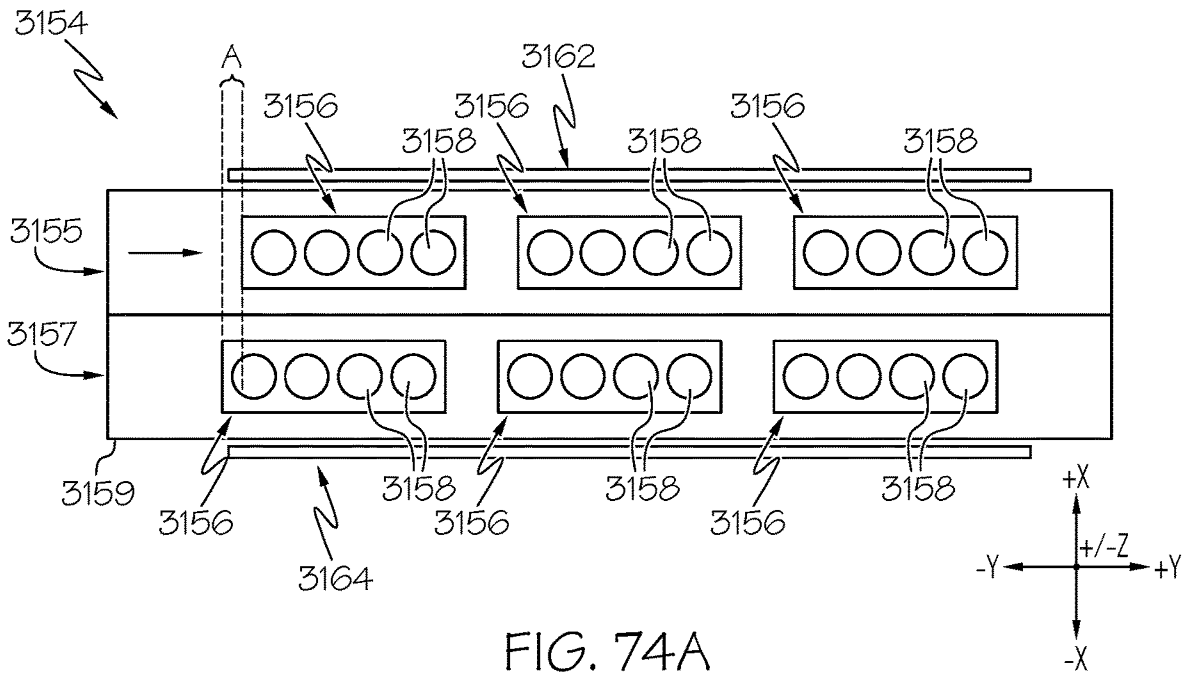
FIG. 74A schematically depicts an embodiment of a printing assembly for a manufacturing apparatus, with a first print head row of print heads coupled to a fine actuator for moving the first print head row according to one or more embodiments shown and described herein.
Figure 74B:
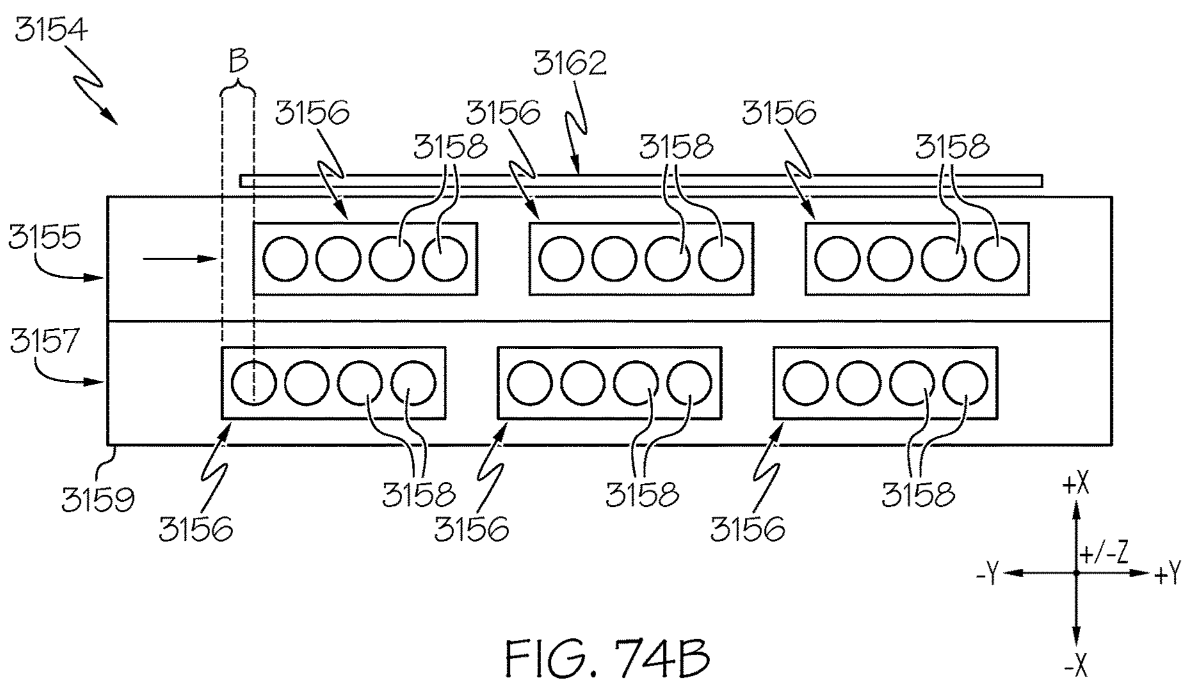
FIG. 74B schematically depicts an embodiment of a printing assembly for a manufacturing apparatus, with a first print head row of print heads coupled to a fine actuator for moving the first print head row according to one or more embodiments shown and described herein.
Figure 74C:
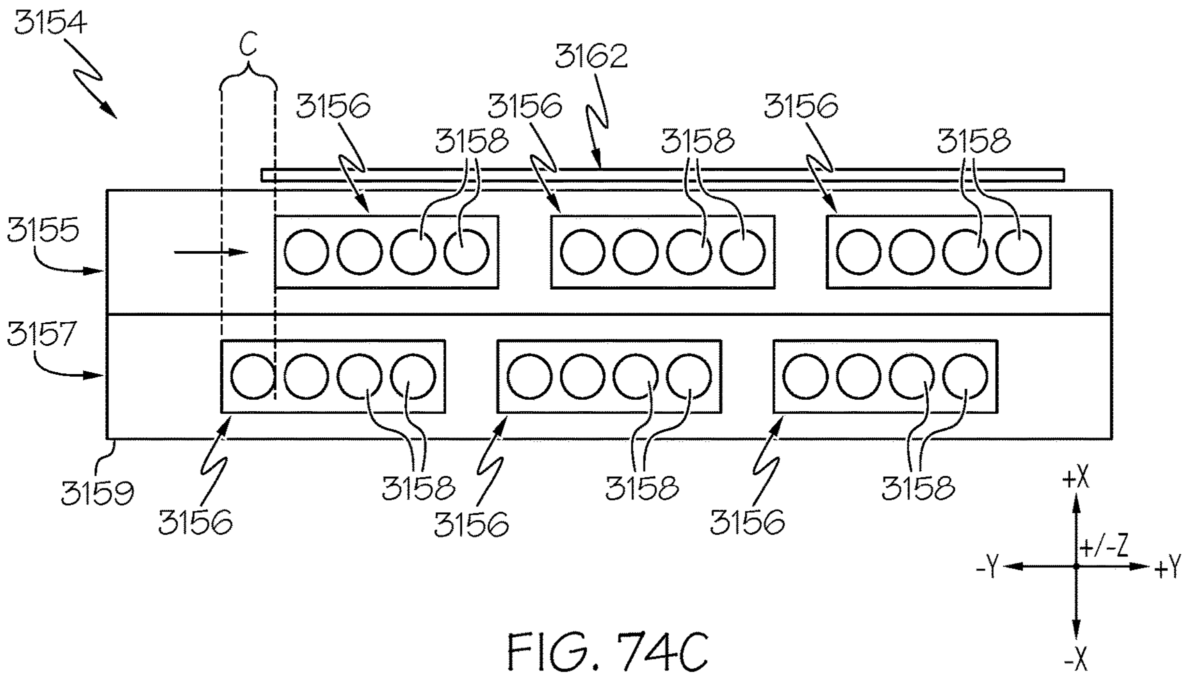
FIG. 74C schematically depicts an embodiment of a printing assembly for a manufacturing apparatus, with a first print head row of print heads coupled to a fine actuator for moving the first print head row according to one or more embodiments shown and described herein.
Figure 74D:
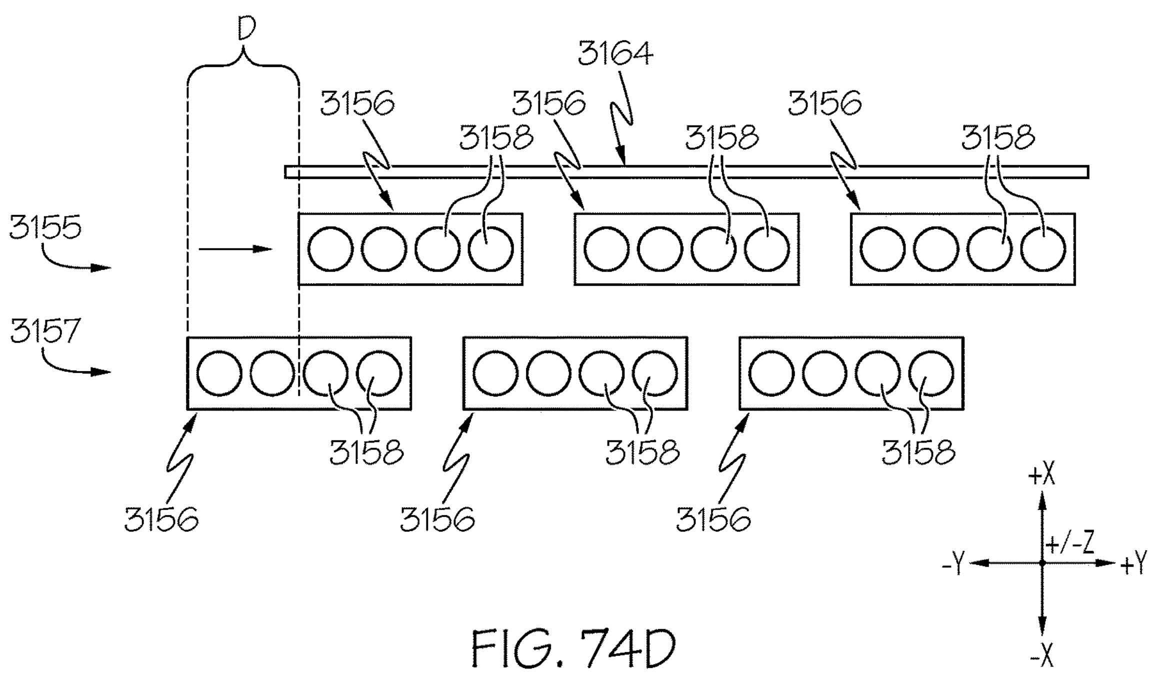
FIG. 74D schematically depicts an embodiment of a printing assembly for a manufacturing apparatus, with a first print head row of print heads coupled to a coarse actuator for moving the first print head row according to one or more embodiments shown and described herein.
Figure 74E:
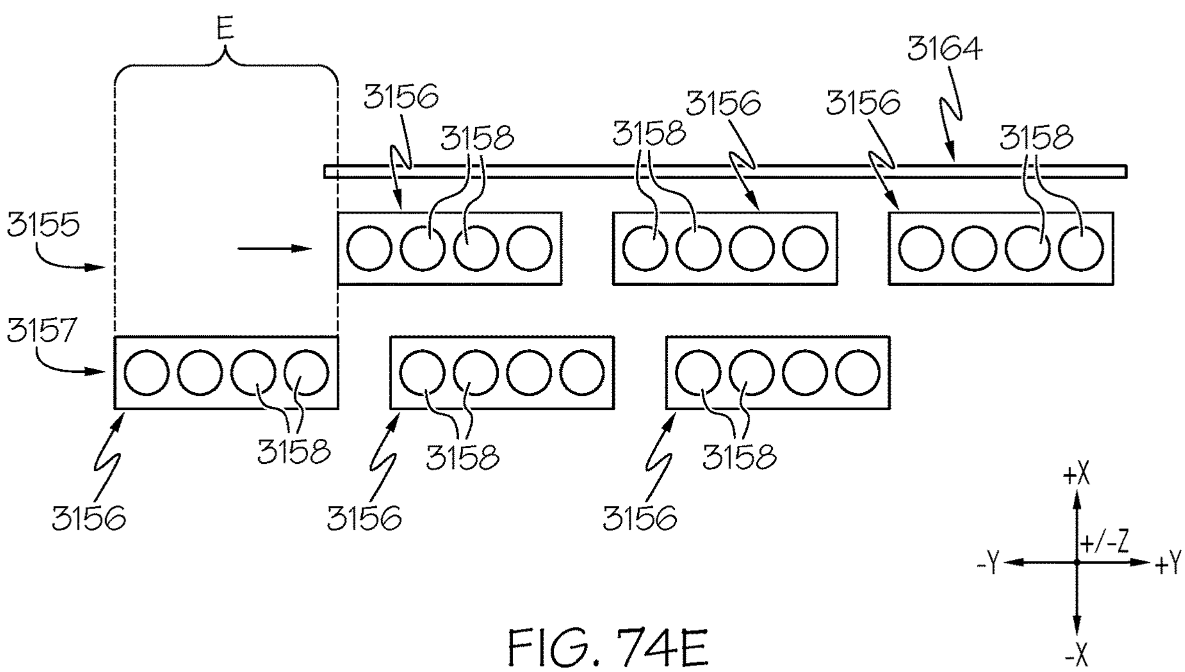
FIG. 74E schematically depicts an embodiment of a printing assembly for a manufacturing apparatus, with a first print head row of print heads coupled to a coarse actuator for moving the first print head row according to one or more embodiments shown and described herein.
Figure 74F:
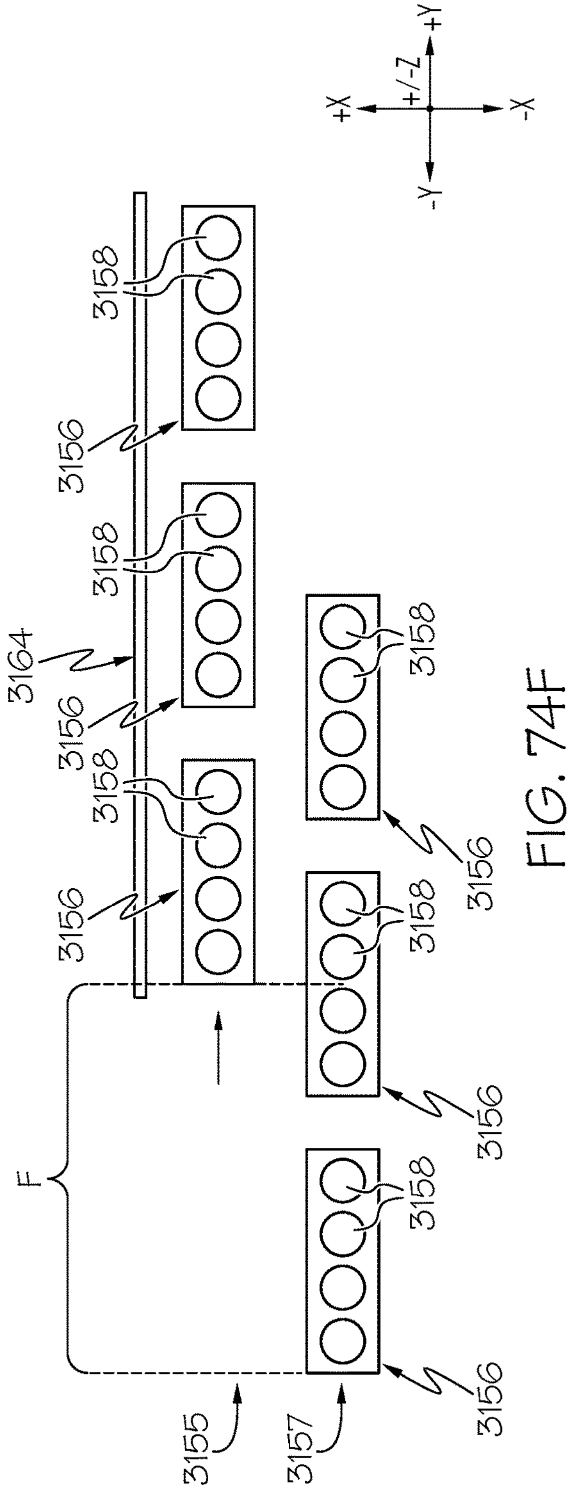
Figure 74G:
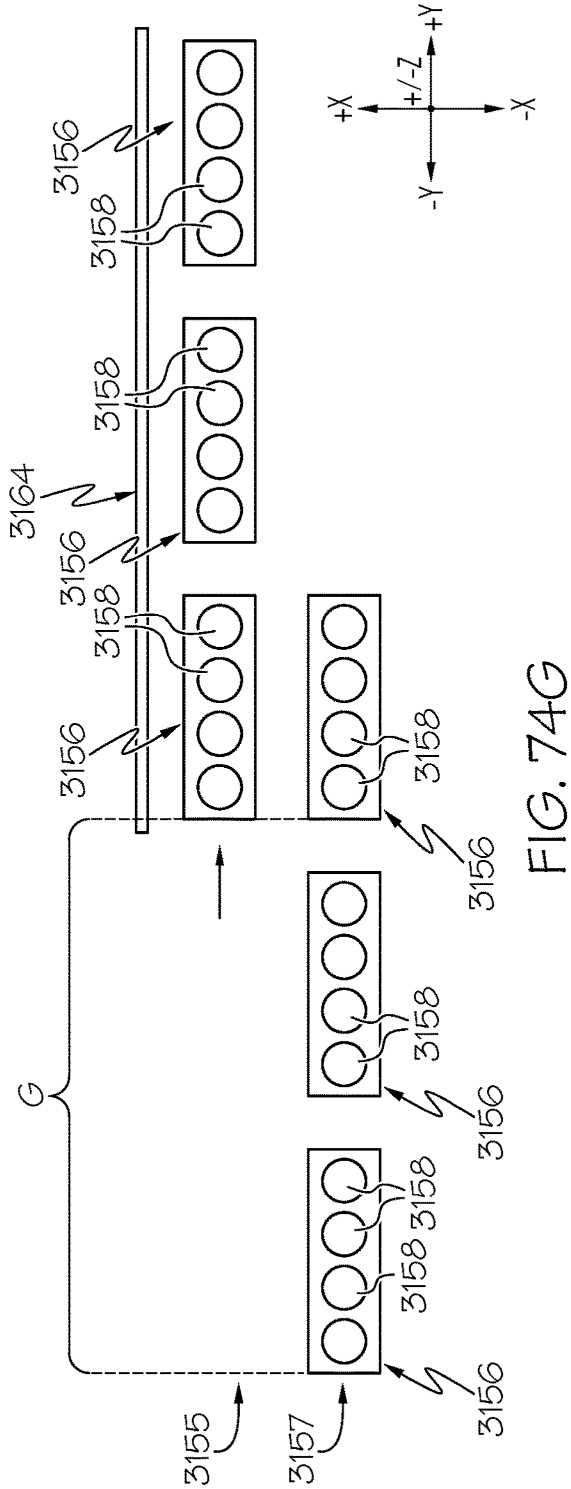
Figure 75A:
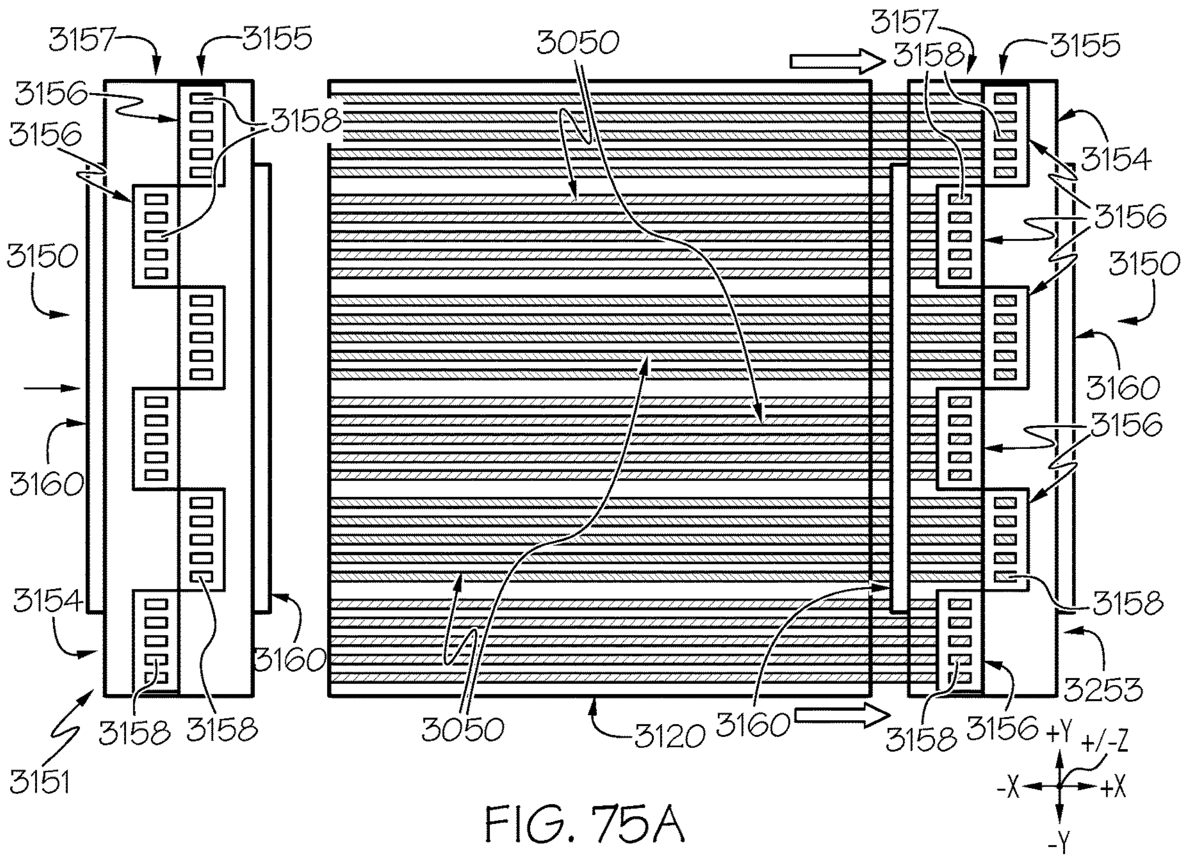
Figure 75B:
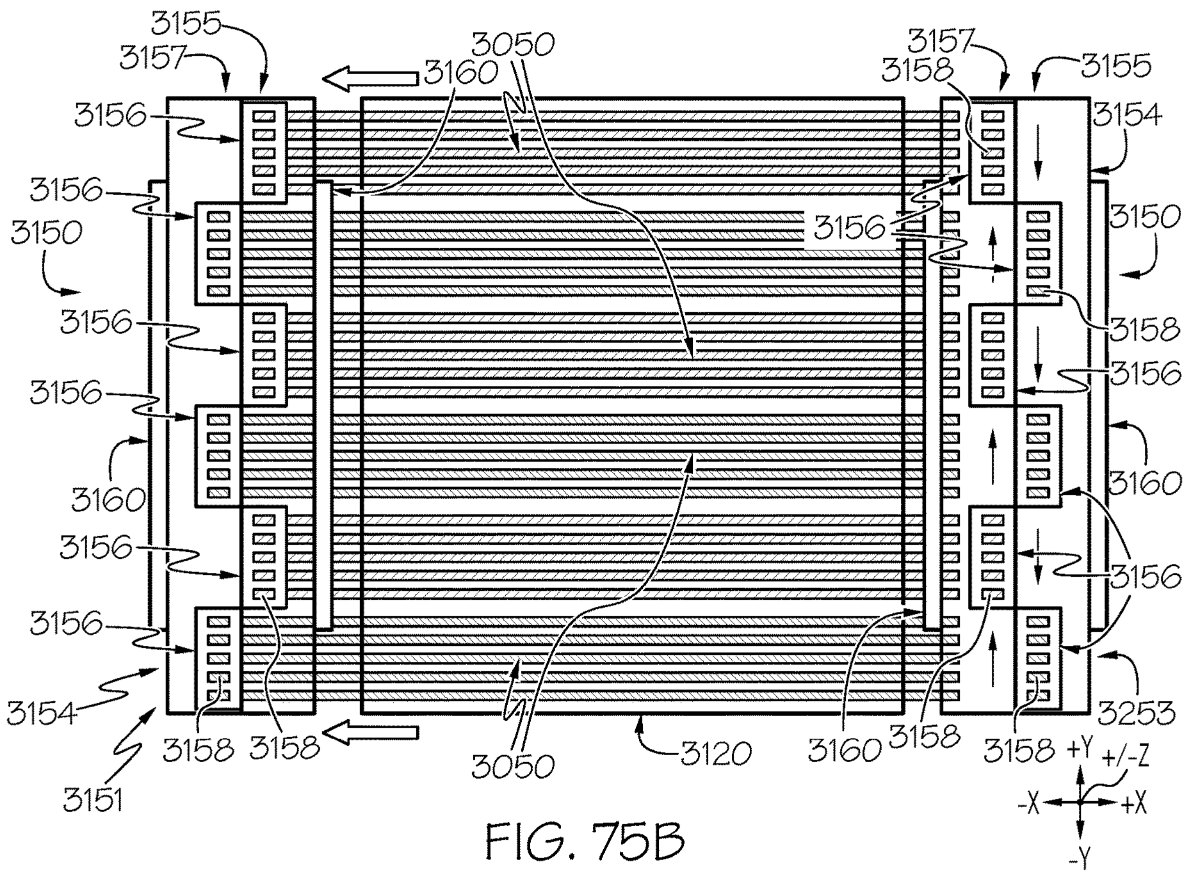
Figure 76A:
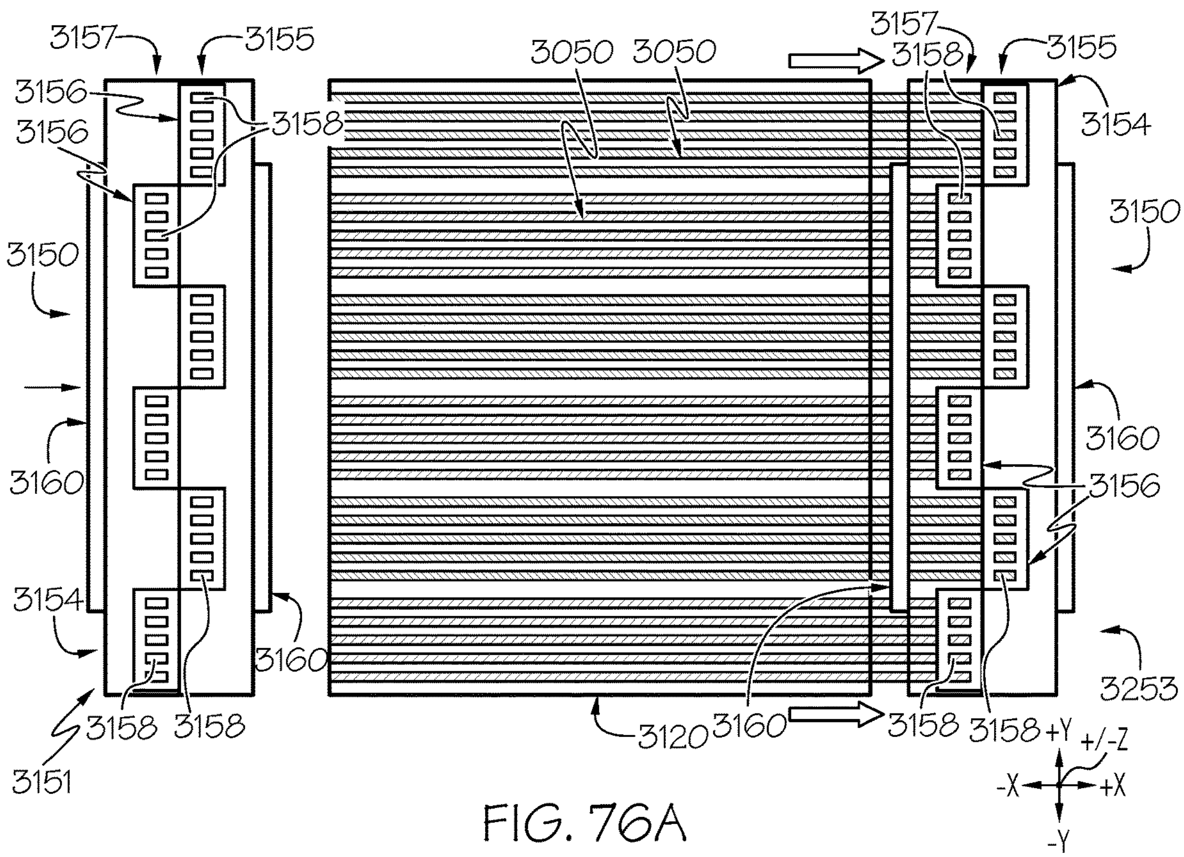
Figure 76B:
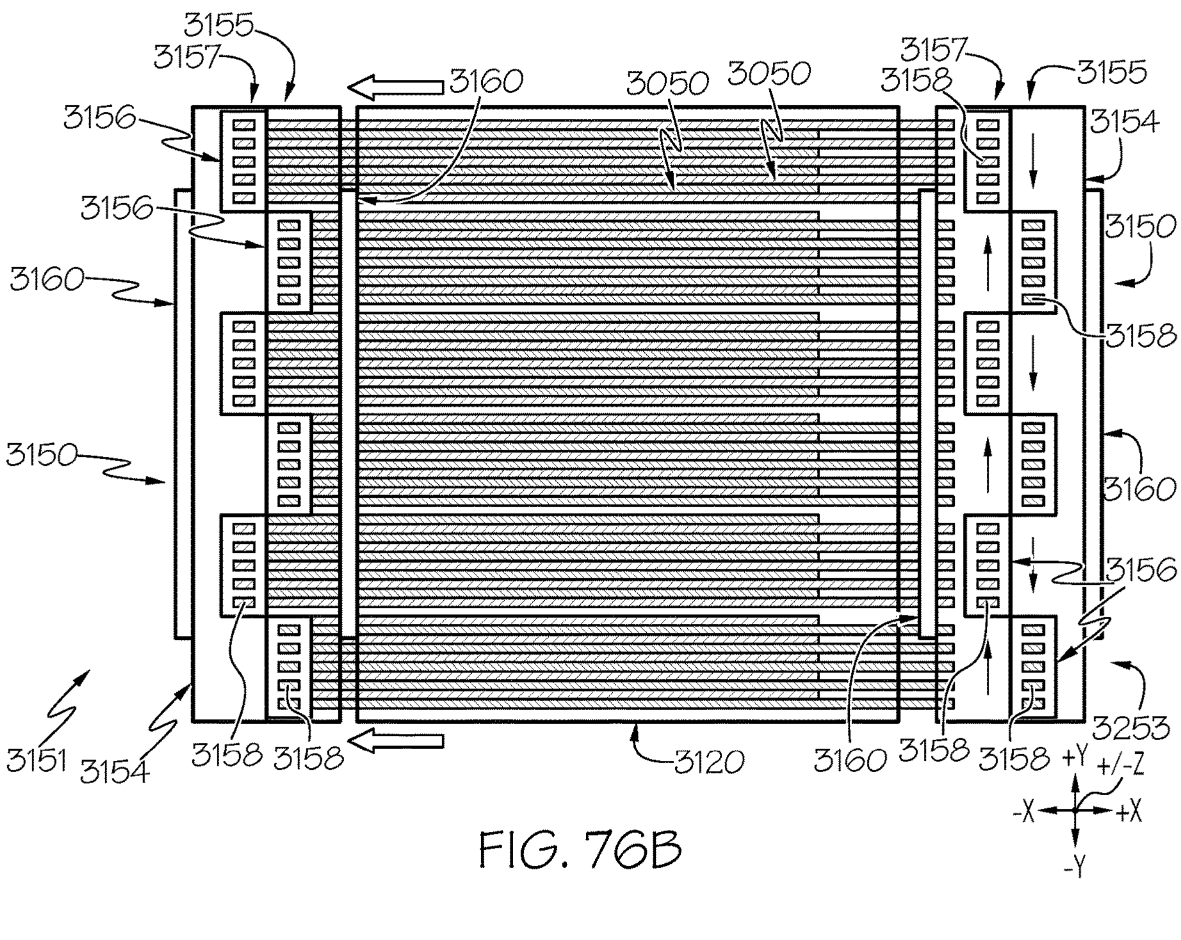
Figure 77A:
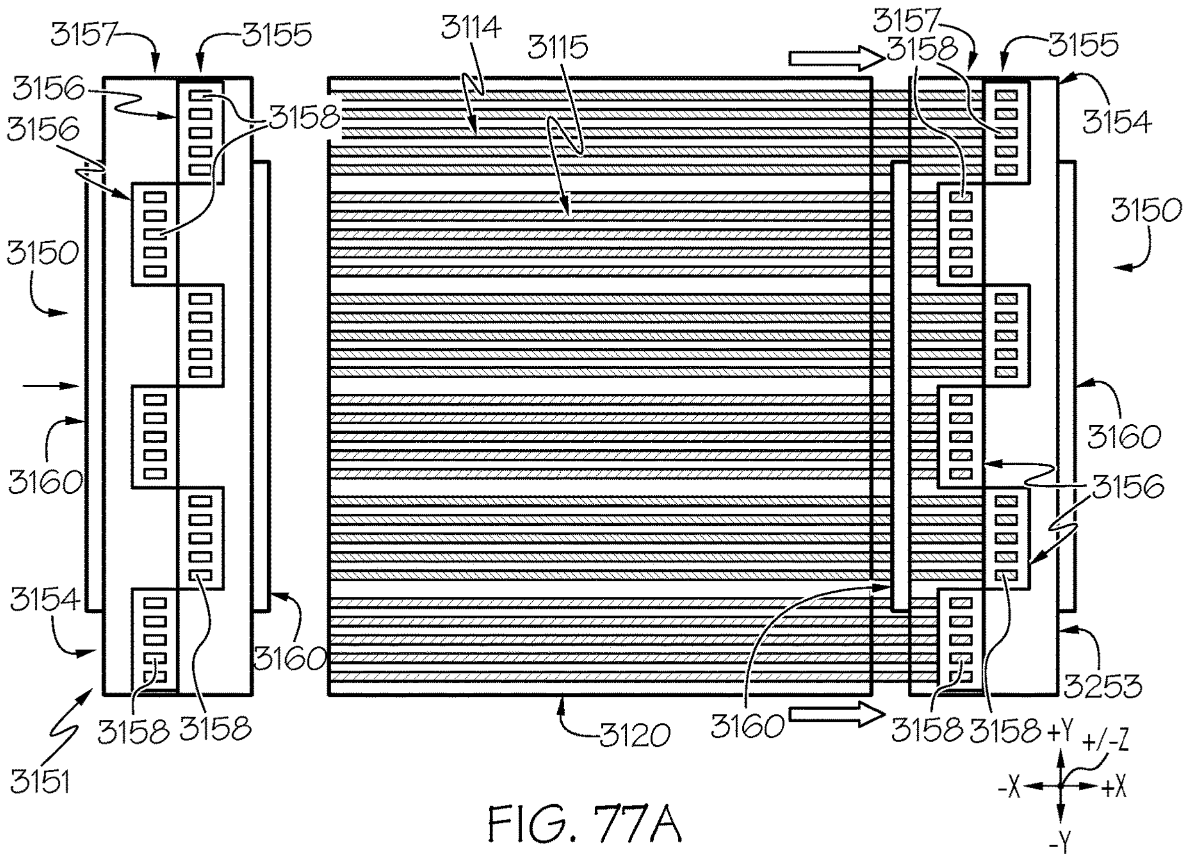
Figure 77B:
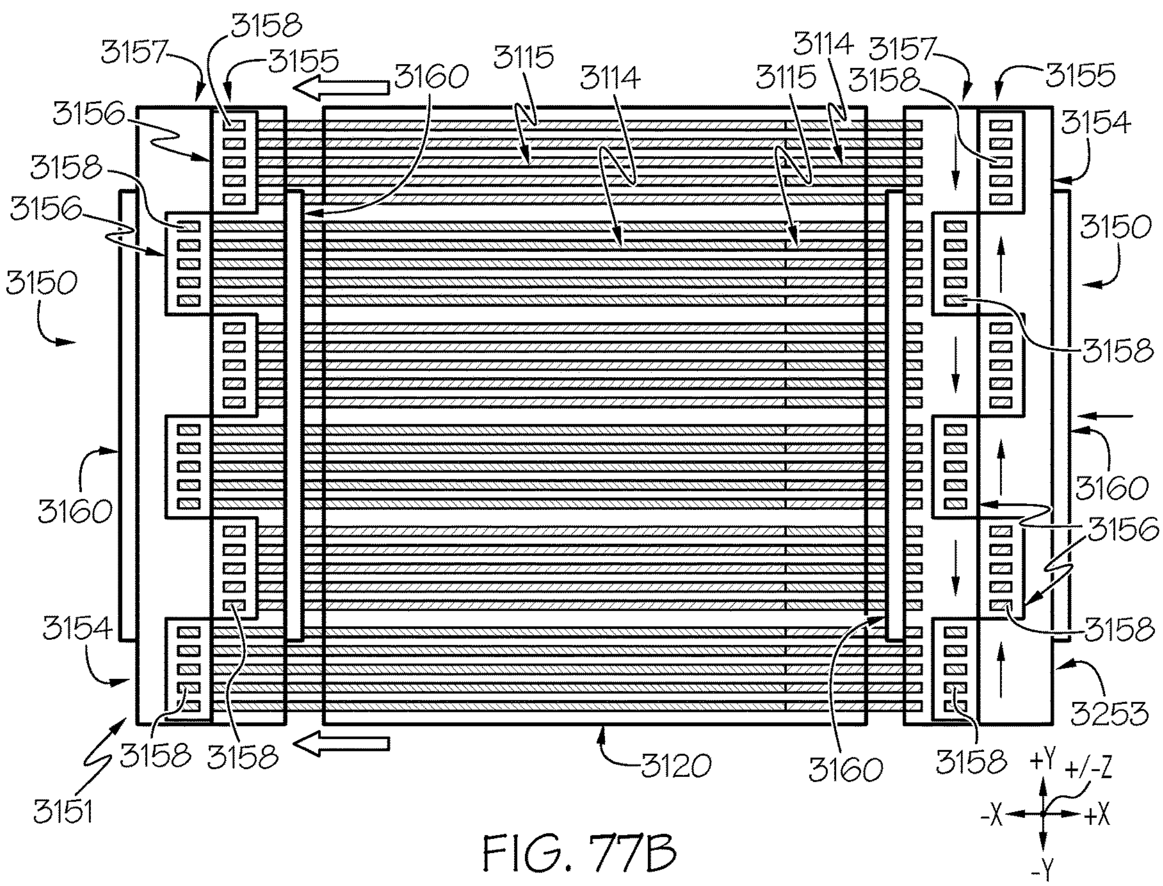
Figure 78A:
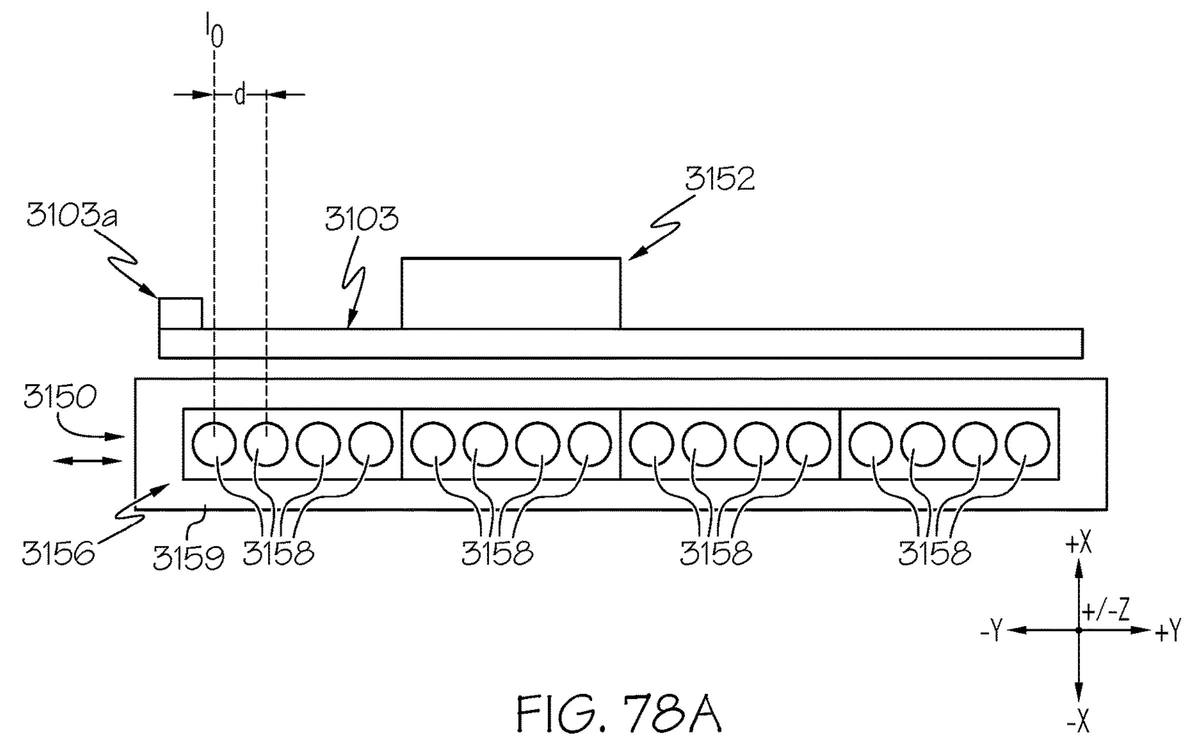
Figure 78B:
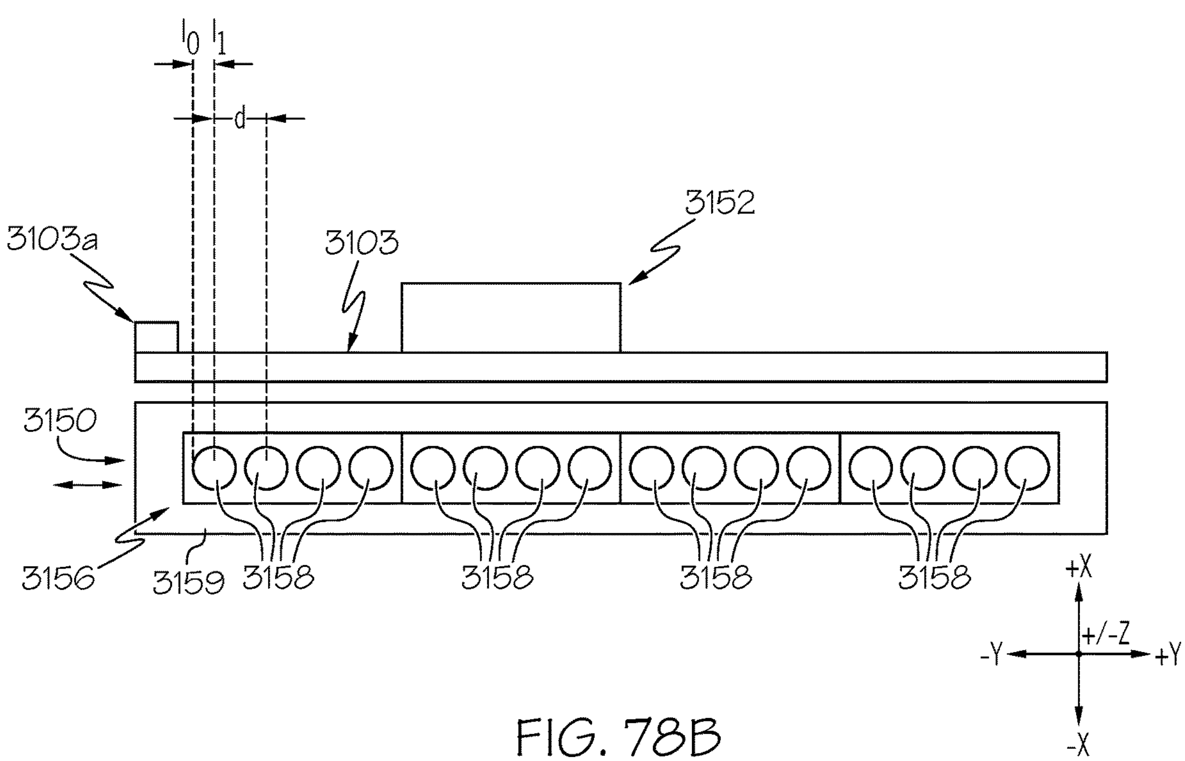
Figure 78C:
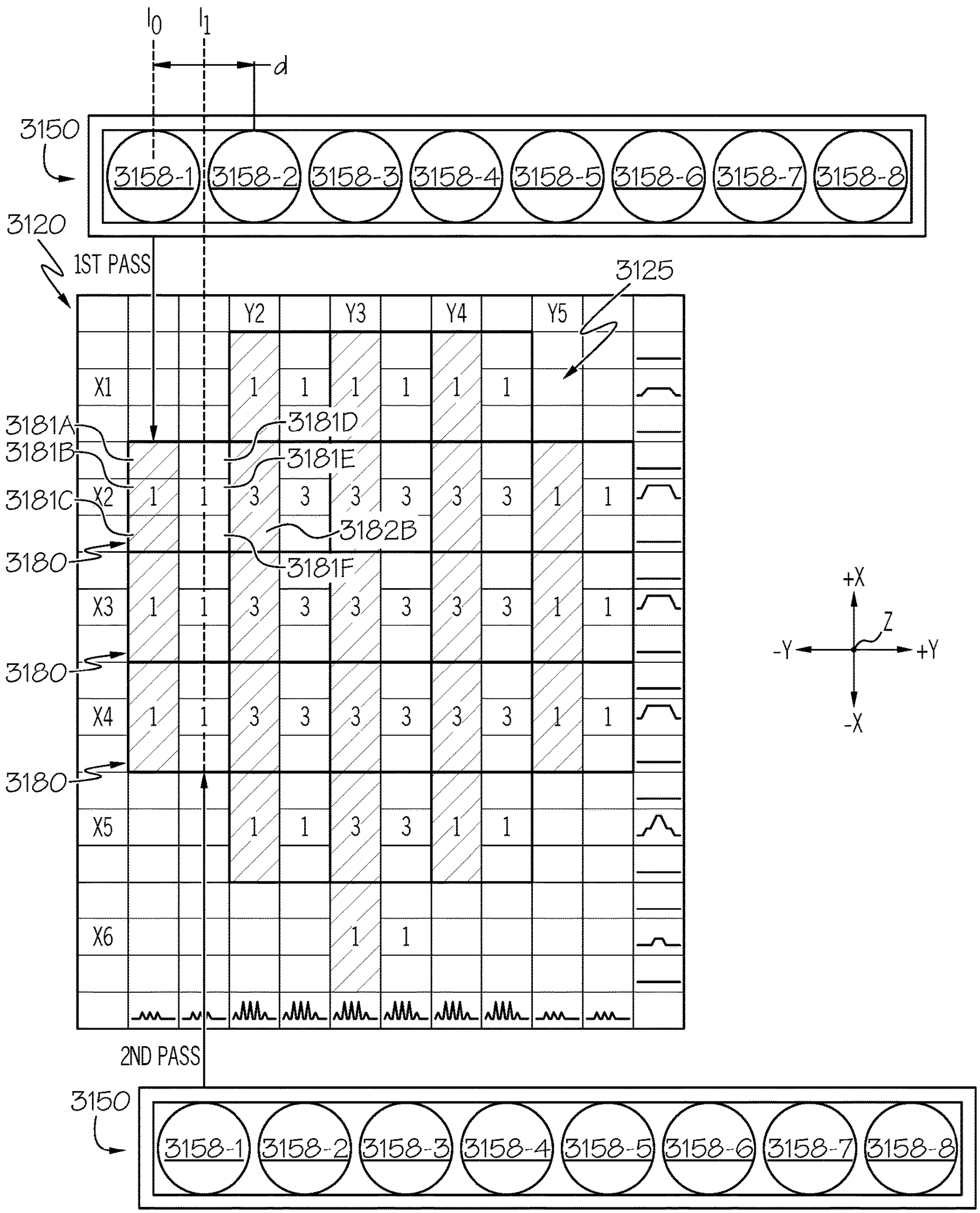
Figure 78E:
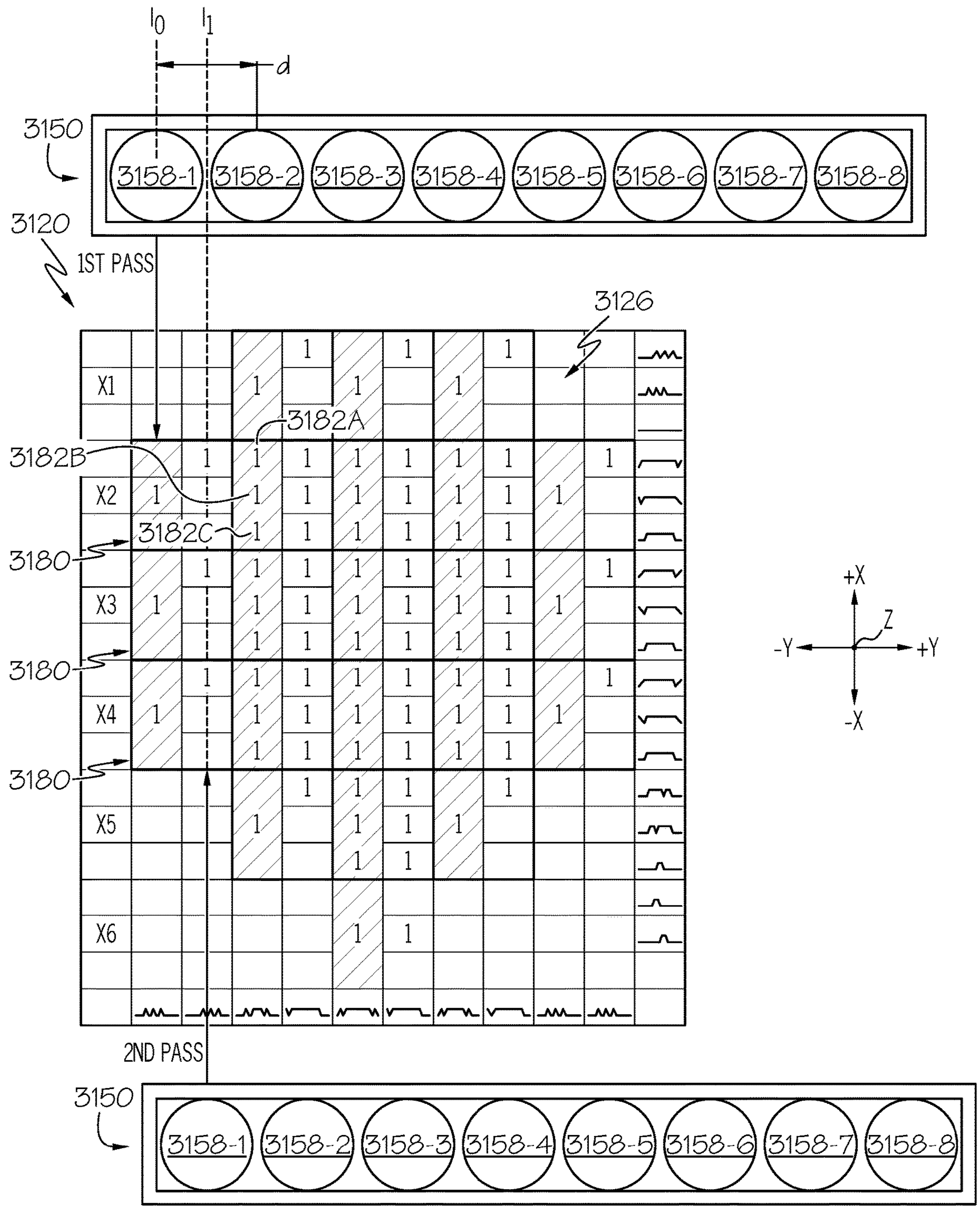
Figure 78F:
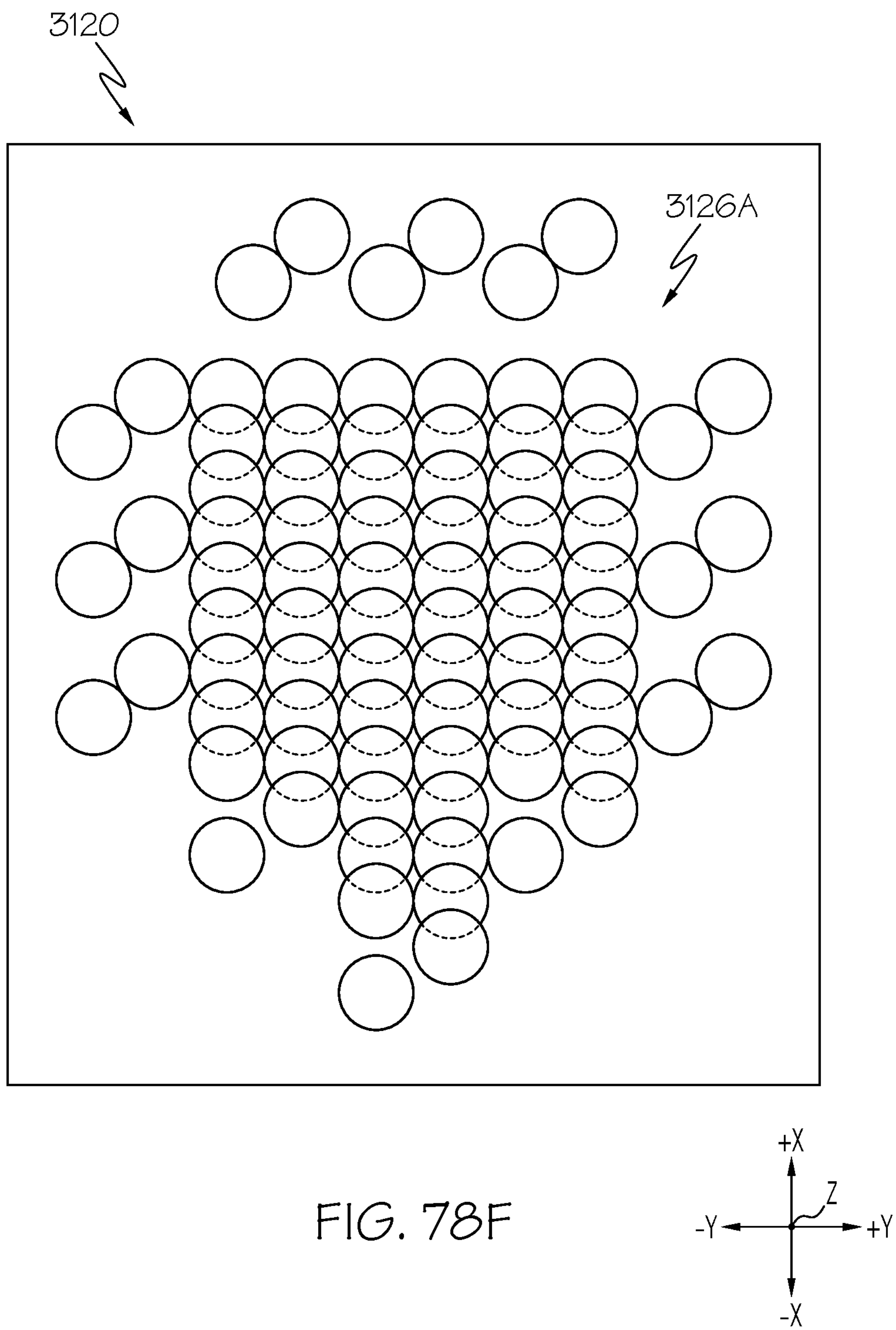
Figure 78G:
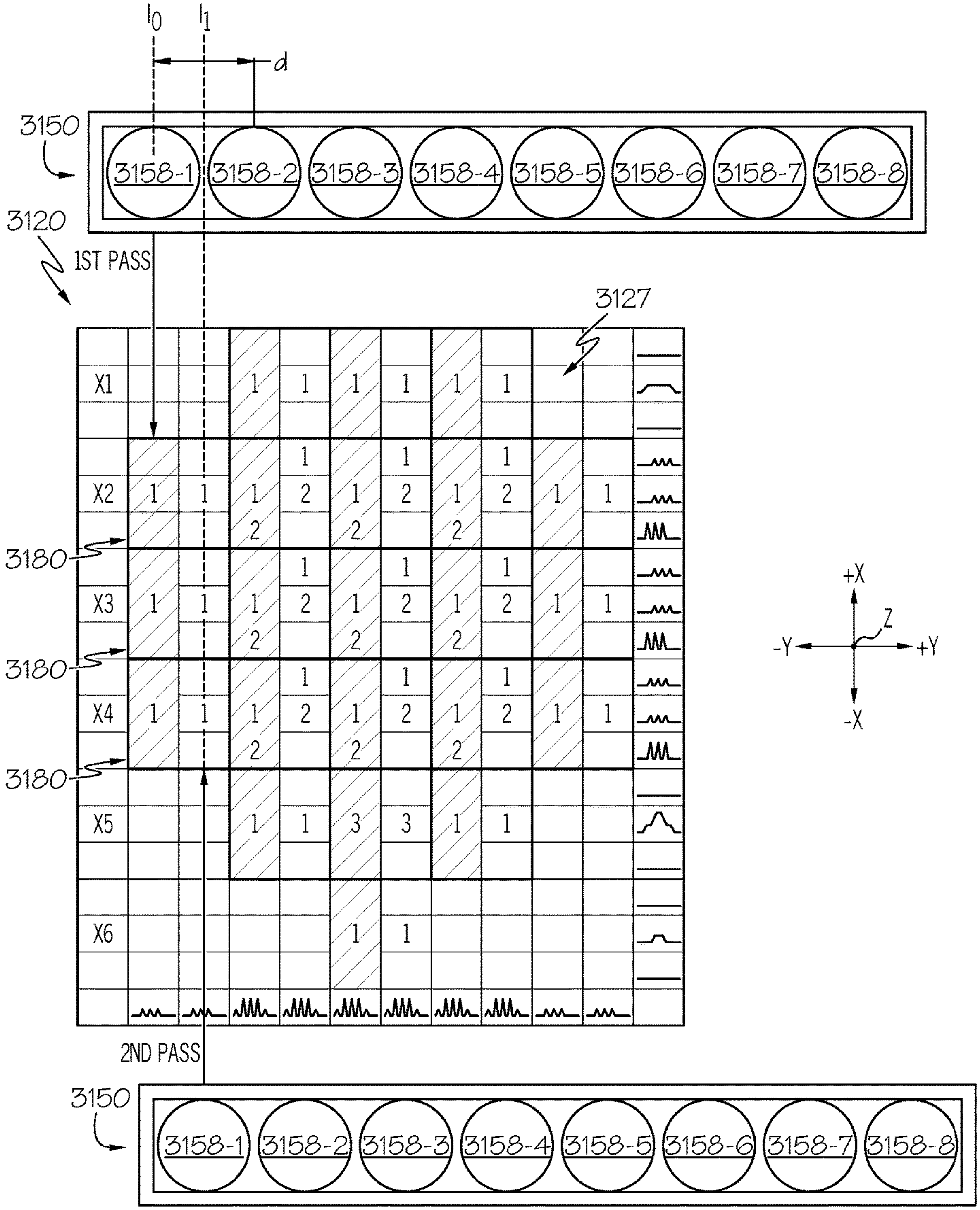
Figure 79A:
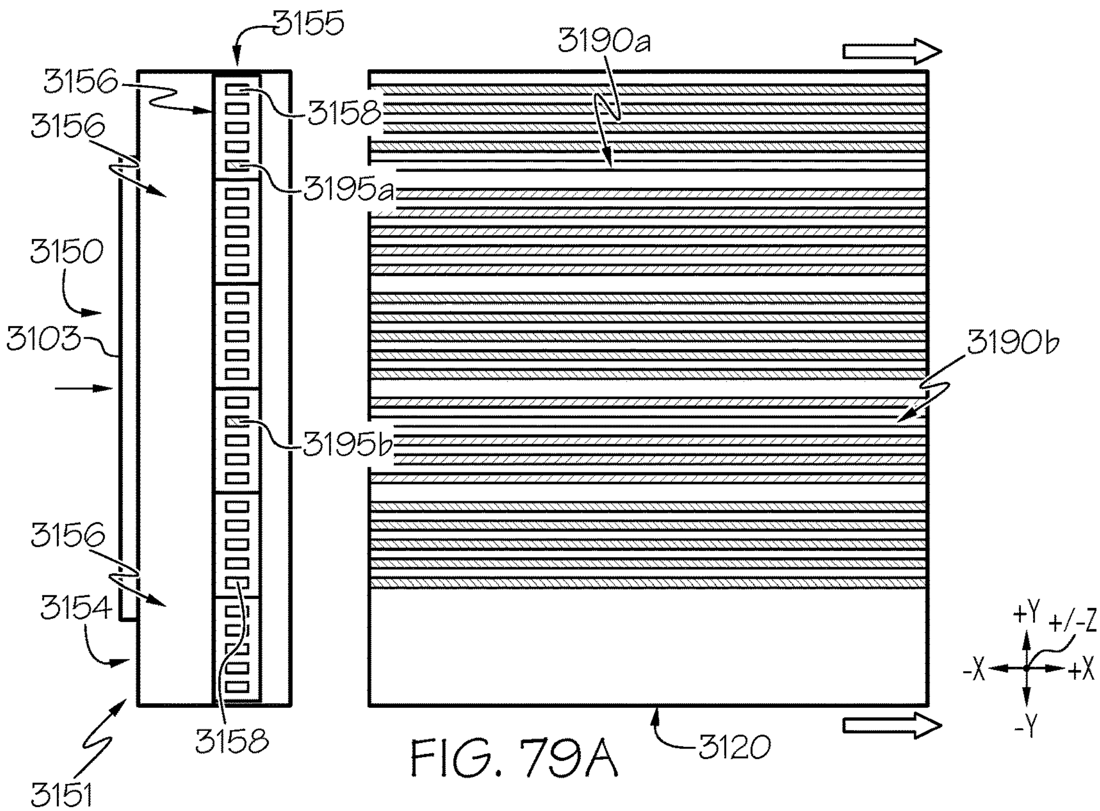
Figure 79B:
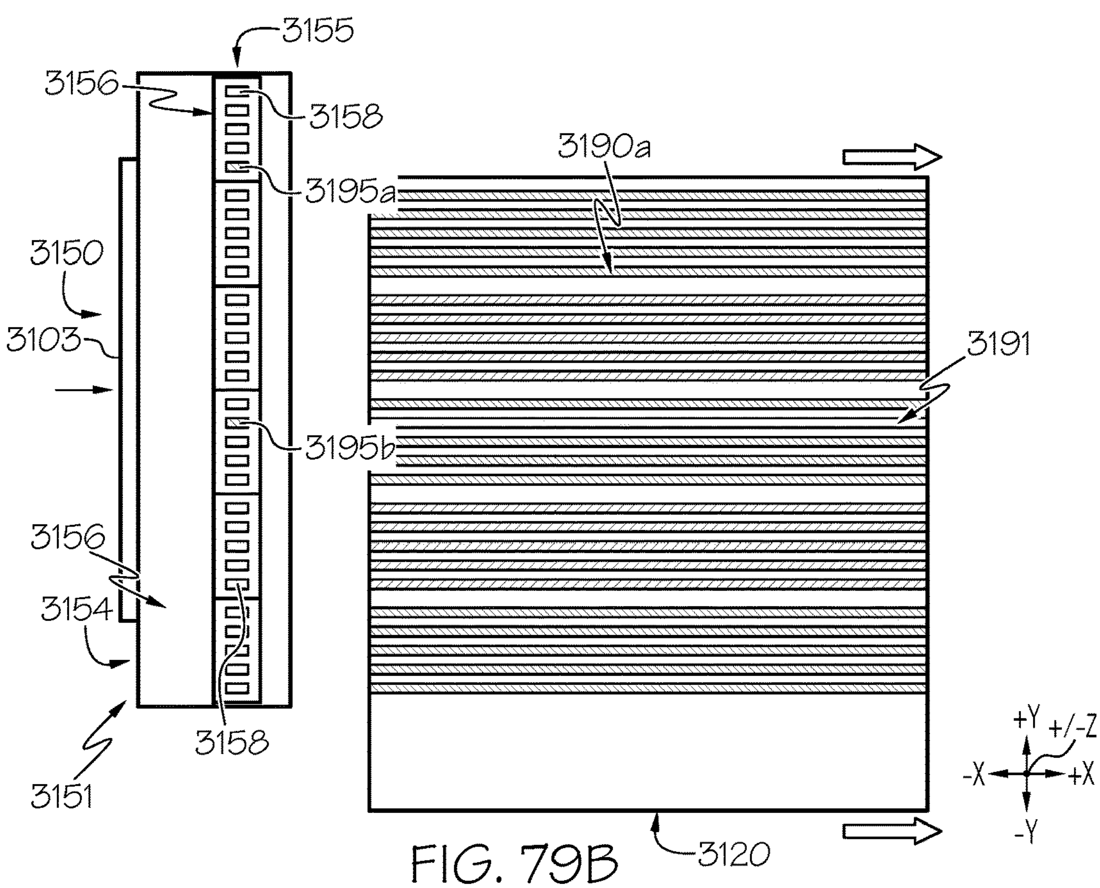
Figure 80B:
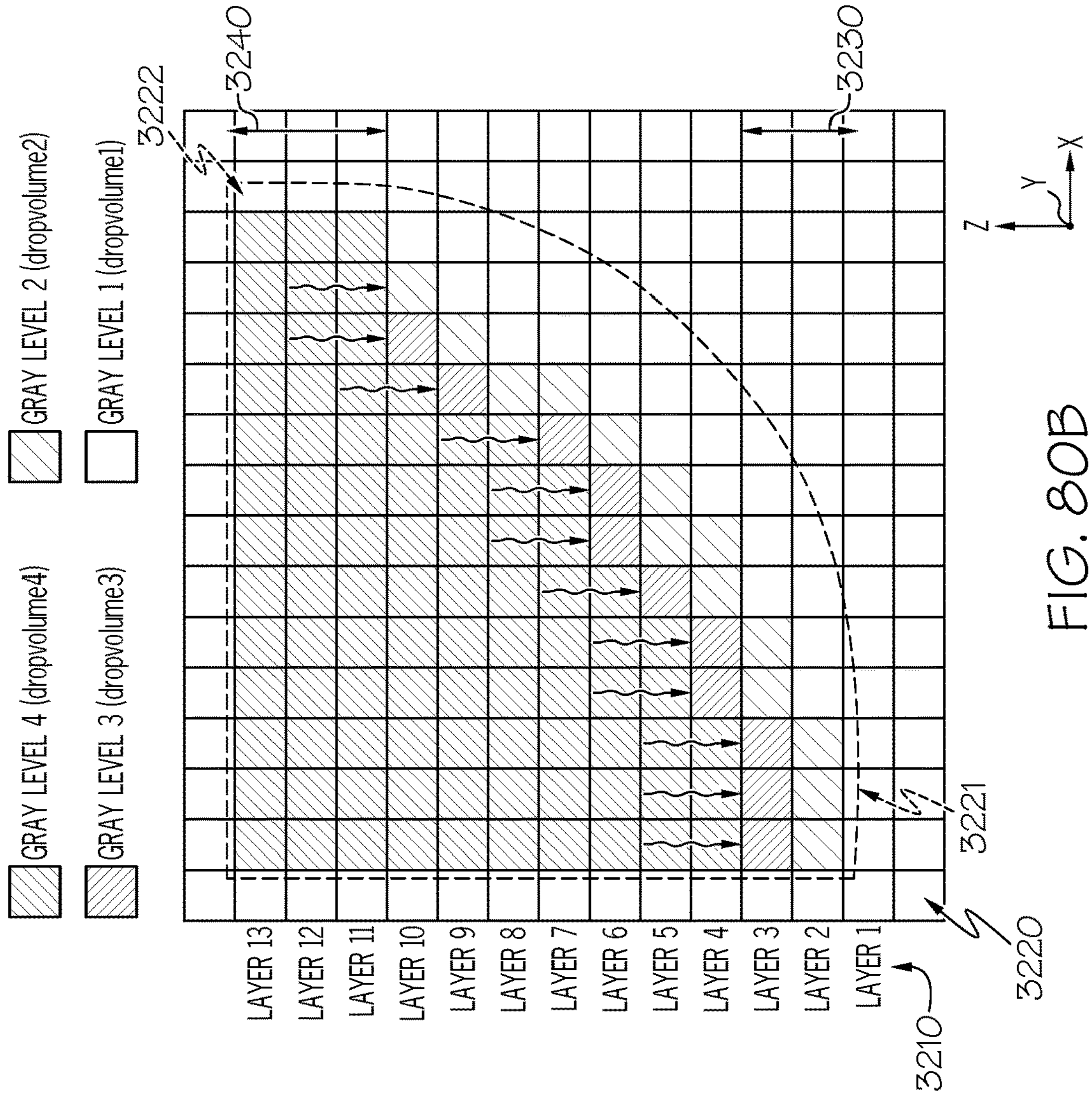
Figure 80A:
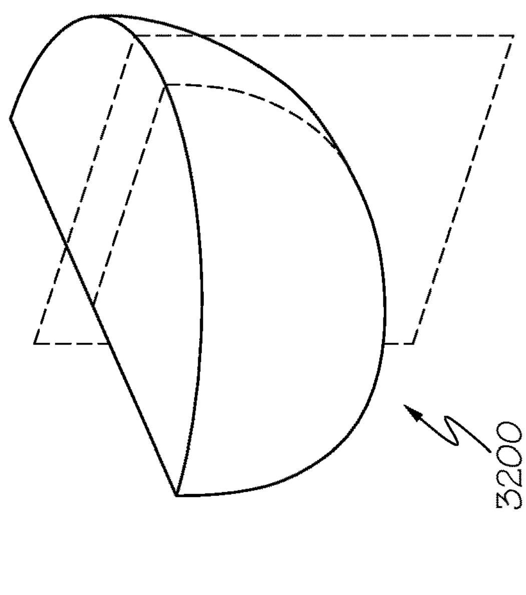
Figure 81:
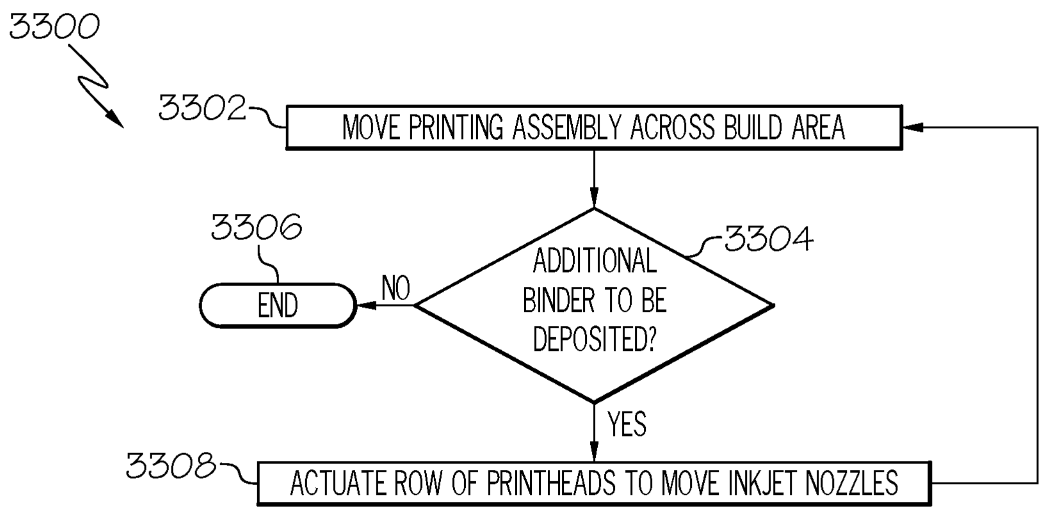
Figure 82:
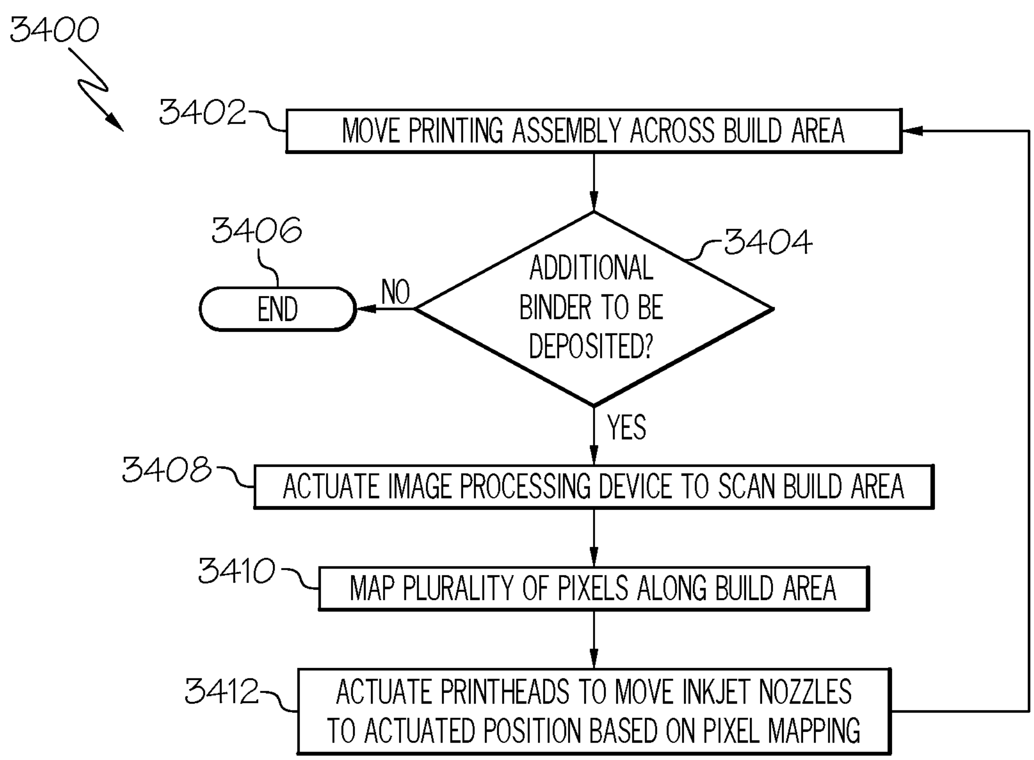
Figure 83:
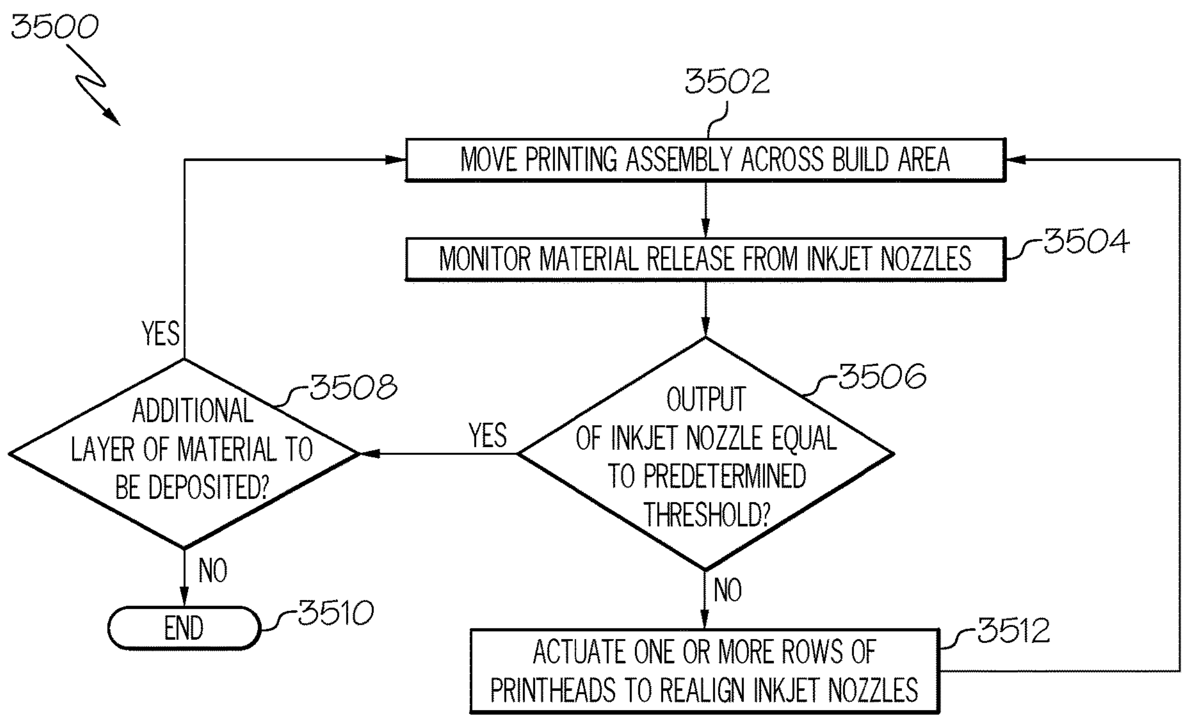
Figure 84:
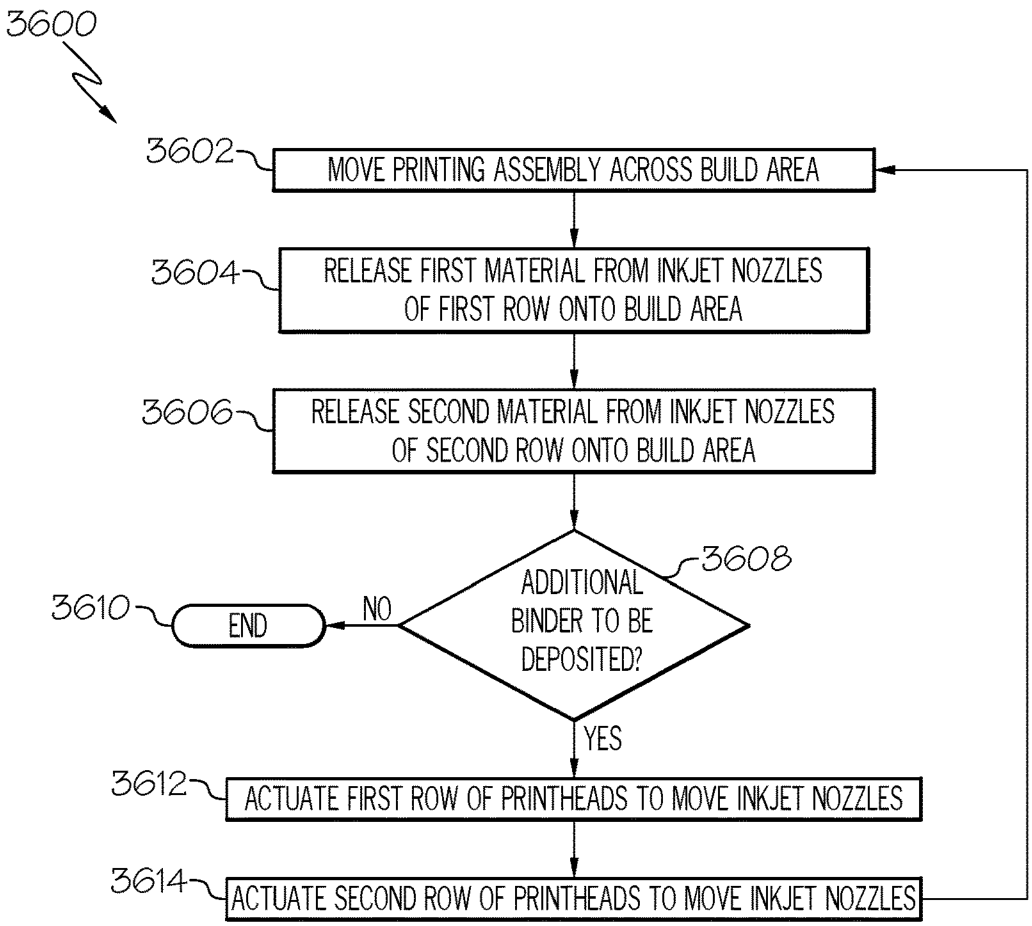
Figure 85:
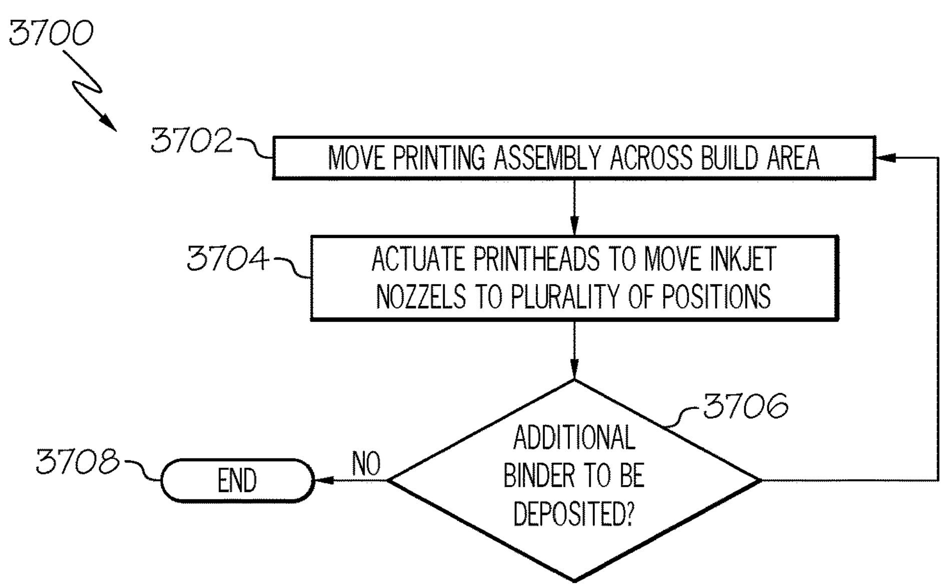
Figure 86:
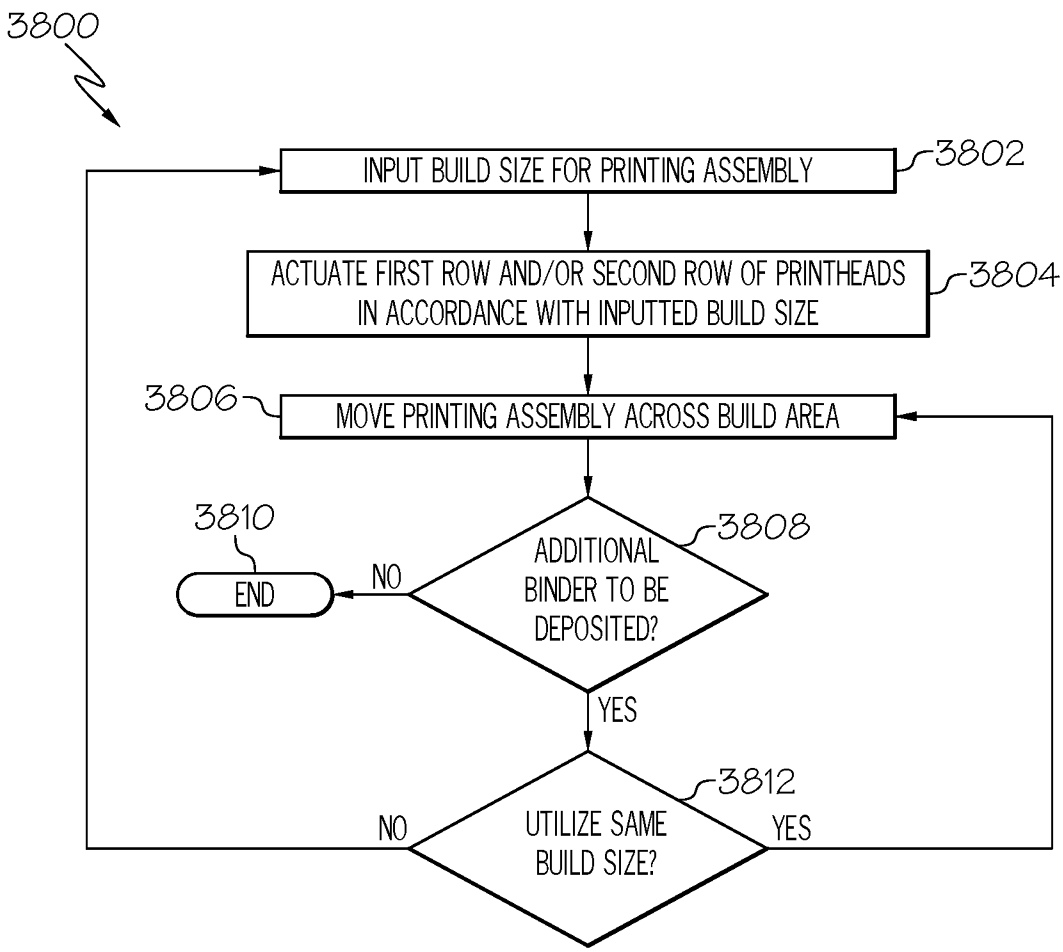
Figure 87:
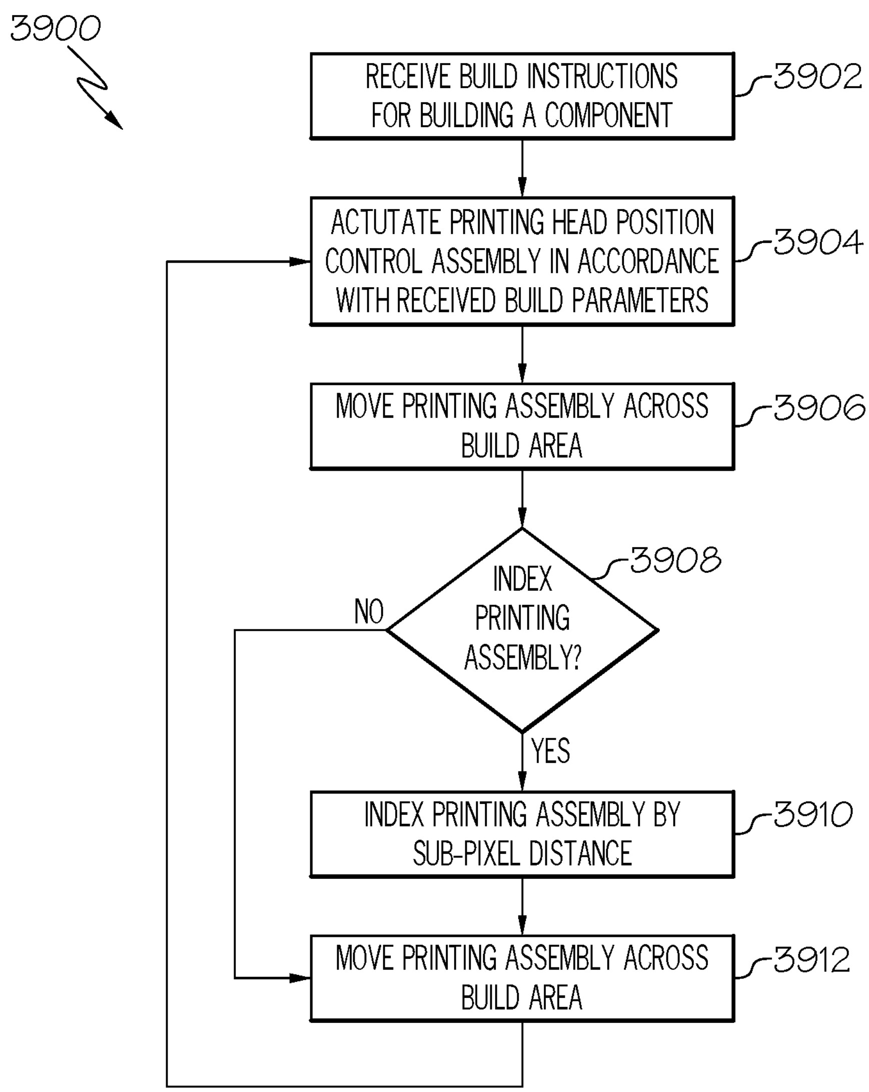
Figure 88:
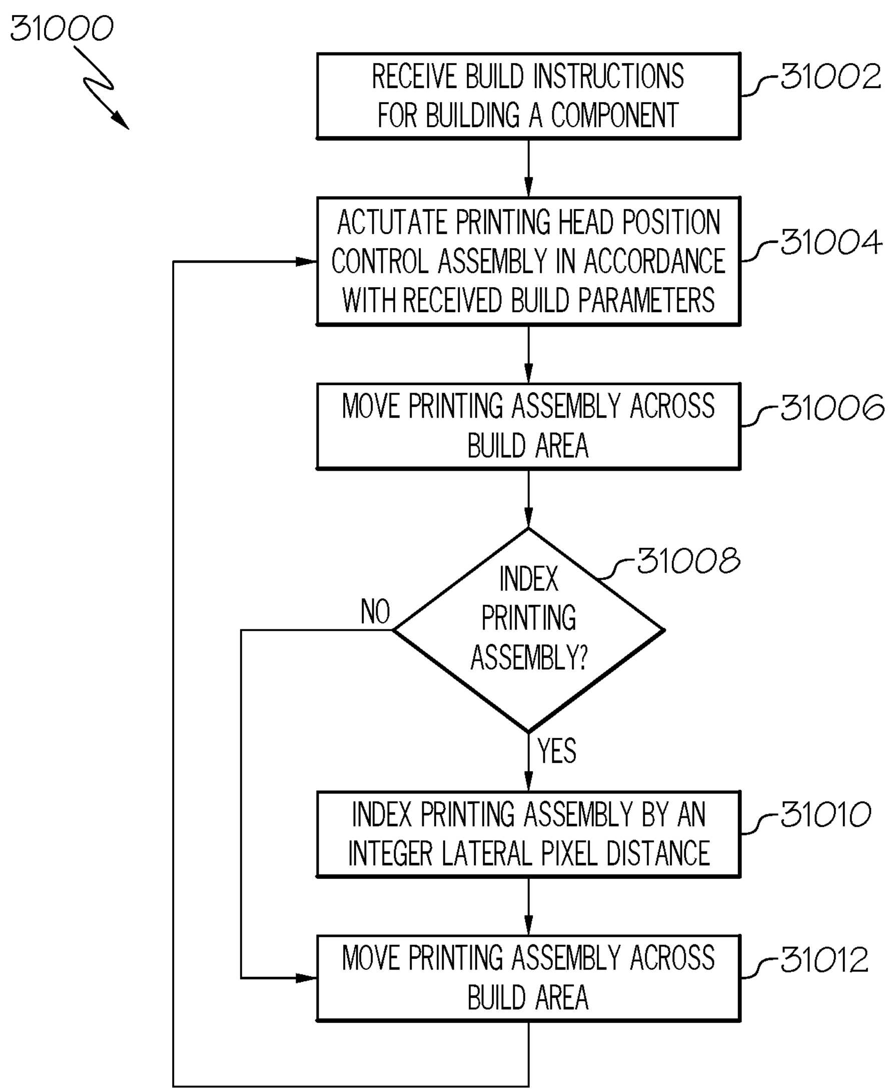
Figure 89:
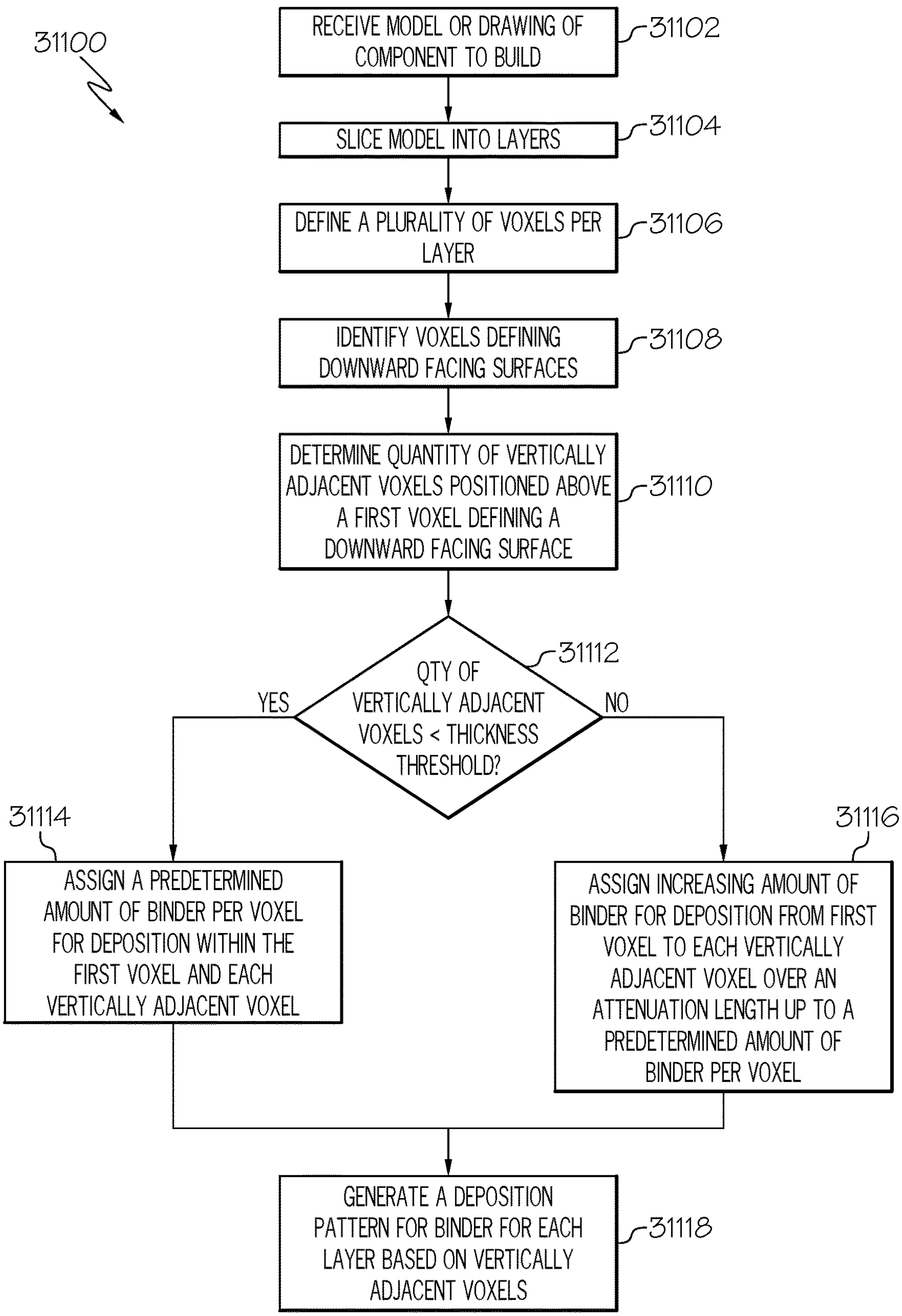
Figure 90A:
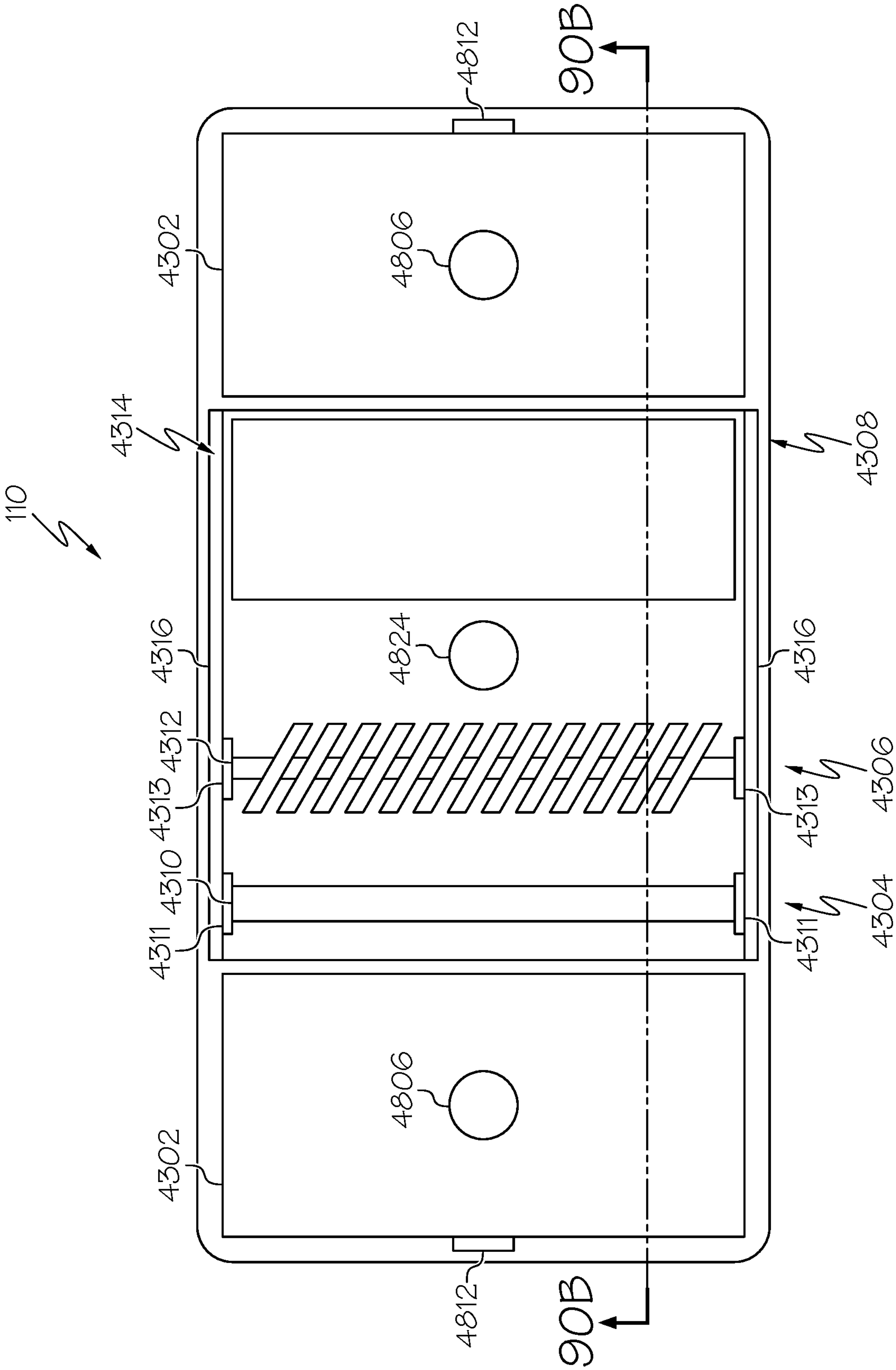
Figure 90B:
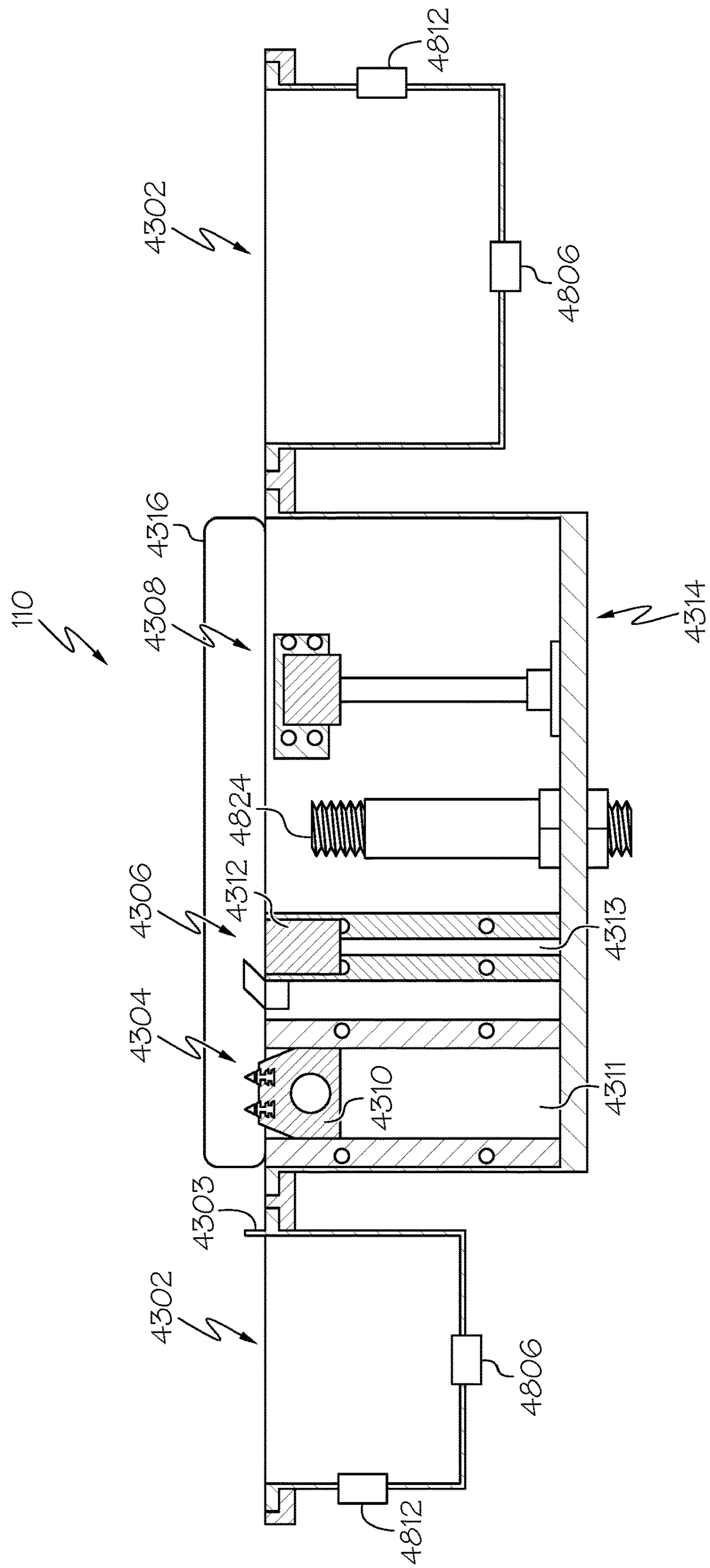
Figure 90C:
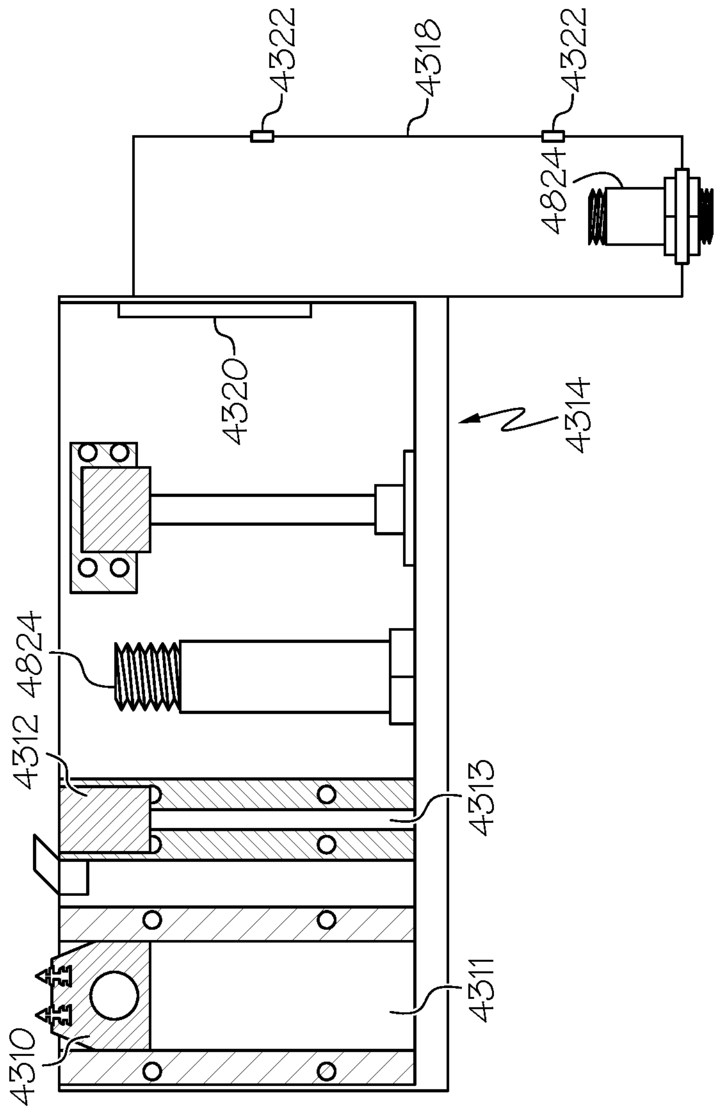
Figure 91A:
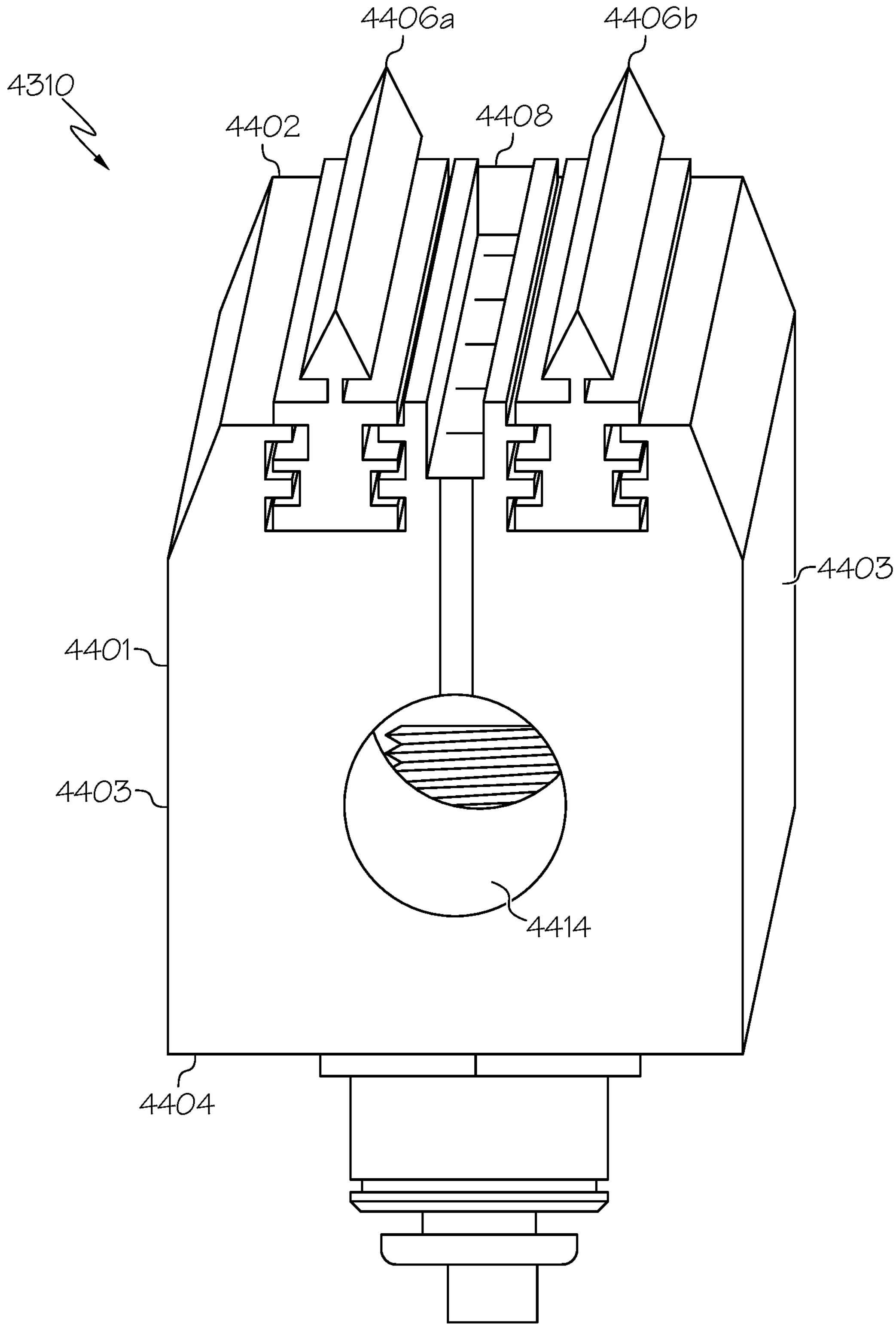
Figure 91B:
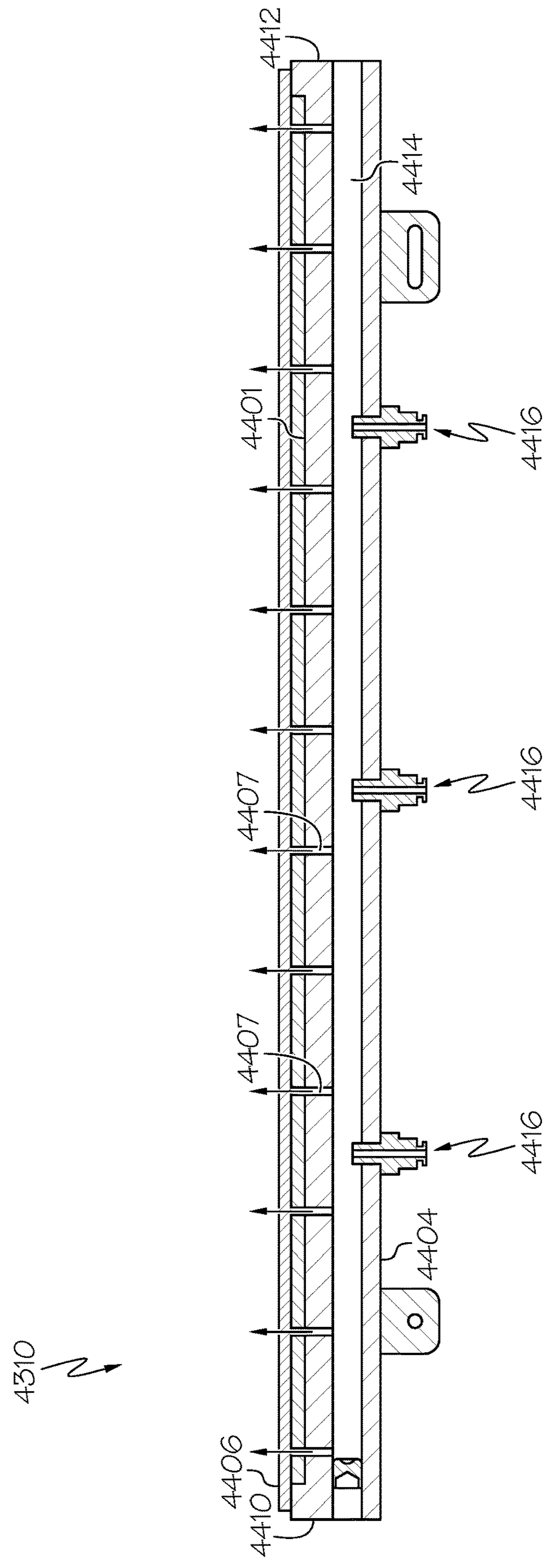
Figure 91C:
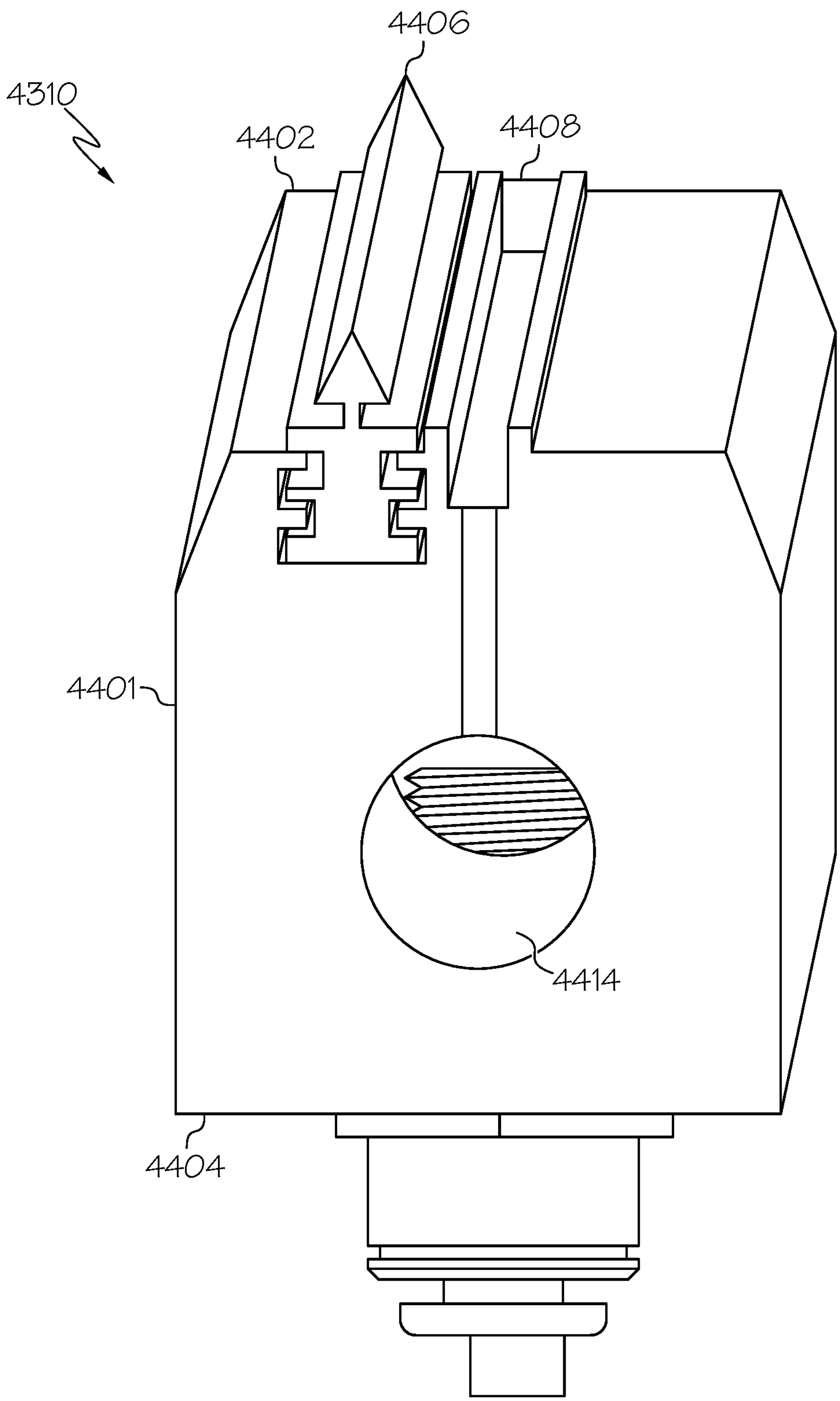
Figure 91D:
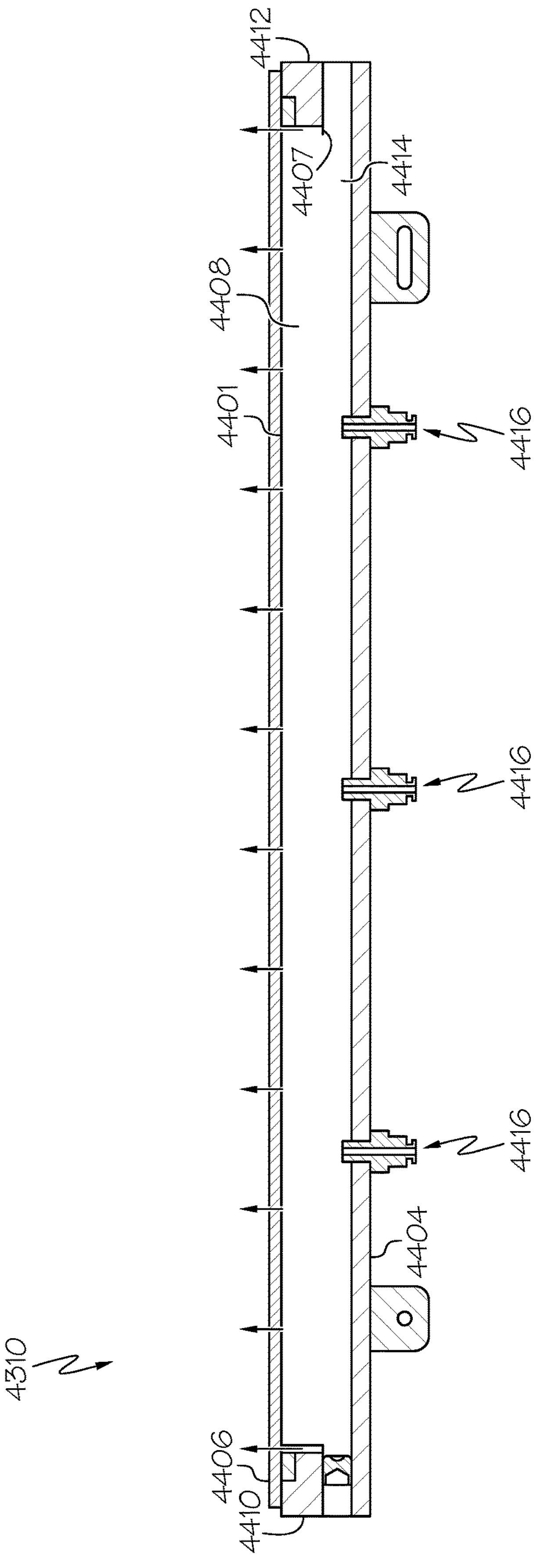
Figure 91F:
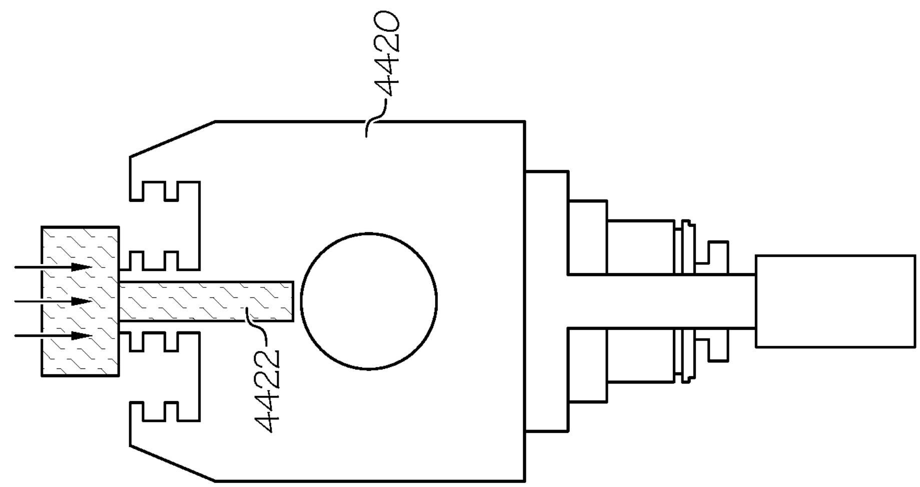
Figure 91E:
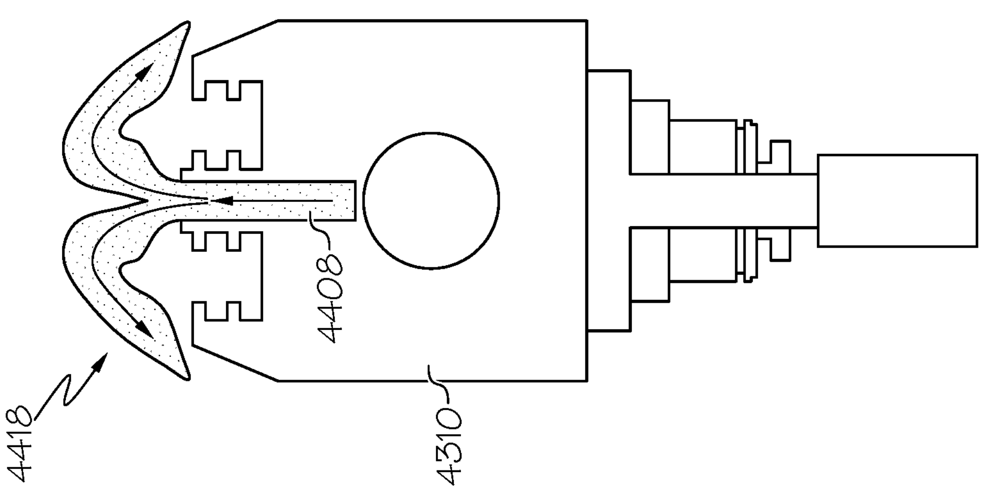
Figure 91G:
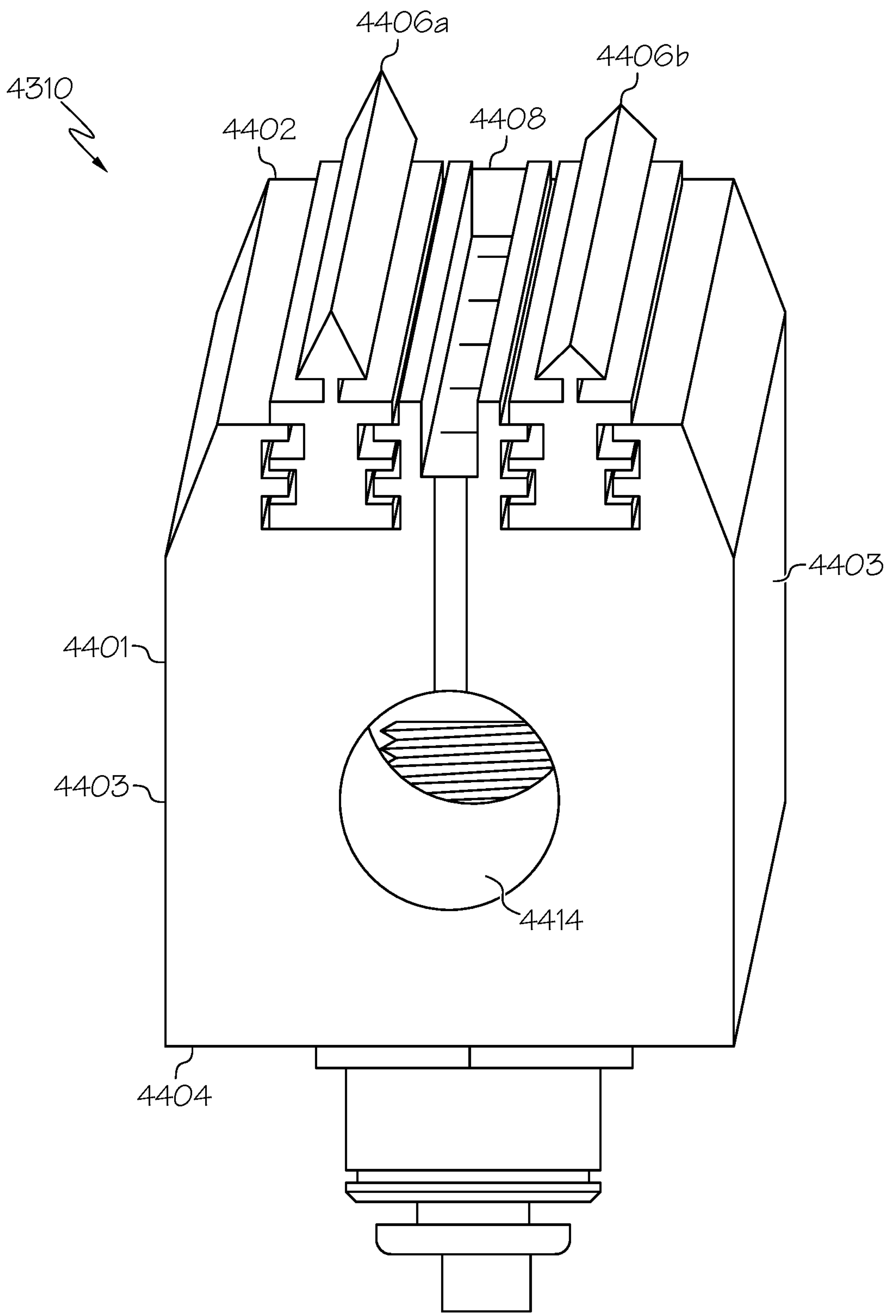
Figure 92A:
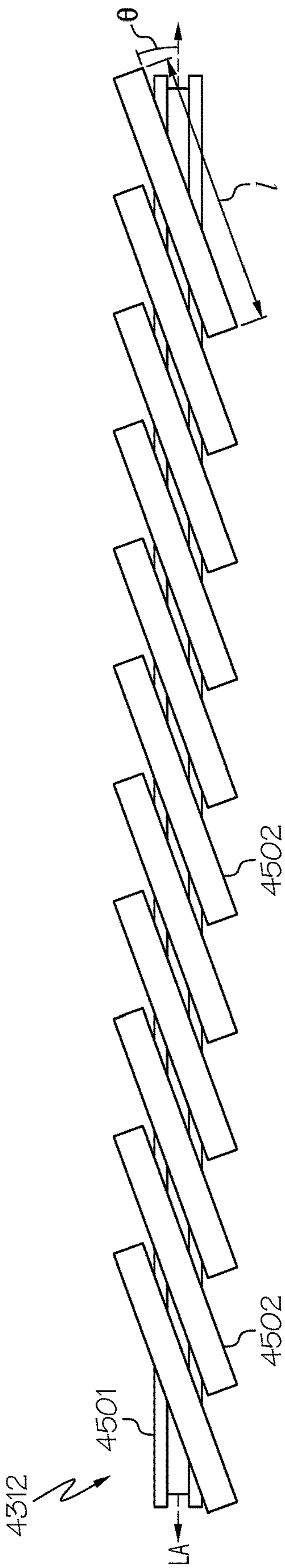
Figure 92B:
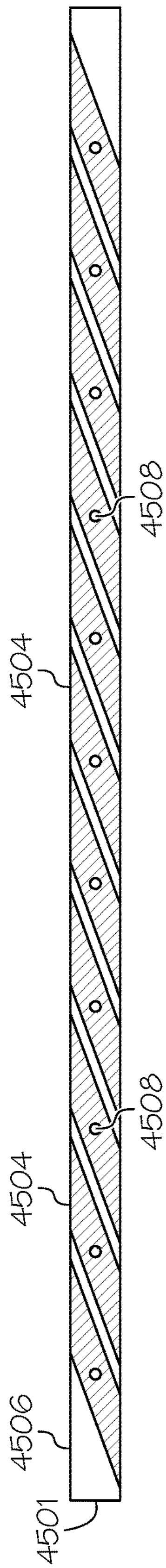
Figure 92C:
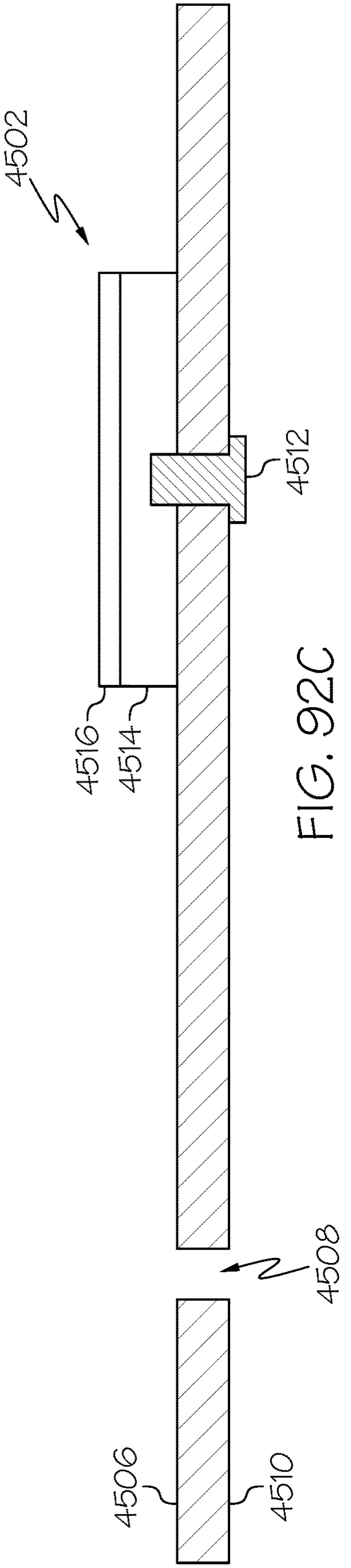
Figure 92D:
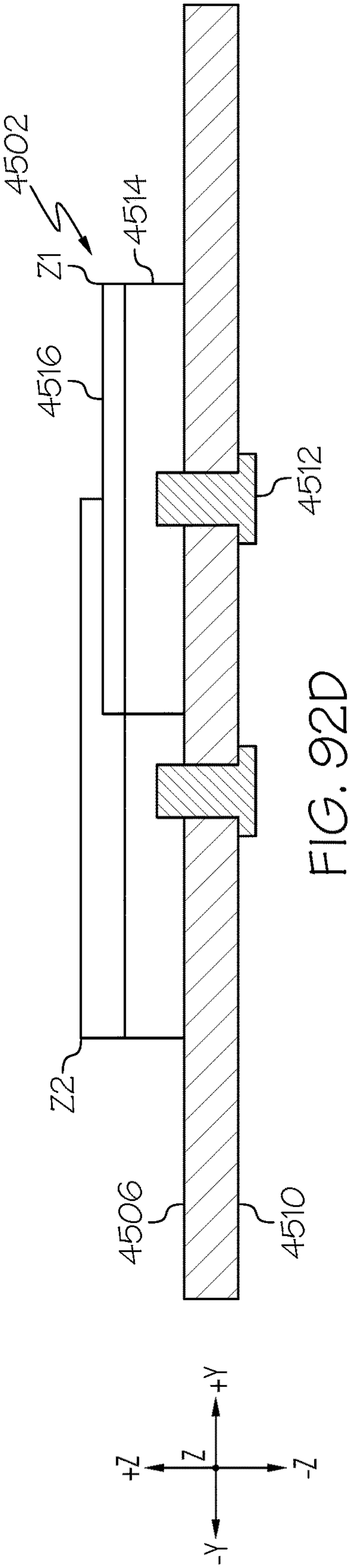
Figure 93A:
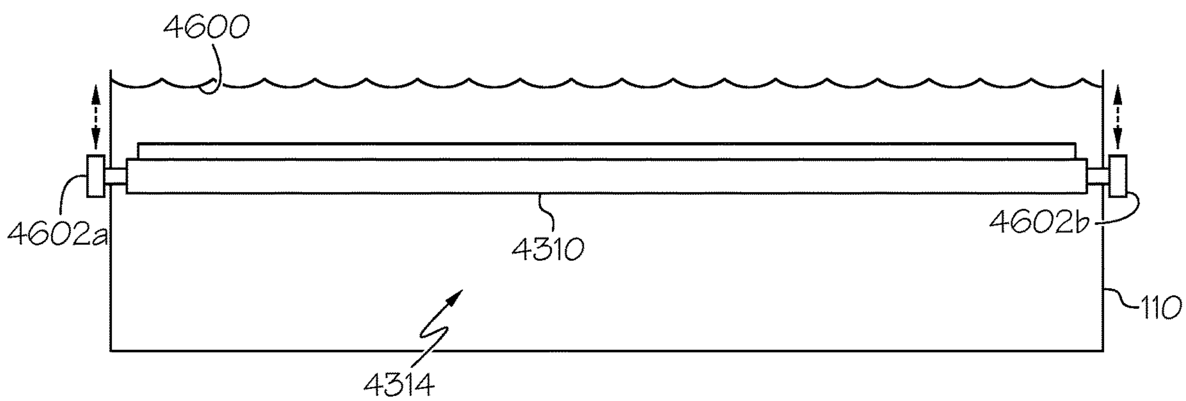
Figure 93B:
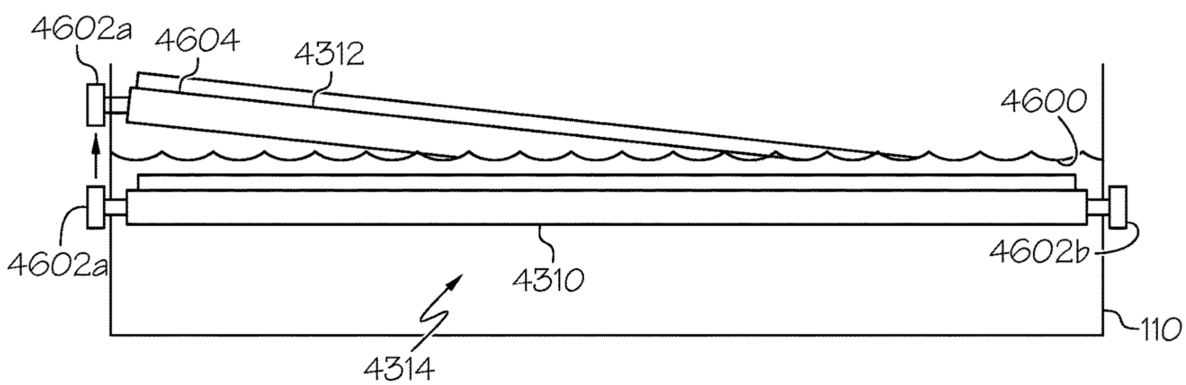
Figure 93C:
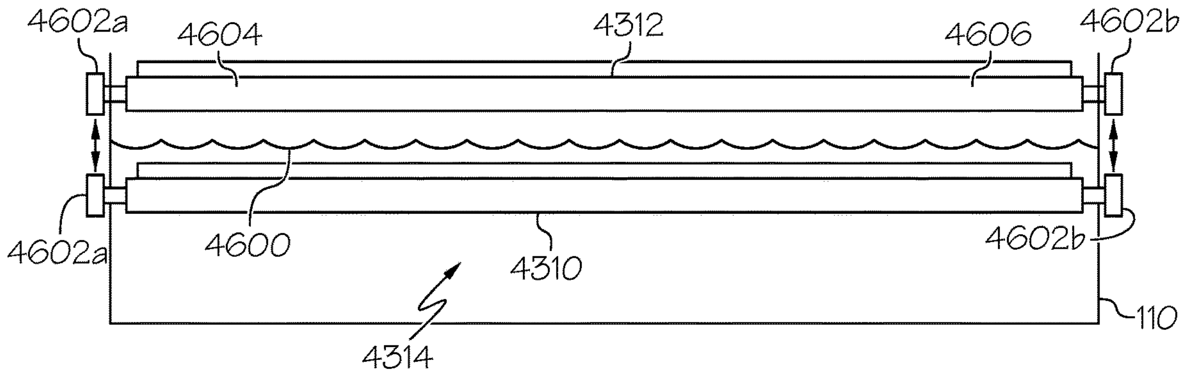
Figure 93D:
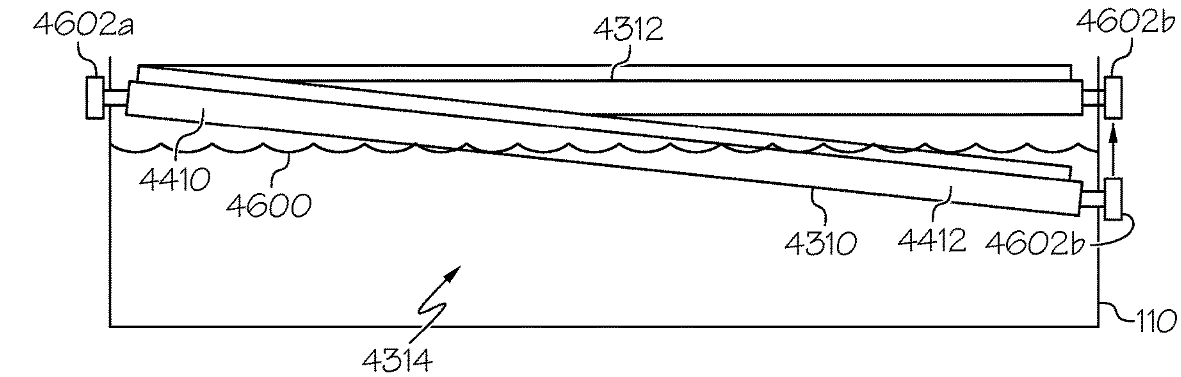
Figure 93E:
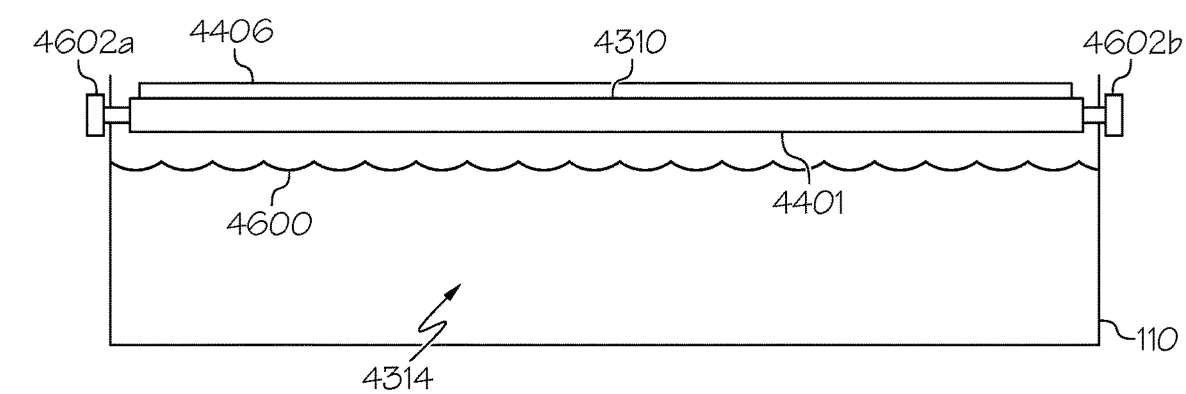
Figure 93F:
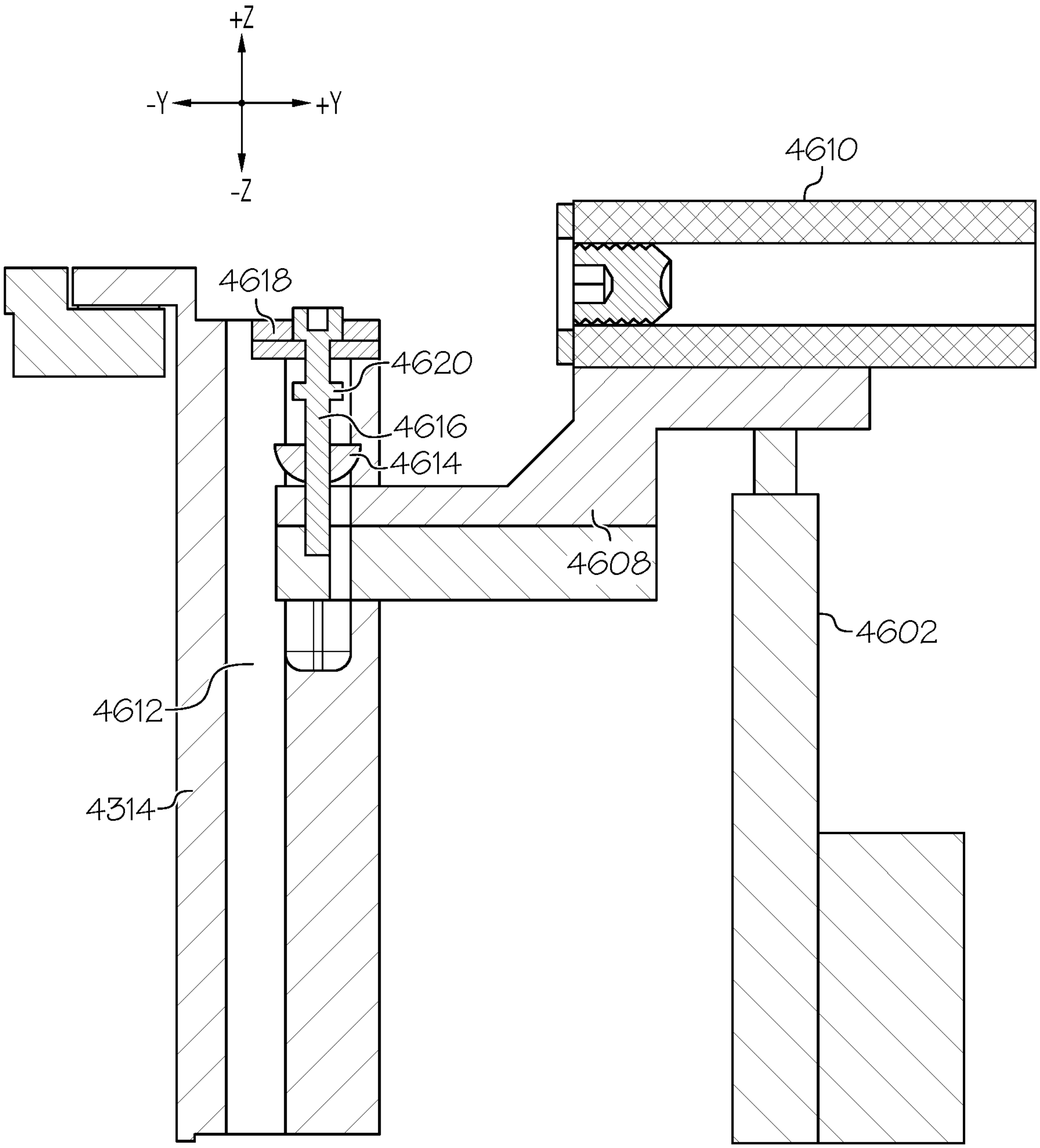
Figure 94A:
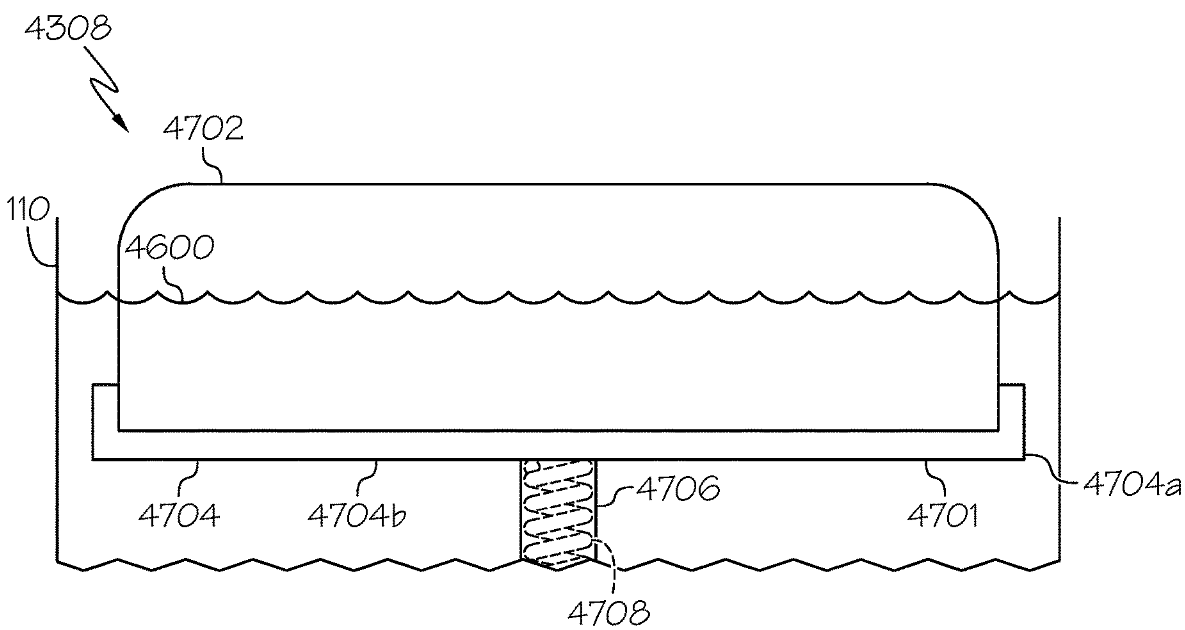
Figure 94B:
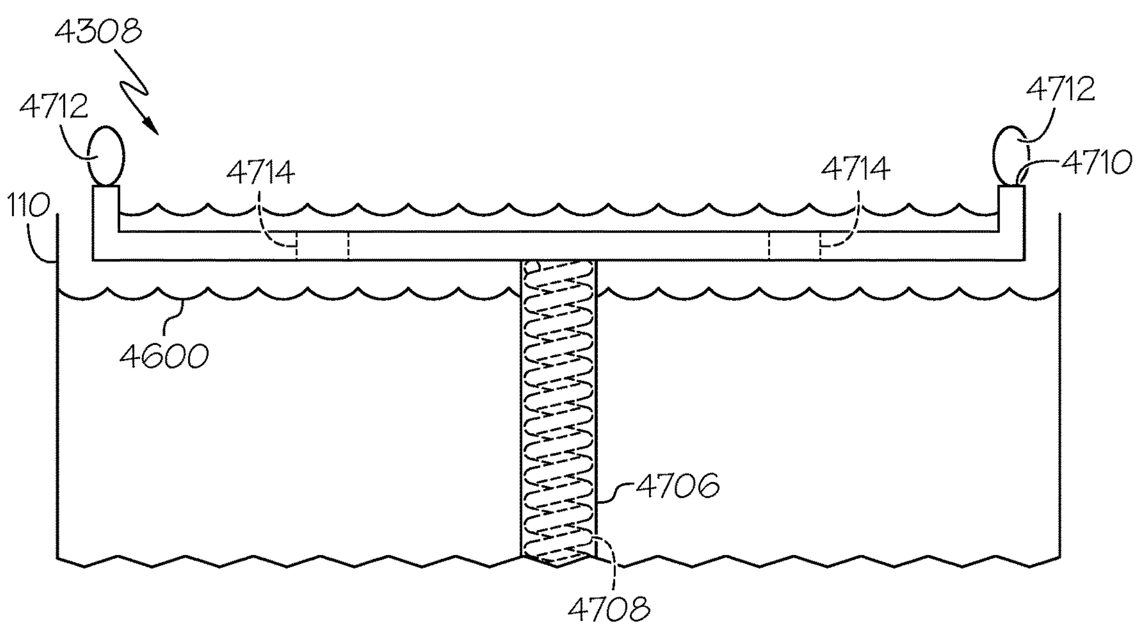
Figure 94C:
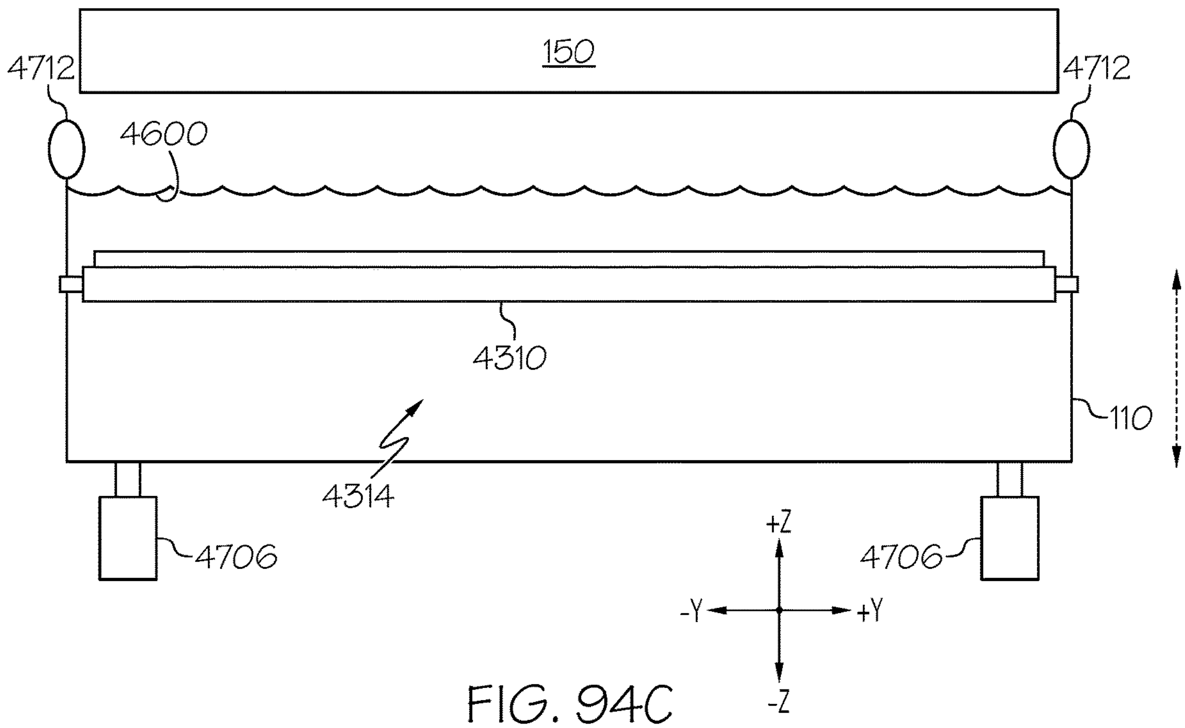
Figure 94D:
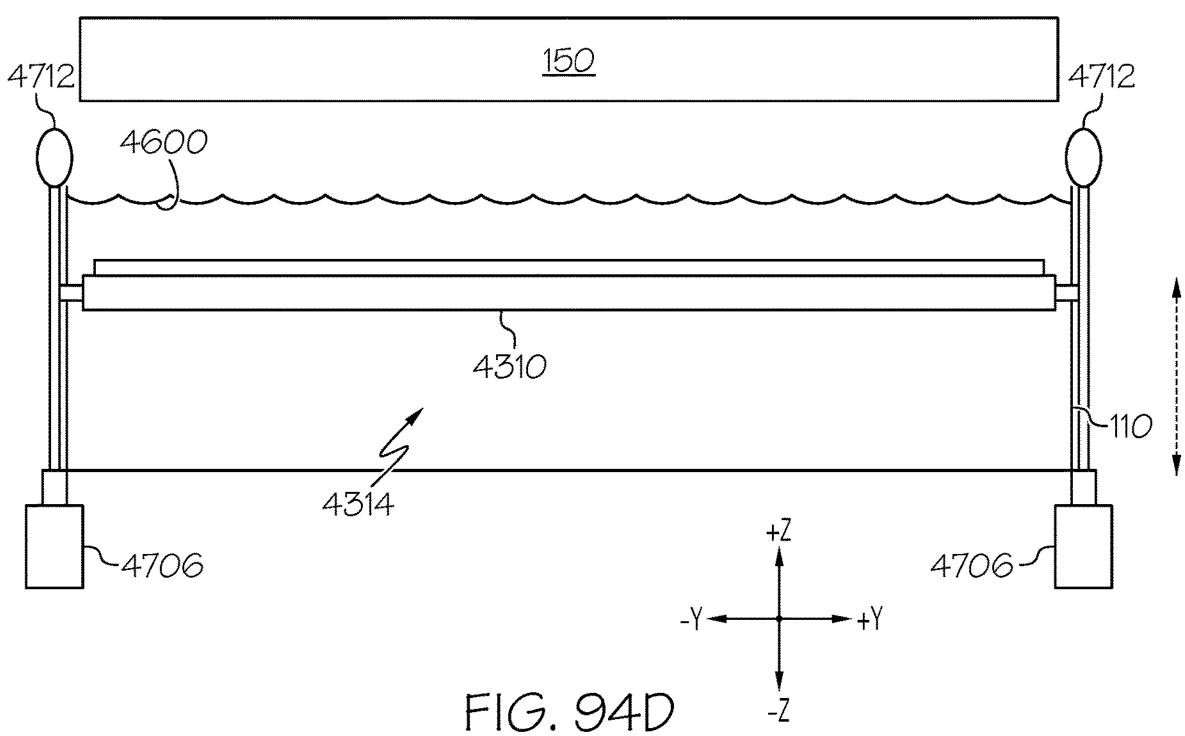
Figure 94E:
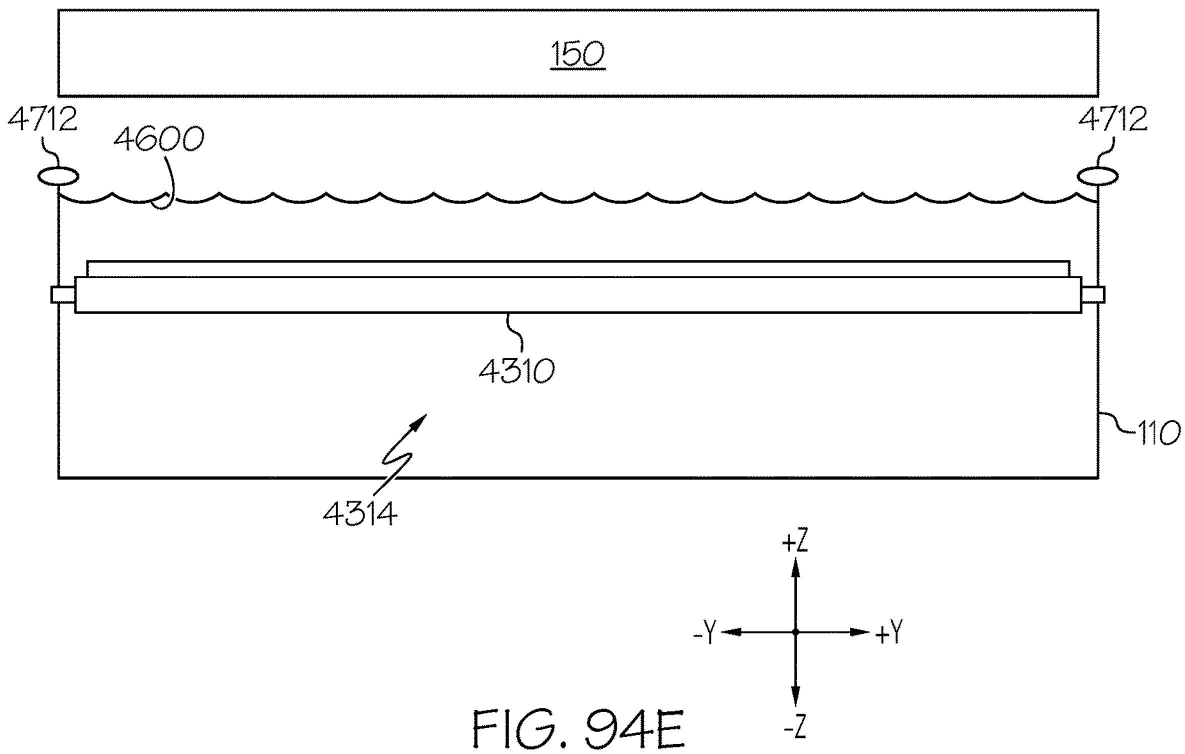
Figure 94F:
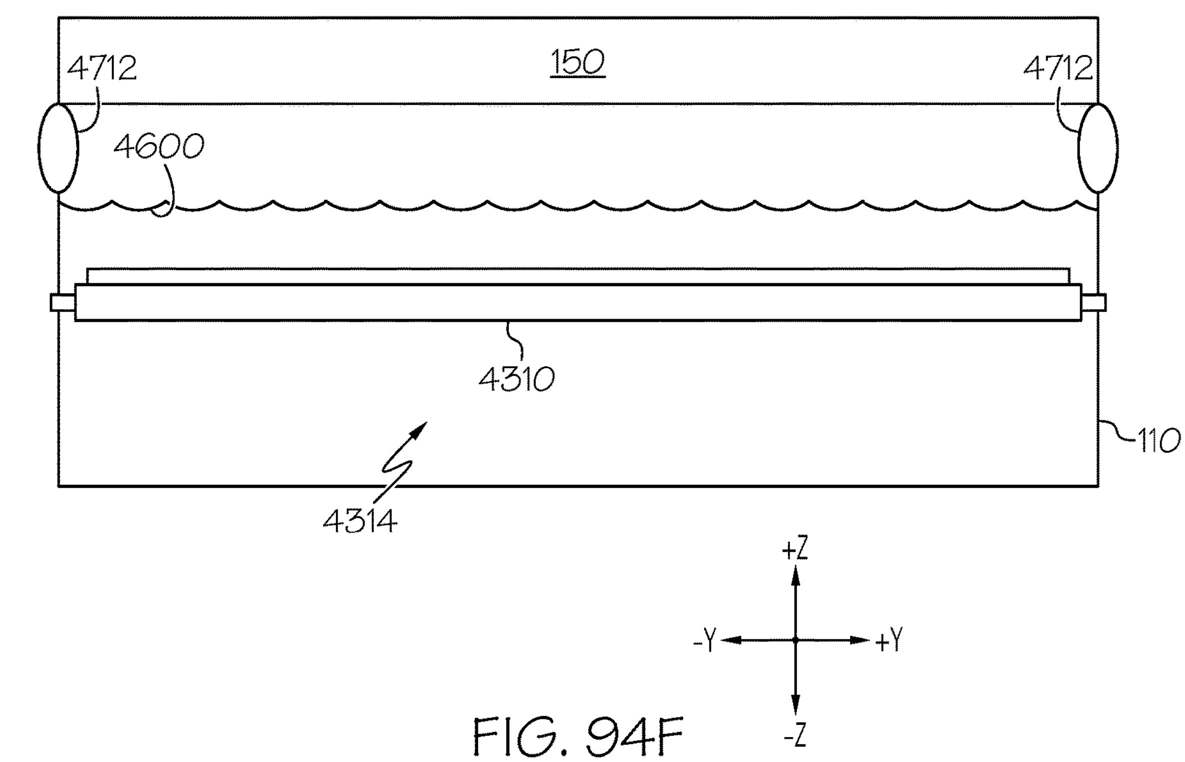
Figure 95:
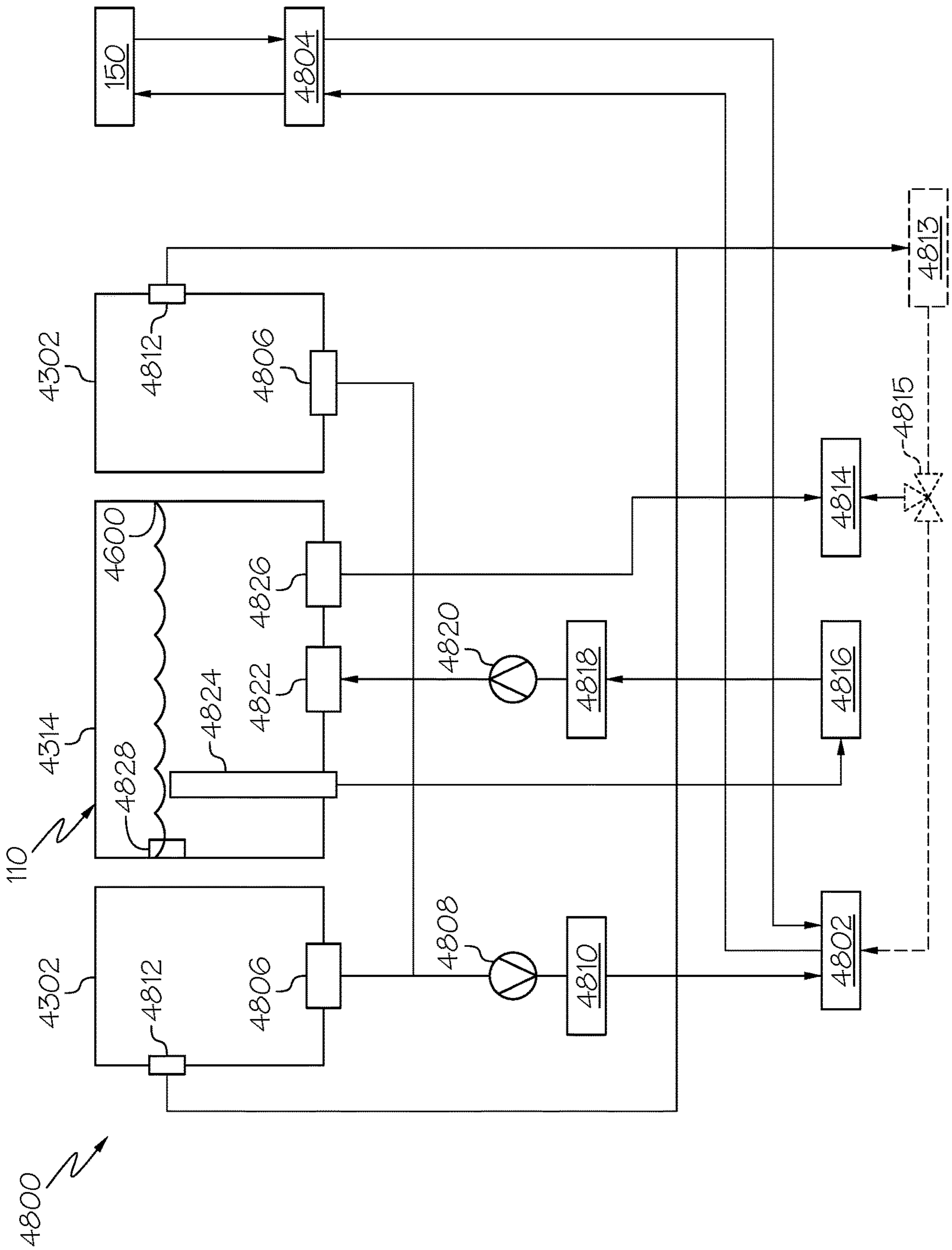
Figure 96:
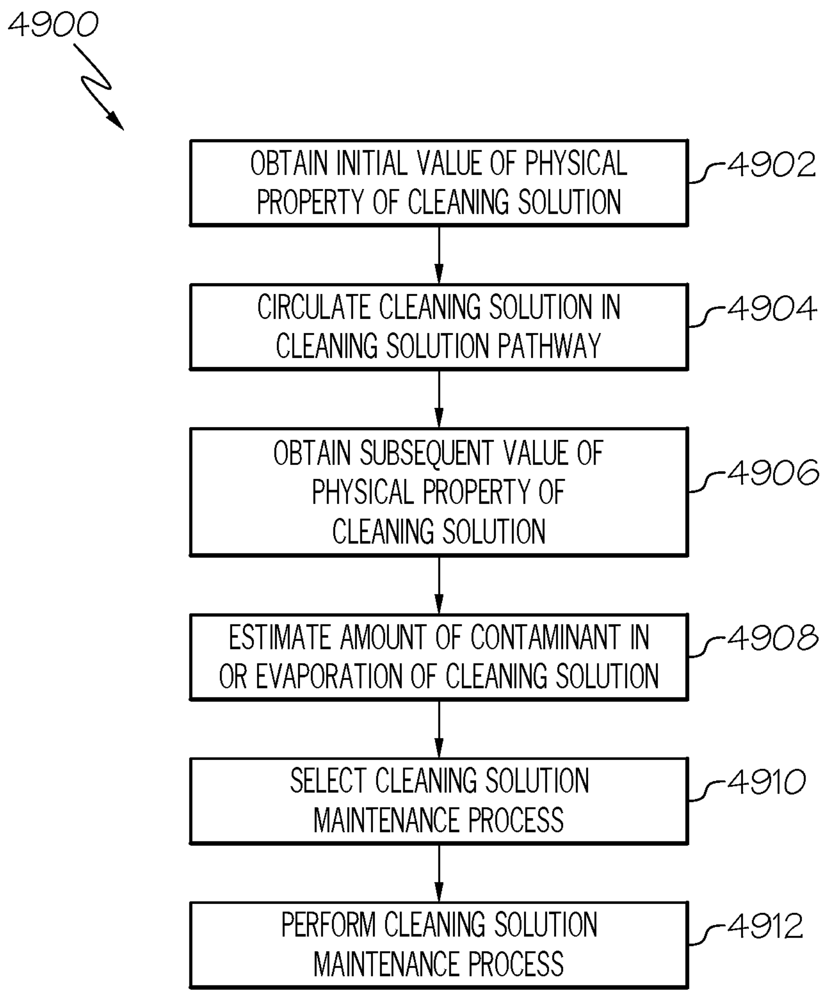
Figure 97:
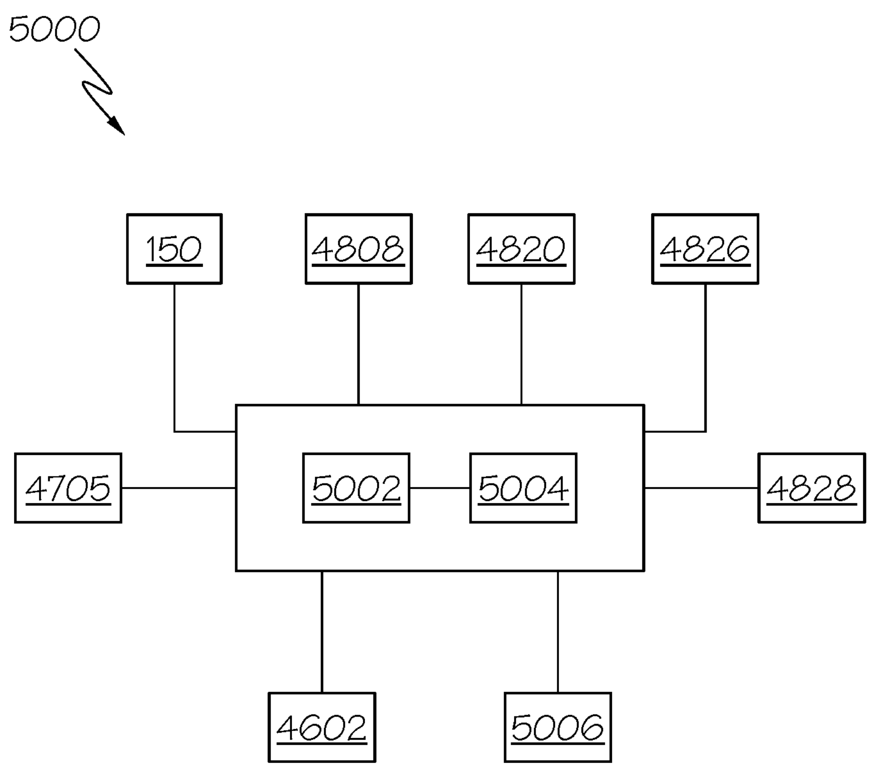
Figure 98:
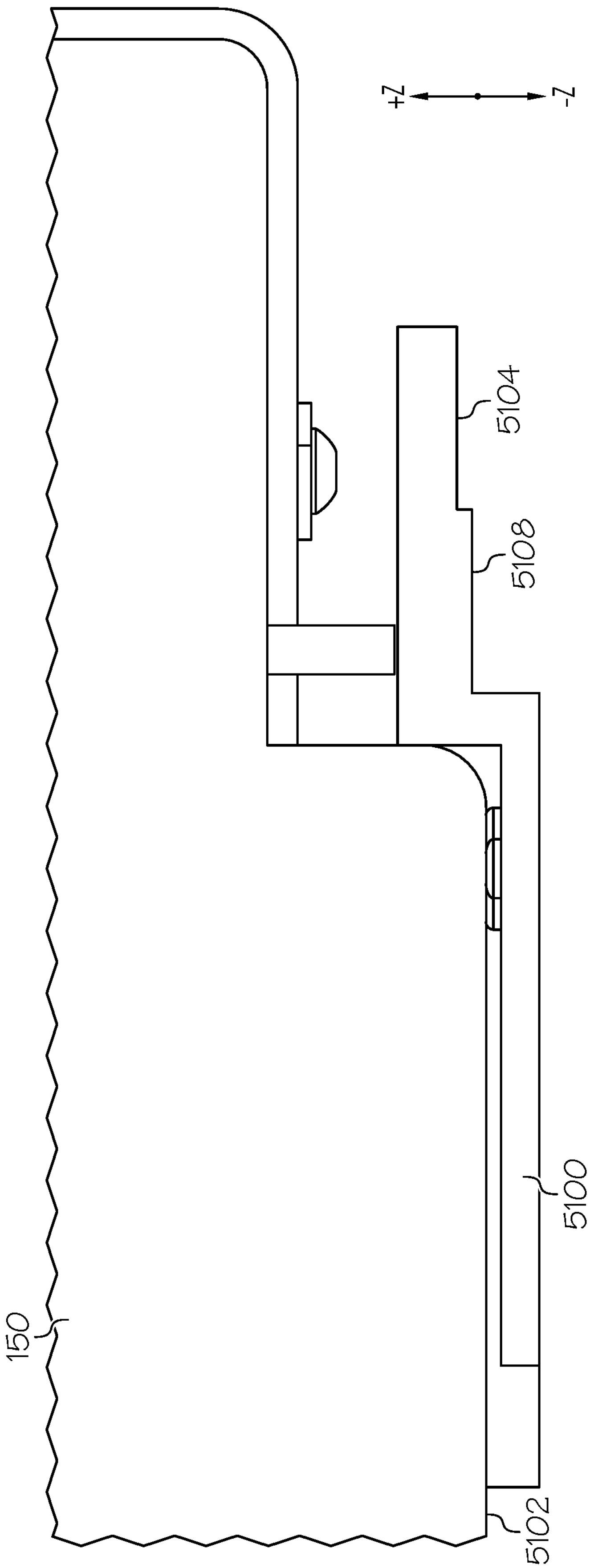

FIG. 74F schematically depicts an embodiment of a printing assembly for a manufacturing apparatus, with a first print head row of print heads coupled to a coarse actuator for moving the first print head row according to one or more embodiments shown and described herein;

FIG. 74G schematically depicts an embodiment of a printing assembly for a manufacturing apparatus, with a first print head row of print heads coupled to a coarse actuator for moving the first print head row according to one or more embodiments shown and described herein;

FIG. 75A schematically depicts an embodiment of a printing assembly for a manufacturing apparatus with a first material deposited from the pair of rows of print heads along a first pass according to one or more embodiments shown and described herein;

FIG. 75B schematically depicts the printing assembly of FIG. 75A with the first material deposited from the pair of rows of print heads along a second pass according to one or more embodiments shown and described herein;

FIG. 76A schematically depicts an embodiment of a printing assembly for a manufacturing apparatus with a first material deposited from a first print head row of print heads and a second material deposited from a second print head row of print heads along a first pass according to one or more embodiments shown and described herein;

FIG. 76B schematically depicts the printing assembly of FIG. 76A with the first material deposited from the first print head row of print heads and the second material deposited from the second print head row of print heads at different locations along a second pass according to one or more embodiments shown and described herein;

FIG. 77A schematically depicts an embodiment of a printing assembly for a manufacturing apparatus with a first material deposited from a first print head row of print heads and a second material deposited from a second print head row of print heads along a first pass according to one or more embodiments shown and described herein;

FIG. 77B schematically depicts the printing assembly of FIG. 77A with a first material deposited from a first print head row of print heads and a second material deposited from a second print head row of print heads along a first pass according to one or more embodiments shown and described herein;

FIG. 78A schematically depicts a printing assembly implementing a second actuator assembly for latitudinal axis indexing of the printing assembly according to one or more embodiments shown and described herein;

FIG. 78B schematically depicts a printing assembly of FIG. 78A indexed by a fraction of the jet-spacing according to one or more embodiments shown and described herein;

FIG. 78C depicts a top down view of a build area where a sub-pixel index of the print head is implemented between a first pass and a second pass to deposit binder with an increased resolution across the layer of powder according to one or more embodiments shown and described herein;

FIG. 78D depicts a top down view of a build area overlaid with an applied deposition pattern of binder according to the design deposition pattern depicted in FIG. 78C according to one or more embodiments shown and described herein;

FIG. 78E depicts another illustrative build area where the same amount of binder per pixel as depicted in FIG. 78C is dispensed using a combination of large and small drops at varying locations within the pixel according to one or more embodiments shown and described herein;

FIG. 78F depicts a top down view of a build area overlaid with an applied deposition pattern of binder according to the design deposition pattern depicted in FIG. 78E according to one or more embodiments shown and described herein;

FIG. 78G depicts an example of a deposition pattern of binder material over the build area using a combination of large and small drops at varying locations within the pixel according to one or more embodiments shown and described herein;

FIG. 79A illustratively depicts a build area and a printing assembly configured in a home position with malfunctioning jets according to one or more embodiments shown and described herein;

FIG. 79B illustratively depicts the build area and the printing assembly of FIG. 79A configured in an indexed position with malfunctioning jets according aligned to different trajectories according to one or more embodiments shown and described herein;

FIG. 80A depicts a model of a part for building having downward-facing surfaces according to one or more embodiments shown and described herein;

FIG. 80B illustratively depicts a cross-section of the model of FIG. 80A for building having predefined allocations of binder to control binder bleed according to one or more embodiments shown and described herein;

FIG. 81 depicts a flow diagram of an illustrative method of depositing material with a printing assembly with movable rows of print heads according to one or more embodiments shown and described herein;

FIG. 82 depicts a flow diagram of an illustrative method of depositing material with a printing assembly with movable rows of print heads according to one or more embodiments shown and described herein;

FIG. 83 depicts a flow diagram of an illustrative method of depositing multiple materials with a printing assembly with movable rows of print heads according to one or more embodiments shown and described herein;

FIG. 84 depicts a flow diagram of an illustrative method of depositing material with the printing assembly of FIG. 58B with movable rows of print heads that deposit multiple materials according to one or more embodiments shown and described herein;

FIG. 85 depicts a flow diagram of an illustrative method of depositing material with the printing assembly of FIG. 58B with movable rows of print heads that translate to a plurality of positions according to one or more embodiments shown and described herein;

FIG. 86 depicts a flow diagram of an illustrative method of depositing material with a printing assembly with movable rows of print heads that deposit multiple materials at varying build sizes according to one or more embodiments shown and described herein;

FIG. 87 depicts a flow diagram of an illustrative method of depositing material with a printing assembly with an indexable printing assembly that provide sub-pixel jet nozzle movement for high-resolution material deposition according to one or more embodiments shown and described herein;

FIG. 88 depicts a flow diagram of an illustrative method of depositing material with a printing assembly with an indexable printing assembly that provides predefined random indexing of one or more of the plurality of jet nozzles according to one or more embodiments shown and described herein;

FIG. 89 depicts a flow diagram of an illustrative method of controlling binder bleed between layers according to one or more embodiments shown and described herein;

FIG. 90A is a schematic top view of a cleaning station of an additive manufacturing apparatus according to one or more embodiments shown and described herein;

FIG. 90B is a side cross-sectional view of a cleaning station of an additive manufacturing apparatus according to one or more embodiments shown and described herein;

FIG. 90C is a side cross-sectional view of a cleaning station vessel of an additive manufacturing apparatus according to one or more embodiments shown and described herein;

FIG. 91A is a schematic perspective view of a wet wipe member including two blades in a wet wipe cleaning section of an additive manufacturing apparatus according to one or more embodiments shown and described herein;

FIG. 91B is a cross-sectional front view of a wet wipe member in a wet wipe cleaning section of an additive manufacturing apparatus according to one or more embodiments shown and described herein;

FIG. 91C is a schematic perspective view of a wet wipe member including a single blade in a wet wipe cleaning section of an additive manufacturing apparatus according to one or more embodiments shown and described herein;

FIG. 91D is a cross-sectional front view of a wet wipe member in a wet wipe cleaning section of an additive manufacturing apparatus according to one or more embodiments shown and described herein;

FIG. 91E is a cross-sectional side view of a blade-less wet wipe member in a wet wipe cleaning section of an additive manufacturing apparatus according to one or more embodiments shown and described herein;

FIG. 91F is a cross-sectional side view of a vacuum wipe member in a wet wipe cleaning section of an additive manufacturing apparatus according to one or more embodiments shown and described herein;

FIG. 91G is a cross-sectional side view of a wet wipe member including two blades having different vertical positions in a wet wipe cleaning section of an additive manufacturing apparatus according to one or more embodiments shown and described herein;

FIG. 92A is a top view of an angled dry wipe member in a dry wipe cleaning section of an additive manufacturing apparatus according to one or more embodiments shown and described herein;

FIG. 92B is a partial top view of FIG. 92A without the angled wipers included for illustration according to one or more embodiments shown and described herein;

FIG. 92C is a cross-sectional front view of the wiper mounting member of the dry wipe member according to one or more embodiments shown and described herein;

FIG. 92D is a cross-sectional front view of the wiper mounting member including blades at different vertical positions of the dry wipe member according to one or more embodiments shown and described herein;

FIG. 93A is a cross-sectional front view of a dry wipe member submerged in cleaning fluid in the dry wipe section of the cleaning station vessel according to one or more embodiments shown and described herein;

FIG. 93B is a cross-sectional front view depicting one end of the dry wipe member of FIG. 93A raised above the fluid level of the cleaning fluid according to one or more embodiments shown and described herein;

FIG. 93C is a cross-sectional front view depicting both ends of the dry wipe member of FIG. 93A raised above the fluid level of the cleaning fluid according to one or more embodiments shown and described herein;

FIG. 93D is a cross-sectional front view depicting one end of the wet wipe member of FIG. 93A raised above the fluid level of the cleaning fluid according to one or more embodiments shown and described herein;

FIG. 93E is a cross-sectional front view depicting both ends of the wet wipe member of FIG. 93A raised above the fluid level of the cleaning fluid according to one or more embodiments shown and described herein;

FIG. 93F is a cross-sectional front view depicting an adjustable hard stop for use in coupling of one of the members of the cleaning station within the cleaning station vessel according to one or more embodiments shown and described herein;

FIG. 94A is a cross-sectional side view of a capping section of the cleaning station including a sponge according to one or more embodiments shown and described herein;

FIG. 94B is a cross-sectional side view of a capping section of the cleaning station including a cap according to one or more embodiments shown and described herein;

FIG. 94C is a cross-sectional front view of a cleaning station in which the cleaning station vessel is actuated vertically to cover the print head according to one or more embodiments shown and described herein;

FIG. 94D is a cross-sectional front view of a cleaning station in which seals around the cleaning station vessel are actuated vertically to cover the print head according to one or more embodiments shown and described herein;

FIG. 94E is a cross-sectional front view of a cleaning station in which the cleaning station vessel includes deflated seals according to one or more embodiments shown and described herein;

FIG. 94F is a cross-sectional front view of a cleaning station in which the deflated seals of FIG. 94E are inflated to form a seal with the print head according to one or more embodiments shown and described herein;

FIG. 95 is a process flow diagram of the fluid management system (binder pathway and the cleaning fluid pathway) according to one or more embodiments shown and described herein;

FIG. 96 is a flow chart depicting an embodiment of cleaning fluid maintenance according to one or more embodiments shown and described herein;

FIG. 97 schematically depicts a control system for controlling the components of the binder pathway and the cleaning fluid pathway according to one or more embodiments shown and described herein; and FIG. 98 is a cross-sectional side view of a print head having a gauge thereon for use in setting a maximum vertical height of one or more components of the cleaning station according to one or more embodiments shown and described herein.

DETAILED DESCRIPTION

Figure 2:
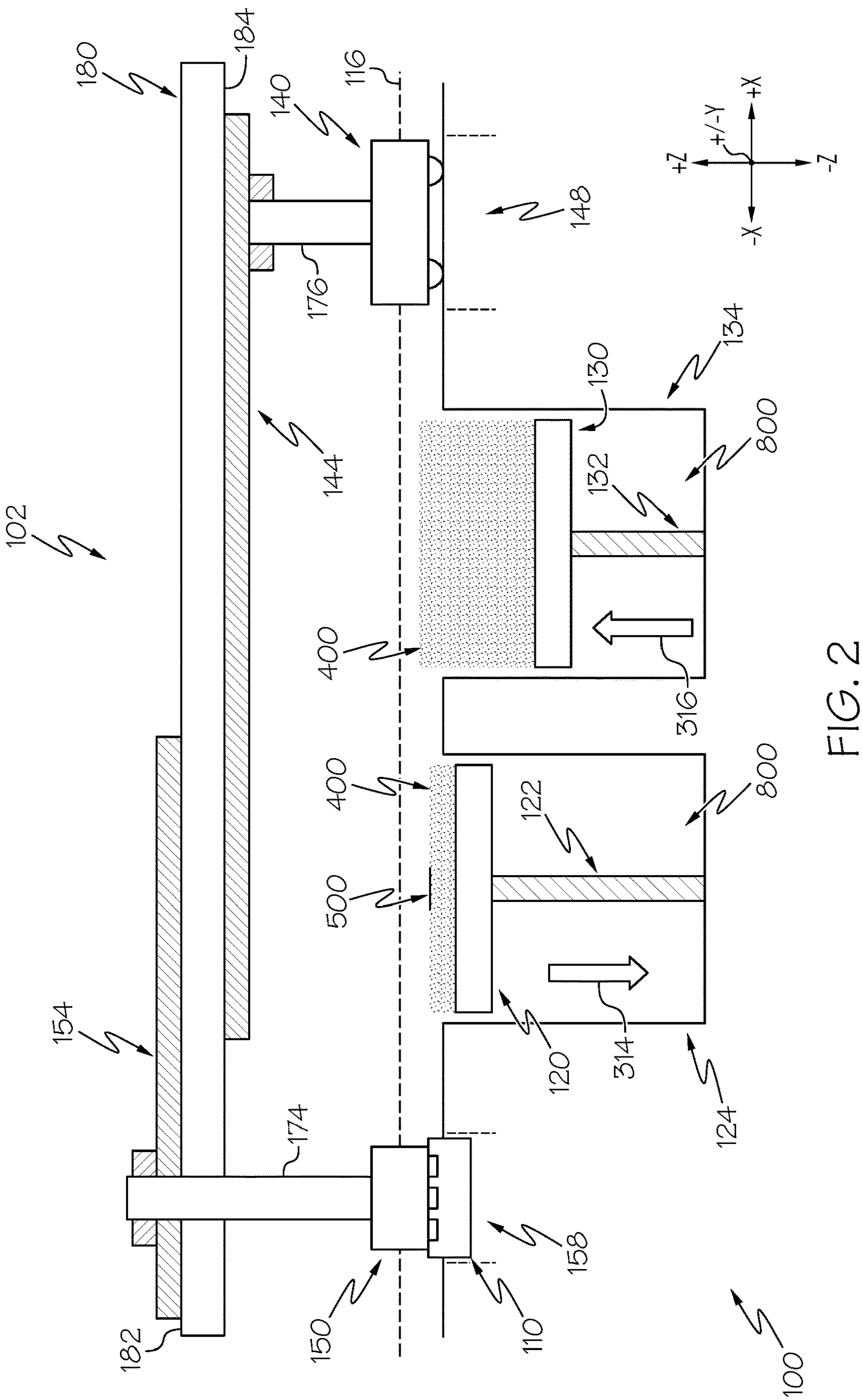
FIG. 2 schematically depicts components of an additive manufacturing apparatus according to one or more embodiments shown and described herein.

Reference will now be made in detail to embodiments of additive manufacturing apparatuses, components thereof, and methods for using such apparatuses and components, examples of which are illustrated in the accompanying drawings. Whenever possible, the same reference numerals will be used throughout the drawings to refer to the same or like parts. One embodiment of an additive manufacturing apparatus 100 comprising an actuator assembly 102 for distributing build material and depositing binder material is schematically depicted in FIG. 2. Various embodiments additive manufacturing apparatuses, components thereof, and methods for using such apparatuses and components are described in further detail herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom, upper, lower, —are made only with reference to the figures as drawn and are not intended to imply absolute orientation unless otherwise expressly stated.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Figure 1:
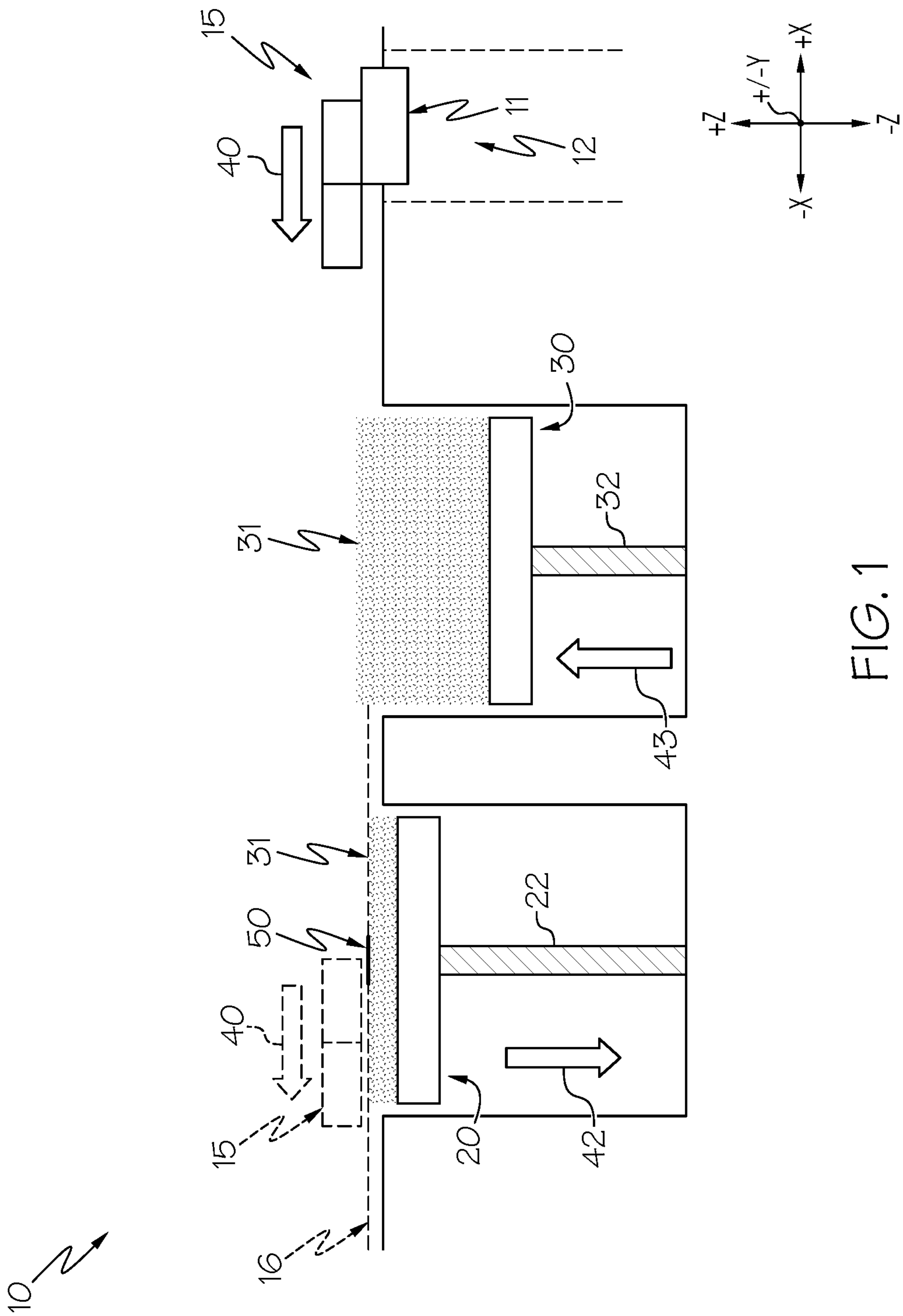
FIG. 1 schematically depicts a conventional additive manufacturing apparatus.

Referring now to FIG. 1, a conventional additive manufacturing apparatus 10 is schematically depicted. The conventional additive manufacturing apparatus 10 includes a supply platform 30, a build platform 20, a cleaning station 11, and a build head 15. The supply platform 30 is coupled to a supply platform actuator 32. The supply platform actuator 32 is actuatable in the vertical direction (i.e., the +/−Z direction of the coordinate axes depicted in the figure) such that the supply platform 30 may be raised or lowered. The build platform 20 is located adjacent to the supply platform 30 and, like the supply platform 30, is coupled to an actuator, specifically a build platform actuator 22. The build platform actuator 22 is actuatable in the vertical direction such that the build platform 20 may be raised or lowered. The cleaning station 11 is located adjacent to the supply platform 30 opposite the build platform 20. That is, the supply platform 30 is located between the cleaning station 11 and the build platform 20 along the working axis of the conventional additive manufacturing apparatus 10 (i.e., an axis extending parallel to the +/−X axis of the coordinate axes depicted in the figure). The build head 15 may be traversed along the working axis of the conventional additive manufacturing apparatus 10 with an actuator (not depicted) such that the build head 15 passes from a home position 12 co-located with the cleaning station 11 over the supply platform 30, over the build platform 20, and back again, ultimately returning to the home position 12. To facilitate this motion, the build head 15 of the conventional additive manufacturing apparatus 10 is mounted on a gantry (not depicted) that rides on a pair of rails (not depicted) horizontally spaced (i.e., spaced apart in the +/−Y direction in the coordinate axes shown in FIG. 1) in a horizontal plane (i.e., a plane parallel to the XY plane of the coordinate axes depicted in FIG. 1) and laterally adjacent to the build platform 20 and the supply platform 30 in the +/−Y directions of the coordinate axes depicted in FIG. 1. The rails may be positioned at or near the build plane 16 as indicated by dashed line.

In operation, build material 31, such as organic or inorganic powder, is positioned on the supply platform 30. The supply platform 30 is actuated to present a layer of the build material 31 in the path of the build head 15. The build head 15 is then actuated along the working axis of the conventional additive manufacturing apparatus 10 from the home position 12 towards the build platform 20 in the direction indicated by arrows 40. As the build head 15 traverses the working axis over the supply platform 30 towards the build platform 20, the build head 15 distributes the layer of build material 31 in the path of the build head 15 from the supply platform 30 to the build platform 20. Thereafter, as the build head 15 continues along the working axis over the build platform 20, the build head 15 deposits a layer of binder material 50 in a predetermined pattern on the layer of build material 31 that has been distributed on the build platform 20. Optionally, after the binder material 50 is deposited, an energy source within the build head 15 is utilized to cure the deposited binder material 50. The build head 15 then returns to the home position 12 where at least a portion of the build head 15 is positioned over the cleaning station 11. While the build head 15 is in the home position 12, the build head 15 works in conjunction with the cleaning station 11 to provide cleaning and maintenance operations on the elements of the build head 15 which deposit the binder material 50 to ensure the elements are not fouled or otherwise clogged. This ensures that the build head is capable of depositing the binder material 50 in the desired pattern during a subsequent deposition pass. During this maintenance interval, the supply platform 30 is actuated in an upward vertical direction (i.e., in the +Z direction of the coordinate axes depicted in the figure) as indicated by arrow 43 to present a new layer of build material 31 in the path of the build head 15. The build platform 20 is actuated in the downward vertical direction (i.e., in the −Z direction of the coordinate axes depicted in the figure) as indicated by arrow 42 to prepare the build platform 20 to receive a new layer of build material 31 from the supply platform 30. The build head 15 is then actuated along the working axis of the conventional additive manufacturing apparatus 10 again to add another layer of build material 31 and binder material 50 to the build platform 20. This sequence of steps is repeated multiple times to build an object on the build platform 20 in a layer-wise manner.

Such conventional additive manufacturing apparatuses may also not meet demands with respect to efficiency, throughput, and/or quality.

The embodiments described herein are directed to additive manufacturing apparatuses, components for additive manufacturing apparatuses, and methods for using such additive manufacturing apparatuses and components, which may be implemented to improve efficiency, throughput, and/or quality.

Additive Manufacturing Apparatuses

Referring now to FIG. 2, an embodiment of an additive manufacturing apparatus 100 is schematically depicted. The apparatus 100 includes a maintenance station, such as the cleaning station 110, a build platform 120, and an actuator assembly 102. The apparatus 100 may optionally include a supply platform 130. The actuator assembly 102 comprises, among other elements, a recoat head 140 for distributing build material 400 and a print head 150 for depositing binder material 500. In embodiments, the recoat head 140 and/or the print head 150 may further comprise an energy source for curing the binder material 500 as will be described in further detail herein. In embodiments, the recoat head 140 may further comprise an energy source for curing the binder material 500 as will be described in further detail herein. The actuator assembly 102 may be constructed to facilitate independent control of the recoat head 140 and the print head 150 along the working axis 116 of the apparatus 100. This allows for the recoat head 140 and the print head 150 to traverse the working axis 116 of the apparatus 100 in the same direction and/or in opposite directions and for the recoat head 140 and the print head 150 to traverse the working axis of the apparatus 100 at different speeds and/or the same speed. Independent actuation and control of the recoat head 140 and the print head 150, in turn, allows for at least some steps of the additive manufacturing process to be performed simultaneously thereby reducing the overall cycle time of the additive manufacturing process to less than the sum of the cycle time for each individual step. In the embodiments of the apparatus 100 described herein, the working axis 116 of the apparatus 100 is parallel to the +/−X axis of the coordinate axes depicted in the figures. It should be understood that the components of the additive manufacturing apparatus 100 traversing the working axis 116, such as the recoat head 140, the print head 150, or the like, need not be centered on the working axis 116. However, in the embodiments described herein, at least two of the components of the additive manufacturing apparatus 100 are arranged with respect to the working axis 116 such that, as the components traverse the working axis, the components could occupy the same or an overlapping volume along the working axis if not properly controlled.

While specific embodiments in the following description relate to additive manufacturing apparatuses utilizing the deposition or printing of a "binder" by a print head and subsequent curing to facilitate consolidation of the build material, it is expressly contemplated that the architecture of the various additive manufacturing apparatuses described herein (e.g., the positioning and layout of the cleaning station, build platform, supply platform, etc. and/or the actuator assemblies associated with the print head and recoat head) may be utilized for other additive manufacturing modalities. For example, the print head associated with the actuator assemblies described herein may be substituted for one or more energy beam sources, such as laser sources or electron beam sources, for example, commonly used to consolidate build materials in additive manufacturing apparatuses and additive manufacturing processes. In these embodiments, the steps of printing binder with a print head and curing binder to consolidate build material would be replaced with consolidating the build material by directing an energy beam of the energy beam source to facilitate consolidation. The energy beam source may be traversed and maneuvered with the actuator assemblies described herein the same as the print head embodiments. Thus, the "print head" of the embodiments described herein could be referred to as a "consolidation head" and the consolidation head may be a print head or an energy beam source. Further, in as much as additive manufacturing processes may be described as "printing" discrete, consolidated layers of a build to form an object, the various uses of the term "print" as a modifier (e.g., print home position, print head actuator, print return rate, etc.) may be substituted for "consolidation" as the modifier (e.g., consolidation home position, consolidation head actuator, consolidation return rate, etc.), such as when the consolidation head is an energy beam source.

Further, with respect to a maintenance station described herein, when an energy beam source is substituted for the print head described herein, it is contemplated that the maintenance station may be used to facilitate cleaning of the energy beam source, to remove soot particles, melt spatter, and the like, in a similar manner as the cleaning stations described herein. In addition or as an alternative to cleaning, the maintenance station may also include a calibration station or calibration feature to allow for calibration (or re-calibration) of the energy beam source. In some of these embodiments, a maintenance station may not be employed, such as in embodiments where the additive manufacturing apparatus utilizes an energy beam source without a maintenance station. In such embodiments the "print home" position described herein would function as a homing position for parking the associated consolidation head.

Referring again to FIG. 2, in the embodiment depicted, the apparatus 100 includes a cleaning station 110, a build platform 120, a supply platform 130 and an actuator assembly 102. However, it should be understood that, in other embodiments, the apparatus 100 does not include a supply platform 130, such as in embodiments where build material is supplied to the build platform 120 with, for example and without limitation, a build material hopper. In the embodiment depicted in FIG. 2, the cleaning station 110, the build platform 120, and the supply platform 130 are positioned in series along the working axis 116 of the apparatus 100 between a print home position 158 of the print head 150 located proximate an end of the working axis 116 in the −X direction, and a recoat home position 148 of the recoat head 140 located proximate an end of the working axis 116 in the +X direction. That is, the print home position 158 and the recoat home position 148 are spaced apart from one another in a horizontal direction that is parallel to the +/−X axis of the coordinate axes depicted in the figures and the cleaning station 110, the build platform 120, and the supply platform 130 are positioned therebetween. In the embodiments described herein, the build platform 120 is positioned between the cleaning station 110 and the supply platform 130 along the working axis 116 of the apparatus 100.

The cleaning station 110 is positioned proximate one end of the working axis 116 of the apparatus 100 and is co-located with the print home position 158 where the print head 150 is located or "parked" before and after depositing binder material 500 on a layer of build material 400 positioned on the build platform 120. The cleaning station 110 may include one or more cleaning sections (not shown) to facilitate cleaning the print head 150 between depositing operations. The cleaning sections may include, for example and without limitation, a soaking station containing a cleaning solution for dissolving excess binder material on the print head 150, a wiping station for removing excess binder material and excess build material from the print head 150, a jetting station for purging binder material and cleaning solution from the print head 150, a park station for maintaining moisture in the nozzles of the print head 150, or various combinations thereof. The print head 150 may be transitioned between the cleaning sections by the actuator assembly 102.

The build platform 120 is coupled to a lift system 800 comprising a build platform actuator 122 to facilitate raising and lowering the build platform 120 relative to the working axis 116 of the apparatus 100 in a vertical direction (i.e., a direction parallel to the +/−Z directions of the coordinate axes depicted in the figures). The build platform actuator 122 may be, for example and without limitation, a mechanical actuator, an electro-mechanical actuator, a pneumatic actuator, a hydraulic actuator, or any other actuator suitable for imparting linear motion to the build platform 120 in a vertical direction. Suitable actuators may include, without limitation, a worm drive actuator, a ball screw actuator, a pneumatic piston, a hydraulic piston, an electro-mechanical linear actuator, or the like. The build platform 120 and build platform actuator 122 are positioned in a build receptacle 124 located below the working axis 116 (i.e., in the −Z direction of the coordinate axes depicted in the figures) of the apparatus 100. During operation of the apparatus 100, the build platform 120 is retracted into the build receptacle 124 by action of the build platform actuator 122 after each layer of binder material 500 is deposited on the build material 400 located on build platform 120.

The supply platform 130 is coupled to a lift system 800 comprising a supply platform actuator 132 to facilitate raising and lowering the supply platform 130 relative to the working axis 116 of the apparatus 100 in a vertical direction (i.e., a direction parallel to the +/−Z directions of the coordinate axes depicted in the figures). The supply platform actuator 132 may be, for example and without limitation, a mechanical actuator, an electro-mechanical actuator, a pneumatic actuator, a hydraulic actuator, or any other actuator suitable for imparting linear motion to the supply platform 130 in a vertical direction. Suitable actuators may include, without limitation, a worm drive actuator, a ball screw actuator, a pneumatic piston, a hydraulic piston, an electro-mechanical linear actuator, or the like. The supply platform 130 and supply platform actuator 132 are positioned in a supply receptacle 134 located below the working axis 116 (i.e., in the −Z direction of the coordinate axes depicted in the figures) of the apparatus 100. During operation of the apparatus 100, the supply platform 130 is raised relative to the supply receptacle 134 and towards the working axis 116 of the apparatus 100 by action of the supply platform actuator 132 after a layer of build material 400 is distributed from the supply platform 130 to the build platform 120, as will be described in further detail herein.

Figure 3:
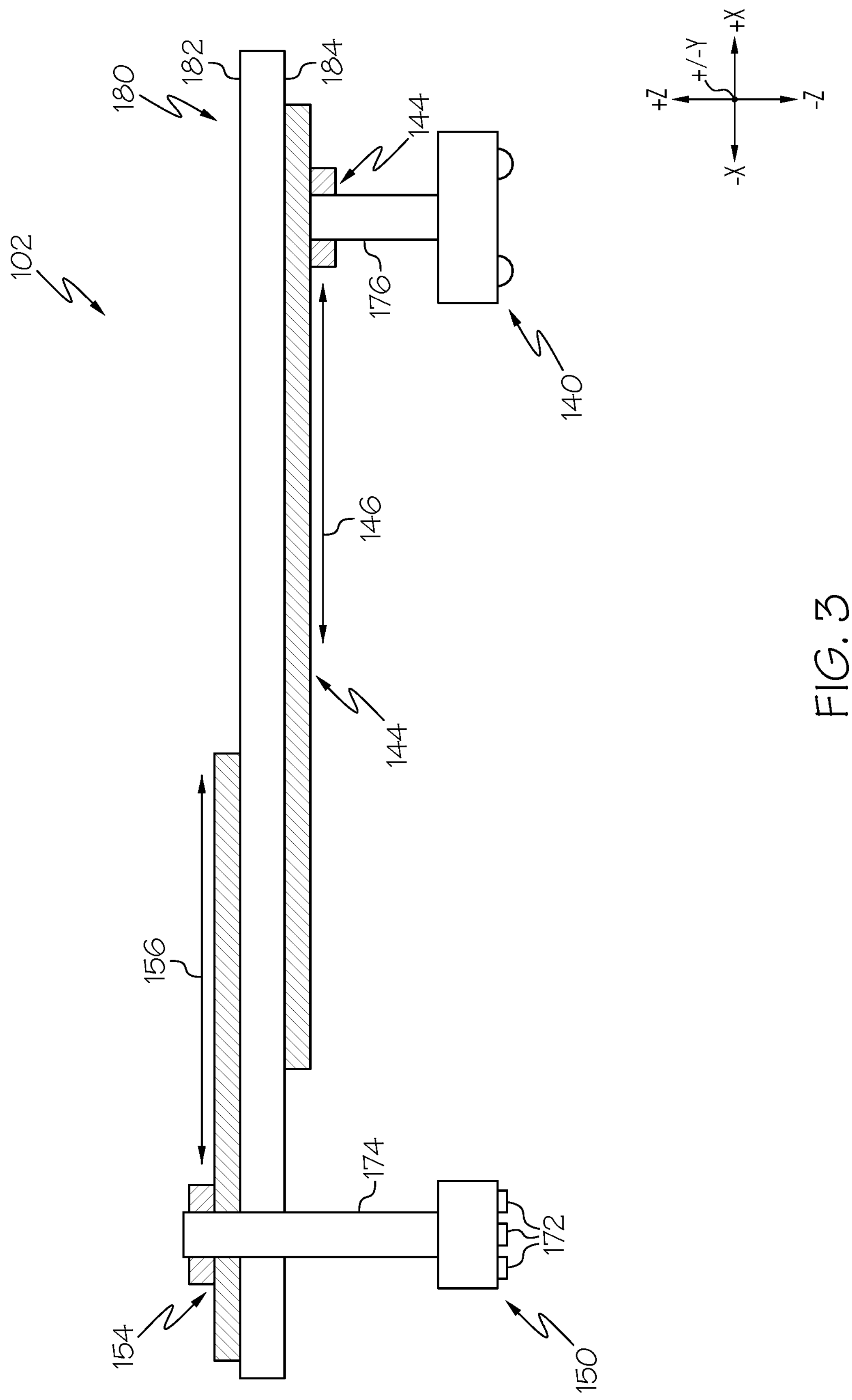
FIG. 3 schematically depicts an embodiment of an actuator assembly for an additive manufacturing apparatus according to one or more embodiments shown and described herein.

Referring now to FIGS. 2 and 3, FIG. 3 schematically depicts the actuator assembly 102 of the additive manufacturing apparatus 100 of FIG. 2. The actuator assembly 102 generally comprises the recoat head 140, the print head 150, a recoat head actuator 144, a print head actuator 154, an upper support 182, and a lower support 184. In the embodiments described herein, the upper support 182 and the lower support 184 extend in a horizontal direction (i.e., a direction parallel to the +/−X direction of the coordinate axes depicted in the figures) parallel to the working axis 116 (FIG. 2) of the apparatus 100 and are spaced apart from one another in the vertical direction. When the actuator assembly 102 is assembled over the cleaning station 110, the build platform 120, and the supply platform 130 as depicted in FIG. 2, the upper support 182 and the lower support 184 extend in a horizontal direction from at least the cleaning station 110 to beyond the supply platform 130.

In one embodiment, such as the embodiment of the actuator assembly 102 depicted in FIG. 2, the upper support 182 and the lower support 184 are opposite sides of a rail 180 that extends in a horizontal direction and is oriented such that the upper support 182 is positioned above and spaced apart from the lower support 184. For example, in one embodiment, the rail 180 may be rectangular or square in vertical cross section (i.e., a cross section in the Y-Z plane of the coordinate axes depicted in the figures) with the top and bottom surfaces of the rectangle or square forming the upper support 182 and the lower support 184, respectively. In an alternative embodiment (not depicted), the rail 180 may have an "I" configuration in vertical cross section (i.e., a cross section in the Y-Z plane of the coordinate axes depicted in the figures) with the upper and lower flanges of the "I" forming the upper support 182 and the lower support 184, respectively. However, it should be understood that other embodiments are contemplated and possible. For example and without limitation, the upper support 182 and the lower support 184 may be separate structures, such as separate rails, extending in the horizontal direction and spaced apart from one another in the vertical direction as depicted in an alternative embodiment of the actuator assembly shown in FIG. 4.

In the embodiments described herein, the recoat head actuator 144 is coupled to one of the upper support 182 and the lower support 184 and the print head actuator 154 is coupled to the other of the upper support 182 and the lower support 184 such that the recoat head actuator 144 and the print head actuator 154 are arranged in a "stacked" configuration. For example, in the embodiment of the actuator assembly 102 depicted in FIGS. 2 and 3, the recoat head actuator 144 is coupled to the lower support 184 and the print head actuator 154 is coupled to the upper support 182. However, it should be understood that, in other embodiments (not depicted) the recoat head actuator 144 may be coupled to the upper support 182 and the print head actuator 154 may be coupled to the lower support 184.

In the embodiments described herein, the recoat head actuator 144 is bi-directionally actuatable along a recoat motion axis 146 and the print head actuator 154 is bi-directionally actuatable along a print motion axis 156. That is, the recoat motion axis 146 and the print motion axis 156 define the axes along which the recoat head actuator 144 and the print head actuator 154 are actuatable, respectively. The recoat motion axis 146 and the print motion axis 156 extend in a horizontal direction and are parallel with the working axis 116 (FIG. 2) of the apparatus 100. In the embodiments described herein, the recoat motion axis 146 and the print motion axis 156 are parallel with one another and spaced apart from one another in the vertical direction due to the stacked configuration of the recoat head actuator 144 and the print head actuator 154. In some embodiments, such as the embodiment of the actuator assembly 102 depicted in FIG. 2, the recoat motion axis 146 and the print motion axis 156 are located in separate vertical planes (i.e., a plane parallel to the X-Z plane of the coordinate axes depicted in the figures). However, it should be understood that other embodiments are contemplated and possible, such as embodiments in which the recoat motion axis 146 and the print motion axis 156 are located in the same vertical plane.

In the embodiments described herein, the recoat head actuator 144 and the print head actuator 154 may be, for example and without limitation, mechanical actuators, electro-mechanical actuators, pneumatic actuators, hydraulic actuators, or any other actuator suitable for providing linear motion. Suitable actuators may include, without limitation, worm drive actuators, ball screw actuators, pneumatic pistons, hydraulic pistons, electro-mechanical linear actuators, or the like. In one particular embodiment, the recoat head actuator 144 and the print head actuator 154 are linear actuators manufactured by Aerotech® Inc. of Pittsburgh, Pennsylvania, such as the PRO225LM Mechanical Bearing, Linear Motor Stage.

In embodiments, the recoat head actuator 144 and the print head actuator 154 may each be a cohesive sub-system that is affixed to the rail 180, such as when the recoat head actuator 144 and the print head actuator 154 are PRO225LM Mechanical Bearing, Linear Motor Stages, for example. However, it should be understood that other embodiments are contemplated and possible, such as embodiments where the recoat head actuator 144 and the print head actuator 154 comprise multiple components that are individually assembled onto the rail 180 to form the recoat head actuator 144 and the print head actuator 154, respectively.

Still referring to FIGS. 2 and 3, the recoat head 140 is coupled to the recoat head actuator 144 such that the recoat head 140 is positioned below (i.e., in the −Z direction of the coordinate axes depicted in the figures) the upper support 182 and the lower support 184. When the actuator assembly 102 is assembled over the cleaning station 110, the build platform 120, and the supply platform 130 as depicted in FIG. 2, the recoat head 140 is situated on the working axis 116 (FIG. 2) of the apparatus 100. Thus, bi-directional actuation of the recoat head actuator 144 along the recoat motion axis 146 affects bi-directional motion of the recoat head 140 on the working axis 116 of the apparatus 100. In the embodiment of the actuator assembly 102 depicted in FIGS. 2 and 3, the recoat head 140 is coupled to the recoat head actuator 144 with support bracket 176 such that the recoat head 140 is positioned on the working axis 116 (FIG. 2) of the apparatus 100 while the recoat head actuator 144 is positioned above the working axis 116. Positioning the recoat head actuator 144 above the working axis 116 of the apparatus 100 reduces fouling of the recoat head actuator 144 with powder from either the build platform 120 or the supply platform 130. This increases the maintenance interval for the recoat head actuator, increases the service life of the recoat head actuator, reduces machine downtime, and reduces build errors due to fouling of the recoat head actuator 144. In addition, positioning the recoat head actuator 144 above the working axis 116 of the apparatus 100 allows for improved visual and physical access to the build platform 120 and the supply platform 130, improving the ease of maintenance and allowing for better visual observation (from human observation, camera systems, or the like) of the additive manufacturing process. In some embodiments described herein, the recoat head 140 may be fixed in directions orthogonal to the recoat motion axis 146 and the working axis 116 (i.e., fixed along the +/−Z axis and/or fixed along the +/−Y axis).

Similarly, the print head 150 is coupled to the print head actuator 154 such that the print head 150 is positioned below (i.e., in the −Z direction of the coordinate axes depicted in the figures) the upper support 182 and the lower support 184. When the actuator assembly 102 is assembled over the cleaning station 110, the build platform 120, and the supply platform 130 as depicted in FIG. 2, the print head 150 is situated on the working axis 116 (FIG. 2) of the apparatus 100. Thus, bi-directional actuation of the print head actuator 154 along the print motion axis 156 affects bi-directional motion of the print head 150 on the working axis 116 of the apparatus 100. In the embodiment of the actuator assembly 102 depicted in FIGS. 2 and 3, the print head 150 is coupled to the print head actuator 154 with support bracket 174 such that the print head 150 is positioned on the working axis 116 (FIG. 2) of the apparatus 100 and the print head actuator 154 is positioned above the working axis 116. Positioning the print head actuator 154 above the working axis 116 of the apparatus 100 reduces fouling of the print head actuator 154 with powder from either the build platform 120 or the supply platform 130. This increases the maintenance interval for the print head actuator 154, increases the service life of the print head actuator 154, reduces machine downtime, and reduces build errors due to fouling of the print head actuator 154. In addition, positioning the print head actuator 154 above the working axis 116 of the apparatus 100 allows for improved visual and physical access to the build platform 120 and the supply platform 130, improving the ease of maintenance and allowing for better visual observation (from human observation, camera systems, or the like) of the additive manufacturing process. In some embodiments described herein, the print head 150 may be fixed in directions orthogonal to the print motion axis 156 and the working axis 116 (i.e., fixed along the +/−Z axis and/or fixed along the +/−Y axis). That is, in embodiments, the entire print head is fixed in directions orthogonal to the print motion axis 156, however, sub-components of the print head, such individual arrays of nozzles or the like, may be translatable in directions that are non-parallel to the print motion axis 156, such as directions that are orthogonal to the print motion axis.

In embodiments, the recoat head actuator 144 and the print head actuator 154 overlap over the build receptacle 124, as depicted in FIG. 2. As such, the range of motion of the recoat head actuator 144 (and attached recoat head 140) and the print head actuator 154 (and attached print head 150) also overlap over the build receptacle 124. In embodiments, the range of motion of the recoat head actuator (and attached recoat head 140) is greater than the range of motion of the print head actuator 154 (and attached print head 150). This is true when, for example, the apparatus 100 includes a supply receptacle 134 positioned between the build receptacle 124 and the recoat home position 148. However, it should be understood that other embodiments are contemplated and possible. For example, in embodiments (not depicted) the recoat head actuator 144 and the print head actuator 154 may overlap along the entire length of the working axis 116 of the apparatus 100. In these embodiments, the range of motion of the recoat head actuator 144 (and attached recoat head 140) and the print head actuator 154 (and attached print head 150) are co-extensive over the working axis 116 of the apparatus 100.

As noted above, in the embodiments described herein the recoat head 140 and the print head 150 are both located on the working axis 116 of the apparatus 100. As such, the movements of the recoat head 140 and the print head 150 on the working axis 116 occur along the same axis and are thus co-linear. With this configuration, the recoat head 140 and the print head 150 may occupy the same space (or portions of the same space) along the working axis 116 of the apparatus 100 at different times during a single build cycle. However, the recoat motion axis 146 of the recoat head actuator 144 and the print motion axis 156 of the print head actuator 154 are spaced apart from one another in a vertical direction due to the stacked configuration of the actuators 144, 154. The spacing of the recoat motion axis 146 and the print motion axis 156 permits the recoat head 140 and the print head 150 to be moved along the working axis 116 of the apparatus 100 simultaneously in a coordinated fashion, in the same direction and/or in opposing directions, at the same speeds or different speeds. This, in turn, allows for individual steps of the additive manufacturing process, such as the distributing step (also referred to herein as the recoating step), the depositing step (also referred to herein as the printing step), the curing (or heating) step, and/or the cleaning step to be performed with overlapping cycle times. For example, the distributing step may be initiated while the cleaning step is being completed; the depositing step may be initiated while the distributing step in completed; and/or the cleaning step may be initiated while the distributing step is being completed. This may reduce the overall cycle time of the additive manufacturing apparatus 100 to less than the sum of the distributing cycle time (also referred to herein as the recoat cycle time), the depositing cycle time (also referred to herein as the print cycle time), and/or the cleaning cycle time.

While FIGS. 2 and 3 schematically depict an embodiment of an actuator assembly 102 which comprises an upper support 182 and a lower support 184 with the recoat head actuator 144 and the print head actuator 154 mounted thereto, respectively, it should be understood that other embodiments are contemplated and possible, such as embodiments which comprise more than two supports and more than two actuators.

Figure 4A:
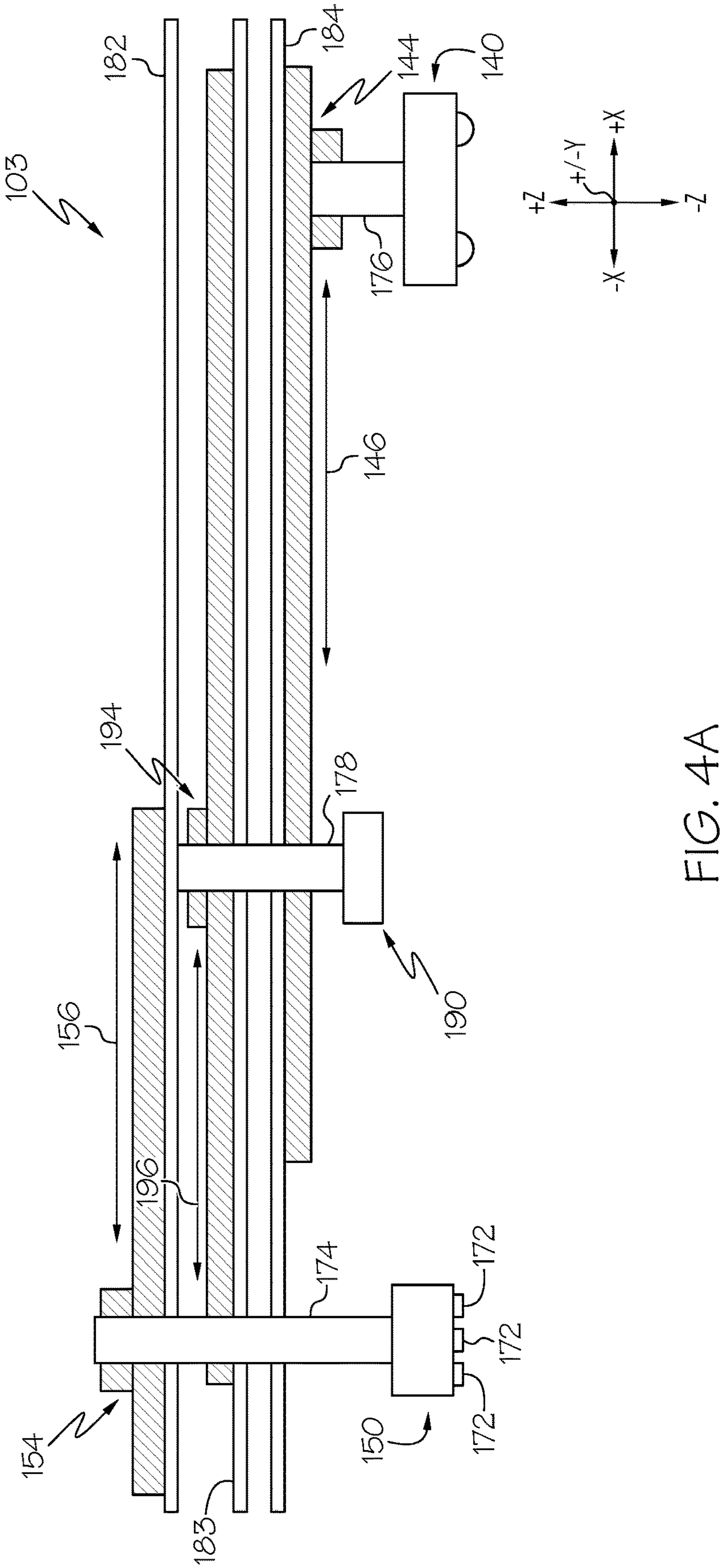
FIG. 4A schematically depicts an embodiment of an actuator assembly for an additive manufacturing apparatus according to one or more embodiments shown and described herein.
Figure 4B:
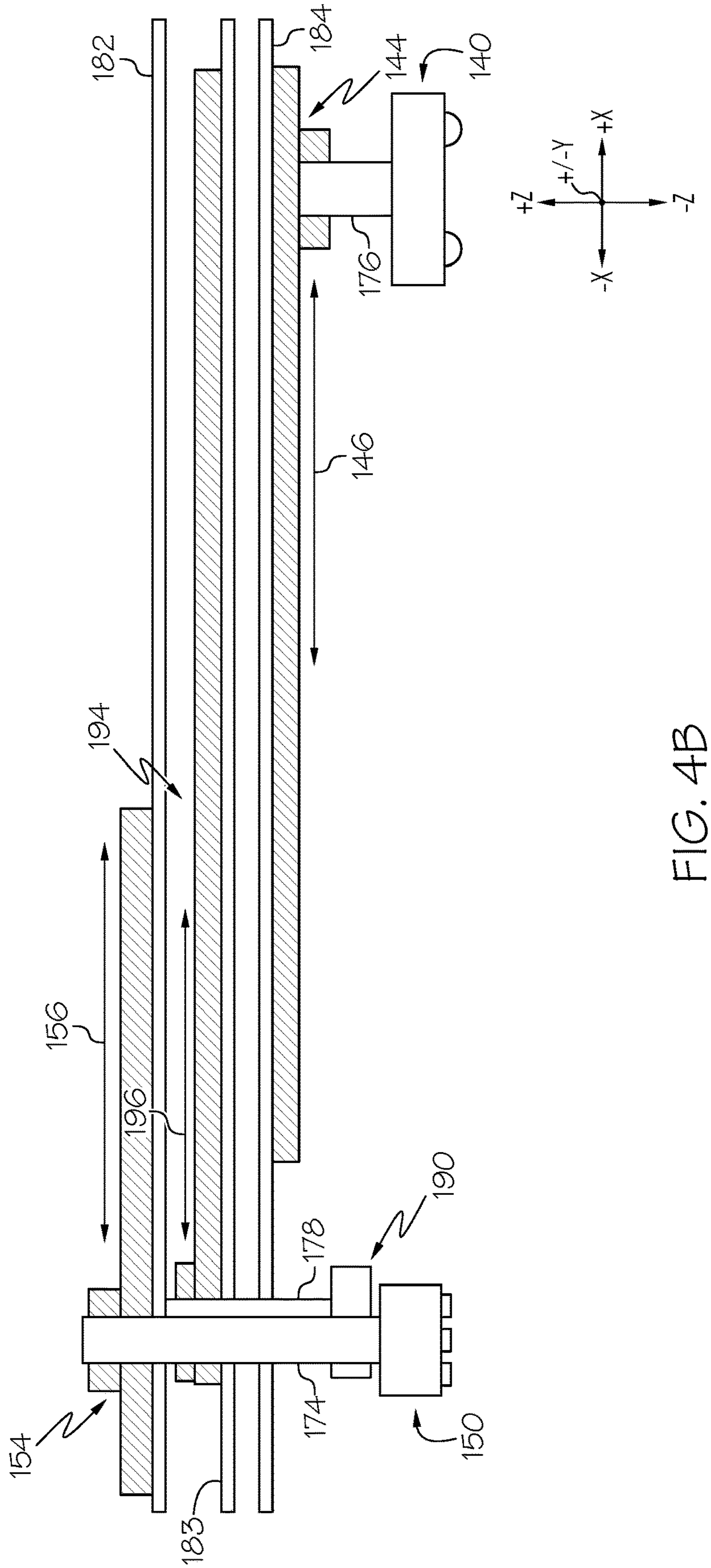
FIG. 4B schematically depicts the actuator assembly of FIG. 4A with the support bracket and process accessory of the process accessory actuator nested within the support bracket of the print head actuator.

For example, FIGS. 4A and 4B schematically depict another embodiment of an actuator assembly 103. In this embodiment, the actuator assembly 103 comprises an upper support 182, a lower support 184, a recoat head 140, a recoat head actuator 144, and a print head actuator 154 as described above with respect to FIG. 3. However, in this embodiment, the actuator assembly 103 further comprises an intermediate support 183 disposed between the upper support 182 and the lower support 184. Each of the upper support 182, the intermediate support 183, and the lower support 184 extend in a horizontal direction (i.e., a direction parallel to the +/−X direction of the coordinate axes depicted in the figures) parallel to the working axis 116 (FIG. 2) of the apparatus 100 and are spaced apart from one another in the vertical direction.

In the embodiment depicted in FIGS. 4A and 4B, the recoat head actuator 144 is coupled to the lower support 184, the print head actuator 154 is coupled to the upper support 182, and a process accessory actuator 194 is coupled to the intermediate support 183 such that the recoat head actuator 144, the print head actuator 154, and the process accessory actuator 194 are arranged in a "stacked" configuration. It should be understood that, in other embodiments (not depicted) the recoat head actuator 144, the print head actuator 154, and the process accessory actuator 194 may be coupled to different ones of the upper support 182, the intermediate support 183, and the lower support 184.

The recoat head actuator 144 and the print head actuator 154 may be bi-directionally actuatable as described herein with respect to FIGS. 2 and 3. Similarly, the process accessory actuator 194 may be bi-directionally actuatable along an accessory motion axis 196. That is, the accessory motion axis 196 defines the axis along which the process accessory actuator 194 is actuatable. Like the recoat motion axis 146 and the print motion axis 156, the accessory motion axis 196 extends in a horizontal direction and is parallel with the working axis 116 (FIG. 2) of the apparatus 100. In the embodiment depicted in FIGS. 4A and 4B, the recoat motion axis 146, the print motion axis 156, and the accessory motion axis 196 are parallel with one another and spaced apart from one another in the vertical direction due to the stacked configuration of the recoat head actuator 144, the print head actuator 154, and the process accessory actuator 194. In some embodiments, the recoat motion axis 146, the print motion axis 156, and the accessory motion axis 196 are located in different vertical planes (i.e., a plane parallel to the X-Z plane of the coordinate axes depicted in the figures). However, it should be understood that other embodiments are contemplated and possible, such as embodiments in which the recoat motion axis 146, the print motion axis 156, and the accessory motion axis 196 are located in the same vertical plane.

Like, the recoat head actuator 144 and the print head actuator 154, the process accessory actuator 194 may be, for example and without limitation, a mechanical actuator, an electro-mechanical actuator, a pneumatic actuator, a hydraulic actuator, or any other actuator suitable for providing linear motion. Suitable actuators may include, without limitation, a worm drive actuator, a ball screw actuator, a pneumatic piston, a hydraulic piston, an electro-mechanical linear actuator, or the like. In one particular embodiment, the process accessory actuator 194 is a linear actuator manufactured by Aerotech® Inc. of Pittsburgh, Pennsylvania, such as the PRO225LM Mechanical Bearing, Linear Motor Stage.

Still referring to FIGS. 4A and 4B, the process accessory 190 is coupled to the process accessory actuator 194 such that the process accessory 190 is positioned below (i.e., in the −Z direction of the coordinate axes depicted in the figures) the upper support 182, the intermediate support 183, and the lower support 184. When the actuator assembly 103 is assembled over the cleaning station 110, the build platform 120, and the supply platform 130, similar to the actuator assembly 102 depicted in FIG. 2, the process accessory 190 may be situated on the working axis 116 (FIG. 2) of the apparatus 100 or above (i.e., in the +Z direction of the coordinate axes depicted in the figures) the working axis 116. Thus, bi-directional actuation of the process accessory actuator 194 along the accessory motion axis 196 affects bi-directional motion of the process accessory 190 on the working axis 116 or parallel to the working axis 116 of the apparatus 100. In the embodiment of the actuator assembly 103 depicted in FIGS. 4A and 4B, the process accessory 190 is coupled to the process accessory actuator 194 with support bracket 178 such that the process accessory 190 is positioned above the working axis 116 (FIG. 2). In some embodiments described herein, the process accessory 190 may be fixed in directions orthogonal to the accessory motion axis 196 and the working axis 116 (i.e., fixed along the +/−Z axis and/or fixed along the +/−Y axis). As noted above, the recoat head 140, the print head 150, and the process accessory 190 may be located on the working axis 116 of the apparatus 100. As such, the movements of the recoat head 140, the print head 150, and the process accessory 190 on the working axis 116 occur along the same axis and are thus co-linear. With this configuration, the recoat head 140, the print head 150, and the process accessory 190 may occupy the same space (or portions of the same space) along the working axis 116 of the apparatus 100 at different times during a single build cycle. However, the recoat motion axis 146 of the recoat head actuator 144, the print motion axis 156 of the print head actuator 154, and the accessory motion axis 196 of the process accessory actuator 194 are spaced apart from one another in a vertical direction due to the stacked configuration of the actuators 144, 154, 194. The spacing of the recoat motion axis 146, the print motion axis 156, and the accessory motion axis 196 permits the recoat head 140, the print head 150, and the process accessory 190 to be moved along the working axis 116 of the apparatus 100 simultaneously in a coordinated fashion, in the same direction and/or in opposing directions, at the same speeds or different speeds. This, in turn, allows for individual steps of the additive manufacturing process, such as the distributing step (also referred to herein as the recoating step), the depositing step (also referred to herein as the printing step), the curing (or heating) step, the cleaning step, and/or additional steps (such as sensing steps, curing steps, or the like) to be performed with overlapping cycle times. For example, the distributing step may be initiated while the cleaning step is being completed; the depositing step may be initiated while the distributing step in completed; and/or the cleaning step may be initiated while the distributing step is being completed. This may reduce the overall cycle time of the additive manufacturing apparatus 100 to less than the sum of the distributing cycle time (also referred to herein as the recoat cycle time), the depositing cycle time (also referred to herein as the print cycle time), and/or the cleaning cycle time.

In embodiments, the support brackets 174, 176, 178 may be sized and shaped to allow the support bracket 178 and process accessory 190 attached to the process accessory actuator 194 to nest within the support bracket 174 attached to the print head actuator 154, as depicted in FIG. 4B. Nesting the process accessory 190 within the support bracket 174 allows the print head 150 and/or the recoat head 140 to traverse the working axis 116 (FIG. 2) of the apparatus 100 unencumbered.

While FIGS. 4A and 4B schematically depicted the print head actuator 154 coupled to the upper support 182, the recoat head actuator 144 coupled to the lower support 184, and the process accessory actuator 194 coupled to the intermediate support, it should be understood that other embodiments are contemplated and possible. For example and without limitation, the print head actuator 154 may be coupled to the lower support 184 and the recoat head actuator 144 could be coupled to the upper support 182. Accordingly, it should be understood that the print head actuator 154 (and print head 150) may be coupled to any one of the upper support 182, the lower support 184 and the intermediate support 183, the recoat head actuator 144 (and recoat head 140) may be coupled to another of the upper support 182, the lower support 184 and the intermediate support 183, and the process accessory actuator 194 (and process accessory 190) may be coupled to the remaining one of the upper support 182, the lower support 184 and the intermediate support 183.

Still referring to FIGS. 4A and 4B, the process accessory 190 may include one or more accessories utilized during the additive manufacturing process. For example and without limitation, the process accessory 190 may be a sensor for detecting a property of the build material 400 distributed on the build platform 120 and/or the binder material 500 deposited on the build platform 120. Examples of sensors may include, without limitation, image sensors such as cameras, thermal detectors, pyrometers, profilometers, ultrasonic detectors, and the like. In these embodiments, signals from the sensors may be fed back to the control system (described in further detail herein) of the additive manufacturing apparatus to facilitate feedback control of one or more functions of the additive manufacturing apparatus. Alternatively or additionally, the process accessory 190 may include an energy source for heating the build material 400 distributed on the build platform 120 and/or curing the binder material 500 deposited on the build platform 120. Examples of energy sources may include, without limitation, infrared heaters, ultraviolet lamps, laser light sources, and the like. In embodiments, the energy source may emit a wavelength or a range of wavelengths of electromagnetic radiation suitable for curing (or at least initiating the curing) of the binder material 500 deposited on the build material 400 distributed on the build platform 120. In instances where the energy source is an infrared heater, the energy source may also preheat the build material 400 as it is distributed from the supply platform 130 to the build platform 120 that may assist in expediting the curing of subsequently deposited binder material 500. Alternatively or additionally, the process accessory 190 may include a projector for projecting a light pattern onto the build platform, such as a DLP projector or the like. The light pattern may be, for example, a pattern corresponding to the pattern of binder material deposited on the build material located on the build platform, an image of a layer of an object to be built on the build platform, or the like. Alternatively or additionally, the process accessory 190 may be an end effector, such as a mechanical gripper or the like, which may be used to position a component (e.g., a material build hopper, a lid of the build receptacle, or the like) along the working axis 116 of the additive manufacturing apparatus). Alternatively or additionally, the process accessory 190 may be a print head, such as, for example, a print head as described herein. Based on the foregoing, it should be understood that the intermediate support 183 and process accessory actuator 194 may be used to support a variety of different process accessories used in conjunction with additive manufacturing processes including, without limitation, those process accessories described herein.

Referring now to FIGS. 2-4B, in the embodiments described herein, the print head 150 may deposit the binder material 500 on a layer of build material 400 distributed on the build platform 120 through an array of nozzles 172 located on the underside of the print head 150 (i.e., the surface of the print head 150 facing the build platform 120). In embodiments, the array of nozzles 172 are spatially distributed in the XY plane of the coordinate axes depicted in the figures. In some embodiments, the print heads may also define the geometry of the part being built. In embodiments, the nozzles 172 may be piezoelectric print nozzles and, as such, the print head 150 is a piezo print head. In alternative embodiments, the nozzles 172 may be thermal print nozzles and, as such, the print head 150 is a thermal print head. In alternative embodiments, the nozzles 172 may be spray nozzles. In such embodiments, the print head 150 and nozzles 172 may work in conjunction with a projector that projects an image that defines the geometry of a layer of an object being built on the build platform. In such embodiments, the projector may be coupled to the accessory actuator, as described herein above. For example, the print head 150 may blanket deposit binder material on the build material and the projector projects a cure pattern of energy on to the binder material to selectively cure the binder material. Alternatively, the print head 150 may selectively deposit binder material in a pattern and the projector projects energy on to the entire build platform thereby curing the binder material. In another embodiment, the print head 150 may deposit binder material in a pre-determined patter and the projector projects a pre-defined pattern of energy with spatial variations in intensity to selectively cure (or partially cure) the deposited binder material.

In addition to the nozzles 172, in some embodiment, the print head 150 may further comprise one or more sensors (not depicted) for detecting a property of the build material 400 distributed on the build platform 120 and/or the binder material 500 deposited on the build platform 120. Examples of sensors may include, without limitation, image sensors such as cameras, thermal detectors, pyrometers, profilometers, ultrasonic detectors, and the like. In these embodiments, signals from the sensors may be fed back to the control system (described in further detail herein) of the additive manufacturing apparatus to facilitate feedback control of one or more functions of the additive manufacturing apparatus.

Alternatively or additionally, the print head 150 may comprise at least one energy source (not depicted). The energy source may emit a wavelength or a range of wavelengths of electromagnetic radiation suitable for curing (or at least initiating curing) the binder material 500 deposited on the build material 400 distributed on the build platform 120. For example, the energy source may comprise an infrared heater or an ultraviolet lamp which emit wavelengths of infrared or ultraviolet electromagnetic radiation suitable for curing the binder material 500 previously deposited on the layer of build material 400 distributed on the build platform 120. In instances where the energy source is an infrared heater, the energy source may also preheat the build material 400 as it is distributed from the supply platform 130 to the build platform 120 that may assist in expediting the curing of subsequently deposited binder material 500.

Referring now to FIGS. 2-4B and 5A-5C, FIGS. 5A-5C depict different embodiments of recoat heads 140*a*, 140*b*, 140*c*. As noted herein, the recoat head 140 is used in the additive manufacturing apparatus 100 to distribute build material 400 and, more specifically, to distribute build material 400 from the supply platform 130 to the build platform 120. That is, the recoat head 140 is used to "recoat" the build platform 120 with build material 400. The recoat head 140 may include at least one of a roller, blade, or wiper to facilitate the distribution of build material 400 from the supply platform 130 to the build platform 120.

Figure 5A:
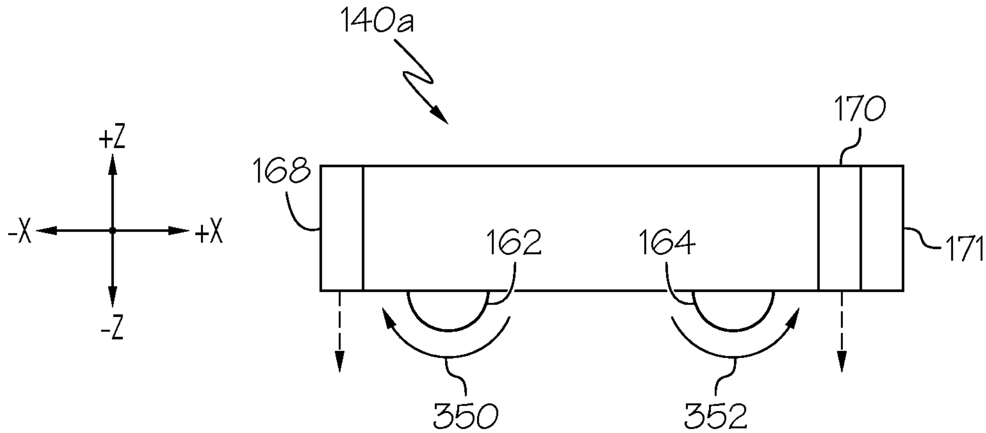
FIG. 5A schematically depicts a recoat head for an additive manufacturing apparatus according to one or more embodiments shown and described herein.

For example, FIG. 5A schematically depicts one embodiment of a recoat head 140*a* which includes a pair of rollers 162, 164. In one embodiment, the rollers 162, 164 may be rotated in the same direction. In another embodiment, the rollers 162,164 may be rotated in opposite directions. For example, the leading roller 162 (i.e., the first roller to contact the build material 400 when the recoat head 140*a* is traversed from the recoat home position 148 towards the print home position 158) may be rotated counter to the direction of travel of the recoat head 140*a* (i.e., clockwise in FIG. 5A) as indicated by arrow 350 while the trailing roller 164 is rotated in the same direction of travel of the recoat head 140*a* (i.e., counter clockwise in FIG. 5A) as indicated by arrow 152. In this embodiment, the leading roller 162 lofts the build material 400, which aids in distributing the build material 400 from the supply platform 130 to the build platform 120, while the trailing roller 164 compacts the build material that has been distributed.

Figure 5B:
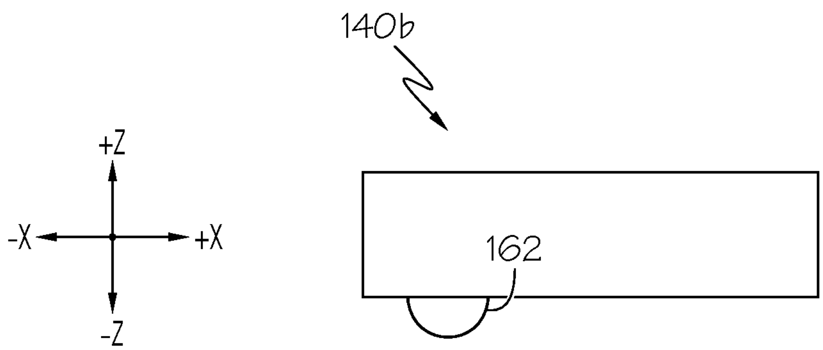
FIG. 5B schematically depicts a recoat head for an additive manufacturing apparatus according to one or more embodiments shown and described herein.

FIG. 5B depicts another embodiment of a recoat head 140*b*. In this embodiment, the recoat head 140*b* includes a single roller 162. The roller 162 may be rotated counter to the direction of travel as the recoat head 140 is traversed from the recoat home position 148 towards the print home position 158. This allows the roller 162 to initially loft and distribute the build material 400 as it advances towards the print home position 158 and compact the build material 400 as it returns towards the recoat home position 148.

Figure 5C:
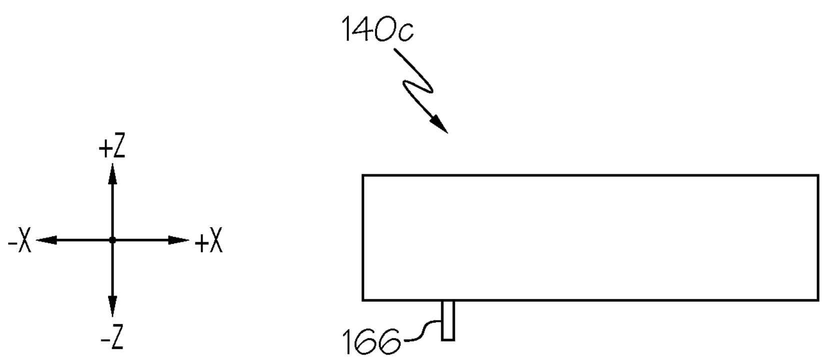
FIG. 5C schematically depicts a recoat head for an additive manufacturing apparatus according to one or more embodiments shown and described herein.

Referring to FIG. 5C, in another embodiment, the recoat head 140*c* may comprise a blade or wiper 166 (e.g., a doctor blade) extending from an underside (i.e., the surface of the recoat head 140*c* facing the supply platform 130) of the recoat head 140*c*. In another embodiment (not depicted) the recoat head may include one or more wipers and one or more rollers. As the recoat head 140*c* is traversed from the recoat home position 148 towards the print home position 158, the wiper 166 distributes build material from the supply platform 130 to the build platform 120.

In addition to at least one of a roller 162 and a wiper 166, the recoat head 140 may further comprise at least one energy source. Referring again to FIG. 5A by way of example, the recoat head 140*a* includes a leading energy source 168 and a trailing energy source 170. In these embodiments, the energy source(s) may emit a wavelength or a range of wavelengths of electromagnetic radiation suitable for curing (or at least initiating curing) the binder material 500 deposited on the build material 400 distributed on the build platform 120. For example, the leading energy source 168 and/or the trailing energy source 170 may comprise an infrared heater or an ultraviolet lamp which emit wavelengths of infrared or ultraviolet electromagnetic radiation, respectively, suitable for curing the binder material 500 previously deposited on the layer of build material 400 distributed on the build platform 120. In instances where the energy sources 168, 170 are infrared heaters, the energy sources may also preheat the build material 400 as it is distributed from the supply platform 130 to the build platform 120 that may assist in expediting the curing of subsequently deposited binder material 500.

While FIG. 5A depicts the recoat head 140*a* as comprising two energy sources 168, 170, it should be understood that the recoat head 140*a* may comprise a single energy source, such as either the leading energy source 168 or the trailing energy source 170. Moreover, it should be understood that, while energy sources are only depicted in conjunction with the embodiment of the recoat head 140*a* of FIG. 5A, the energy sources may be used in conjunction with any embodiment of the recoat head.

In addition to at least one of a roller 162 and a wiper 166, in some embodiments, the recoat head 140 may further comprise at least one sensor 171. Referring again to FIG. 5A by way of example, the recoat head 140*a* may further comprise at least one sensor 171 for detecting a property of the build material 400 distributed on the build platform 120 and/or the binder material 500 deposited on the build platform 120. Examples of sensors may include, without limitation, image sensors such as cameras, thermal detectors, pyrometers, profilometers, ultrasonic detectors, and the like. In these embodiments, signals from the sensors may be fed back to the control system (described in further detail herein) of the additive manufacturing apparatus to facilitate feedback control of one or more functions of the additive manufacturing apparatus.

While FIG. 5A depicts the recoat head 140*a* as comprising at least one sensor 171, it should be understood that at least one sensor may be used in conjunction with any embodiment of the recoat head described herein.

Referring again to FIG. 2, at least one of the recoat head 140, the print head 150, and the process accessory 190 (when included) may include a working axis proximity sensor (not depicted), such as a capacitive proximity sensor, a photoelectric sensor, an inductive proximity sensor, or the like, to detect the relative position of another of the recoat head 140, the print heads 150, and the process accessory 190 (when included) along the working axis 116 of the additive manufacturing apparatus 100. The working axis proximity sensors may be communicatively coupled to the control system 200 (described in further detail herein) of the additive manufacturing apparatus 100. Signals from the working axis proximity sensor may be fed back to the control system 200 and the control system utilizes the signals to detect potential collisions between the recoat head 140, the print head 150, and the process accessory 190 (when included) as they are individually traversed along the working axis 116 of the additive manufacturing apparatus 100.

More specifically, the motion of the recoat head 140, the print head 150, and the process accessory 190 (when included) may be controlled by the control system 200 according to computer readable and executable instructions stored in a memory of the control system 200. It is assumed that the computer readable and executable instructions are formulated to avoid co-locating the recoat head 140, the print head 150, and the process accessory 190 (when included) in the same space (or portions of the same space) along the working axis 116 of the apparatus 100 at the same time during a single build cycle. However, the control system 200 may utilize signal(s) from the working axis proximity sensor to ensure that the recoat head 140, the print head 150, and the process accessory 190 (when included) do not occupy the same space (or portions of the same space) along the working axis 116 of the apparatus 100 at the same time during a single build cycle. If the potential for a collision is determined based on the signals received from the working axis proximity sensor, the control system 200 may change the speed of one or more of recoat head 140, the print head 150, and the process accessory 190 (when included) along the working axis 116 to avoid the collision. Alternatively, if the potential for a collision is determined based on the signals received from the working axis proximity sensor, the control system 200 may halt the additive manufacturing process to prevent damage to one or more of the recoat head 140, the print head 150, and the process accessory 190 (when included).

In some other embodiments, collisions between components may be avoided by knowing the position of the components along the working axis and controlling the positioning of the components with a control system to prevent the components from occupying the same space at the same time. For example, linear encoders may be used in conjunction with the print head actuator and the recoat head actuator (and the knowledge of the dimensions of the print head and recoat head) to determine the position of the print head and the recoat head along the working axis. With this information, the control system can be programmed to avoid collisions between the print head and recoat head based on the location as determined by the linear encoders.

Alternatively or additionally, the additive manufacturing apparatus (specifically the control system) may be programmed to avoid collisions between the print head and the recoat head. For example, using the recoat head start positions with respect to the build platform and the supply platform, the recoat head end positions with respect to the build platform and the supply platform, the speed of the recoat head over the build platform, the speed of the recoat head over the supply platform, the acceleration(s) of the recoat head, the print head start position, the print head end position, the speed of the print head over the print platform, and the acceleration of the print head over the build platform, the motion of the print head and the recoat head can be synchronized and choreographed to avoid collisions.

Figure 6:
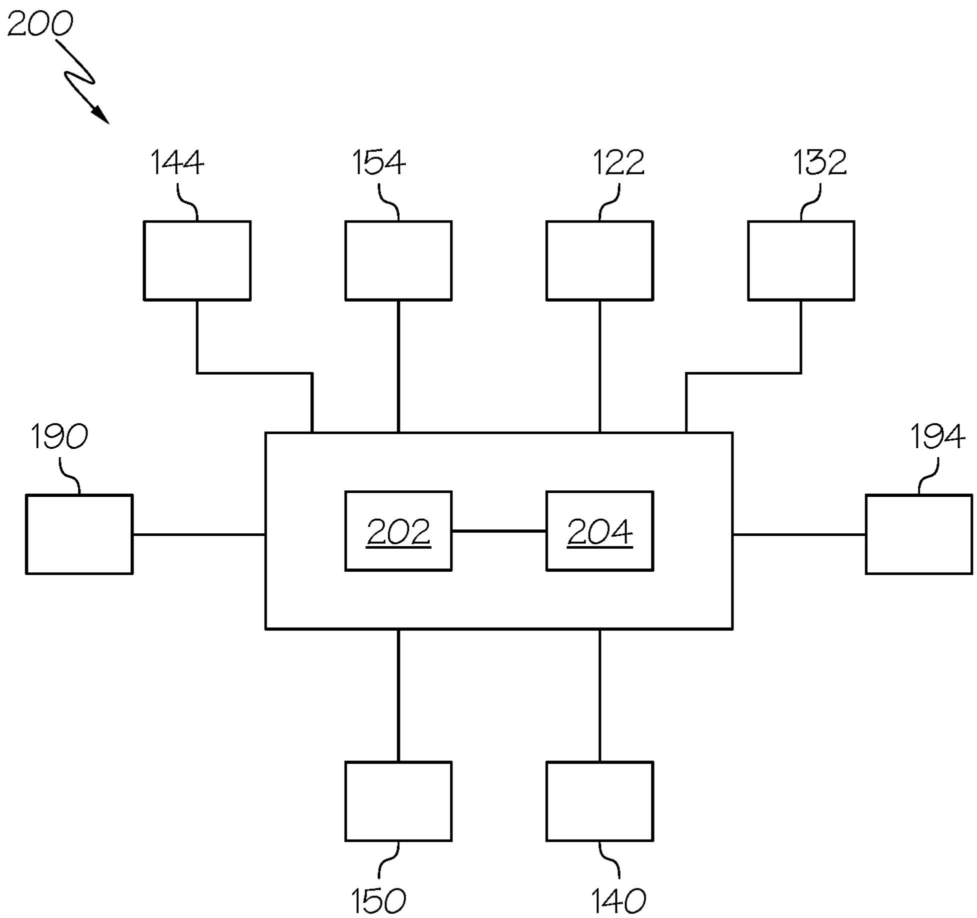
FIG. 6 schematically depicts a portion of control system for an additive manufacturing apparatus according to one or more embodiments shown and described herein.

Referring now to FIGS. 2 and 6, FIG. 6 schematically depicts a portion of a control system 200 for controlling the additive manufacturing apparatus 100 of FIG. 2 with an actuator assembly as depicted in either FIG. 3 or FIG. 4. The control system 200 is communicatively coupled to the recoat head actuator 144, the print head actuator 154, the build platform actuator 122, the supply platform actuator 132, and the process accessory actuator 194 (when included). The control system 200 may also be communicatively coupled to the print head 150, the recoat head 140, and the process accessory 190 (when included). In embodiments where one or more of the print head 150, the recoat head 140, and the process accessory 190 (when included) comprise a working axis proximity sensor (not depicted), the control system 200 may also be communicatively coupled to the working axis proximity sensor(s). In the embodiments described herein, the control system 200 comprises a processor 202 communicatively coupled to a memory 204. The processor 202 may include any processing component(s), such as a central processing unit or the like, configured to receive and execute computer readable and executable instructions stored in, for example, the memory 204. In the embodiments described herein, the processor 202 of the control system 200 is configured to provide control signals to (and thereby actuate) the recoat head actuator 144, the print head actuator 154, the build platform actuator 122, the supply platform actuator 132, and the process accessory actuator 194 (when included). The processor 202 may also be configured to provide control signals to (and thereby actuate) the print head 150, the recoat head 140, and the process accessory 190 (when included). The control system 200 may also be configured to receive signals from one or more sensors of the process accessory 190 and/or recoat head 140 and, based on these signals, actuate one or more of the recoat head actuator 144, the print head actuator 154, the build platform actuator 122, the supply platform actuator 132, the process accessory actuator 194, the print head 150, the recoat head 140, and/or the process accessory 190.

In the embodiments described herein, the computer readable and executable instructions for controlling the additive manufacturing apparatus 100 are stored in the memory 204 of the control system 200. The memory 204 is a non-transitory computer readable memory. The memory 204 may be configured as, for example and without limitation, volatile and/or nonvolatile memory and, as such, may include random access memory (including SRAM, DRAM, and/or other types of random access memory), flash memory, registers, compact discs (CD), digital versatile discs (DVD), and/or other types of storage components.

The operation of the additive manufacturing apparatus 100 will now be described in further detail with specific reference to FIGS. 2, 6, and 7A-7C.

Operation of the Additive Manufacturing Apparatus

Referring to FIG. 2, the additive manufacturing apparatus 100 is schematically depicted at initiation of a build cycle. The phrase "build cycle," as used herein, refers to the process of building a single layer of an object on the build platform 120. In the embodiments described herein, the "build cycle" may include one iteration each of raising the supply platform 130, lowering the build platform 120, distributing a new layer of build material 400 from the supply platform 130 to the build platform 120, depositing binder material 500 on the new layer of build material 400 distributed on the build platform 120, and optionally the cleaning of the print head 150. The additive manufacturing apparatus 100 comprises an overall build cycle time $T_{BC}$ which is the elapsed time during a single build cycle.

In describing the operation of the additive manufacturing apparatus 100, specific reference will be made herein to build material 400 and binder material 500. The build material generally comprises a powder material that is spreadable or flowable. Categories of suitable powder material include, without limitation, dry powder material and wet powder material (e.g., a powder material entrained in a slurry). In embodiments, the build material may be capable of being bound together with the binder material. In embodiments, the build material may also be capable of being fused together, such as by sintering. In embodiments, the build material may be an inorganic powder material including, for example and without limitation, ceramic powders, metal powders, glass powders, carbon powder, sand, cement, calcium phosphate powder, and various combinations thereof. In embodiments, the build material may comprise an organic powder material including, for example and without limitation, plastic powders, polymer powders, soap, powders formed from foodstuff (i.e., edible powders), and various combinations thereof. In some embodiments, the build material may be (or include) pharmaceutically active components, such as when the build material is or contains a pharmaceutical. In embodiments, the build material may be a combination of inorganic powder material and organic powder material.

The build material may be uniform in size or non-uniform in size. In embodiments, the build material may have a powder size distribution such as, for example and without limitation, a bi-modal or tri-modal powder size distribution. In embodiments, the build material may be, or may include, nanoparticles.

The build material may be regularly or irregularly shaped, and may have different aspect ratios or the same aspect ratio. For example, the build material may take the form of small spheres or granules, or may be shaped like small rods or fibers.

In embodiments, the build material can be coated with a second material. For example and without limitation, the build material may be coated with a wax, a polymer, or another material that aids in binding the build material together (in conjunction with the binder). Alternatively or additionally, the build material may be coated with a sintering agent and/or an alloying agent to promote fusing the build material.

The binder material may comprise a material which is radiant-energy curable and which is capable of adhering or binding together the build material when the binder material is in the cured state. The term "radiant-energy curable," as used herein, refers to any material that solidifies in response to the application of radiant energy of a particular wavelength and energy. For example, the binder material may comprise a known photopolymer resin containing photoinitiator compounds functioning to trigger a polymerization reaction, causing the resin to change from a liquid state to a solid state. Alternatively, the binder material may comprise a material that contains a solvent that may be evaporated out by the application of radiant energy. The uncured binder material may be provided in solid (e.g. granular) form, liquid form including a paste or slurry, or a low viscosity solution compatible with print heads. The binder material may be selected to have the ability to out-gas or burn off during further processing, such as during sintering of the build material. In embodiments, the binder material may be as described in U.S. Patent Publication No. 2018/0071820 entitled "Reversible Binders For Use In Binder Jetting Additive Manufacturing Techniques" and assigned to General Electric Corporation, Schenectady, NY However, it should be understood that other binder materials are contemplated and possible, including combinations of various binder materials.

Referring initially to FIG. 2, at initiation of the build cycle, the control system 200 sends a control signal to the supply platform actuator 132 that actuates the supply platform actuator 132 in the upward vertical direction (i.e., in the +Z direction of the coordinate axes depicted in the figures) as indicated by arrow 316, thereby moving the supply platform 130, and the build material 400 positioned thereon, in the upward vertical direction towards the working axis 116 of the apparatus 100. The supply platform 130 is moved in the upward vertical direction by an amount sufficient to position a predetermined amount of the build material 400 in the pathway of the recoat head 140 as it traverses over the working axis 116 of the apparatus 100. Actuation of the supply platform actuator 132 occurs over a supply platform cycle time $T_{SP}$. While FIG. 2 schematically depicts an initiation of a build cycle in which binder material 500 is already present on a layer of build material 400 (such as on a previously distributed layer of build material 400), it should be understood that the initiation of the build cycle may occur without any build material 400 or binder material 500 disposed on the build platform 120.

Figure 7A:
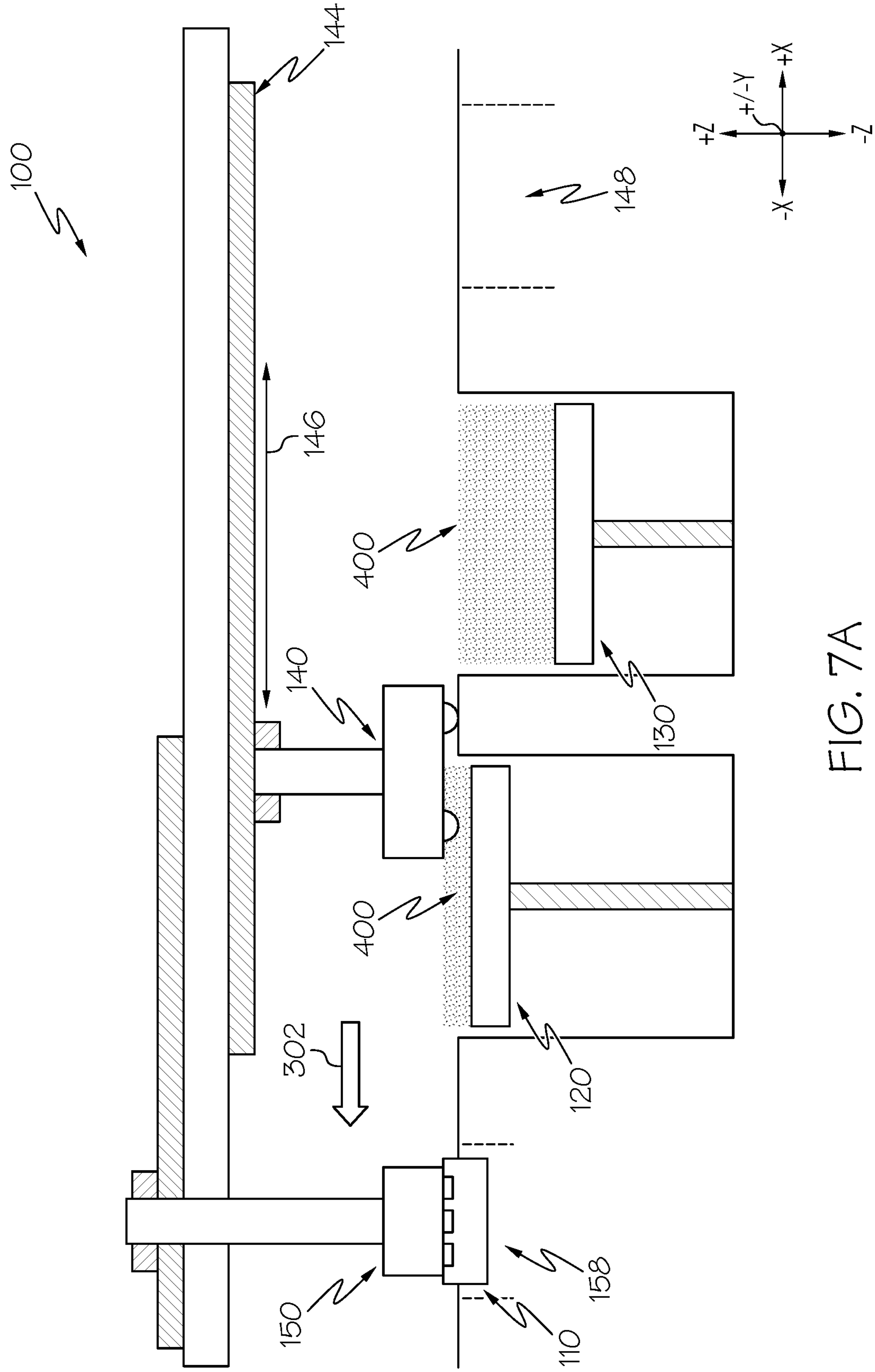
FIG. 7A schematically depicts an additive manufacturing apparatus comprising the actuator assembly of FIG. 3 in use according to one or more embodiments shown and described herein.

Referring now to FIGS. 2 and 7A, as the supply platform 130 is raised (i.e., during the platform cycle time $T_{SP}$), the control system 200 also sends a control signal to the recoat head actuator 144 causing the recoat head actuator 144 to advance the recoat head 140 from the recoat home position 148 towards the print home position 158 along the working axis 116 in a first recoat direction, as indicated by arrow 302, at a recoat advance rate. This is accomplished by actuating the recoat head actuator 144 along the recoat motion axis 146 in the −X direction of the coordinate axes depicted in the figures. The advance of the recoat head 140 is coordinated with the upward vertical motion of the supply platform 130 such that the predetermined amount of build material 400 is positioned in the pathway of the recoat head 140 prior to the recoat head 140 traversing over the supply platform 130. As the recoat head 140 traverses over the supply platform 130 towards the build platform 120, the recoat head 140 moves (i.e., distributes) build material 400 from the supply platform 130 to the build platform 120, thereby distributing a new layer of build material 400 on the build platform 120, as indicated in FIG. 7A.

In embodiments, the recoat advance rate may vary as the recoat head 140 is traversed over the working axis 116 of the apparatus 100 in the direction indicated by arrow 302. For example, the recoat advance rate may comprise an initial recoat advance rate prior to traversing over the supply platform 130 from the recoat home position 148 and a distribution advance rate as the recoat head 140 traverses over the supply platform 130 and the build platform 120. In embodiments, the recoat advance rate may be different (e.g., faster) between the supply platform 130 and the build platform 120. In embodiments, the distribution advance rate may be less than the initial recoat advance rate. This may promote uniformity in the layer of build material 400 distributed on the build platform 120 from the supply platform 130 and reduce defects in the object.

In embodiments where the recoat head 140 comprises an energy source as described herein with respect to FIGS. 5A-5C, the control system 200 may actuate the energy source as the recoat head 140 distributes the build material 400 from the supply platform 130 to the build platform 120. The energy source may, for example, heat the build material 400 as it is distributed onto the build platform 120 and/or initiate or supplement curing of binder material 500 (FIG. 2) previously deposited on a layer of build material 400 distributed on the build platform 120.

In embodiments where the recoat head 140 comprises at least one sensor as described herein with respect to FIGS. 5A-5C, the control system 200 may receive a signal from the at least one sensor indicative of a property of the build material 400 and/or the binder material 500 deposited on the build platform 120 and adjust an operation of the additive manufacturing apparatus 100 based on the signal. For example, the at least one sensor may comprise a pyrometer that detects a temperature of the binder material 500. Based on the temperature of the binder material 500, the control system 200 may actuate the energy source associated with the recoat head 140 to provide more or less energy to the binder material 500, thereby adjusting the cure rate of the binder material 500.

Figure 7B:
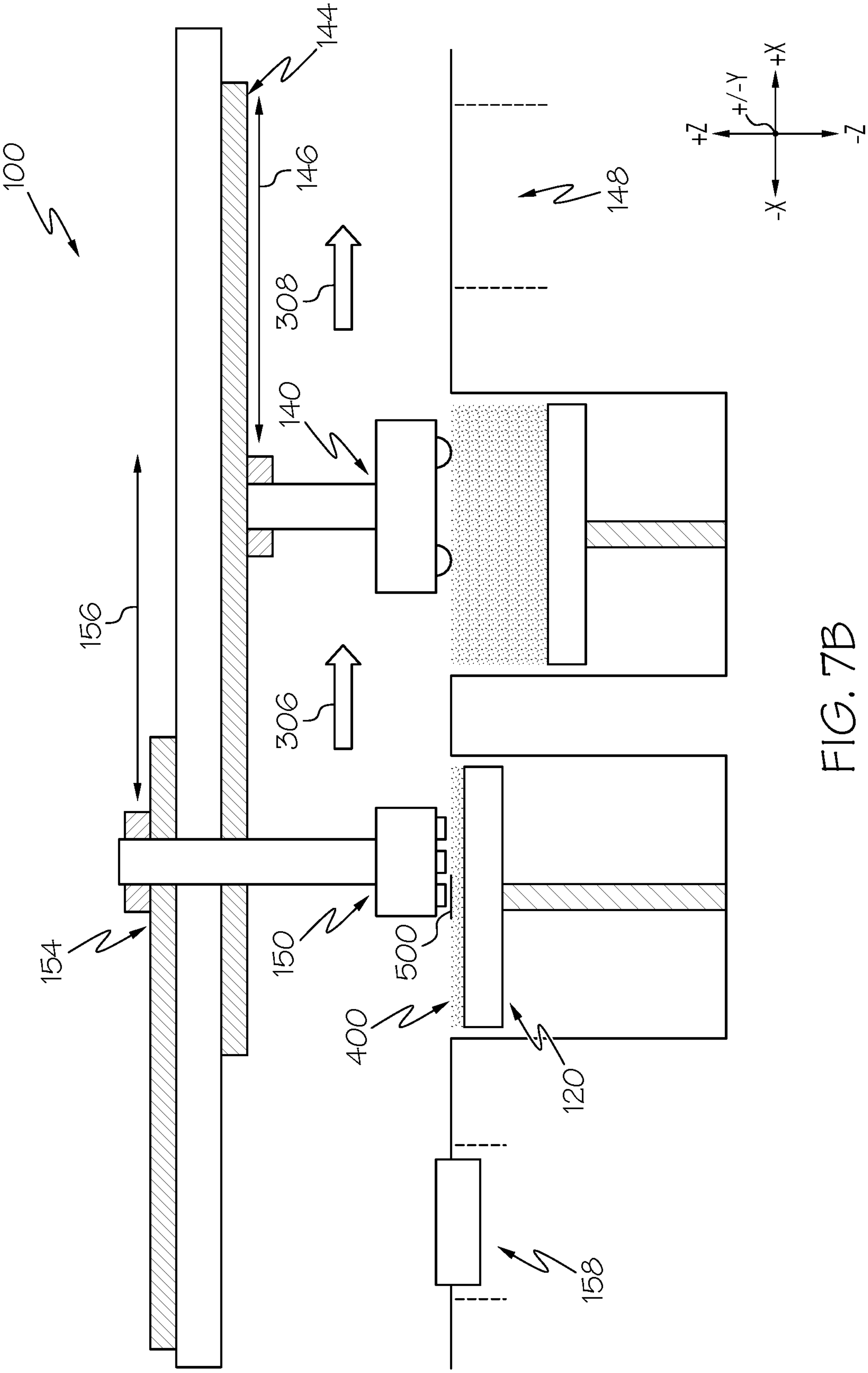
FIG. 7B schematically depicts an additive manufacturing apparatus comprising the actuator assembly of FIG. 3 in use according to one or more embodiments shown and described herein.
Figure 7C:
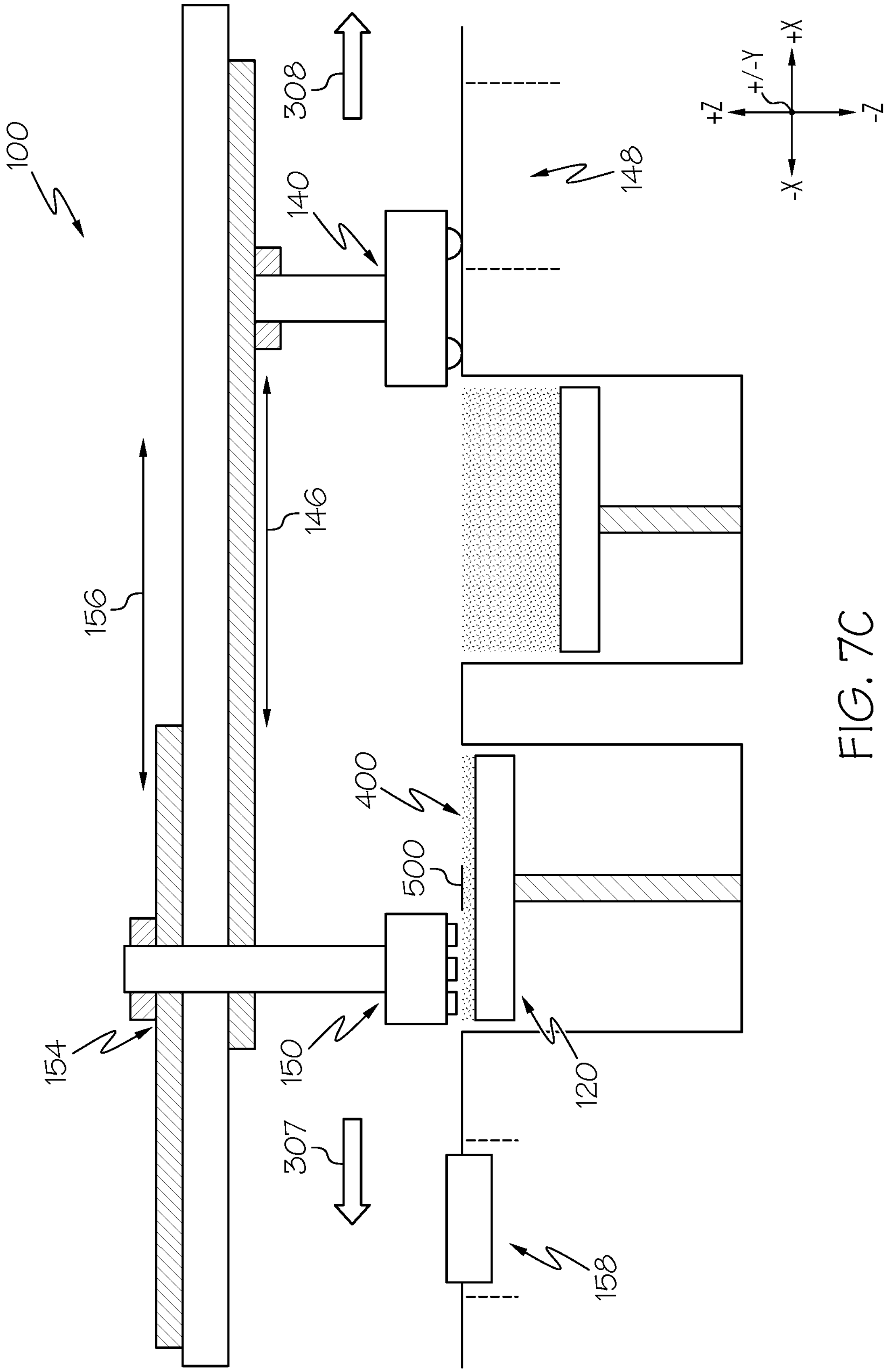
FIG. 7C schematically depicts an additive manufacturing apparatus comprising the actuator assembly of FIG. 3 in use according to one or more embodiments shown and described herein.

Referring now to FIGS. 7A-7C, after the new layer of build material 400 is distributed on the build platform 120, the control system 200 sends a control signal to the recoat head actuator 144 causing the recoat head actuator 144 to return the recoat head 140 to the recoat home position 148 along the working axis 116 (FIG. 2) in a second recoat direction opposite the first recoat direction, as indicated by arrow 308, at a recoat return rate. In embodiments, the recoat return rate may be greater than or equal to the recoat advance rate. In embodiments, the recoat return rate may be less than the recoat advance rate. In embodiments, where the recoat advance rate comprises an initial recoat advance rate and a distribution advance rate as described herein, the recoat return rate may be greater than the distribution advance rate and greater than or equal to the initial recoat advance rate. Return of the recoat head 140 to the recoat home position is accomplished by actuating the recoat head actuator 144 along the recoat motion axis 146 in the +X direction of the coordinate axes depicted in the figures.

In the embodiments described herein, the recoat head 140 and the recoat head actuator 144 have a recoat cycle time $T_{RH}$ that is the elapsed time from when the recoat head 140 leaves the recoat home position 148 to when the recoat head 140 returns to the recoat home position 148. In the embodiments described herein, the platform cycle time $T_{SP}$ occurs within the recoat cycle time $T_{RH}$.

Still referring to FIGS. 7A-7C, as the recoat head 140 is returned to the recoat home position 148 (i.e., during the recoat cycle time $T_{RH}$), the control system 200 sends a control signal to the print head actuator 154 causing the print head actuator 154 to advance the print head 150 from the print home position 158 towards the recoat home position 148 along the working axis 116 (FIG. 2) in a first print direction opposite the first recoat direction, as indicated by arrow 306 of FIG. 7B, at a print advance rate. This is accomplished by actuating the print head actuator 154 along the print motion axis 156 in the +X direction of the coordinate axes depicted in the figures. As shown in FIG. 7B, both the recoat head 140 and the print head 150 are in motion along the working axis 116 (FIG. 2) of the apparatus 100 simultaneously which is facilitated by the recoat head actuator 144 and the print head actuator 154 being arranged in a stacked configuration as described herein. The recoat head 140 and the print head 150 may be in motion simultaneously along the working axis 116 (FIG. 2) of the apparatus 100 in the same direction, as depicted in FIG. 7B, or in opposite directions, as depicted in FIG. 7C. Further, the recoat head 140 and the print head 150 may be in motion simultaneously along the working axis 116 (FIG. 2) of the apparatus 100 at different speeds or at the same speed.

In embodiments, the print advance rate may vary as the print head 150 is traversed over the working axis 116 of the apparatus 100 in the direction indicated by arrow 306. For example, the print advance rate may comprise an initial print advance rate prior to traversing over the build platform 120 from the print home position 158 and a deposition advance rate as the print head 150 traverses over the build platform 120. In embodiments, the deposition advance rate may be less than the initial print advance rate. This promotes precision in the deposition of the binder material 500 on the build platform 120.

As the print head 150 traverses over the build platform 120 in the direction indicated by arrow 306, the control system 200 sends a signal to the print head 150 causing the print head 150 to deposit a layer of binder material 500 in a predetermined pattern on the layer of build material 400 positioned on the build platform 120, as depicted in FIG. 7B. The predetermined pattern generally corresponds to a horizontal cross section of the object being built on the build platform 120. In embodiments, the print head 150 deposits the binder material 500 in a pattern corresponding to a first portion of the predetermined pattern on the layer of build material 400 positioned on the build platform 120 as the print head 150 traverses over the build platform 120 in the direction indicated by arrow 306 in FIG. 7B. In these embodiments, the print head 150 deposits binder material 500 in a pattern corresponding to a second portion of the predetermined pattern on the layer of build material 400 positioned on the build platform 120 as the print head 150 traverses over the build platform 120 in the direction indicated by arrow 307 in FIG. 7C when returning to the print home position 158. As the print head 150 deposits the binder material 500 in a pattern corresponding to the second portion of the predetermined pattern, the print head 150 may be advanced along the working axis 116 (FIG. 2) of the apparatus 100 in the direction indicated by arrow 307 at a deposition return rate. In embodiments, the deposition return rate may be equal to the deposition advance rate. As shown in FIG. 7C, the print head 150 and the recoat head 140 may be in motion simultaneously along the working axis 116 (FIG. 2) of the apparatus 100 in opposite directions, as indicated by arrows 307 and 308. In embodiments, the second portion of the predetermined pattern may overlap or at least partially overlap with the first portion of the predetermined pattern. Depositing the binder material 500 on the layer of build material 400 in two separate portions may allow the binder material 500 to more fully penetrate the layer of build material 400 between deposition steps, improving the binding action of the binder material 500 with respect to the build material 400. Additionally or alternatively, depositing the binder material 500 on the layer of build material 400 in two separate portions may prevent displacement of the build material 400 in the overlapping portions as less binder material 500 may be deposited per print operation while still achieving deposition of the same amount of binder material 500 on the build material 400 at the end of the print cycle. While deposition of the binder material 500 on the layer of build material 400 has been described herein as occurring in two separate portions, it should be understood that, in other embodiments, the deposition of the binder material 500 on the layer of build material 400 may occur in more than two separate portions, such as when the print head 150 is scanned over the build platform 120 multiple times. For example, in some embodiments the same pattern of binder material 500 may be jetted onto the build material 400 multiple times under a controlled rate to facilitate a gradual build-up of binder material 500 to account for powder wetting speeds. This may also be used to more uniformly control the time between deposition and subsequent curing along different areas of the build platform.

While the binder material 500 has been described as being deposited in two portions which at least partially overlap, it should be understood that other embodiments are contemplated and possible. For example, the binder material 500 may be deposited by the print head 150 in a single pass, such as when the binder material 500 is deposited on the layer of build material 400 as the print head 150 traverses the working axis 116 (FIG. 2) of the apparatus 100 in the direction indicated by arrow 306 of FIG. 7B or the direction indicated by arrow 307 of FIG. 7C.

Figure 7D:
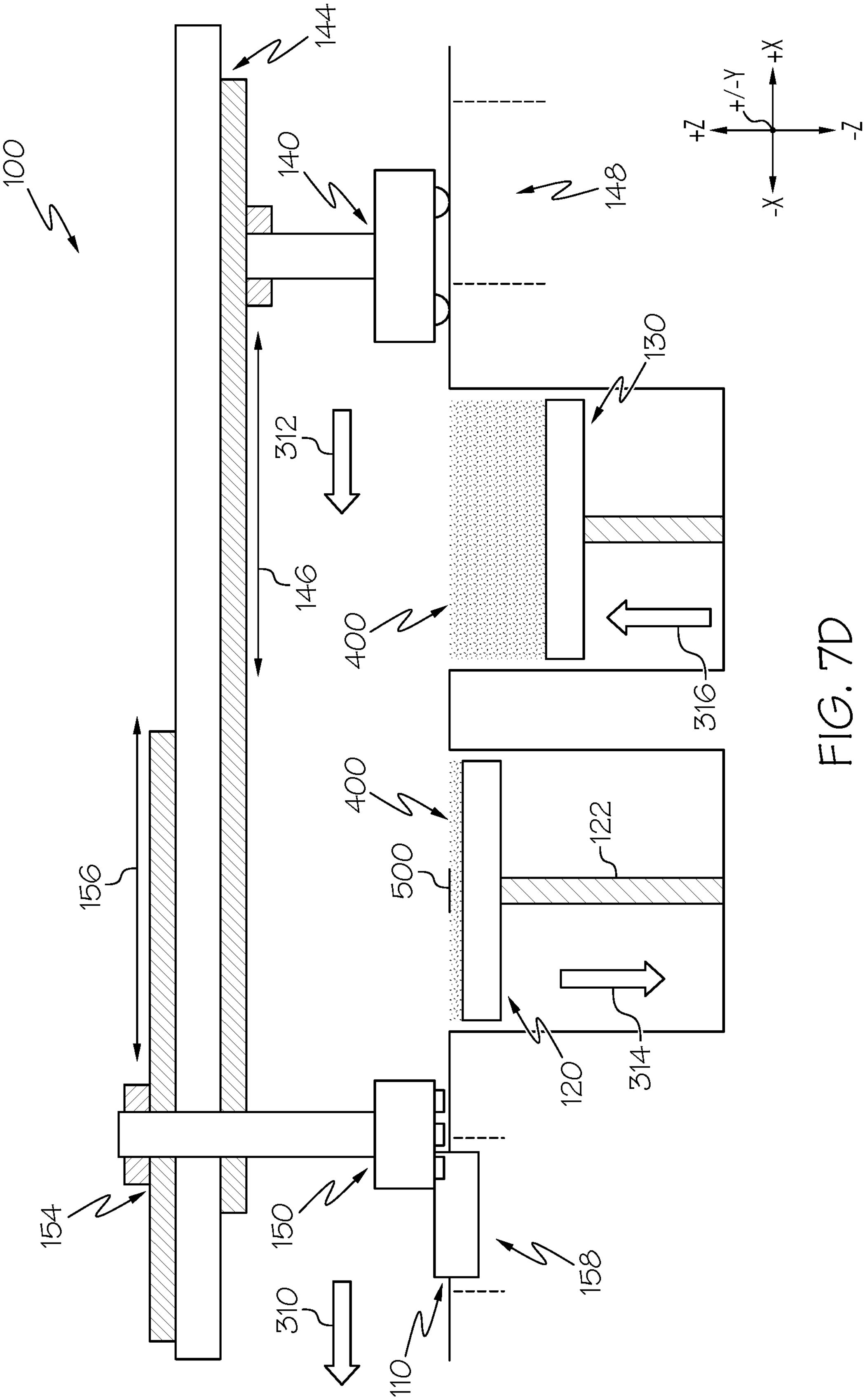
FIG. 7D schematically depicts an additive manufacturing apparatus comprising the actuator assembly of FIG. 3 in use according to one or more embodiments shown and described herein.

Referring now to FIG. 7D, after the layer of binder material 500 is deposited on the layer of build material 400 positioned on the build platform 120, the control system 200 sends a control signal to the print head actuator 154 causing the print head actuator 154 to return the print head 150 to the print home position 158 along the working axis 116 (FIG. 2) in a second print direction opposite the first print direction, as indicated by arrow 310, at a print return rate. This is accomplished by actuating the print head actuator 154 along the print motion axis 156 in the −X direction of the coordinate axes depicted in the figures. In embodiments, the print return rate is greater than the deposition return rate. In embodiments, the print return rate may be greater than the print advance rate. In embodiments, the print return rate may be less than or equal to the print advance rate.

In the embodiments described herein, the print head 150 and the print head actuator 154 have a print cycle time $T_{PH}$ that is the elapsed time from when the print head 150 leaves the print home position 158 to when the print head 150 returns to the print home position 158.

Still referring to FIG. 7D, as the print head 150 traverses away from the build platform 120 (i.e., during the print cycle time $T_{PH}$), the control system 200 sends a control signal to the build platform actuator 122 that actuates the build platform actuator 122 in the downward vertical direction (i.e., in the −Z direction of the coordinate axes depicted in FIG. 2), as indicated by arrow 314, thereby moving the build platform 120 in the downward vertical direction away from the working axis 116 of the apparatus 100. The build platform 120 is moved in the downward vertical direction by an amount sufficient to accommodate receiving a new layer of build material 400 from the supply platform 130. Actuation of the build platform actuator 122 occurs over a build platform cycle time $T_{BP}$. Accordingly, the build platform cycle time $T_{BP}$ at least partially overlaps with the print cycle time $T_{PH}$. In embodiments, the build platform cycle time $T_{BP}$ completely overlaps with the print cycle time $T_{PH}$.

Still referring to FIG. 7D, the print home position 158 is generally co-located with the cleaning station 110, as described herein. Accordingly, as the print head 150 returns to the print home position 158, cleaning and maintenance operations on the print head 150 are initiated. The cleaning and maintenance operations occur over a cleaning station cycle time $T_{CS}$. In embodiments, the cleaning station cycle time $T_{CS}$ at least partially overlaps with the print cycle time $T_{PH}$. For example, the cleaning station cycle time $T_{CS}$ may be initiated as soon as a portion of the print head 150 is positioned over the cleaning station 110. Alternatively, the cleaning station cycle time $T_{CS}$ may be initiated before a portion of the print head 150 is positioned over the cleaning station 110, such as when components of the cleaning station 110 are actuated into position prior to the arrival of the print head 150 at the print home position 158. In some embodiments, during the cleaning station cycle time $T_{CS}$, the control system 200 may send a control signal to the print head actuator 154 causing the print head actuator 154 to traverse the print head 150 over individual sections (not depicted) of the cleaning station 110 in the +/−X directions of the coordinate axes depicted in the figures to affect the cleaning and maintenance operations of the cleaning station 110.

As depicted in FIG. 7D, as the print head 150 is traversing towards the print home position 158 (i.e., during the print cycle time $T_{PH}$), the control system 200 initiates the next build cycle. Specifically, the control system 200 initiates the next build cycle by sending a control signal to the supply platform actuator 132 that actuates the supply platform actuator 132 in the upward vertical direction and by sending a control signal to the recoat head actuator 144 causing the recoat head actuator 144 to advance the recoat head 140 from the recoat home position 148 towards the print home position 158 along the working axis 116, as described hereinabove with respect to FIGS. 2 and 7A. Accordingly, at least the end of the print cycle time $T_{PH}$ may overlap with at least the beginning of the recoat cycle time $T_{RH}$. In addition, at least the end of the print cycle time $T_{PH}$ may overlap with at least the beginning of the supply platform cycle time $T_{SP}$. Further, because the next build cycle is initiated while the print head 150 is returning to the print home position 158, and because the cleaning station cycle time $T_{CS}$ at least partially overlaps with the print cycle time $T_{PH}$, the cleaning station cycle time $T_{CS}$ at least partially overlaps with the recoat cycle time $T_{RH}$. In embodiments, the cleaning station cycle time $T_{CS}$ overlaps with both the print cycle time $T_{PH}$ and the recoat cycle time $T_{RH}$. In embodiments, the entire cleaning station cycle time $T_{CS}$ overlaps with at least one of the print cycle time $T_{PH}$ and the recoat cycle time $T_{RH}$. For example, in some embodiments, at least a portion of the cleaning station cycle time $T_{CS}$ overlaps with the print cycle time $T_{PH}$ and the entire cleaning station cycle time $T_{CS}$ overlaps with the recoat cycle time $T_{RH}$.

The build platform cycle time $T_{BP}$ and supply platform cycle time $T_{SP}$ may completely overlap with the print cycle time $T_{PH}$ and/or the recoat cycle time $T_{RH}$ and, as such, the build platform cycle time $T_{BP}$ and supply platform cycle time $T_{SP}$ do not contribute to the overall build cycle time $T_{BC}$. Further, because at least portions of the cleaning station cycle time $T_{CS}$, the print cycle time $T_{PH}$, and the recoat cycle time $T_{RH}$ overlap with one another, the overall build cycle time $T_{BC}$ is less than the sum of the cleaning station cycle time $T_{CS}$, the print cycle time $T_{PH}$, and the recoat cycle time $T_{RH}$. In embodiments, the overall build cycle time $T_{BC}$ is less than the sum of the print cycle time $T_{PH}$ and the recoat cycle time $T_{RH}$, such as when at least a portion of the cleaning station cycle time $T_{CS}$ overlaps with the print cycle time $T_{PH}$ and the entire cleaning station cycle time $T_{CS}$ overlaps with the recoat cycle time $T_{RH}$.

The reduction in the duration of the overall build cycle time $T_{BC}$ to less than the sum of the individual print, recoat, and cleaning cycle times is facilitated by the stacked configuration of the actuators 144, 154 which, in turn, allows the recoat head 140 and the print head 150 to move on the working axis 116 of the additive manufacturing apparatus 100 at the same time.

Collision Avoidance

As described with respect to FIGS. 7A-7D, movements of the print head 150 and the recoat head 140 along the working axis 116 during the build cycle cause the print head 150 and the recoat head 140 to occupy the same spatial position at different temporal points within the build cycle (e.g., over the build platform 120). In at least some of these temporal points of potential overlap between the print head 150 and the recoat head 140, the print head 150 and the recoat head 140 are moving towards one another. For example, as the recoat head 140 distributes the build material 400 over the build platform 120, the recoat head 140 is moving towards the print head 150 when the print head 150 is at the print home position 158. In embodiments, after the recoat head 140 distributes the print material over the build platform 120, the recoat head 140 may be in relatively close proximity to the print home position 158 and still moving towards the print head 150. Given this, depending on the timing at which the print head 150 is advanced from the print home position 158 (e.g., to move in the direction indicated by the arrow 306 in FIG. 7B), there is a potential for a collision between the print head 150 and the recoat head 140. In other words, if the timing at which the print head 150 is advanced from the print home position 158 is too soon, the print head 150 may collide with the recoat head 140.

Accordingly, the control system 200 may generate and control the motion of the recoat head 140, the print head 150, and the process accessory 190 (when included) to maintain a minimum separation distance over the course of the build cycle. Generally, it is beneficial that the minimum separation distance be as small as possible while still ensuring that collisions between the print head 150 and the recoat head 140 are avoided over the course of the build cycle. This way, efficiency benefits of simultaneous actuation of the print head 150 and the recoat head 140 are fully realized.

Figure 7E:
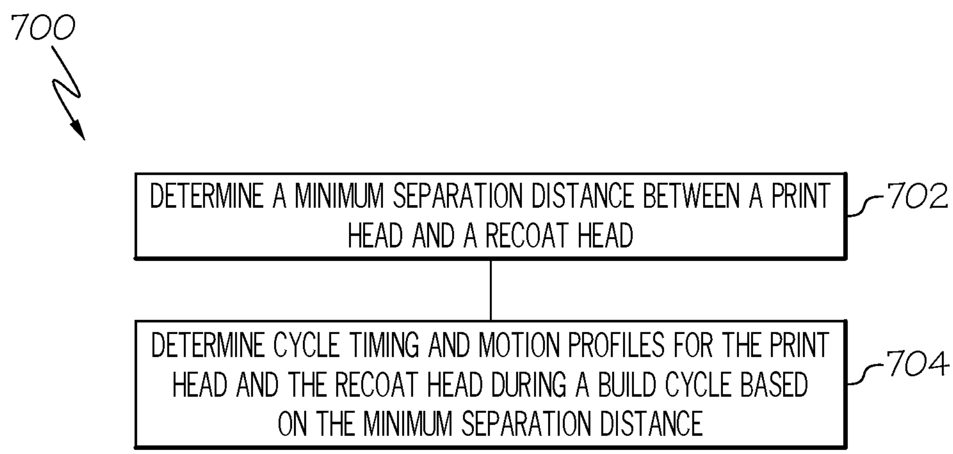
FIG. 7E depicts a flow diagram of a method of determining cycle times and motion profiles for the actuator assembly of FIG. 3 according to one or more embodiments shown and described herein.

Referring now to FIG. 7E, a flow diagram of a method 700 for determining cycle timing and motion profiles for the print head 150 and the recoat head 140 during the build cycle is shown. In embodiments, the method 700 may be performed via the control system 200 to generate executable instructions used by the control system 200 to control the print head actuator 154 and the recoat head actuator 144 during the build cycle to avoid collocating the print head 150 and the recoat head 140. In embodiments, the method 700 may be performed during a calibration process of the actuator assembly 102. The calibration process of the actuator assembly 102 may be for a particular print job (e.g., for the construction of a particular object). In embodiments, the method 700 may be performed during the execution of a build cycle to avoid collision between the print head 150 and the recoat head 140 during the build cycle.

In a step 702, a minimum separation distance between the print head 150 and the recoat head 140 is determined. In embodiments, the minimum separation distance has two separate components: a collision distance and a velocity-based component. The collision distance may correspond to position measurements of the print head 150 and the recoat head 140 (e.g., measured via linear encoders associated with the print head actuator 154 and recoat head actuator 144, respectively) when the print head 150 contacts the recoat head 140. For example, prior to the build cycle, the print head 150 may be brought into contact with the recoat head 140 and position measurements taken via the linear encoders of the print head actuator 154 and recoat head actuator 144 may be used to determine a difference between a print head position and a recoat head position when the print head 150 is brought into contact with the recoat head 140 to determine the collision distance.

In embodiments, the velocity-based component of the minimum separation distance is a single value calculated based on the velocities at which the print head 150 and the recoat head 140 travel during the build cycle. For example, in embodiments, the velocity-based component accounts for maximum process velocities of the print head 150 and the recoat head 140 during the build cycle. The maximum process velocities of the print head 150 and the recoat head 140 may be added to one another to obtain a maximum relative velocity to account for situations in which the print head 150 and the recoat head 140 are moving towards one another. Once the maximum relative velocity is determined, the velocity-based component of the minimum separation distance may be determined based on the deceleration capabilities of the print head actuator 154 and the recoat head actuator 144. For example, if the print head actuator 154 is capable of a first deceleration rate and the recoat head actuator 144 is capable of a second deceleration rate, the smaller of the first deceleration rate and the second deceleration rate may be used to compute the velocity-based component of the minimum separation distance. The velocity-based component may then be added to the collision distance to determine the minimum separation distance. Such an approach beneficially avoids collisions between the print head 150 and the recoat head 140 while requiring minimum calculation.

In embodiments, a plurality of minimum separation distances are used throughout the build cycle. For example, in embodiments, the control system 200 calculates a real-time minimum separation distance during the build cycle based on the velocities at which the print head 150 and the recoat head 140 are traveling (e.g., determined via position measurements of the linear encoders of the print head actuator 154 and the recoat head actuator 144). Such an approach beneficially enables the control system 200 to detect faults in the motion of the print head 150 and the recoat head 140 (e.g., associated with unexpectedly high velocities and accelerations). Additionally, by taking the actual velocities of the print head 150 and the recoat head 140 into account, the real-time minimum separation distance may provide for smaller minimum separation distances than the maximum velocity-based approach described herein, leading to a more efficient build cycle.

In a step 704, the control system 200 determines cycle timing and motion profiles for the print head 150 and the recoat head 140 during a build cycle based on the minimum separation distance. In embodiments, in addition to the minimum separation distance determined at the step 702, the control system 200 relies on any combination of the following parameters to pre-calculate motion profiles and cycle timing for the print head 150 and the recoat head 140: the recoat home position 148, positions of the recoat head 140 at ends of the supply platform 130, positions of the recoat head 140 at ends of the build platform 120, a velocity of the recoat head 140 over the supply platform 130, a velocity of the recoat head 140 over the build platform 120, acceleration rates of the recoat head 140, the print home position 158, the position of the print head 150 after passing over the build platform 120, a print head 150 velocity over the build platform 120, and acceleration rates of the print head 150. For example, the control system 200 may determine timings during the build cycle at which the print head 150 and/or the recoat head 140 are at various positions to maintain the minimum separation distance based on the velocities at which the print head 150 and recoat head 140 are traveling during various portions of the build cycle. In other words, the motion profiles for each of the print head 150 and the recoat head 140 are calculated such that the print head 150 is never closer to the recoat head 140 than the minimum separation distance to ensure collision avoidance.

Figure 7F:
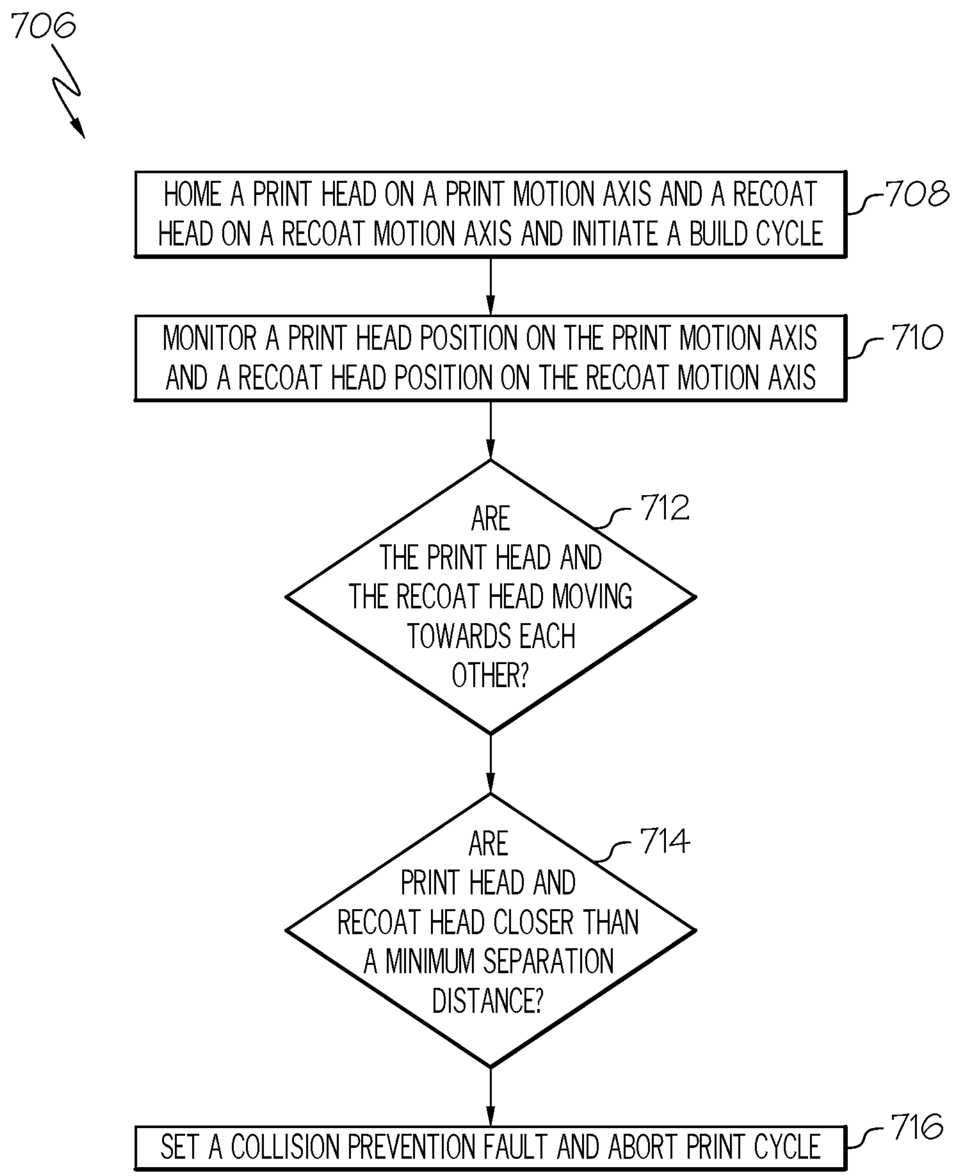
FIG. 7F depicts a flow diagram of setting a collision prevention fault for the actuator assembly of FIG. 3 according to one or more embodiments described herein.

Referring now to FIG. 7F, a flow diagram of a collision avoidance method 706 is depicted. In embodiments, the control system 200 may perform the collision avoidance method 706 during a build cycle to ensure that the print head 150 does not collide with the recoat head 140 as the print head 150 and the recoat head 140 move along the working axis 116. While the collision avoidance method 706 is described as being performed via the various components of the actuator assembly 102, it should be understood that any other actuator assembly may use a method similar to the collision avoidance method 706 consistent with the present disclosure.

In a step 708, the print head 150 is homed on the print motion axis 156 and the recoat head 140 is homed on the recoat motion axis 146. For example, after the additive manufacturing apparatus 100 is powered on and a build job is initiated, the control system 200 may provide homing control signals to the print head actuator 154 and the recoat head actuator 144 to cause the print head 150 to travel to the print home position 158 and the recoat head 140 to travel to the recoat home position 148. In embodiments, once the print head 150 and the recoat head 140 are homed, the control system 200 normalizes position measurements taken by linear encoders of the print head actuator 154 and the recoat head actuator 144 to set motion profiles for the print head 150 and the recoat head 140 (e.g., the motion profiles determined via the control system 200 during the method 700 described herein). After the encoder measurements are normalized, the control system 200 may initiate a build cycle.

In a step 710, during the print cycle (e.g., during motion of the print head 150 and the recoat head 140), the control system 200 continuously monitors positions of the print head 150 and the recoat head 140. For example, in embodiments, the control system 200 monitors the positions of the print head 150 and the recoat head 140 via the linear encoders of the print head actuator 154 and the recoat head actuator 144. In embodiments, the actuator assembly 102 may include additional location detectors (e.g., proximity sensors) through which the control system 200 monitors the positions of the print head 150 and the recoat head 140. Using the real-time positioning of the print head 150 and the recoat head 140, during a step 712, the control system 200 determines whether the print head 150 and the recoat head 140 are travelling towards one another creating a risk of a collision. If the print head 150 and the recoat head 140 are travelling towards one another, in a step 714, the control system 200 determines if the print head 150 and the recoat head 140 are closer than a minimum separation distance (e.g., the minimum separation distance calculated via performance of the method 700 described herein). If the print head 150 and the recoat head 140 are closer than the minimum separation distance, in a step 716, the control system 200 sets a collision prevention fault and aborts the build cycle. For example, if the print head 150 and the recoat head 140 are closer than the minimum separation distance, the control system 200 may provide abort signals to the print head actuator 154 and the recoat head actuator 144 to cause the print head 150 and the recoat head 160 to return to the print home position 158 and the recoat home position 148, respectively.

In embodiments, in addition to continuously monitoring the positioning of the print head 150 and the recoat head 140 during the build cycle via the linear encoders of the print head actuator 154 and the recoat head actuator 144, the relative position of the print head 150 and the recoat head 140 may also be monitored via a working axis proximity sensor (not depicted). For example, various embodiments may incorporate a capacitive proximity sensor, a photoelectric sensor, an inductive proximity sensor, or the like coupled to at least one of the print head 150 and the recoat head 140. In embodiments, the working axis proximity sensor is used as a final collision prevention check (e.g., in addition to the real-time positions determined via the linear encoders of the print head actuator 154 and the recoat head actuator 144). For example, if the working axis proximity sensor generates a signal provided to the control system 200 that indicates that the print head 150 and the recoat head are separated by less than the minimum separation distance, the control system 200 may set a collision prevention fault. Thus, the working axis proximity sensor may serve as a final system check to avoid collisions.

Based on the foregoing, it should be understood that the actuator assemblies for additive manufacturing apparatuses described herein may be implemented to reduce the overall build cycle time of an additive manufacturing apparatus, thereby improving the manufacturing through-put of the additive manufacturing apparatus. In particular, the actuator assemblies include individual actuators, such as print head actuators and recoat head actuators, which are arranged in a stacked configuration. This allows the print head and the recoat head operatively associated with each actuator to move along the working axis of the additive manufacturing apparatus at the same time, in the same or different directions at the same or different speeds, which, in turn, allows the individual cycle times associated with each of the print head and the recoat head to overlap while maintaining the print quality, thereby reducing the overall build cycle time of the additive manufacturing apparatus to less than the sum of the individual cycle times.

While FIGS. 2 and 7A-7D depict an additive manufacturing apparatus 100 comprising a supply receptacle 134 used in conjunction with the recoat head 140 of the actuator assembly 102 to supply build material 400 to the build platform 120 of the build receptacle 124, it should be understood that other embodiments are contemplated and possible.

Figure 8:
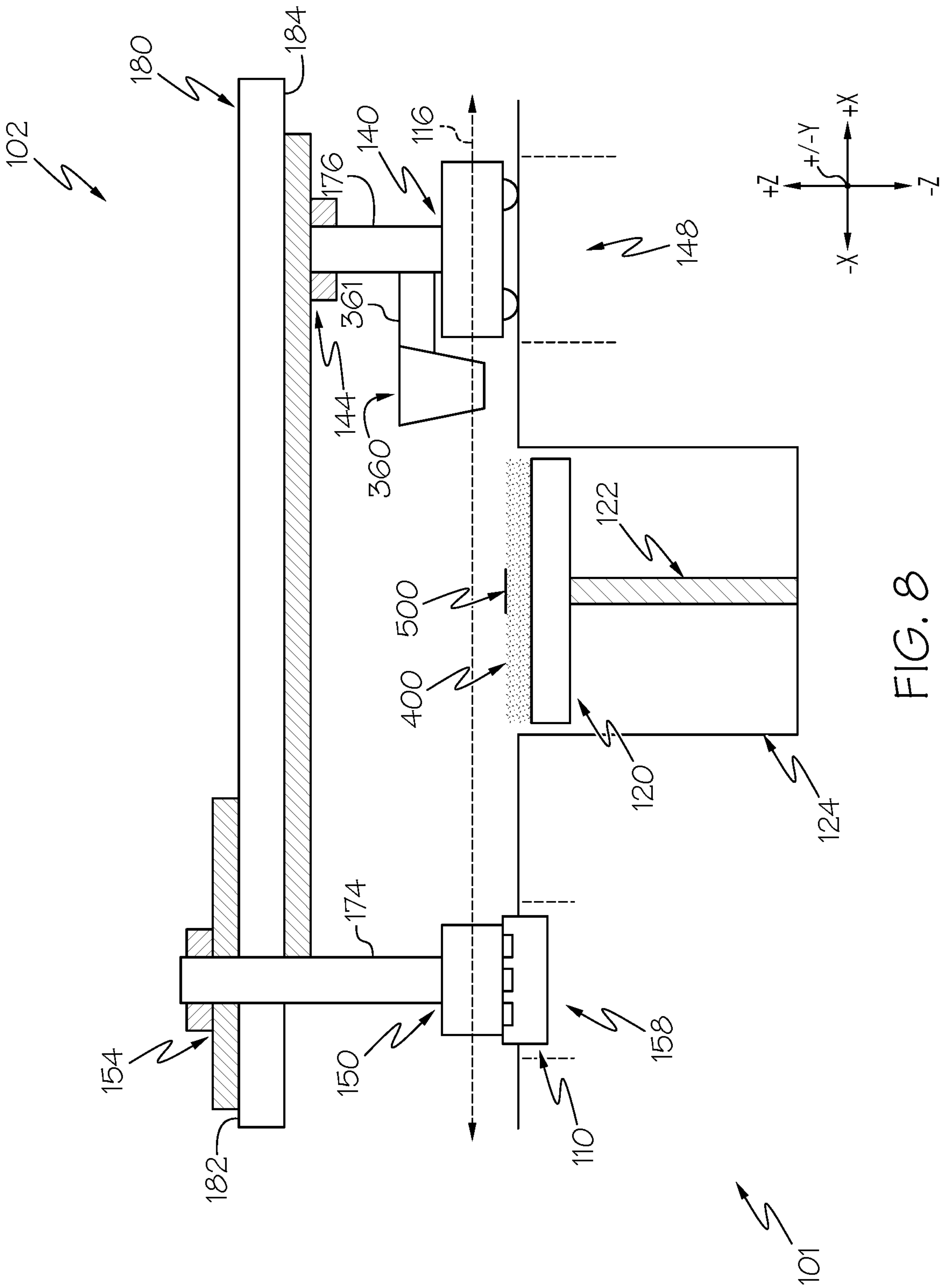
FIG. 8 schematically depicts an additive manufacturing apparatus comprising the actuator assembly of FIG. 3 and further comprising a build material hopper coupled to the recoat head according to one or more embodiments shown and described herein.

Referring to FIG. 8 by way of example, an alternative embodiment of an additive manufacturing apparatus 101 is schematically depicted. In this embodiment, the additive manufacturing apparatus 101 comprises a cleaning station 110, a build platform 120, and an actuator assembly 102, as described herein with respect to FIG. 2. However, in this embodiment, the apparatus 101 does not include a supply receptacle. Instead, the apparatus 101 comprises a build material hopper 360 that is used to supply build material 400 to the build platform 120 of the build receptacle 124. In this embodiment, the build material hopper 360 is coupled to the recoat head actuator 144 such that the build material hopper 360 traverses the working axis 116 of the apparatus 101 with the recoat head 140. In the embodiment depicted in FIG. 8, the build material hopper 360 is coupled to the support bracket 176 with, for example, bracket 361. However, it should be understood that the build material hopper 360 may be directly coupled to the support bracket 176 without an intermediate bracket. Alternatively, the build material hopper 360 may be coupled to the recoat head 140 either directly or with an intermediate bracket. While FIG. 8 schematically depicts the build material hopper 360 as being external to the recoat head 140, it should be understood that other embodiments are contemplated and possible, such as embodiments where the recoat head is internal to the recoat head 140.

The build material hopper 360 may include an electrically actuated valve (not depicted) to release build material 400 onto the build platform 120 as the build material hopper 360 traverses over the build platform 120. In embodiments, the valve may be communicatively coupled to the control system 200 (FIG. 6) which executes computer readable and executable instructions to open and close the valve based on the location of the build material hopper 360 with respect to the build platform 120. The build material 400 released onto the build platform 120 is then distributed over the build platform 120 with the recoat head 140 as the recoat head 140 traverses over the build platform 120.

The embodiment of the additive manufacturing apparatus 101 depicted in FIG. 8 may be utilized to build an object on the build platform 120 in a similar manner as described herein with respect to FIGS. 2 and 7A-7D. However, with this embodiment of the additive manufacturing apparatus 101, the build material 400 is delivered to the build platform 120 with the build material hopper 360 as described herein, instead of by actuation of a supply platform.

Figure 9:
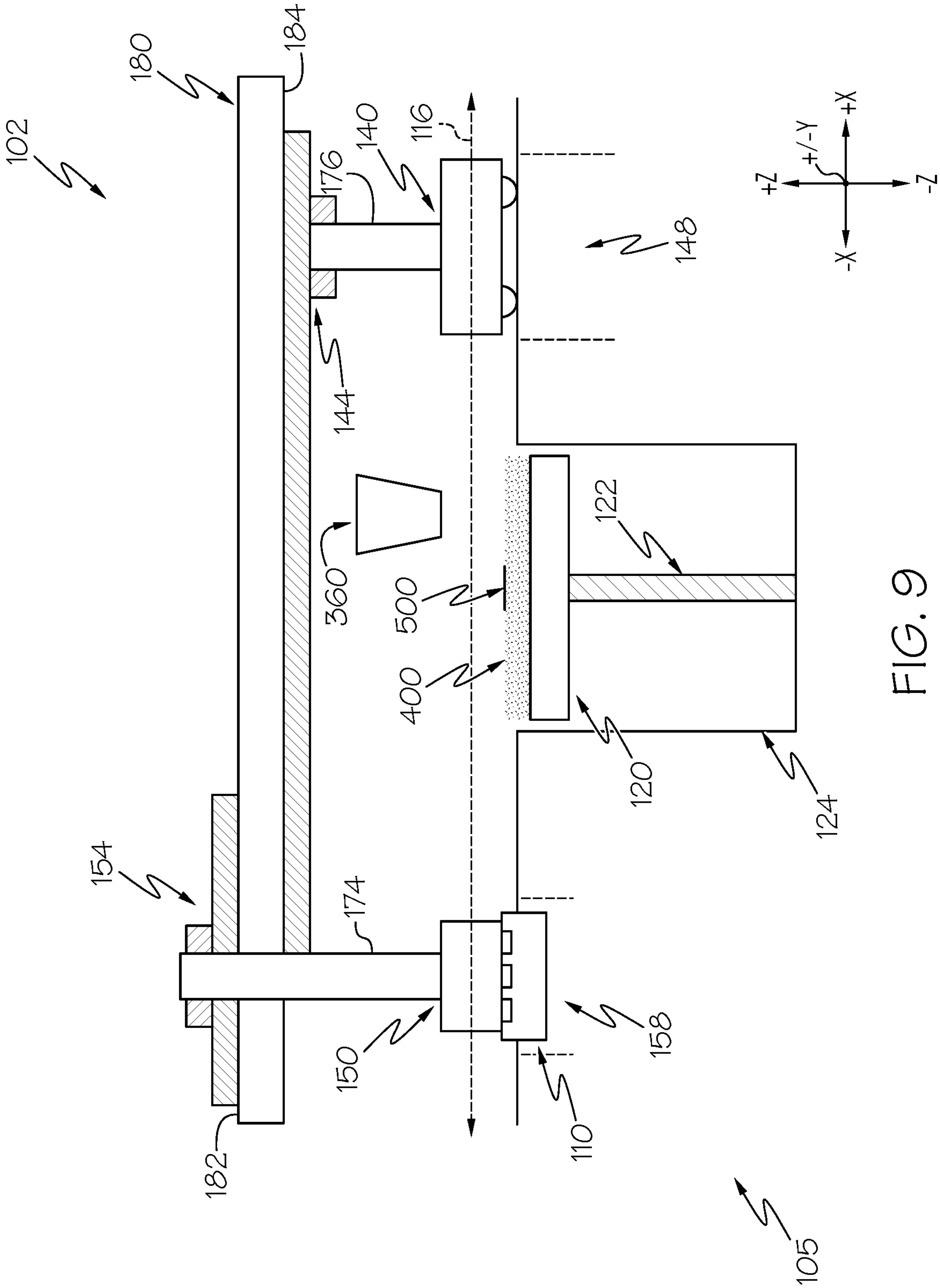
FIG. 9 schematically depicts an additive manufacturing apparatus comprising the actuator assembly of FIG. 3 and further comprising a build material hopper in fixed position according to one or more embodiments shown and described herein.

Another alternative embodiment of an additive manufacturing apparatus 105 is schematically depicted in FIG. 9. In this embodiment, the additive manufacturing apparatus 105 comprises a cleaning station 110, a build platform 120, and an actuator assembly 102, as described herein with respect to FIG. 2. However, in this embodiment, the apparatus 105 does not include a supply receptacle. Instead, the apparatus 105 comprises a build material hopper 360 that is used to supply build material 400 to the build platform 120 of the build receptacle 124. In this embodiment, the build material hopper 360 is fixed over the build platform 120 such that the build material hopper 360 is able to release build material 400 onto the build platform 120. For example, the build material hopper 360 may be coupled to the rail 180 of the actuator assembly 102 either directly, or with a bracket (not depicted). However, it should be understood that the build material hopper 360 may be fixedly coupled to another structural member or support so long as the build material hopper 360 is oriented and arranged to deliver build material 400 to the build platform 120.

In this embodiment, the build material hopper 360 may include an electrically actuated valve (not depicted) to release build material 400 onto the build platform 120. In embodiments, the valve may be communicatively coupled to the control system 200 (FIG. 6) which executes computer readable and executable instructions to open and close the valve at the desired time. In embodiments, opening and closing the valve of the build material hopper 360 may be synchronized with actuation of the build platform actuator 122 and/or actuation of the recoat head actuator 144. The build material 400 released onto the build platform 120 is distributed over the build platform 120 with the recoat head 140 as the recoat head 140 traverses over the build platform 120.

While FIG. 9 depicts the build material hopper 360 as being in a fixed position, it should be understood that other embodiments are contemplated and possible. For example the build material hopper 360 may be coupled to an actuator to facilitate moving the build material hopper in one or more of the +/−X, +/−Y, and/or +/−Z directions. In embodiments the actuator may be, for example, the process accessory actuator depicted in FIG. 4A. This allows for the build material hopper 360 to have independent speed control (e.g., apart from the recoat head and/or print head). In embodiments where the build material hopper 360 is coupled to an actuator, the build material may have a home position where the build material hopper 360 is not positioned over the build platform. In these embodiments, the build material hopper 360 may be actuated over the build platform to facilitate distributing the build material onto the build platform.

The embodiment of the additive manufacturing apparatus 105 depicted in FIG. 8 may be utilized to build an object on the build platform 120 in a similar manner as described herein with respect to FIGS. 2 and 7A-7D. However, with this embodiment of the additive manufacturing apparatus 105, the build material 400 is delivered to the build platform 120 with the build material hopper 360 as described herein, instead of by actuation of a supply platform.

While FIGS. 2 and 7A-7D depict an additive manufacturing apparatus 100 comprising actuator assemblies as depicted in FIGS. 2-4B, it should be understood that other configurations of actuator assemblies are contemplated and possible.

Figure 10A:
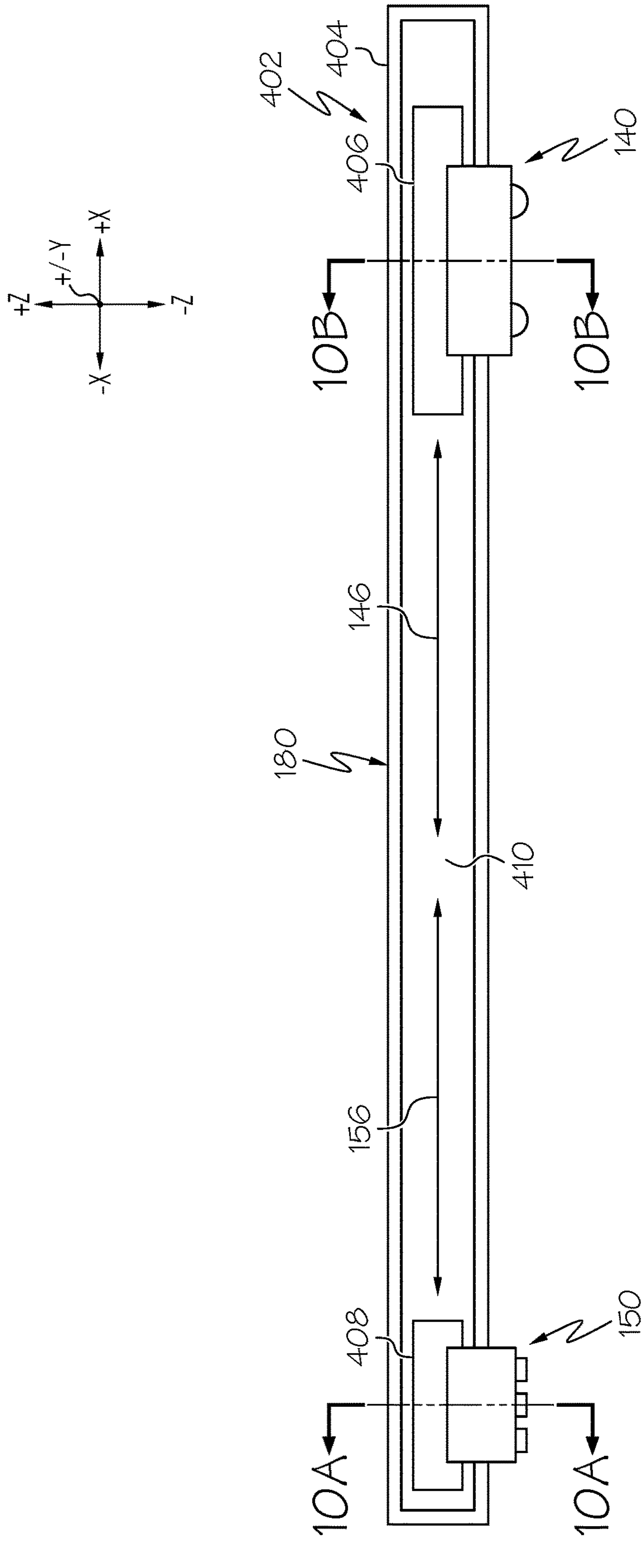
FIG. 10A schematically depicts another embodiment of an actuator assembly for an additive manufacturing apparatus according to one or more embodiments shown and described herein.
Figure 10B:
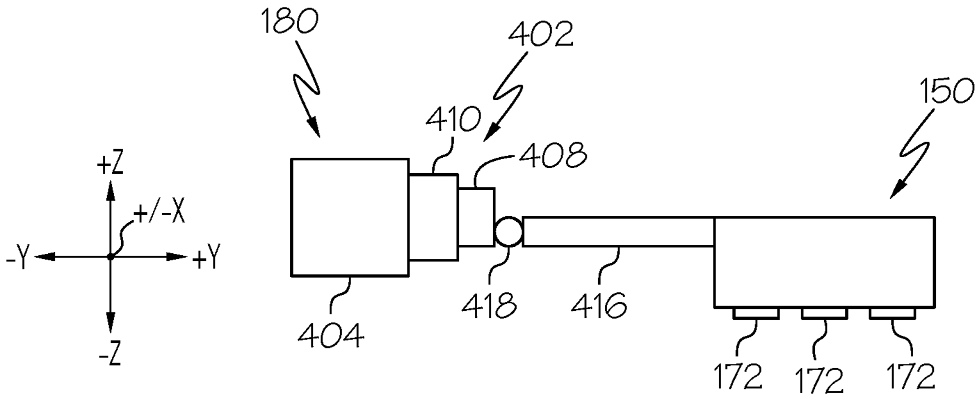
FIG. 10B schematically depicts a cross section of the actuator assembly of FIG. 10A.
Figure 10C:
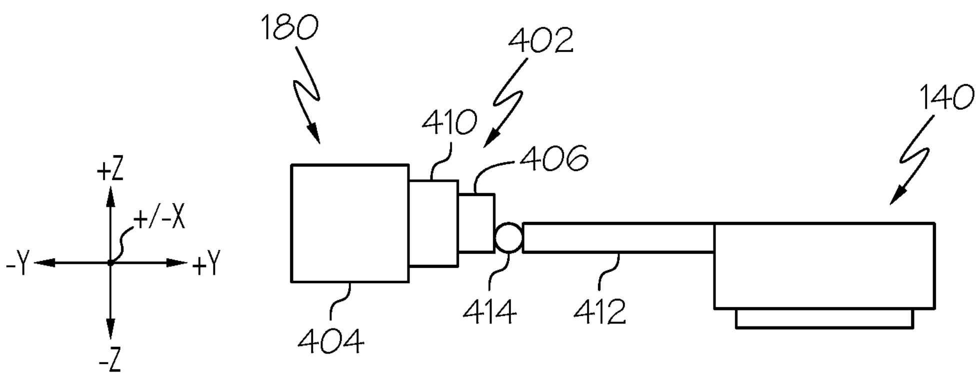
FIG. 10C schematically depicts a cross section of the actuator assembly of FIG. 10A.

Referring to FIGS. 10A-10C by way of example, FIG. 10A schematically depicts an alternative embodiment of an actuator assembly 402, FIG. 10B depicts a cross section of the actuator assembly 402 of FIG. 10A along line 10A, and FIG. 10C depicts a cross section of the actuator assembly 402 along line 10B. The actuator assembly 402 generally comprises a recoat head 140 and a print head 150 as described hereinabove with respect to the actuator assembly 102 depicted in FIG. 3. The recoat head 140 and the print head 150 may be as described herein with respect to FIGS. 2-3 and 5A-5C. The actuator assembly 402 also comprises a recoat head actuator 406 and a print head actuator 408. The actuator assembly 402 further comprises a support 404 that extends in a horizontal direction (i.e., a direction parallel to the +/−X direction of the coordinate axes depicted in the figures) parallel to the working axis 116 (FIG. 2) of the additive manufacturing apparatus, such as the additive manufacturing apparatuses 100, 101 depicted in FIGS. 2, 8, and 9, for example. In one embodiment, the support 404 is a side of a rail 180 that extends in a horizontal direction. For example, in one embodiment, the rail 180 may be rectangular or square in vertical cross section (i.e., a cross section in the Y-Z plane of the coordinate axes depicted in the figures) with a side surface of the rectangle or square forming the support 404. However, it should be understood that other embodiments are contemplated and possible. For example and without limitation, the rail 180 may have other cross sectional shapes, such as octagonal or the like, with the support 404 being one surface of facet of the rail 180. In embodiments, the support 404 is positioned in a vertical plane (e.g., a plane parallel to the X-Z plane of the coordinate axes depicted in the figures). However, it should be understood that, in other embodiments, the support 404 is positioned in a plane other than a vertical plane.

In the embodiments described herein, the recoat head actuator 406 and the print head actuator 408 are coupled to the support 404. The recoat head actuator 144 is bi-directionally actuatable along a recoat motion axis 146 and the print head actuator 154 is bi-directionally actuatable along a print motion axis 156. That is, the recoat motion axis 146 and the print motion axis 156 define the axes along which the recoat head actuator 144 and the print head actuator 154 are actuatable, respectively. In embodiments, the recoat head actuator 144 and the print head actuator 154 are bi-directionally actuatable independent of one another. The recoat motion axis 146 and the print motion axis 156 extend in a horizontal direction and are parallel with the working axis 116 (FIG. 2) of the apparatus 100. In the embodiments described herein, the recoat motion axis 146 and the print motion axis 156 are co-linear. With this configuration, the recoat head 140 and the print head 150 may occupy the same space (or portions of the same space) along the working axis 116 of the apparatus 100 at different times because the recoat motion axis 146 and the print motion axis 156 lie along the same line. In the embodiment of the actuator assembly 402 depicted in FIGS. 10A-10C, the recoat motion axis 146 and the print motion axis 156 are located in the same vertical plane. In embodiments where the support 404 is positioned in a vertical plane, the recoat motion axis 146 and the print motion axis 156 are located a vertical plane that is parallel to the vertical plane of the support 404, as depicted in FIGS. 10A-10C. However, it should be understood that other embodiments are contemplated and possible, such as embodiments in which the recoat motion axis 146 and the print motion axis 156 are located in a vertical plane that is non-parallel with the plane of the support 404.

In the embodiments described herein, the recoat head actuator 144 and the print head actuator 154 may be, for example and without limitation, mechanical actuators, electro-mechanical actuators, pneumatic actuators, hydraulic actuators, or any other actuator suitable for providing linear motion. Suitable actuators may include, without limitation, worm drive actuators, ball screw actuators, pneumatic pistons, hydraulic pistons, electro-mechanical linear actuators, or the like. In embodiments, the recoat head actuator 144 and the print head actuator 154 are linear actuators similar to the PRO225LM Mechanical Bearing, Linear Motor Stage manufactured by Aerotech® Inc. of Pittsburgh, Pennsylvania. Alternatively, the recoat head actuator 144 and the print head actuator 154 may be linear actuators such as the Yamaha MF75D Linear Motor Single Axis Robot.

For example, the actuator assembly 402 may comprise a guide 410 affixed to the support 404 of the rail 180. The recoat head actuator 144 and the print head actuator 154 may be moveably coupled to the rail 180 such that the recoat head actuator 144 and the print head actuator 154 can independently traverse a length of the guide 410. In embodiments, the motive force traversing the recoat head actuator 144 and the print head actuator 154 is supplied by direct-drive linear motors, such as brushless servomotors, for example.

In embodiments, the recoat head actuator 144, the print head actuator 154, and the guide 410 may be a cohesive sub-system that is affixed to the rail 180, such as when the guide 410, the recoat head actuator 144 and the print head actuator 154 are similar to the PRO225LM Mechanical Bearing, Linear Motor Stage or the Yamaha MF75D Linear Motor Single Axis Robot, for example. However, it should be understood that other embodiments are contemplated and possible, such as embodiments where the recoat head actuator 144 and the print head actuator 154 comprise multiple components that are individually assembled onto the rail 180 to form the recoat head actuator 144 and the print head actuator 154, respectively.

Still referring to FIGS. 10A-10C, the recoat head 140 is coupled to the recoat head actuator 144 such that the recoat head 140 is situated proximate the working axis 116 (FIG. 2) of the additive manufacturing apparatus 100. Thus, bi-directional actuation of the recoat head actuator 144 along the recoat motion axis 146 affects bi-directional motion of the recoat head 140 on the working axis 116 of the additive manufacturing apparatus 100. In the embodiment of the actuator assembly 402 depicted in FIGS. 10A-10C, the recoat head 140 is coupled to the recoat head actuator 144 with strut 412 such that the recoat head 140 is cantilevered from the support 404 and positioned on the working axis 116 (FIG. 2) of the additive manufacturing apparatus 100. Cantilevering the recoat head 140 from the support 404 allows the recoat head actuator 144 and the guide 410 to be spaced apart from, for example, the build platform 120 of the additive manufacturing apparatus 100 thereby reducing the likelihood that the recoat head actuator 144, the guide 410, and associate electrical components will be fouled or otherwise contaminated with build material 400. This increases the maintenance interval for the recoat head actuator, increases the service life of the recoat head actuator, reduces machine downtime, and reduces build errors due to fouling of the recoat head actuator 144. In addition, spacing the recoat head actuator 144 apart from the build platform 120 of the apparatus 100 allows for improved visual and physical access to the build platform 120 and the supply platform 130, improving the ease of maintenance and allowing for better visual observation (from human observation, camera systems, or the like) of the additive manufacturing process.

In some embodiments described herein, the recoat head 140 may be fixed in directions orthogonal to the recoat motion axis 146 and the working axis 116 (i.e., fixed along the +/−Z axis and/or fixed along the +/−Y axis). In embodiments where the recoat head 140 is cantilevered from the support 404, the recoat head 140 may be optionally coupled to an overhead support rail 470 with a sliding linkage 472 that vertically supports at least a portion of the recoat head 140 in the vertical direction, as depicted in FIG. 10C. The sliding linkage 472 may be slidably displaced along the overhead support rail 470 in the +/−X directions of the coordinate axes depicted in the figures to accommodate motion of the recoat head 140 in the same direction.

In embodiments, the recoat head 140 may be pivotally coupled to the recoat head actuator 144. For example and without limitation, in the embodiment of the actuator assembly 402 depicted in FIGS. 10A-10C, the strut 412 is coupled to the recoat head 140 and pivotally coupled to the recoat head actuator 406 at pivot point 414. This allows the recoat head 140 to be pivoted with respect to the recoat head actuator 406 away from the working axis 116 (FIG. 2) of the apparatus 100 to facilitate, for example, maintenance or removal of components of the apparatus positioned below the recoat head 140 (e.g., the build receptacle, supply receptacle, or the like). In embodiments, the pivot point 414 may include an actuator, such as a motor or the like, to facilitate automated pivoting of the recoat head 140. In embodiments, a separate actuator (not depicted) may be provided between the recoat head 140 and the recoat head actuator 144 to facilitate automated pivoting of the recoat head 140. While FIG. 10C depicts the pivot point 414 positioned between the strut 412 and the recoat head actuator 406, it should be understood that other embodiments are contemplated and possible, such as embodiments where the pivot point 414 is positioned between the strut 412 and the recoat head 140.

Still referring to FIGS. 10A-10C, the print head 150 is coupled to the print head actuator 154 such that the print head 150 is situated proximate the working axis 116 (FIG. 2) of the additive manufacturing apparatus 100. Thus, bi-directional actuation of the print head actuator 154 along the print motion axis 156 affects bi-directional motion of the print head 150 on the working axis 116 of the additive manufacturing apparatus 100. In the embodiment of the actuator assembly 402 depicted in FIGS. 10A-10C, the print head 150 is coupled to the print head actuator 154 with strut 416 such that the print head 150 is cantilevered from the support 404 and positioned on the working axis 116 (FIG. 2) of the additive manufacturing apparatus 100. Cantilevering the print head 150 from the support 404 allows the print head actuator 154 and the guide 410 to be spaced apart from, for example, the build platform 120 of the additive manufacturing apparatus 100 thereby reducing the likelihood that the print head actuator 154, the guide 410, and associate electrical components will be fouled or otherwise contaminated with build material 400. This increases the maintenance interval for the print head actuator, increases the service life of the print head actuator, reduces machine downtime, and reduces build errors due to fouling of the print head actuator 154. In addition, spacing the print head actuator 154 apart from the build platform 120 of the apparatus 100 allows for improved visual and physical access to the build platform 120 and the supply platform 130, improving the ease of maintenance and allowing for better visual observation (from human observation, camera systems, or the like) of the additive manufacturing process. In some embodiments described herein, the print head 150 may be fixed in directions orthogonal to the recoat motion axis 146 and the working axis 116 (i.e., fixed along the +/−Z axis and/or fixed along the +/−Y axis). In embodiments where the print head 150 is cantilevered from the support 404, the print head 150 may be optionally coupled to an overhead support rail 470 with a sliding linkage 474 that vertically supports at least a portion of the print head 150 in the vertical direction, as depicted in FIG. 10B. The sliding linkage 474 may be slidably displaced along the overhead support rail 470 in the +/−X directions of the coordinate axes depicted in the figures to accommodate motion of the print head 150 in the same direction.

In embodiments, the print head 150 may be pivotally coupled to the print head actuator 154. For example and without limitation, in the embodiment of the actuator assembly 402 depicted in FIGS. 10A-10C, the strut 416 is coupled to the print head 150 and pivotally coupled to the print head actuator 408 at pivot point 418. This allows the print head 150 to be pivoted with respect to the print head actuator 408 away from the working axis 116 (FIG. 2) of the apparatus 100 to facilitate, for example, maintenance or removal of components of the apparatus positioned below the print head 150 (e.g., the build receptacle, supply receptacle, or the like). In embodiments, the pivot point 418 may include an actuator, such as a motor or the like, to facilitate automated pivoting of the print head 150. In embodiments, a separate actuator (not depicted) may be provided between the print head 150 and the print head actuator 154 to facilitate automated pivoting of the print head 150. While FIG. 10B depicts the pivot point 418 positioned between the strut 416 and the print head actuator 408, it should be understood that other embodiments are contemplated and possible, such as embodiments where the pivot point 418 is positioned between the strut 416 and the print head 150.

As noted above, in embodiments described herein the recoat head 140 and the print head 150 are both located on the working axis 116 of the apparatus 100. As such, the movements of the recoat head 140 and the print head 150 on the working axis 116 occur along the same axis and are thus co-linear. With this configuration, the recoat head 140 and the print head 150 may occupy the same space (or portions of the same space) along the working axis 116 of the apparatus 100 at different times during a single build cycle. The recoat head 140 and the print head 150 may be moved along the working axis 116 of the apparatus 100 simultaneously in a coordinated fashion, in the same direction and/or in opposing directions, at the same speeds or different speeds. This, in turn, allows for individual steps of the additive manufacturing process, such as the distributing step (also referred to herein as the recoating step), the depositing step (also referred to herein as the printing step), the curing (or heating) step, and/or the cleaning step to be performed with overlapping cycle times. For example, the distributing step may be initiated while the cleaning step is being completed; the depositing step may be initiated while the distributing step in completed; and/or the cleaning step may be initiated while the distributing step is being completed. This may reduce the overall cycle time of the additive manufacturing apparatus 100 to less than the sum of the distributing cycle time (also referred to herein as the recoat cycle time), the depositing cycle time (also referred to herein as the print cycle time), and/or the cleaning cycle time.

While FIGS. 10A-10C schematically depict the recoat head 140, the print head 150, and associated actuators 406, 408 coupled to a single support 404, it should be understood that other embodiments are contemplated and possible. For example, the recoat head 140 and the associated recoat head actuator 406 may be coupled to a first support while the print head 150 and print head actuator 408 may be coupled to a second, separate support that is oriented in parallel to the first support.

The embodiment of the actuator assembly 402 depicted in FIGS. 10A-10C may be implemented in the embodiments of the additive manufacturing apparatuses 100, 101 depicted in FIGS. 2, 8, and 9, for example, as an alternative to the actuator assembly 102. As such, it should be understood that the embodiment of the actuator assembly 402 depicted in FIGS. 10A-10C may be utilized to build an object on the build platform 120 in a similar manner as described herein with respect to FIGS. 2 and 7A-7D.

Various configurations of additive manufacturing apparatuses with actuator assemblies are described below with specific reference to FIGS. 11-15.

Figure 11:
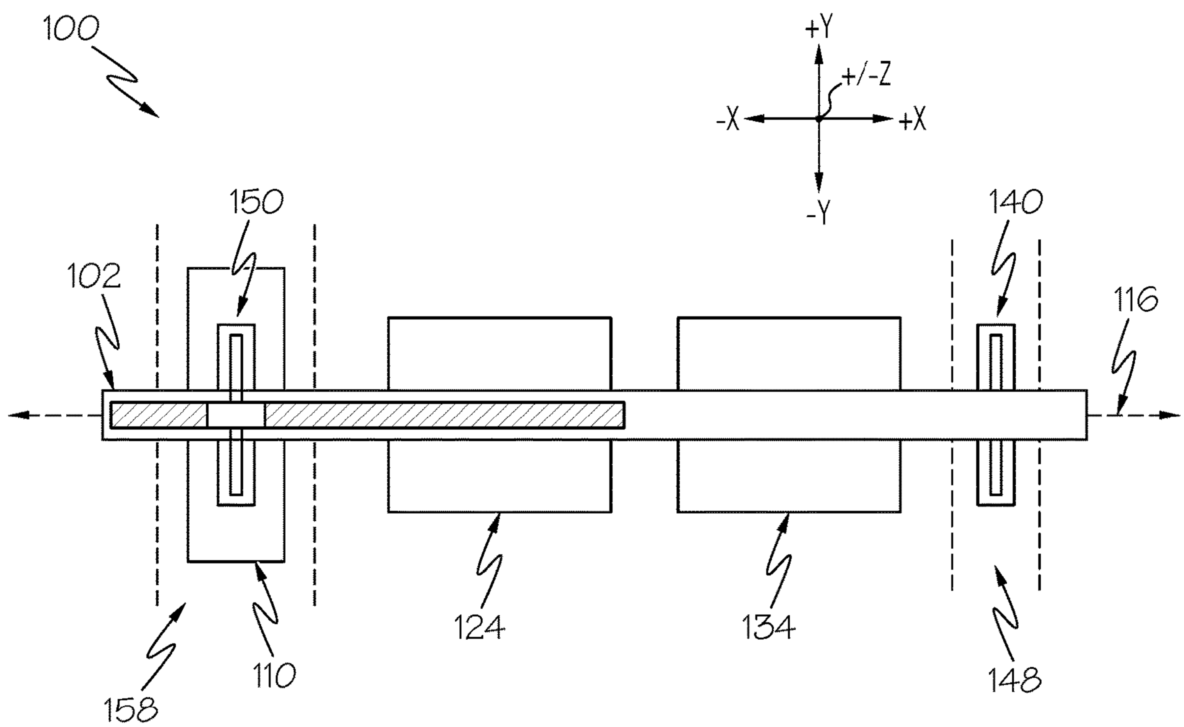
FIG. 11 schematically depicts a top-down view of the additive manufacturing apparatus of FIG. 2.

Referring now to FIG. 11, a top-down view of the additive manufacturing apparatus 100 of FIG. 2 is schematically depicted. As shown in FIG. 11, the additive manufacturing apparatus comprises a cleaning station 110, a build receptacle 124, a supply receptacle 134 and an actuator assembly 102. The actuator assembly 102 comprises, among other elements, a recoat head 140 for distributing build material and a print head 150 for depositing binder material. The cleaning station 110, the build receptacle 124, and the supply receptacle 134 are arranged along the working axis 116 of the apparatus 100 with the build receptacle 124 positioned between the cleaning station 110 and the supply receptacle 134. The actuator assembly 102 is constructed to facilitate independent control of the recoat head 140 and the print head 150 along the working axis 116 of the apparatus 100. For example, the actuator assembly 102 facilitates traversing the print head 150 along the working axis 116 from a print home position 158 co-located with the cleaning station 110, over the build receptacle 124 and back again. The actuator assembly also facilitates traversing the recoat head 140 along the working axis 116 from a recoat home position 148, over the supply receptacle 134, over the build receptacle 124 and back again. As noted herein, the actuator assembly allows for the recoat head 140 and the print head 150 to independently traverse the working axis 116 of the apparatus 100 in the same direction and/or in opposite directions and for the recoat head 140 and the print head 150 to traverse the working axis of the apparatus 100 at different speeds and/or the same speed. Independent actuation and control of the recoat head 140 and the print head 150, in turn, allows for at least some steps of the additive manufacturing process to be performed simultaneously thereby reducing the overall cycle time of the additive manufacturing process to less than the sum of the cycle time for each individual step.

Figure 12:
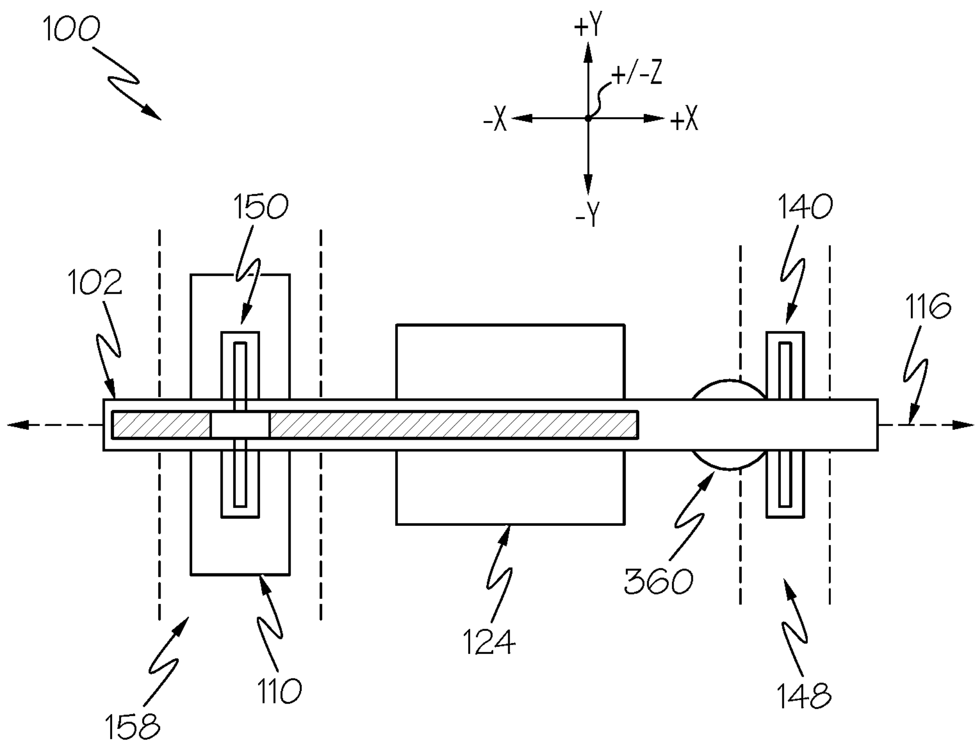
FIG. 12 schematically depicts a top-down view of the additive manufacturing apparatus of FIG. 8 according to one or more embodiments shown and described herein.

Referring now to FIG. 12, a top-down view of the additive manufacturing apparatus 101 of FIG. 8 is schematically depicted. As shown in FIG. 12, the additive manufacturing apparatus comprises a cleaning station 110, a build receptacle 124, and an actuator assembly 102. The actuator assembly 102 comprises, among other elements, a build material hopper 360 for delivering build material, a recoat head 140 for distributing build material, and a print head 150 for depositing binder material. The cleaning station 110 and the build receptacle 124 are arranged along the working axis 116 of the apparatus 100 between a print home position 158 of the print head 150 and a recoat home position 148 of the recoat head 140. The actuator assembly 102 is constructed to facilitate independent control of the recoat head 140 and the print head 150 along the working axis 116 of the apparatus 101. For example, the actuator assembly 102 facilitates traversing the print head 150 along the working axis 116 from the print home position 158 co-located with the cleaning station 110, over the build receptacle 124 and back again. The actuator assembly also facilitates traversing the recoat head 140 and the build material hopper 360 along the working axis 116 from a recoat home position 148, over the build receptacle 124 and back again. The actuator assembly 102 allows for the print head 150 and the recoat head 140 (with attached build material hopper 360) to independently traverse the working axis 116 of the apparatus 101 in the same direction and/or in opposite directions and for the print head 150 and the recoat head 140 (with attached build material hopper 360) to traverse the working axis 116 of the apparatus 101 at different speeds and/or the same speed. Independent actuation and control of the recoat head 140 (with attached build material hopper 360) and the print head 150, in turn, allows for at least some steps of the additive manufacturing process to be performed simultaneously thereby reducing the overall cycle time of the additive manufacturing process to less than the sum of the cycle time for each individual step.

Figure 13:
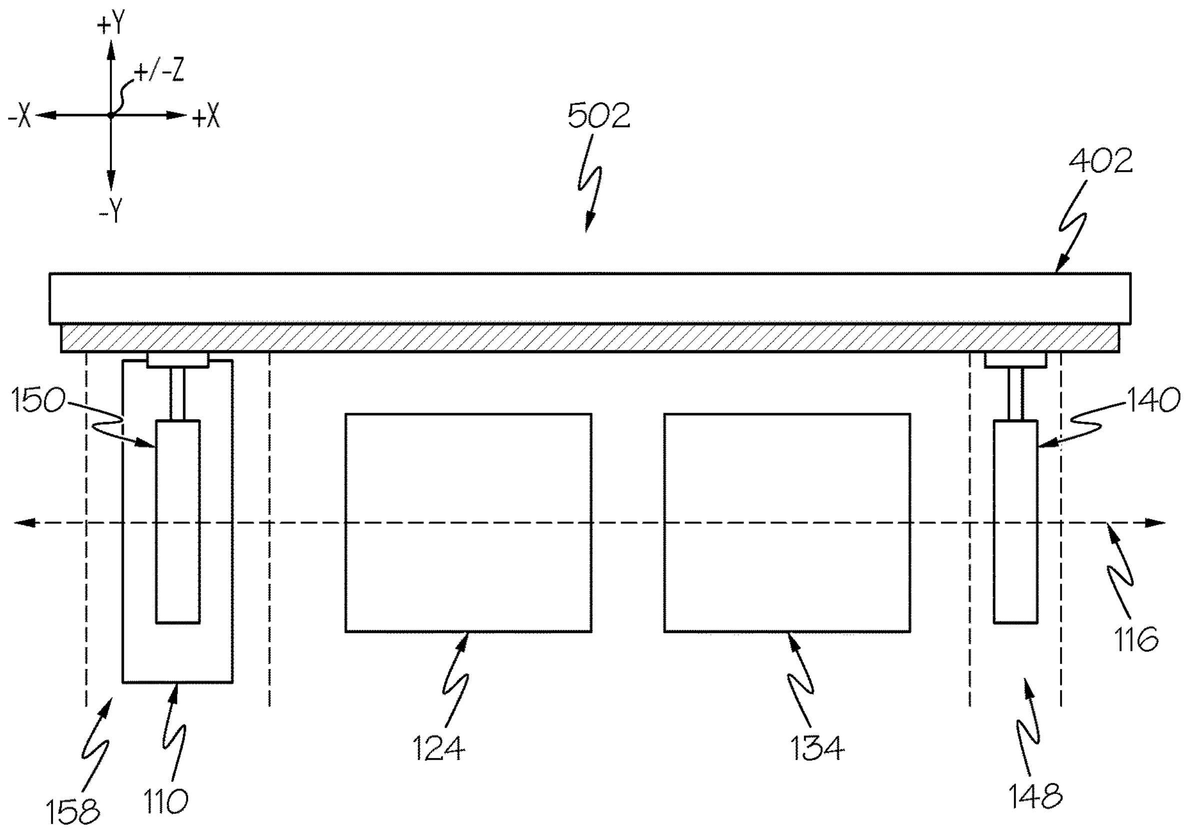
FIG. 13 schematically depicts a top-down view of an additive manufacturing apparatus comprising the actuator assembly of FIGS. 10A-10C according to one or more embodiments shown and described herein.

Referring now to FIG. 13, a top-down view of the additive manufacturing apparatus 502 comprising the actuator assembly 402 of FIGS. 10A-10C is schematically depicted. As shown in FIG. 13, the additive manufacturing apparatus 502 comprises a cleaning station 110, a build receptacle 124, a supply receptacle 134 and the actuator assembly 402. The actuator assembly 402 comprises, among other elements, a recoat head 140 for distributing build material and a print head 150 for depositing binder material. The cleaning station 110, the build receptacle 124, and the supply receptacle 134 are arranged along the working axis 116 of the apparatus 100 with the build receptacle 124 positioned between the cleaning station 110 and the supply receptacle 134. The actuator assembly 402 is laterally spaced apart from the build receptacle 124 that reduces fouling of the electrical components of the actuator assembly 402, as described hereinabove with respect to FIGS. 10A-10C. Further, the actuator assembly 402 is constructed to facilitate independent control of the recoat head 140 and the print head 150 along the working axis 116 of the apparatus 502. For example, the actuator assembly 402 facilitates traversing the print head 150 along the working axis 116 from a print home position 158 co-located with the cleaning station 110, over the build receptacle 24 and back again. The actuator assembly 402 also facilitates traversing the recoat head 140 along the working axis 116 from a recoat home position 148, over the supply receptacle 134, over the build receptacle 124 and back again. As noted herein, the actuator assembly 402 allows for the recoat head 140 and the print head 150 to independently traverse the working axis 116 of the apparatus 502 in the same direction and/or in opposite directions and for the recoat head 140 and the print head 150 to traverse the working axis of the apparatus 502 at different speeds and/or the same speed. Independent actuation and control of the recoat head 140 and the print head 150, in turn, allows for at least some steps of the additive manufacturing process to be performed simultaneously thereby reducing the overall cycle time of the additive manufacturing process to less than the sum of the cycle time for each individual step.

Figure 14:
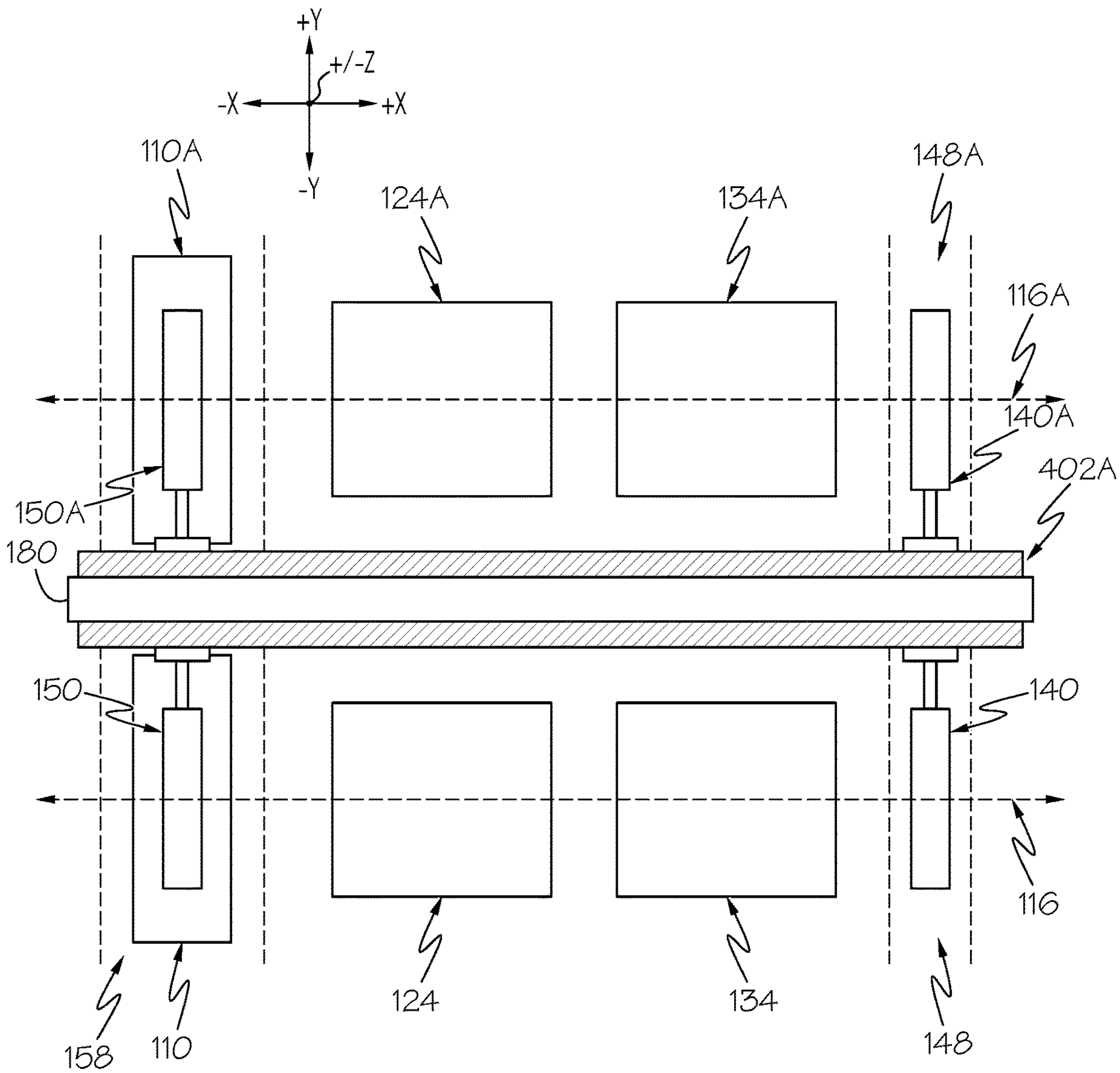
FIG. 14 schematically depicts a top-down view of an additive manufacturing apparatus comprising an alternate configuration of the actuator assembly according to FIGS. 10A-10C according to one or more embodiments shown and described herein.

FIG. 14 schematically depicts another embodiment of an additive manufacturing apparatus 503. In this embodiment, the additive manufacturing apparatus 503 comprises a cleaning station 110, a build receptacle 124, a supply receptacle 134 and an actuator assembly 402A arranged as described herein with respect to FIG. 13. The actuator assembly 402A further comprises a recoat head 140 and a print head 150 as described herein with respect to FIGS. 10A-10C and 13.

However, in this embodiment, the additive manufacturing apparatus 503 further comprises a second cleaning station 110A, a second build receptacle 124A, and a second supply receptacle 134A. The second cleaning station 110A, the second build receptacle 124A, and the second supply receptacle 134A are arranged on the opposite side of the actuator assembly 402A from the cleaning station 110, the build receptacle 124, and the supply receptacle 134 and mirror the arrangement of the cleaning station 110, the build receptacle 124, and the supply receptacle 134. In this embodiment, the actuator assembly 402A further comprises a second recoat head 140A and a second print head 150A arranged on the opposite side of the rail 180 of the actuator assembly 402A from the recoat head 140 and the print head 150. The second recoat head 140A and the second print head 150A are arranged and configured in the same manner as the recoat head 140 and the print head 150 (i.e., as described herein with respect to FIGS. 10A-10C and 13), albeit on opposite sides of the rail 180. In this embodiment, the actuator assembly 402A is constructed to facilitate independent control of the recoat head 140 and the print head 150 along the working axis 116 of the apparatus 503 and to facilitate independent control of the second recoat head 140A and the second print head 150A along the second working axis 116A of the apparatus 503. The actuator assembly 402A is also constructed to facilitate control of the recoat head 140 and the print head 150 independent of the second recoat head 140A and the second print head 150A. This embodiment allows for objects to be independently and individually built in the build receptacle 124 and the second build receptacle 124A using a single actuator assembly 402A.

Figure 15:
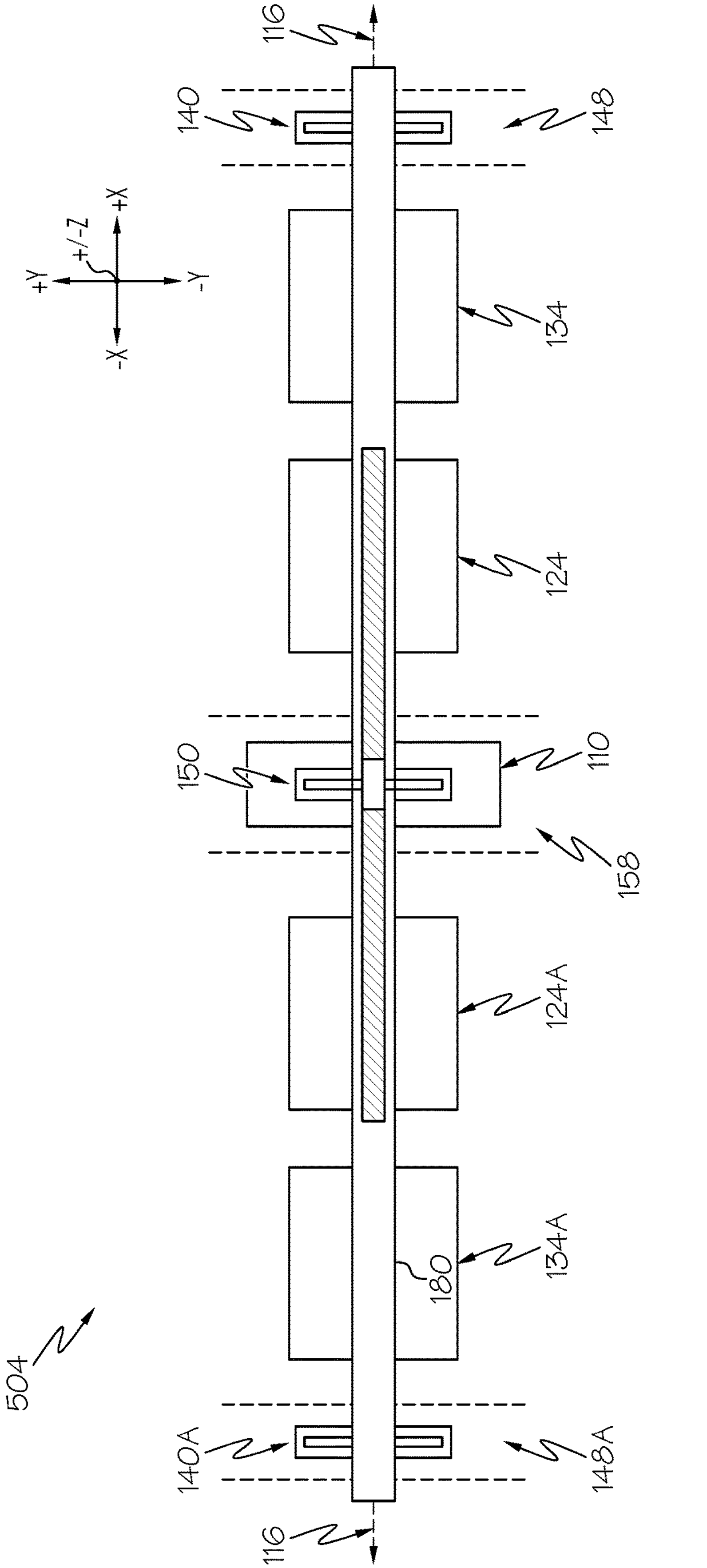
FIG. 15 schematically depicts a top-down view of an additive manufacturing apparatus having multiple build receptacles and supply receptacles according to one or more embodiments shown and described herein.

Referring now to FIG. 15, a top-down view of another embodiment of an additive manufacturing apparatus 504 is schematically depicted. As shown in FIG. 15, the additive manufacturing apparatus 504 comprises a cleaning station 110, a build receptacle 124, a supply receptacle 134 and an actuator assembly 102A. The additive manufacturing apparatus 504 further comprises a second build receptacle 124A and a second supply receptacle 134A. The actuator assembly 102A is similar to the actuator assembly 102 described above with respect to FIGS. 2 and 3 and comprises, among other elements, a recoat head 140 for distributing build material and a print head 150 for depositing binder material. However, in this embodiment, the actuator assembly further comprises a second recoat head 140A coupled to the rail 180 of the actuator assembly 102A such that the print head 150 is positioned between the recoat head 140 and the second recoat head 140A. In this embodiment, the second recoat head 140A may be arranged and configured in a similar manner as the recoat head 140.

In this embodiment, the cleaning station 110, the build receptacle 124, and the supply receptacle 134 are arranged along the working axis 116 of the apparatus 504 with the build receptacle 124 positioned between the cleaning station 110 and the supply receptacle 134. The second build receptacle 124A and the second supply receptacle 134A are arranged along the working axis 116 of the apparatus 504 with the second build receptacle 124A positioned between the cleaning station 110 and the second supply receptacle 134A. The build receptacle 124 and the supply receptacle 134 are located on a side of the cleaning station 110 opposite the second build receptacle 124A and the second supply receptacle 134A.

The actuator assembly 102A is constructed to facilitate independent control of the recoat head 140, the recoat head 140A, the print head 150, and the second print head 150A along the working axis 116 of the apparatus 504. For example, the actuator assembly 102A facilitates traversing the print head 150 along the working axis 116 from a print home position 158 co-located with the cleaning station 110, over the build receptacle 124 and back again. The actuator assembly 102A also facilitates traversing the recoat head 140 along the working axis 116 from a recoat home position 148, over the supply receptacle 134, over the build receptacle 124 and back again. The actuator assembly 102A also facilitates traversing the print head 150 along the working axis 116 from the print home position 158 co-located with the cleaning station 110, over the second build receptacle 124A and back again. The actuator assembly 102A also facilitates traversing the second recoat head 140A along the working axis 116 from a second recoat home position 148A, over the second supply receptacle 134A, over the second build receptacle 124A and back again.

The actuator assembly 102A of this embodiment allows for the recoat head 140, the second recoat head 140A, and the print head 150 to independently traverse the working axis 116 of the apparatus 504 in the same direction and/or in opposite directions and for the recoat head 140, the second recoat head 140A, and the print head 150 to traverse the working axis of the apparatus 504 at different speeds and/or the same speed. Independent actuation and control of the recoat head 140, the second recoat head 140A and the print head 150, in turn, allows for at least some steps of the additive manufacturing process to be performed simultaneously thereby reducing the overall cycle time of the additive manufacturing process to less than the sum of the cycle time for each individual step.

Moreover, including a second recoat head 140A on the actuator assembly, along with a second build receptacle 124A and a second supply receptacle 134A, may further maximize the working time of the print head 150, thereby increasing manufacturing throughput. Specifically, while the recoat head 140 is distributing build material from the supply receptacle 134 to the build receptacle 124, the print head 150 may be utilized to deposit binder material on build material in the second build receptacle 124A. Likewise, while the second recoat head 140A is distributing build material from the second supply receptacle 134A to the second build receptacle 124A, the print head 150 may be utilized to deposit binder material on build material in the build receptacle 124.

Build Receptacle

While FIGS. 2 and 7A-7D depict one embodiment of a build receptacle 124 and an additive manufacturing operation using the build receptacle 124, it should be understood that other embodiments of build receptacles are contemplated and possible. For example, the time for building an object by the additive manufacturing processes described herein may be further reduced by curing layers of binder material while subsequent layers of binder material are deposited on the build material. Accordingly, in some embodiments, the additive manufacturing apparatus 100 depicted in FIG. 2 may comprise a build receptacle 124 which facilitates curing layers of deposited binder material 500 while subsequent layers of binder material are deposited on build material 400 distributed on the build platform 120 of the build receptacle 124.

Figure 16A:
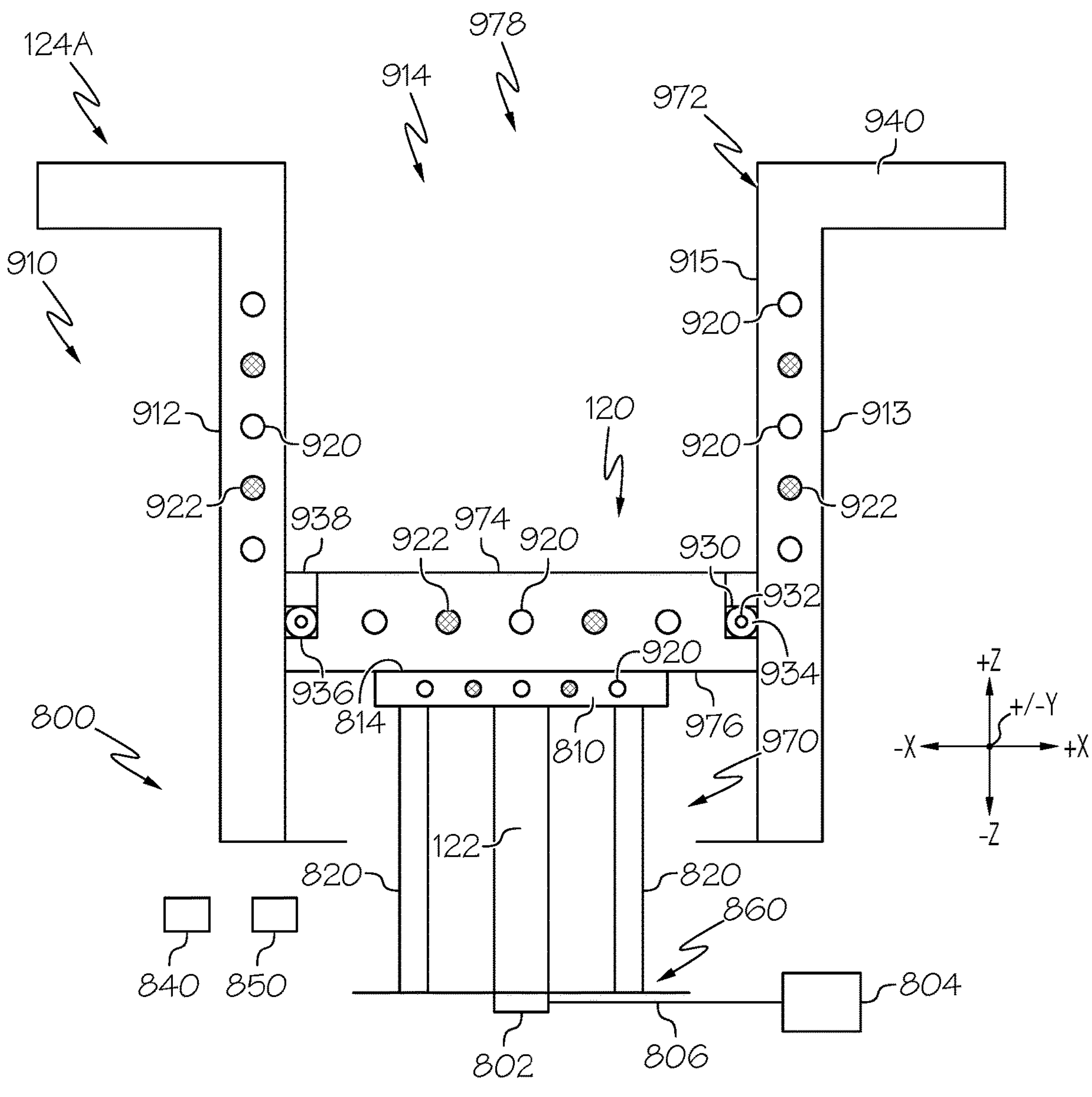
FIG. 16A schematically depicts a cross section of a build receptacle for use with an additive manufacturing apparatus according to one or more embodiments shown and described herein.

Referring now to FIG. 16A, an alternative embodiment of a build receptacle 124A for use with an additive manufacturing apparatus 100 is schematically depicted. The build receptacle 124A includes, among other elements, a housing 910 comprising a sidewall 912 at least partially enclosing a build chamber 914, a build platform 120 positioned within the build chamber 914, and a plurality of heating elements 920 disposed around the build chamber 914. The build platform 120 is configured to couple to a lift system 800 of the additive manufacturing apparatus 100. The heating elements 920 of the build receptacle 124A may be utilize to cure layers of deposited binder material while subsequent layers of binder material are deposited on build material distributed on the build platform 120, as will be described in further detail herein.

Still referring to FIG. 16A, a position of the build platform 120 is slidably adjustable within the build chamber 914 in a vertical direction (i.e., the +/−Z direction of the coordinate axes depicted in the figures) from a lower position proximate a bottom 970 of the build chamber 914 to one of a plurality of upper positions spaced part from the bottom 970 of the build chamber 914 in the upward vertical direction (i.e., in the +Z direction of the coordinate axes depicted in the figures) and from one of the plurality of upper positions to the lower position.

As described herein, the housing 910 comprises a sidewall 912 at least partially enclosing a build chamber 914. The phrase "at least partially enclosing," as used herein, means that the sidewall 912 bounds the build chamber 914 on at least one side. For example, the sidewall 912 bounds at least the vertical sides of the build chamber 914 (i.e., the sides of the build chamber extending in the +/−Z direction of the coordinate axes depicted in the figures) in the embodiment depicted in FIG. 16A. In this embodiment, the sidewall 912 may be, for example, square in horizontal cross section (i.e., a cross section in a plane parallel to the XY plane of the coordinate axes depicted in the figures) enclosing the build chamber 914. In embodiments, the sidewall 912 may be rectangular, circular, or ovoid in horizontal cross section, or any other suitable cross-sectional shape.

The housing 910 and sidewall 912 of the build receptacle 124A may be constructed of, for example and without limitation, a metal or a metallic alloy. As non-limiting examples, the metal or metallic alloy may comprise aluminum or an aluminum alloy, steel, copper or a copper alloy, nickel or a nickel alloy, bronze, or combinations thereof.

Figure 18:
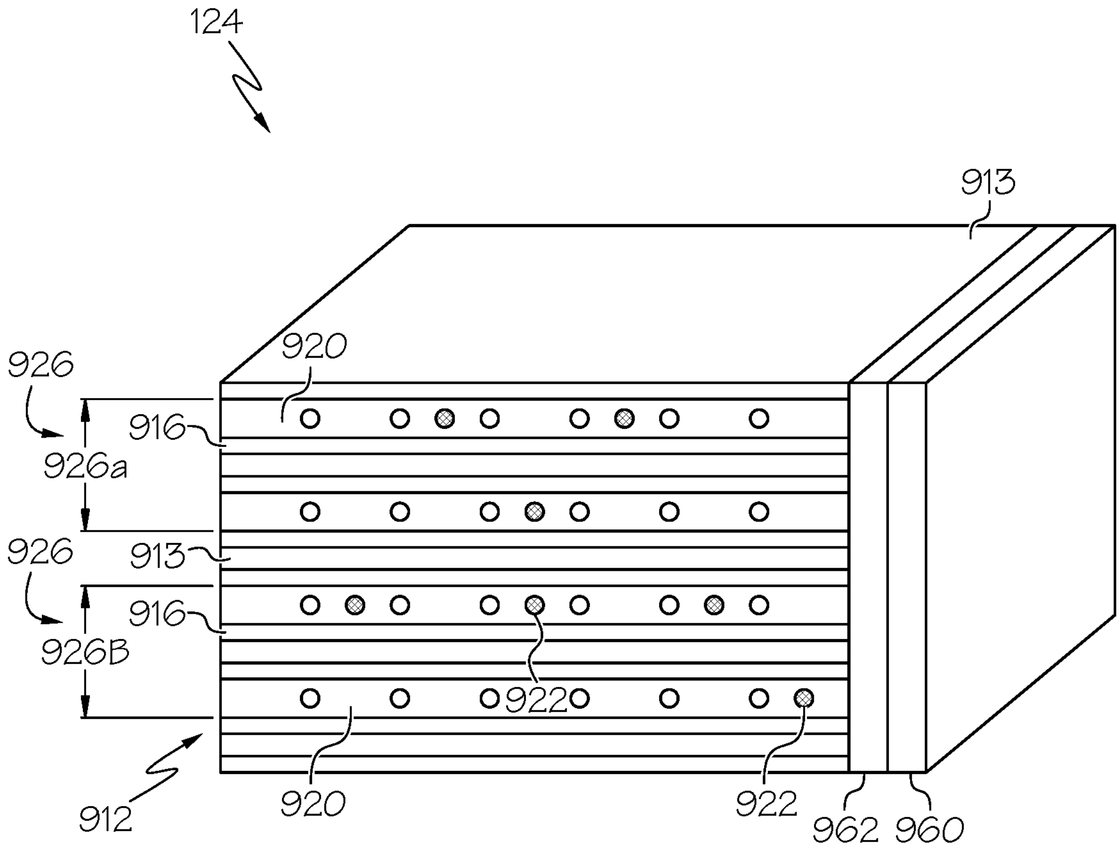
FIG. 18 schematically depicts heating elements coupled to a build receptacle according to one or more embodiments shown and described herein.

Referring now to FIGS. 16A and 18, the build receptacle 124A may include a plurality of heating elements 920, as noted herein. The plurality of heating elements 920 may aid in supplying heat to the build chamber 914 to facilitate curing binder material 500 deposited on build material 400 distributed on the build platform 120 within the build chamber 914. In conventional binder jet additive manufacturing processes, constructed objects are removed from the build chamber before the binder material is fully cured and placed in a separate enclosure, such as an oven or the like, to facilitate or complete curing. Removing the object from the additive manufacturing apparatus and relocating it to a separate apparatus constitutes an additional step in the production process, increasing downtime and decreasing efficiency and productivity. Further, removing uncured objects from the apparatus could potentially result in harm to the object during handling, particularly considering the binder material may be uncured or not fully cured. In the embodiments described herein, to address such concerns, the plurality of heating elements 920 are included in the build receptacle 124A so that the binder material incorporated in the built object may be cured within the build receptacle 124A during the additive manufacturing process.

In embodiments, the plurality of heating elements 920 may be disposed on an exterior surface 913 of the sidewall 912, as depicted in FIG. 18 and described in further detail herein. As an alternative embodiment, the plurality of heating elements 920 may be disposed within the sidewall 912, as depicted in FIG. 16A. In yet other embodiments (not depicted), the plurality of heating elements 920 may be disposed both on the exterior surface 913 of the sidewall 912 and within the sidewall 912. The plurality of heating elements 920 may be positioned to facilitate curing of the binder material, as previously described, as the object is built in a layer-wise fashion. In embodiments, the plurality of heating elements 920 may be independently controlled to create a temperature gradient from a bottom 970 of the build chamber 914 to a top 978 of the build chamber 914.

In embodiments, the build platform 120 may be constructed to supply heat and/or supplemental heating to the build chamber 914. For example, in embodiments, the build platform 120 may comprise channels or bores in the thickness of the build platform 120 and heating elements 920 may be disposed within the channels or bores, as depicted in FIG. 16A. In some embodiments (not depicted), the plurality of heating elements 920 may optionally be positioned in the top surface and/or affixed to a top surface 974 of the build platform 120. In embodiments (not depicted), the plurality of heating elements 920 may optionally be positioned in and/or affixed to a bottom surface 976 of the build platform 120. Additionally or alternatively, the build platform 120 may comprise channels (not depicted) in the top surface 974 of the build platform 120 and/or the bottom surface 976 of the build platform 120 and the heating elements may be disposed within the channels.

In embodiments, a plurality of heating elements 920 may optionally be disposed on a top surface 814 of a heating platen 810 of the lift system 800, disposed within the thickness of the heating platen 810 as depicted in FIG. 16A, disposed in a top surface 814 of the heating platen 810, or any combination thereof. In these embodiments, heat from the heating elements 920 associated with the heating platen 810 may be conducted to the build receptacle 124 and into the build chamber 914 when the build receptacle 124 is positioned on the build heating platen 810 of the lift system 800.

In the embodiments described herein, the heating elements 920 may have one or more form factors. For example and without limitation, the plurality of heating elements 920 may be resistance heaters, cartridge heaters, heating cables, heating tape, or various combinations thereof.

Referring still to FIGS. 16A and 18, in embodiments, the plurality of heating elements 920 may be arranged in heating zones 926 around the build chamber 914. Each heating zone 926 may comprise one or more heating elements 920 as previously described. Heating zones 926 may include heating elements 920 positioned on the sidewall 912, heating elements 920 positioned on or in the build platform 120, and/or heating elements 920 positioned on or in the heating platen 810. In embodiments, each heating zone 926 may be spaced apart from an adjacent heating zone 926 in the vertical direction, as depicted in FIG. 18. The heating elements 920 forming the heating zone 926 may be arranged in a horizontal band around the build chamber 914 of the build receptacle 124A (as depicted in FIG. 18). In embodiments, the heating elements 920 positioned on or in the sidewall 912 may form a distinct heating zone 926, the heating elements 920 positioned on or in the build platform 120 may form another distinct heating zone 926, and the heating elements 920 positioned on or in the heating platen 810 may form yet another distinct heating zone 926. Alternatively or additionally, the heating elements 920 positioned on or in the sidewall 912 may form multiple distinct heating zones 926, the heating elements 920 positioned on or in the build platform 120 may form another distinct heating zone 926, and the heating elements 920 positioned on or in the heating platen 810 may form yet another distinct heating zone 926. Alternatively or additionally, in embodiments, the heating elements 920 positioned on or in the build platform 120 may form multiple distinct heating zones 926.

In embodiments, the build receptacle 124A may further comprise a plurality of temperature sensors 922 arranged around the build chamber 914. In embodiments, the temperature sensors 922 may be disposed on the exterior surface 913 of the sidewall 912. Alternatively, the temperature sensors 922 may be disposed within the sidewall 912. In embodiments where the build receptacle 124A comprises heating elements 920 disposed on or in the build platform 120, the build receptacle 124A may further comprise temperature sensors 922 on or in the build platform 120. In embodiments where the build receptacle 124A comprises heating elements 920 disposed on or in the heating platen 810, the build receptacle 124A may further comprise temperature sensors 922 on or in the heating platen 810.

In embodiments, the temperature sensors 922 may be coupled to individual ones of the plurality of heating elements 920. In embodiments, two temperature sensors 922 may be coupled to individual ones of the plurality of heating elements 920. In such embodiments, the temperature sensors may be positioned such that the diameter (or width) of the build chamber 914 is positioned between the temperature sensors 922.

As a non-limiting example, the plurality of temperature sensors 922 may include resistance temperature detectors, thermocouples, thermopiles or the like. In embodiments, the temperature sensors 922 may detect the heat output of the plurality of heating elements 920, may detect the temperature of the build chamber 914, or both.

Figure 22:
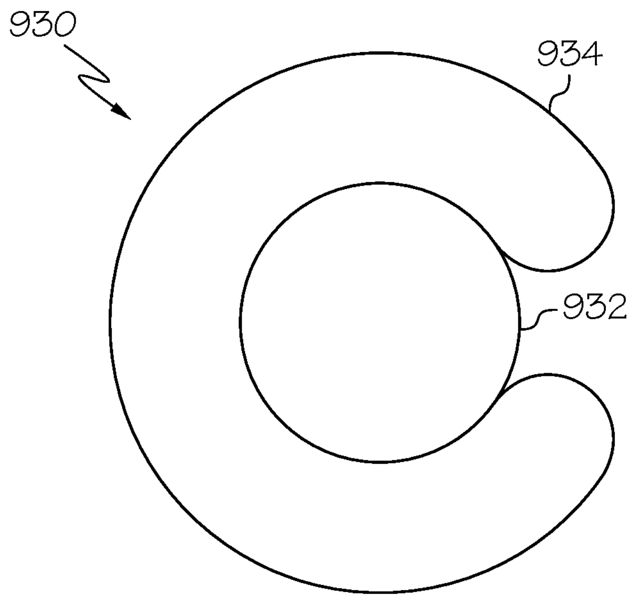
FIG. 22 schematically depicts a seal according to one or more embodiments shown and described herein.

Referring now to FIGS. 16A and 22, in some embodiments, the build receptacle 124A comprises a seal 930 disposed between the build platform 120 and an interior surface 915 of the sidewall 912. The seal 930 may prevent build material and/or binder material, as previously described, from passing between the build platform 120 and the sidewall 912. The seal 930 may be slidable against the sidewall 912, such that the build platform 120 may be actuated within the build chamber 914 in a vertical direction as previously described. Furthermore, the seal 930 may be compressible and recoverable so as to allow the build receptacle 124A and/or build platform 120 to expand and contract with temperature fluctuations while still remaining sealed.

In embodiments, the seal 930 may include a core portion 932 and an enveloping portion 934. In embodiments, the enveloping portion 934 at least partially encloses the core portion 932. In embodiments, the core portion 932 may include polytetrafluoroethylene and the enveloping portion 934 may include a fibrous material. For example, in embodiments, the core portion 932 may comprise a braided polytetrafluoroethylene packing seal. However, it should be understood that other materials may be used for the core portion 932 including, without limitation, Viton™ seals or the like. In embodiments, the fibrous material of the enveloping portion 934 may be a wool felt seal. However, it should be understood that other materials may be used for the enveloping portion 934 including, without limitation, felt seals constructed of other fibrous material or the like.

In embodiments, the build platform 120 may comprise a seal seat 936 formed in an edge of the build platform 120. The seal 930 may be positioned in the seal seat 936 such that the seal 930 is disposed between the build platform 120 and the interior surface 915 of the sidewall 912. In embodiments, the apparatus 100 further includes a seal frame 938 enclosing at least a portion of the seal seat 936. In embodiments, the seal frame 938 may be recessed in a top surface 974 of the build platform 120 (as depicted in FIG. 16A) such that the seal frame 938 forms a portion of the top surface of the build platform 120. This configuration of the seal frame 938 and build platform 120 allows for the seal 930 to be serviced and/or replaced without removal of the build platform 120 from the build receptacle 124A. In embodiments in which the build platform 120 comprises a seal frame 938, the seal frame 938 may be constructed from a metal or a metal alloy. As non-limiting examples, the metal or metal alloy may comprise aluminum or an aluminum alloy, steel, copper or a copper alloy, nickel or a nickel alloy, bronze, or combinations thereof.

In alternative embodiments (not depicted), the build platform 120 may comprise a groove in the perimeter of the build platform 120 between the top surface 974 and the bottom surface 976 of the build platform 120. In this embodiment, the seal 930 may be disposed in the groove such that the seal is positioned between the build platform 120 and the interior surface 915 of the sidewall 912 of the build receptacle 124A.

Figure 23A:
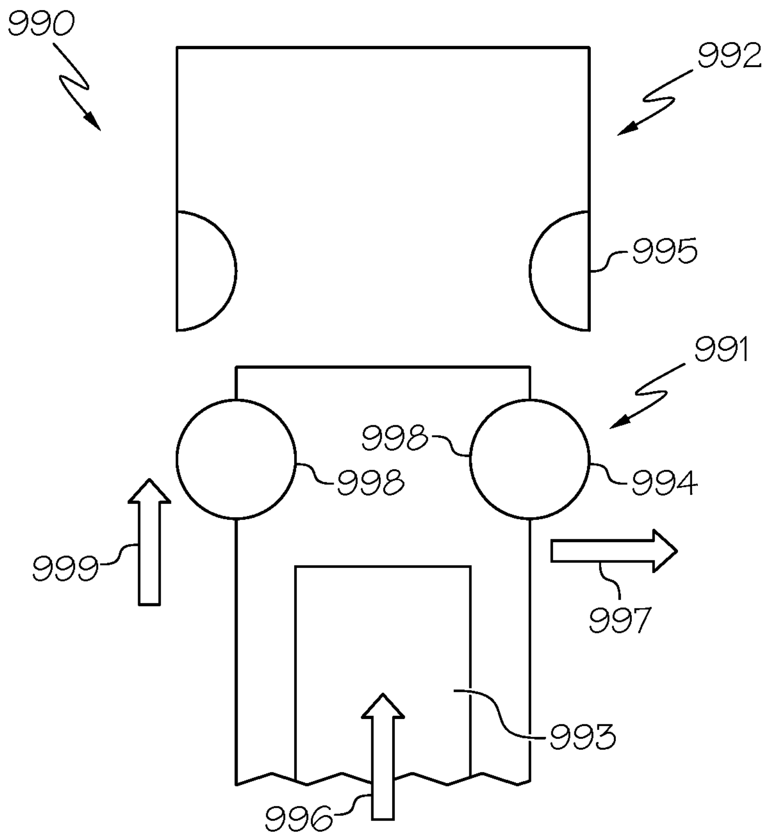
FIG. 23A schematically depicts a connector according to one or more embodiments shown and described herein.
Figure 23B:
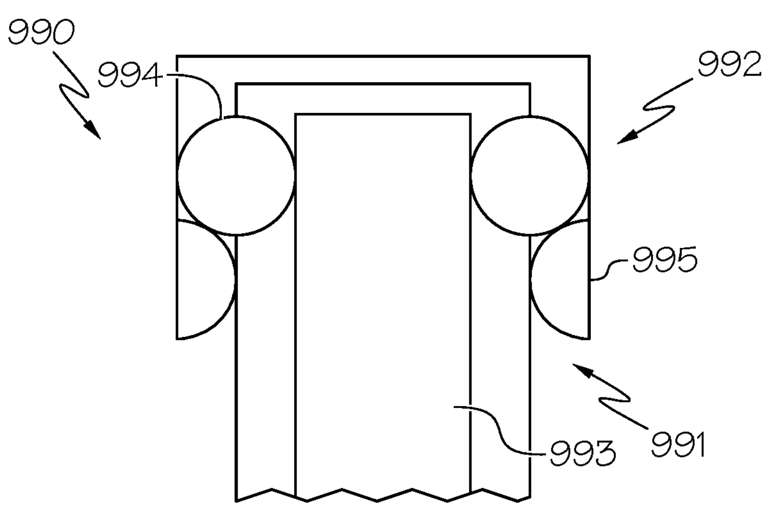
FIG. 23B schematically depicts a connector according to one or more embodiments shown and described herein.

Referring now to FIGS. 16A and 23A-23B, a bottom surface 976 of the build platform 120 may further comprise connectors 990 for coupling the build platform 120 to the heating platen 810 of the lift system 800. The connectors may comprise interference fit connectors, pneumatic connectors, electro-magnetic couplings, parallel groove connectors, or combinations thereof. In embodiments where the connectors 990 are pneumatic connectors, the connectors 990 may comprise mating connectors such as a male connector 991 and a female connector 992 as depicted in FIG. 23A. In such embodiments, pressurized air may push a pin 993 within the male connector 991 up as indicated by arrow 996, to contact inner portions 998 of ball bearings 994. The ball bearings 994 are then extended horizontally as indicated by arrow 997 while the male connector 991 is pushed into the female connector 992 as indicated by arrow 999. The ball bearings 994 then rest above detents 995 within the female connector 992, as depicted in FIG. 23B. In embodiments, the bottom surface 976 of the build platform 120 may comprise either the male connector 991 or the female connector 992, and the lift system 800 may comprise the corresponding connector, where the male connector 991 and the female connector 992 correspond to one another. The connectors 990 may be communicatively coupled to the control system 200 such that the control system 200 receives electrical signals indicative of whether the connectors 990 are in a pneumatically activated position (as shown in FIG. 23B) or in a released position (as shown in FIG. 23A). The control system 200 may utilize these signals to control the activation of the connectors 990 between the pneumatically activated position and the released position.

Referring again to FIG. 16A, in embodiments, the housing 910 of the build receptacle 124A may comprise a flange 940 extending from the sidewall 912 proximate a top 972 of the sidewall 912. The flange 940 may support the build receptacle 124A within the additive manufacturing apparatus 100. For example, the build receptacle 124A may hang within the apparatus 100 by the flange 940.

Figure 24A:
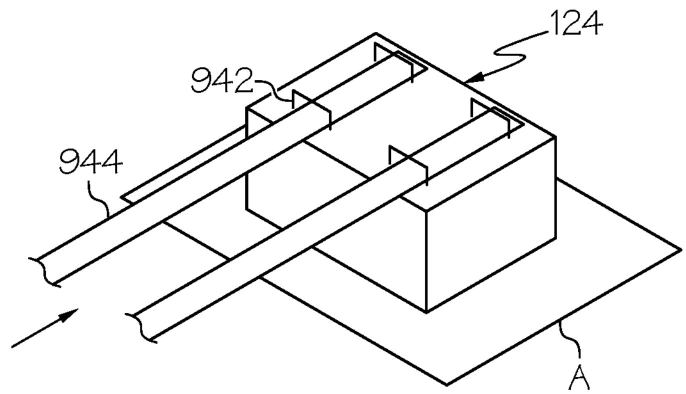
FIG. 24A schematically depicts a perspective view of a build receptacle for use with an additive manufacturing apparatus according to one or more embodiments shown and described herein.
Figure 24B:
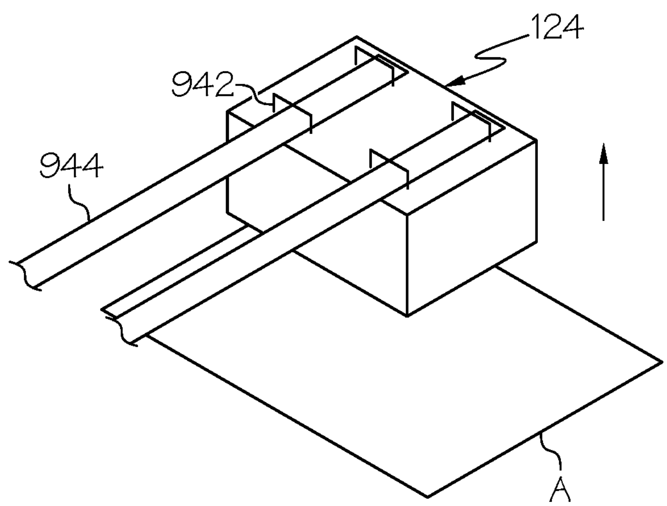
FIG. 24B schematically depicts a perspective view of a build receptacle for use with an additive manufacturing apparatus according to one or more embodiments shown and described herein.
Figure 24C:
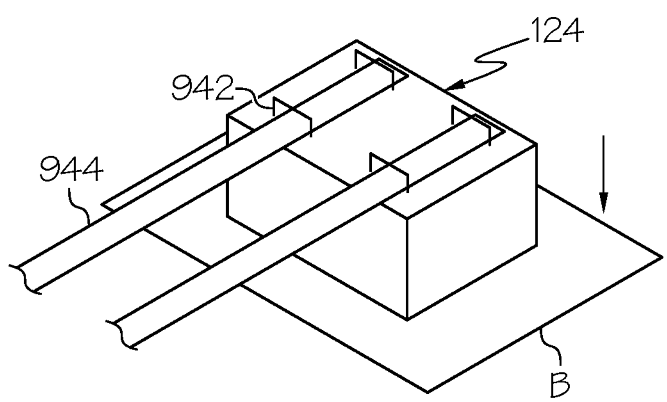
FIG. 24C schematically depicts a perspective view of a build receptacle for use with an additive manufacturing apparatus according to one or more embodiments shown and described herein.
Figure 28:
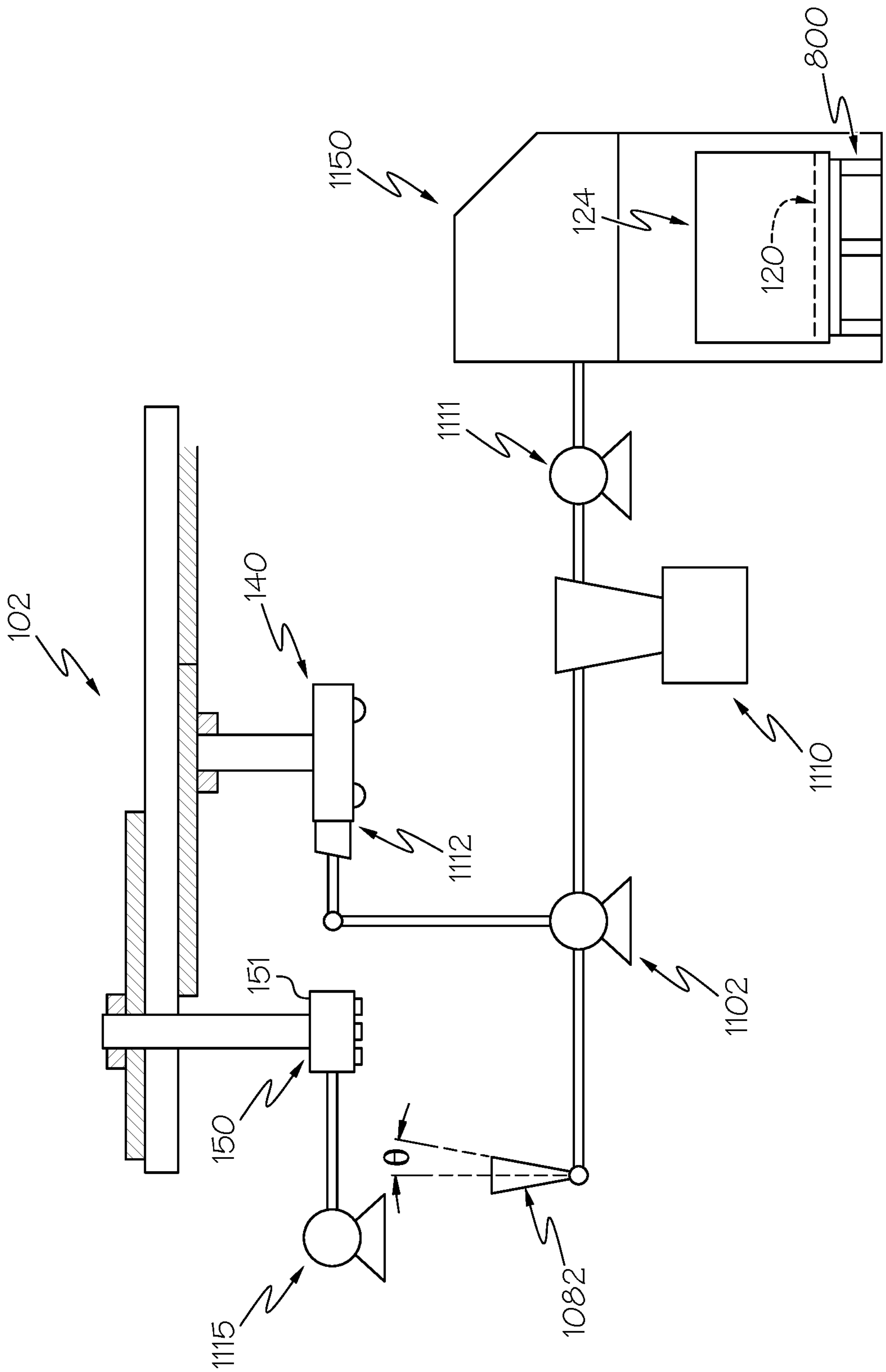
FIG. 28 schematically depicts the interconnectivity of various components and accessories of an additive manufacturing apparatus to a sieve system and an air pump according to one or more embodiments shown and described herein.

Referring to FIGS. 17 and 24A-24C, in embodiments, the build receptacle 124A may further comprise a plurality of lift points 942 located on the flange 940, on the sidewall 912, or both. The lift points 942 may facilitate lifting and lowering of the build receptacle 124A. In embodiments, the build receptacle 124A may be lifted from a first location, A, to move the build receptacle 124A to a second location, B, as depicted in FIGS. 24A-24C. As non-limiting examples, the build receptacle 124A may be lifted by a forklift, a lifting box, a pallet jack, a winch, or combinations thereof. When the build receptacle 124A is lifted by a forklift, the forks 944 of the forklift may be utilized to lift and lower the build receptacle 124A with the lift points 942, as depicted in FIGS. 24A-24B. The forklift may then transfer the build receptacle 124A to location B as depicted in FIG. 24C. The locations A and B may include, as non-limiting examples, the apparatus 100, a curing station, or a de-powdering station 1150 (FIG. 28). The curing station may be an enclosure separate from the apparatus 100 where the build receptacle 124A may be placed to cure the object within the build receptacle 124A at a curing temperature. For example, the build receptacle 124A may comprise electrical connectors (described in further detail herein) coupled to the heating elements 920 and, optionally, the temperature sensors 922. The heating elements 920 and the temperature sensors 922 may be coupled to the control system 200 (FIG. 6) and power supplies of the additive manufacturing apparatus 100 with the electrical connectors during a build operation. After the build operation is complete, the electrical connectors are decoupled from the control system 200 and power supplies of the additive manufacturing apparatus 100, moved to the curing station, and recoupled to the control system and/or power supplies of the curing station to complete curing. The de-powdering station 1150 may be a location separate from the apparatus 100 where the build receptacle 124A may be placed to remove excess build material from the build receptacle 124A and/or to cure the object within the build receptacle 124A. After the build operation is complete, the electrical connectors are decoupled from the control system 200 and power supplies of the additive manufacturing apparatus 100, moved to the de-powdering station, and recoupled to the control system and/or power supplies of the de-powdering station to complete curing and de-powdering.

In embodiments, each lift point of the plurality of lift points 942 may comprise a handle extending from the flange 940, the sidewall 912, or both. For example, and without limitation, the handle may be an inverted U-shaped member attached to the flange 940 or an inverted L-shaped member attached to the flange 940. Alternatively, the handle may be a C-shaped member attached to the sidewall 912. Alternatively, each lift point of the plurality of lift points 942 comprises a lift flange extending from the sidewall 912. For example, and without limitation, the lift flange may comprise a rod extending perpendicularly from the sidewall 912. Alternatively, the lift flange may comprise an L-shaped member attached to the sidewall 912.

Referring again to FIGS. 16A and 17, the build receptacle 124A may further comprise a lid 950. In embodiments, the lid 950 at least partially encloses the build chamber 914. The lid 950 may be positioned proximate the top 972 of the sidewall 912. In embodiments, the lid 950 may be flush with the flange 940 extending from the sidewall 912 proximate the top 972 of the sidewall 912. The lid 950 may prevent build material, as previously described, from exiting the build chamber 914 after completion of a build operation, such as when the build receptacle 124A is removed from the additive manufacturing apparatus 100 for de-powdering. In embodiments, the lid 950 may prevent the build material from exiting the build chamber 914 during movement of the build receptacle 124A between the apparatus 100, the curing station, and/or the de-powdering station. Alternatively or additionally, the lid 950 may assist in thermally insulate the build chamber 914 during curing and/or the lid 950 may prevent heat from leaking from the build chamber 914. In that regard, the lid 950 may comprise insulation. In embodiments, the lid may comprise a handle 952 to facilitate easy access to the build chamber 914 of the build receptacle 124A. In embodiments, the handle 952 may be an inverted U-shaped member attached to the lid 950. The lid 950 may comprise a metal or a metal alloy. As non-limiting examples, the metal or metal alloy may comprise aluminum or an aluminum alloy, steel, copper or a copper alloy, nickel or a nickel alloy, bronze, or combinations thereof.

Referring now to FIG. 18, in embodiments, the exterior surface 913 of the sidewall 912 of the build receptacle 124A may comprises grooves 916. In these embodiments, the plurality of heating elements 920 may be positioned in the grooves 916. In embodiments, the grooves 916 may be formed into the exterior surface 913 of the sidewall 912, such as by machining or the like. Alternatively or additionally, the grooves 916 may be formed by affixing strips of material to the exterior surface 913 of the sidewall 912. The grooves 916 may, for example, aid in aligning and/or attaching the heating elements 920 on the exterior surface 913 of the sidewall 912. The grooves 916 may also, for example, aid in thermally isolating adjacent heating elements 920 from one another, thereby improving the ability to establish and maintain a temperature gradient with respect to the build chamber 914.

While FIG. 18 depicts the exterior surface 913 of the sidewall 912 of the build receptacle 124A as comprising grooves 916, it should be understood that the grooves are optional and that, in some embodiments, the build receptacle 124A is constructed without grooves 916 in the sidewall 912 of the build receptacle 124A. In embodiments, each groove 916 may comprise a set of heating elements 920 within the groove 916. Furthermore, in embodiments, each set of heating elements 920 within each groove 916 may form separate heating zones 926.

Still referring to FIG. 18, in some embodiments, the build receptacle 124A may further comprise at least one cover 960 (one depicted in FIG. 18) affixed to the exterior surface 913 of the sidewall 912 such that the plurality of heating elements 920 are disposed between the cover 960 and the exterior surface 913 of the sidewall 912. The cover 960 may comprise a metal or a metal alloy. As non-limiting examples, the metal or metal alloy may comprise aluminum or an aluminum alloy, steel, copper or a copper alloy, nickel or a nickel alloy, bronze, or combinations thereof. The build receptacle 124A may further comprise insulation 962 positioned between the cover 960 and the plurality of heating elements 920. The insulation 962 may comprise, for example and without limitation, refractory ceramic materials such as alumina board or alumina fiber, fiberglass, mineral wool, cellulose, natural fibers, polystyrene, polyisocyanurate, polyurethane, urea-formaldehyde foam, phenolic foam, cementitious foam, or combinations of these. In the case of cementitious foam, the cementitious foam may include magnesium silicate, magnesium oxide, or both. Without intending to be bound by theory, the cover 960 (with or without insulation) may aid in maintaining heat within the build chamber 914 and may protect the plurality of heating elements 920 from damage, such as during handling of the build receptacle 124A.

Figure 19:
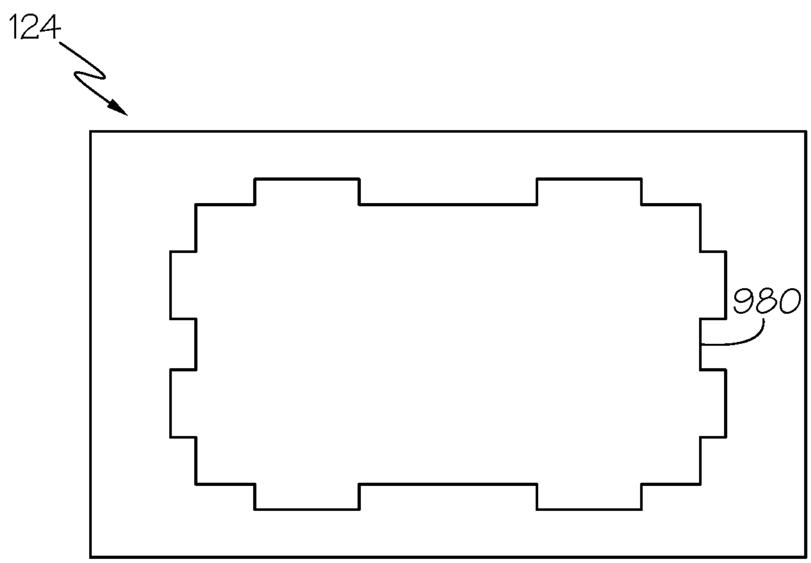
FIG. 19 schematically depicts a bottom view of a build receptacle according to one or more embodiments shown and described herein.

The housing 910 of the build receptacle 124A may further include a plurality of retention tabs 980, as depicted in FIG. 19. The plurality of retention tabs 980 may extend from the sidewall 912 of the build receptacle 124A into the build chamber 914 proximate a bottom of the sidewall 912. The build platform 120 may be seated on the plurality of retention tabs 980 when the build platform 120 is in the lower position as previously described. The plurality of retention tabs 980 may prevent the build platform 120 from descending below the bottom 970 of the build chamber 914.

Figure 17:
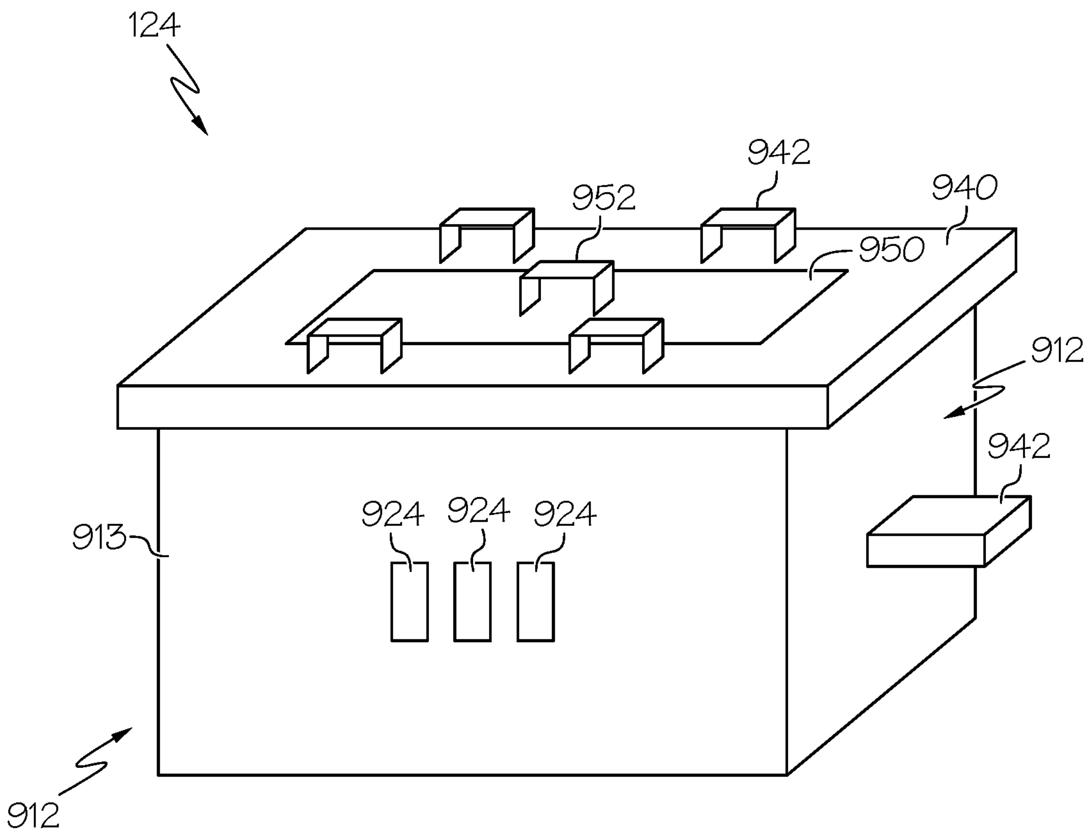
FIG. 17 schematically depicts a perspective view of a build receptacle for use with an additive manufacturing apparatus according to one or more embodiments shown and described herein.

Referring to FIGS. 16A, 17, and 18, the plurality of heating elements 920 may be communicatively coupled to at least one electrical connector 924, as described herein. The at least one electrical connector 924 may be disposed on the exterior surface 913 of the sidewall 912. In some embodiments, the at least one electrical connector 924 supplies power to the plurality of heating elements 920. In embodiments, the at least one electrical connector 924 may transmit electrical signals from the build receptacle 124A indicative of a temperature of the sidewall 912 of the build receptacle 124A. Specifically, in embodiments, the temperature sensors 922 may be communicatively coupled to at least one electrical connector 924 disposed on the exterior surface 913 of the sidewall 912. In some embodiments, the electrical connectors 924 supply power to the temperature sensors 922 and transmit electrical signals from the build receptacle 124A.

In embodiments, the electrical connectors 924 may also facilitate portability of the build receptacle 124A. For example, the electrical connectors 924 may be connected to a power source regardless of whether the build receptacle 124A is within the apparatus 100. In embodiments, the electrical connectors 924 may be connected to a power source when the build receptacle 124A is within the apparatus 100, when the build receptacle 124A is at a curing station as previously described, or when the build receptacle 124A is at a depowdering station as previously described.

Referring to FIG. 16A, in the embodiments described herein, the additive manufacturing apparatus 100 may further comprise a lift system 800 that is removably coupled to the build platform 120 to facilitate movement of the build platform 120 in the vertical direction when the build receptacle 124A is disposed in the additive manufacturing apparatus 100. In embodiments, the lift system 800 may comprise a heating platen 810 and a plurality of heating elements 920, as described herein. The heating platen 810 may be coupled to an upper end of a build platform actuator 122.

The heating platen 810 is thermally coupled to the build platform 120, such as by proximity coupling, when the lift system 800 is coupled to the build platform 120 with the connectors 990 previous described (FIGS. 23A-23B). Specifically, when the lift system 800 is coupled to the build platform 120, a bottom surface of the build platform 120 may be in contact with an upper surface of the heating platen 810. The heating platen 810 may supply heat and/or supplemental heating to the build platform 120 with heating elements 920 operatively associated with the heating platen 810, as described herein. The heating platen 810 may be constructed of, for example and without limitation, a metal or a metal alloy. As non-limiting examples, the metal or metal alloy may comprise aluminum or an aluminum alloy, steel, copper or a copper alloy, nickel or a nickel alloy, bronze, or combinations thereof.

In the embodiment shown in FIG. 16A, the build platform actuator 122 comprises a ball screw 802 coupled to a motor 804. The build platform actuator 122 may further comprise a drive linkage 806 connecting the ball screw 802 to an armature of the motor 804 such that the ball screw 802 is rotatably coupled to the armature of the motor 804. The drive linkage 806 may be, for example and without limitation, a belt, a chain, or the like. In embodiments, the armature of the motor rotates, thereby driving the drive linkage 806. The drive linkage 806, in turn, may rotate the ball screw 802, thereby advancing the build platform actuator 122. However, it should be understood that other embodiments are contemplated and possible.

While FIG. 16A depicts an embodiment of a lift system 800 with a build platform actuator 122 comprising a ball screw 802 coupled to a motor 804 with a drive linkage 806, it should be understood that other embodiments of the build platform actuator 122 are contemplated and possible, such as those previously described in reference to the build platform actuator 122 shown in FIG. 2.

In the embodiments described herein, the lift system 800 may further comprise a plurality of vertical guides 820 coupled to the heating platen 810. The plurality of vertical guides 820 extend in a vertical direction (i.e., a direction parallel to the +/−Z direction of the coordinate axes in the figures) and are spaced apart from one another in a horizontal direction (i.e., a direction parallel to the +/−X direction of the coordinate axes depicted in the figures). The lift system 800 may include a single vertical guide (not depicted), or multiple vertical guides 820, as depicted in FIG. 16A. The vertical guides 820 may be circular or ovoid in horizontal cross section (i.e., a cross section in the Y-X plane of the coordinate axes depicted in the figures). However, it should be understood that other embodiments are contemplated and possible. The vertical guides 820 may maintain the orientation of the build platform 120 as the build platform 120 is actuated within the build receptacle 124A between the lower position and the plurality of upper positions by the build platform actuator 122.

In embodiments, the lift system 800 may include sensors for determining the location of the heating platen 810, the build platform 120, or both. For example, the lift system 800 may include a heating platen position sensor 840 for detecting a vertical position of the heating platen 810. The heating platen position sensor 840 may be positioned proximate to a lower end 860 of the lift system 800 and, in some embodiments, includes a limit switch. In embodiments, the limit switch may comprise a capacitive limit switch, an inductive limit switch, a photoelectric limit switch, a mechanical limit switch, or combinations thereof. The heating platen position sensor 840 may be communicatively coupled to the control system 200 such that the control system 200 receives electrical signals indicative of the position of the heating platen 810. The control system 200 may utilize these signals to control positioning of the heating platen 810 (and hence the build platform 120 attached to the heating platen 810) within the build receptacle 124A.

The lift system 800 may further include a build platform position sensor 850 for detecting a vertical position of the build platform 120. In some embodiments, the build platform position sensor 850 may include an inductive limit switch. In embodiments, the limit switch may comprise a capacitive limit switch, an inductive limit switch, a photoelectric limit switch, a mechanical limit switch, or combinations thereof. The build platform position sensor 850 may be communicatively coupled to the control system 200 such that the control system 200 receives electrical signals indicative of the position of the build platform 120. The control system 200 may utilize these signals to control positioning of the build platform 120 within the build receptacle 124A.

Figure 16B:
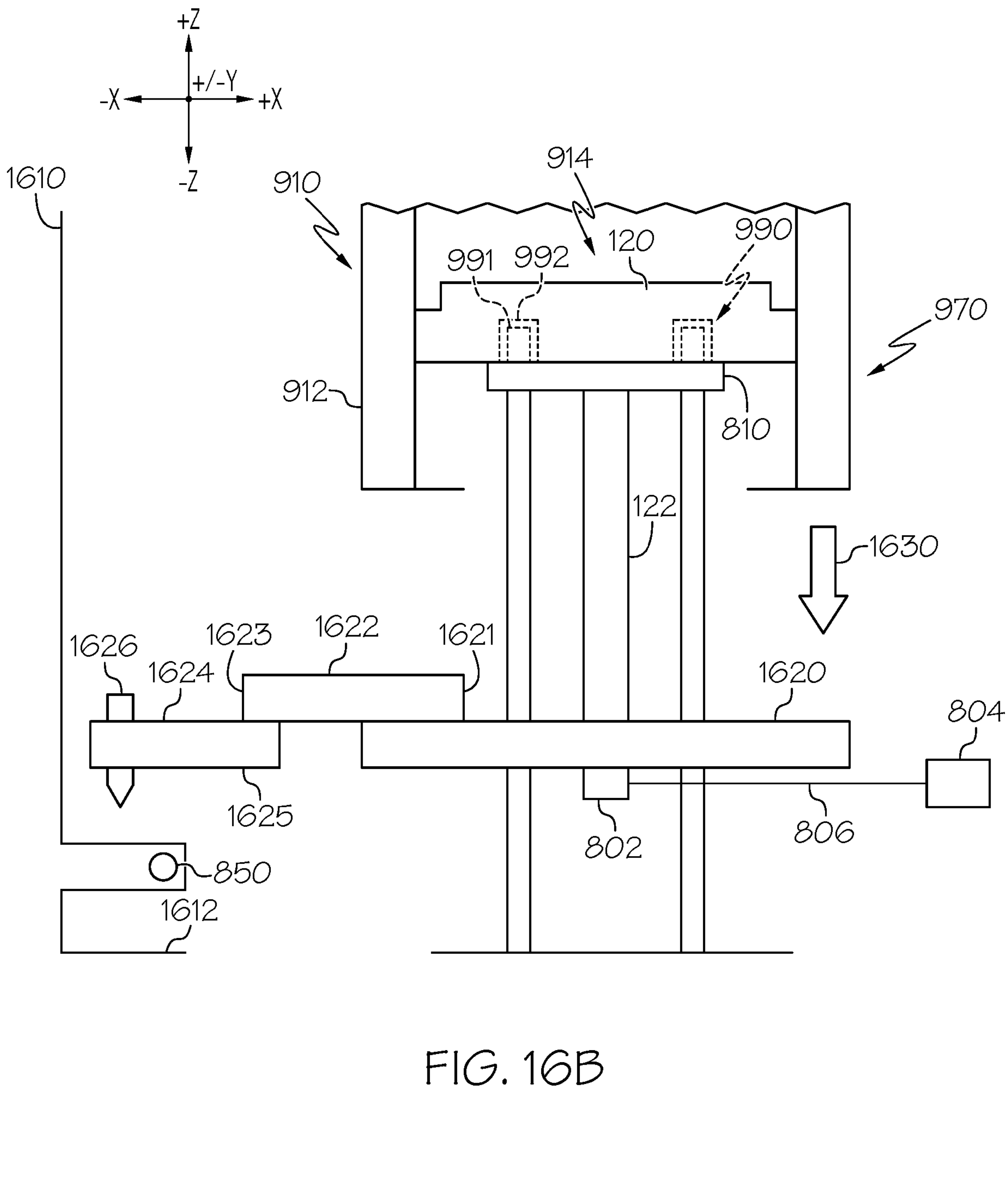
FIG. 16B schematically depicts the build receptacle of FIG. 16A in use according to one or more embodiments shown and described herein.
Figure 16C:
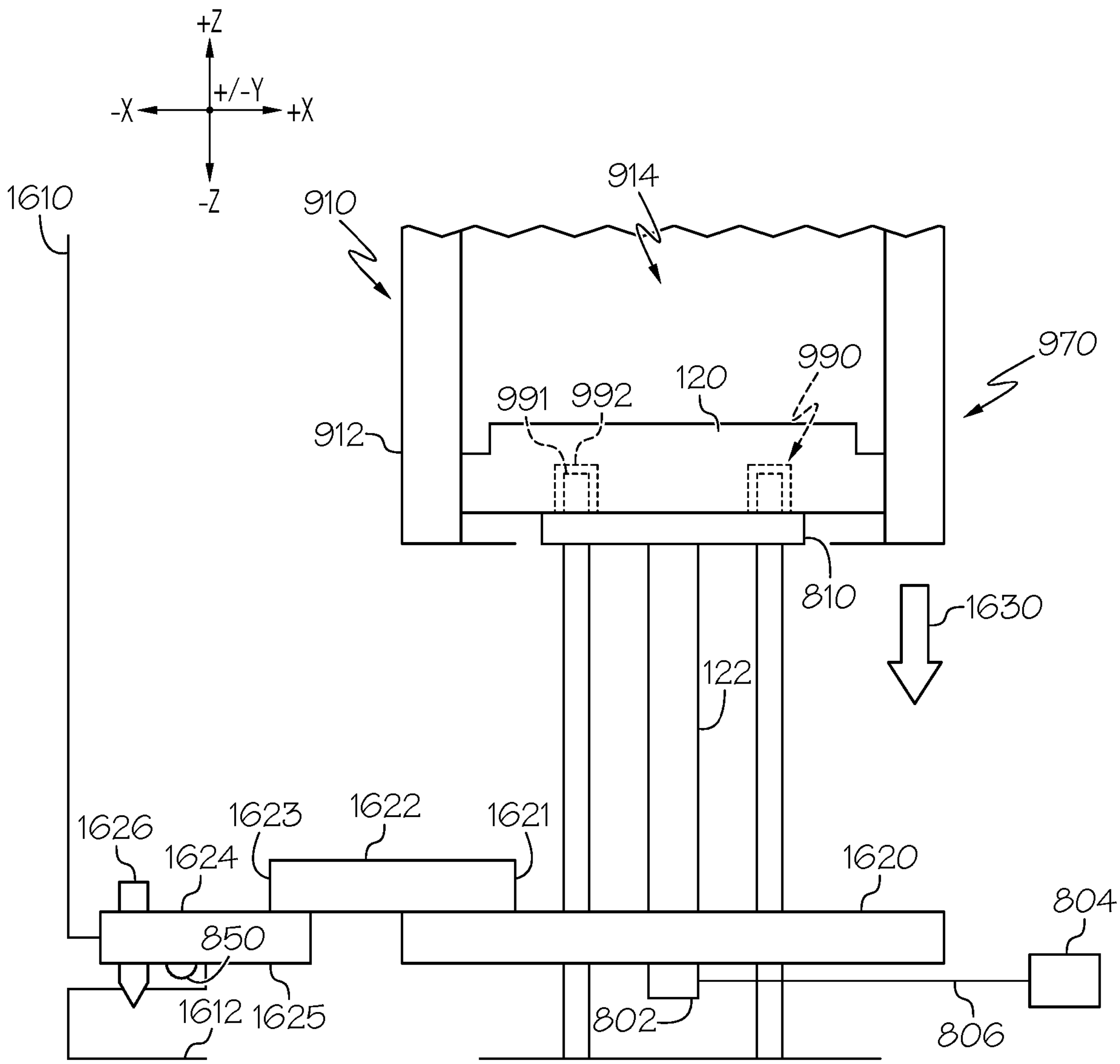
FIG. 16C schematically depicts the build receptacle of FIG. 16A in use according to one or more embodiments shown and described herein.
Figure 16D:
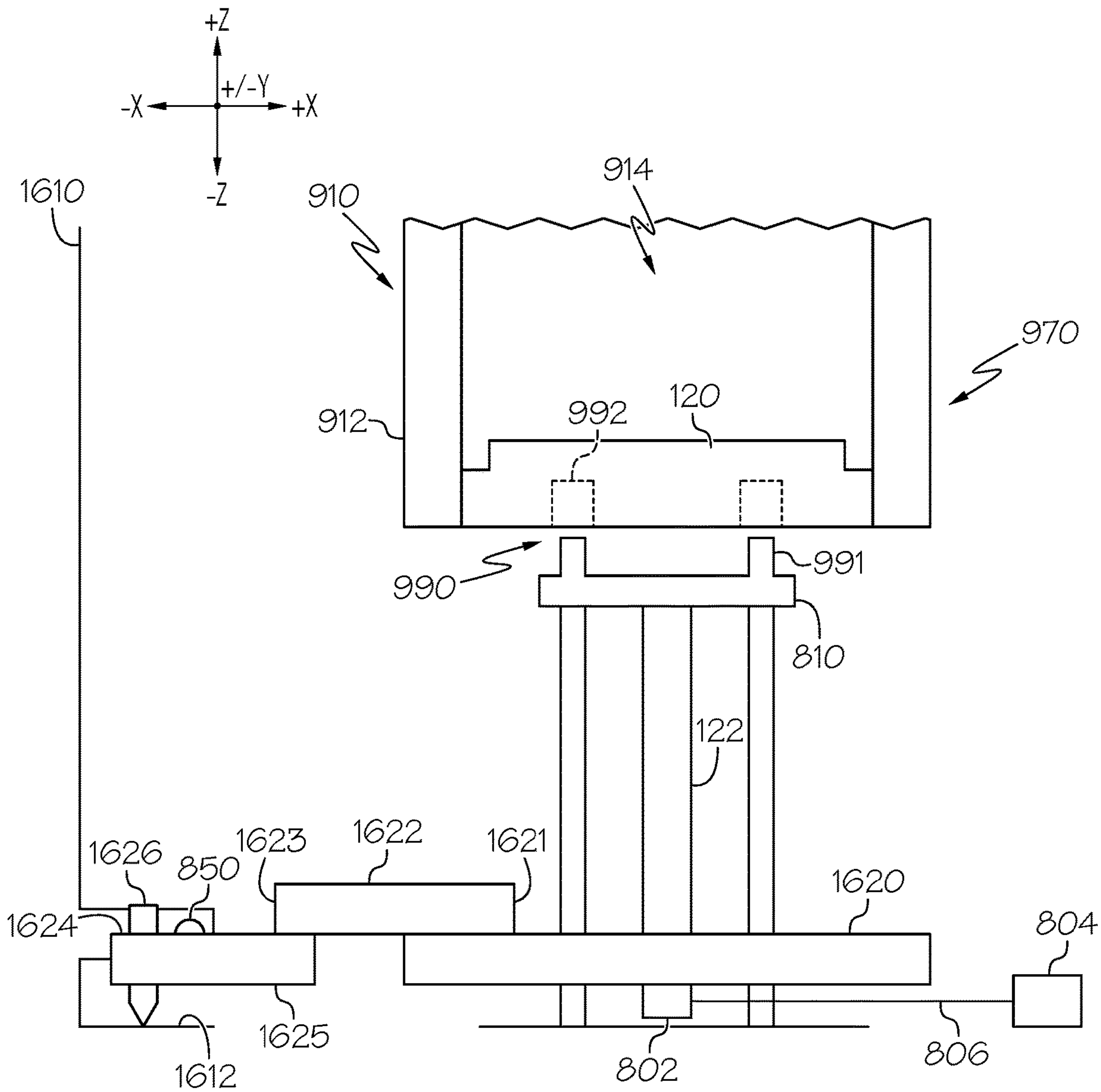
FIG. 16D schematically depicts the build receptacle of FIG. 16A in use according to one or more embodiments shown and described herein.

Referring now to FIGS. 16B to 16D, in embodiments, the build platform position sensor 850 may be disposed on a vertical wall 1610, where the vertical wall 1610 is spaced apart from the sidewall 912 in the lateral direction (i.e., the +/−X direction of the coordinate axes depicted in the figures) . The build platform position sensor 850 may be mounted directly on the vertical wall 1610 (not shown), protruding from the vertical wall 1610 (as shown), or mechanically connected to the vertical wall 1610 in any other suitable fashion.

In embodiments, as shown in FIGS. 16B to 16D, the lift system 800 may include an actuator stage 1620 supporting the build platform actuator 122. The actuator stage 1620 may be configured to move in a vertical direction corresponding to the movement of the build platform 120. A sensor flag 1624 may be connected to the actuator stage 1620 by a bracket 1622. A first side 1621 of the bracket 1622 may be connected to the actuator stage 1620, and a second side 1623 of the bracket 1622 may be connected to the sensor flag 1624. The sensor flag 1624 may include a home sensor 1626 protruding from a bottom side 1625 of the flag 1624. The home sensor 1626 may be communicatively coupled to the control system 200 such that the control system 200 receives electrical signals indicative of the position of the build platform 120. The control system 200 may utilize these signals to control positioning of the build platform 120 within the build receptacle 124A.

FIGS. 16B to 16D depict the operation of the build platform position sensor 850 in sequence. As the build platform 120 is actuated in the downward vertical direction (i.e., in the −Z direction of the coordinate axes depicted in the figure) as indicated by arrow 1630, the actuator stage 1620 is also actuated in the downward vertical direction, thereby lowering the sensor flag 1624 (as shown in FIGS. 16B and 16C). As the build platform 120 is actuated downwards as indicated by arrow 1630, the sensor flag 1624 enters the signal range of the build platform position sensor 850. The sensor flag 1624 may enter the signal range of the build platform position sensor 850 when the build platform 120 is within a distance p of the bottom 970 of the build chamber 914. In embodiments, the distance p may be from 1 millimeter (mm) to 20 mm, from 1 mm to 15 mm, from 1 mm to 10 mm, from 1 mm to 5 mm, from 5 mm to 20 mm, from 5 mm to 15 mm, from 5 mm to 10 mm, from 10 mm to 20 mm, or from 10 mm to 15 mm.

When the build platform position sensor 850 senses the sensor flag 1624, the control system 200 may release the connectors 990 from a pneumatically activated position (as shown in FIG. 23A) to a released position (as shown in FIG. 23B). The connectors may be any of the connectors as previously described, including mating connectors such as a male connector 991 and a female connector 992. The build platform 120 may continue to be actuated in the downward vertical direction after the connectors 990 have been released, as shown in FIGS. 16C and 16D. Releasing the connectors 990 may ensure the build platform 120 is not actuated below the bottom 970 of the build chamber 914, to avoid damage to the build platform 120 and/or the connectors 990.

The build platform 120 may rest at the bottom 970 of the build chamber 914 (as shown in FIG. 16D) as the heating platen 810 continues to be actuated downwards, until the home sensor 1626 contacts a home sensor touch point 1612 protruding from the vertical wall 1610. The home sensor touch point 1612 may provide a reference point in space for the positioning of the home sensor 1626. The reference point may be used by the control system 200 to determine positioning of the build platform 120 within the build receptacle 124A, and therefore ensure accuracy in determining the distance p as shown in FIG. 16C.

Although the lift system 800 is described herein in the context of the build receptacle 124A, it should be understood that the additive manufacturing apparatus 100 may include a similar lift system 800 removably coupled to the supply receptacle 134 (FIG. 2).

Figure 20:
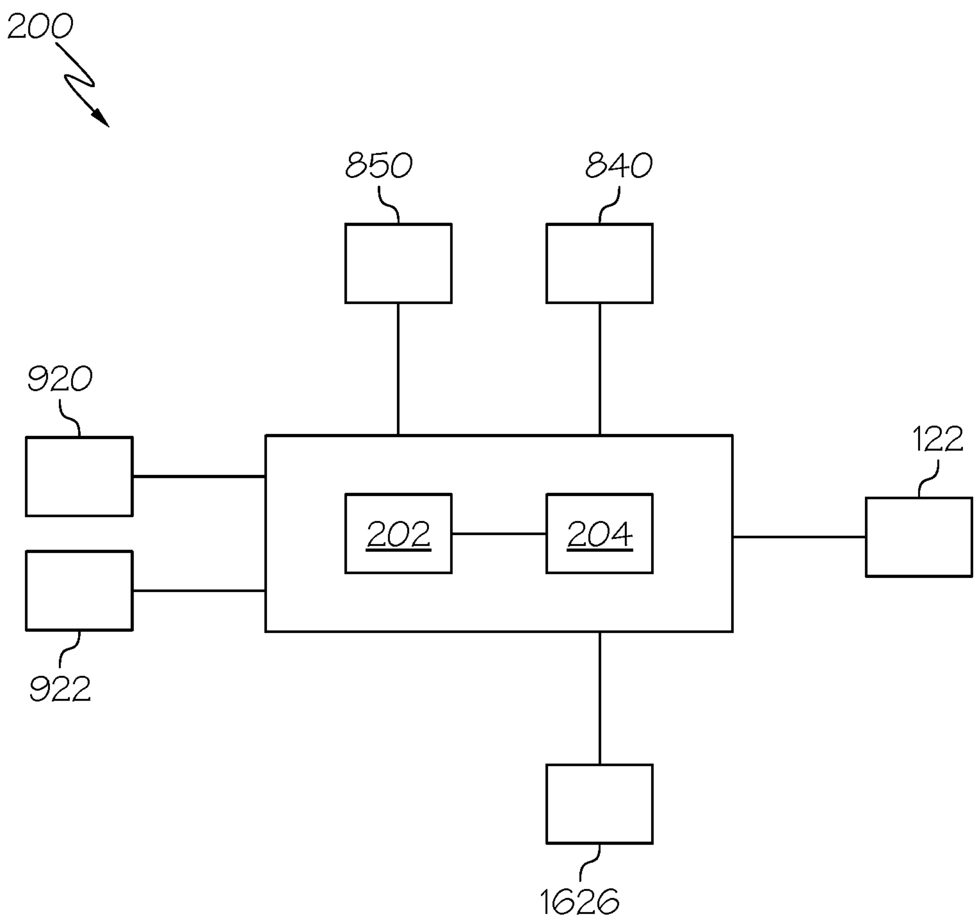
FIG. 20 schematically depicts a control unit for a build receptacle according to one or more embodiments shown and described herein.

Referring to FIGS. 16A and 20, another portion of the control system 200 for controlling the additive manufacturing apparatus 100 of FIG. 6 is schematically depicted. The control system 200 may be communicatively coupled to the build platform actuator 122, the plurality of heating elements 920, the temperature sensors 922, the heating platen position sensor 840, and the build platform position sensor 850.

In the embodiments described herein, the processor 202 of the control system 200 is configured to provide control signals to (and thereby actuate) the build platform actuator 122, the plurality of heating elements 920, and the temperature sensors 922. The control system 200 may also be configured to receive signals from the plurality of heating elements 920, the temperature sensors 922, the heating platen position sensor 840, and the build platform position sensor 850 and, based on these signals, actuate either the build platform actuator 122 and/or the plurality of heating elements 920.

In embodiments, the heating platen position sensor 840 may be communicatively coupled to the control system 200 as described herein. The heating platen position sensor 840 may provide a feedback signal to the control system 200 to cease actuating the lift system 800. The heating platen position sensor 840 may detect the position of the heating platen 810 to ensure the heating platen 810 and the build platform 120 are not actuated below a lower end 860 of the lift system 800, to avoid damage to the apparatus 100.

In embodiments, the build platform position sensor 850 may be communicatively coupled to a control system 200 as described herein. The build platform position sensor 850 may provide a feedback signal to the control system 200 to cease actuating the lift system 800. The build platform position sensor 850 may detect the position of the build platform 120 to ensure the build platform 120 and the heating platen 810 are not actuated below a lower limit proximate a lower end 860 of the lift system 800, to avoid damage to the apparatus 100.

Referring to FIGS. 18 and 20, as stated previously, the plurality of heating elements 920 may be arranged in heating zones 926. In embodiments, each heating zone 926 of heating elements 920 is independently actuatable by the control system 200. Independently actuatable heating zones 926 means that the control system 200 may heat each heating zone 926 of heating elements 920 to a specific temperature independently of any other heating zone 926. For example, and without limitation, when each heating zone 926 is spaced apart from an adjacent heating zone 926 in the vertical direction and each heating zone 926 is arranged in a horizontal band on the sidewall 912 (as depicted in FIG. 18), the heating zones 926 may be actuated to establish a temperature gradient within the build chamber 914. Furthermore, heating zones 926 formed by the heating elements 920 positioned on the build platform 120 and the heating platen 810 may be actuated by the control system 200 to establish or contribute to the temperature gradient.

In embodiments, the plurality of heating elements 920 positioned around the build chamber 914 may form two distinct heating zones 926, specifically heating zone 926A and heating zone 926B (as depicted in FIG. 18). In such embodiments, the two distinct heating zones 926A and 926B may be independently actuated by the control system 200. In embodiments, the two distinct heating zones 926A and 926B may be arranged vertically spaced from one another and may comprise a horizontal band of heating elements 920 (as depicted in FIG. 18). Alternatively or additionally, the build receptacle 124A may comprise two distinct heating zones 926A and 926B that are horizontally spaced from one another and comprise a vertical band of heating elements 920 (not depicted). In embodiments, the two distinct heating zones 926A and 926B may repeat and form vertically alternating heating zones 926A and 926B, or form horizontally alternating heating zones 926A and 926B.

In embodiments, following the logic described previously in regards to two distinct heating zones 926 (926A and 926B), it is contemplated that the plurality of heating elements 920 positioned on the build receptacle 124A may form three or more distinct heating zones 926 (926A, 926B, 926C, etc.). These distinct heating zones may form blocked groupings or alternating groupings.

The operation of the build receptacle 124A will now be described in further detail with specific reference to FIGS. 16A, 20, and 21A-21C. As referenced previously, in describing the operation of the additive manufacturing apparatus 100, specific reference will be made herein to build material 400 and binder material 500. It should be understood that the following operation of the build receptacle 124A may be used in conjunction with method of operating the additive manufacturing apparatus 100 described hereinabove with respect to FIGS. 2 and 7A-7D.

Figure 21A:
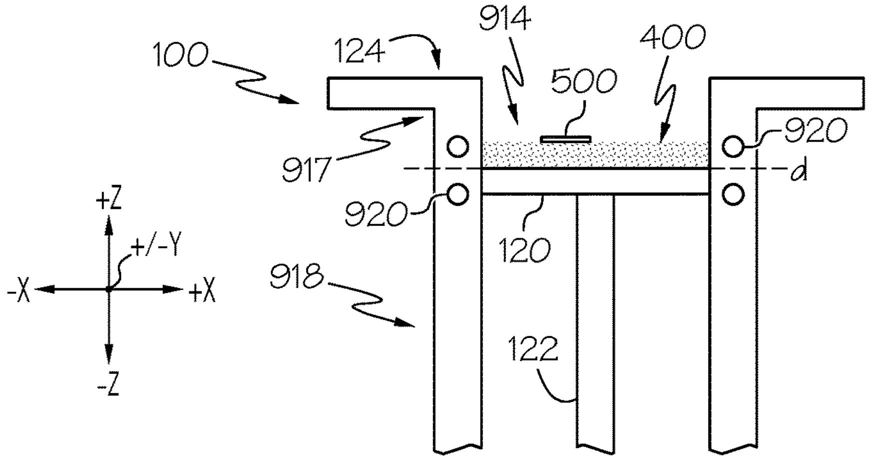
FIG. 21A schematically depicts the build receptacle of FIG. 16A in use according to one or more embodiments shown and described herein.

Referring initially to FIG. 21A, the build receptacle 124A is depicted at the initiation of a thermal curing process. The thermal curing process may begin with build material 400 and binder material 500 deposited on the build platform 120 (as depicted), or, as a non-limiting example, may begin during deposition of the build material 400 and the binder material 500, such as in embodiments where the recoat head comprises an energy source as described herein.

In FIG. 21A, the build material 400 and the binder material 500 are deposited on the build platform 120 as previously described. The build material 400 and the binder material 500 are deposited on the build platform 120 in a deposition region 917 of the build chamber 914 vertically spaced above axis d, which is parallel to the working axis 116 of the apparatus 100 (FIG. 2). Axis d represents the transition from the deposition region 917 of the build chamber 914 to a curing region 918 of the build chamber 914. The deposition region 917 of the build chamber 914 is located vertically above (i.e. in the +Z direction of the coordinate axes depicted in the figures) the curing region 918 of the build chamber 914. While axis d is described herein as delineating the deposition region 917 from the curing region 918, it should be understood that some curing of the binder material 500 may take place in the deposition region 917, such as when the binder material 500 is exposed to an energy source coupled to, for example and without limitation, the recoat head.

The deposition region 917 of the build chamber 914 may be pre-heated to a pre-heat temperature prior to deposition, and/or during deposition of the build material 400 and the binder material 500. For example, in some embodiments, the deposition region 917 of the build chamber 914 may be pre-heated to a pre-heat temperature prior to deposition of the build material 400 and the binder material 500. The deposition region 917 of the build chamber 914 may be pre-heated using any of the plurality of heating elements 920 previously described. In some embodiments, the pre-heating is achieved with the plurality of heating elements 920 positioned around the build chamber 914 and/or below the build platform 120.

As stated previously, the plurality of heating elements 920 may be arranged in heating zones wherein each heating zone is independently actuatable by the control system 200 (depicted in FIG. 20). In embodiments, individual heating elements of the plurality of heating elements 920 that are positioned vertically above axis d may be part of a different heating zone than individual heating elements of the plurality of heating elements 920 that are positioned vertically below axis d. Therefore, individual heating elements of the plurality of heating elements 920 that are positioned vertically above axis d may be actuated to pre-heat the deposition region 917 of the build chamber 914 to the pre-heat temperature, whereas individual heating elements of the plurality of heating elements 920 that are positioned vertically below axis d may not be actuated or may be actuated to a different temperature than the heating elements positioned vertically above axis d.

If the pre-heat temperatures is too low, the binder material tends to seep into and diffuse into the powder material. If the pre-heat temperature is too high, the binder material may become too dry which, in turn, weakens the part. Accordingly, in the embodiments described herein, the pre-heat temperature may be less than or equal to 100° C., less than or equal to 90° C., less than or equal to 80° C., less than or equal to 75° C., less than or equal to 70° C., less than or equal to 65° C., less than or equal to 60° C., less than or equal to 55° C., less than or equal to 50° C., less than or equal to 40° C., or even less than or equal to 30° C. In some embodiments, the pre-heat temperature may range from 25° C. to 130° C., from 30° C. to 100° C., from 40° C. to 100° C., from 50° C. to 100° C., from 55° C. to 100° C., from 60° C. to 100° C., from 65° C. to 100° C., from 70° C. to 100° C., from 75° C. to 100° C., from 80° C. to 100° C., from 90° C. to 100° C., from 30° C. to 90° C., from 40° C. to 90° C., from 50° C. to 90° C., from 55° C. to 90° C., from 60° C. to 90° C., from 65° C. to 90° C., from 70° C. to 90° C., from 75° C. to 90° C., from 80° C. to 90° C., from 30° C. to 80° C., from 40° C. to 80° C., from 50° C. to 80° C., from 55° C. to 80° C., from 60° C. to 80° C., from 65° C. to 80° C., from 70° C. to 80° C., from 75° C. to 80° C., from 30° C. to 75° C., from 40° C. to 75° C., from 50° C. to 75° C., from 55° C. to 75° C., from 60° C. to 75° C., from 65° C. to 75° C., from 70° C. to 75° C., from 30° C. to 70° C., from 40° C. to 70° C., from 50° C. to 70° C., from 55° C. to 70° C., from 60° C. to 70° C., from 65° C. to 70° C., from 30° C. to 65° C., from 40° C. to 65° C., from 50° C. to 65° C., from 55° C. to 65° C., from 60° C. to 65° C., from 30° C. to 60° C., from 40° C. to 60° C., from 50° C. to 60° C., from 55° C. to 60° C., from 30° C. to 55° C., from 40° C. to 55° C., or from 50° C. to 55° C.

The aforementioned pre-heat temperatures may be used, for example, when the binder material is a water-based binder material. Accordingly, it should be understood that, for different binder materials (such as non-water-based binder materials) different pre-heat temperatures may be used.

Figure 21B:
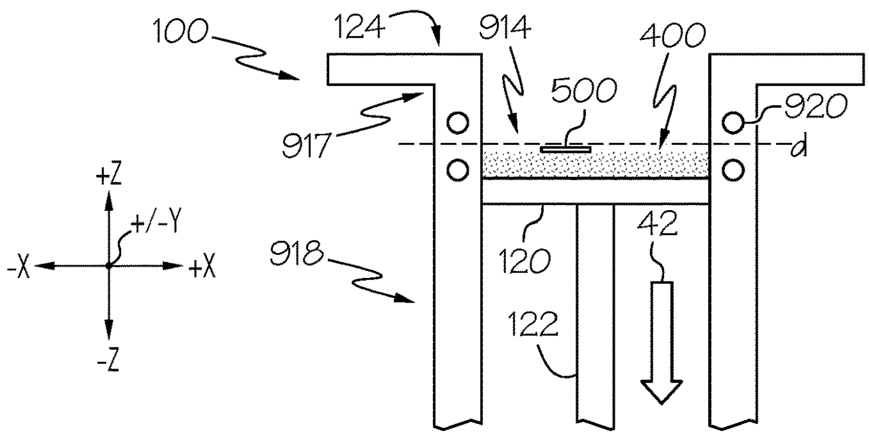
FIG. 21B schematically depicts the build receptacle of FIG. 16A in use according to one or more embodiments shown and described herein.

After distributing a layer of build material 400 on the build platform 120 positioned within the build chamber 914 and then depositing a layer of binder material 500 on the layer of build material 400 as described previously, the position of the build platform 120 may be adjusted in the downward vertical direction, as depicted in FIG. 21B. The position of the build platform 120 may be adjusted such that a portion of the build material 400 and the binder material 500 previously deposited in the build platform 120 is within the curing region 918 of the build chamber 914. Specifically, the build platform 120 may be adjusted by actuating the build platform 120 in the downward vertical direction (i.e. in the −Z direction of the coordinate axes depicted in the figures) with the build platform actuator 122 as indicated by arrow 42 to position a portion of the build material 400 and the binder material 500 within the curing region 918 of the build chamber 914.

The curing region 918 of the build chamber 914 may be heated to a curing temperature to cure the portion of build material 400 and binder material 500 within the curing region 918 of the build chamber 914. In embodiments, the curing temperature may be greater than the pre-heat temperature. The curing region 918 of the build chamber 914 may be heated using any of the plurality of heating elements 920 previously described. In some embodiments, the heating is achieved with the plurality of heating elements 920 positioned around the build chamber 914 and/or below the build platform 120.

As stated previously, in embodiments, individual heating elements of the plurality of heating elements 920 that are positioned vertically above axis d may be part of a different heating zone than individual heating elements of the plurality of heating elements 920 that are positioned vertically below axis d. Therefore, individual heating elements of the plurality of heating elements 920 that are positioned vertically below axis d may be actuated to heat the curing region 918 of the build chamber 914 to the curing temperature, whereas individual heating elements of the plurality of heating elements 920 that are positioned vertically above axis d may not be actuated, or may be actuated to pre-heat the deposition region 917 of the build chamber 914 to a pre-heat temperature.

The curing temperature (i.e., the temperature to which the curing region of the 918 of the build chamber 914 is heated) may range from 40° C. to 300° C., from 50° C. to 300° C., from 70° C. to 300° C., from 100° C. to 300° C., from 130° C. to 300° C., from 150° C. to 300° C., from 175° C. to 300° C., from 200° C. to 300° C., from 225° C. to 300° C., from 250° C. to 300° C., from 40° C. to 250° C., from 50° C. to 250° C., from 70° C. to 250° C., from 100° C. to 250° C., from 130° C. to 250° C., from 150° C. to 250° C., from 175° C. to 250° C., from 200° C. to 250° C., from 225° C. to 250° C., from 40° C. to 225° C., from 50° C. to 225° C., from 70° C. to 225° C., from 100° C. to 225° C., from 130° C. to 225° C., from 150° C. to 225° C., from 175° C. to 225° C., from 200° C. to 225° C., from 40° C. to 200° C., from 50° C. to 200° C., from 70° C. to 200° C., from 100° C. to 200° C., from 130° C. to 200° C., from 150° C. to 200° C., from 175° C. to 200° C., from 40° C. to 175° C., from 50° C. to 175° C., from 70° C. to 175° C., from 100° C. to 175° C., from 130° C. to 175° C., from 150° C. to 175° C., from 40° C. to 150° C., from 50° C. to 150° C., from 70° C. to 150° C., from 100° C. to 150° C., from 130° C. to 150° C., from 40° C. to 130° C., from 50° C. to 130° C., from 70° C. to 130° C., from 100° C. to 130° C., from 40° C. to 100° C., from 50° C. to 100° C., or from 70° C. to 100° C.

Referring to FIGS. 18 and 21A-21C, as previously discussed, the heating elements 920 may be arranged into independently actuatable heating zones 926. In embodiments, the heating zones 926 may be arranged to form a temperature gradient within the build chamber 914, where the top 978 of the build chamber 914 is heated to the pre-heat temperature and the bottom 970 of the build chamber 914 is heated to the curing temperature. In embodiments, the heating zones 926 may be arranged to form a temperature gradient within the build chamber 914, where the build chamber 914 above axis d is heated to the pre-heat temperature and the build chamber 914 below axis d is heated to the curing temperature. For example, and not by way of limitation, the heating elements 920 positioned above axis d may form a distinct heating zone, and may not be heated to greater than the pre-heat temperature. Additionally or alternatively, the heating elements 920 positioned below axis d may form a distinct heating zone, and may be heated to greater than the pre-heat temperature. In embodiments, the heating elements 920 below axis d may be heated to the curing temperature to facilitate curing of the binder material 500. In embodiments, the heating elements 920 positioned below axis d may be operated to create an increasing temperature gradient from axis d to the bottom 970 of the build chamber 914.

Figure 21C:
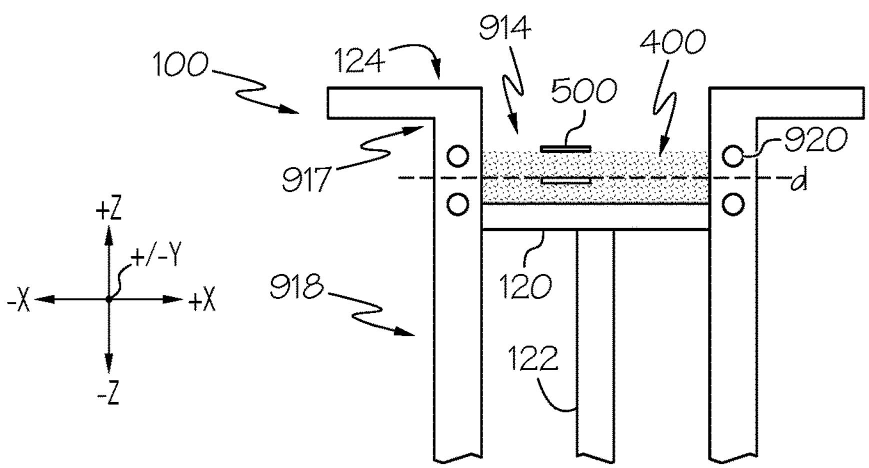
FIG. 21C schematically depicts the build receptacle of FIG. 16A in use according to one or more embodiments shown and described herein.

Referring now to FIG. 21C, the build cycle may begin again with a new layer of build material 400 and a new layer of binder material 500 distributed within the deposition region 917 on the build platform 120 and above the curing region.

In embodiments, the temperature of the curing region 918 may be detected during the thermal curing process. The control system, as previously described, may detect the temperature of the curing region 918 of the build chamber 914 through the use of temperature sensors. In some embodiments, the curing temperature of the curing region 918 of the build chamber 914 may be adjusted based on the detected temperature of the curing region 918. Without being bound by theory, the curing temperature of the curing region 918 of the build chamber 914 may be adjusted depending on the thermal conductivity of the build platform 120, the thermal conductivity of the sidewall 912 of the housing 910, and/or the thermal conductivity of the heating platen 810.

Further, in some embodiments, the temperature within the curing region 918 may be adjusted as a build operation progresses. For example, the temperature gradient between the axis d and the bottom 970 of the build chamber 914 may be reduced as the build operation progresses such that the temperature within the build chamber 914 is the same at the bottom 970 of the build chamber 914 as at the axis d.

As noted herein, the build receptacle 124A and methods for using the build receptacle 124A may be used in conjunction with one or more of the embodiments of the additive manufacturing apparatuses described herein, including the method of operating an additive manufacturing apparatus as described herein with respect to FIGS. 7A-7D.

Support Chassis

The foregoing description includes various embodiments of components of additive manufacturing apparatuses and methods for using the same. It should be understood that various combinations of these components may be included in additive manufacturing apparatuses and arranged in (or coupled to) a support chassis.

Figure 25:
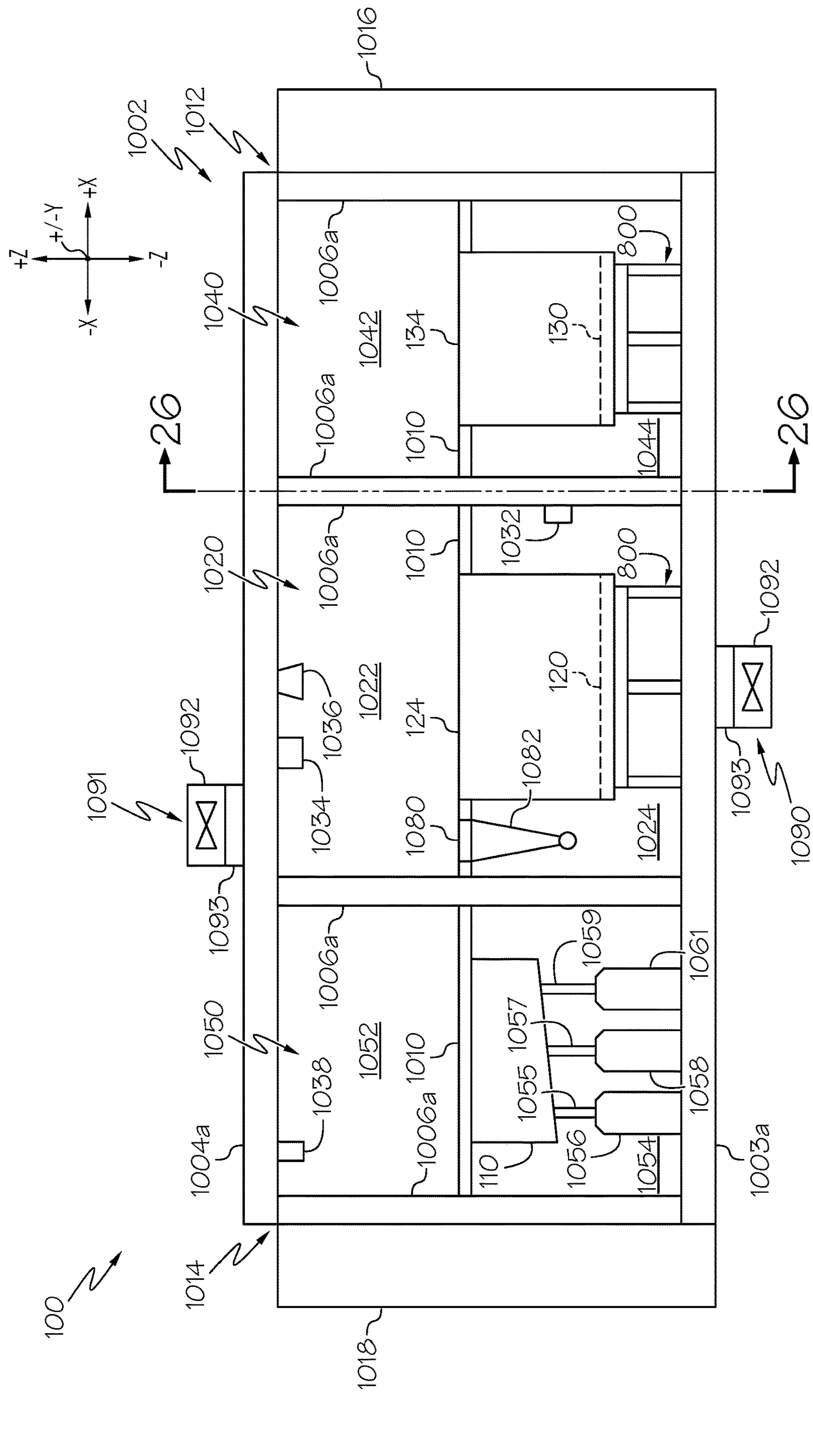
FIG. 25 schematically depicts an additive manufacturing apparatus comprising a support chassis according to one or more embodiments shown and described herein.
Figure 26:
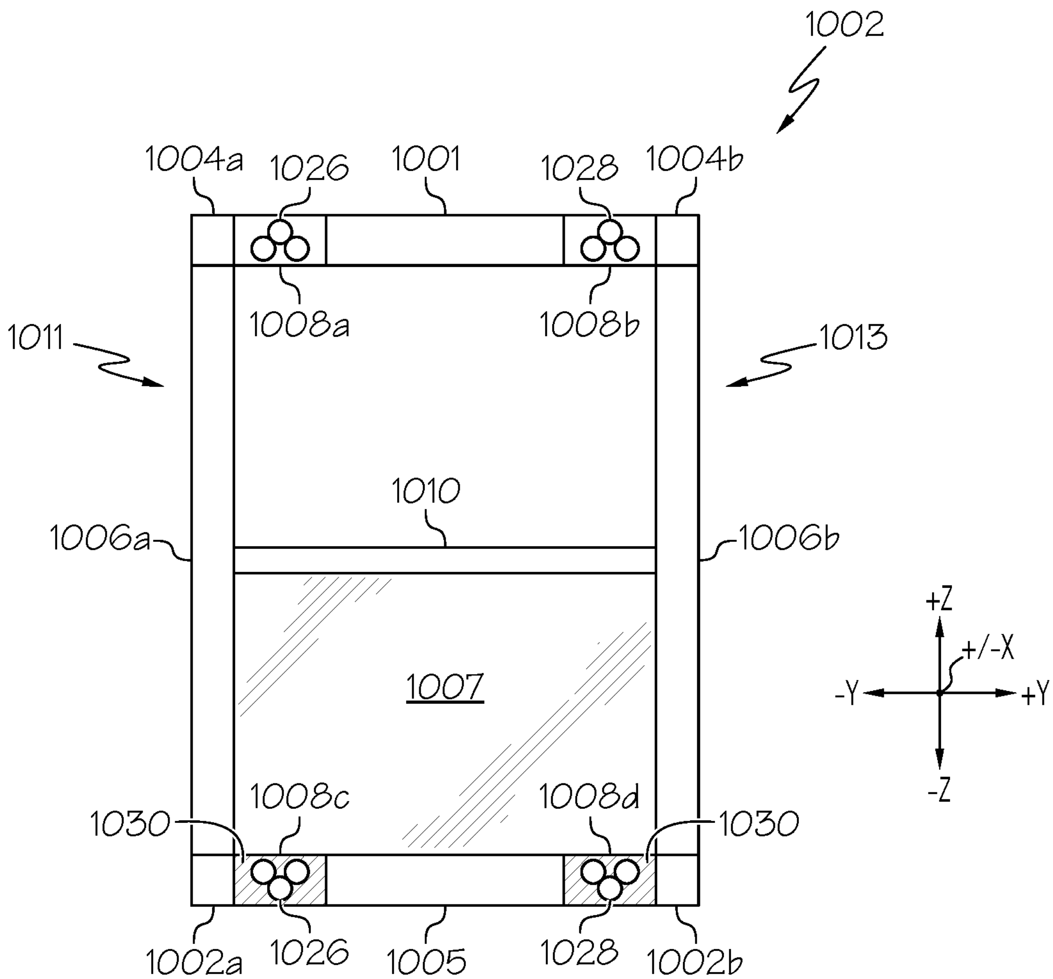
FIG. 26 schematically depicts a vertical cross section of the additive manufacturing apparatus of FIG. 25 according to one or more embodiments shown and described herein.

Referring to FIGS. 25 and 26 by way of example, the additive manufacturing apparatus 100 comprising a support chassis 1002 is schematically depicted. While specific reference is made herein to the support chassis as being a component of the additive manufacturing apparatus 100, it should be understood that the support chassis 1002 may be used in conjunction with any embodiment of an additive manufacturing apparatus described herein. The support chassis 1002 generally comprises a pair of lower horizontal support members 1003*a*, 1003*b*, a pair of upper horizontal support members 1004*a*, 1004*b* and a plurality of pairs of vertical support members 1006*a*, 1006*b* (one pair depicted in FIG. 26). Lower horizontal support member 1003*a* is spaced apart from lower horizontal support member 1003*b* in the lateral direction in a horizontal plane (i.e., the lower horizontal support member 1003*a* is spaced apart from lower horizontal support member 1003*b* in the +/−Y direction in a plane parallel to the Y-Z plane of the coordinate axes depicted in the figures). Similarly, upper horizontal support member 1004*a* is spaced apart from upper horizontal support member 1004*b* in the lateral direction in a horizontal plane (i.e., the upper horizontal support member 1004*a* is spaced apart from upper horizontal support member 1004*b* in the +/−Y direction in a plane parallel to the Y-Z plane of the coordinate axes depicted in the figures). The pair of upper horizontal support members 1004*a*, 1004*b* are spaced apart from the pair of lower horizontal support members 1003*a*, 1003*b* in the vertical direction (i.e., the +/−Z direction of the coordinate axes depicted in the figures). A top panel 1001 (FIG. 26) extends between the pair of upper horizontal support members 1004*a*, 1004*b*. Similarly, a floor panel 1005 (FIG. 26) extends between the pair of lower horizontal support members 1003*a*, 1003*b*.

Pairs of vertical support members 1006*a*, 1006*b* extend between and are coupled to the pair of lower horizontal support members 1003*a*, 1003*b* and the pair of upper horizontal support members 1004*a*, 1004*b*, as depicted in FIGS. 25 and 26. The pairs of vertical support members 1006*a*, 1006*b* segment the volume enclosed by the support chassis 1002 into a plurality of bays, specifically a build bay 1020, a material supply bay 1040 (also referred to as a recoat bay 1040), and a print bay 1050. In the embodiments described herein, the build bay 1020 is positioned between the material supply bay 1040 and the print bay 1050 along the working axis 116 (FIG. 2) of the additive manufacturing apparatus 100. Each of the build bay 1020, the material supply bay 1040, and the print bay 1050 will be described in further detail herein.

Still referring to FIGS. 25 and 26, the support chassis 1002 further comprises a working surface 1010 supported by the pairs of vertical support members 1006*a*, 1006*b* within the volume defined by the support chassis 1002. The working surface 1010 is generally horizontal (i.e., parallel to the X-Y plane of the coordinate axes depicted in the figures) and extends through each of the build bay 1020, the material supply bay 1040, and the print bay 1050. The working surface 1010 segments each of the build bay 1020, the material supply bay 1040, and the print bay 1050 into upper compartments 1022, 1042, 1052 and lower compartments 1024, 1044, 1054. In the embodiments described herein, the actuator assembly (not depicted in FIGS. 25 and 26) is positioned over the working surface 1010 and extends from the upper compartment 1052 of the print bay 1050, through the upper compartment 1022 of the build bay 1020, and into the upper compartment 1042 of the material supply bay 1040 such that the print head and recoat head associated with the actuator assembly are able to traverse over portions of the working surface 1010 of the additive manufacturing apparatus 100 along the working axis 116 (FIG. 2).

In the embodiments described herein, the pair of vertical support members 1006*a*, 1006*b* positioned between the print bay 1050 and the build bay 1020 and the pair of vertical support members 1006*a*, 1006*b* positioned between the print bay 1050 and the build bay 1020 each comprise a bulkhead 1007. Referring to FIG. 26 by way of example, a cross section of the additive manufacturing apparatus 100 through the line 26-26 of FIG. 25 is schematically depicted. As depicted in FIG. 26, the bulkhead 1007 extends from the working surface 1010 to the floor panel 1005 in the vertical direction (i.e., the +/−Z directions of the coordinate axes depicted in the figures) and from the vertical support member 1006*a* to the vertical support member 1006*b* in the lateral direction (i.e., the +/−Y directions of the coordinate axes depicted in the figures). The bulkhead 1007 is sealed to the working surface 1010, the floor panel 1005, and the vertical support members 1006*a*, 1006*b* such as with adhesives, mechanical seals, welds, or combinations thereof. Another bulkhead is similarly arranged between the vertical support members 1006*a*, 1006*b* separating the build bay 1020 and the print bay 1050. The bulkheads 1007, in conjunction with the working surface 1010, the floor panel 1005, and the build receptacle 124 (when installed in the build bay 1020) isolate the lower compartment 1024 of the build bay 1020 from the adjacent compartments of the additive manufacturing apparatus 100 which, in turn, assists in containment of loose build material disposed in the build receptacle 124.

Referring now to FIG. 25, in embodiments, the support chassis 1002 of the additive manufacturing apparatus 100 may further comprise a high voltage supply cabinet 1016 and a low voltage supply cabinet 1018. In embodiments, the high voltage supply cabinet 1016 is positioned on a first end 1012 of the support chassis 1002 and the low voltage supply cabinet 1018 is positioned on a second end 1014 of the support chassis 1002 opposite the first end 1012. The high voltage supply cabinet 1016 houses power supplies and associated electronics operating at voltages of 120 volts or greater, such as power supplies and associated electronics powering the motors, heaters, fans, etc. of the additive manufacturing apparatus 100. The low voltage supply cabinet 1018 houses power supplies and associated electronics operating at voltages of less than 120 volts, such as power supplies and associated electronics powering the control system, pumps, sensors, etc. of the additive manufacturing apparatus 100. Separating the high voltage supply cabinet 1016 from the low voltage supply cabinet 1018 avoids electro-magnetic interference with (and potential damage to) sensitive electronic components (such as control units, sensors, pumps, etc.) that operate at lower voltages due to the magnetic fields generated by power supplies and associated electronics operating with high voltage.

Referring again to FIGS. 25 and 26, in embodiments, the high voltage supply lines coupled into the high voltage supply cabinet 1016 and the low voltage supply lines coupled into the low voltage supply cabinet 1018 may also be physically separated to avoid electromagnetic interference. For example, in embodiments, the support chassis 1002 may further comprise cable trays 1008*a*, 1008*b*, 1008*c*, 1008*d* that extend along the length (or at least a portion of the length) of the support chassis 1002 in the +/−X direction of the coordinate axes depicted in the figures. For example, the support chassis 1002 may comprise a front 1011 and a back 1013. Cable trays 1008*a*, 1008*c* may be positioned proximate a front 1011 of the support chassis 1002 (i.e., distal from the back 1013 of the support chassis 1002) and cable trays 1008*b*, 1008*d* may be positioned proximate a back 1013 of the support chassis 1002. In embodiments, the cable trays 1008*a*, 1008*b*, 1008*c*, 1008*d* may be located proximate a top of the support chassis 1002 (i.e., proximate the top panel 1001 and distal from the floor panel 1005) and/or proximate a bottom of the support chassis 1002 (i.e., proximate the floor panel 1005 and distal from the top panel 1001). For example, in the embodiment depicted in FIG. 26, the cable trays 1008*a*, 1008*b* are positioned proximate the top of the support chassis 1002 while the cable trays 1008*c*, 1008*d* are positioned proximate the bottom of the support chassis 1002.

In embodiments, the low voltage supply lines 1026 are directed through cable trays 1008*a*, 1008*c* at the front 1011 of the support chassis 1002 and the high voltage supply lines 1028 are directed through cable trays 1008*b*, 1008*d* at the back 1013 of the support chassis 1002, as depicted in FIG. 26. In an alternative embodiment (not depicted), the low voltage supply lines 1026 may be directed through cable trays 1008*b*, 1008*d* at the back 1013 of the support chassis 1002 and the high voltage supply lines 1028 may be directed through cable trays 1008*a*, 1008*c* at the front 1011 of the support chassis 1002. As another alternative, the low voltage supply lines 1026 may be directed through cable trays 1008*c*, 1008*d* at the bottom of the support chassis 1002 and the high voltage supply lines 1028 may be directed through cable trays 1008*a*, 1008*b* at the top of the support chassis 1002. In yet another alternative, the high voltage supply lines 1028 may be directed through cable trays 1008*c*, 1008*d* at the bottom of the support chassis 1002 and the low voltage supply lines 1026 may be directed through cable trays 1008*a*, 1008*b* at the top of the support chassis 1002. Physically separating the high voltage supply lines 1028 from the low voltage supply lines 1026, as described herein avoids electromagnetic interference between the supply lines and the potential damage to sensitive electronic components.

In embodiments, the cable trays 1008*c*, 1008*d* extend through the lower compartments 1024, 1044, 1054 of the build bay 1020, material supply bay 1040, and print bay 1050, respectively. In these embodiments, the cable trays 1008*c*, 1008*d* may pass through the bulkhead 1007 between the build bay 1020 and the material supply bay 1040 and through the bulkhead 1007 between the build bay 1020 and the print bay 1050. To facilitate sealing the portions of the cable trays 1008*c*, 1008*d* that pass through the bulkheads 1007, the cable trays 1008*c*, 1008*d* may further comprise sealing glands 1030 which form a seal between the cable trays 1008*c*, 1008*d*, the bulkheads 1007 and any lines (or other conduits) passing through the bulkheads 1007 in the cable trays 1008*c*, 1008*d*.

Still referring to FIGS. 25 and 26, in addition to the low voltage supply lines 1026 and the high voltage supply lines 1028, the cable trays 1008*a*, 1008*b*, 1008*c*, 1008*d* may also comprise other lines or conduits. For example, in addition to the low voltage supply lines 1026 and the high voltage supply lines 1028, the cable trays 1008*a*, 1008*b*, 1008*c*, 1008*d* may also include air lines for supplying air to various components of the additive manufacturing apparatus 100, vacuum lines for supplying vacuum to various components of the additive manufacturing apparatus 100, and/or liquid lines for supplying liquid (e.g., binder, cleaning solution, cooling fluid(s) and the like) to various components of the additive manufacturing apparatus 100.

Referring again to FIG. 25, in the embodiments described herein, the print bay 1050 comprises a cleaning station 110 positioned in the working surface 1010 within the print bay 1050. The cleaning station 110 may be used, for example, to clean the print head (not depicted) of the additive manufacturing apparatus 100, as described herein. In embodiments, the lower compartment 1054 of the print bay 1050 may comprise a cleaning fluid supply tank 1056 (sometimes referred to herein as a cleaning fluid reservoir) fluidly coupled to the cleaning station 110 to supply fresh cleaning fluid to the cleaning station 110. The cleaning fluid supply tank 1056 may be fluidly coupled to the cleaning station 110 with supply line 1055. In embodiments, the lower compartment 1054 of the print bay 1050 may further comprise a cleaning fluid recovery tank 1058 fluidly coupled to the cleaning station 110 to collect used cleaning fluid from the cleaning station 110. The cleaning fluid recovery tank 1058 may be fluidly coupled to the cleaning station 110 with supply line 1057. In embodiments, the lower compartment 1054 of the print bay 1050 may further comprise a binder supply tank 1061 (sometimes referred to herein as a binder reservoir) fluidly coupled to the print head (not depicted) to the print head. The binder supply tank 1061 may be fluidly coupled to the print head with supply line 1059.

In embodiments, the lower compartment 1024 of the build bay 1020 comprises a build receptacle 124. In these embodiments, the working surface 1010 of the support chassis 1002 comprises an opening for receiving the build receptacle 124 such that the build receptacle 124 is removably positioned in the working surface 1010 and the lower compartment 1024 of the build bay 1020. This allows for the build receptacle 124 (and the contents thereof) to be removed from the additive manufacturing apparatus 100 after a build operation is completed and an empty build receptacle 124 to be installed in the working surface 1010 and lower compartment 1024 of the build bay 1020. The lower compartment of the build bay 1020 may further comprise a lift system 800 for raising and lowering the build platform 120 of the build receptacle 124, as described herein.

In embodiments, the lower compartment 1024 of the build bay 1020 may further comprise a build bay temperature sensor 1032 for detecting the temperature of the lower compartment of the build bay 1020. The build bay temperature sensor 1032 may be, for example, and without limitation, a thermocouple, thermopile, or similar temperature sensor. The build bay temperature sensor 1032 may be coupled to the control system 200 and provides the control system 200 with a signal indicative of the temperature of the lower compartment 1024 of the build bay 1020. The control system 200 may use this signal to monitor the temperature the lower compartment 1024 of the build bay 1020 and provide a warning signal if an over-temperature (e.g., an overheating condition) condition is present. In embodiments, the control system 200 may take remedial actions to correct the over-temperature condition, such as by increasing the airflow through the lower compartment 1024 of the build bay 1020 to reduce the temperature.

In embodiments, the build bay 1020 may further comprise a build temperature sensor 1034 located in the upper compartment 1022 of the build bay 1020. The build temperature sensor 1034 is oriented to detect the temperature of the build material located on the build platform 120. The build temperature sensor 1034 may be, for example, and without limitation, an infrared temperatures sensor, such as an infrared camera, a pyrometer, or a similar temperature sensor. The build temperature sensor 1034 may be coupled to the control system 200 (as described in further detail herein) and provides the control system 200 with a signal indicative of the temperature of the build material (and binder material) located on the build platform 120. The control system 200 may use this signal to monitor the temperature of the build material and adjust the heating of the build material (and binder material) in the build receptacle 124 with the energy sources of the recoat head 140 and/or the heating elements 920 of the build receptacle 124, as described herein.

In embodiments, the build bay 1020 may further comprise a camera system 1036 located in the upper compartment 1022 of the build bay 1020. The camera system 1036 is oriented to collect an image of the build material located on the build platform 120. The camera system 1036 may be coupled to the control system 200 (as described in further detail herein) and provides the control system 200 with a signal indicative of the image of the surface of the build material (and binder material) located on the build platform 120. The control system 200 may use this signal to monitor the deposition of the build material on the build platform 120 and adjust the operation of the build platform 120 of the build receptacle 124, the operation of the supply platform 130 of the supply receptacle 134 and/or the operation of the recoat head 140 to obtain a layer of build material with the desired characteristics (e.g., surface uniformity, thickness, or the like). Alternatively or additionally, the control system 200 may use this signal to monitor the deposition of the binder material on the build platform 120 and adjust the operation of the print head to achieve deposition of the binder material with the desired characteristics (e.g., surface uniformity, pattern uniformity, pattern consistency, or the like).

In addition to the foregoing, in embodiments, at least one of the build bay 1020, the material supply bay 1040, and the print bay 1050 may further comprise an environmental sensor 1038 for detecting an air temperature or a humidity within the support chassis 1002. The environmental sensor 1038 may comprise, for example, and without limitation, a hygrometer and/or a temperature sensor. The environmental sensor 1038 may be coupled to the control system 200 (as described in further detail herein) and provides the control system 200 with a signal indicative of the temperature and or humidity within the support chassis 1002. The control system 200 may use this signal to monitor the temperature and/or humidity within the support chassis 1002 and provide a warning signal if either the temperature and/or humidity within the support chassis 1002 is outside of a predetermined range. In embodiments, the control system 200 may take remedial actions to correct the temperature and/or humidity, such as by adjusting the airflow through the support chassis 1002.

In some embodiments, the lower compartment 1044 of the material supply bay 1040 comprises a supply receptacle 134. In these embodiments, the working surface 1010 of the support chassis 1002 comprises an opening for receiving the supply receptacle 134 such that the supply receptacle 134 is removably positioned in the working surface 1010 and the lower compartment 1044 of the material supply bay 1040. In embodiments, this may allow for an empty supply receptacle 134 to be extracted from the additive manufacturing apparatus 100 after a build operation is completed and full build receptacle 124 to be installed in the working surface 1010 and lower compartment 1044 of the material supply bay 1040. The lower compartment 1044 of the build bay 1020 may further comprise a lift system 800 for raising and lowering the supply platform 130 of the supply receptacle 134, as described herein.

While FIG. 25 depicts the material supply bay 1040 as comprising a supply receptacle 134 and a lift system 800, it should be understood that the supply receptacle 134 and the lift system 800 are optional and may be omitted in some embodiments, such as embodiments where the additive manufacturing apparatus 100 comprises a hopper for distributing the build material rather than supply receptacle.

Figure 27:
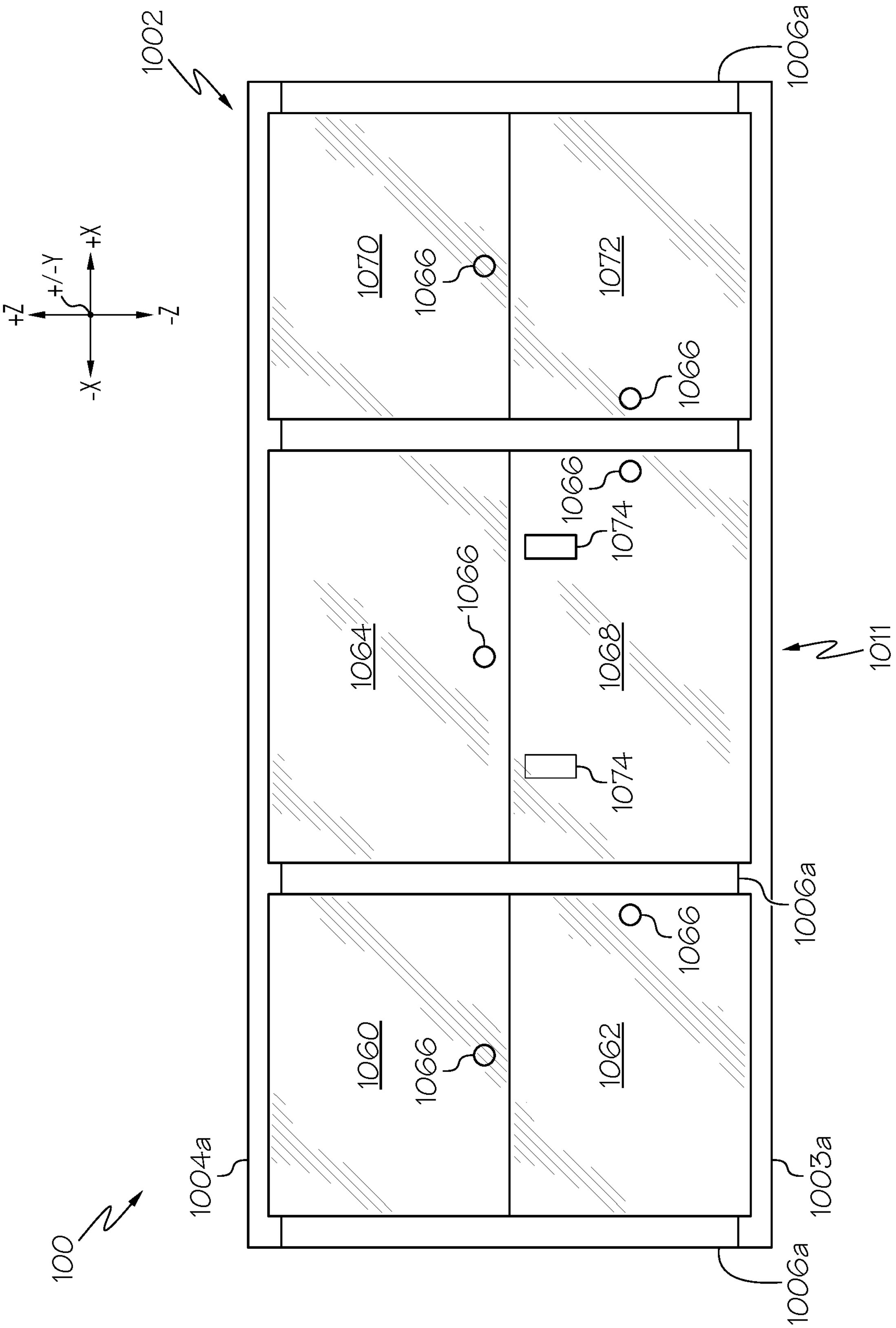
FIG. 27 schematically depicts the additive manufacturing apparatus of FIG. 25 further comprising access panels coupled to the support chassis according to one or more embodiments shown and described herein.

Referring now to FIGS. 25 and 27, the additive manufacturing apparatus 100 may further comprise at least one access panel coupled to the lower compartment 1024, 1044, 1054 of each of the build bay 1020, the material supply bay 1040, and the print bay 1050 and at least one access panel coupled to the upper compartment 1022, 1042, 1052 of each of the build bay 1020, the material supply bay 1040, and the print bay 1050.

For example, the upper compartment 1022 of the build bay 1020 comprises an upper access panel 1064 hingedly coupled to the upper horizontal support member 1004*a* at the front 1011 of the additive manufacturing apparatus 100. The upper access panel 1064 may comprise a latch 1066 for latching the upper access panel 1064 to the working surface 1010 or a vertical support member 1006*a*. In embodiments, seals (not depicted) may be disposed between the upper access panel 1064 and the upper horizontal support member 1004*a*, the vertical support members 1006*a*, and the working surface 1010 to facilitate sealing the upper access panel 1064 to the support chassis 1002 when the upper access panel 1064 is in a closed position.

Further, the lower compartment 1024 of the build bay 1020 comprises a lower access panel 1068 hingedly coupled to the vertical support member 1006*a* at the front 1011 of the additive manufacturing apparatus 100, between the build bay 1020 and the material supply bay 1040 or between the build bay 1020 and the print bay 1050. The lower access panel 1068 may comprise a latch 1066 for latching the lower access panel 1068 to the working surface 1010 or a vertical support member 1006*a*. In embodiments, seals (not depicted) may be disposed between the lower access panel 1068 and the lower horizontal support member 1003*a*, the vertical support members 1006*a*, and the working surface 1010 to facilitate sealing the lower access panel 1068 to the support chassis 1002 when the lower access panel 1068 is in a closed position. In embodiments, the lower compartment 1024 of the build bay 1020 may comprise air inlets 1074 proximate the top of the compartment (i.e., proximate to but below the working surface 1010). In embodiments, the air inlets 1074 extend through the lower access panel 1068 of the build bay 1020.

Still referring to FIGS. 25 and 27, the upper compartment 1042 of the material supply bay 1040 comprises an upper access panel 1070 hingedly coupled to the upper horizontal support member 1004*a* at the front 1011 of the additive manufacturing apparatus 100. The upper access panel 1070 may comprise a latch 1066 for latching the upper access panel 1070 to the working surface 1010 or a vertical support member 1006*a*. In embodiments, seals (not depicted) may be disposed between the upper access panel 1070 and the upper horizontal support member 1004*a*, the vertical support members 1006*a*, and the working surface 1010 to facilitate sealing the upper access panel 1070 to the support chassis 1002 when the upper access panel 1070 is in a closed position.

Further, the lower compartment 1044 of the material supply bay 1040 comprises a lower access panel 1072 hingedly coupled to the vertical support member 1006*a* at the first end 1012 of the support chassis 1002 at the front 1011 of the additive manufacturing apparatus 100. The lower access panel 1072 may comprise a latch 1066 for latching the lower access panel 1072 to the working surface 1010 or a vertical support member 1006*a*. In embodiments, seals (not depicted) may be disposed between the lower access panel 1072 and the lower horizontal support member 1003*a*, the vertical support members 1006*a*, and the working surface 1010 to facilitate sealing the lower access panel 1072 to the support chassis 1002 when the lower access panel 1072 is in a closed position.

The upper compartment 1052 of the print bay 1050 comprises an upper access panel 1060 hingedly coupled to the upper horizontal support member 1004*a* at the front 1011 of the additive manufacturing apparatus 100. The upper access panel 1060 may comprise a latch 1066 for latching the upper access panel 1060 to the working surface 1010 or a vertical support member 1006*a*. In embodiments, seals (not depicted) may be disposed between the upper access panel 1060 and the upper horizontal support member 1004*a*, the vertical support members 1006*a*, and the working surface 1010 to facilitate sealing the upper access panel 1060 to the support chassis 1002 when the upper access panel 1060 is in a closed position.

Further, the lower compartment 1054 of the print bay 1050 comprises a lower access panel 1062 hingedly coupled to the vertical support member 1006*a* at the second end 1014 of the support chassis 1002 at the front 1011 of the additive manufacturing apparatus 100. The lower access panel 1062 may comprise a latch 1066 for latching the lower access panel 1062 to the working surface 1010 or a vertical support member 1006*a*. In embodiments, seals (not depicted) may be disposed between the lower access panel 1062 and the lower horizontal support member 1003*a*, the vertical support members 1006*a*, and the working surface 1010 to facilitate sealing the lower access panel 1062 to the support chassis 1002 when the lower access panel 1062 is in a closed position.

While FIG. 27 schematically depicts the upper and lower access panels disposed on the front 1011 of the additive manufacturing apparatus 100, it should be understood that the back 1013 of the additive manufacturing apparatus 100 may include similar access panels.

In the embodiment depicted in FIG. 27 the upper access panels 1060, 1064, 1070 may be constructed of a transparent material, such as plastic or glass, to allow the build process of the additive manufacturing apparatus 100 to be visually monitored. Optionally, the lower access panels 1062, 1069, 1072 may be constructed of a transparent material, such as plastic or glass.

Still referring to FIGS. 25 and 27, in embodiments, the additive manufacturing apparatus further comprises a lower exhaust system 1090 coupled to the lower compartment 1024 of the build bay 1020 proximate to the bottom of the lower compartment 1024. In the embodiment depicted in FIG. 25, the lower exhaust system 1090 is coupled to the floor panel of the build bay 1020. However, it should be understood the lower exhaust system 1090 may be coupled to, for example, the lower access panel 1068 of the build bay 1020. The lower exhaust system 1090 generally comprises an exhaust fan 1092 and, optionally, a filter 1093, such as a HEPA filter. The exhaust fan 1092 is communicatively coupled to the control system 200 that controls the speed of the fan and, therefore, the amount of air drawn through the fan per unit of time. The control system 200 may also control the direction of rotation of the fan so that air can either be drawn into the lower compartment 1024 of the build bay 1020 or expelled from the lower compartment 1024 of the build bay 1020.

In embodiments, the lower exhaust system 1090 is operated to draw air out of the build bay 1020, such as out of the lower compartment 1024 of the build bay 1020. In these embodiments, fresh air is drawn into the lower compartment 1024 through the air inlets 1074 and is exhausted from the lower compartment 1024 through the lower exhaust system 1090. The exhausted air passes through filter 1093 to remove particulates, such as particulates of build material, from the air. The air circulating through the lower compartment 1024 assists in preventing the buildup of heat in the lower compartment 1024 around the build receptacle 124. In addition, exhausting air through the lower exhaust system 1090 may aid in reducing particulates of build material in the air in the lower compartment 1024, thereby reducing the potential of fouling the components of the additive manufacturing apparatus 100. As noted hereinabove, the control system 200 may utilize the build bay temperature sensor 1032 to determine the temperature of the lower compartment 1024 and, based on the temperature, operate the exhaust fan 1092 of the lower exhaust system 1090 to maintain the temperature of the lower compartment 1024 within a predetermined range.

In embodiments, the additive manufacturing apparatus further comprises an upper exhaust system 1091 coupled to the top panel 1001 of the support chassis 1002. The upper exhaust system 1091 generally comprises an exhaust fan 1092 and, optionally, a filter 1093, such as a HEPA filter. The exhaust fan 1092 is communicatively coupled to the control system 200 that controls the speed of rotation of the fan and, therefore, the amount of air drawn through the fan per unit of time. The control system 200 may also control the direction of rotation of the fan so that air can either be drawn into the support chassis 1002 or expelled from the support chassis 1002.

In embodiments, the upper exhaust system 1091 is operated to draw air out of the volume enclosed by the support chassis 1002. The exhausted air passes through filter 1093 to remove particulates, such as particulates of build material, from the air. Exhausting air through the upper exhaust system 1091 may aid in regulating the temperature and/or humidity around the build platform 120. In addition, exhausting air through the upper exhaust system 1091 may aid in reducing particulates of build material in the air within the volume of the support chassis 1002, thereby reducing the potential of fouling the components of the additive manufacturing apparatus 100. As noted hereinabove, the control system 200 may utilize the environmental sensor 1038 to determine the temperature and/or humidity within the support chassis 1002 and, based on the temperature and/or humidity, operate the exhaust fan 1092 of the upper exhaust system 1091 to maintain the temperature and/or humidity within a predetermined range.

Referring now to FIGS. 25 and 28, the additive manufacturing apparatus 100 may further comprise a powder recovery slot 1080 extending through the working surface 1010 in one of the build bay 1020 or the material supply bay 1040. In the embodiment depicted in FIGS. 25 and 28, the powder recovery slot is in the build bay 1020. The powder recovery slot 1080 may be positioned in the working surface 1010 between the build receptacle 124 and the cleaning station 110 such that excess build material from the build receptacle 124 is pushed into the powder recovery slot 1080 when build material is distributed onto the build platform 120 with the recoat head (not depicted). In embodiments, the powder recovery slot 1080 is coupled to a recovery funnel 1082 positioned below the working surface 1010. The recovery funnel 1082 may have a cone angle θ of less than or equal to 60 degrees with respect to vertical to ensure that particulate matter, such as build material, flows through the recovery funnel 1082 without sticking to the sidewalls of the recovery funnel 1082.

In embodiments, the recovery funnel 1082 is fluidly coupled to a vacuum system 1102. The vacuum system 1102 applies a negative pressure to the recovery funnel 1082 and the powder recovery slot 1080 that, in turn, aids in drawing build material through the powder recovery slot 1080 and the recovery funnel 1082. The vacuum system 1102 is coupled to a sieve system 1110 such that the vacuum system 1102 directs the recovered build material into the sieve system 1110. The sieve system 1110 screens the recovered build material, removing agglomerated build material, agglomerated binder material, or the like, such that the recovered build material can be reused in the additive manufacturing apparatus 100.

Still referring to FIG. 28, in embodiments, the recoat head 140 of the actuator assembly 102 comprises a containment housing 1112 for collecting lofted build material during a recoat operation. The containment housing 1112 is fluidly coupled to the vacuum system 1102. The vacuum system 1102 applies a negative pressure to the containment housing 1112 such that build material is drawn into the containment housing 1112. The vacuum system 1102 is coupled to a sieve system 1110 such that the vacuum system 1102 directs the recovered build material from the containment housing 1112 into the sieve system 1110. The sieve system 1110 screens the recovered build material, removing agglomerated build material, agglomerated binder material, or the like, such that the recovered build material can be reused in the additive manufacturing apparatus 100.

The sieve system 1110 may also be coupled to a de-powdering station 1150. As described herein, the de-powdering station 1150 comprises a lift system 800 to facilitate raising a build platform 120 of a build receptacle 124 during a de-powdering operation. In embodiments, the de-powdering station 1150 may also have electrical connections for power the heating elements of the build receptacle such as when the build receptacle is as described herein with respect to FIGS. 16A, 17, and 18. The de-powdering station in fluidly coupled to a vacuum system 1111. Loose build material from the build receptacle 124 may be drawn out of the build receptacle 124 with vacuum system 1111. The vacuum system 1111 is coupled to a sieve system 1110 such that the vacuum system 1111 directs the recovered build material from the de-powdering station 1150 into the sieve system 1110. The sieve system 1110 screens the recovered build material, removing agglomerated build material, agglomerated binder material, or the like, such that the recovered build material can be reused in the additive manufacturing apparatus 100.

Still referring to FIG. 28, in embodiments, the print head 150 of the actuator assembly 102 is coupled to an air pump 1115. Specifically, the print head 150 comprises a housing 151 and the air pump 1115 is fluidly coupled to the housing 151 and provides an overpressure to the housing 151. The overpressure in the housing 151 prevents the intrusion of entry of build material into the print head 150, thereby reducing the potential of fouling the components of the print head 150.

Recoat Assemblies

While FIGS. 2-28 depict embodiments of additive manufacturing systems including a recoat head 140, it should be understood that other embodiments are possible and contemplated. For example, in some embodiments, recoat assemblies include one or more sensors that detect forces acting on the recoat assembly. By detecting forces acting on the recoat assembly, defects may be identified and one or more parameters related to the operation of the recoat assembly may be adjusted to optimize the performance of the recoat assembly. In some embodiments, recoat assemblies described herein may include multiple redundant components, such as rollers and energy sources, such that the recoat assembly may continue operation in the event of failure of one or more components of the recoat assemblies. In some embodiments, recoat assemblies described herein are in fluid communication with a vacuum that acts to collect and contain airborne build material. It should be understood that as referred to herein, the terms “recoat head” and “recoat assembly” are used interchangeably.

Figure 29A:
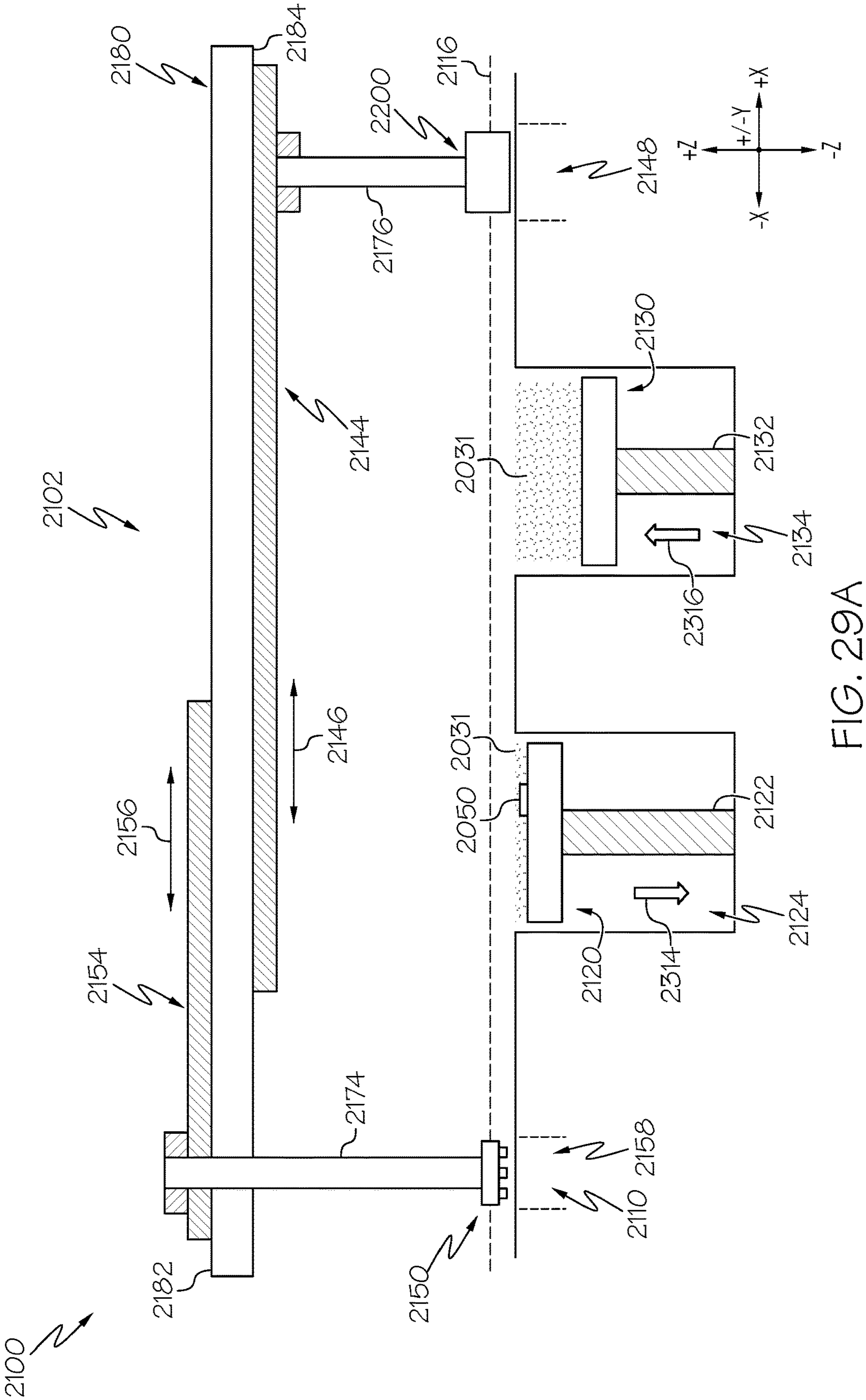
FIG. 29A schematically depicts an additive manufacturing system, according to one or more embodiments shown and described herein.

Referring now to FIG. 29A, an embodiment of an additive manufacturing system 2100 is schematically depicted. The system 2100 includes a cleaning station 2110, a build area 2124, a supply platform 2130, and an actuator assembly 2102. The actuator assembly 2102 comprises, among other elements, a recoat assembly 2200 for distributing build material 2031 and a print head 2150 for depositing binder material 2050. The actuator assembly 2102 is constructed to facilitate traversing the recoat assembly 2200 and the print head 2150 over the working axis of the system 2100 independent of one another. This allows for at least some steps of the additive manufacturing process to be performed simultaneously thereby reducing the overall cycle time of the additive manufacturing process to less than the sum of the cycle time for each individual step. In the embodiments of the system 2100 described herein, the working axis 2116 of the system 2100 is parallel to the +/−X axis of the coordinate axes depicted in the figures. It should be understood that the components of the additive manufacturing system 2100 traversing the working axis 2116, such as the recoat head 2140, the print head 2150, or the like, need not be centered on the working axis 2116. However, in the embodiments described herein, at least two of the components of the additive manufacturing system 2100 are arranged with respect to the working axis 2116 such that, as the components traverse the working axis, the components could occupy the same or an overlapping volume along the working axis if not properly controlled.

In the embodiments described herein, the cleaning station 2110, the build platform 2120, and the supply platform 2130 are positioned in series along the working axis 2116 of the system 2100 between a print home position 2158 of the print head 2150 located proximate an end of the working axis 2116 in the −X direction, and a recoat home position 2148 of the recoat assembly 2200 located proximate an end of the working axis 2116 in the +X direction. That is, the print home position 2158 and the recoat home position 2148 are spaced apart from one another in a horizontal direction that is parallel to the +/−X axis of the coordinate axes depicted in the figures and the cleaning station 2110, the build area 2124, and the supply platform 2130 are positioned therebetween. In the embodiments described herein, the build area 2124 is positioned between the cleaning station 2110 and the supply platform 2130 along the working axis 2116 of the system 2100.

The cleaning station 2110 is positioned proximate one end of the working axis 2116 of the system 2100 and is co-located with the print home position 2158 where the print head 2150 is located or “parked” before and after depositing binder material 2050 on a layer of build material 2031 positioned on the build area 2124. The cleaning station 2110 may include one or more cleaning sections (not shown) to facilitate cleaning the print head 2150 between depositing operations. The cleaning sections may include, for example and without limitation, a soaking station containing a cleaning solution for dissolving excess binder material on the print head 2150, a wiping station for removing excess binder material from the print head 2150, a jetting station for purging binder material and cleaning solution from the print head 2150, a park station for maintaining moisture in the nozzles of the print head 2150, or various combinations thereof. The print head 2150 may be transitioned between the cleaning sections by the actuator assembly 2102.

While reference is made herein to additive manufacturing systems including a print head 2150 that dispenses a binder material 2050, it should be understood that recoat assemblies 2200 described herein may be utilized with other suitable additive powder-based additive manufacturing systems. For example, in some embodiments, instead of building objects with a cured binder material 2050 applied to build material 2031, in some embodiments, a laser or other energy source may be applied to the build material 2031 to fuse the build material 2031.

In the embodiment depicted in FIG. 29A, the build area 2124 comprises a receptacle including a build platform 2120. The build platform 2120 is coupled to a build platform actuator 2122 to facilitate raising and lowering the build platform 2120 relative to the working axis 2116 of the system 2100 in a vertical direction (i.e., a direction parallel to the +/−Z directions of the coordinate axes depicted in the figures). The build platform actuator 2122 may be, for example and without limitation, a mechanical actuator, an electro-mechanical actuator, a pneumatic actuator, a hydraulic actuator, or any other actuator suitable for imparting linear motion to the build platform 2120 in a vertical direction. Suitable actuators may include, without limitation, a worm drive actuator, a ball screw actuator, a pneumatic piston, a hydraulic piston, an electro-mechanical linear actuator, or the like. The build platform 2120 and build platform actuator 2122 are positioned in a build area 2124 located below the working axis 2116 (i.e., in the −Z direction of the coordinate axes depicted in the figures) of the system 2100. During operation of the system 2100, the build platform 2120 is retracted into the build area 2124 by action of the build platform actuator 2122 after each layer of binder material 2050 is deposited on the build material 2031 located on build platform 2120. While the build area 2124 described and depicted herein includes a receptacle, it should be understood that the build area 2124 may include any suitable structure for supporting build material 2031, and may for example include a mere surface supporting the build material 2031.

The supply platform 2130 is coupled to a supply platform actuator 2132 to facilitate raising and lowering the supply platform 2130 relative to the working axis 2116 of the system 2100 in a vertical direction (i.e., a direction parallel to the +/−Z directions of the coordinate axes depicted in the figures). The supply platform actuator 2132 may be, for example and without limitation, a mechanical actuator, an electro-mechanical actuator, a pneumatic actuator, a hydraulic actuator, or any other actuator suitable for imparting linear motion to the supply platform 2130 in a vertical direction. Suitable actuators may include, without limitation, a worm drive actuator, a ball screw actuator, a pneumatic piston, a hydraulic piston, an electro-mechanical linear actuator, or the like. The supply platform 2130 and supply platform actuator 2132 are positioned in a supply receptacle 2134 located below the working axis 2116 (i.e., in the −Z direction of the coordinate axes depicted in the figures) of the system 2100. During operation of the system 2100, the supply platform 2130 is raised relative to the supply receptacle 2134 and towards the working axis 2116 of the system 2100 by action of the supply platform actuator 2132 after a layer of build material 2031 is distributed from the supply platform 2130 to the build platform 2120, as will be described in further detail herein.

In embodiments, the actuator assembly 2102 generally includes a recoat assembly transverse actuator 2144, a print head actuator 2154, a first guide 2182, and a second guide 2184. The recoat assembly transverse actuator 2144 is operably coupled to the recoat assembly 2200 and is operable to move the recoat assembly 2200 relative to the build platform 2120 to dispense build material 2031 on the build platform 2120, as described in greater detail herein. The print head actuator 2154 is operably coupled to the print head 2150 and is operable to move the print head 2150 and is operable to move the print head 2150 relative to the build platform 2120 to dispense the binder material 2050 on the build platform 2120.

In the embodiments described herein, the first guide 2182 and the second guide 2184 extend in a horizontal direction (i.e., a direction parallel to the +/−X direction of the coordinate axes depicted in the figures) parallel to the working axis 2116 of the system 2100 and are spaced apart from one another in the vertical direction. When the actuator assembly 2102 is positioned over the cleaning station 2110, the build platform 2120, and the supply platform 2130 as depicted in FIG. 29A, the first guide 2182 and the second guide 2184 extend in a horizontal direction from at least the cleaning station 2110 to beyond the supply platform 2130.

In one embodiment, such as the embodiment of the actuator assembly 2102 depicted in FIG. 29A, the first guide 2182 and the second guide 2184 are opposite sides of a rail 2180 that extends in a horizontal direction and is oriented such that the first guide 2182 is positioned above and spaced apart from the second guide 2184. For example, in one embodiment, the rail 2180 has an "I" configuration in vertical cross section (i.e., a cross section in the Y-Z plane of the coordinate axes depicted in the figures) with the upper and lower flanges of the "I" forming the first guide 2182 and the second guide 2184, respectively. However, it should be understood that other embodiments are contemplated and possible. For example and without limitation, the first guide 2182 and the second guide 2184 may be separate structures, such as separate rails, extending in the horizontal direction and spaced apart from one another in the vertical direction. In some embodiments, the first guide 2182 and the second guide 2184 may be positioned at the same height and spaced apart from one another on opposite sides of the rail 2180. In embodiments, the first guide 2182 and the second guide 2184 are positioned in any suitable configuration, and may be collinear.

In the embodiments described herein, the recoat assembly transverse actuator 2144 is coupled to one of the first guide 2182 and the second guide 2184 and the print head actuator 2154 is coupled to the other of the first guide 2182 and the second guide 2184 such that the recoat assembly transverse actuator 2144 and the print head actuator 2154 are arranged in a "stacked" configuration. For example, in the embodiment of the actuator assembly 2102 depicted in FIG. 29A, the recoat assembly transverse actuator 2144 is coupled to the second guide 2184 and the print head actuator 2154 is coupled to the first guide 2182. However, it should be understood that, in other embodiments (not depicted) the recoat assembly transverse actuator 2144 may be coupled to the first guide 2182 and the print head actuator 2154 may be coupled to the second guide 2184.

In the embodiments described herein, the recoat assembly transverse actuator 2144 is bi-directionally actuatable along a recoat motion axis 2146 and the print head actuator 2154 is bi-directionally actuatable along a print motion axis 2156. That is, the recoat motion axis 2146 and the print motion axis 2156 define the axes along which the recoat assembly transverse actuator 2144 and the print head actuator 2154 are actuatable, respectively. The recoat motion axis 2146 and the print motion axis 2156 extend in a horizontal direction and are parallel with the working axis 2116 of the system 2100. In the embodiments described herein, the recoat motion axis 2146 and the print motion axis 2156 are parallel with one another and spaced apart from one another in the vertical direction due to the stacked configuration of the recoat assembly transverse actuator 2144 and the print head actuator 2154. In some embodiments, such as the embodiment of the actuator assembly 2102 depicted in FIG. 29A, the recoat motion axis 2146 and the print motion axis 2156 are located in the same vertical plane (i.e., a plane parallel to the X-Z plane of the coordinate axes depicted in the figures). However, it should be understood that other embodiments are contemplated and possible, such as embodiments in which the recoat motion axis 2146 and the print motion axis 2156 are located in different vertical planes.

In the embodiments described herein, the recoat assembly transverse actuator 2144 and the print head actuator 2154 may be, for example and without limitation, mechanical actuators, electro-mechanical actuators, pneumatic actuators, hydraulic actuators, or any other actuator suitable for providing linear motion. Suitable actuators may include, without limitation, worm drive actuators, ball screw actuators, pneumatic pistons, hydraulic pistons, electro-mechanical linear actuators, or the like. In one particular embodiment, the recoat assembly transverse actuator 2144 and the print head actuator 2154 are linear actuators manufactured by Aerotech® Inc. of Pittsburgh, Pennsylvania, such as the PRO225LM Mechanical Bearing, Linear Motor Stage.

In embodiments, the recoat assembly transverse actuator 2144 and the print head actuator 2154 may each be a cohesive sub-system that is affixed to the rail 2180, such as when the recoat assembly transverse actuator 2144 and the print head actuator 2154 are PRO225LM Mechanical Bearing, Linear Motor Stages, for example. However, it should be understood that other embodiments are contemplated and possible, such as embodiments where the recoat assembly transverse actuator 2144 and the print head actuator 2154 comprise multiple components that are individually assembled onto the rail 2180 to form the recoat assembly transverse actuator 2144 and the print head actuator 2154, respectively.

Still referring to FIG. 29A, the recoat assembly 2200 is coupled to the recoat assembly transverse actuator 2144 such that the recoat assembly 2200 is positioned below (i.e., in the −Z direction of the coordinate axes depicted in the figures) the first guide 2182 and the second guide 2184. When the actuator assembly 2102 is positioned over the cleaning station 2110, the build platform 2120, and the supply platform 2130 as depicted in FIG. 29A, the recoat assembly 2200 is situated on the working axis 2116 of the system 2100. Thus, bi-directional actuation of the recoat assembly transverse actuator 2144 along the recoat motion axis 2146 affects bi-directional motion of the recoat assembly 2200 on the working axis 2116 of the system 2100. In the embodiment of the actuator assembly 2102 depicted in FIG. 29A, the recoat assembly 2200 is coupled to the recoat assembly transverse actuator 2144 with support bracket 2176 such that the recoat assembly 2200 is positioned on the working axis 2116 of the system 2100 while still providing clearance between rail 2180 of the actuator assembly 2102 and the build platform 2120 and the supply platform 2130. In some embodiments described herein, the recoat assembly 2200 may be fixed in directions orthogonal to the recoat motion axis 2146 and the working axis 2116 (i.e., fixed along the +/−Z axis and/or fixed along the +/−Y axis).

Similarly, the print head 2150 is coupled to the print head actuator 2154 such that the print head 2150 is positioned below (i.e., in the −Z direction of the coordinate axes depicted in the figures) the first guide 2182 and the second guide 2184. When the actuator assembly 2102 is positioned over the cleaning station 2110, the build platform 2120, and the supply platform 2130 as depicted in FIG. 29A, the print head 2150 is situated on the working axis 2116 of the system 2100. Thus, bi-directional actuation of the print head actuator 2154 along the print motion axis 2156 affects bi-directional motion of the print head 2150 on the working axis 2116 of the system 2100. In the embodiment of the actuator assembly 2102 depicted in FIG. 29A, the print head 2150 is coupled to the print head actuator 2154 with support bracket 2174 such that the print head 2150 is positioned on the working axis 2116 of the system 2100 while still providing clearance between rail 2180 of the actuator assembly 2102 and the build platform 2120 and the supply platform 2130. In some embodiments described herein, the print head 2150 may be fixed in directions orthogonal to the print motion axis 2156 and the working axis 2116 (i.e., fixed along the +/−Z axis and/or fixed along the +/−Y axis).

While FIG. 29A schematically depicts an embodiment of an actuator assembly 2102 which comprises a first guide 2182 and a second guide 2184 with the recoat assembly transverse actuator 2144 and the print head actuator 2154 mounted thereto, respectively, it should be understood that other embodiments are contemplated and possible, such as embodiments which comprise more than two guides and more than two actuators. It should also be understood that other embodiments are contemplated and possible, such as embodiments which comprise the print head and the recoat assembly 2200 on the same actuator.

Figure 29B:
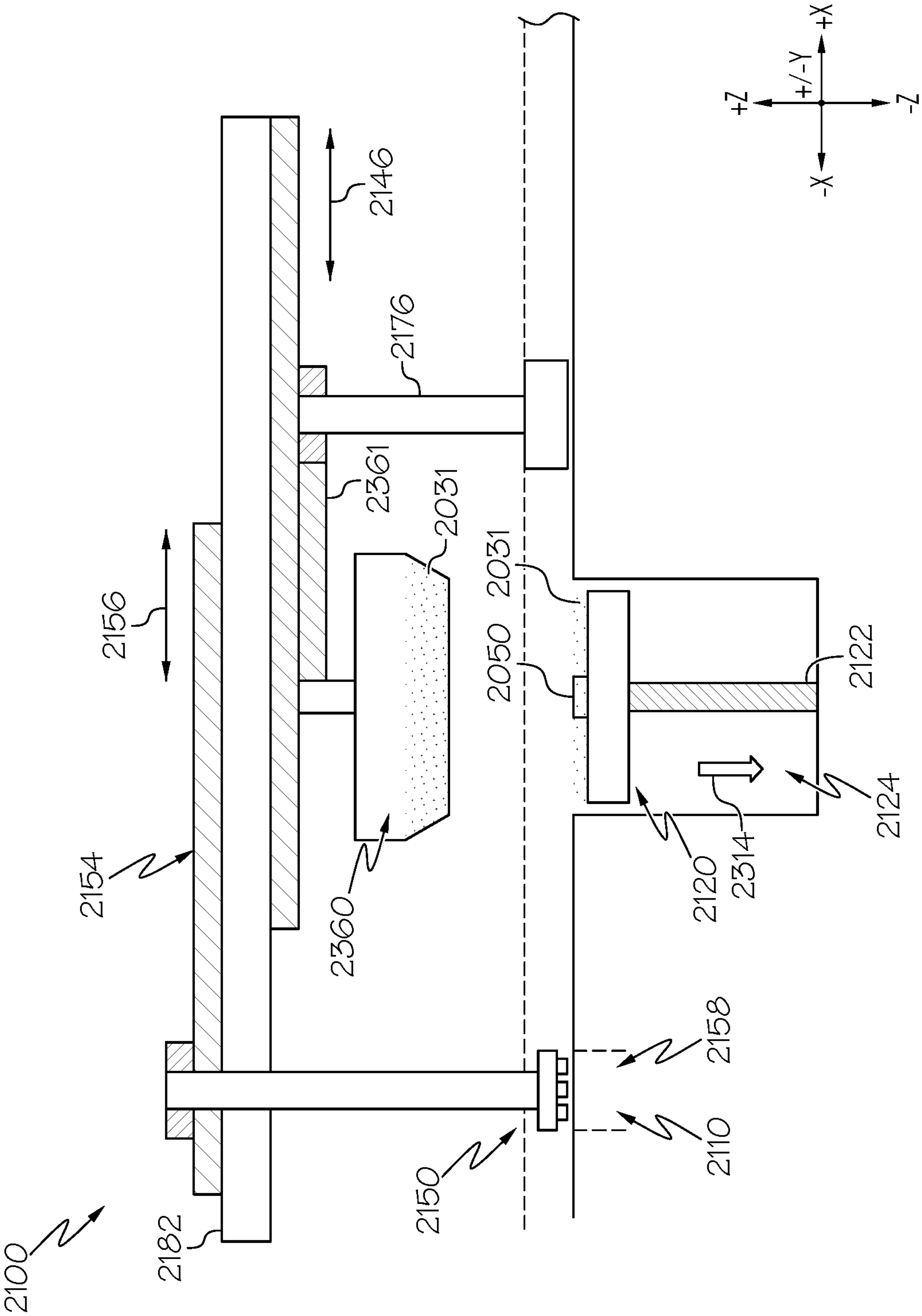
FIG. 29B schematically depicts another additive manufacturing system, according to one or more embodiments shown and described herein.

Referring to FIG. 29B, in some embodiments, the additive manufacturing system 2100 comprises a cleaning station 2110, and a build area 2124, as described herein with respect to FIG. 29A. However, in the embodiment depicted in FIG. 29B, the additive manufacturing system does not include a supply receptacle. Instead, the system comprises a build material hopper 2360 that is used to supply build material 2031 to the build area 2124. In this embodiment, the build material hopper 2360 is coupled to the recoat assembly transverse actuator 2144 such that the build material hopper 2360 traverses along the recoat motion axis 2146 with the with the recoat assembly 2200. In the embodiment depicted in FIG. 29B, the build material hopper 2360 is coupled to the support bracket 2176 with, for example, bracket 2361. However, it should be understood that the build material hopper 2360 may be directly coupled to the support bracket 2176 without an intermediate bracket. Alternatively, the build material hopper 2360 may be coupled to the recoat assembly 2200 either directly or with an intermediate bracket.

The build material hopper 2360 may include an electrically actuated valve (not depicted) to release build material 2031 onto the build area 2124 as the build material hopper 2360 traverses over the build area 2124. In embodiments, the valve may be communicatively coupled to an electronic control unit 2300 (FIG. 51) which executes computer readable and executable instructions to open and close the valve based on the location of the build material hopper 2360 with respect to the build area. The build material 2031 released onto the build area 2124 is then distributed over the build area with the recoat assembly 2200 as the recoat assembly 2200 traverses over the build area 2124.

Figure 29C:
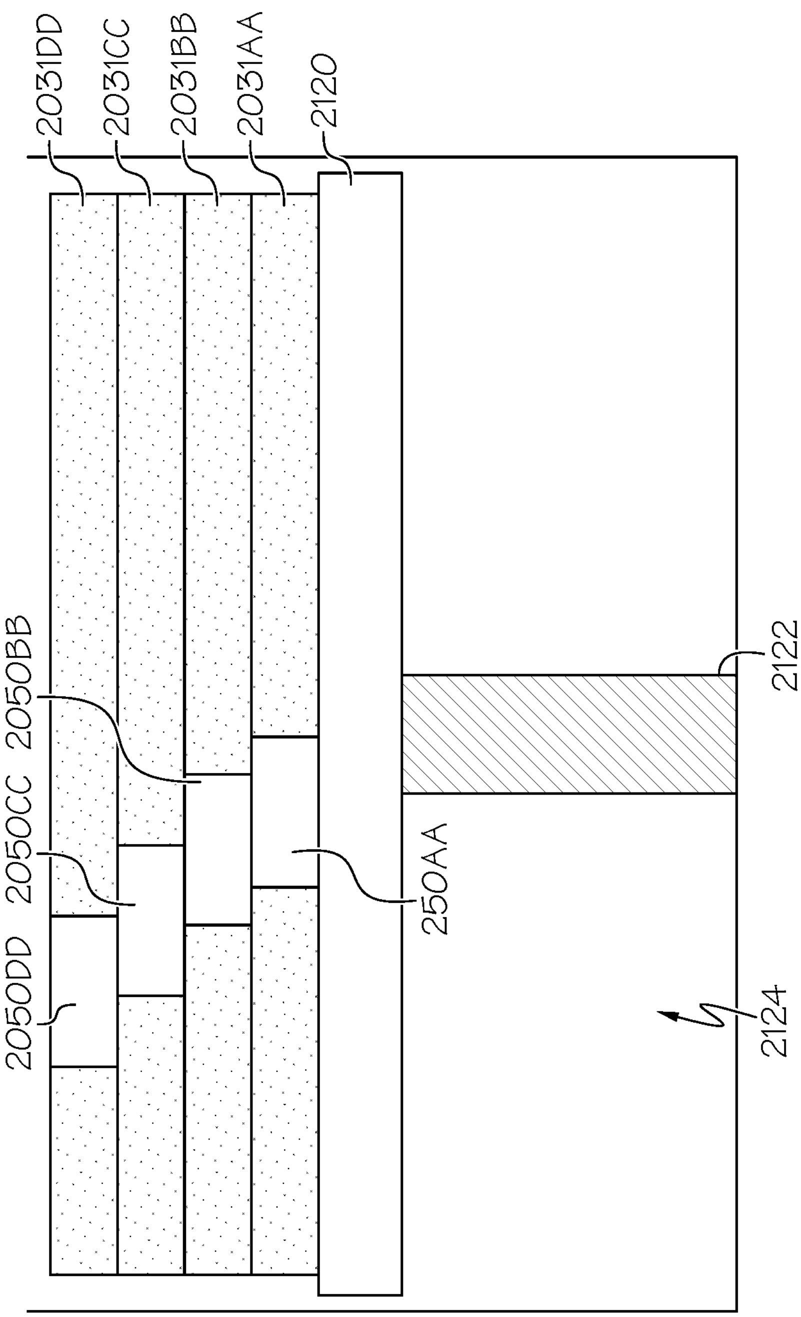
FIG. 29C schematically depicts an enlarged view of build material of an additive manufacturing system according to one or more embodiments shown and described herein.

Referring to FIG. 29C, to form an object layers of build material 2031AA-2031DD may be sequentially positioned on top of one another. In the example provided in FIG. 29C, sequential layers of binder material 2050AA-2050CC are positioned on the layers of build material 2031AA-2031DD. By curing the layers of binder material 2050AA-2050CC, a finished product may be formed.

Figure 30:
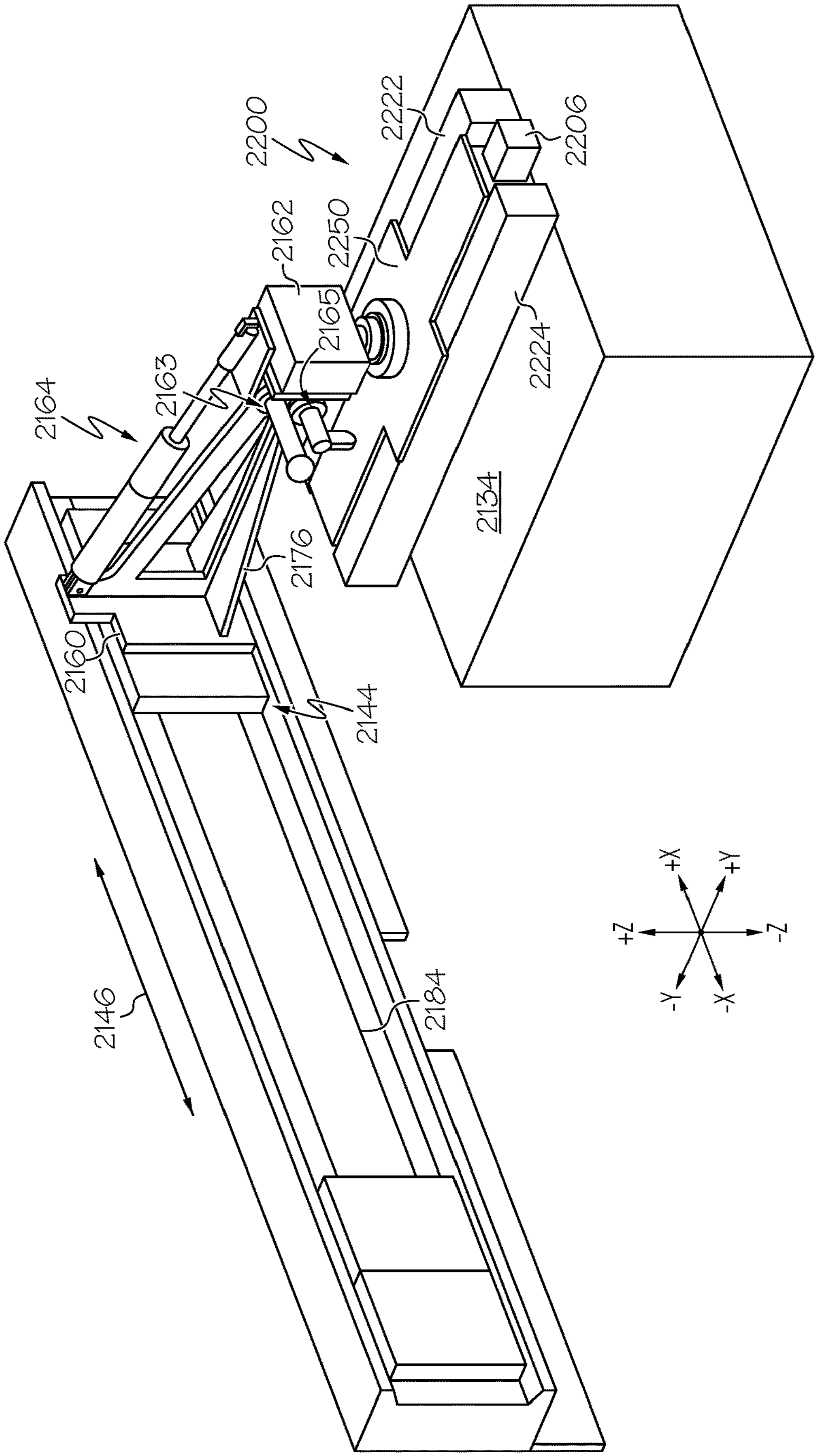
FIG. 30 schematically depicts an embodiment of a recoat assembly of the additive manufacturing system of FIG. 29A, according to one or more embodiments shown and described herein.

Referring to FIG. 30, a perspective view of one embodiment of the recoat assembly 2200 is schematically depicted. In embodiments, the recoat assembly 2200 may include one or more housings 2222, 2224 that at least partially encapsulate a portion of the recoat assembly 2200. The recoat assembly 2200 includes the recoat assembly transverse actuator 2144 that moves the recoat assembly 2200 in the lateral direction (i.e., in the X-direction as depicted). In some embodiments, the recoat assembly 2200 further includes a recoat assembly vertical actuator 2160 that moves the recoat assembly 2200 in the vertical direction (i.e., in the Z-direction as depicted).

Figure 31:
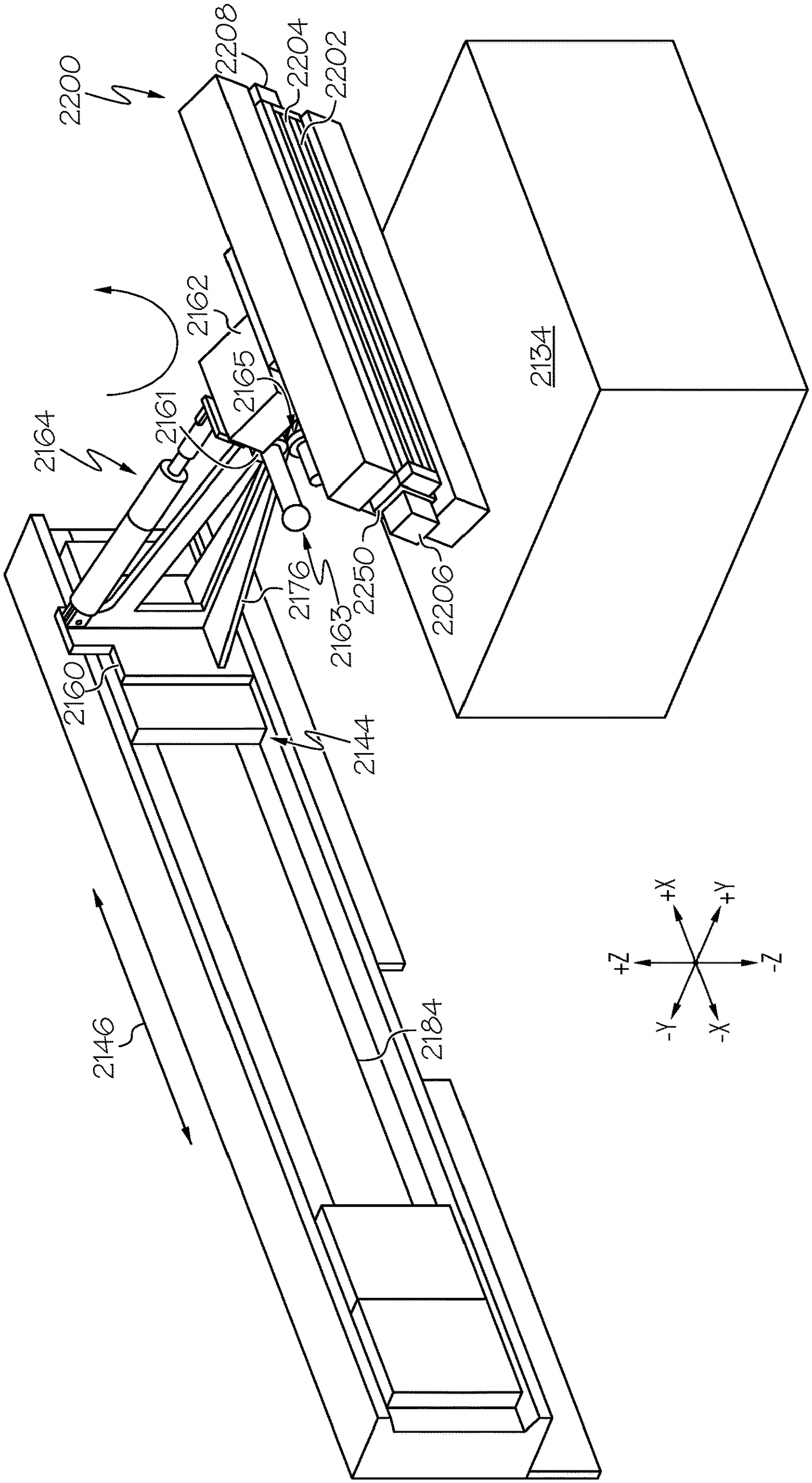
FIG. 31 schematically depicts another view of the recoat assembly of FIG. 30, according to one or more embodiments shown and described herein.

In some embodiments, the recoat assembly 2200 includes a base member 2250, and the recoat assembly transverse actuator 2144 is coupled to the base member 2250, moving the base member 2250 in the lateral direction (i.e., in the X-direction as depicted). As referred to herein the base member 2250 may include any suitable structure of the recoat assembly 2200 coupled to the recoat assembly transverse actuator 2144, and may include a housing, a plate, or the like. In the embodiment depicted in FIGS. 30 and 31, the recoat assembly 2200 further includes at least one tilt actuator 2164 that is operable to tilt the base member 2250 of the recoat assembly 2200 (e.g., about an axis extending in the X-direction as depicted in FIG. 31). As described in greater detail herein, in embodiments, the tilt actuator 2164 may tilt the base member 2250 of the recoat assembly 2200. In embodiments, the tilt actuator 2164 may also tilt the base member 2250 to provide access to an underside of the recoat assembly 2200 such that maintenance may be performed on the recoat assembly 2200.

Recoat Assembly

Figure 32:
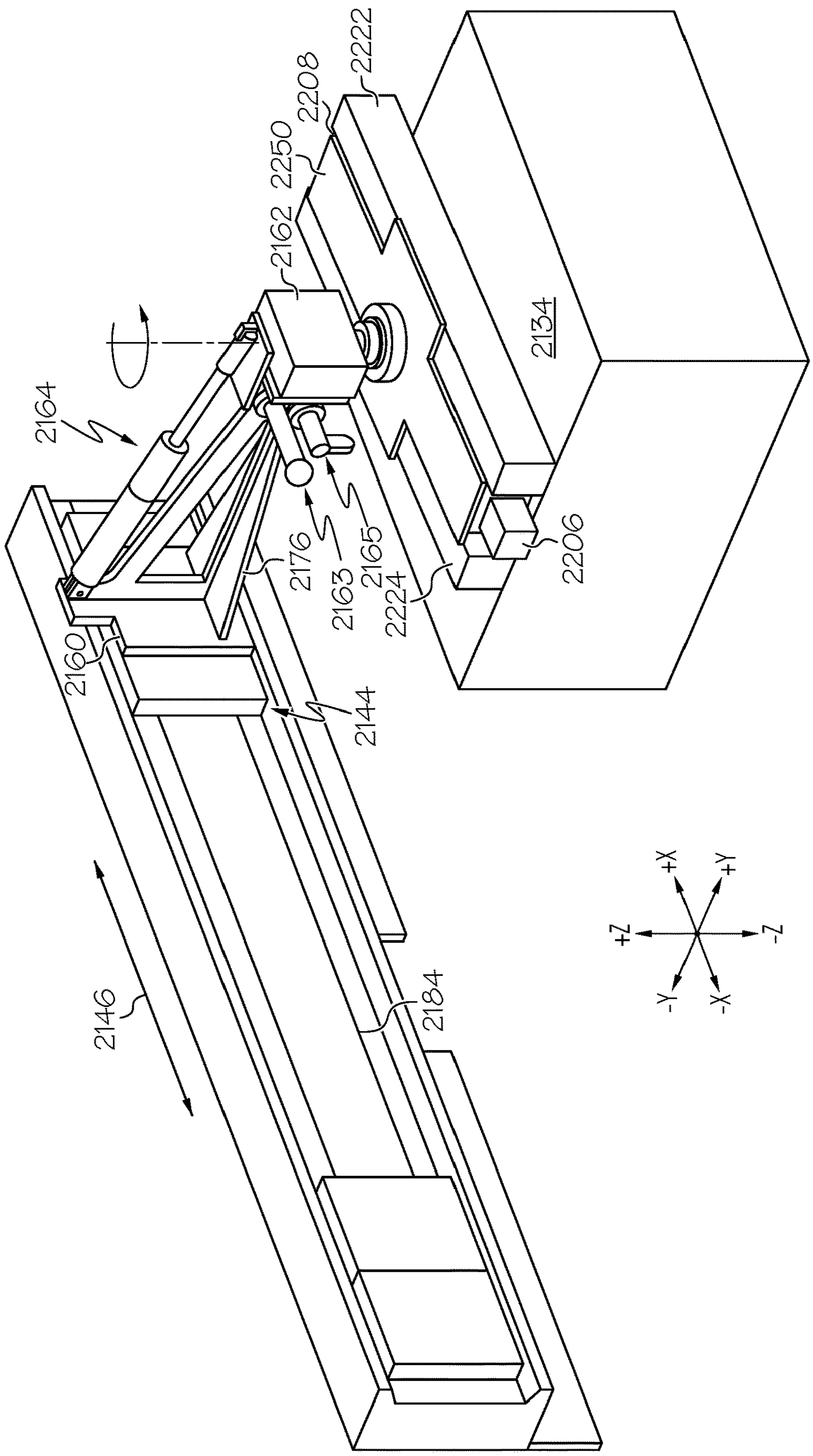
FIG. 32 schematically depicts another view of the recoat assembly of FIG. 30, according to one or more embodiments shown and described herein.

Referring to FIGS. 30 and 32, in some embodiments, the recoat assembly 2200 further includes a base member rotational actuator 2162 coupled to the base member 2250. The base member rotational actuator 2162 is operable to rotate the base member 2250 about an axis extending in the vertical direction (e.g., in the Z-direction as depicted). In embodiments, the base member rotational actuator 2162 and the tilt actuator 2164 may include any suitable actuators, for example and without limitation, a worm drive actuator, a ball screw actuator, a pneumatic piston, a hydraulic piston, an electro-mechanical linear actuator, or the like.

Figure 33A:
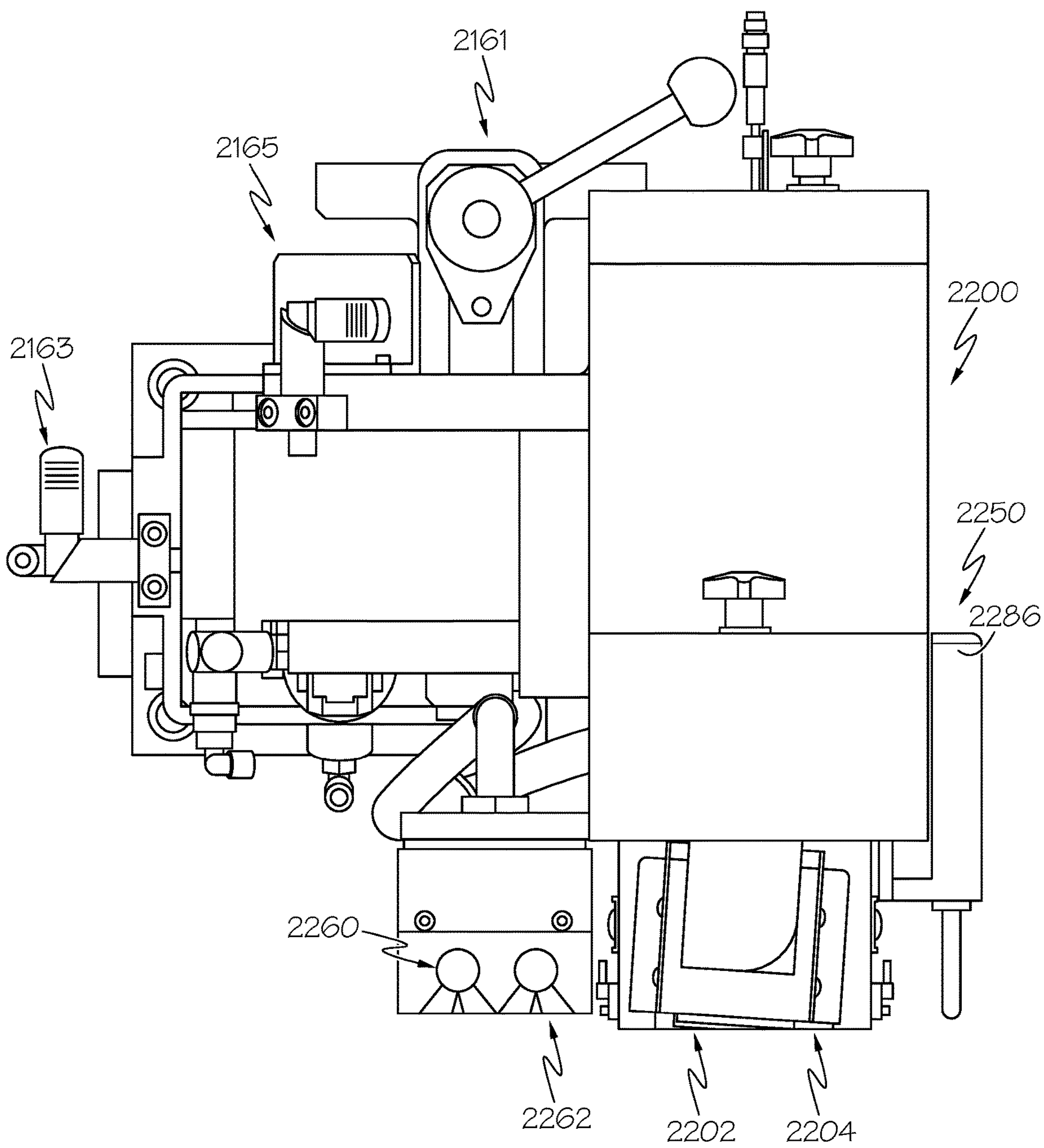
FIG. 33A schematically depicts another side view of a recoat assembly, according to one or more embodiments shown and described herein.

In some embodiments and referring to FIGS. 31 and 33A, the recoat assembly 2200 may include a tilt locking member 2161 that is selectively engagable with the base member 2250. For example, the tilt locking member 2161 may selectively restrict movement of the base member 2250 about the X-axis shown in FIG. 31. By selectively restricting movement of the base member 2250, the orientation of the base member 2250 can be maintained without the application of force by the tilt actuator 2164. In this way, the base member 2250 can be maintained in a tilted position as shown in FIG. 31 while maintenance is performed on the recoat assembly 2200 without requiring the application of energy to the tilt actuator 2164. In some embodiments, the recoat assembly 2200 further includes a first rotational locking member 2163 and/or a second rotational locking member 2165. The first rotational locking member 2163 and/or the second rotational locking member 2165 may selectively restrict movement of the base member 2250 about the Z-axis depicted in FIG. 31. In embodiments, the recoat assembly 2200 includes a powder spreading member, such as one or more rollers, that distribute build material 2031 (FIG. 29A).

Figure 33B:
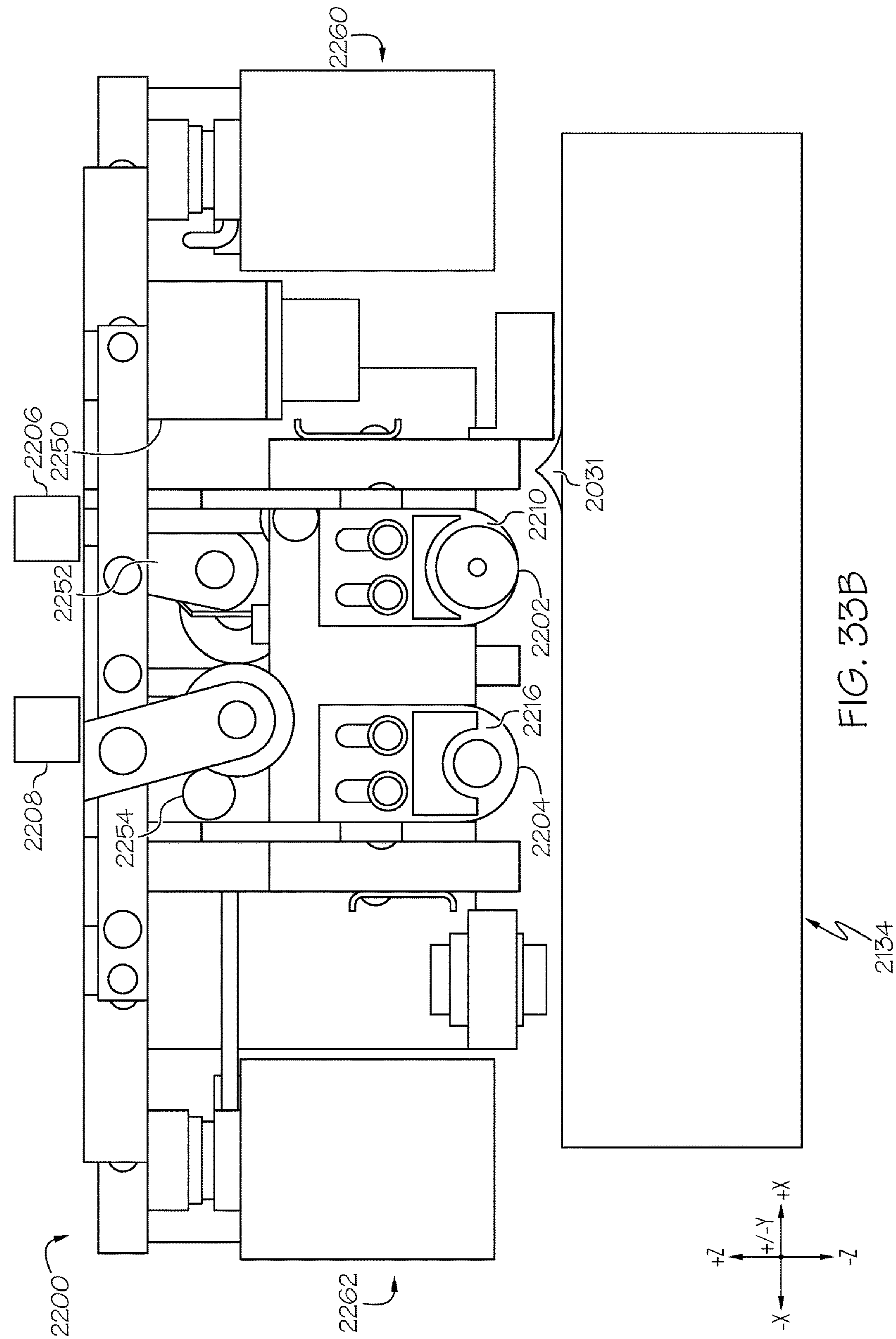
FIG. 33B schematically depicts a section view of a recoat assembly, according to one or more embodiments shown and described herein.
Figure 33C:
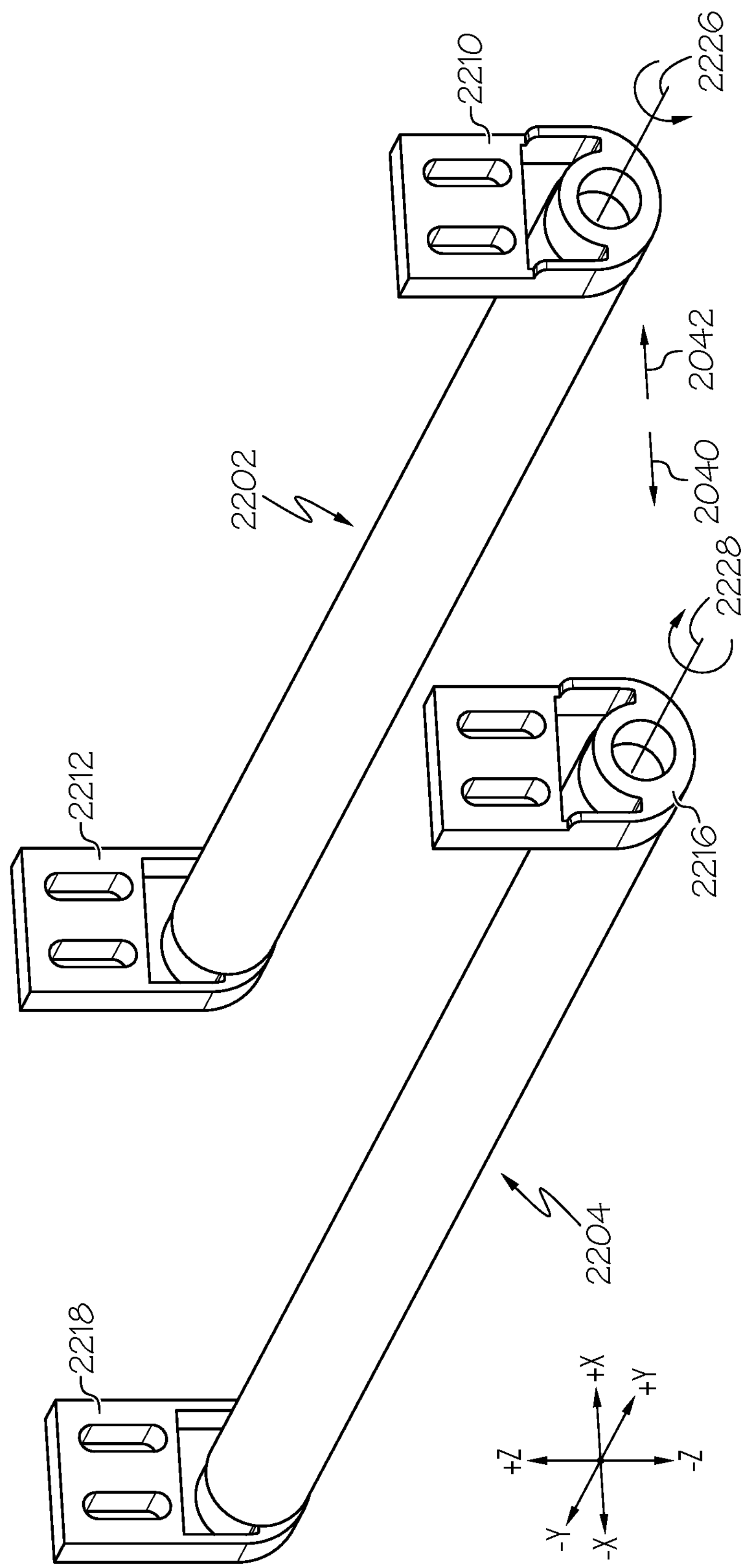
FIG. 33C schematically depicts rollers and roller supports of the recoat assembly of FIG. 33B shown in isolation, according to one or more embodiments shown and described herein.

For example and referring to FIGS. 33B and 33C, a side view of the recoat assembly 2200 and a view of rollers 2202, 2204 of the recoat assembly 2200 are depicted, respectively. In embodiments, the recoat assembly 2200 includes a first roller support 2210, a second roller support 2212, and a first roller 2202 disposed between and supported by the first roller support 2210 and the second roller support 2212. In the embodiment depicted in FIGS. 33B and 33C, the recoat assembly 2200 further includes a third roller support 2216, a fourth roller support 2218, and a second roller 2204 disposed between and supported by the third roller support 2216 and the fourth roller support 2218. In embodiments, the second roller 2204 is positioned rearward of the first roller 2202 (i.e., in the –X-direction as depicted). In these embodiments, the first roller 2202 may generally be referred to as the "front" roller, and the second roller 2204 may be referred to as the "rear" roller.

In embodiments, the recoat assembly 2200 includes a roller vertical actuator 2252 that is coupled to the first roller 2202 and/or the second roller 2204. The roller vertical actuator 2252 is operable to move the first roller 2202 and/or the second roller 2204 with respect to the base member 2250 in the vertical direction (i.e., in the Z-direction as depicted). In some embodiments, the vertical actuator 2252 is coupled to the front roller 2202 and the rear roller 2204 such that the front roller 2202 and the rear roller 2204 are movable with respect to the base member 2250 independently of one another. In some embodiments, the roller vertical actuator 2252 is a first roller vertical actuator 2252 coupled to the first roller 2202, and the recoat assembly 2200 further includes a second roller vertical actuator 2254 coupled to the second roller 2204, such that the front roller 2202 and the rear roller 2204 are movable with respect to the base member 2250 independently of one another. The first and second roller vertical actuators 2252, 2254 may include any suitable actuators, for example and without limitation, pneumatic actuators, motors, hydraulic actuators, or the like.

Figure 38A:
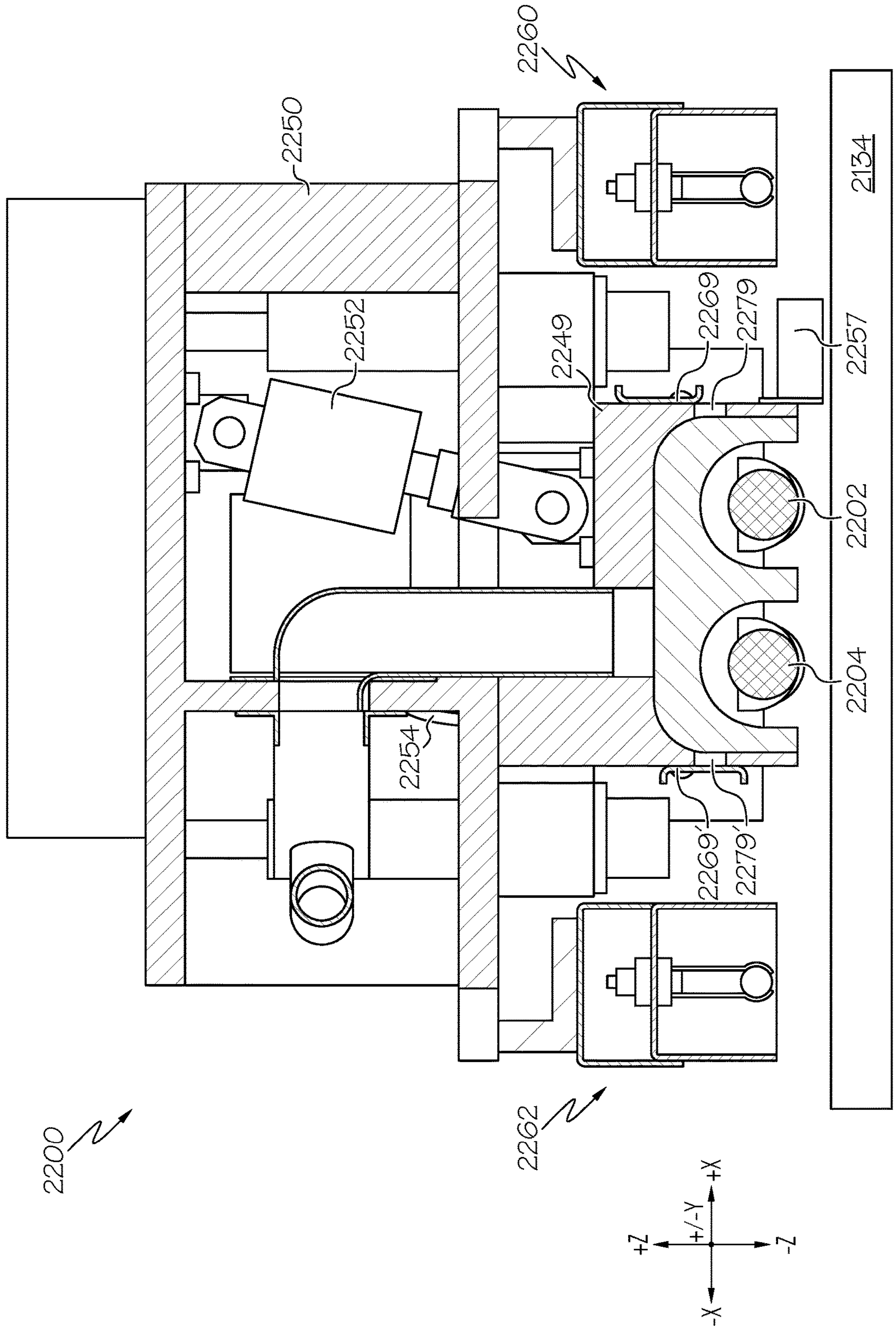
FIG. 38A schematically depicts another section view of the recoat assembly of FIG. 33B, according to one or more embodiments shown and described herein.
Figure 38B:
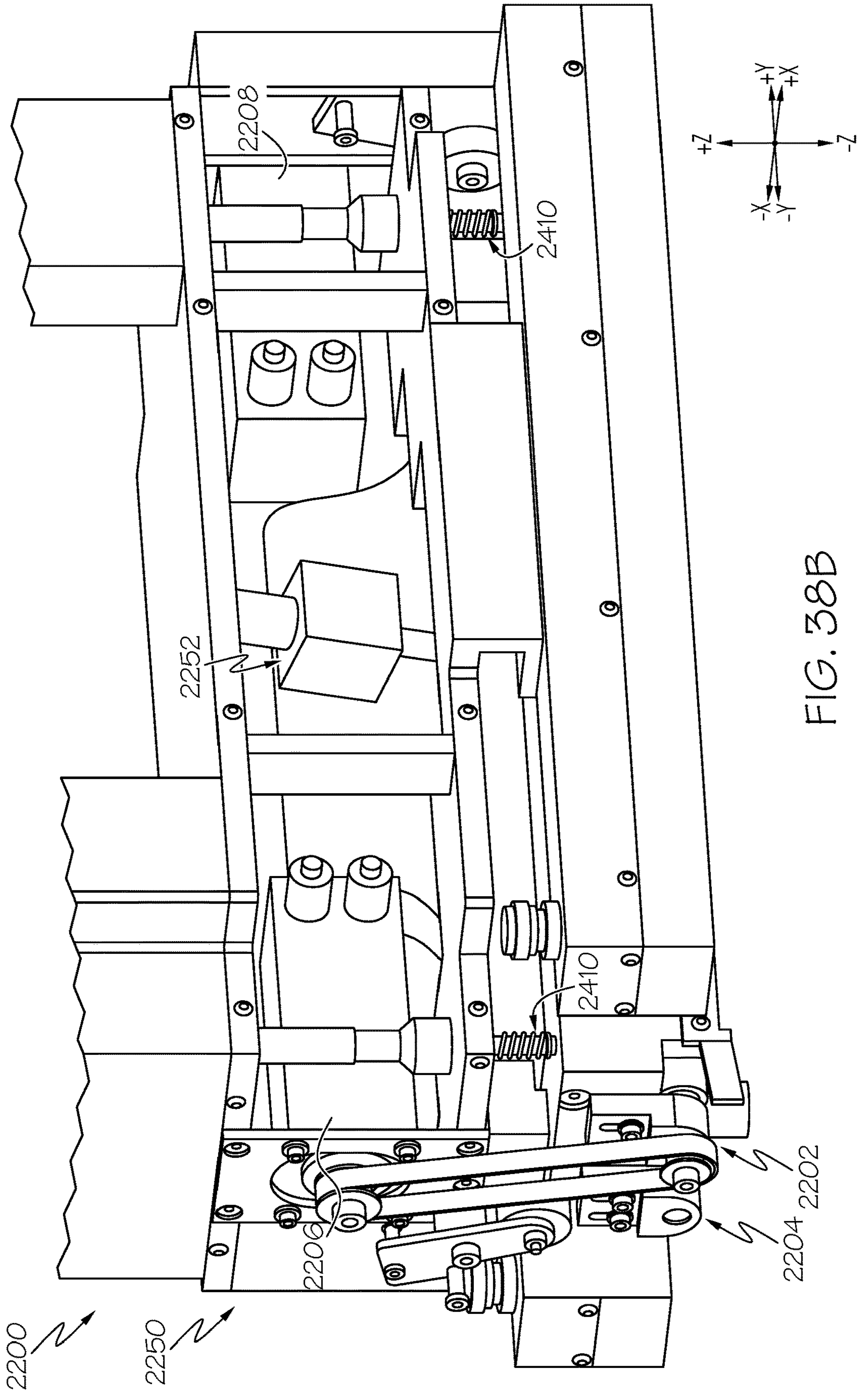
FIG. 38B schematically depicts a perspective view of a recoat assembly, according to one or more embodiments shown and described herein.

The recoat assembly 2200 further includes a first rotational actuator 2206 coupled to the first roller 2202, as best shown in FIG. 38B. In some embodiments, the first rotational actuator 2206 is spaced apart from the first roller 2202, and may be coupled to the first roller 2202 through a belt, a chain, or the like. In embodiments in which the recoat assembly 2200 includes the second roller 2204, the recoat assembly 2200 may include a second rotational actuator 2208, best shown in FIG. 38B, coupled to the second roller 2204. In some embodiments, the second rotational actuator 2208 is spaced apart from the second roller 2204, and may be coupled to the second roller 2204 through a belt, a chain, or the like. In some embodiments, the recoat assembly 2200 may include a single rotational actuator coupled to both the first roller 2202 and the second roller 2204. In some embodiments, the first rotational actuator 2206 is directly coupled to the first roller 2202 and/or the second rotational actuator 2208 is directly coupled to the second roller 2204.

The first rotational actuator 2206 is configured to rotate the rotate the first roller 2202 about a first rotation axis 2226. Similarly, the second rotational actuator 2208 is configured to rotate the second roller 2204 about a second rotation axis 2228. In the embodiment depicted in FIG. 33C, the first rotation axis 2226 and the second rotation axis 2228 are generally parallel to one another and are spaced apart from one another in the X-direction as depicted. As described in greater detail herein, the first roller 2202 and the second roller 2204 may be rotated in a "rotation direction" (e.g., a clockwise direction from the perspective shown in FIG. 33C) and/or a "counter-rotation direction" that is the opposite of the rotation direction (e.g., a counter-clockwise direction from the perspective shown in FIG. 33C). The first and second roller 2202, 2204 can be rotated in the same direction or may be rotated in opposite directions from one another. The first and second rotational actuators 2206, 2208 may include any suitable actuator for inducing rotation of the first and second rollers 2202, 2204, such as and without limitation, alternating current (AC) or direct current (DC) brushless motors, linear motors, servo motors, stepper motors, pneumatic actuators, hydraulic actuators, or the like.

Recoat Sensors

In embodiments, the recoat assembly 2200 includes one or more sensors mechanically coupled to the roller supports 2210, 2212, 2216, and/or 2218, the one or more sensors configured to output a signal indicative of forces incident on the roller supports 2210, 2212, 2216, and/or 2218 via the first roller 2202 and/or the second roller 2204.

Figure 34A:
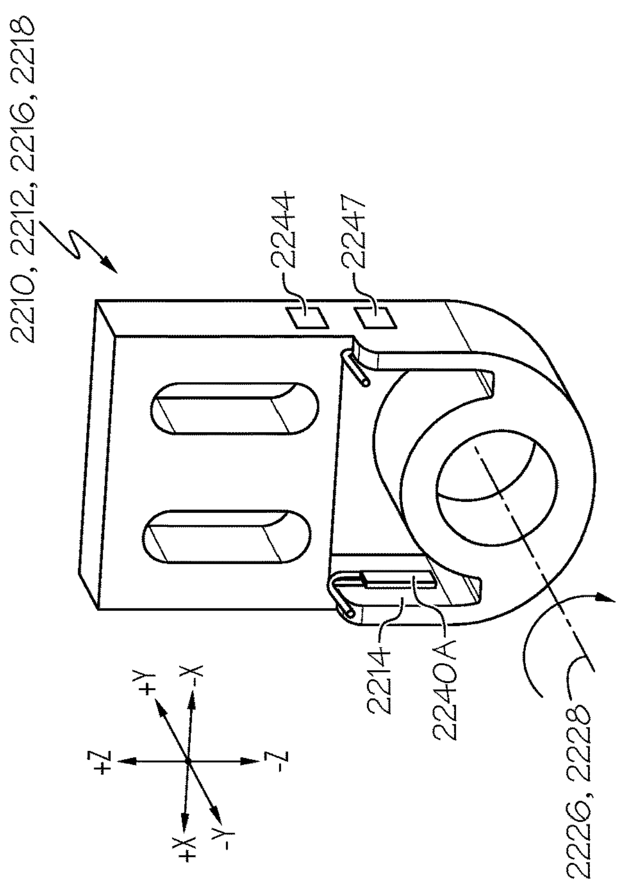
FIG. 34A schematically depicts a roller support of FIG. 33C in isolation, according to one or more embodiments shown and described herein.
Figure 34B:
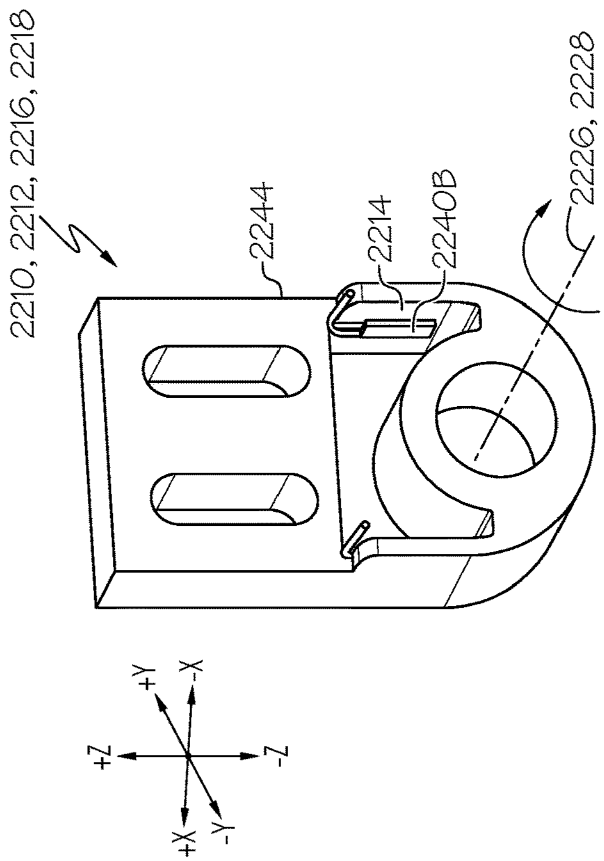
FIG. 34B schematically depicts another view of the roller support of FIG. 34A, according to one or more embodiments shown and described herein.
Figure 34C:
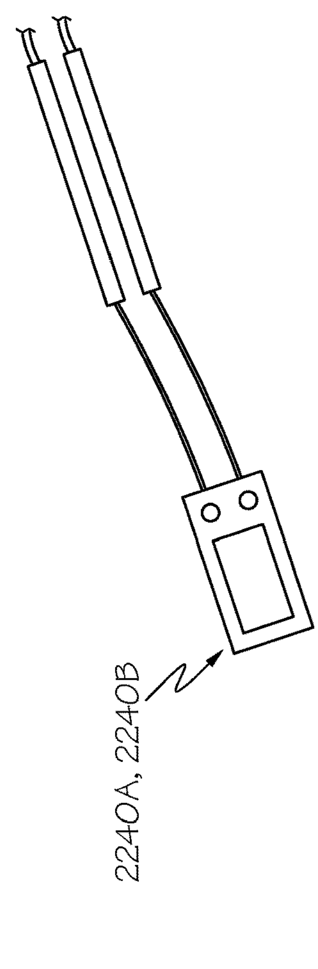
FIG. 34C schematically depicts a strain gauge for use with the roller support of FIG. 34A, according to one or more embodiments shown and described herein.

For example and referring to FIGS. 34A-34C, in embodiments, a strain gauge 2240A is mechanically coupled to the first roller support 2210. In some embodiments, the strain gauge 2240A is a first strain gauge 2240A, and a second strain gauge 2240B is mechanically coupled to the first roller support 2210. While reference is made herein to the strain gauges 2240A, 2240B being mechanically coupled to the first roller support 2210, it should be understood that one or more strain gauges may be coupled to any or all of the first, second, third, and fourth roller supports 2210, 2212, 2216, 2218.

In embodiments, the roller supports 2210, 2212, 2216, and/or 2218 define one or more flexures 2214 to which the strain gauges 2240A, 2240B are coupled. The strain gauges 2240A, 2240B are configured to detect elastic deformation of the flexures 2214, which may generally correlate to forces acting on the roller supports 2210, 2212, 2216, and/or 2218. In the depicted embodiment, the flexures 2214 are walls of a cavity extending through the roller supports 2210, 2212, 2216, and/or 2218, however, it should be understood that the flexures 2214 may include any suitable portion of the roller supports 2210, 2212, 2216, and/or 2218 that elastically deform such that strain of the flexures 2214 may be determined.

In embodiments, the strain gauges 2240A, 2240B are oriented in order to measure a strain. For example, in the embodiment depicted in FIGS. 34A and 34B, the strain gauges 2240A, 2240B are oriented in the vertical direction (i.e., in the Z-direction as depicted and transverse to the first rotation axis 2226), and measure a strain in a resultant vector at some angle between the horizontal (X-axis) and the vertical (Z-axis) direction. By measuring strain in the resultant vector direction, normal forces, i.e., forces acting on the roller supports 2210, 2212, 2216, and/or 2218 in a direction transverse to a coating direction, can be determined. For example, forces normal to the X-direction and Z-direction may be imparted on the roller supports 2210, 2212, 2216, and/or 2218 by build material 2031 (FIG. 29A) distributed by the recoat assembly 2200, and/or by cured binder material 2050 (FIG. 29A), as the recoat assembly 2200 moves build material 2031 over build area 2124 to cover the build material 2031 (FIG. 29A) and/or cured binder material 2050 with a layer of build material 2031. One or more parameters of the operation of the recoat assembly 2200 may be changed to reduce normal forces acting on the roller supports 2210, 2212, 2216, and/or 2218 to maintain the structural integrity of build material 2031 bound by the cured binder material 2050 (FIG. 29C) positioned beneath build material 2031, as described in greater detail herein.

Figure 35:
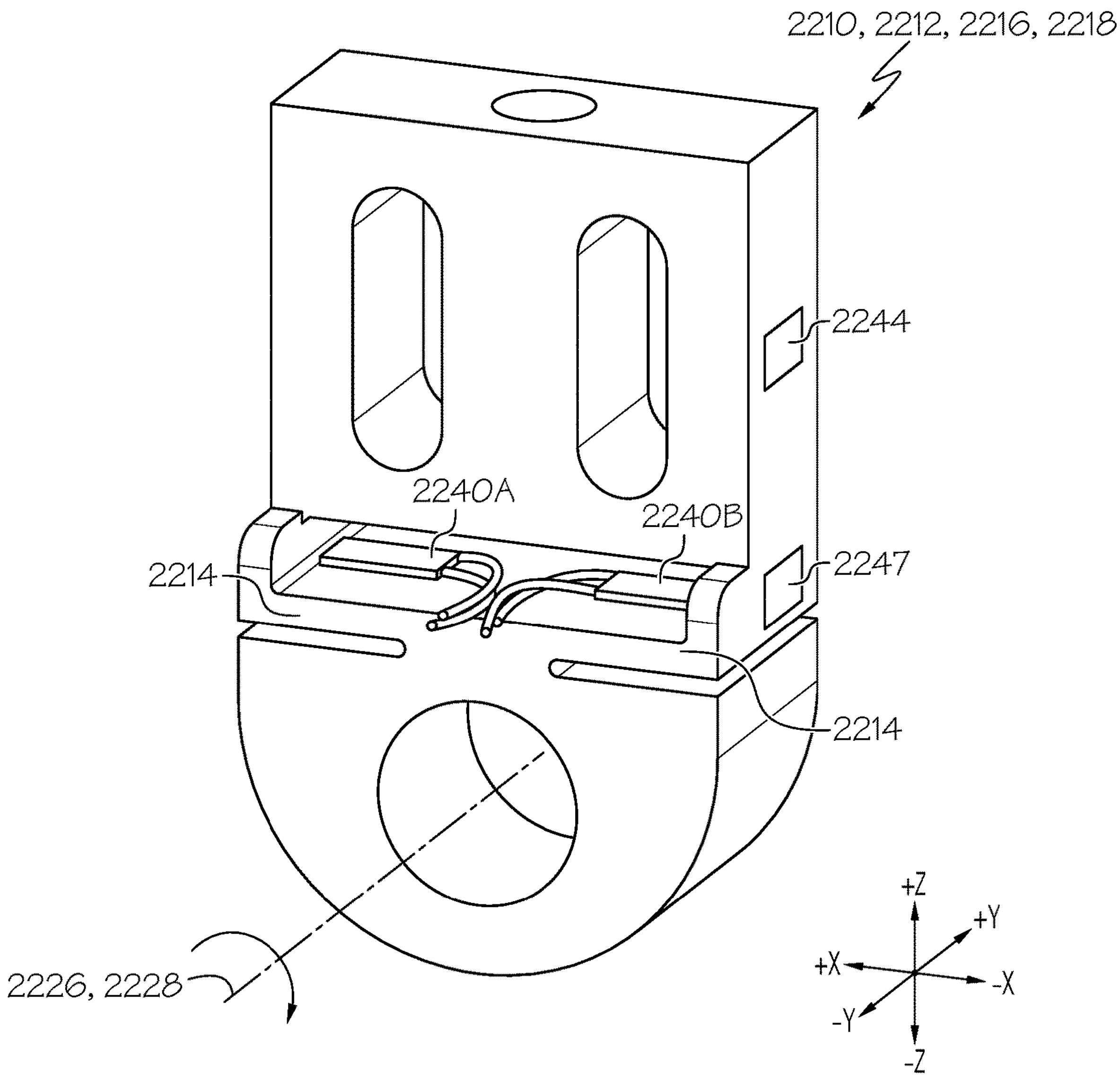
FIG. 35 schematically depicts another roller support in isolation, according to one or more embodiments shown and described herein.

Referring to FIG. 35, in some embodiments, one or both of the strain gauges 2240A, 2240B are oriented in a horizontal direction (i.e., in the X-direction as depicted and transverse to the first rotation axis 2226), and may measure a strain in a resultant vector at some angle between the horizontal (X-axis) direction and the vertical (Z-axis) direction. In some embodiments, the strain gauges 2240A, 2240B may be oriented in the horizontal direction on the first and second roller supports 2210, 2212, while the strain gauges 2240A, 2240B may be oriented in the vertical direction, as depicted in FIGS. 34A-34B, on the third and fourth roller supports 2216, 2218. By measuring strain in the horizontal direction (i.e., in the X-direction as depicted), shear forces, i.e., forces acting on the roller supports 2210, 2212, 2216, and/or 2218 in a direction corresponding to a coating direction, can be determined. For example, shear forces may be imparted on the roller supports 2210, 2212, 2216, and/or 2218 by build material 2031 (FIG. 29A) distributed by the recoat assembly 2200, and/or by build material 2031 bound by cured binder material 2050 (FIG. 29A) as the recoat assembly 2200 moves to the build area 2124 to cover a previous layer of build material 2031 bound by the cured binder material 2050 and/or the build material 2031 with another layer of build material 2031. One or more parameters of the operation of the recoat assembly 2200 may be changed to reduce shear forces acting on the roller supports 2210, 2212, 2216, and/or 2218 to maintain the structural integrity of the build material 2031 (FIG. 29A) bound by cured binder material 2050 (FIG. 29A), as described in greater detail herein. As described in greater detail herein, determined forces can also be utilized in open-loop (i.e., feedforward) control of the recoat assembly 2200 and/or closed-loop (i.e., feedback) control of the recoat assembly 2200. For example, in embodiments, determined forces may be compared to a lookup table of desired forces, and one or more parameters of the operation of the recoat assembly 2200 may be changed based on the comparison of the determined forces as compared to the desired forces. In embodiments, the forces acting on the roller supports 2210, 2212, 2216, and/or 2218 may depend on any of a number of factors, including but not limited to, a layer thickness of the build material 2031 (FIG. 29A), a traverse speed of the recoat assembly 2200 (FIG. 29A), the direction and rotational speed of the first and/or second roller 2202, 2204 (FIG. 33C), on the type/composition of build material 2031 (FIG. 29A), the particle size of the build material 2031 (FIG. 29A), the type/composition of the binder material 2050 (FIG. 29A), the volume (or saturation) of binder material 2050 (FIG. 29A), on if and how the binder is partially or fully cured in situ, on the geometry of the component being built, etc.

In some embodiments, information related to a current layer of the object being built and/or a prior layer may be utilized to generate an expected force or pressure curve to be experienced as the recoat assembly 2200 traverses the build area 2124. In some embodiments, a geometry of the current layer of the object being built or a geometry of the immediately preceding layer that was built may be used to determine an expected pressure or force profile (e.g., shear forces expected to be experienced as the recoat assembly 2200 traverses the build area 2124 to distribute material for the current layer, normal forces expected to be experienced as the recoat assembly 2200 traverses the build area 2124 to distribute material for the current layer and/or any other type of expected force to be experienced as the recoat assembly 2200 traverses the build area 2124 to distribute material for the current layer), output signals from the one or more sensors coupled to the roller supports (e.g., one or more strain gauges and/or one or more load cells) may be used to calculate a measured force or pressure as the recoat assembly 2200 traverses the build area 2124 to distribute material for the current layer, a comparison between the expected pressure or measured force profile and the measured force or pressure may be made, and an action may be taken in response to the comparison. In some embodiments, a lookup table containing expected force or pressure information may be previously generated, such as based on calibration force measurements generated under various conditions (e.g., size of build area coated with binder, recoat traverse speed, recoat roller rotation speed, layer thickness, recoat roller geometry coating, and the like). For example, in some embodiments, when an expected pressure or force deviates from a measured pressure or force during spreading of material for a current layer by the recoat assembly 2200, the printing recoat process may be determined to be defective. The extent of force deviation may be used to determine a type of defect (e.g., a powder defect, a recoat roller defect, insufficient binder cure, a jetting defect, or the like). When a deviation beyond a given threshold is determined to have occurred, a corrective action may be taken, such as to adjust a recoat traverse speed for the current layer, adjust a roller rotation speed for the current layer, adjust a recoat traverse speed for one or more subsequent layers, adjust a roller rotation speed for one or more subsequent layers, adjust a height of one or more rollers for the current layer and/or for one or more subsequent layers, etc. Such measurements, comparisons, and control actions may be implemented by the electronic control unit 2300 executing one or more instructions stored in its memory component.

In some embodiments, the one or more sensors mechanically coupled to the roller supports 2210, 2212, 2216, and/or 2218 may include a load cell.

Figure 36B:
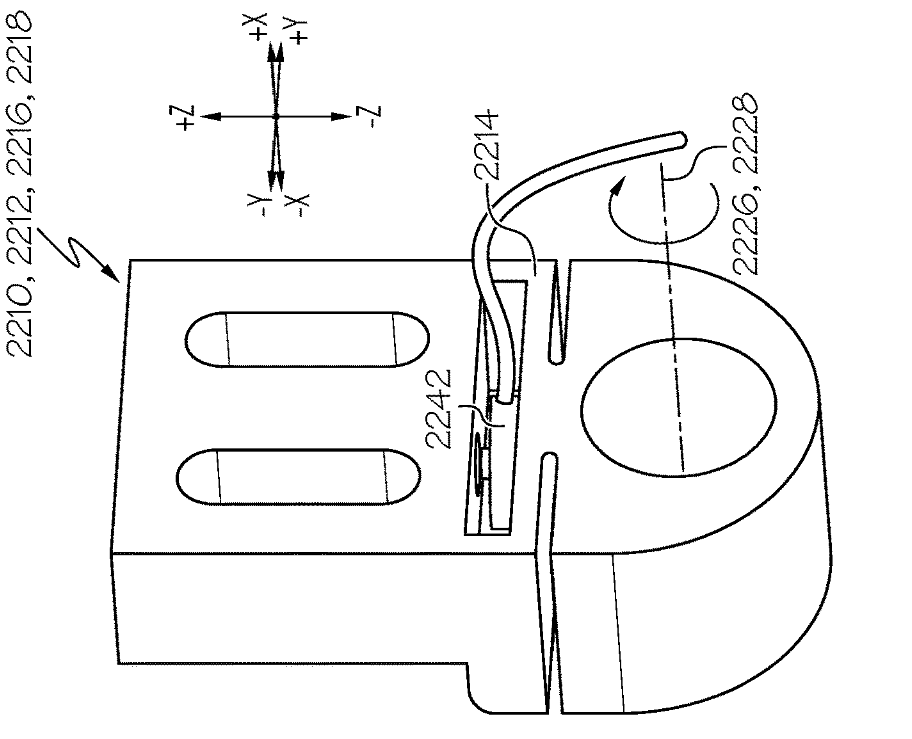
FIG. 36B schematically depicts another view of the roller support of FIG. 36A, according to one or more embodiments shown and described herein.
Figure 36A:
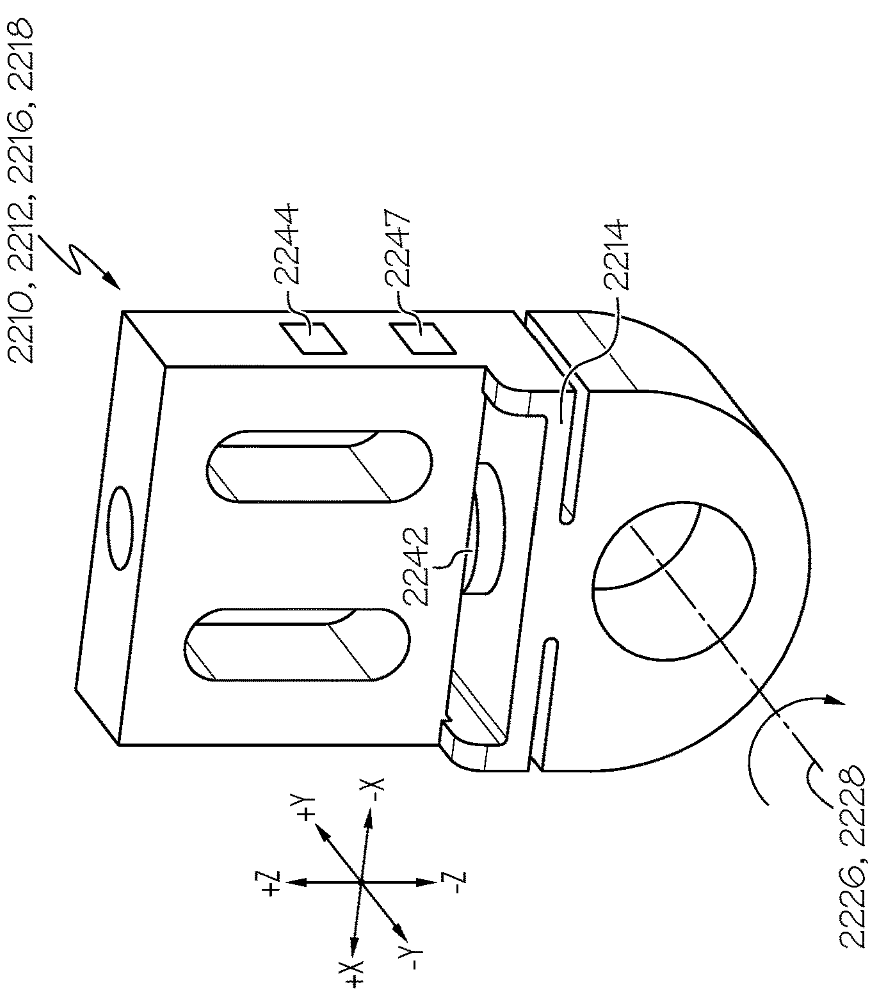
FIG. 36A schematically depicts another roller support in isolation, according to one or more embodiments shown and described herein.
Figure 36C:
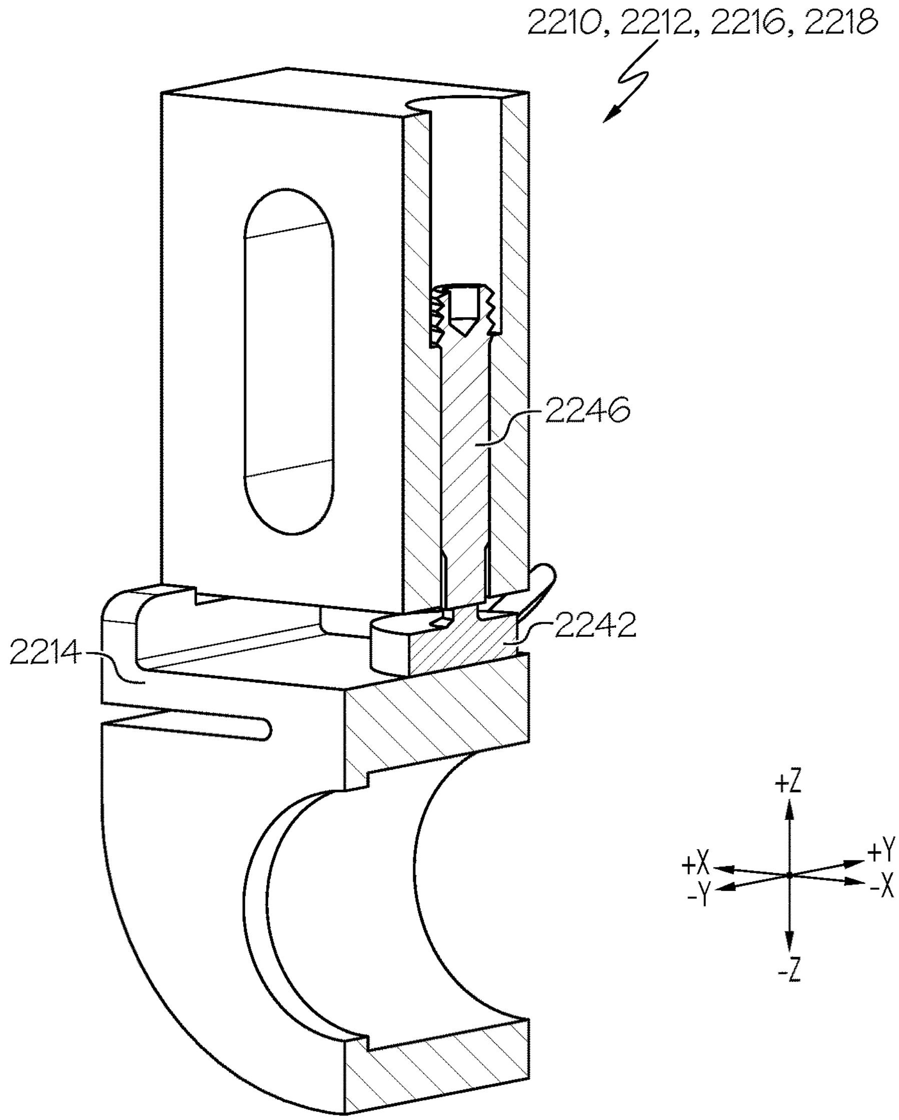
FIG. 36C schematically depicts a section view of the roller support of FIG. 36A, according to one or more embodiments shown and described herein.
Figure 36D:
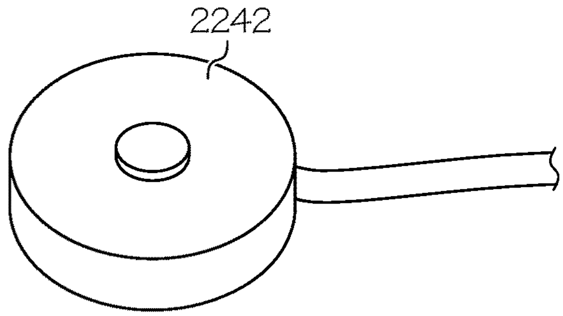
FIG. 36D schematically depicts a load cell for use with the roller support of FIG. 36A, according to one or more embodiments shown and described herein.

For example and referring to FIGS. 36A-36D, in embodiments a load cell 2242 is mechanically coupled to the first roller support 2210, and is configured to measure a force in the vertical direction (i.e., in the Z-direction as depicted and transverse to the first rotation axis 2226). As shown in FIG. 36C, in some embodiments, a set screw 2246 may engage the load cell 2242 to calibrate the load cell 2242, for example, by applying a known amount of force to the load cell 2242.

Figure 37:
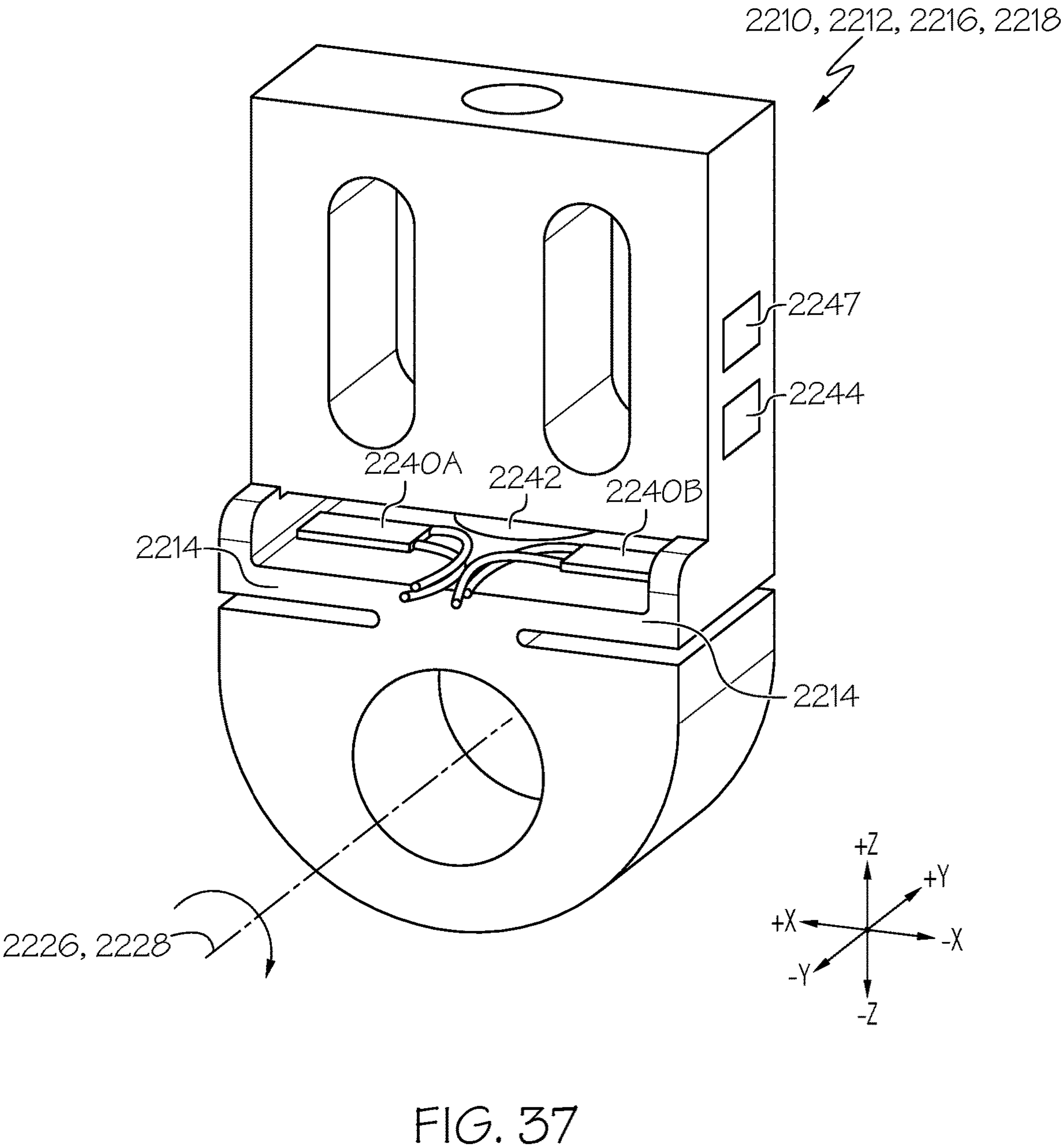
FIG. 37 schematically depicts a roller support coupled to a load cell and at least one strain gauge, according to one or more embodiments shown and described herein.

Referring to FIG. 37, in some embodiments, the first roller support 2210 may include both the load cell 2242 and the strain gauges 2240A, 2240B. While in the embodiment depicted in FIG. 37, the strain gauges 2240A, 2240B are oriented in the horizontal direction, it should be understood that one or both of the strain gauges 2240A, 2240B may be oriented in the vertical direction.

In some embodiments, an accelerometer 2244 is coupled to the first roller support 2210. While in the embodiment depicted in FIG. 37, the load cell 2242, the strain gauges 2240A, 2240B, and the accelerometer 2244 are coupled to the first roller support 2210, it should be understood that in some embodiments, only the accelerometer 2244 may be mechanically coupled to the first roller support 2210. In some embodiments, the accelerometer 2244 is coupled to the first roller support 2210 along with any combination of the load cell 2242, the strain gauge 2240A, and/or the strain gauge 2240B. Furthermore, the accelerometer 2244 may be coupled to any of the roller supports 2210, 2212, 2216, and/or 2218.

In some embodiments, a roller support temperature sensor 2247 is coupled to the first roller support 2210. The roller support temperature sensor 2247 is operable to detect a temperature of the roller support 2210, which may be utilized to calibrate and/or compensate for a load cell reading from the load cell 2242. While in the embodiment depicted in FIG. 37, the load cell 2242, the strain gauges 2240A, 2240B, the accelerometer 2244, and the roller support temperature sensor 2247 are coupled to the first roller support 2210, it should be understood that in some embodiments, only the roller support temperature sensor 2247 may be mechanically coupled to the first roller support 2210. In some embodiments, the roller support temperature sensor 2247 is coupled to the first roller support 2210 along with any combination of the load cell 2242, the strain gauge 2240A, the strain gauge 2240B, and/or the accelerometer 2244. Furthermore, the roller support temperature sensor 2247 may be coupled to any of the roller supports 2210, 2212, 2216, and/or 2218.

Recoat Energy Sources

Figure 38C:
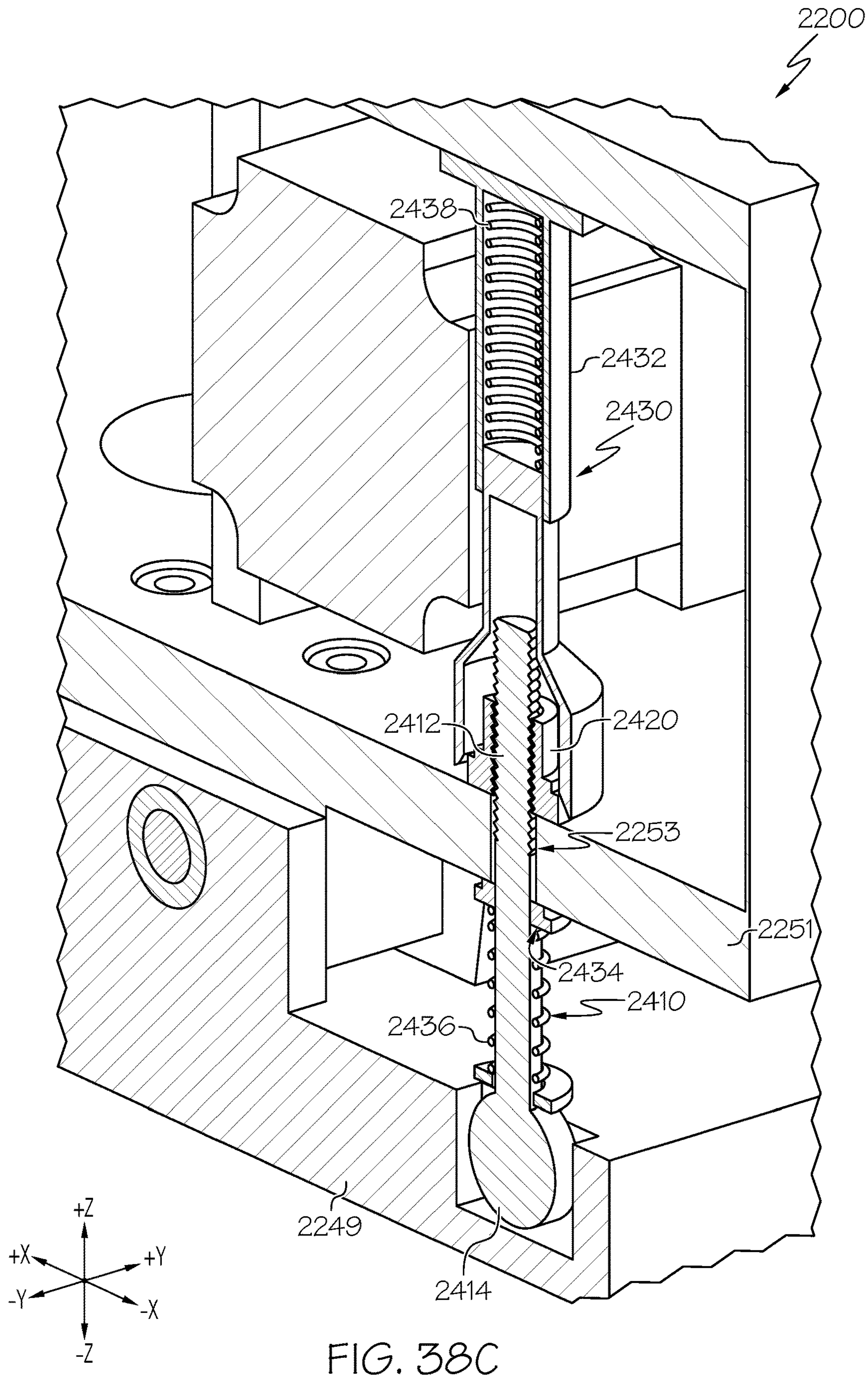
FIG. 38C schematically depicts a perspective section view of the recoat assembly of FIG. 38B, according to one or more embodiments shown and described herein.
Figure 38D:
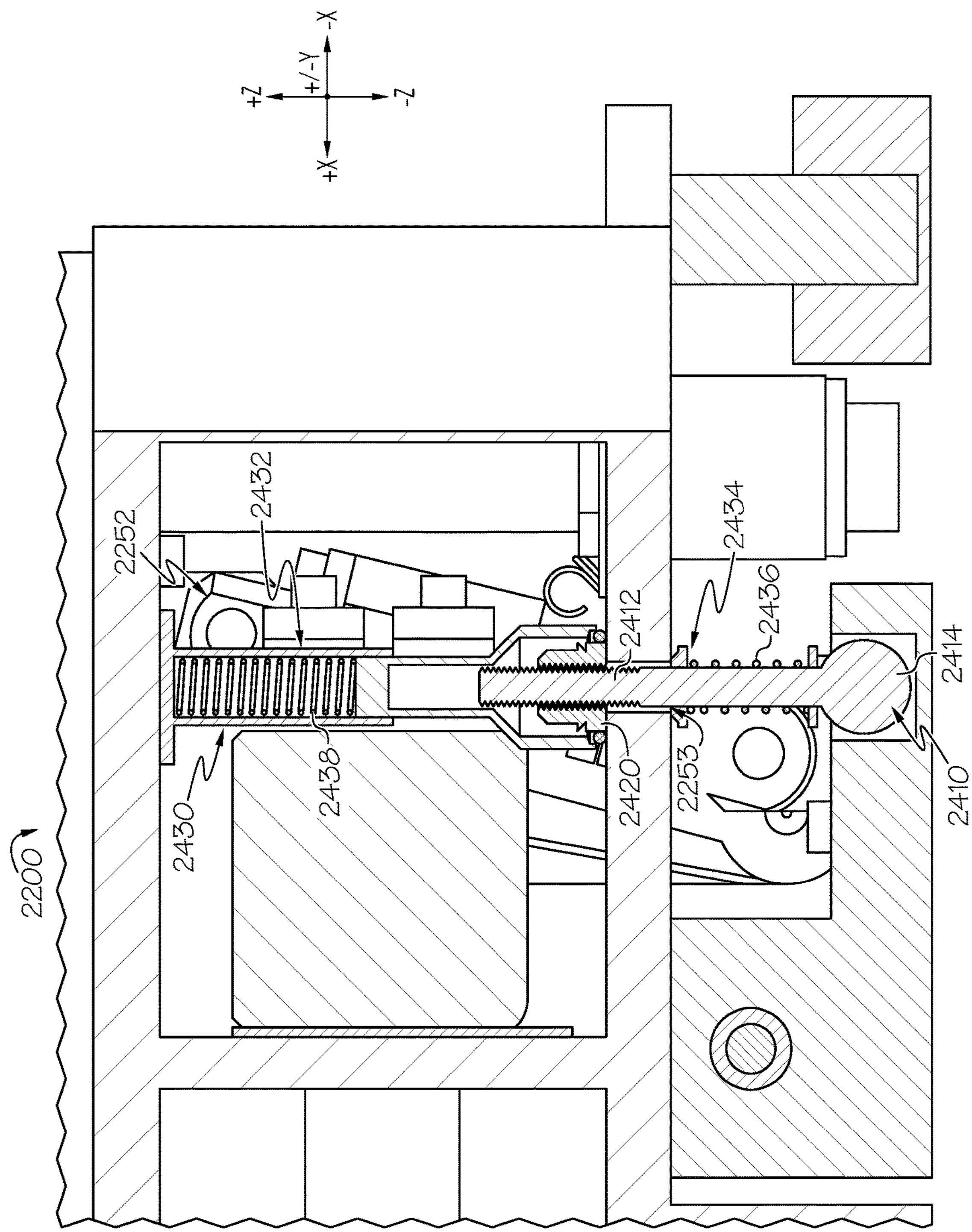
FIG. 38D schematically depicts a section view of the recoat assembly of FIG. 38B, according to one or more embodiments shown and described herein.

Referring to FIG. 38A, in some embodiments, the recoat assembly 2200 generally includes a front energy source 2260 coupled to the base member 2250 and positioned forward of the front roller 2202 (i.e., in the +X-direction as depicted). The recoat assembly 2200, in the embodiment depicted in FIG. 38A, further includes a rear energy source 2262 coupled to the base member 2250 and positioned rearward of the rear roller 2204 (i.e., in the −X-direction as depicted). The front energy source 2260 generally emits energy forward of the front roller 2202, and the rear energy source 2262 emits energy rearward of the rear roller 2204. In embodiments, the front and rear energy sources 2260, 2262 may generally emit electromagnetic radiation, such as infrared radiation, ultraviolet radiation, or the like. In some embodiments, the front and rear energy sources 2260, 2262 may emit energy, which may act to heat build material 2031 (FIG. 29A) and/or cure binder material 2050 (FIG. 29A) on the build material 2031, as described in greater detail herein. While in the embodiment depicted in FIG. 38A, the front energy source 2260 is positioned forward of the front roller 2202 and the rear energy source 2262 is positioned rearward of the rear roller 2204, it should be understood that this is merely an example. For example in some embodiments, the front energy source 2260 and the rear energy source 2262 may both be positioned forward of the front roller 2202, as shown in FIG. 33A, or the front energy source 2260 and the rear energy source 2262 may both be positioned rearward of the front roller 2202 and the rear roller 2204. By including multiple energy sources (e.g., the front energy source 2260 and the rear energy source 2262), energy can be applied to build material 2031 (FIG. 29A) over a comparatively longer period of time as compared to the application of energy via a single energy source. In this way, over-cure of build material 2031 bound by cured binder material 2050 can be minimized. While in the embodiment depicted in FIG. 38A, a front energy source 2262 and a rear energy source 2262 are depicted, it should be understood that embodiments described herein can include any suitable number of energy sources positioned in any suitable manner forward and rearward of the front roller 2202 and the rear roller 2204. Referring to FIGS. 38B-38D, in some embodiments, the recoat assembly 2200 includes one or more hard stops 2410 coupled to the base member 2250. While a single hard stop 2410 is shown in the section views depicted in FIGS. 38C and 38D, it should be understood that each of the hard stops 2410 may be identical. Moreover, although in the embodiment depicted in FIG. 38B the recoat assembly 2200 includes two hard stops 2410, it should be understood that the recoat assembly 2200 may include a single hard stop 2410 or any suitable number of hard stops 2410.

Recoat Hard Stops/Pivots

The hard stops 2410 may assist in limiting movement of the first roller 2202 and/or the second roller 2204 about the Y-axis as depicted, for example, as a result of actuation of the roller vertical actuator 2252. For example and referring particularly to FIGS. 38A, 38C, and 48, in some embodiments, the roller vertical actuator 2252 is coupled to a pivoting portion 2249 of the base member 2250 that is movable with respect to a stationary portion 2251 of the base member 2250 about the Y-axis as depicted. The first roller 2202 and the second roller 2204 may be coupled to the pivoting portion 2249, such that movement of the pivoting portion 2249 about the Y-axis results in movement of the first roller 2202 and/or the second roller 2204 about the Y-axis as depicted.

In embodiments, the hard stop 2410 includes a coupling portion 2414 that is coupled to the pivoting portion 2249 of the base member 2250, and a post portion 2412 that is movably engaged with the stationary portion 2251 of the base member 2250. For example, the post portion 2412 of the hard stop 2410 may be movable with respect to the stationary portion 2251 in a vertical direction (e.g., in the Z-direction as depicted). Movement of the post portion 2412 of the hard stop 2410 in the vertical direction (e.g., in the Z-direction as depicted) may be restricted. For example, a nut 2420 may be adjustably engaged with the post portion 2412, and may restrict movement of the post portion 2412 with respect to the stationary portion 2251 of the base member 2250. Because the coupling portion 2414 of the hard stop 2410 is coupled to the pivoting portion 2249 of the base member 2250, restriction of the movement of the post portion 2412 of the hard stop 2410 with respect to the stationary portion 2251 thereby restricts movement of the pivoting portion 2249 with respect to the stationary portion 2251 in the vertical direction (e.g., in the Z-direction as depicted). In some embodiments, the nut 2420 is adjustable on the post portion 2412 in the Z-direction as depicted. By moving the nut 2420 along the post portion 2412 in the Z-direction, the freedom of movement of the pivoting portion 2249 of the base member 2250, and accordingly the first roller 2202 and/or the second roller 2204, with respect to the stationary portion 2251 of the base member 2250 can be adjusted. Through the hard stop 2410, movement of the pivoting portion 2249 of the base member 2250, and accordingly the first roller 2202 and/or the second roller 2204, via actuation of the roller vertical actuator 2252 can be precisely tuned as desired. While in the embodiment depicted in FIGS. 38C and 38D the hard stop 2410 includes the nut 2420 that limits movement of the hard stop 2410, it should be understood that this is merely an example. For example, in some embodiments, the movement of the hard stop 2410 may be limited by a manual micrometer, one or more motors, or the like. For example and as best shown in FIG. 43B, in some embodiments, the recoat assembly may include multiple hard stops 2410 that limit movement of the first roller 2202 and the second roller about the Y-axis as depicted. The hard stops 2410 may include micrometers for moving a position of the hard stops 2410. In some embodiments, the hard stops 2410 may further include a load cell for detecting a position of the hard stop 2410.

In some embodiments, the post portion 2412 of the hard stop 2410 extends through an aperture 2253 extending through the stationary portion 2251 of the base member 2250. In some embodiments, the recoat assembly 2200 includes a dust shield 2430 that at least partially encapsulates the aperture 2253 and/or at least a portion of the hard stop 2410. For example in the embodiment depicted in FIGS. 38C and 38D, the dust shield 2430 includes an upper portion 2432 that at least partially covers an upper opening of the aperture 2253 and the post portion 2412 of the hard stop 2410, and a lower portion 2434 that at least partially covers a lower opening of the aperture 2253. The dust shield 2430 may further include a lower biasing member 2436 that biases the lower portion 2434 of the dust shield 2430 into engagement with the aperture 2253. The dust shield 2430 may further include an upper biasing member 2438 that biases the upper portion 2432 of the dust shield 2430 into engagement with the aperture 2253. By at least partially enclosing the aperture 2253, the dust shield 2430 may assist in preventing build material 2031 (FIG. 29A) from entering the aperture 2253 and interfering with movement of the post portion 2412 of the hard stop 2410 through the aperture 2253. Further, in embodiments, the lower biasing member 2436 and/or the upper biasing member 2438 may at least partially offset tension resulting from a connection between the first rotational actuator 2206 and the first roller 2202 and/or between the second rotational actuator 2208 and the second roller 2204. For example, as shown in FIG. 38B, the first rotational actuator 2206 may be coupled to the first roller 2202 via a belt. Similarly, the second rotational actuator 2208 may be coupled to the second roller 2204 via a belt. Tension in the belts may cause movement of the first roller 2202 and/or the second roller 2204 in the Z-direction as depicted. This movement may be opposed by the lower biasing member 2436 and/or the upper biasing member 2438, thereby stabilizing the position of the first roller 2202 and/or the second roller 2204 in the Z-direction as depicted.

Figure 38E:
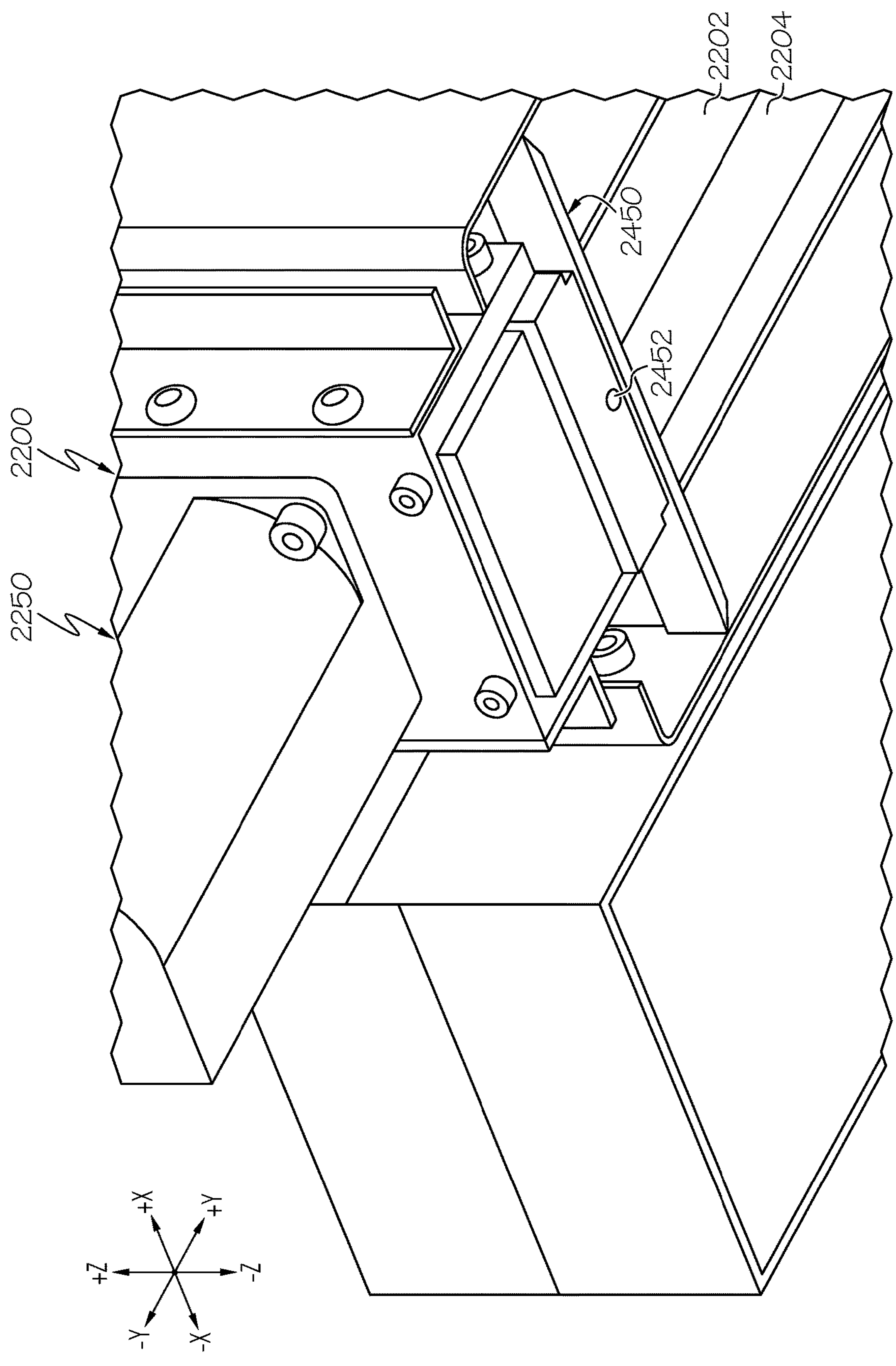
FIG. 38E schematically depicts a bottom perspective view of a recoat assembly, according to one or more embodiments shown and described herein.

Referring to FIG. 38E, a lower perspective view of the recoat assembly 2200 is schematically depicted. In some embodiments, the recoat assembly 2200 includes a powder guide 2450 pivotally coupled to the base member 2250 of the recoat assembly 2200 at a pivot point 2452. The powder guide 2450 may be pivotable with respect to the base member 2250 about the Y-axis as depicted. By pivoting with respect to the base member 2250 about the Y-axis, the powder guide 2450 may maintain contact with the build platform 2120 (FIG. 29A) and/or the supply platform 2130 (FIG. 29A) as the rollers 2202, 2204 move in the Z-direction as depicted. The powder guide 2450 may assist in restricting the flow of build material 2031 (FIG. 29A) in the Y-direction away from recoat assembly 2200.

Figure 39:
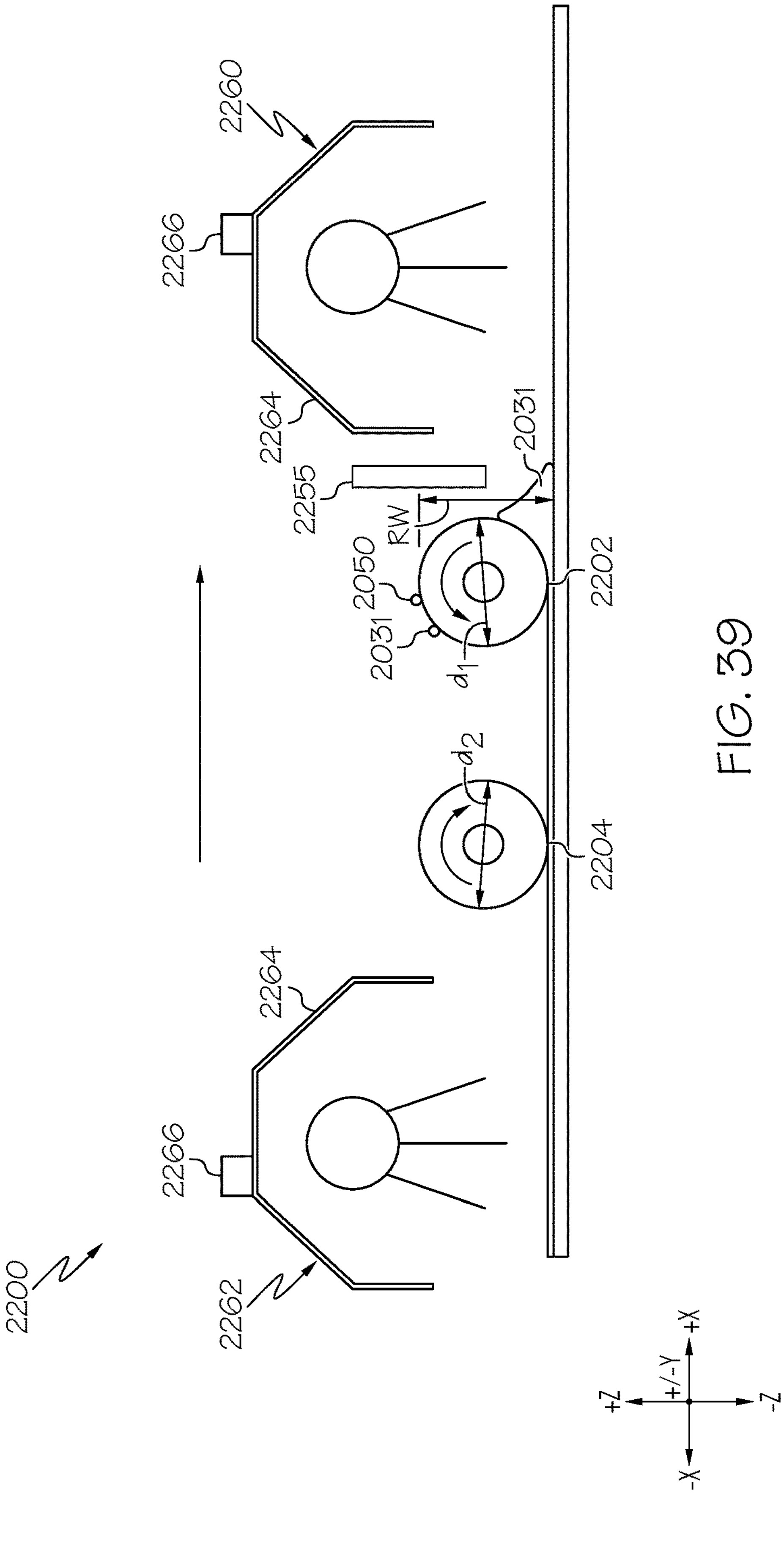
FIG. 39 schematically depicts rollers and energy sources of the recoat assembly of FIG. 33B, according to one or more embodiments shown and described herein.

Referring to FIGS. 38 and 39, in some embodiments, the front energy source 2260 and the rear energy source 2262 are each positioned at least partially within an energy source housing 2264. The energy source housings 2264 can, in some embodiments, focus energy emitted by the front energy source 2260 and the rear energy source 2262, and may include a reflective interior surface or the like.

In some embodiments, the recoat assembly 2200 includes one or more housing temperature sensors 2266. In the embodiment depicted in FIG. 39, the recoat assembly 2200 includes a housing temperature sensor 2266 coupled to the energy source housing 2264 of the front energy source 2260, and a housing temperature sensor 2266 coupled to the energy source housing 2264 of the front energy source 2262. In embodiments, the housing temperature sensors 2266 are configured to detect a temperature of the respective front and rear energy sources 2260, 2262 and/or the energy source housings 2264. The energy emitted by the front and rear energy sources 2260, 2262 may be controlled based at least in part on the detected temperature of the front and rear energy sources 2260, 2262 and/or the energy source housings 2264, so as to prevent damage to the front and rear energy sources 2260, 2262 and/or the energy source housings 2264 and/or to ensure that appropriate energy is applied to the build material 2031.

In some embodiments, the recoat assembly 2200 includes one or more housing engagement members 2257 positioned at outboard ends of the recoat assembly 2200 and engaged with a housing of the additive manufacturing system 2100. The housing engagement members 2257 are generally configured to engage and "plow" or "scrape" build material 2031 off of the sides of the additive manufacturing system 2100. In embodiments, the housing engagement members 2257 may include any structure suitable, such as brushes, blades, or the like.

Referring to FIG. 39, a side view of the recoat assembly 2200 is schematically depicted. In embodiments, the front roller 2202 has a front roller diameter d1, and the rear roller 2204 has a rear roller diameter d2. In some embodiments, the front roller diameter d1 is different from the rear roller diameter d2. For example, in some embodiments, the front roller diameter d1 is less than the rear roller diameter d2. In embodiments, the front roller diameter d1 is between 20 millimeters and 25 millimeters, inclusive of the endpoints. In some embodiments, the front roller diameter d1 is between 10 millimeters and 40 millimeters, inclusive of the endpoints. In some embodiments, the front roller diameter d1 is less than about 22.23 millimeters. As described in greater detail herein, a relatively small diameter may assist the front roller 2202 in fluidizing build material 2031 to distribute the build material 2031. In embodiments, the rear roller diameter d2 is between 35 millimeters and 40 millimeters, inclusive of the endpoints. In embodiments, the rear roller diameter d2 is between 20 millimeters and 60 millimeters, inclusive of the endpoints. In some embodiments, the rear roller diameter d2 is greater than about 38.1 millimeters. As described in greater detail herein, a relatively large diameter may assist the rear roller 2204 in compacting build material 2031.

In some embodiments, the recoat assembly 2200 includes a powder engaging member 2255 coupled to the base member 2250 (FIG. 38A) and positioned forward of the front roller 2202. In embodiments, the powder engaging member 2255 is positioned at a height evaluated in the vertical direction (i.e., in the Z-direction as depicted) that is within a roller window Rw defined by the front roller 2202. The powder engaging member 2255 may be a "doctor" blade that generally acts to plow and clear build material 2031 forward of the front roller 2202, thereby minimizing a height of build material 2031 contacted by the front roller 2202. While in the depicted embodiment, the recoat assembly 2200 includes the powder engaging member 2255 and the front and rear rollers 2202, 2204, it should be understood that in some embodiments, the recoat assembly 2200 may include only the powder engaging member 2255 to spread build material 2031. While in the embodiment depicted in FIG. 39, the powder engaging member 2255 is positioned forward of the front roller 2202, embodiments described herein may include a single or multiple powder engaging members positioned forward of the front roller 2202 and/or rearward of the rear roller 2204.

Recoat Roller Positioning

In some embodiments, the recoat assembly 2200 includes multiple front rollers 2202 and/or multiple rear rollers 2204.

Figure 40:
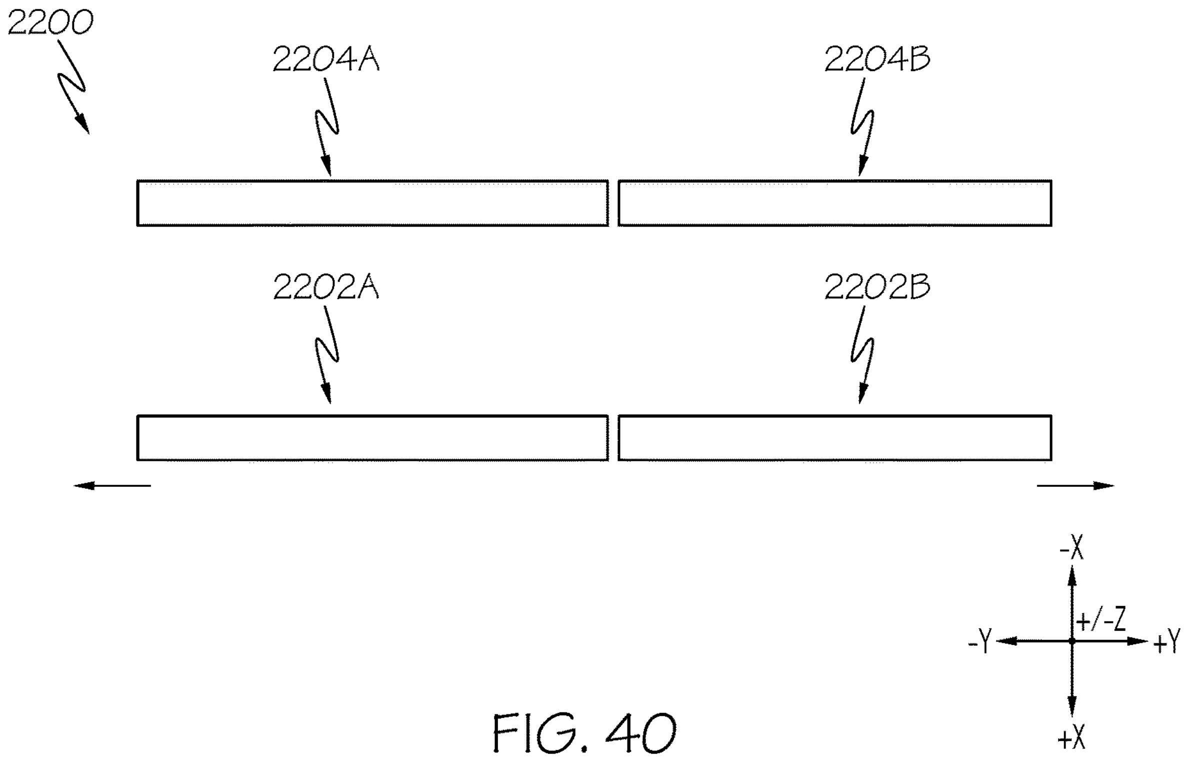
FIG. 40 schematically depicts one embodiment of a layout of the rollers of the recoat assembly of FIG. 33B, according to one or more embodiments shown and described herein.

For example and referring to FIG. 40, a top view of one configuration of front rollers 2202A, 2202B and rear rollers 2204A, 2204B is schematically depicted. In the embodiment depicted in FIG. 40, the recoat assembly 2200 includes a first front roller 2202A and a second front roller 2202B that is spaced apart from the first front roller 2202A in the lateral direction (i.e., in the Y-direction as depicted). In the embodiment depicted in FIG. 40, the recoat assembly 2200 further includes a first rear roller 2204A and a second rear roller 2204B spaced apart from the first rear roller 2204A in the lateral direction (i.e., in the Y-direction as depicted). While the embodiment depicted in FIG. 40 includes the two front rollers 2202A, 2202B and two rear rollers 2204A, 2204B, it should be understood that the recoat assembly 2200 may include any suitable number of front rollers spaced apart from one another in the lateral direction (i.e., in the Y-direction as depicted), and any suitable number of rear rollers spaced apart from one another in the lateral direction. In some embodiments, the recoat assembly 2200 may include the two front rollers 2202A, 2202B, and a single rear roller, or the two rear rollers 2204A, 2204B with a single front roller. By including multiple front rollers 2202A, 2202B, aligned with one another in the lateral direction (i.e., in the Y-direction as depicted), and/or by including multiple rear rollers 2204A, 2204B aligned with one another in the lateral direction, the recoat assembly 2200 may extend a greater distance in the lateral direction, as compared to recoat assemblies including a single front roller and a single rear roller. As an example and without being bound by theory, the longer a roller extends in the lateral direction (i.e., in the Y-direction as depicted), the more susceptible the roller may be to elastic and/or inelastic deformation due to forces acting on the roller. Accordingly, the width of recoat assemblies including a single front roller and a single rear roller may be effectively limited, which may limit the size of objects that may be built by the additive manufacturing system 2100. However, by including multiple front rollers 2202A, 2202B, aligned with one another in the lateral direction (i.e., in the Y-direction as depicted), and/or by including multiple rear rollers 2204A, 2204B aligned with one another in the lateral direction, the recoat assembly 2200 may extend a greater distance in the lateral direction.

Figure 41:
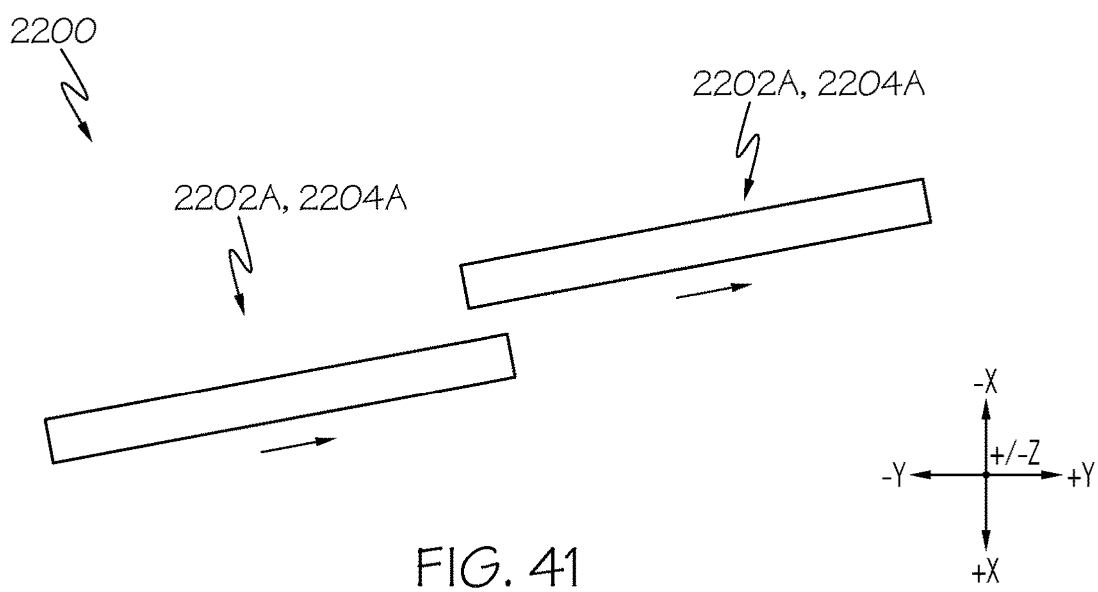
FIG. 41 schematically depicts another embodiment of a layout of the rollers of the recoat assembly of FIG. 33B, according to one or more embodiments shown and described herein.

Referring to FIG. 41, in some embodiments, the front rollers 2202A, 2202B overlap one another in the lateral direction (i.e., in the Y-direction as depicted). In embodiments in which the recoat assembly 2200 includes the two rear rollers 2204A, 2204B, the two rear rollers may similarly overlap one another in the lateral direction (i.e., in the Y-direction as depicted). By overlapping the front rollers 2202A, 2202B and/or the rear rollers 2204A, 2204B in the lateral direction (i.e., in the Y-direction as depicted), the front rollers 2202A, 2202B and/or the rear rollers 2204A, 2204B may prevent build material 2031 (FIG. 39) from passing between adjacent front rollers 2202A, 2202B and/or adjacent rear rollers 2204A, 2204B.

Figure 42:
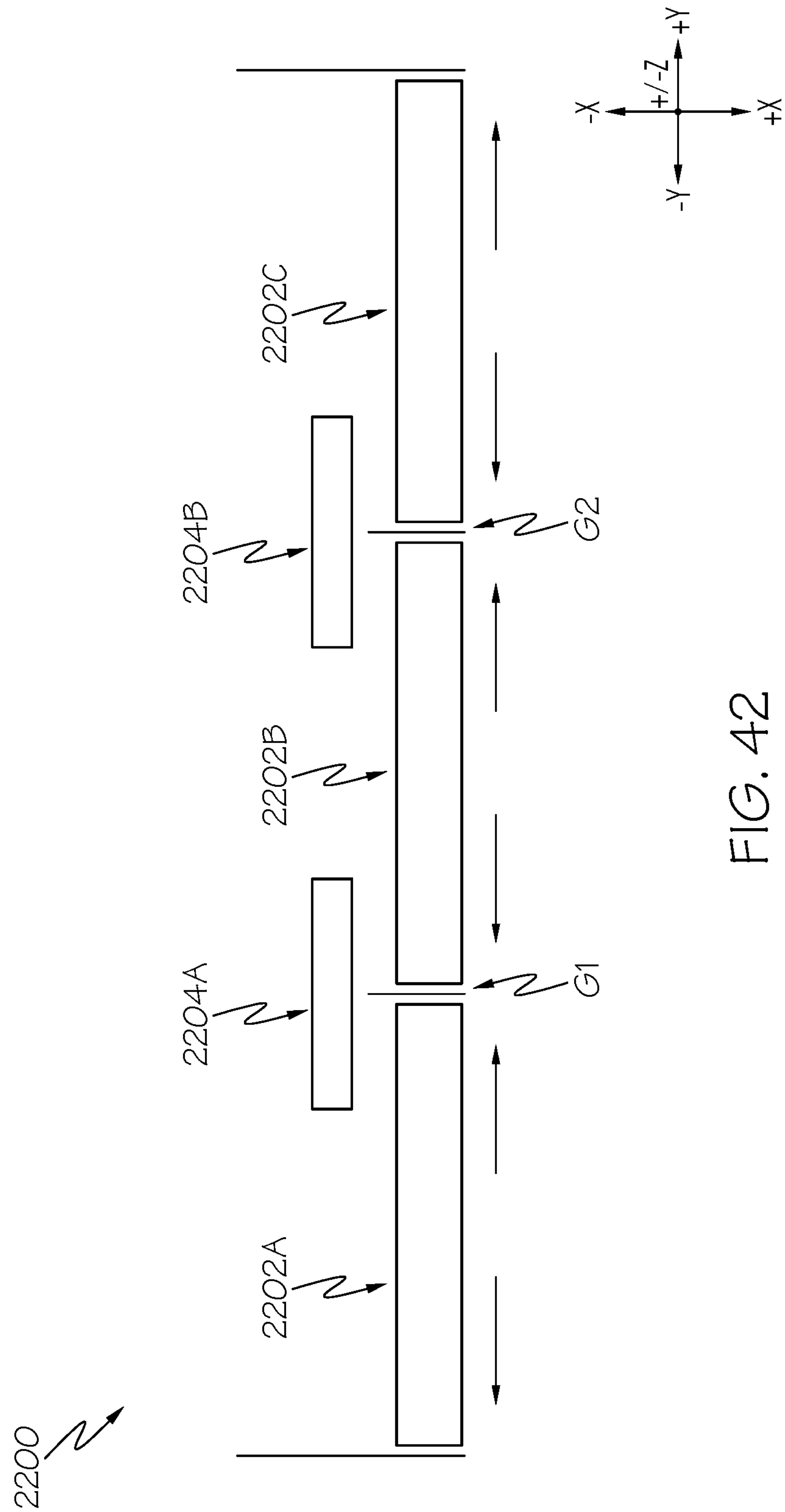
FIG. 42 schematically depicts another embodiment of a layout of the rollers of the recoat assembly of FIG. 33B, according to one or more embodiments shown and described herein.

Referring to FIG. 42, in some embodiments, rollers are positioned to extend across gaps defined by adjacent rollers. For example, in the embodiment depicted in FIG. 42, the recoat assembly 2200 includes three front rollers 2202A, 2202B, and 2202C, wherein adjacent front rollers 2202A, 2202B define a gap G1 positioned between the rollers 2202A, 2202B in the lateral direction (i.e., in the Y-direction as depicted), and adjacent front rollers 2202B, 2202C define a gap G2 positioned between the rollers 2202B, 2202C in the lateral direction. The recoat assembly 2200 includes a rear roller 2204A extending between the adjacent front rollers 2202A, 2202B, and rear roller 2204B extending between the adjacent front rollers 2202B, 2202C. In particular, the rear roller 2204A extends across the gap G1 between the adjacent front rollers 2202A, 2202B, and the rear roller 2204B extends across the gap G2 between the adjacent front rollers 2202B, 2202C. By extending across the gaps G1, G2, the rear rollers 2204A, 2204B may engage build material 2031 (FIG. 39) that passes through the gaps G1, G2.

Recoat Cleaning Member

Figure 43A:
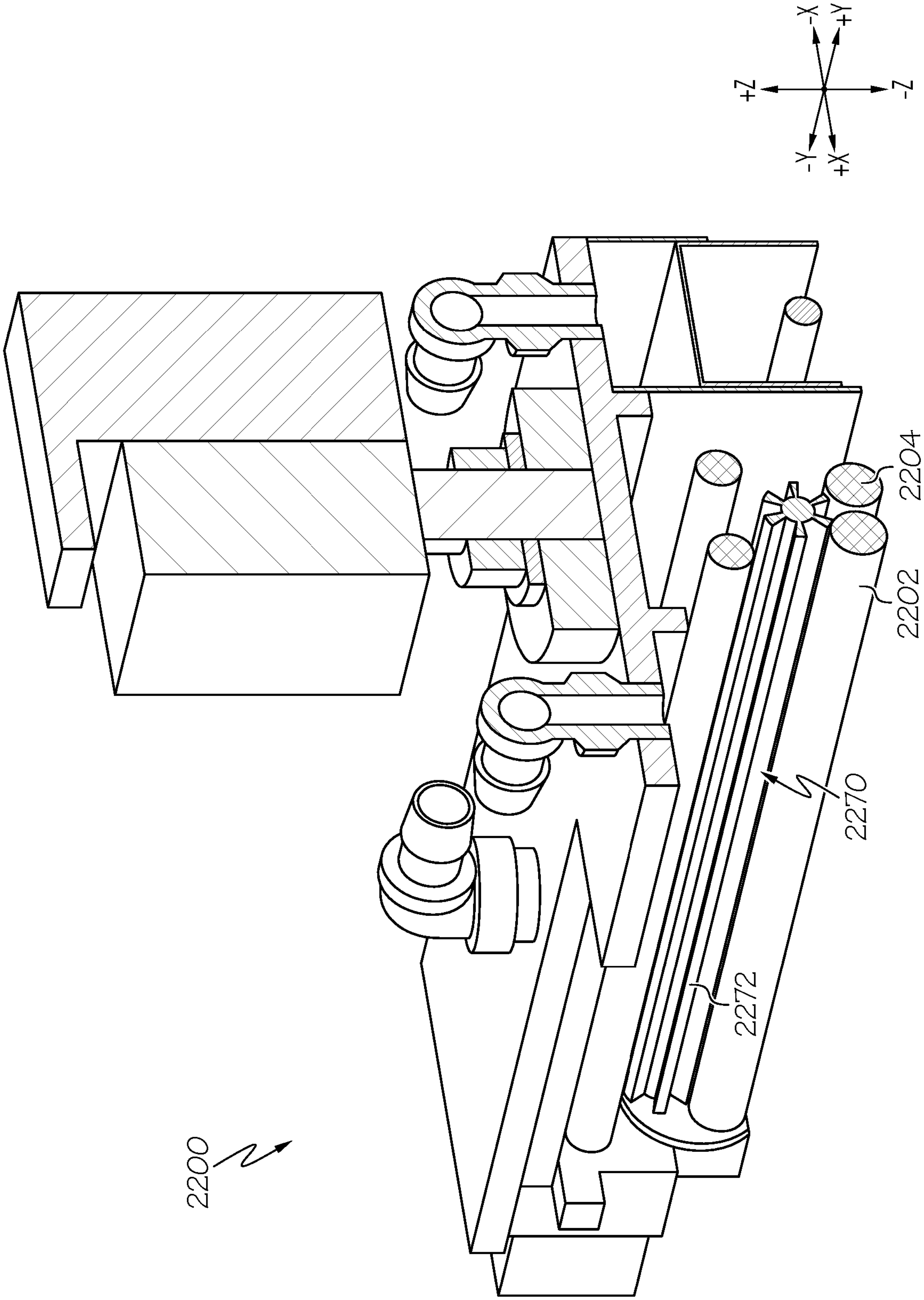
FIG. 43A schematically depicts a perspective view of a recoat assembly including a cleaning member, according to one or more embodiments shown and described herein.
Figure 43B:
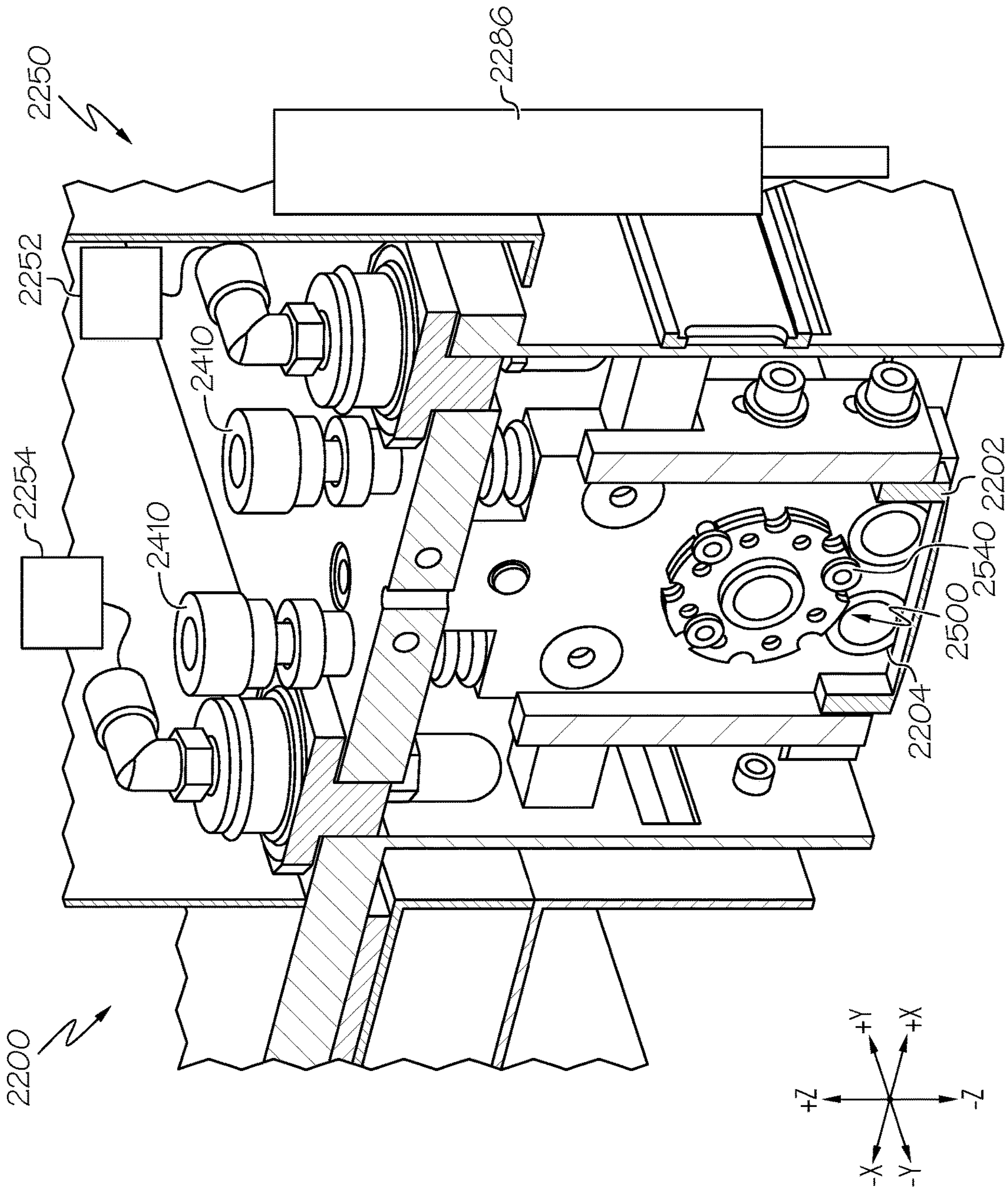
FIG. 43B schematically depicts a perspective view of a recoat assembly including a cleaning member, according to one or more embodiments shown and described herein.

Referring to FIG. 43A, in some embodiments, the recoat assembly 2200 includes a cleaning member 2270. In embodiments, the cleaning member 2270 is selectively engagable with at least one roller. For example, in the embodiment depicted in FIG. 43A, the cleaning member 2270 is positioned between and engaged with the first roller 2202 and the second roller 2204. In the embodiment depicted in FIG. 43A, the cleaning member 2270 generally engages both the first roller 2202 and the second roller 2204 along the length of the first roller 2202 and the second roller 2204 evaluated in the lateral direction (i.e., in the Y-direction as depicted) and generally removes build material 2031 (FIG. 39) and/or cured binder material 2050 (FIG. 39) that may remain attached to the first roller 2202 and the second roller 2204 as the first roller 2202 and the second roller 2204 rotate. In some embodiments, the cleaning member 2270 is a cleaning roller including grooves 2272 or brush that is configured to rotate while engaged with the first roller 2202 and the second roller 2204. In some embodiments, the cleaning member 2270 may include a blade or the like that removes build material 2031 (FIG. 39) from the first roller 2202 and the second roller 2204. While in the embodiment depicted in FIG. 43A the cleaning member 2270 is simultaneously engaged with the first roller 2202 and the second roller 2204, it should be understood that the cleaning member 2270 may in some embodiments be engaged solely with either the first roller 2202 or the second roller 2204. Moreover, while the embodiment depicted in FIG. 43A depicts a single cleaning member 2270, it should be understood that in embodiments, the recoat assembly 2200 may include multiple cleaning members 2270.

Figure 43C:
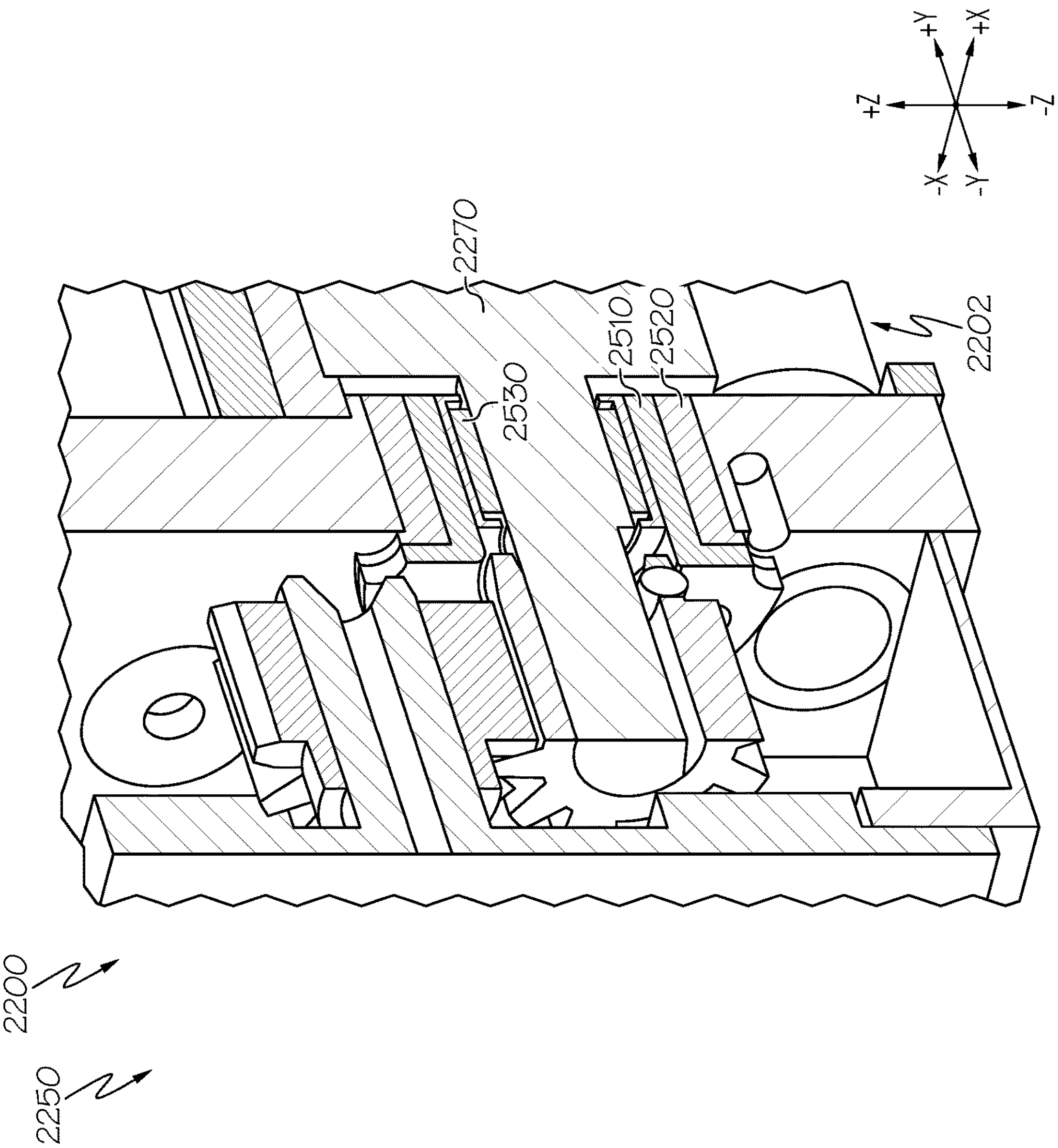
FIG. 43C schematically depicts a perspective section view of the recoat assembly of FIG. 43B, according to one or more embodiments shown and described herein.
Figure 43D:
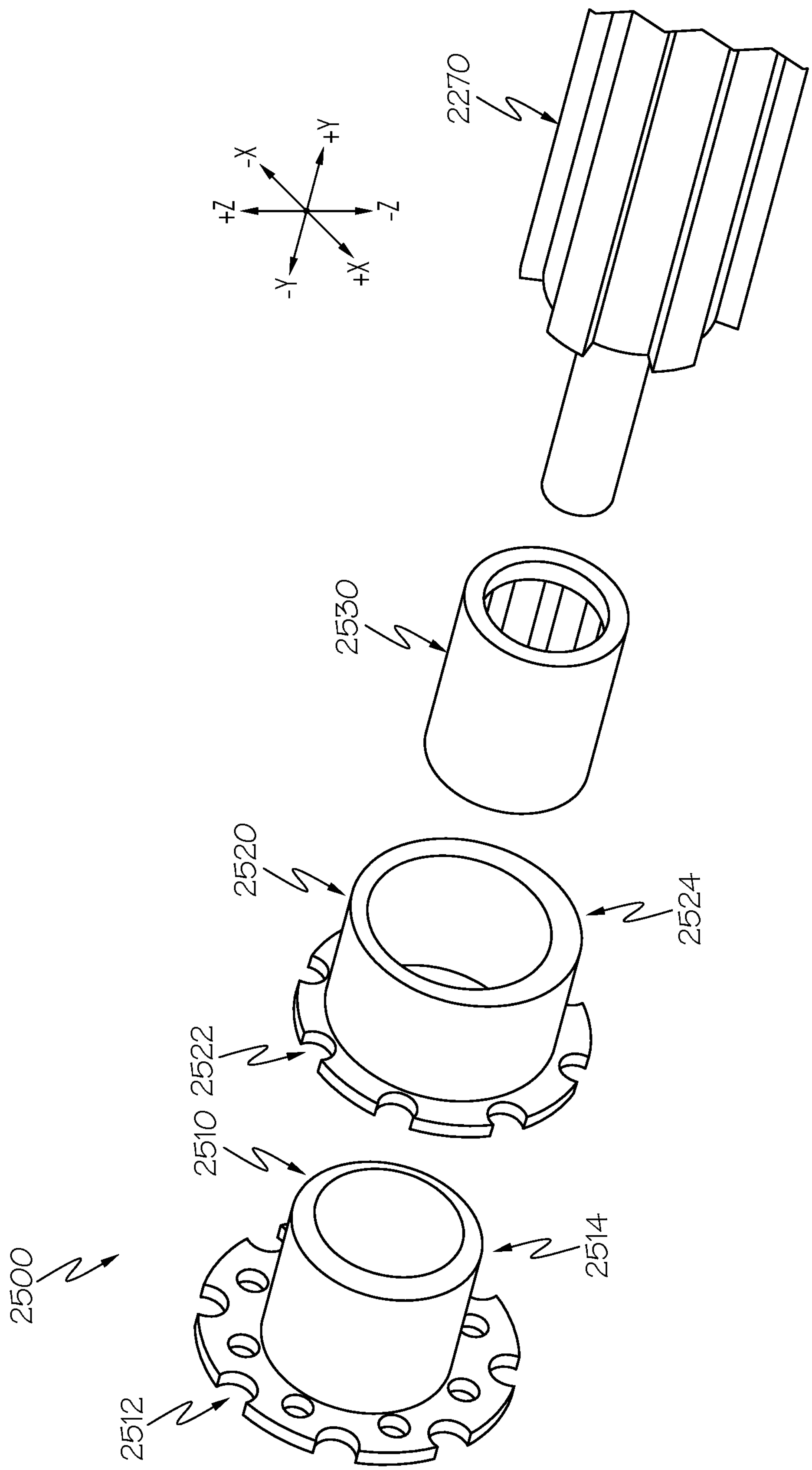
FIG. 43D schematically depicts an exploded view of a cleaning position adjustment assembly engaged with the cleaning member of FIG. 43C, according to one or more embodiments shown and described herein.

In some embodiments, the position of the cleaning member 2270 can be adjusted with respect to the first roller 2202 and/or the second roller 2204. For example and referring to FIGS. 43B, 43C, and 43D, in some embodiments, the recoat assembly 2200 includes a cleaning position adjustment assembly 2500. In some embodiments, the cleaning position adjustment assembly 2500 includes a first rotational member 510 and a second rotational member 2520. As best shown in FIG. 43D, in some embodiments, the first rotational member 2510 includes a first notched flange 2512 and a first eccentric tube 2514. The second rotational member 2520 includes a second notched flange 2522 and a second eccentric tube 2524. In embodiments, the first eccentric tube 2514 is insertable within the second eccentric tube 2524, as shown in FIG. 43C. The cleaning position adjustment assembly 2500 may further include a bearing 2530 that is insertable within the first eccentric tube 2514, and the cleaning member 2270 is engaged with the bearing 2530.

By rotating the first rotational member 2510 and/or the second rotational member 2520 with respect to one another, the position of the cleaning member 2270 with respect to the base member 2250, and accordingly the first roller 2202 and the second roller 2204, may be adjusted. For example, the position of the second rotational member 2520 with respect to the base member 2250 may be generally fixed. As the first rotational member 2510 and the second rotational member 2520 rotate with respect to one another, the eccentricity of the first eccentric tube 2514 and the second eccentric tube 2524 move the cleaning member 2270 with respect to the base member 2250, and accordingly with respect to the first roller 2202 and the second roller 2204. In this way, a user, such as a technician, can adjust the position of the cleaning member 2270 with respect to the first roller 2202 and the second roller 2204. In some embodiments, the cleaning position adjustment assembly 2500 further includes one or more pins 2540 that are insertable into the base member 2250 through notches of the first notched flange 2512 and the second notched flange 2522. The one or more pins 2540 restrict rotational movement of the first rotational member 2510 and the second rotational member 2520 with respect to one another, and with respect to the base member 2250. The one or more pins 2540 may be positioned into the base member 2250 through notches of the first notched flange 2512 and the second notched flange 2522, for example by a technician, once the cleaning member 2270 is positioned as desired. In some embodiments, the first rotational member 2510 and/or the second rotational member 2520 may be rotated with respect to one another and/or retained in position by an actuator or the like.

Figures 44A, 44B, 44C:
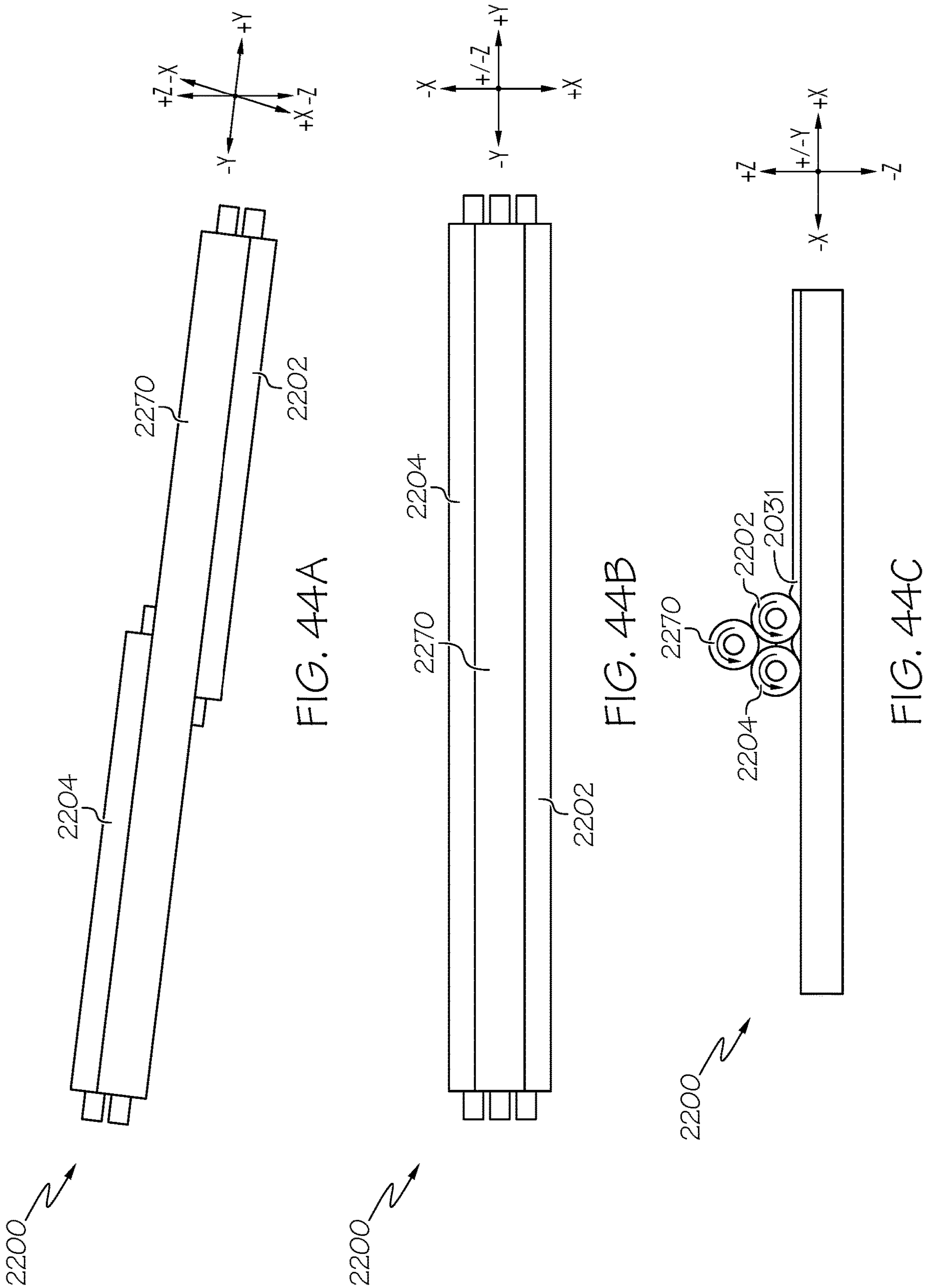
FIG. 44A schematically depicts a top view of the cleaning member and the rollers of the recoat assembly of FIG. 30, according to one or more embodiments shown and described herein.
FIG. 44B schematically depicts another top view of the rollers of the recoat assembly of FIG. 30 and the cleaning member, according to one or more embodiments shown and described herein.
FIG. 44C schematically depicts a side view of the rollers of the recoat assembly of FIG. 30 and the cleaning member, according to one or more embodiments shown and described herein.

Referring to FIGS. 44A-44C, top views and a side view of the cleaning member 2270 engaged with the first and second rollers 2202, 2204 are schematically depicted. As shown in FIG. 44A, in some embodiments, such as embodiments in which the first roller 2202 and the second roller 2204 are offset from one another in the lateral direction (i.e., in the Y-direction as depicted), the cleaning member 2270 may extend along the length of both the first roller 2202 and the second roller 2204 in the lateral direction. As shown in FIG. 44B, the cleaning member 2270 may similarly extend along the length of both the first roller 2202 and the second roller 2204 in the lateral direction (i.e., in the Y-direction as depicted) in embodiments in which the first roller 2202 and the second roller 2204 are aligned with one another. In embodiments, as depicted in FIG. 44C, the cleaning member 2270 is generally positioned above the first roller 2202 and the second roller 2204 in the vertical direction (i.e., in the Z-direction as depicted).

Recoat Vacuum

Figure 45A:
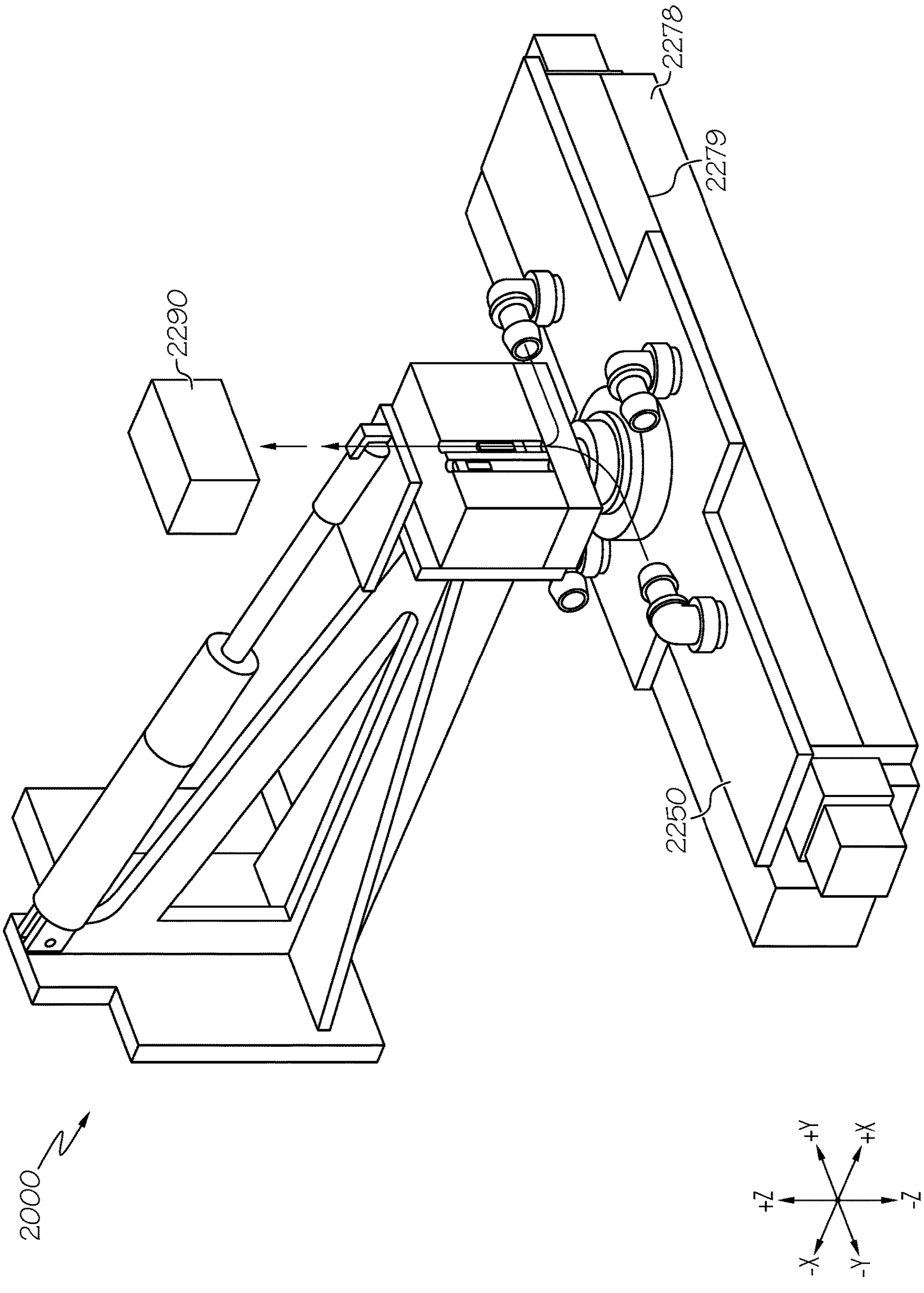
FIG. 45A schematically depicts a perspective view of a secondary containment housing and a vacuum of the recoat assembly of FIG. 30, according to one or more embodiments shown and described herein.
Figure 45B:
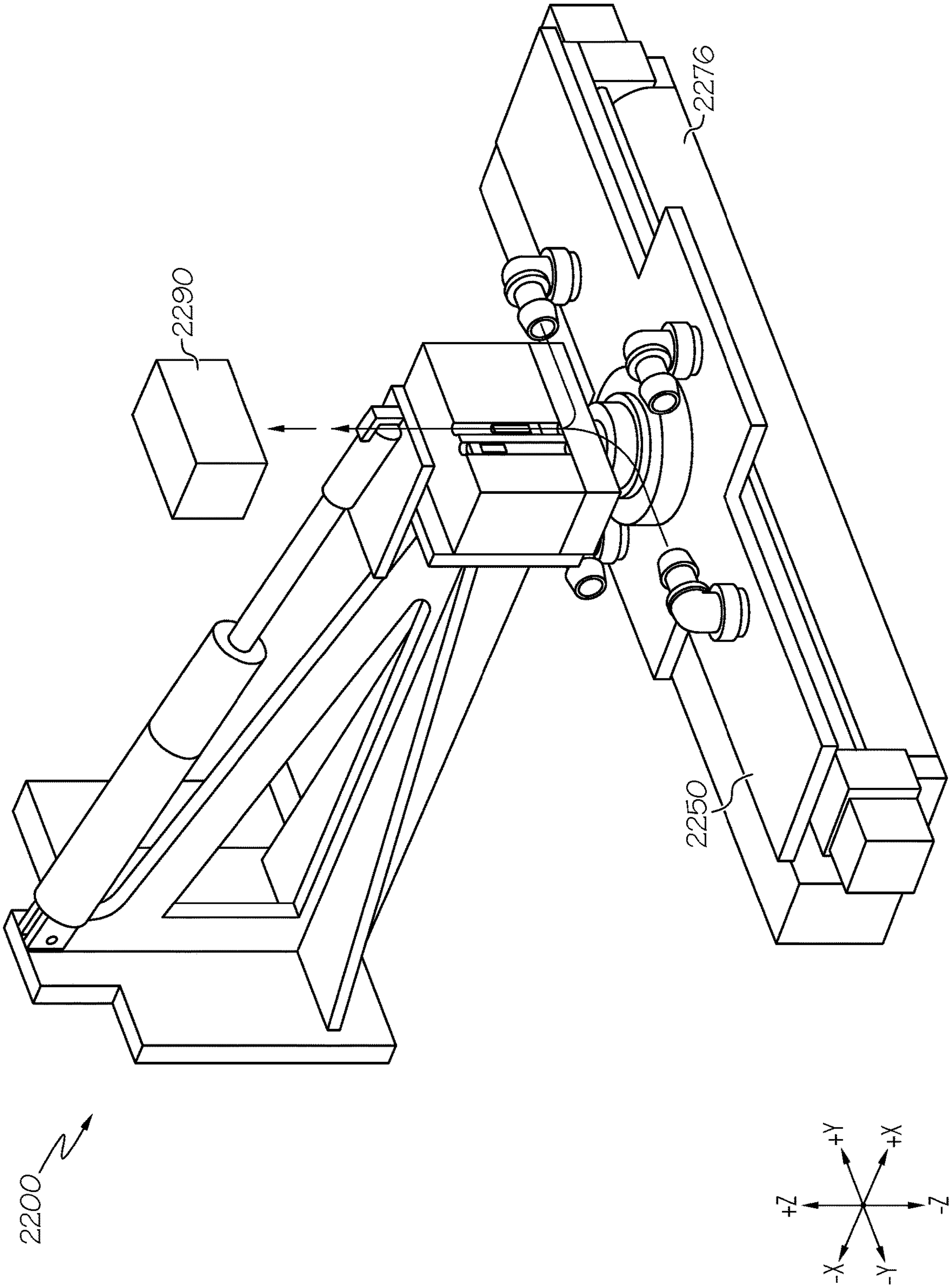
FIG. 45B schematically depicts a perspective view of a primary containment housing and a vacuum of the recoat assembly of FIG. 30, according to one or more embodiments shown and described herein.

Referring to FIGS. 38A, 45A, 45B, and 49, in some embodiments, the recoat assembly 2200 is in fluid communication with a vacuum 2290. In particular, in embodiments, the vacuum 2290 is in fluid communication with at least a portion of the base member 2250 of the recoat assembly 2200. The vacuum 2290 is generally operable to draw airborne build material 2031 (FIG. 39) out of the recoat assembly 2200 and/or control the flow of aerosolized build material 2031 within the additive manufacturing system 2100 (FIG. 29A). In particular, as the rollers 2202, 2204 (FIG. 46) fluidize build material 2031 (FIG. 44C), some build material 2031 will become airborne, unless controlled, may foul components of the additive manufacturing system 2100. The vacuum 2290, in embodiments, may include any suitable device for applying a negative and/or a positive pressure to the recoat assembly 2200, such as a pump or the like. As depicted in FIG. 45A, the base member 2250 generally includes a secondary containment housing 2278. In some embodiments, the primary containment housing 2276 and/or the secondary containment housing 2278 may include one or more adjustable openings 2279 that can be adjustably opened and closed to selectively restrict the flow of air and/or build material through the primary containment housing 2276 and/or the secondary containment housing 2278. For example and as shown in FIGS. 38A and 50, the primary containment housing includes a first adjustable opening 2279 and a second adjustable opening 2279'. The recoat assembly 2200 may further include a first movable cover 2269 that can selectively cover the first adjustable opening 2279. For example, the first movable cover 2269 may be movable in the Z-direction as depicted to selectively widen or narrow the first adjustable opening 2279 (evaluated in the Z-direction as depicted). Similarly, the recoat assembly 2200 may include a second movable cover 2269' that can selectively cover the second adjustable opening 2279'. For example, the second movable cover 2269' may be movable in the Z-direction as depicted to selectively widen or narrow the second adjustable opening 2279' (evaluated in the Z-direction as depicted) independently of the first adjustable opening 2279. By widening or narrowing the first and/or second adjustable openings 2279, 2279', airflow into the primary containment housing 2276 can be tuned as desired to direct flow of airborne build material 2031. FIG. 45B shows the base member 2250 with the secondary containment housing 2278 removed, and depicts a primary containment housing 2276 of the base member 2250.

Without being bound by theory, airborne build material 2031 may include particles that are smaller than the build material 2031 that does not become airborne. Accordingly, by drawing airborne build material 2031 of smaller size out of the recoat assembly 2200, the mean particle size of the build material 2031 in the supply receptacle 2134 (FIG. 29A) and/or the build area 2124 (FIGS. 29A, 29B) may increase. Accordingly, in some embodiments, build material 2031 including smaller particles, such as the build material 2031 drawn from the recoat assembly 2200, may be periodically re-introduced to the supply receptacle 2134 (FIG. 29A) and/or the build material hopper 2360 (FIG. 29A) to maintain a relatively consistent particle size of the build material 2031.

Figure 46:
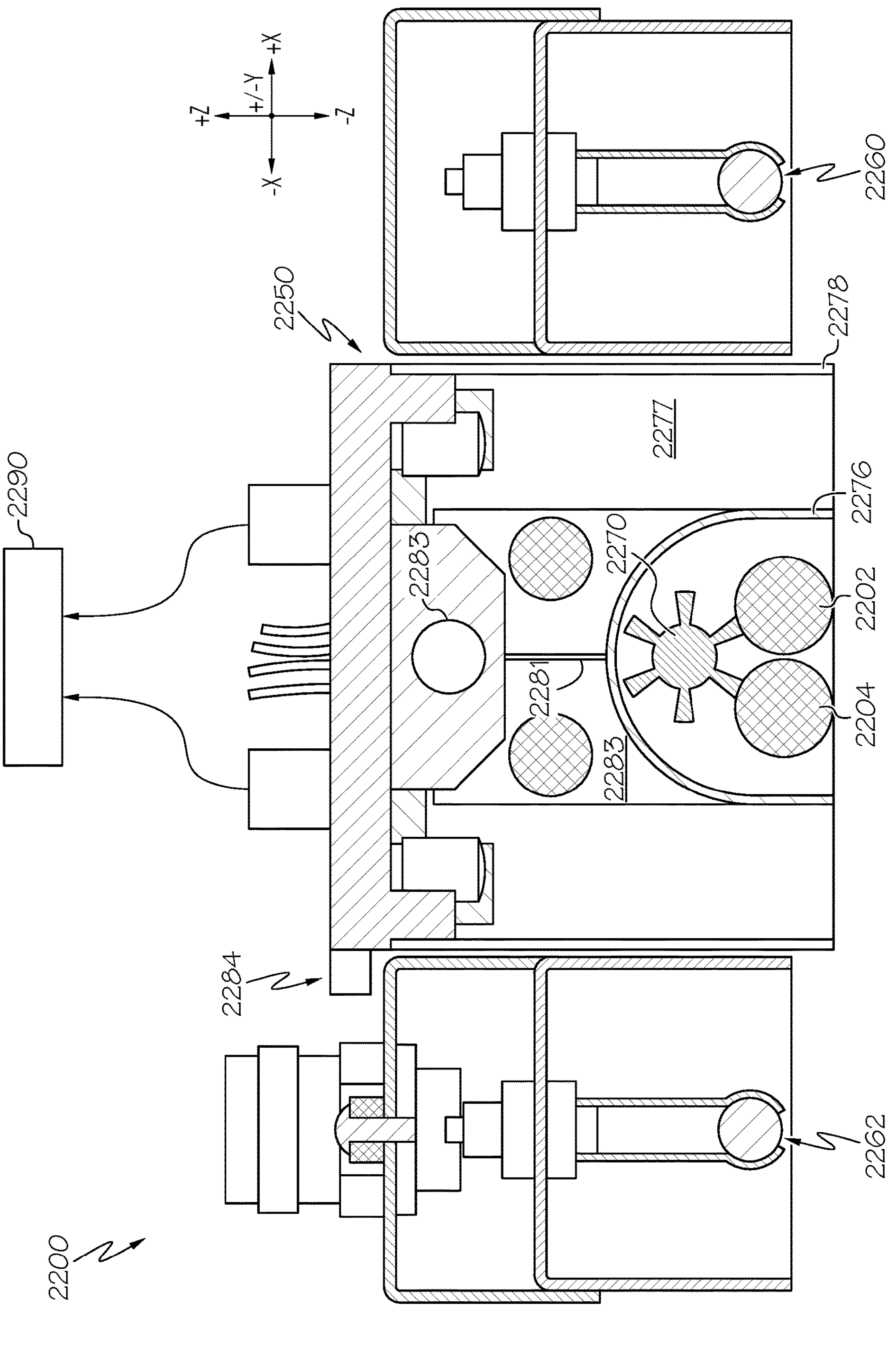
FIG. 46 schematically depicts a section view of the vacuum and the recoat assembly of FIG. 30, according to one or more embodiments shown and described herein.

Referring to FIG. 46, a section view of the base member 2250 is depicted. In embodiments, the primary containment housing 2276 at least partially encapsulates the powder spreading member (e.g., the first and second rollers 2202, 2204 and/or the powder engaging member 2255 (FIG. 39)). The secondary containment housing 2278 is spaced apart from the primary containment housing 2276 and at least partially encapsulates the primary containment housing 2276. The primary containment housing 2276 and the secondary containment housing 2278 generally define an intermediate cavity 2277 that is disposed between the primary containment housing 2276 and the secondary containment housing 2278. In embodiments, the vacuum 2290 is in fluid communication with the intermediate cavity 2277, and is operable to draw airborne build material 2031 from the intermediate cavity 2277. In some embodiments, the intermediate cavity 2277 is a forward intermediate cavity 2277, and the secondary containment housing 2278 and the primary containment housing 2276 define a rear intermediate cavity 2283 separated from the forward intermediate cavity 2277 by a bulkhead 2281. By separating the forward intermediate cavity 2277 and the rear intermediate cavity 2283, different vacuum pressures may be applied to the forward intermediate cavity 2277 and the rear intermediate cavity 2283. For example, the rear intermediate cavity 2283 may pass over generally settled build material 2031, and accordingly, it may be desirable to apply less vacuum pressure at the rear intermediate cavity 2283 to avoid disturbing the settled build material 2031. In some embodiments, the recoat assembly 2200 further includes an agitation device 2284 coupled to the base member 2250. The agitation device 2284 is operable to vibrate components of the recoat assembly 2200, such as the base member 2250, the first roller 2202, and/or the second roller 2204 to dislodge build material 2031 (FIG. 39) that may be attached to the base member 2250 and/or the first roller 2202 and the second roller 2204.

Figure 47:
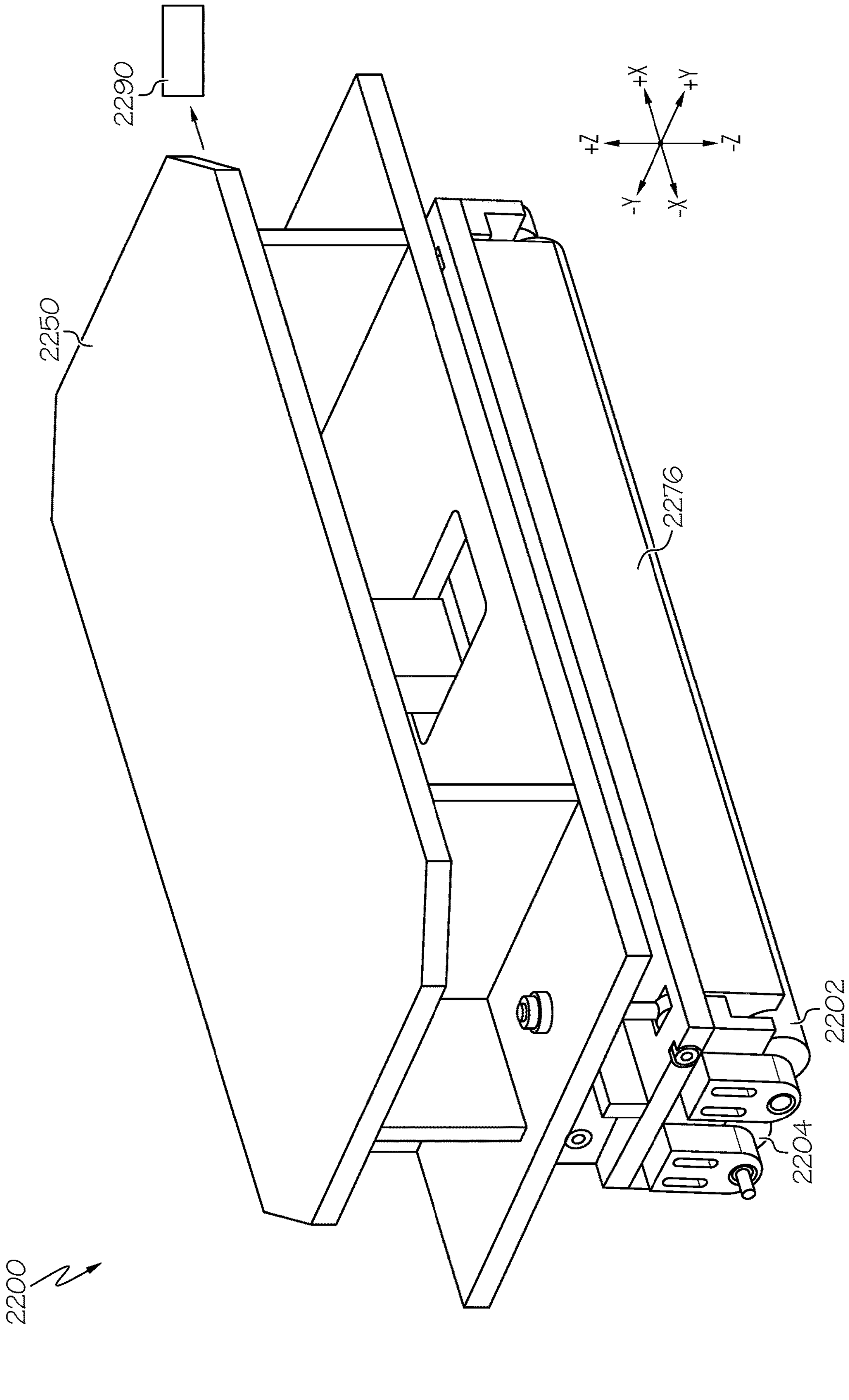
FIG. 47 schematically depicts a perspective view of another recoat assembly, according to one or more embodiments shown and described herein.
Figure 48:
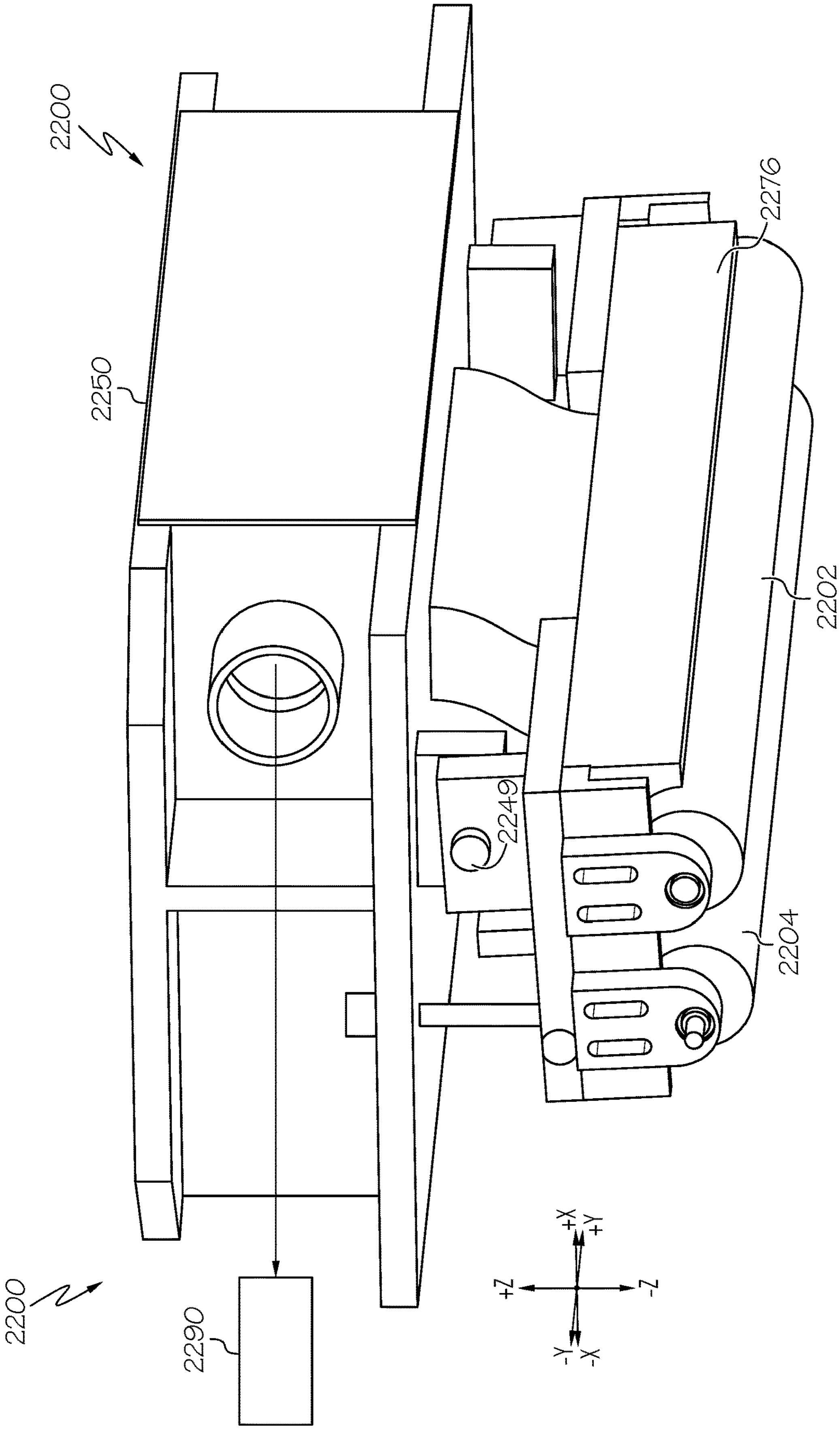
FIG. 48 schematically depicts another perspective view of the recoat assembly of FIG. 47, according to one or more embodiments shown and described herein.

Referring to FIGS. 47 and 48, in some embodiments the base member 2250 may include only the primary containment housing 2276 at least partially enclosing the powder spreading member (e.g., the first roller 2202 and/or the second roller 2204). In these embodiments, the vacuum 2290 is in fluid communication with the primary containment housing 2276.

Figure 49:
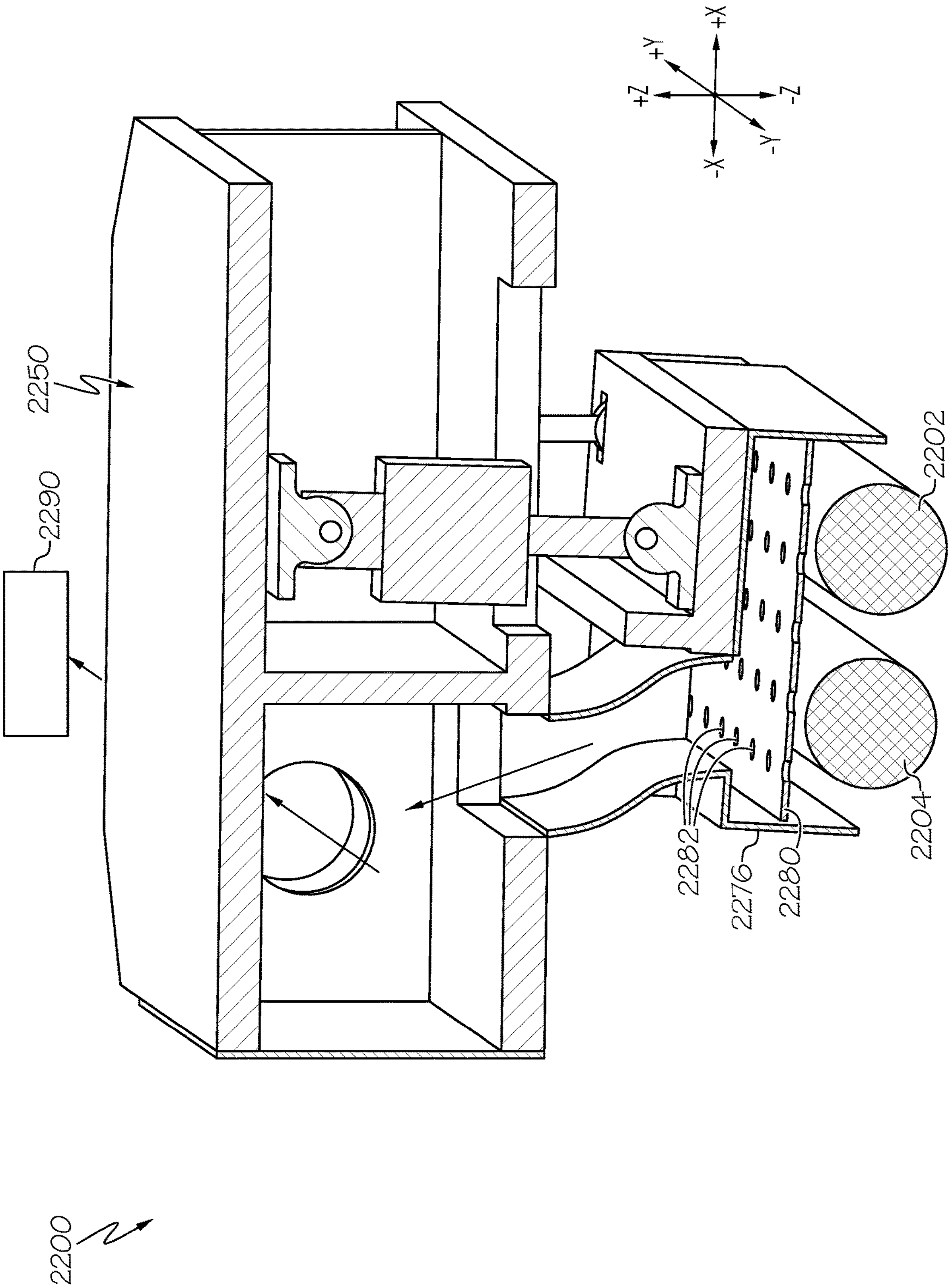
FIG. 49 schematically depicts a section view of the recoat assembly of FIG. 47, according to one or more embodiments shown and described herein.
Figure 50:
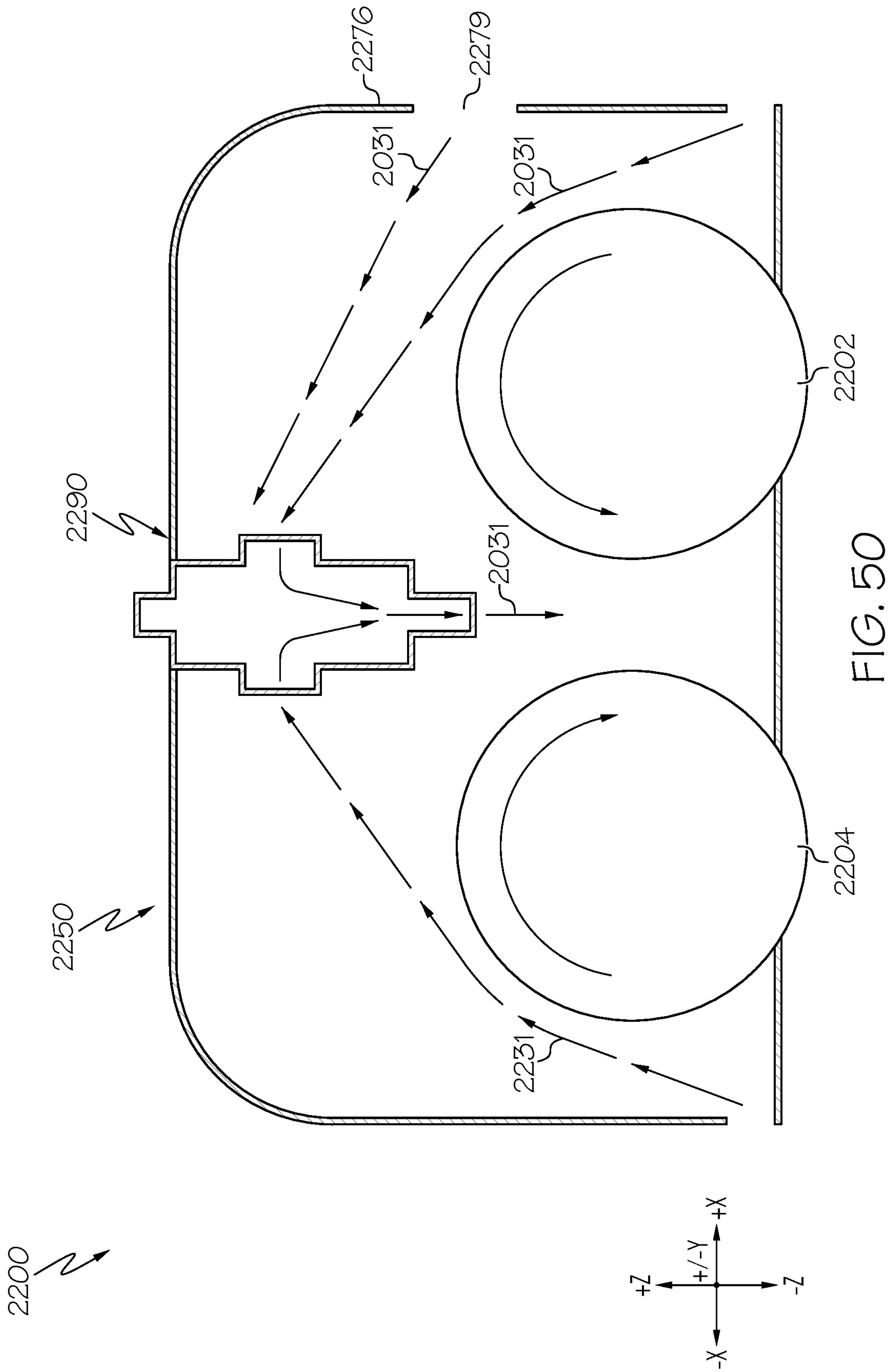
FIG. 50 schematically depicts another section view of a recoat assembly, according to one or more embodiments shown and described herein.

Referring to FIG. 49, a section view of the base member 2250 is schematically depicted. As shown in FIG. 49, the vacuum 2290 is in fluid communication with the primary containment housing 2276, and generally operates to draw airborne build material 2031 (FIG. 39). In some embodiments, the recoat assembly 2200 includes a diffuser plate 2280 positioned between the vacuum 2290 and the powder spreading member (e.g., the first roller 2202 and/or the second roller 2204). The diffuser plate 2280 generally includes a plurality of apertures 2282 extending therethrough. The diffuser plate 2280 may generally assist in distributing the negative pressure applied to the primary containment housing 2276 by the vacuum 2290.

Referring to FIG. 50, in some embodiments, the vacuum 2290 is operable to draw airborne build material 2031 from the recoat assembly 2200, and is further operable to direct the collected build material 2031 beneath the recoat assembly 2200 in the vertical direction (i.e., in the Z-direction as depicted). In the embodiment depicted in FIG. 50, the vacuum 2290 is positioned within the primary containment housing 2276 and is positioned between the first roller 2202 and the second roller 2204. The vacuum 2290 generally acts to draw in and collect airborne build material 2031 and subsequently deposit the collected build material 2031 below the recoat assembly 2200. In the embodiment depicted in FIG. 50, the vacuum 2290 is positioned between the first roller 2202 and the second roller 2204, and the vacuum 2290 deposits the collected build material 2031 between the first roller 2202 and the second roller 2204. In some embodiments, the vacuum 2290 may be positioned outside of the recoat assembly 2200 and may redeposit the collected build material 2031 at any suitable location beneath the recoat assembly 2200.

Recoat Controls

Figure 51:
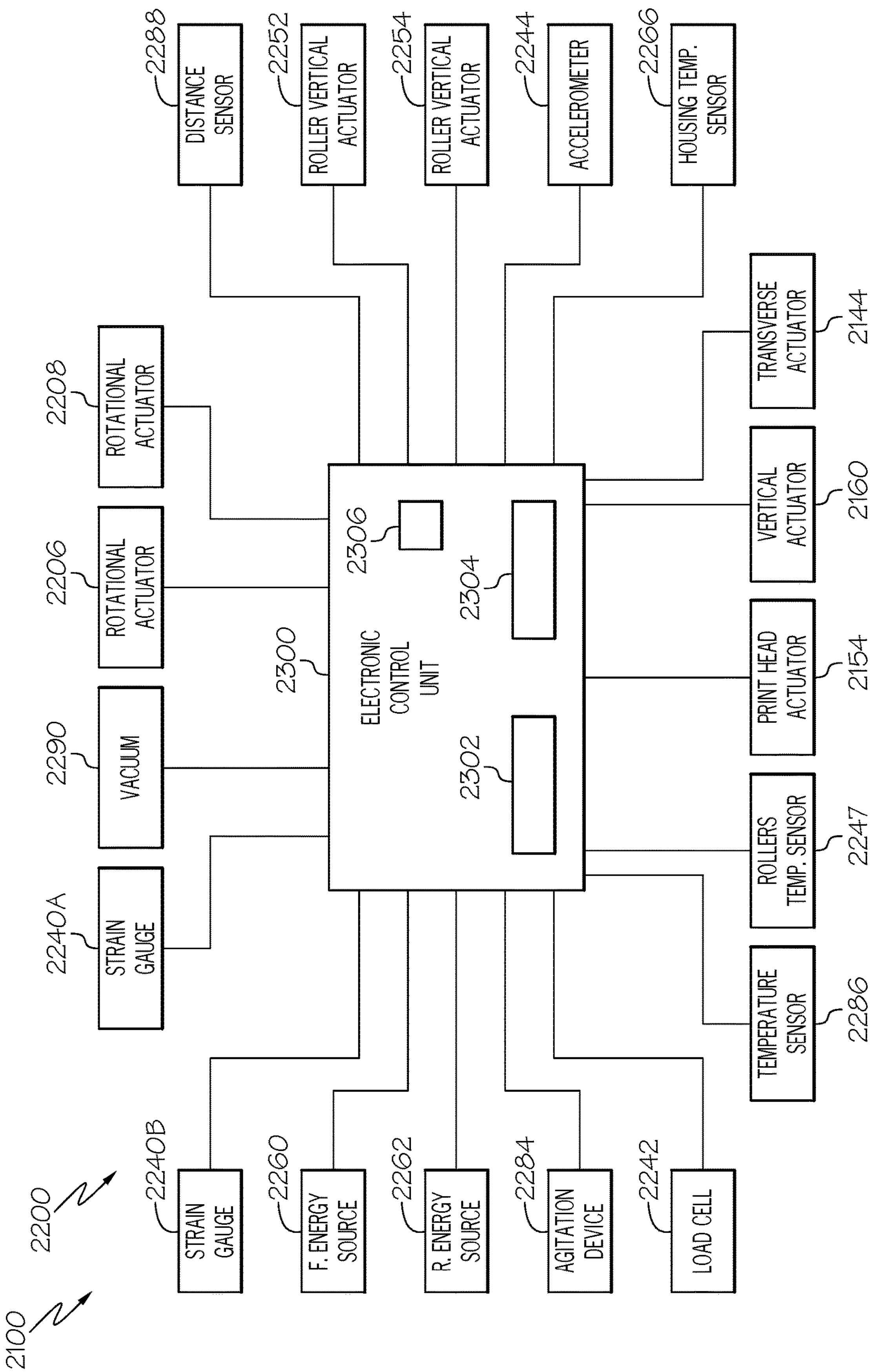
FIG. 51 schematically depicts a control diagram of the additive manufacturing system according to one or more embodiments shown and described herein.

Referring to FIG. 51, a control diagram for the additive manufacturing system 2100 is schematically depicted. In embodiments, the strain gauges 2240A, 2240B, the load cell 2242, and the accelerometer 2244 are communicatively coupled to an electronic control unit 2300. The first and second rotational actuators 2206, 2208, the recoat assembly transverse actuator 2144, the recoat assembly vertical actuator 2160, and the print head actuator 2154 are communicatively coupled to the electronic control unit 2300, in embodiments. The electronic control unit 2300 is also communicatively coupled to the roller vertical actuators 2252, 2254, the front and rear energy source 2260, 2262, the agitation device 2284, the one or more housing temperature sensors 2266, and the vacuum 2290. In some embodiments, a temperature sensor 2286 and a distance sensor 2288, and the roller support temperature sensor 2247 are also communicatively coupled to the electronic control unit 2300 as shown in FIG. 51.

In some embodiments, the electronic control unit 2300 includes a current sensor 2306. The current sensor 2306 generally senses a current driving the recoat assembly transverse actuator 2144, the first rotational actuator 2206, the second rotational actuator 2208, the vertical actuator 2160, and/or the print head actuator 2154. In embodiments in which the recoat assembly transverse actuator 2144, the first rotational actuator 2206, the second rotational actuator 2208, the vertical actuator 2160, and/or the print head actuator 2154 are electrically actuated, the current sensor 2306 senses current driving the recoat assembly transverse actuator 2144, the first rotational actuator 2206, the second rotational actuator 2208, the vertical actuator 2160, and/or the print head actuator 2154. While in the embodiment depicted in FIG. 51, the current sensor 2306 is depicted as being a component of the electronic control unit 2300, it should be understood that the current sensor 2306 may be a separate component communicatively coupled to the electronic control unit 2300. Furthermore, while in the embodiment depicted in FIG. 51, a single current sensor 2306 is depicted, it should be understood that the additive manufacturing system 2100 may include any suitable number of current sensors 2306 associated with the recoat assembly transverse actuator 2144, the first rotational actuator 2206, the second rotational actuator 2208, the vertical actuator 2160, and/or the print head actuator 2154.

In embodiments, the electronic control unit 2300 generally includes a processor 2302 and a memory component 2304. The memory component 2304 may be configured as volatile and/or nonvolatile memory, and as such may include random access memory (including SRAM, DRAM, and/or other types of RAM), flash memory, secure digital (SD) memory, registers, compact discs (CD), digital versatile discs (DVD), bernoulli cartridges, and/or other types of non-transitory computer-readable mediums. The processor 2302 may include any processing component operable to receive and execute instructions (such as from the memory component 2304). In embodiments, the electronic control unit 2300 may store one or more operating parameters for operating the additive manufacturing system 2100, as described in greater detail herein.

Operation of Recoat Assemblies

Methods for operating the recoat assembly 2200 will now be described with reference to the appended drawings.

Figure 52:
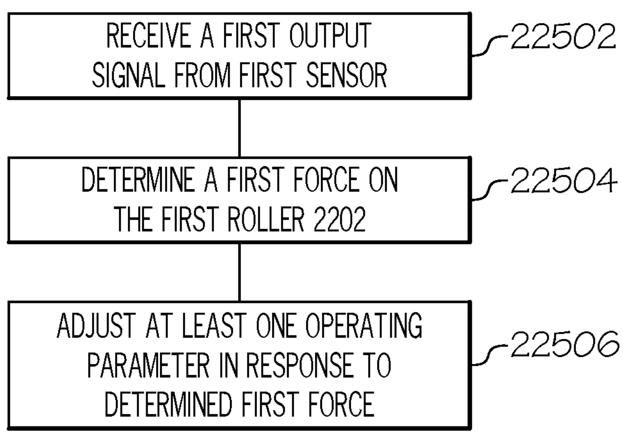
FIG. 52 is a flowchart for adjusting an operating parameter of the additive manufacturing system, according to one or more embodiments shown and described herein.

Referring collectively to FIGS. 51 and 52, an example method of operating the recoat assembly 2200 is schematically depicted. In a first step 22502, the electronic control unit 2300 receives a first output signal of a first sensor. In embodiments, the first sensor is mechanically coupled to and in contact with the first roller support 2210 (FIG. 33B), and may include any of the first strain gauge 2240A, the second strain gauge 2240B, the load cell 2242, and/or the accelerometer 2244. The first sensor, in embodiments, outputs the first output signal, which is indicative of a first force incident on the first roller 2202 (FIG. 33B). In a second step 22504, the electronic control unit 2300 determines the first force on the first roller 2202 (FIG. 33B) based on the first output signal of the first sensor. At step 22506, the electronic control unit 2300 adjusts at least one operating parameter of the additive manufacturing system 2100 (FIG. 29A) in response to the determined first force.

As noted above, in embodiments, the electronic control unit 2300 may include one or more parameters for operating the additive manufacturing system 2100 (FIG. 29A). By adjusting at least one operating parameter in response to determined forces acting on the first roller 2202 (FIG. 33B), the electronic control unit 2300 may actively adjust operation of the additive manufacturing system 2100. As one example, in embodiments, the at least one parameter of the additive manufacturing system 2100 (FIG. 29A) includes a speed with which the recoat assembly transverse actuator 2144 moves the recoat assembly 2200 (FIG. 29A) relative to the build area 2124 (FIGS. 29A, 29B). In embodiments, upon determining a force acting on the first roller 2202 below a configurable threshold, the electronic control unit 2300 may direct the recoat assembly transverse actuator 2144 to increase the speed at which the recoat assembly 2200 (FIG. 29A) moves relative to the build area 2124 (FIGS. 29A, 29B). For example, the determination of comparatively low force or forces acting on the first roller 2202 may be indicative that the speed at which the recoat assembly 2200 (FIG. 29A) is moved may be increased without detrimentally affecting the first roller 2202. By contrast, upon detecting a force acting on the first roller 2202 exceeding a configurable threshold, the electronic control unit 2300 may direct the recoat assembly transverse actuator 2144 to decrease the speed at which the recoat assembly 2200 (FIG. 29A) moves relative to the build area 2124 (FIGS. 29A, 29B). For example, the determination of comparatively high force or forces acting on the first roller 2202 may be indicative that the speed at which the recoat assembly 2200 (FIG. 29A) should be decreased to reduce the forces acting on the first roller 2202.

In some embodiments, the at least one parameter is a height of the first roller 2202 (FIG. 33B) evaluated in the vertical direction (e.g., in the Z-direction as depicted in FIG. 33B). In embodiments, upon determining a force acting on the first roller 2202 below a configurable threshold, the electronic control unit 2300 may direct the vertical actuator 2160 to lower the recoat assembly 2200 relative to the build area 2124 (FIGS. 29A, 29B). For example, the determination of comparatively low force or forces acting on the first roller 2202 may be indicative that the height at which the recoat assembly 2200 (FIG. 29A) may be lowered to engage an additional volume of build material 2031 (FIG. 29A). By contrast, upon detecting a force acting on the first roller 2202 exceeding a configurable threshold, the electronic control unit 2300 may direct the vertical actuator 2160 to raise the recoat assembly 2200 relative to the build area 2124 (FIGS. 29A, 29B). For example, the determination of comparatively high force or forces acting on the first roller 2202 may be indicative that the first roller 2202 should be raised so as to engage a reduced volume of build material 2031 (FIG. 29A).

In some embodiments, the at least one parameter of the additive manufacturing system 2100 comprises a speed at which the print head actuator 2154 moves the print head 2150 (FIG. 29A). In embodiments, upon determining a force acting on the first roller 2202 below a configurable threshold, the electronic control unit 2300 may direct the print head actuator 2154 to increase the speed at which the print head actuator 2154 moves the print head 2150 (FIG. 29A) relative to the build area 2124 (FIGS. 29A, 29B). For example, the determination of comparatively low force or forces acting on the first roller 2202 may be indicative that the speed at which first roller 2202 (FIG. 29A) moves with respect to the build area 2124 (FIGS. 29A, 29B) may be increased, and the speed at which the print head actuator 2154 moves the print head 2150 may be similarly increased, and/or a volume of binder material 2050 (FIG. 29A) can be increased. By contrast, upon detecting a force acting on the first roller 2202 exceeding a configurable threshold, the electronic control unit 2300 may direct the print head actuator 2154 to decrease the speed at which the print head 2150 (FIG. 29A) moves with respect to the build area 2124 (FIGS. 29A, 29B). For example, the determination of comparatively high force or forces acting on the first roller 2202 may be indicative that the speed at which first roller 2202 (FIG. 29A) moves with respect to the build area 2124 (FIGS. 29A, 29B) should be decreased, and the speed at which the print head actuator 2154 moves the print head 2150 should similarly be decreased and/or a volume of binder material 2050 (FIG. 29A) can be decreased.

In some embodiments, the electronic control unit 2300 is configured to adjust the at least one operating parameter of the additive manufacturing system 2100 based on sensed current from the current sensor 2306. For example, in embodiments, the current sensor 2306 may detect current from the first rotational actuator 2206 and/or the second rotational actuator 2208. Detection of a current below a configurable threshold may be generally indicative of relatively low forces acting on the first roller 2202 and/or the second roller 2204. By contrast, detection of a current above a configurable threshold may be generally indicative of relatively high forces acting on the first roller 2202 and/or the second roller 2204. In some embodiments, the current sensor 2306 may sense a current driving the transverse actuator 2144 that moves the recoat assembly 2200 relative to the build area 2124. Similar to the first and second rotational actuators 2206, 2208, detection of a current below a configurable threshold may be generally indicative of relatively low forces acting on the first roller 2202 and/or the second roller 2204. By contrast, detection of a current above a configurable threshold may be generally indicative of relatively high forces acting on the first roller 2202 and/or the second roller 2204.

Referring to FIGS. 29A, 29B, 51, and 53, another method for adjusting at least one operating parameter of the additive manufacturing system 2100 is depicted. In a first step 22602, the method comprises distributing a layer of a build material 2031 on the build area with the recoat assembly 2200. In a second step 22604, the method comprises receiving a first output signal from a first sensor as the layer of the build material 2031 is distributed on the build area 2124 with the recoat assembly 2200. As described above, in embodiments, the first sensor is mechanically coupled to and in contact with the first roller support 2210 (FIG. 33B), and may include any of the first strain gauge 2240A, the load cell 2242, and/or the accelerometer 2244. The first sensor, in embodiments, outputs the first output signal, which is indicative of a first force incident on the first roller 2202 (FIG. 33B).

At step 22604, the method comprises determining the first force on the first roller 2202 based on the first output signal of the first sensor. In some embodiments, a lookup table containing expected force or pressure information may be previously generated, such as based on calibration force measurements generated under various conditions (e.g., size of build area coated with binder, recoat traverse speed, recoat roller rotation speed, recoat roller direction, layer thickness, recoat roller geometry coating, and the like). In some embodiments, information related to a current layer of the object being built and/or a prior layer may be utilized to generate an expected force or pressure curve to be experienced as the recoat assembly 2200 traverses the build area 2124. In some embodiments, a geometry of the current layer of the object being built or a geometry of the immediately preceding layer that was built may be used to determine an expected pressure or force profile (e.g., shear forces expected to be experienced as the recoat assembly 2200 traverses the build area 2124 to distribute material for the current layer, normal forces expected to be experienced as the recoat assembly 2200 traverses the build area 2124 to distribute material for the current layer and/or any other type of expected force to be experienced as the recoat assembly 2200 traverses the build area 2124 to distribute material for the current layer), a comparison between the expected pressure or measured force profile and the measured force or pressure may be made, and an action may be taken in response to the comparison.

At step 22608, the method comprises adjusting the at least one operating parameter of the additive manufacturing system 2100 in response to the determined first force. For example, in some embodiments, the at least one operating parameter of the additive manufacturing system 2100 is adjusted based on a comparison of an expected force on the first roller 2202 to the first force on the first roller 2202 determined based on the first output signal of the first sensor. In embodiments, when a deviation beyond a given threshold is determined to have occurred, a corrective action may be taken, such as to adjust a recoat traverse speed for the current layer, adjust a roller rotation speed for the current layer, adjust a recoat traverse speed for one or more subsequent layers, adjust a roller rotation speed for one or more subsequent layers, adjust a height of one or more rollers for the current layer and/or for one or more subsequent layers, etc.

In some embodiments, when an expected pressure or force deviates from a measured pressure or force during spreading of material for a current layer by the recoat assembly 2200, the layer recoat process may be determined to be defective. The extent of force deviation may be used to determine a type of defect (e.g., a powder defect, a recoat roller defect, insufficient binder cure, a jetting defect, or the like.

In embodiments, each of steps 22602-22608 may be performed, for example, by the electronic control unit 2300. As noted above, in embodiments, the electronic control unit 2300 may include one or more parameters for operating the additive manufacturing system 2100. By adjusting at least one operating parameter in response to determined forces acting on the first roller 2202 (FIG. 33B), the electronic control unit 2300 may actively adjust operation of the additive manufacturing system 2100. As one example, in embodiments, the at least one parameter of the additive manufacturing system 2100 includes a speed with which the recoat assembly transverse actuator 2144 moves the recoat assembly 2200 relative to the build area 2124, as outlined above.

In some embodiments, the at least one parameter is a speed of rotation of the first rotational actuator 2206. In embodiments, upon determining a force acting on the first roller 2202 below a configurable threshold, the electronic control unit 2300 may direct the first rotational actuator 2206 to decrease the speed at which the first rotational actuator 2206 rotates the first roller 2202. For example, the determination of comparatively low force or forces acting on the first roller 2202 may be indicative that the speed at which the first rotational actuator 2206 may be reduced while still being sufficient to fluidize the build material 2031. By contrast, upon detecting a force acting on the first roller 2202 exceeding a configurable threshold, the electronic control unit 2300 may direct may direct the first rotational actuator 2206 to increase the speed at which the first rotational actuator 2206 rotates the first roller 2202. For example, the determination of comparatively high force or forces acting on the first roller 2202 may be indicative that the speed at which the first rotational actuator 2206 is rotating the first roller 2202 is insufficient to fluidize the build material 2031 as desired.

In some embodiments, the at least one parameter is a target thickness of a subsequent layer of build material 2031 and/or the layer of build material 2031 being distributed. In embodiments, upon determining a force acting on the first roller 2202 below a configurable threshold, the electronic control unit 2300 may direct the recoat assembly 2200 to increase a target thickness of a subsequent layer of build material 2031, for example by changing the height of the recoat assembly 2200. For example, the determination of comparatively low force or forces acting on the first roller 2202 may be indicative that the thickness of the layer of build material 2031 distributed by the recoat assembly 2200 may be increased. By contrast, upon detecting a force acting on the first roller 2202 exceeding a configurable threshold, the electronic control unit 2300 may direct the recoat assembly 2200 to decrease a target thickness of a subsequent layer of build material 2031, for example by changing the height of the recoat assembly 2200. For example, the determination of comparatively high force or forces acting on the first roller 2202 may be indicative that the thickness of the layer of build material 2031 distributed by the recoat assembly 2200 should be decreased.

Figure 53:
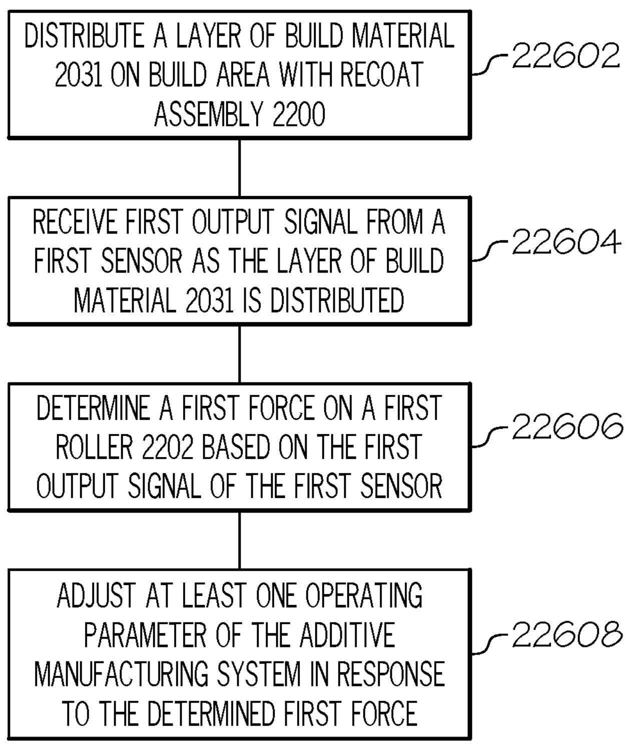
FIG. 53 is another flowchart for adjusting an operating parameter of the additive manufacturing system, according to one or more embodiments shown and described herein.

In some embodiments, the method illustrated in FIG. 53 further comprises determining a type of defect. For example, in some embodiments, a type of defect may be determined based on a comparison of an expected force on the first roller 2202 and the first force on the first roller 2202. For example, a defect in the build material 2031 may be associated with a particular amount of force applied to the first roller 2202, while a defect in the first roller 2202 may be associated with a different amount of force applied to the first roller 2202. Accordingly, the amount of force applied to the first roller 2202 may be utilized to determine a type of defect within the additive manufacturing system 2100.

In embodiments, the adjustment of the at least one operating parameter of the additive manufacturing system 2100 can be implemented at one or more times during a build cycle. For example, in embodiments, the at least one operating parameter may be adjusted while the layer of build material 2031 is being distributed by the recoat assembly 2200. In some embodiments, the at least one operating parameter of the additive manufacturing system 2100 is adjusted when a next layer of build material 2031 is distributed by the recoat assembly 2200.

In some embodiments, a wear parameter may be determined based on the determined first force. For example, as the first roller 2202 wears, for example through repeated contact with the build material 2031, the diameter of the first roller 2202 may generally decrease. The decreased diameter of the first roller 2202 may generally lead to lower forces on the first roller 2202 as the first roller 2202 distributes build material 2031.

In some embodiments, wear on other components of the recoat assembly 2200 may be determined based on the determined first force. For example, the first roller 2202 may be coupled to the base member 2250 (FIG. 30) via one or more bearings, or the like. Additionally and as noted above, the first roller 2202 may be coupled to the first rotational actuator 2206 (FIG. 30) through a belt, a chain, or the like. Wear on the one or more bearings and/or the belt, chain, or the like may generally lead to increased forces on the first roller 2202. In some embodiments, the increased forces on the first roller 2202 may be determined by the current sensor 2306.

In some embodiments, the method depicted in FIG. 53 further includes receiving a second output signal from a second sensor mechanically coupled to and in contact with the second roller support 2212. In embodiments, the second sensor may include any of the first strain gauge 2240A, the second strain gauge 2240B, the load cell 2242, and/or the accelerometer 2244. In embodiments, the method further includes receiving the second output signal from the second sensor as the layer of the build material 2031 is distributed on the build area 2124 with the recoat assembly 2200 and determining the first force on the first roller 2202 based on the first output signal of the first sensor and the second output signal of the second sensor.

In some embodiments, the method depicted in FIG. 53 further includes receiving a third output signal from a third sensor mechanically coupled to and in contact with the third roller support 2216. In embodiments, the third sensor may include any of the include any of the first strain gauge 2240A, the second strain gauge 2240B, the load cell 2242, and/or the accelerometer 2244. In embodiments, the method further includes receiving the third output signal from the third sensor as the layer of the build material 2031 is distributed on the build area 2124 with the recoat assembly 2200 and determining a second force on the second roller 2204 based on the third output signal of the third sensor. In some embodiments, the method further includes adjusting the at least one operating parameter in response to the determined first force and the determined second force. In this way, the at least one operating parameter may be adjusted based on determined forces acting on both the first roller 2202 and the second roller 2204. For example a detection of a deceleration of the first roller 2202 and/or the second roller 2204 above a configurable threshold may be indicative of a collision of the recoat assembly 2200 with an object, such as a foreign object within the additive manufacturing system 2100. By detecting a collision, operation of the additive manufacturing system 2100 may be halted to prevent further damage to the additive manufacturing system 2100, and/or provide an indication to a user that maintenance is necessary.

In some embodiments, the method depicted in FIG. 53 further includes determining a collision of the recoat assembly 2200. For example, in some embodiments, the method further includes determining a roller collision event based on an output of the at least one accelerometer 2244, an adjusting the at least one operating parameter when the roller collision event is determined to have occurred.

Figure 54:
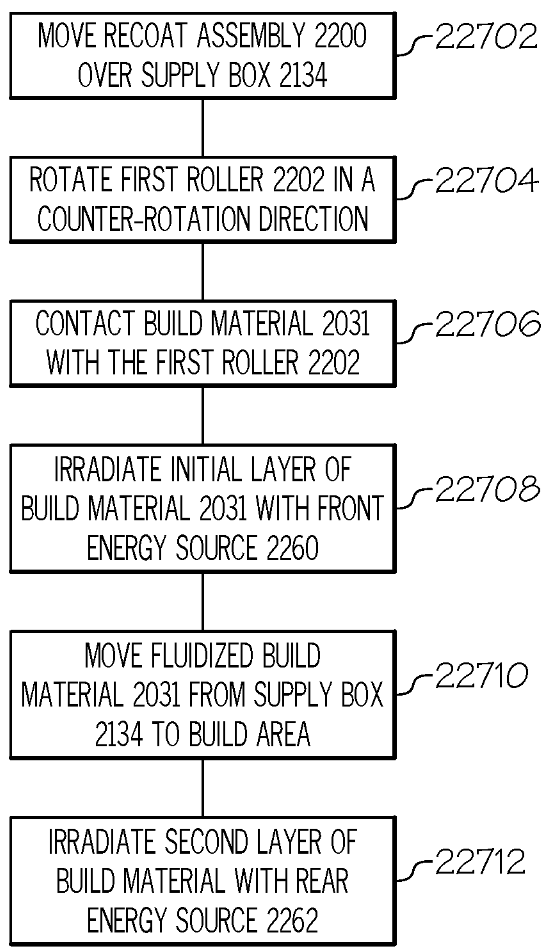
FIG. 54 is a flowchart for moving build material to a build area, according to one or more embodiments shown and described herein.
Figure 55:
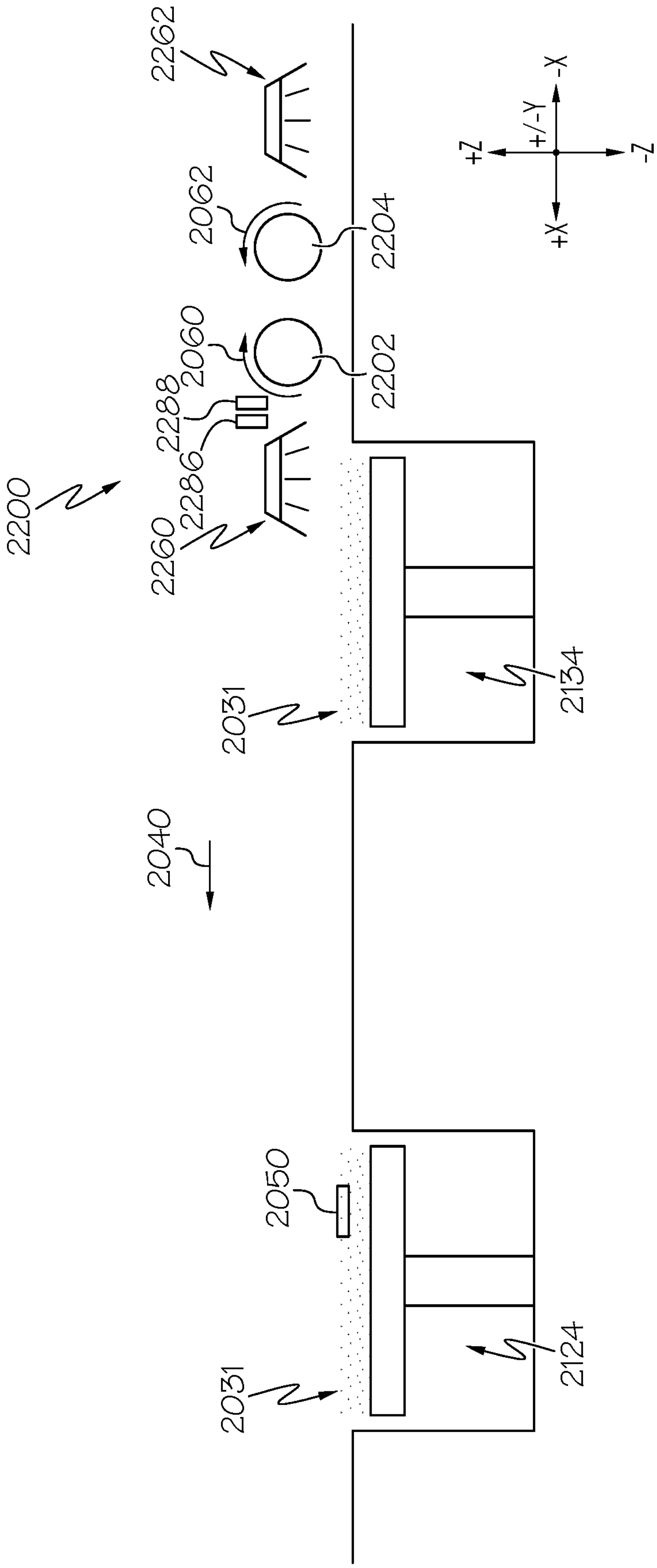
FIG. 55 schematically depicts a recoat assembly moving build material to a build area, according to one or more embodiments shown and described herein.

Referring to FIGS. 51, 54, and 55, a method for forming an object is schematically depicted. In a first step 22702, the method comprises moving the recoat assembly 2200 over the supply receptacle 2134 in a coating direction, as indicated by arrow 2040. The supply receptacle 2134 comprises build material 2031 positioned within the supply receptacle 2134, and the recoat assembly 2200 comprises a first roller 2202 and a second roller 2204 that is spaced apart from the first roller 2202. As noted above, in some embodiments, the recoat assembly 2200 may include only a single roller. In a second step 22704, the method comprises rotating the first roller 2202 of the recoat assembly 2200 in a counter-rotation direction 2060, such that a bottom of the first roller 2202 moves in the coating direction 2040. In the embodiment depicted in FIG. 55, the counter-rotation direction 2060 is shown as the clockwise direction. In a third step 22706, the method comprises contacting the build material 2031 with the first roller 2202 of the recoat assembly 2200, thereby fluidizing at least a portion of the build material 2031. At step 22708, the method comprises irradiating, with the front energy source 2260, an initial layer of build material 2031 positioned in the build area 2124 spaced apart from the supply receptacle 2134. As noted above, irradiating the initial layer of build material 2031 may bind the build material 2031 to binder material 2050 positioned in the build area 2124. Subsequent to step 22708, at step 22710, the method comprises moving the fluidized build material 2031 from the supply receptacle 2134 to the build area 2124 with the first roller 2202, thereby depositing a second layer of the build material 2031 over the initial layer of build material 2031 within the build area 2124. Subsequent to step 22710, at step 22712, the method comprises irradiating, with the rear energy source 2262, the second layer of build material 2031 within the build area 2124. In some embodiments, steps 22708-22712 may occur within a predetermined cycle time. For example, in some embodiments, steps 22708-22712 may be performed within a range between 5 seconds and 20 seconds.

While the method described above includes moving the recoat assembly 2200 over a supply receptacle 2134, it should be understood that in some embodiments a supply receptacle 2134 is not provided, and instead build material 2031 may be placed on the build area 2124 through other devices, such as the build material hopper 2360 (FIG. 29B).

In embodiments, the electronic control unit 2300 may direct various components of the additive manufacturing system 2100 to perform steps 22702-22712. In embodiments, by irradiating the initial layer of build material 2031, the front energy source 2260 may act to cure binder material 2050 positioned on the build material 2031 of the build area 2124. By irradiating the second layer of build material 2031, the rear energy source 2262 may generally act to pre-heat the build material 2031, and/or further cure the binder material 2050.

By irradiating the build material 2031 with a front energy source 2260 that is separate from a rear energy source 2262, the intensity of energy emitted by the recoat assembly 2200 may be distributed, as compared to recoat assemblies including a single energy source, which may reduce defects in the binder material 2050 and/or the build material 2031. More particularly, the thermal power density of a single energy source heating system can quickly reach a limit due to space and cost constraints. Excessive power output in a single energy source heating system can be detrimental to the quality of the cure of the binder material 2050 in each layer of build material 2031, as large spikes in temperature may induce stress and cracks in the relatively weak parts and can cause uncontrolled evaporation of solvents within the binder material 2050. By including the front energy source 2260 and the rear energy source 2262, the thermal power intensity of the recoat assembly 2200 may be distributed. In particular and as noted above, including multiple energy sources (e.g., the front energy source 2260 and the rear energy source 2262), energy can be applied to build material 2031 (FIG. 29A) over a comparatively longer period of time as compared to the application of energy via a single energy source. In this way, over-cure of build material 2031 bound by cured binder material 2050 can be minimized.

Furthermore, because the recoat assembly 2200 includes the front energy source 2260 and the rear energy source 2262, operation of the recoat assembly 2200 may be maintained in the case of failure of the front energy source 2260 or the rear energy source 2262. In particular, by providing multiple energy sources (e.g., the front energy source 2260 and the rear energy source 2262), in the case of failure of one of the energy sources, the other energy source may continue to be utilized, so that the recoat assembly 2200 may continue to operate, thereby reducing downtime of the recoat assembly 2200.

The first roller 2204, in embodiments, is rotated at a rotational speed sufficient to fluidize at least a portion of the build material 2031. In some embodiments, the first roller 2204 is rotated at a rotational speed of at least 2.5 meters per second. In some embodiments, the first roller 2204 is rotated at a rotational speed of at least 2 meters per second. In some embodiments, the first roller 2204 is rotated at a rotational speed of at least 1 meter per second.

In some embodiments, the operation of the front energy source 2260 and/or the rear energy source 2262 may be controlled and modified. In embodiments, the front energy source 2260 and/or the rear energy source 2262 may be communicatively coupled to the electronic control unit 2300 through one or more relays, such as solid state relays, that facilitate control of the front energy source 2260 and/or the rear energy source 2262.

In some embodiments, the additive manufacturing system 2100 may include a temperature sensor 2286 communicatively coupled to the electronic control unit 2300. The temperature sensor 2286 may include any contact or non-contact sensor suitable for detecting a temperature of the build material 2031, for example and without limitation, one or more infrared thermometers, thermocouples, thermopiles or the like. As shown in FIG. 33A, one or more temperature sensors 2286 may be positioned rearward of the first roller 2202 and/or the second roller 2204, however, it should be understood that the one or more temperature sensors 2286 may be coupled to the recoat assembly 2200 at any suitable position. In embodiments, subsequent to irradiating the initial layer of build material 2031 with the front energy source 2260 and/or irradiating the second layer of build material 2031, the method further comprises detecting a temperature of the irradiated build material 2031 with the temperature sensor 2286. In some embodiments, the output of the front energy source 2260 and/or the rear energy source 2262 may be adjusted in response to the detected temperature of the build material 2031 (e.g., feedback control). In some embodiments, the detected temperature may be stored such that the electronic control unit 2300 may develop a model for controlling the front energy source 2260 and/or the rear energy source 2262 (e.g., feedforward control). For example, in some embodiments, the method further comprises changing at least one parameter of the front energy source 2260 or the rear energy source 2262 based at least in part on the detected temperature. Further, in some embodiments, at least one of irradiating the initial layer of build material 2031 with the front energy source 2260 and irradiating the second layer of build material 2031 comprises applying a predetermined power to the front energy source 2260 or the rear energy source 2262, and the method further comprises changing the predetermined power based at least in part on the detected temperature.

In some embodiments, the recoat assembly 2200 includes a distance sensor 2288 communicatively coupled to the electronic control unit 2300. The distance sensor 2288 is generally configured to detect a thickness of a layer of build material 2031 positioned below the recoat assembly 2200. In embodiments, the electronic control unit 2300 may receive a signal from the distance sensor 2288 indicative of the layer or build material 2031 moved to the build area 2124. The electronic control unit 2300 may change one or more parameters based on the detected thickness of the layer of build material 2031 such that the recoat assembly 2200 may move build material 2031 to the build area 2124 as desired. In embodiments, the distance sensor 2288 may include any sensor suitable for detecting a thickness of build material 2031, such as and without limitation, a laser sensor, an ultrasonic sensor, or the like.

In some embodiments, the second roller 2204 may be positioned above the first roller 2202 in the vertical direction (i.e., in the Z-direction as depicted). In these embodiments, only the first roller 2202 may contact the build material 2031, and the second roller 2204 may act as a spare roller that can be utilized in the case of failure or malfunction of the first roller 2202.

In some embodiments, the second roller 2204 is rotated in a rotation direction 2062 that is the opposite of the counter-rotation direction 2060 and the second roller 2204 contacts the build material 2031 within the build area 2124. The second roller 2204 may be rotated at a rotational velocity that corresponds to a linear velocity of the recoat assembly 2200. More particularly, by matching the rotational velocity of the second roller 2204 to match the linear velocity of the recoat assembly 2200, the second roller 2204 may generally act to compact the build material 2031, while causing minimal disruption to the build material 2031 as the recoat assembly 2200 moves with respect to the build area 2124. In embodiments, the rotational velocity of the first roller 2202 is greater than the rotational velocity of the second roller 2204. In some embodiments, as the second roller 2204 compacts the build material 2031, the second roller 2204 may be positioned lower than the first roller 2202 in the vertical direction (i.e., in the Z-direction as depicted).

Figure 56A:
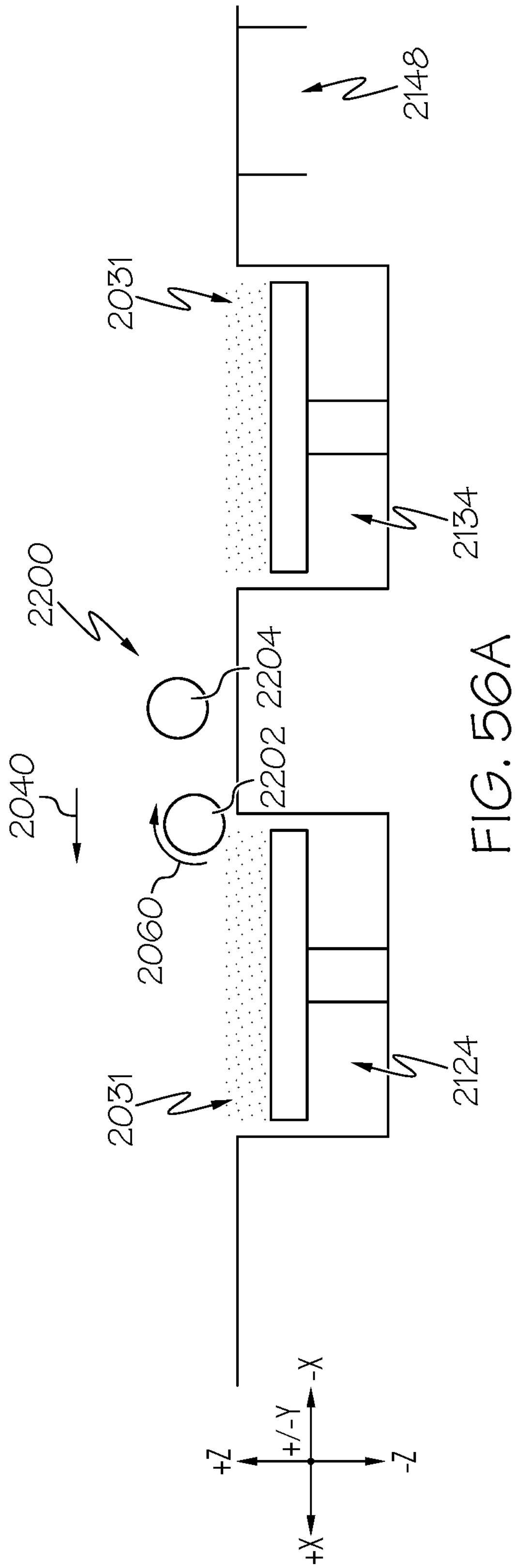
FIG. 56A schematically depicts a recoat assembly moving build material to a build area, according to one or more embodiments shown and described herein.

In some embodiments, once the second layer of build material 2031 is deposited the first roller 2202 is moved upward in the vertical direction (i.e., in the Z-direction as depicted), such that the first roller 2202 is spaced apart from the second layer of build material 2031. The recoat assembly 2200 is then moved to the supply receptacle 2134 in a direction that is opposite of the coating direction 2040. In this way, the recoat assembly 2200 may be returned to the recoat home position 2148 (FIG. 56A). In some embodiments, the recoat assembly 2200 is moved to the supply receptacle 2134 at a return speed. In embodiments the return speed is greater than a coating speed at which the recoat assembly 2200 moves the fluidized build material 2031 to the build area 2124. In some embodiments, to avoid damaging cured binder the build material 2031, the coating speed may be limited, and accordingly, by increasing the return speed, the overall cycle time required to deposit build material 2031 may be reduced.

In some embodiments, the first roller 2202 and/or the second roller 2204 may compact the build material 2031 in the build area 2124 as the recoat assembly 2200 moves back to the recoat home position 2148. For example and referring to FIGS. 56A and 56B, the recoat assembly 2200 is depicted moving in coating direction 2040, and a direction 2042 opposite the coating direction 2040, respectively. In some embodiments, the method further comprises rotating the first roller 2202 and/or second roller 2204 in the counter-rotation direction 2060. Rotating the first roller 2202 and/or the second roller 2204 in the counter-rotation direction 2060 may comprise rotating the first roller 2202 and/or the second roller 2204 at a rotational velocity that corresponds to a linear velocity of the recoat assembly 2200 moving toward the supply receptacle 2134.

In some embodiments, before moving the recoat assembly 2200 to the supply receptacle 2134, the method further comprises moving the first roller 2202 and/or the second roller 2204 upward in the vertical direction (i.e., in the Z-direction as depicted). In some embodiments, the first roller 2202 and/or the second roller 2204 is moved upward between 8 micrometers and 12 micrometers in the vertical direction, inclusive of the endpoints. In some embodiments, the first roller 2202 and/or the second roller 2204 is moved upward about 10 micrometers in the vertical direction. In some embodiments, before moving the recoat assembly 2200 to the supply receptacle 2134, the method further comprises moving the first roller 2202 and/or the second roller 2204 upward in the vertical direction (i.e., in the Z-direction as depicted). In some embodiments, the first roller 2202 and/or the second roller 2204 is moved upward between 5 micrometers and 20 micrometers in the vertical direction, inclusive of the endpoints. By moving first roller 2202 and/or the second roller 2204 upward in the vertical direction, the first roller 2202 and/or the second roller 2204 may be positioned to compact the build material 2031 in the build area 2124.

In some embodiments, as the first roller 2202 and/or the second roller 2204 contacts the build material 2031 in the build area 2124 moving back toward the supply receptacle 2134, the first roller 2202 and/or the second roller 2204 is rotated at a rotational velocity that corresponds to the linear velocity of the recoat assembly 2200 moving back toward the supply receptacle 2134. As noted above, by correlating the rotational velocity of the first roller 2202 and/or the second roller 2204 to the linear velocity of the recoat assembly 2200, the first roller 2202 and/or the second roller 2204 may compact the build material 2031, with minimal disruption of the build material 2031 in the longitudinal direction (i.e., in the X-direction as depicted).

Figure 56B:
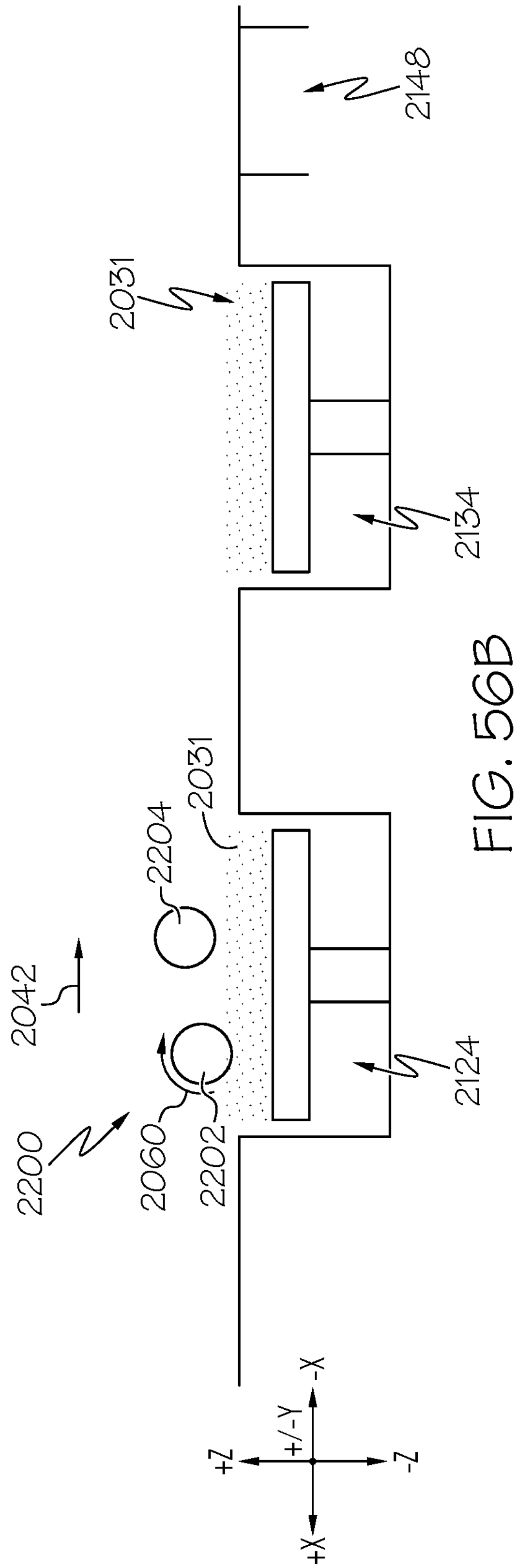
FIG. 56B schematically depicts a recoat assembly compacting build material within the build area, according to one or more embodiments shown and described herein.

While FIGS. 56A and 56B include a supply receptacle 2134, it should be understood that in some embodiments a supply receptacle 2134 is not provided, and instead build material 2031 may be placed on the build area 2124 through other devices, such as the build material hopper 2360 (FIG. 29B).

Figure 56C:
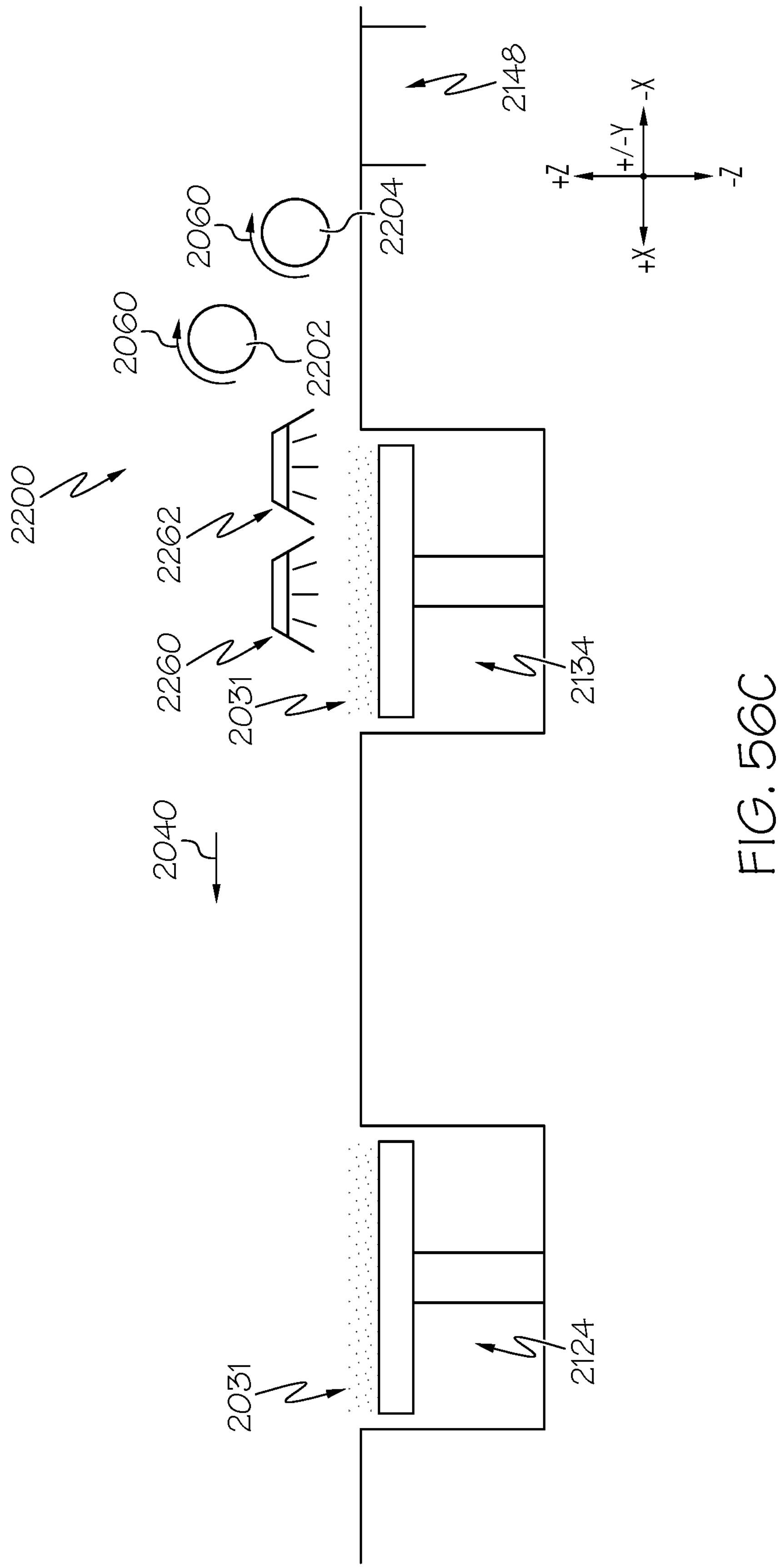
FIG. 56C schematically depicts a recoat assembly moving build material to a build area, according to one or more embodiments shown and described herein.
Figure 56D:
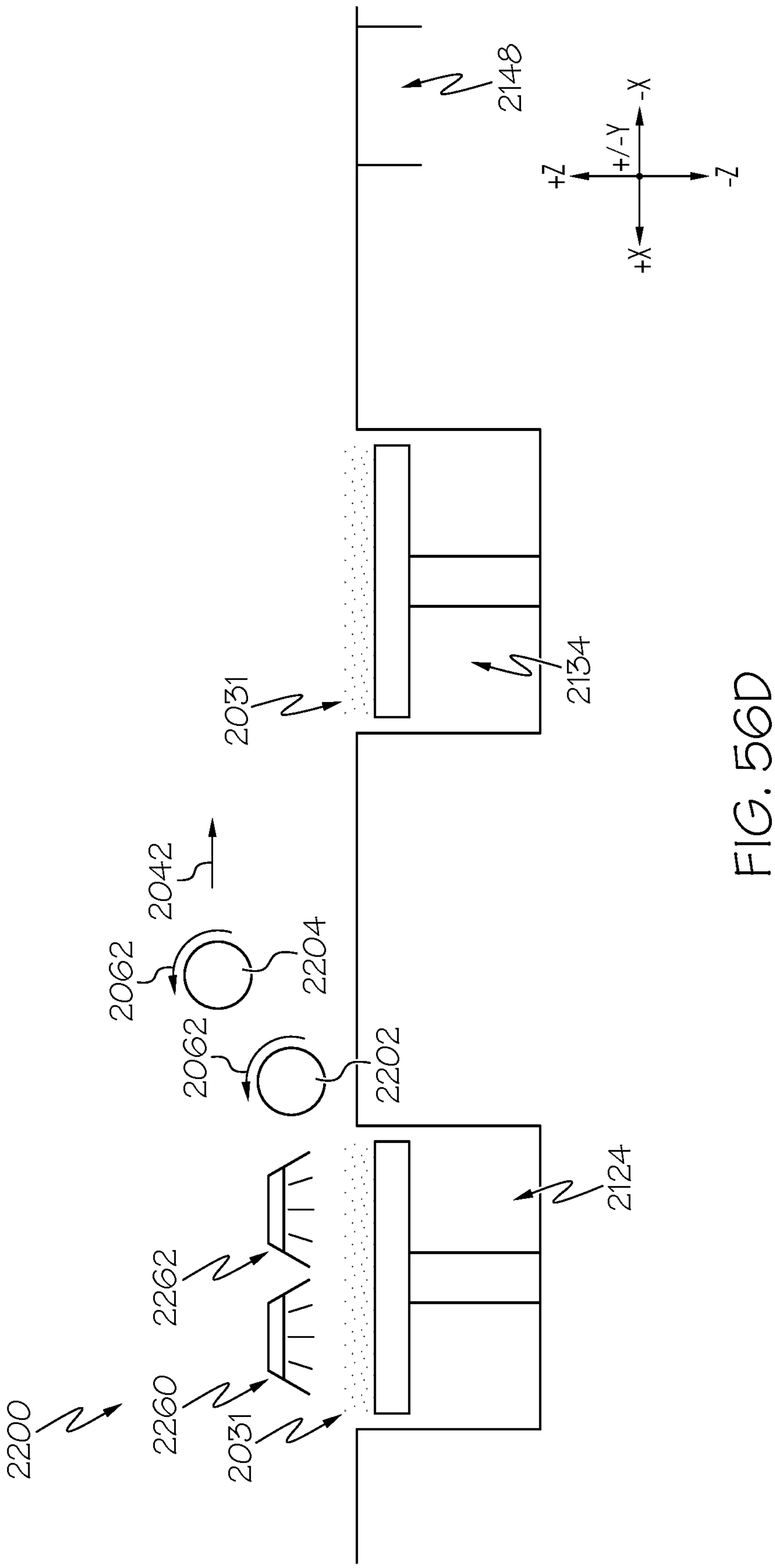
FIG. 56D schematically depicts a recoat assembly moving in a return direction, according to one or more embodiments shown and described herein.

In some embodiments, the first roller 2202 and the second roller 2204 may be rotated in the counter-rotation direction 2060 as the recoat assembly 2200 moves in the coating direction 2040, as shown in FIG. 56C. In some embodiments, the first roller 2202 is positioned above the second roller 2204 as the recoat assembly 2200 moves in the coating direction 2040. The first roller 2202 and the second roller 2204 may be rotated in the rotation direction 2062 as the recoat assembly 2200 moves in the return direction 2042, as shown in FIG. 56D. In some embodiments, the first roller 2202 is positioned below the second roller 2204 as the recoat assembly 2200 moves in the return direction 2042. Further, in some embodiments, the front energy source 2260 and/or the rear energy source 2262 may irradiate the build material 2031 in the build area 2124 as the recoat assembly 2200 moves in the coating direction 2040 (FIG. 56C) and/or as the recoat assembly 2200 moves in the return direction 2042 (FIG. 56D).

Figure 57:
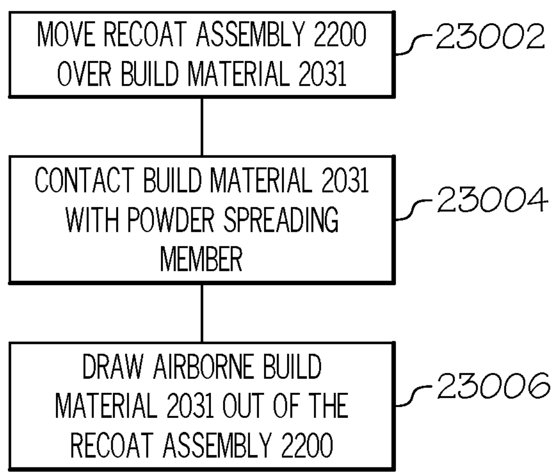
FIG. 57 is a flowchart of a method for drawing build material out of a recoat assembly, according to one or more embodiments shown and described herein.

Referring to FIGS. 51 and 57, an example method for drawing airborne build material 2031 out of the recoat assembly 2200 is schematically depicted. In a first step 23002, the method comprises moving the recoat assembly 2200 build material 2031 in the coating direction 2040. At step 23004, the method further comprises contacting the build material 2031 with the powder spreading member, causing at least a portion of the build material 2031 to become airborne. At step 23006, the method further comprises drawing airborne build material 2031 out of the recoat assembly 2200 with a vacuum 2290 in fluid communication with the recoat assembly 2200.

In embodiments, each of steps 23002-23006 may be performed, for example, by the electronic control unit 2300.

In embodiments, the vacuum 2290 may draw the airborne build material 2031 out of the recoat assembly 2200 at one or more times during a build cycle. For example, in some embodiments, the step of drawing airborne build material 2031 out of the recoat assembly 2200 is subsequent or during to the step of moving the build material 2031. Put another way, the vacuum 2290 draws the build material 2031 out of the recoat assembly 2200 at the end of a build cycle. In some embodiments, the step of drawing airborne build material 2031 out of the recoat assembly 2200 is concurrent with the step of moving the build material 2031. Put another way, the airborne build material 2031 may be drawn out of the recoat assembly 2200 during the build cycle in a continuous or semi-continuous manner.

In some embodiments, the vacuum 2290 may apply a positive pressure to the recoat assembly 2200 to dislodge build material 2031 accumulated within the recoat assembly 2200. For example, in some embodiments, subsequent to moving the build material 2031, the vacuum 2290 directs a process gas, such as air or the like, to the recoat assembly 2200. In some embodiments, the vacuum 2290 may apply positive pressure while the recoat assembly 2200 is positioned over a drain that applies a negative pressure to collect the build material 2031. In embodiments, the drain may be positioned proximate to the build area 2124 (FIG. 56A).

Printing Assemblies

While FIGS. 2-4D depict one embodiment of a print head 150 and an additive manufacturing operation using the print head 150, it should be understood that other embodiments of print heads are contemplated and possible. For example, the time for building an object by the additive manufacturing processes described herein may be further reduced by printing layers of material while minimizing occurrences of print defects or errors forming on the plurality of pixels of the built object to avoid necessary reprinting of layers. Accordingly, in some embodiments, the additive manufacturing apparatus 100 depicted in FIG. 2 may comprise a printing assembly which facilitates printing layers of deposited material while minimizing a need to redeposit material distributed on the build platform 120 due to potential print defects or errors. Except as otherwise described below, the cleaning station 3108, the build area 3120, the supply platform 3130, the recoat assembly 3140, and the printing assembly 3150 of this example may be configured and operable just like the other cleaning stations, build platforms, supply platforms, recoat assemblies, and/or printing assemblies described herein. It should be understood that the printing assembly 3150 of the present example may be readily incorporated into any of the additive manufacturing apparatuses described herein.

Referring to FIG. 58A, an illustrative process flow diagram for building a component 3080 using manufacturing apparatuses 3100 and manufacturing methods is depicted. FIG. 58A is intended to provide a non-limiting overview of the manufacturing apparatuses 3100 and manufacturing methods depicted and described in detail herein. The apparatus 3100 is configured to perform one or more predefined operations as prescribed by build instructions that are executed by a control system 3010.

As used herein, "build instructions" refer to the control commands for manipulating the operation of the apparatus 3100 to build a component 3080. The build instructions are defined by, for example, design deposition patterns for each layer of the component 3080 to be built and a plurality of motion controls defining commands setting forth an ordered operation of motors, actuators, printing assemblies, jet nozzles, and various other components of the apparatus to build the component 3080. The build instructions are defined based on a component design or model and mechanical specifications of the apparatus 3100. For example, an apparatus 3100 may include predefined and fixed distance between jet nozzles within a print head, referred to herein as "jet-spacing." Embodiments described herein provide techniques for printing a component 3080 using sub jet-spacing indexing to deliver a high degree of distribution of binder that is otherwise not achievable unless the jet-spacing is reduced thus increasing the complexity and cost of a print head. In other words, for example, jet nozzles of a print head having a jet-spacing of 400 DPI (dots per inch) may achieve greater than 400 DPI deposition of binder through sub jet-spacing indexing as described herein.

The apparatus 3100 further receives build material 3040 and binder material 3050 that may be deposited layer-by-layer and drop-by-drop, respectively, according to the build instructions for building the component 3080. For example, the apparatus 3100 may form a layer of powder 3060 (also referred to herein as a layer of build material) in a build area 3120 (FIG. 58B) and then deposit one or more drops of binder material 3070 within a pixel 3020 thereby forming a voxel 3030. "Build material" may include one or more organic and/or inorganic materials that when combined with a binder, and optionally a source of energy, cures to form a portion of a component 3080.

As used herein, a "pixel" refers to a 2-dimensional spatial portion of the object or part to-be-printed by the apparatus 3100, and in particular, a current slice or layer of the three-dimensional part relative to its positioning along the build area. Each pixel corresponds to an image pixel defined in the design deposition pattern of the build instructions. The image pixel is the digital representation of a pixel. The image pixel includes a width defined by the jet-spacing of the jet nozzles of the apparatus 3100. As used herein, a "voxel" refers to a 3-dimensional spatial portion of the powder in the build area defined by the one or more drops of binder deposited within the pixel forming the current slice or layer of the three-dimensional part (e.g., the component 3080). It is understood that a voxel may not be cubic as the shape of the shape of the voxel depends on the wicking and curing behavior of the binder with the build material (e.g., the layer of powder that binder is deposited in).

Binder material 3050 may be deposited in various amounts at various locations within the layer of powder 3060 (e.g. build material) in the form of droplets. The locations and amounts of the droplets are defined in the "design deposition pattern," which refers to a collection of image pixels forming the pattern of the desired slice of the build file, and when applied to by the apparatus 3100 to the layer of powder 3060 defines an "applied deposition pattern." While the design deposition pattern defines the amount (e.g., the "drop volume") and location (e.g., the location of the center of the droplet of binder on the layer of powder 3060), the applied deposition pattern refers to the distribution of the binder through the layer or layers of powder, which may include overlap into adjacent pixels or lower layers of powder. (See FIG. 78D). As used herein, "drop volume" refers to the volume of the binder droplet that is released from a jet at one time. Multiple drops can be released for a single pixel, and the drops may vary in drop volume. After the formation of one or more layers of powder 3060 and deposition of one or more droplets of binder material 3050, the apparatus 3100 forms a component 3080. More specific methods for forming the component 3080 and embodiments of the apparatus 3100 will now be described in detail.

Referring now to FIG. 58B, an embodiment of a manufacturing apparatus 3100 is schematically depicted. The apparatus 3100 includes a cleaning station 3108, a build area 3120, a supply platform 3130, a recoat assembly 3140, and a printing assembly 3150. The recoat assembly 3140 and the printing assembly 3150 are coupled to a rail 3104 of the apparatus 3100 and are configured to translate along the rail 3104 in response to an actuation of a first actuator assembly 3102. In some embodiments, the rail 3104 may be rectangular or square in vertical cross section (i.e., a cross section in the Y-Z plane of the coordinate axes depicted in the figures) while in other embodiments the rail 3104 may have an "I" configuration in vertical cross section (i.e., a cross section in the Y-Z plane of the coordinate axes depicted in the figures). The first actuator assembly 3102 may be constructed to facilitate independent control of the recoat assembly 3140 and the printing assembly 3150 along a working axis 3116 of the apparatus 3100. The working axis 3116 is also referred to herein as the "longitudinal axis" (i.e., extending along the +/−X-axis as depicted in the figures). This allows for the recoat assembly 3140 and the printing assembly 3150 to traverse the working axis 3116 of the apparatus 3100 in the same direction and/or in opposite directions and for the recoat assembly 3140 and the printing assembly 3150 to traverse the working axis 3116 of the apparatus 3100 at different speeds and/or the same speed. Independent actuation and control of the recoat assembly 3140 and the printing assembly 3150, in turn, allows for at least some steps of a manufacturing process (e.g., additive manufacturing process) to be performed simultaneously thereby reducing the overall cycle time of the manufacturing process to less than the sum of the cycle time for each individual step. In other embodiments, the apparatus 3100 may include additional actuator assemblies coupled to the recoat assembly 3140, the printing assembly 3150, and/or the like.

In some embodiments, a second actuator assembly 3103 may be constructed to facilitate independent control of the printing assembly 3150 along a latitudinal axis (i.e., extending along the +/−Y-axis as depicted in the figures), which is generally perpendicular to the longitudinal axis (i.e., the working axis 3116). As described in more detail herein, the second actuator assembly 3103 may provide fine movement of the printing assembly 3150 along the longitudinal axis, herein referred to as indexing. The first actuator assembly 3102 and the second actuator assembly 3103 are generally referred to as printing head position control assembly. That is, the printing head position control assembly includes the first actuator assembly 3102 configured to move the printing head along the longitudinal axis and a second actuator assembly 3103 configured to move the printing head along a latitudinal axis. The printing head position control assembly may be controlled via signals generated by a control system 3010 such as an electronic control unit. The electronic control unit may include a processor and a non-transitory computer readable memory.

In some embodiments, the first actuator assembly 3102 includes a position sensor **3102*a* that provides the electronic control unit with position information of the recoat assembly 3140 and/or the printing assembly 3150 in a feedback control signal such that the electronic control unit may track the position of the recoat assembly 3140 and/or the printing assembly 3150 in response to the provided control signals. In some instances, the electronic control unit may make adjustments to the control signal provided to the first actuator assembly 3102 based on the position information provided by the position sensor. In embodiments, the position sensor may be an encoder, an ultrasonic sensor, a light-based sensor, a magnetic sensor, or the like embedded in or coupled to the first actuator assembly 3102**.

As noted above, in the embodiments described herein the recoat assembly 3140 and the printing assembly 3150 are both located on the working axis 3116 of the apparatus 3100. As such, the movements of the recoat assembly 3140 and the printing assembly 3150 on the working axis 3116 occur along the same axis and are thus co-linear. With this configuration, the recoat assembly 3140 and the printing assembly 3150 may occupy the same space (or portions of the same space) along the working axis 3116 of the apparatus 3100 at different times during a single build cycle. In other embodiments, the components of the manufacturing apparatus 3100 traversing the working axis 3116, such as the recoat assembly 3140, the printing assembly 3150, or the like, need not be centered on the working axis 3116. In this instance, at least two of the components of the manufacturing apparatus 3100 are arranged with respect to the working axis 3116 such that, as the components traverse the working axis 3116, the components could occupy the same or an overlapping volume along the working axis 3116.

The recoat assembly 3140 is constructed to facilitate a distribution of a build material 3040 over the build area 3120 and the supply platform 3130. As will be described in greater detail herein, the printing assembly 3150 is constructed to facilitate a deposition of a binder material 3050 and/or other jettable composition materials (e.g., ink, fluid medium, nanoparticles, fluorescing particles, sintering aids, anti-sintering aids, things, etc.) over the build area 3120 as the printing assembly 3150 traverses the build area 3120 along a working axis 3116 of the apparatus 3100. In the embodiments of the apparatus 3100 described herein, the working axis 3116 of the apparatus 3100 is parallel to the +/−X axis of the coordinate axes depicted in the figures. In the embodiments described herein the cleaning station 3108, the build area 3120, the supply platform 3130, the recoat assembly 3140, and the printing assembly 3150 are positioned in series along the working axis 3116 of the apparatus 3100 between a home position 3151 of the printing assembly 3150, located proximate an end of the working axis 3116 in the −X direction, and a home position 3153 of the recoat assembly 3140, located proximate an end of the working axis 3116 in the +X direction. That is, the home position 3151 of the printing assembly 3150 and the home position 3153 of the recoat assembly 3140 are spaced apart from one another in a horizontal direction that is parallel to the +/−X axis of the coordinate axes depicted in the figures and at least the build area 3120 and the supply platform 3130 are positioned therebetween. In the embodiments, the build area 3120 is positioned between the cleaning station 3108 and the supply platform 3130 along the working axis 3116 of the apparatus 3100.

Still referring to FIG. 58B, the cleaning station 3108 is positioned proximate one end of the working axis 3116 of the apparatus 3100 and is co-located with the home position 3151 where the printing assembly 3150 is located or "parked" before and after depositing a binder material 3050 on a layer of build material 3040 positioned on the build area 3120. The cleaning station 3108 may include one or more cleaning sections to facilitate cleaning the printing assembly 3150, and in particular, a plurality of print heads 3156 of the printing assembly 3150 between depositing operations. The cleaning sections may include, for example and without limitation, a soaking station containing a cleaning solution for dissolving excess binder material 3050 from the plurality of print heads 3156, a wiping station for removing excess binder material 3050 from the plurality of print heads 3156, a jetting station for purging binder material 3050 and/or cleaning solution from the plurality of print heads 3156, a capping station for maintaining moisture in a plurality of jet nozzles 3158 of the plurality of print heads 3156, or various combinations thereof. The printing assembly 3150 may be transitioned between the cleaning sections by the first actuator assembly 3102. In some embodiments, the apparatus 3100 may include a jetting test area positioned proximate to one end of the working axis 3116 adjacent to the cleaning station 3108 and/or the home position 3151. Although not shown, it should be understood that the jetting test area of the apparatus 3100 may be configured to facilitate a material deposition by the printing assembly 3150 prior to performing a deposition along the build area 3120.

The build area 3120 is coupled to a build platform actuator 3122 to facilitate raising and lowering the build area 3120 relative to the working axis 3116 of the apparatus 3100 in a vertical direction (i.e., a direction parallel to the +/−Z directions of the coordinate axes depicted in the figures). The build platform actuator 3122 may be, for example and without limitation, a mechanical actuator, an electro-mechanical actuator, a pneumatic actuator, a hydraulic actuator, or any other actuator suitable for imparting linear motion to the build area 3120 in a vertical direction. Suitable actuators may include, without limitation, a worm drive actuator, a ball screw actuator, a pneumatic piston, a hydraulic piston, an electro-mechanical linear actuator, or the like. The build area 3120 and build platform actuator 3122 are positioned in a build receptacle 3124 located below the working axis 3116 (i.e., in the −Z direction of the coordinate axes depicted in the figures) of the apparatus 3100. During operation of the apparatus 3100, the build area 3120 is retracted into the build receptacle 3124 by action of the build platform actuator 3122 after each layer of binder material 3050 is deposited on the build material 3040 located on the build area 3120.

Still referring to FIG. 58B, the supply platform 3130 is coupled to a supply platform actuator 3132 to facilitate raising and lowering the supply platform 3130 relative to the working axis 3116 of the apparatus 3100 in a vertical direction (i.e., a direction parallel to the +/−Z directions of the coordinate axes depicted in the figures). The supply platform actuator 3132 may be, for example and without limitation, a mechanical actuator, an electro-mechanical actuator, a pneumatic actuator, a hydraulic actuator, or any other actuator suitable for imparting linear motion to the supply platform 3130 in a vertical direction. Suitable actuators may include, without limitation, a worm drive actuator, a ball screw actuator, a pneumatic piston, a hydraulic piston, an electro-mechanical linear actuator, or the like. The supply platform 3130 and supply platform actuator 3132 are positioned in a supply receptacle 3134 located below the working axis 3116 (i.e., in the −Z direction of the coordinate axes depicted in the figures) of the apparatus 3100. During operation of the apparatus 3100, the supply platform 3130 is raised relative to the supply receptacle 3134 and towards the working axis 3116 of the apparatus 3100 by action of the supply platform actuator 3132 after a layer of build material 3040 is distributed from the supply platform 3130 to the build area 3120, as will be described in further detail herein. However, it should be understood that, in other embodiments, the apparatus 3100 does not include a supply platform 3130, such as in embodiments where build material is supplied to the build area 3120 with, for example and without limitation, a build material hopper (see FIG. 58C).

The printing assembly 3150 comprises, among other features, a support bracket 3152, a printing head 3154, and a plurality of print heads 3156. The support bracket 3152 is movably coupled to the rail 3104 and the first actuator assembly 3102 of the apparatus 3100 while the printing head 3154 is positioned along an opposite end of the support bracket 3152 and movably coupled thereto via a second actuator assembly 3103 configured to operably index the printing head along a latitudinal axis. As described in greater detail herein, the printing head 3154 of the printing assembly 3150 may include two or more rows of a plurality of print heads 3156 and in some embodiments, at least one of which is movable relative to another row of a plurality of print heads 3156. This allows for at least the material deposit steps of the manufacturing process to be performed with enhanced jetting reliability and jetting resolution by varying a relative location of the at least one movable row of print heads 3156.

However, in some embodiments the printing assembly 3150 includes a plurality of print heads 3156, which may optionally comprise a plurality of jet nozzles 3158. The plurality of jet nozzles 3158 are spaced apart from one another in a direction transverse to a longitudinal axis, where a distance from a first jet nozzle to a second jet nozzle positioned adjacent the first jet of the plurality of jets defines a jet-spacing, as described in more detail herein.

Still referring to FIG. 58B, the manufacturing apparatus 3100 may further include a control system 3010 communicatively coupled to the first actuator assembly 3102, the second actuator assembly 3103 (collectively referred to herein as the printing head position control assembly), the recoat assembly 3140, and/or the printing assembly 3150. As described in greater detail herein, in some embodiments the control system 3010 may be particularly coupled to one or more actuators (e.g. 3160, FIG. 61) of the printing assembly 3150. In the present example the control system 3010 is coupled to the apparatus 3100 via a communication conduit 3012, however, it should be understood that in other embodiments the control system 3010 may be communicatively coupled to the apparatus 3100 via various other means or systems, such as, for example, through a wireless connection. The control system 3010, which may also be referred to as an electronic control unit, comprises a processor and a non-transitory memory that includes computer readable and executable instructions stored thereon. Any action of the apparatus 3100, including the actions described herein, may be caused to be performed by the computer readable and executable instructions (e.g., build instructions defining the sliced files and/or deposition patterns for layers of the component to be built, as described in more detail herein) stored in the non-transitory memory of the control system 3010 when executed by the processor of the control system 3010. For example, one or more actuators of the first actuator assembly 3102 (e.g., mechanical actuators, electro-mechanical actuators, pneumatic actuators, hydraulic actuators, worm drive actuators, ball screw actuators, pneumatic pistons, hydraulic pistons, electro-mechanical linear actuators, etc.) may be actuated by the computer readable and executable instructions stored in the non-transitory memory of the control system 3010 when executed by the processor of the control system 3010 to cause the printing assembly 3150 and/or the recoat assembly 3140 to move in the manner described herein. Furthermore, as described in greater detail below, the computer readable and executable instructions stored in the non-transitory memory may cause the control system 3010 to, when executed by the processor, perform various processes for moving the printing assembly 3150, actuating the one or more actuators 3160 of the printing assembly 3150 to move the rows of print heads 3156, depositing materials onto the build material 3040 (e.g., powder or other material) in the build area 3120, and the like.

In some embodiments, the control system 3010 may be further communicatively coupled to a computing device 3015, optionally via a network 3016, or directly via a communication link such as a wired or wireless connection. The computing device 3015 may include a display 3015*a*, a processing unit 3015*b* (e.g., having at least a processor and memory) and an input device 3015*c*, each of which may be communicatively coupled together and/or to the network 3016. The computing device 3015 may be configured to carry out processes such as generating executable instruction for building a component with the apparatus 3100. The process may implement CAD or other related three dimensional drafting and rendering systems as well as a slicing engine or the like. A slicing engine may be logic configured to receive a model or drawing of a component for building and process the model or drawing into build instructions defining a plurality of motion control operations, powder layer placements, deposition patterns for binder, and the like to be performed by the apparatus 3100 to build the component. The slicing engine may determine the number of layers of powder a build should include as well as locations within the layers of powder that binder should be dispensed. The deposition patterns of binder may also include defining the amount (volume) of binder that is to be dispensed at particular locations within the layer of powder.

In some embodiments, the network 3016 is a personal area network that utilizes Bluetooth technology to communicatively couple the control system 3010. In other embodiments, the network 3016 may include one or more computer networks (e.g., a personal area network, a local area network, or a wide area network), cellular networks, satellite networks, and/or a global positioning system and combinations thereof. Accordingly, the control system 3010 and/or the apparatus 3100 can be communicatively coupled to the network 3016 via wires, via a wide area network, via a local area network, via a personal area network, via a cellular network, via a satellite network, or the like. Suitable local area networks may include wired Ethernet and/or wireless technologies such as, for example, Wi-Fi. Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

The apparatus 3100 further includes one or more fluid reservoirs fluidly coupled to the printing assembly 3150 via one or more conduit lines. In some embodiments, the printing assembly 3150 may also include one or more local fluid manifolds for locally storing fluid. In particular, the one or more fluid reservoirs may be fluidly coupled to the plurality of print heads 3156 disposed within the printing head 3154 of the printing assembly 3150. In this instance, a plurality of jet nozzles 3158 of each of the plurality of print heads 3156 (see FIGS. 2-20) are in fluid communication with a material stored within the one or more fluid reservoirs. FIG. 58B depicts the one or more fluid reservoirs as including a first fluid reservoir 3110 containing a first material 3114 stored therein and a second fluid reservoir 3112 containing a second material 3115 stored therein, where the first material 3114 is different than the second material 3115. The first fluid reservoir 3110 is in fluid communication with the plurality of print heads 3156 in the printing head 3154 via a first conduit line 3111 and the second fluid reservoir 3112 is in fluid communication with the plurality of print heads 3156 in the printing head 3154 via a second conduit line 3113. In some embodiments, the first fluid reservoir 3110 and the second fluid reservoir 3112 may contain the same material. In some embodiments, the plurality of print heads 3156 of the printing head 3154 may be coupled to a single fluid reservoir containing the same material such that the plurality of print heads 3156 is configured to deposit the same material.

As will be described in greater detail herein, in some embodiments, the first fluid reservoir 3110 is coupled to a different subset (i.e., a first subset) of the plurality of print heads 3156 than the second fluid reservoir 3112 (i.e., a second subset) such that the plurality of print heads 3156 collectively receive and dispense each of the first material 3114 and the second material 3115, but each of the plurality of print heads 3156 of the printing assembly 3150 receive and dispense one of the first material 3114 or the second material 3115. In other embodiments, the first conduit line 3111 and the second conduit line 3113 may be coupled to one another at a coupling mechanism, such as, for example, a manifold, a valve, and/or the like. In this instance, the fluid reservoirs 3110, 3112 are in fluid communication with the coupling mechanism via the conduit lines 3111, 3113, where the coupling mechanism includes a third conduit line coupled thereto and extending to the printing head 3154. The coupling mechanism may be configured to selectively transition fluid communication between the fluid reservoirs 3110, 3112 and the printing head 3154 such that the plurality of print heads 3156 receive one of the first material 3114 or the second material 3115 in response to an actuation of the coupling mechanism. It should be understood that the coupling mechanism may be further configured to facilitate simultaneous fluid communication of the first fluid reservoir 3110 and the second fluid reservoir 3112 with the printing head 3154 such that the plurality of print heads 3156 receive both materials 3114, 3115 concurrently.

Figure 58C:
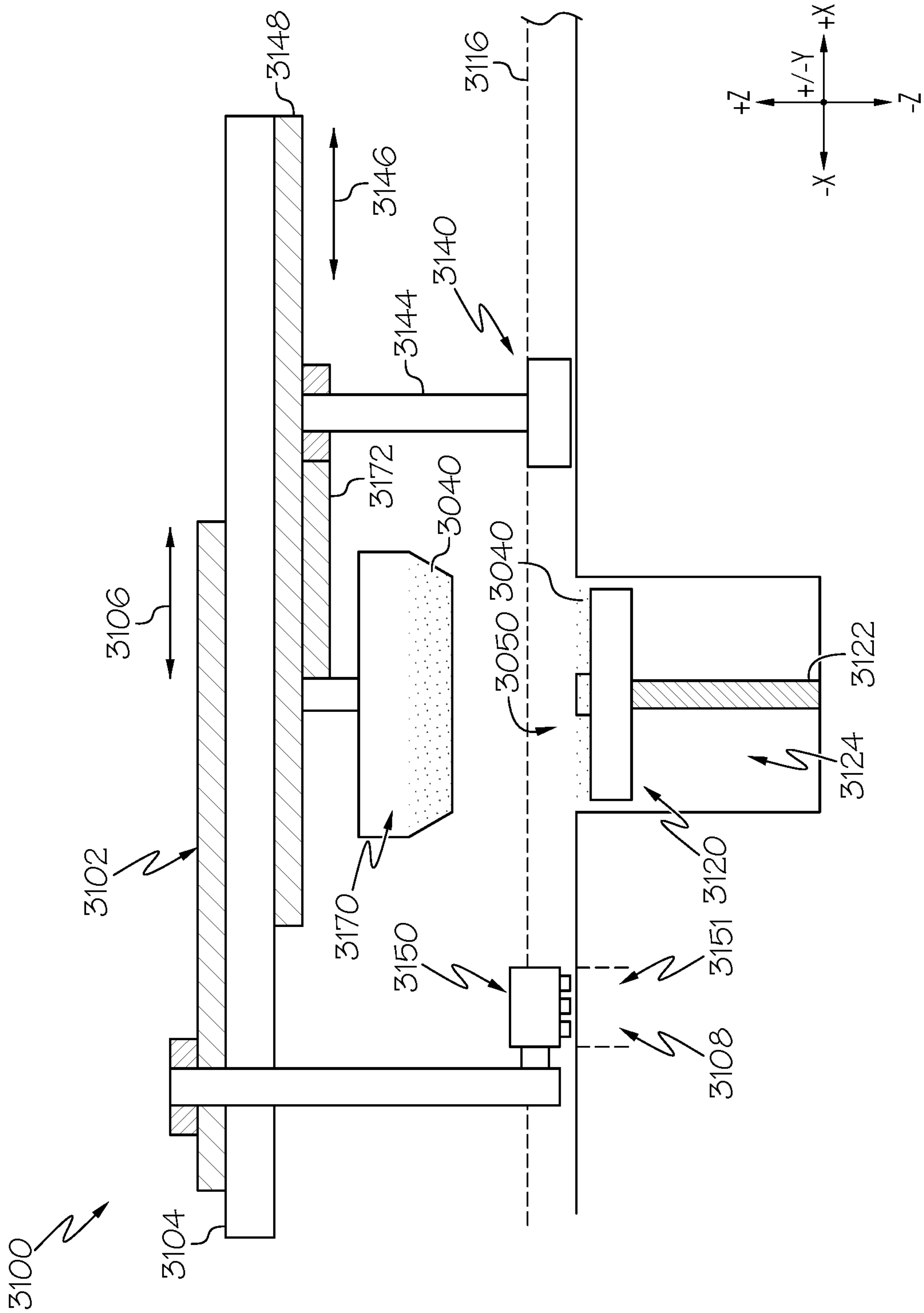
FIG. 58C schematically depicts another manufacturing apparatus according to one or more embodiments shown and described herein.

Referring to FIG. 58C, in some embodiments, the manufacturing apparatus 3100 comprises a cleaning station 3108, and a build area 3120, as described herein with respect to FIG. 58B. However, in the embodiment depicted in FIG. 58C, the manufacturing apparatus 3100 does not include a supply receptacle and/or platform. Instead, the apparatus 3100 comprises a build material hopper 3170 that is used to supply build material 3040 to the build area 3120. In this embodiment, the build material hopper 3170 is coupled to a recoat assembly transverse actuator 3148 such that the build material hopper 3170 traverses along a recoat motion axis 3146 with the recoat assembly 3140. In the embodiment depicted in FIG. 58C, the build material hopper 3170 is coupled to a support bracket 3144 of the recoat assembly 3140 with, for example, a bracket 3172. However, it should be understood that the build material hopper 3170 may be directly coupled to the support bracket 3144 of the recoat assembly 3140 without an intermediate bracket. Alternatively, the build material hopper 3170 may be coupled to the recoat assembly 3140 either directly or with an intermediate bracket.

The build material hopper 3170 may include an electrically actuated valve (not depicted) to release build material 3040 onto the build area 3120 as the build material hopper 3170 traverses over the build area 3120. In embodiments, the valve may be communicatively coupled to the control system 3010 (i.e. electronic control unit) which executes computer readable and executable instructions to open and close the valve based on the location of the build material hopper 3170 with respect to the build area 3120. The build material 3040 released onto the build area 3120 is then distributed over the build area 3120 with the recoat assembly 3140 as the recoat assembly 3140 traverses over the build area 3120.

Figure 58D:
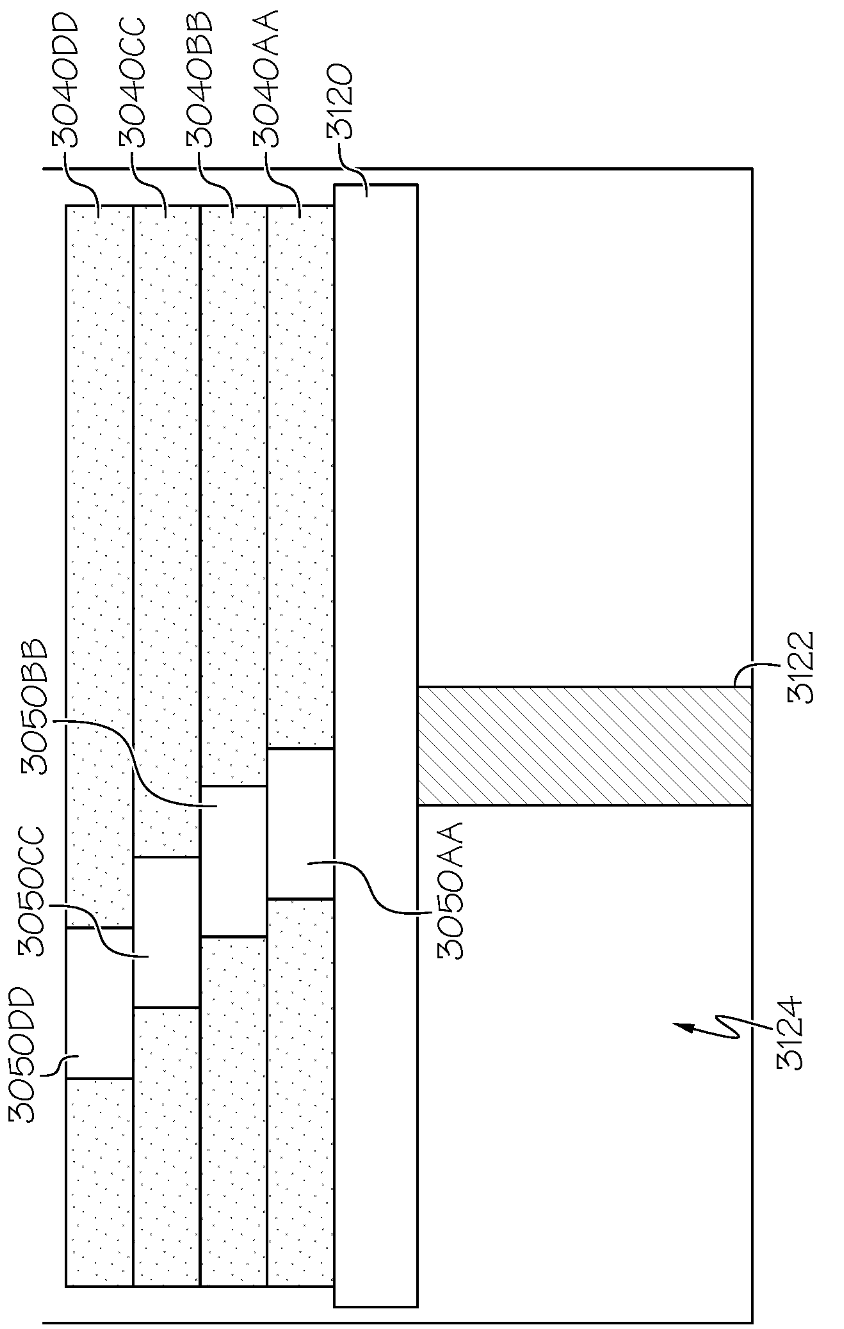
FIG. 58D schematically depicts an enlarged view of build material of a manufacturing apparatus according to one or more embodiments shown and described herein.

Referring to FIG. 58D, object layers of build material 3040AA-3040DD may be sequentially positioned on top of one another when deposited on the build area 3120. In the example provided in FIG. 58D, sequential layers of binder material 3050AA-3050CC are positioned on the layers of build material 3040AA-3040DD. By curing the layers of binder material 3050AA-3050CC, a finished product may be formed.

Referring now to FIGS. 2-9, the printing head 3154 of the printing assembly 3150 is schematically depicted with the plurality of print heads 3156 positioned therein. In particular, FIGS. 2-9 schematically depict a bottom end 3159 of the printing head 3154 thereby illustrating the plurality of print heads 3156 disposed therein. It should be understood that the plurality of print heads 3156 are exposed from within the printing head 3154 of the printing assembly 3150 along the bottom end 3159 of the printing head 3154. As further seen in FIGS. 2-9, and as briefly described above, each of the plurality of print heads 3156 disposed within the printing head 3154 include a plurality of jet nozzles 3158 for depositing the binder material 3050, the first material 3114, the second material 3115, and/or other materials therefrom.

In some embodiments depicted herein, the printing head 3154 of the printing assembly 3150 includes multiple rows of print heads 3156, and in particular, at least a first print head row 3155 of print heads 3156 and a second print head row 3157 of print heads 3156. As will be described in greater detail herein, in other embodiments the printing head 3154 of the printing assembly 3150 may include additional or fewer rows of print heads 3156 (See, FIGS. 12-16). For example, in some embodiments the printing head 3154 of the printing assembly 3150 may include one row of print heads 3156. Although the first print head row 3155 and the second print head row 3157 of the printing head 3154 is shown herein as including three print heads 3156 each, respectively, it should be understood that such depiction is for illustrative purposes, and that in embodiments, the first print head row 3155 and/or the second print head row 3157 include greater or fewer print heads 3156.

It should further be understood that each of the plurality of print heads 3156 include a plurality of jet nozzles 3158. Despite the present example depicting each print head 3156 having four jet nozzles 3158 therein, it should be understood that this is merely for illustrative purposes and that each print head 3156 of the plurality of print heads 3156 in the first print head row 3155 and the second print head row 3157 include a plurality of jet nozzles 3158, which in many instances include many more than four jet nozzles. Accordingly, embodiments are contemplated and possible wherein each of the print heads 3156 of the plurality of print heads 3156 disposed within the printing head 3154 include greater or fewer jet nozzles 3158. By way of example only, each of the print heads 3156 may include a plurality of jet nozzles 3158 from about 5 nozzles to 50 nozzles, from about 50 nozzles to about 100 nozzles, from about 100 nozzles to about 500 nozzles, from about 500 nozzles to about 1000 nozzles, from about 1000 nozzles to about 2000 nozzles, from about 2000 nozzles to about 3000 nozzles, from about 3000 nozzles to about 4000 nozzles, from about 4000 nozzles to about 5000 nozzles, from about 5,000 nozzles to about 6,000 nozzles, with each jet nozzle 3158 spaced apart from another. The nozzles may be spaced apart from each other by 1/10 inch to about 1/1200 inch, or any value therebetween, for example 1/100 inch, 1/200 inch, 1/300 inch, 1/400 inch, 1/500 inch, 1/600 inch, 1/700 inch, 1/800 inch, 1/900 inch, 1/1000 inch, 1/1100 inch, or 1/1200 inch from one another. The distance "d" from a first jet to a second jet positioned adjacent the first jet of the plurality of jets corresponds to a jet-spacing (d) (FIG. 78A).

Figure 59:
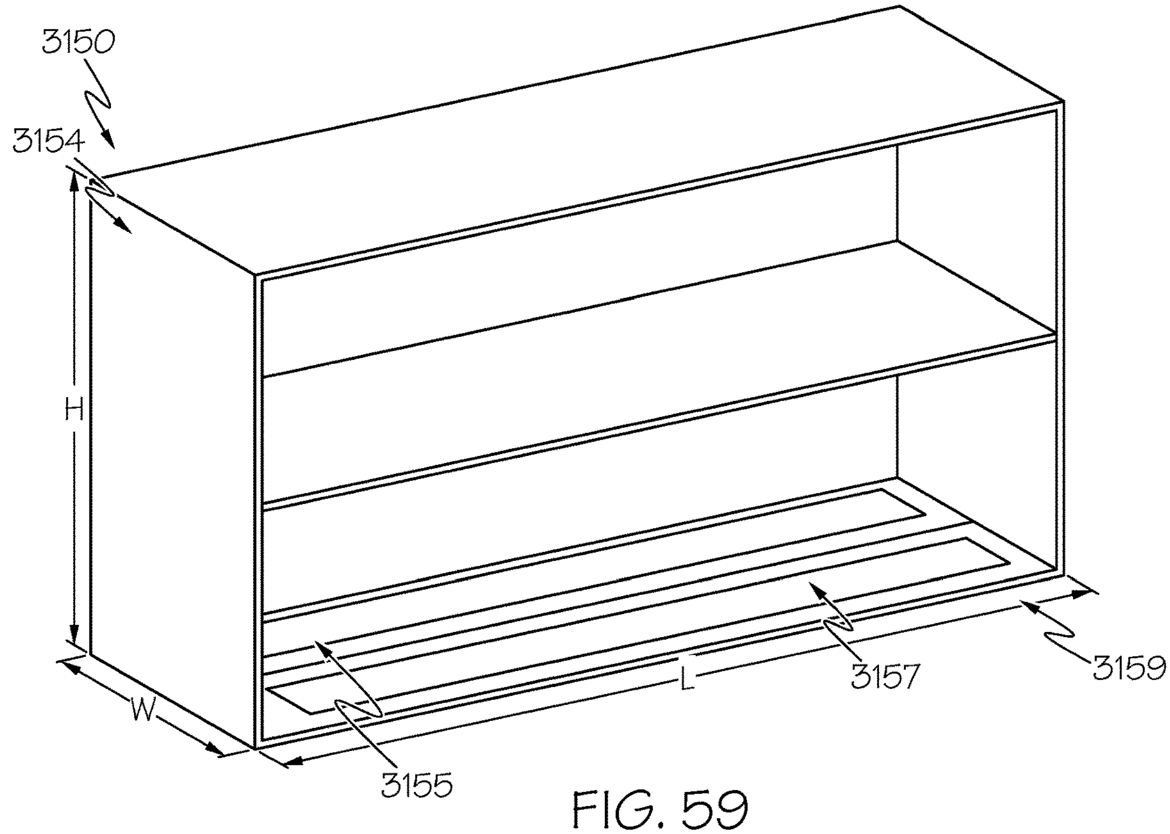
FIG. 59 schematically depicts an embodiment of a printing assembly for a manufacturing apparatus, with a pair of print head rows according to one or more embodiments shown and described herein.

Referring in more detail to FIG. 59, the printing assembly 3150 includes the first print head row 3155 and the second print head row 3157 positioned along the bottom end 3159 of the printing head 3154. More particularly, the print head rows 3155, 3157 extend along a length "L" of the printing head 3154 such that the print head rows 3155, 3157 have a length that is similar to a length "L" of the printing head 3154. In the present example, the print head rows 3155, 3157 include an identical length relative to one another, however, it should be understood that in other embodiments the print head rows 3155, 3157 may have varying lengths relative to one another and from that shown and described herein. The print head rows 3155, 3157 are sized and shaped to slidably receive at least one print head 3156 therein, respectively, and in particular a plurality of print heads 3156. The print head rows 3155, 3157 are positioned parallel to one another along the bottom end 3159 of the printing head 3154 and are sequentially aligned relative to each other in a collinear arrangement.

Figure 60:
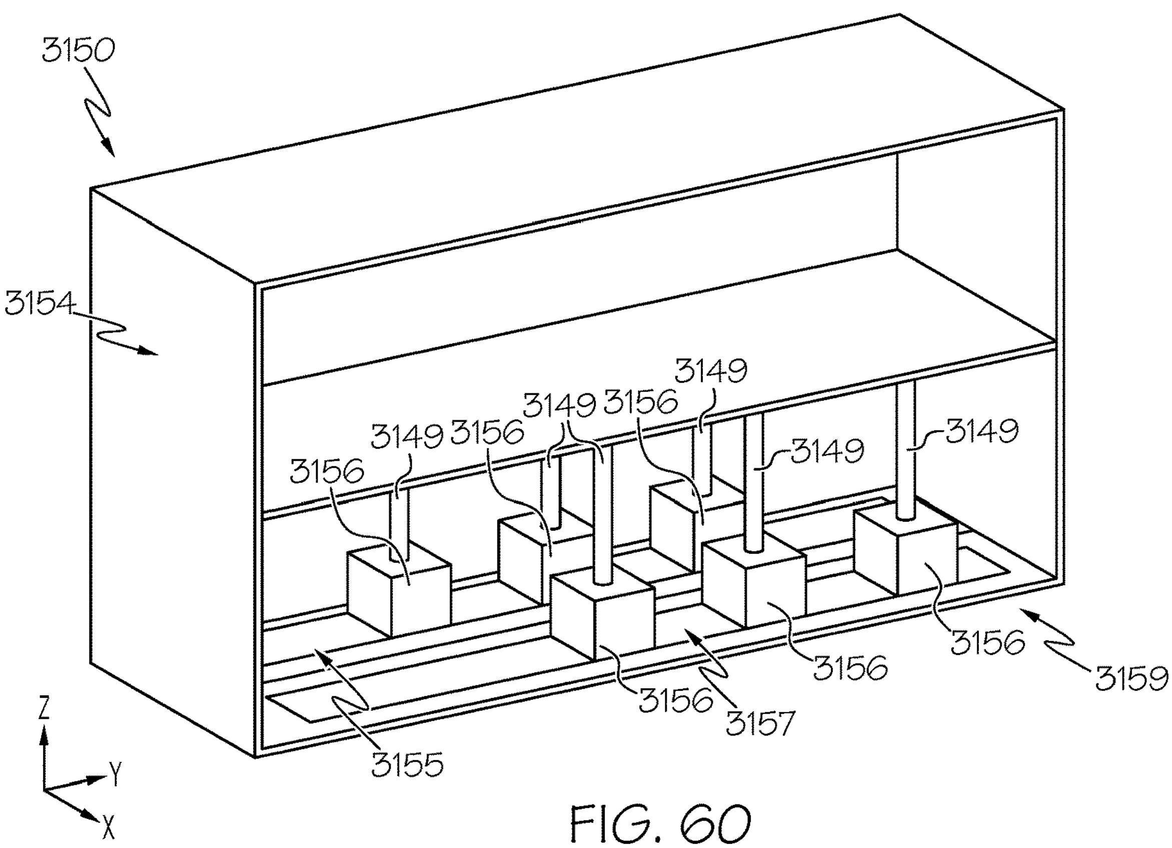
FIG. 60 schematically depicts an embodiment of a printing assembly for a manufacturing apparatus, with a pair of print head rows including a plurality of print heads therein according to one or more embodiments shown and described herein.

Referring now to FIG. 60, the printing assembly 3150 is schematically depicted including a plurality of print heads 3156 defining the first print head row 3155 and a plurality of print heads 3156 defining the second print head row 3157. The plurality of print heads 3156 of the first print head row 3155 are in coaxial alignment relative to one another, and the plurality of print heads 3156 of the second print head row 3157 are in coaxial alignment relative to one another. In some embodiments, the plurality of print heads 3156 of the first print head row 3155 and the second print head row 3157 are aligned with the bottom end 3159 of the printing head 3154 such that a faceplate of the plurality of print heads 3156 may be flush with the bottom end 3159 of the printing head 3154. As described in greater detail herein, in some embodiments the faceplates of the plurality of print heads 3156 may be moved relative to the bottom end 3159 of the printing head 3154 to thereby offset the faceplates relative to one another and relative to the bottom end 3159.

As briefly described above, the plurality of print heads 3156 may be configured to slidably translate within the print head rows 3155, 3157, respectively, in a transverse direction relative to the working axis 3116 of the apparatus 3100 (i.e., in the +/−Y direction as shown in the figures). In the present example, the printing head 3154 of the printing assembly 3150 includes a pair of print head rows 3155, 3157 defined by three print heads 3156, respectively, in each row. It should be understood that the printing head 3154 of the printing assembly 3150 is configured to be modular such that in other embodiments additional print head rows and/or print heads 3156 may be included without departing from the scope of the present disclosure. Each of the print heads 3156 include a coupling feature 3149 attached thereto. Although not shown in FIG. 60, the coupling features 3149 of each of the print heads 3156 in the print head rows 3155, 3157 are further attached to an actuator 3160 (see FIGS. 4-20) at an end opposite of the print head 3156. As will be described in greater detail herein, the actuator(s) 3160 are configured to move the plurality of print heads 3156 of the first print head row 3155 and/or the second print head row 3157 upon an actuation of the actuator(s) 3160, which may be caused by execution of computer readable and executable instructions stored in the non-transitory memory of the control system 3010 by the processor of the control system 3010. In some embodiments, for example, those depicted and described with reference to FIGS. 78A-78B, the printing assembly 3150 may be indexable along a latitudinal axis via a second actuator assembly 3103 (FIG. 78A). This may be in addition to the independent movement of the plurality of print heads 3156 described with reference to FIGS. 4-20 or the plurality of print heads 3156 may be fixed to a location within the printing assembly 3150 (i.e., absent actuator(s) 3160.

Figure 61:
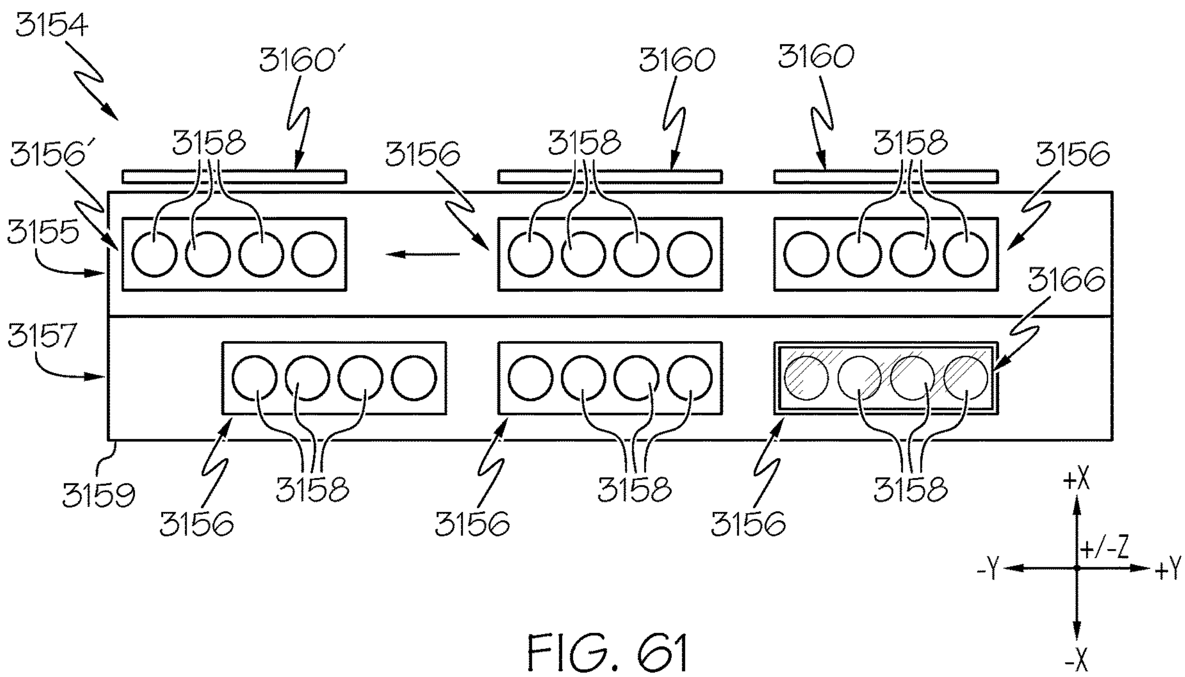
FIG. 61 schematically depicts an embodiment of a printing assembly for a manufacturing apparatus, with a first print head that is laterally movable according to one or more embodiments shown and described herein.

Referring specifically to FIG. 61, the first print head row 3155 of the plurality of print heads 3156 is positioned relative to the second print head row 3157 of the plurality of print heads 3156 such that the first print head row 3155 is spaced apart from the second print head row 3157 along the working axis 3116 of the apparatus 3100 (i.e., in the +/−X direction of the coordinate axes depicted in the figures). Each of the plurality of print heads 3156 of the first print head row 3155 are sequentially spaced apart from one another in a direction transverse to the working axis 3116 of the apparatus 3100 (in the +/−Y direction of the coordinate axes depicted in the figures). Similarly, each of the plurality of print heads 3156 of the second print head row 3157 is sequentially spaced apart from one another in a direction transverse to the working axis 3116 of the apparatus 3100 (in the +/−Y direction of the coordinate axes depicted in the figures).

In a default position, the plurality of print heads 3156 of the first print head row 3155 may be positioned such that they at least partially overlap with the plurality of print heads 3156 of the second print head row 3157 in the +/−X direction of the coordinate axes (i.e. along the working axis 3116). It should be understood that in some embodiments the plurality of print heads 3156 of the first print head row 3155 are at least laterally offset (in the +/−Y direction of the coordinate axes of the figures) from the plurality of print heads 3156 of the second print head row 3157 by at least about one-half a width and/or diameter of a jet nozzle 3158 when the print head rows 3155, 3157 are in a default position. As will be described in greater detail herein, the plurality of print heads 3156 of the first print head row 3155 and the second print head row 3157 may be laterally offset relative to one another, in a direction transverse to the working axis 3116 (in the +/−Y direction of the coordinate axes depicted in the figures), such that the at least one print head 3156 of the first print head row 3155 and/or the second print head row 3157 is shifted in the +/−Y direction of the coordinate axes depicted in the figures relative to another print head 3156 of the adjacent row when the printing head 3154 is in an actuated position. However, it should be understood that in some embodiments at least one print head 3156 of the first print head row 3155 and/or the second print head row 3157 may continue to overlap with at least one opposing print head 3156 of the adjacent row when the printing head 3154 is in an actuated position (see FIGS. 5-9). It should further be understood that a default position of the plurality of print heads 3156 of either print head row 3155, 3157 may vary from that depicted and described herein, such that the default position of each row of print heads 3156 may be distinct from a default position of an adjacent row of print heads 3156. As described in greater detail herein, moving one or more of the plurality of print heads 3156 of the first print head row 3155 and/or the second print head row 3157 provides for a printing redundancy over the plurality of pixels along the build area 3120, thereby forming a final deposited geometry where each of the plurality of pixels received material deposits thereon from more than one jet nozzle 3158 of the plurality of jet nozzles 3158.

Still referring to FIG. 61, the printing head 3154 of the printing assembly 3150 further includes at least one actuator 3160 coupled to at least one of the plurality of print heads 3156 positioned within the first print head row 3155 of print heads 3156. The actuator 3160 is configured to move the at least one print head 3156 of the plurality of print heads 3156 in the first print head row 3155 (e.g., a first print head 3156') in response to an actuation of the actuator 3160 (e.g., a first actuator 3160'). The first print head 3156' moves relative to the support bracket 3152 of the printing assembly 3150. In particular, the first actuator 3160' translates the first print head 3156' in a direction transverse to the working axis 3116 (in the +/−Y direction of the coordinate axes depicted in the figures) such that the first print head 3156' moves relative to the support bracket 3152 (See FIG. 58B) in the direction transverse to the working axis (in the +/−Y direction of the coordinate axes shown in FIG. 61). In some embodiments, and as will be described in greater detail herein, a relative distance between the first print head 3156' and the adjacent print heads 3156 of the second print head row 3157 may also be adjusted in response to a translation of the first print head 3156' within the first print head row 3155.

In the embodiments described herein, the actuator 3160 of the at least one print head 3156 may be, for example and without limitation, mechanical actuators, electro-mechanical actuators, pneumatic actuators, hydraulic actuators, motorized actuators, non-motorized actuators, or any other actuator suitable for providing at least a linear motion. Suitable actuators may include, without limitation, linear stages, worm drive actuators, ball screw actuators, pneumatic pistons, hydraulic pistons, electro-mechanical linear actuators, or the like. By way of example, the actuator 3160 may comprise a linear stage actuator such as a 150 MM linear motor stage with at least a 4 um accuracy.

Still referring to FIG. 61, in some embodiments, the printing head 3154 of the printing assembly 3150 includes a plurality of actuators 3160, and in particular at least one actuator 3160 for each of the plurality of print heads 3156 of the first print head row 3155. In this instance, and as described in greater detail herein, each of the plurality of print heads 3156 of the first print head row 3155 may move relative to one another and relative to the support bracket 3152 (See FIG. 58B) in the direction transverse to the working axis (in the +/−Y direction of the coordinate axes shown in the figures) in response to an actuation of the respective actuator 3160 coupled thereto. In other words, each of the plurality of print heads 3156 of the first print head row 3155 are movable independent of one another such that adjacent print heads 3156 of the first print head row 3155 may translate in opposite directions and/or at varying degrees (i.e., distances) relative to one another along the +/−Y direction of the coordinate axes.

In some embodiments, the printing head 3154 may include at least one spacer positioned between adjacent print heads 3156 of the first print head row 3155 such that a spacing between the adjacent and independently movable print heads 3156 increases and/or decreases uniformly relative to one another. In other embodiments, a limited number of the print heads 3156 within the first print head row 3155 may include one of the plurality of actuators 3160 coupled thereto (e.g., every other print head 3156 of the first print head row 3155; outer print heads 3156 of the first print head row; inner print heads 3156 of the first print head row; and the like) such that not every print head 3156 of the first print head row 3155 is independently movable.

In some embodiments, more than one of the plurality of print heads 3156 of the first print head row 3155 may be coupled to a single actuator 3160 such that the print heads 3156 coupled thereto may move in unison in the direction transverse to the working axis 3116 (the +/−Y direction in the coordinate axes shown in the figures). In some embodiments, all of the print heads 3156 in a single row may be coupled to a single actuator 3160 (e.g., all of the plurality of print heads 3156 in the first print head row 3155 may be coupled to a single actuator 3160 such that all print heads 3156 in the first print head row 3155 move in unison in the direction transverse to the working axis 3116 (the +/−Y direction in the coordinate axes shown in the figures). Alternatively, all of the print heads 3156 in multiple rows may be coupled to a single actuator 3160 (e.g., all of the plurality of print heads 3156 in the first print head row 3155 and the second print head row 3157 may be coupled to a single actuator 3160 such that all the print heads 3156 in the printing head 3154 move in unison in the direction transverse to the working axis 3116 (the +/−Y direction in the coordinate axes shown in the figures).

Still referring to FIG. 61, in some embodiments when one or more of the print heads 3156 in a single row 3155, 3157 are not currently required for performing an additive manufacturing process, the one or more print heads 3156 may be capped to protect the plurality of jet nozzles 3158 of the respective print head 3156 from the printing process. In particular, a print head cap 3166 may be positioned along a faceplate of one or more print heads 3156 such that the plurality of jet nozzles 3158 are effectively covered with and/or receive the print head cap 3166 therein. In this instance, the plurality of jet nozzles 3158 of the capped print head 3156 may be shielded from dirt during use of the printing assembly 3150. When necessary, the capped print heads 3156 may be uncapped to thereby expose the plurality of jet nozzles 3158 therein for performing an additive manufacturing process.

In other embodiments, the printing head 3154 may include at least one actuator 3160 coupled to the plurality of print heads 3156 defining the first print head row 3155 for moving the plurality of print heads 3156 and another actuator 3160 coupled to the plurality of print heads 3156 defining the first print head row 3155 for changing a distance (e.g., spacing) between the plurality of print heads 3156 of the first print head row 3155. In this instance, despite the plurality of print heads 3156 of the first print head row 3155 moving in unison with one another in response to an actuation of a single actuator 3160, a spacing between each of the plurality of print heads 3156 may be selectively controlled (e.g., increased or decreased) by another actuator 3160 coupled to the print heads 3156 of the first print head row 3155. In the present example, the plurality of print heads 3156 of the second print head row 3157 do not include an actuator coupled thereto such that the second print head row 3157 of the plurality of print heads 3156 are securely fixed relative to one another, relative to the support bracket 3152 (See FIG. 58B), and relative to the plurality of print heads 3156 of the first print head row 3155. However, as described below, one or more of the print heads 3156 of the second print head row 3157 may also be movable relative to the support bracket 3152 in the +/−Y direction of the coordinate axes.

Figure 62:
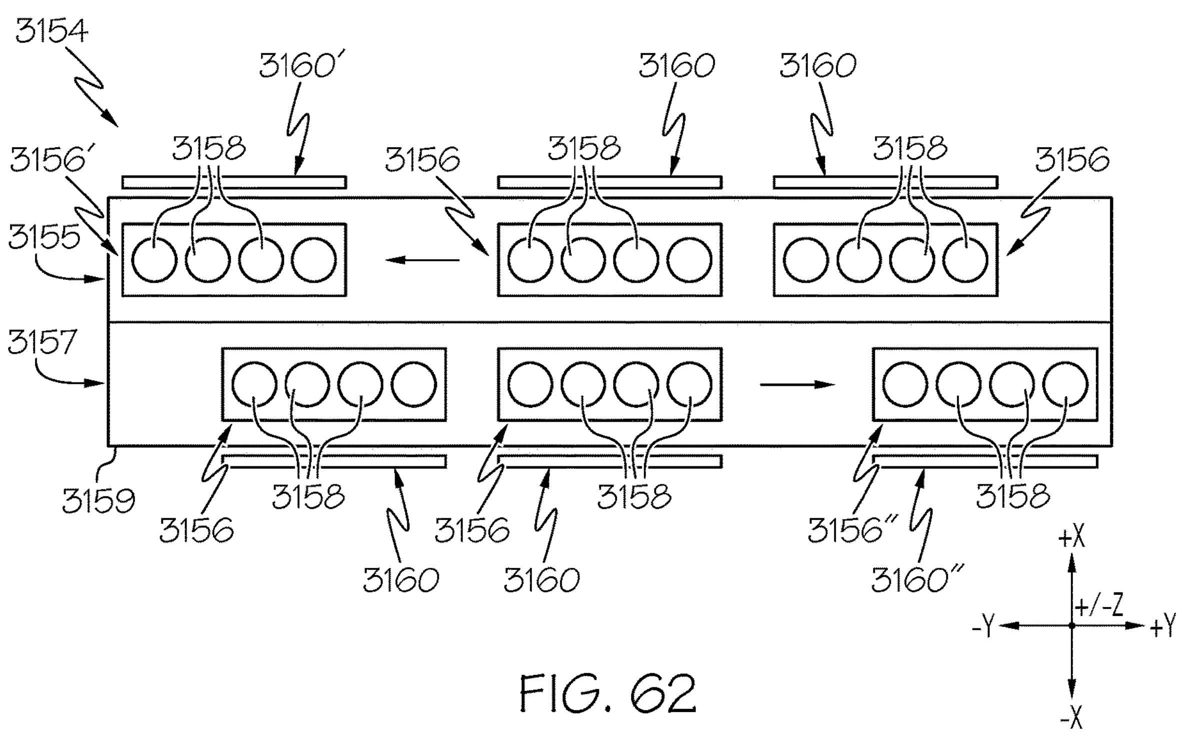
FIG. 62 schematically depicts an embodiment of a printing assembly for a manufacturing apparatus, with a pair of print heads that are laterally movable according to one or more embodiments shown and described herein.

Referring now to FIG. 62, in some embodiments the printing head 3154 of the printing assembly 3150 includes at least one actuator 3160 coupled to at least one of the plurality of print heads 3156 positioned within the second print head row 3157. The actuator 3160 is configured to move the at least one print head 3156 of the plurality of print heads 3156 in the second print head row 3157 (e.g., a second print head 3156") in response to an actuation of the actuator 3160 (e.g., a second actuator 3160"). The second print head 3156" moves relative to the support bracket 3152 of the printing assembly 3150 (See FIG. 58B). In particular, the second actuator 3160" translates the second print head 3156" in a direction transverse to the working axis 3116 (i.e., in the +/−Y direction of the coordinate axes depicted in the figures) such that the second print head 3156" moves relative to the support bracket 3152 (See FIG. 58B) in the direction transverse to the working axis 3116 (in the +/−Y direction of the coordinate axes shown in FIG. 61). In some embodiments, and as will be described in greater detail herein, a relative distance between the second print head 3156" and the adjacent print heads 3156 of the first print head row 3155 may also be adjusted in response to a translation of the second print head 3156" within the second print head row 3157.

In other embodiments, the printing head 3154 of the printing assembly 3150 includes a plurality of actuators 3160, and in particular at least one actuator 3160 for each of the plurality of print heads 3156 of the second print head row 3157. In this instance, and as described in greater detail herein, each of the plurality of print heads 3156 of the second print head row 3157 may move relative to one another in response to an actuation of the respective actuator 3160 coupled thereto. In other words, each of the plurality of print heads 3156 of the second print head row 3157 are movable independent of one another such that adjacent print heads 3156 of the second print head row 3157 may translate in opposite directions and/or at varying degrees (i.e., distances) relative to one another along the +/−Y direction of the coordinate axes. With one or more of the print head 3156 in each of the print head rows 3155, 3157 coupled to at least one actuator 3160, the printing head 3154 of the printing assembly 3150 may generate a variable printing width that is configured to expand or contract as necessary.

Figure 63:
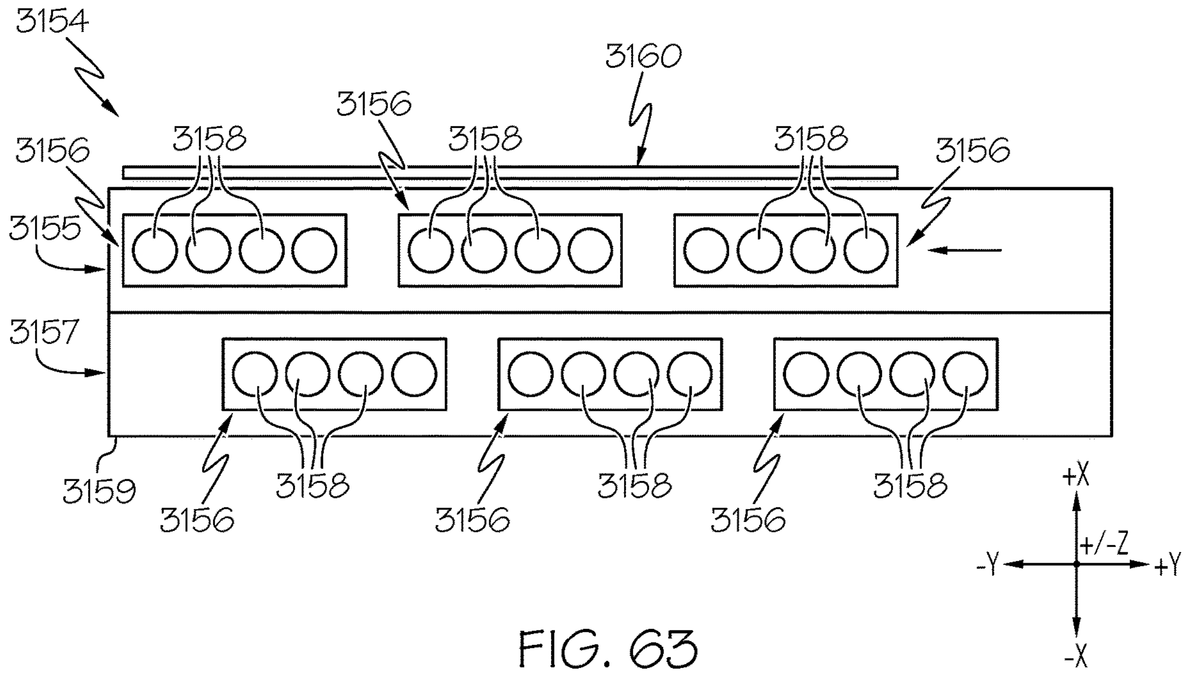
FIG. 63 schematically depicts an embodiment of a printing assembly for a manufacturing apparatus, with a first print head row of print heads that are laterally movable according to one or more embodiments shown and described herein.

Referring now to FIG. 63, in other embodiments the printing head 3154 of the printing assembly 3150 includes a single actuator 3160 that is coupled to the plurality of print heads 3156 of the first print head row 3155. The actuator 3160 is configured to move the plurality of print heads 3156 of the first print head row 3155 in unison relative to the support bracket 3152 of the printing assembly 3150 (See FIG. 58B) in a direction transverse to the working axis 3116 of the apparatus 3100 (i.e., in the +/−Y direction of the coordinate axes depicted in the figures). In other words, actuation of the actuator 3160 provides a simultaneous translation of the plurality of print heads 3156 of the first print head row 3155 relative to the plurality of print heads 3156 of the second print head row 3157. In this instance, a relative distance (e.g., spacing) between each of the plurality of print heads 3156 of the first print head row 3155 is maintained such that the offset between adjacent print heads 3156 within the first print head row 3155 is not changed as the first print head row 3155 of print heads 3156 translates.

In the present example, the plurality of print heads 3156 of the second print head row 3157 do not include an actuator coupled thereto such that the second print head row 3157 of the plurality of print heads 3156 is securely fixed relative to the plurality of print heads 3156 of the first print head row 3155. In other embodiments, the single actuator 3160 may be coupled to both the first print head row 3155 and the second print head row 3157 such that actuation of the actuator 3160 provides translation of both rows 3155, 3157 in unison relative to the support bracket 3152 (See FIG. 58B) in a direction transverse to the working axis 3116 of the apparatus 3100 (i.e., in the +/−Y direction of the coordinate axes depicted in the figures).

Figure 64:
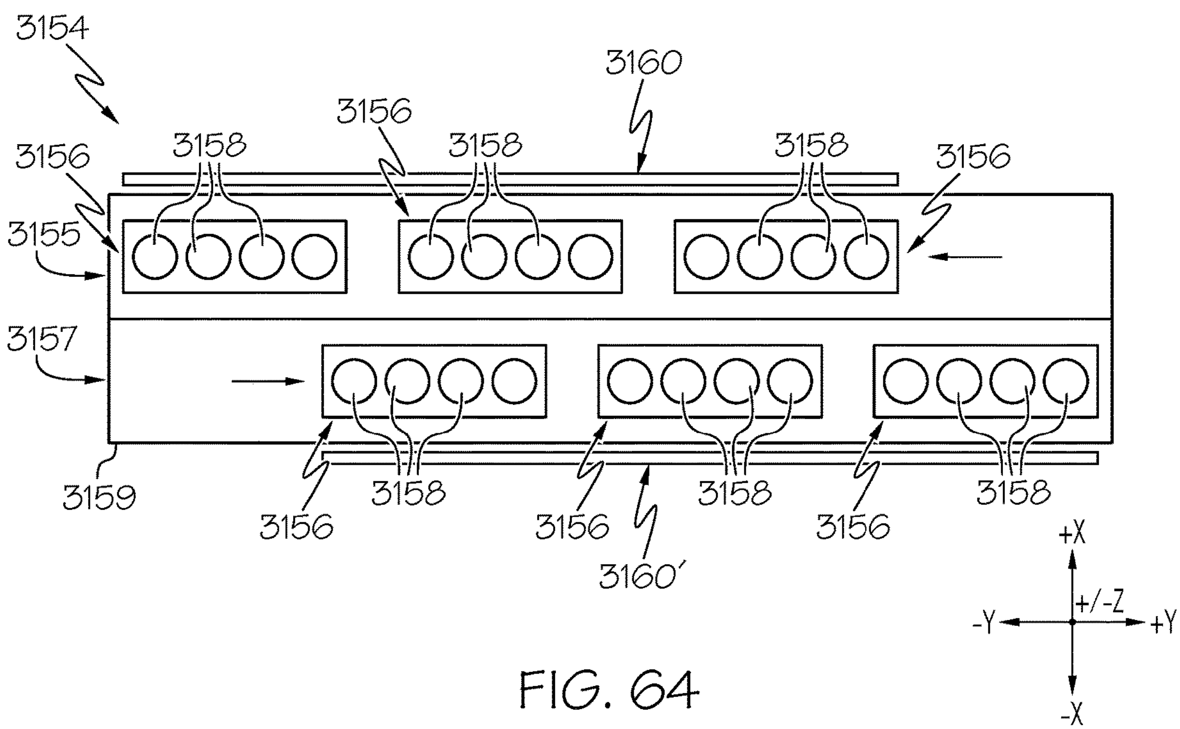
FIG. 64 schematically depicts an embodiment of a printing assembly for a manufacturing apparatus, with a pair of rows of print heads that are laterally movable according to one or more embodiments shown and described herein.

Referring to FIG. 64, in some embodiments the printing head 3154 of the printing assembly 3150 includes a second actuator 3160' coupled to the plurality of print heads 3156 positioned within the second print head row 3157 of print heads 3156. The second actuator 3160' is configured to move the plurality of print heads 3156 of the second print head row 3157 in response to an actuation of the second actuator 3160'. The plurality of print heads 3156 of the second print head row 3157 move relative to the support bracket 3152 of the printing assembly 3150 (see FIG. 58B). In particular, the second actuator 3160' translates the plurality of print heads 3156 of the second print head row 3157 in a direction transverse to the working axis 3116 (i.e., in the +/−Y direction of the coordinate axes depicted in the figures). In other words, actuation of the second actuator 3160' provides a simultaneous translation of the plurality of print heads 3156 of the second print head row 3157 relative to the plurality of print heads 3156 of the first print head row 3155. The plurality of print heads 3156 of the first print head row

3155 are translated in an opposite direction (−Y direction of the coordinate axes of FIG. 64) than the plurality of print heads 3156 of the second print head row 3157 (+Y direction of the coordinate axes of FIG. 64). It should be understood that the plurality of print heads 3156 of the first print head row 3155 may trade positions with the plurality of print heads 3156 of the second print head row 3157. In this instance, a relative distance between each of the plurality of print heads 3156 of the second print head row 3157 is maintained such that the offset between adjacent print heads 3156 within the second print head row 3157 is not changed as the second print head row 3157 of print heads 3156 translates.

In some embodiments, the actuator 3160 of the printing head 3154 is configured to move one or more of the plurality of print heads 3156 of the first print head row 3155 and/or the second print head row 3157 in various other directions other than those shown and described above (i.e., directions other than in the +/−Y direction of the coordinate axes depicted in the figures). For example, the actuator 3160 of the printing head 3154 may be configured to move one or more of the plurality of print heads 3156 of the first print head row 3155 and/or the second print head row 3157 in a direction parallel to the working axis 3116 of the apparatus 3100 (i.e., in the +/−X direction of the coordinate axes depicted in the figures), in another direction that is transverse to the working axis 3116 (i.e., in the +/−Z direction of the coordinate axes depicted in the figures), and the like.

Figure 65:
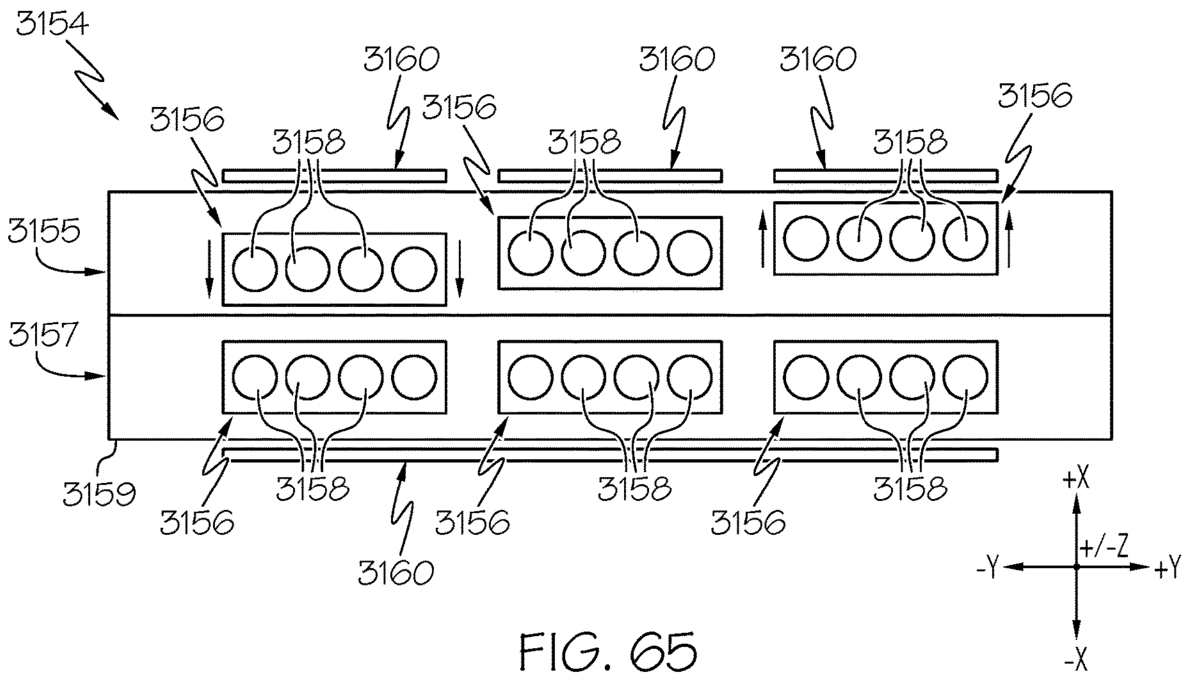
FIG. 65 schematically depicts an embodiment of a printing assembly for a manufacturing apparatus, with a pair of print heads that are movable according to one or more embodiments shown and described herein.

Specifically referring to FIG. 65, in some embodiments the printing head 3154 of the printing assembly 3150 includes a plurality of actuators 3160, and in particular each of the plurality of print heads 3156 of the first print head row 3155 are coupled to at least one actuator 3160, respectively. Further, the plurality of print heads 3156 of the second print head row 3157 is collectively coupled to a single actuator 3160. In this instance, the plurality of actuators 3160 coupled to the plurality of print heads 3156 of the first print head row 3155 are configured to selectively and individually move each of the print heads 3156 in a direction that is parallel to the working axis 3116 of the apparatus 3100 (i.e., in the +/−X direction of the coordinate axes depicted in the figures).

In this instance, each of the plurality of print heads 3156 of the first print head row 3155 are movable independent of one another such that adjacent print heads 3156 of the first print head row 3155 may translate in opposite directions and/or at varying degrees (i.e., distances) relative to one another and the support bracket 3152 (see FIG. 58B) along the +/−X direction of the coordinate axes. Although not shown, it should be understood that in other embodiments the plurality of print heads 3156 of the second print head row 3157 may be coupled to a plurality of actuators 3160, rather than a single actuator 3160 as shown and depicted herein, such that the plurality of print heads 3156 of the second print head row 3157 are individually movable simultaneous to the plurality of print heads 3156 of the first print head row 3155. In other embodiments where the printing head 3154 of the printing assembly 3150 includes a plurality of actuators 3160 coupled to the plurality of print heads 3156 of the first print head row 3155 and the plurality of print heads 3156 of the second print head row 3157 is collectively coupled to a single actuator 3160, the plurality of actuators 3160 may be configured to selectively and individually rotate each of the print heads 3156 of the first print head row 3155.

Figure 66:
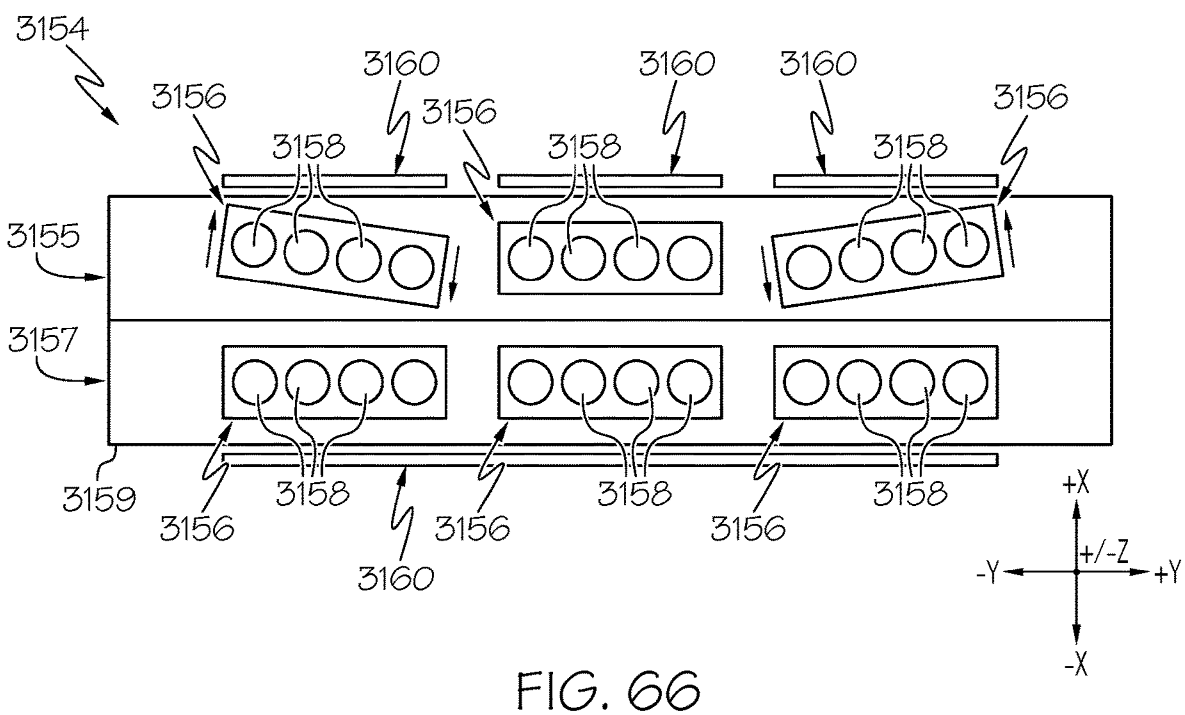
FIG. 66 schematically depicts an embodiment of a printing assembly for a manufacturing apparatus, with a pair of print heads that are rotatable according to one or more embodiments shown and described herein.

Specifically referring to FIG. 66, the plurality of actuators 3160 coupled to the plurality of print heads 3156 of the first print head row 3155 are configured to rotate and/or pivot each of the print heads 3156, independent of an adjacent print head 3156 of the first print head row 3155, about a rotation axis that is transverse to the working axis 3116 of the apparatus 3100 (i.e., a rotation axis parallel to the +/−Z direction of the coordinate axes depicted in the figures). In other words, each of the plurality of print heads 3156 of the first print head row 3155 is rotatable relative to one another and the support bracket 3152 (see FIG. 58B) such that adjacent print heads 3156 of the first print head row 3155 may rotate in opposite directions and/or at varying degrees relative to one another about the rotation axis. Although not shown, it should be understood that in other embodiments the plurality of print heads 3156 of the second print head row 3157 may similarly be coupled to a plurality of actuators 3160, rather than a single actuator 3160 as shown and depicted herein, such that the plurality of print heads 3156 of the second print head row 3157 are individually rotatable simultaneous to the plurality of print heads 3156 of the first print head row 3155.

Referring now to FIGS. 10-11, the printing head 3154 of the printing assembly 3150 is schematically depicted with at least one of the print heads 3156 of the plurality of print heads 3156 of the first print head row 3155 (i.e., the first print head 3156') and at least one of the print heads 3156 of the plurality of print heads 3156 of the second print head row 3157 (i.e., the second print head 3156") disposed therein.

Figure 67:
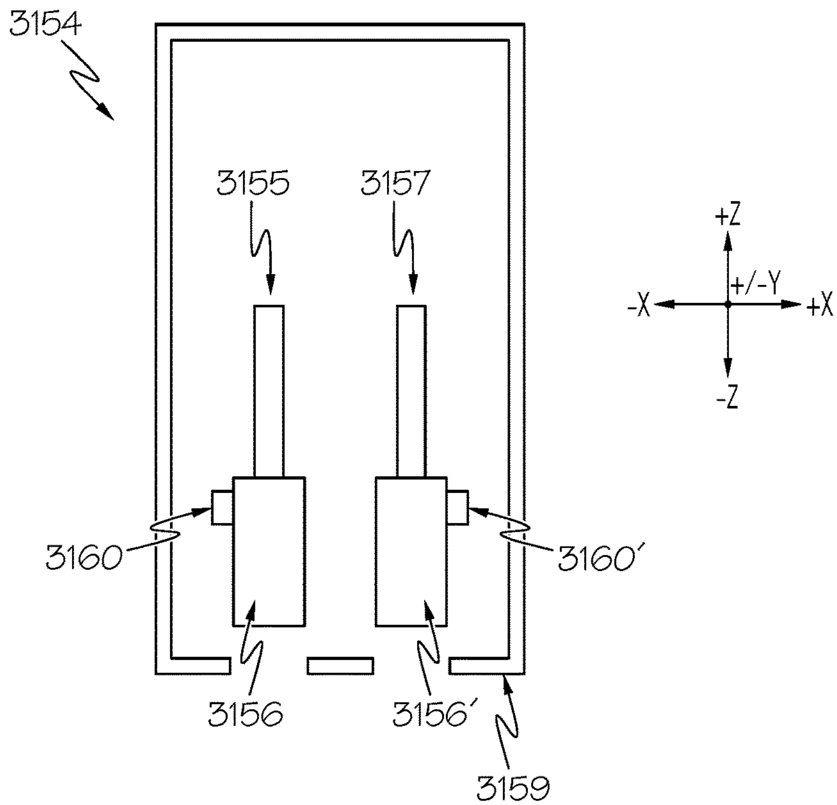
FIG. 67 schematically depicts an embodiment of a printing assembly for a manufacturing apparatus, with a pair of print heads that are positioned at a default elevation according to one or more embodiments shown and described herein.

Specifically referring to FIG. 67, the first print head row 3155 and the second print head row 3157 of print heads 3156 are positioned within the printing head 3154 at a predetermined elevation (i.e., height) relative to the bottom end 3159 of the printing head 3154 when in a default position. In some embodiments the printing head 3154 of the printing assembly 3150 includes a plurality of actuators 3160, and in particular each of the plurality of print heads 3156 of the first print head row 3155 and/or the second print head row 3157 are coupled to at least one actuator 3160, respectively. In this instance, the plurality of actuators 3160 coupled to the plurality of print heads 3156 of the first print head row 3155 and/or the second print head row 3157 are configured to selectively and independently move each of the print heads 3156 in a direction that is transverse to the working axis 3116 of the apparatus 3100 (i.e., in the +/−Z direction of the coordinate axes depicted in the figures).

Accordingly, each of the plurality of print heads 3156 of the first print head row 3155 and/or the second print head row 3157 are movable independent of one another such that adjacent print heads 3156 of the first print head row 3155 and/or the second print head row 3157 may translate in opposite directions and/or at varying degrees (i.e., distances) relative to one another along the +/−Z direction of the coordinate axes. In other words, the plurality of actuators 3160 are configured to adjust a height between the plurality of print heads 3156 of the first print head row 3155 and/or the second print head row 3157 relative to one another, the bottom end 3159 of the printing head 3154, and the build area 3120 over which the printing assembly 3150 is positioned over when depositing the binder material 3050, the first material 3114, the second material 3115, and the like. In other embodiments, a height of the plurality of print heads 3156 of the first print head row 3155 and/or the second print head row 3157 may be adjusted in instances where the plurality of print heads 3156 are to be inactive during a current print cycle. In this instance, the first print head row 3155 or the second print head row 3157 is movable in the +Z direction of the coordinate axes to vertically offset the inactive plurality of print heads 3156 positioned therein.

Figure 68:
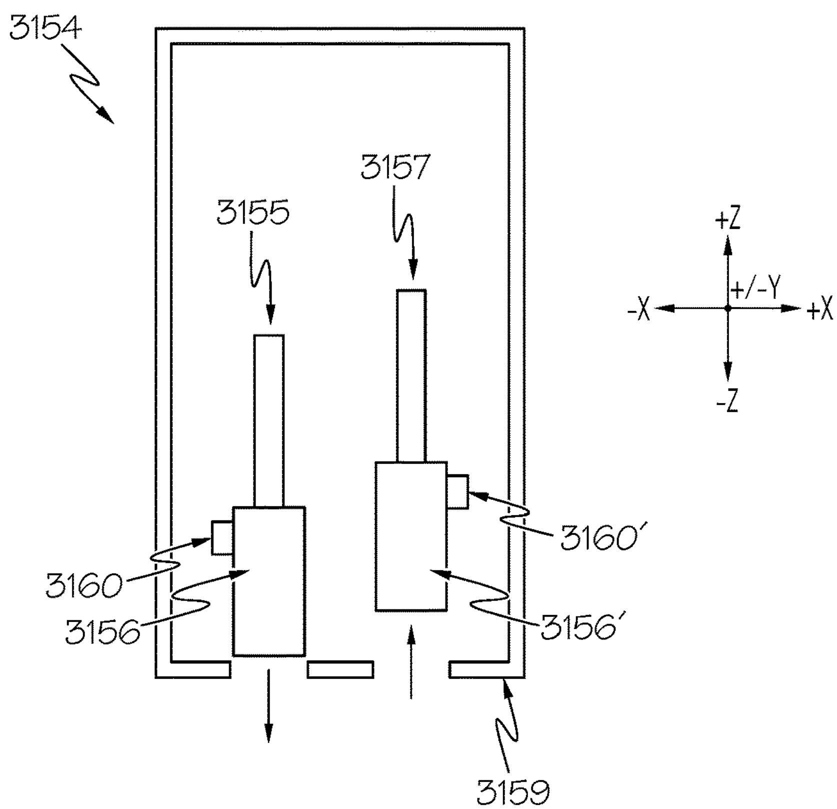
FIG. 68 schematically depicts an embodiment of a printing assembly for a manufacturing apparatus, with a pair of print heads that are longitudinally movable relative to the default elevation according to one or more embodiments shown and described herein.

Referring now to FIG. 68, the first print head 3156' of the first print head row 3155 is moved along the −Z direction of the coordinate axes toward the bottom end 3159 of the printing head 3154 in response to an actuation of the actuator 3160 coupled thereto. The second print head 3156" of the second print head row 3157 is moved along the +Z direction of the coordinate axes away from the bottom end 3159 of the printing head 3154 in response to an actuation of the second actuator 3160' coupled thereto. Although the first print head 3156' and the second print head 3156" are depicted as being translated in opposite directions relative to one another along the +/−Z direction of the coordinate axes, it should be understood that in other embodiments the first print head 3156' and the second print head 3156" may trade positions and/or be moved in similar directions and/or distances.

Although not shown, it should further be understood that in other embodiments the plurality of print heads 3156 of the first print head row 3155 and/or the second print head row 3157 may collectively be coupled to a single actuator 3160, respectively, rather than a plurality of actuators 3160 as shown and depicted herein. In this instance, the plurality of print heads 3156 of the first print head row 3155 and/or the second print head row 3157 are simultaneously movable in unison relative adjacent print heads 3156 within the same print head row 3155, 3157. However, the plurality of print heads 3156 of the first print head row 3155 remains independently movable relative to the plurality of print heads 3156 of the second print head row 3157. In other embodiments, the plurality of print heads 3156 defining the first print head row 3155 and the second print head row 3157 may collectively be coupled to a single actuator 3160 such that both rows 3155, 3157 of print heads 3156 move in unison with one another relative to the support bracket 3152 (see FIG. 58B). It should be understood that other directions, configurations, and orientations of movement of the plurality of print heads 3156 relative to one another and/or of the first print head row 3155 relative the second print head row 3157, and vice versa, may be incorporated with the printing assembly 3150 herein without departing from the scope of the present disclosure.

FIGS. 12-16 schematically depict another embodiment of a three-row printing assembly that includes multiple rows of print heads 3156 disposed within a printing head 3254. It should be understood that the three-row printing assembly of the present example may be readily incorporated into the manufacturing apparatus 3100 described above. It should also be understood that, in many respects, the three-row printing assembly functions substantially similar to the printing assembly 3150 described above. Thus, a version of the apparatus 3100 that is equipped with the three-row printing assembly of the present example may be configured and operable similar to the printing assembly 3150 described above, except for the differences described below. Since the three-row printing assembly is substantially similar to the printing assembly 3150, like reference numerals are used to identify like components. However, the three-row printing assembly is different than the printing assembly 3150 in that the three-row printing assembly includes a printing head 3254 having a third print head row 3256 of a plurality of print heads 3156 disposed therein.

Figure 69:
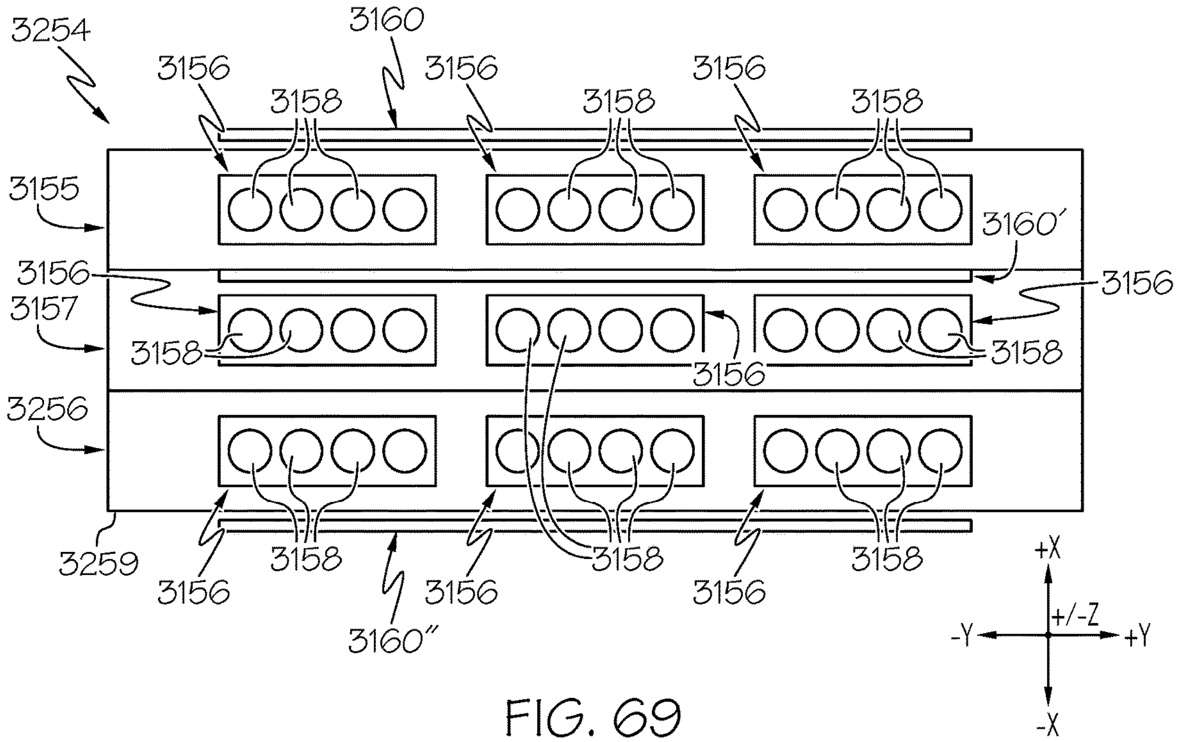
FIG. 69 schematically depicts an embodiment of a printing assembly for a manufacturing apparatus, with three rows of print heads according to one or more embodiments shown and described herein.

Specifically referring to FIG. 69, the plurality of print heads 3156 of the third print head row 3256 are sequentially spaced apart from one another in a direction that is transverse to the working axis 3116 of the apparatus 3100 (i.e., in the +/−Y direction of the coordinate axes of the figures). The plurality of print heads 3156 of the third print head row 3256 is disposed proximate to the second print head row 3157 and relatively distal to the first print head row 3155 in a direction that is parallel to the working axis 3116 of the apparatus 3100 (i.e., in the +/−X direction of the coordinate axes of the figures). In this instance, the second print head row 3157 is disposed between the first print head row 3155 and the third print head row 3256. Each of the plurality of print heads 3156 of the third print head row 3256 comprises a plurality of jet nozzles 3158, respectively, positioned adjacent to a bottom end 3259 of the printing head 3254.

Figure 70:
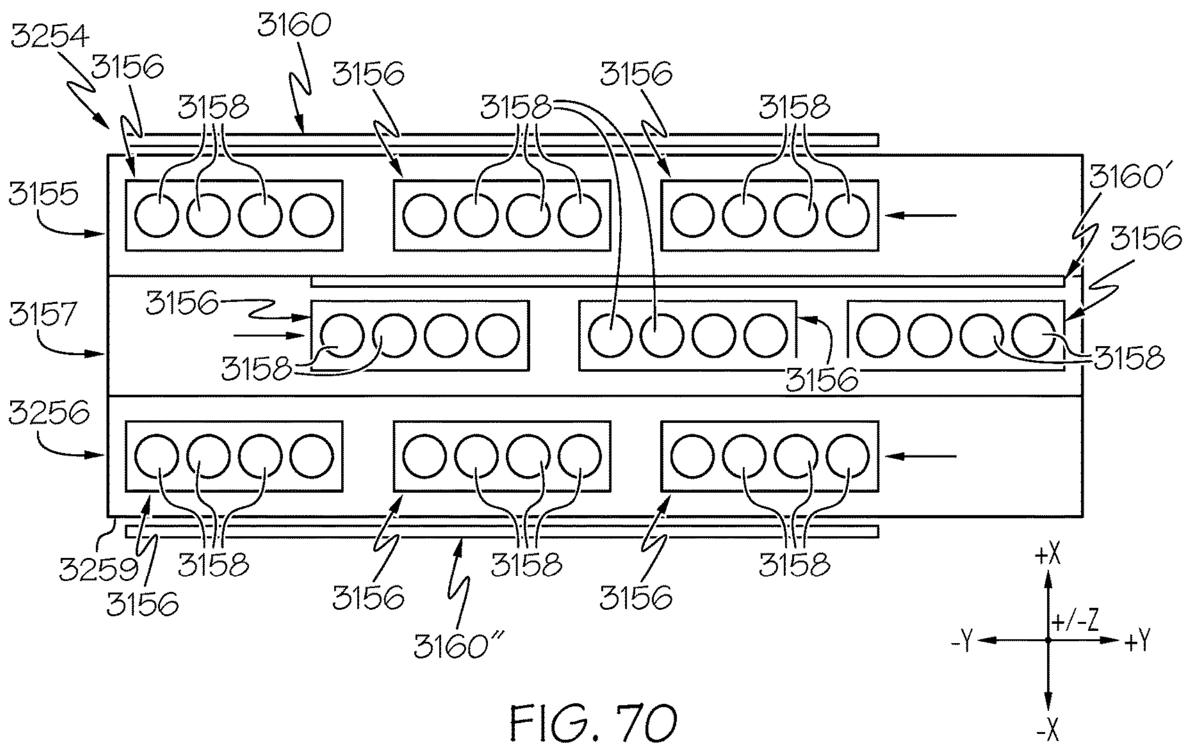
FIG. 70 schematically depicts an embodiment of a printing assembly for a manufacturing apparatus, with three rows of print heads that are movable according to one or more embodiments shown and described herein.

Referring now to FIG. 70, in some embodiments the printing head 3254 of the printing assembly includes a first actuator 3160 coupled to the plurality of print heads 3156 positioned within the first print head row 3155 of print heads 3156, a second actuator 3160' coupled to the plurality of print heads 3156 positioned within the second print head row 3157 of print heads 3156, and a third actuator 3160" coupled to the plurality of print heads 3156 positioned within the third print head row 3256 of print heads 3156. In this instance, the third actuator 3160" is configured to move the plurality of print heads 3156 of the third print head row 3256 in response to an actuation of the third actuator 3160". The plurality of print heads 3156 of the third print head row 3256 move relative to the support bracket 3152 of the printing assembly (See FIG. 58B). In particular, the third actuator 3160" translates the plurality of print heads 3156 of the third print head row 3256 in a direction transverse to the working axis 3116 (i.e., in the +/−Y direction of the coordinate axes depicted in the figures).

Accordingly, actuation of the third actuator 3160" provides a simultaneous translation of the plurality of print heads 3156 defining the third print head row 3256 relative to the plurality of print heads 3156 defining the first print head row 3155 and the second print head row 3157. In this instance, a relative distance between each of the plurality of print heads 3156 of the third print head row 3256 is maintained such that the offset (i.e. spacing) between adjacent print heads 3156 defining the third print head row 3256 is not changed as the third print head row 3256 of print heads 3156 translates. In the present example, the plurality of print heads 3156 of the first print head row 3155 and the plurality of print heads 3156 of the third print head row 3256 are depicted as being moved in the −Y direction of the coordinate axes while the plurality of print heads 3156 of the second print head row 3157 disposed therebetween is depicted as being moved in the +Y direction of the coordinate axes.

It should be understood that the print heads 3156 of the rows may interchangeably trade positions and/or translate to various other lateral degrees than that shown and described herein. In some embodiments, the three rows of print heads 3156 may be collectively coupled to a single actuator 3160 such that the first print head row 3155, the second print head row 3157, and the third print head row 3256 of print heads 3156 are configured to move in unison relative to the support bracket 3152 (See FIG. 58B). In other embodiments, the plurality of print heads 3156 of the first print head row 3155 and/or the second print head row 3157 may not include an actuator coupled thereto such that the first print head row 3155 and/or the second print head row 3157 of the plurality of print heads 3156 are securely fixed relative to the plurality of print heads 3156 of the third print head row 3256.

Figure 71:
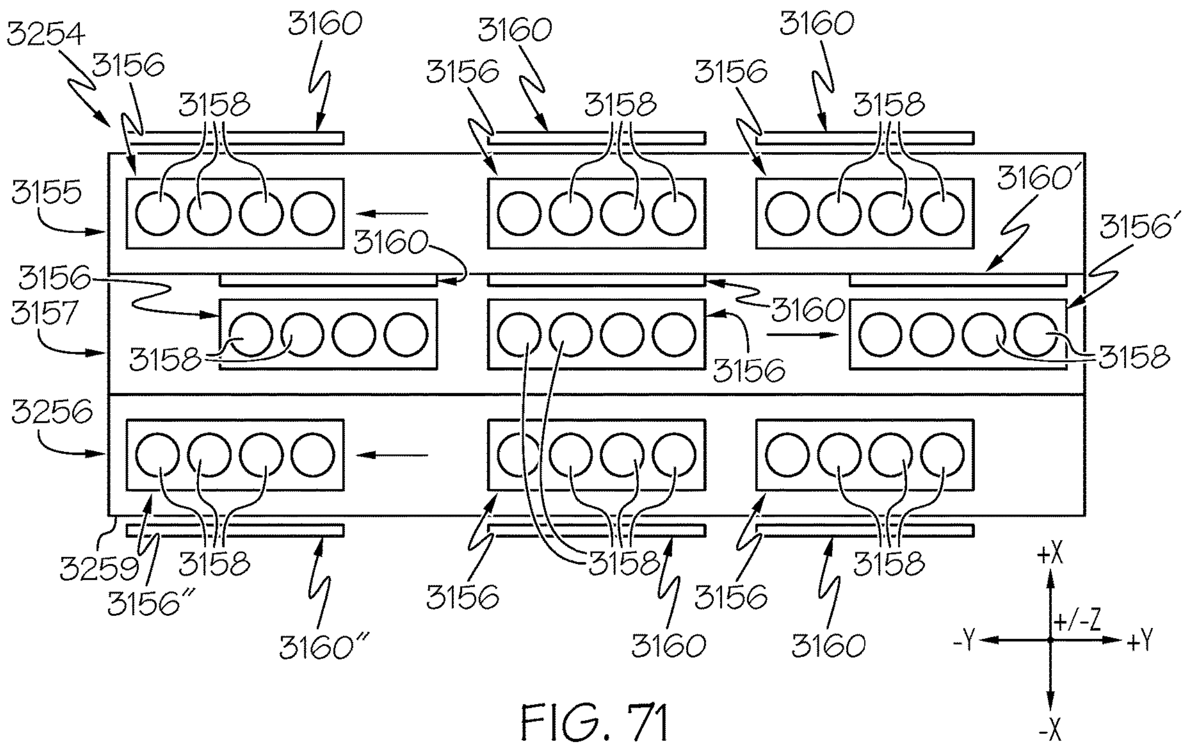
FIG. 71 schematically depicts an embodiment of a printing assembly for a manufacturing apparatus, with three print heads in respective rows that are movable according to one or more embodiments shown and described herein.

Referring now to FIG. 71, in some embodiments the printing head 3254 of the printing assembly includes at least one actuator 3160 coupled to at least one of the plurality of print heads 3156 positioned within the first print head row 3155 of print heads 3156, at least one actuator 3160 coupled to at least one of the plurality of print heads 3156 positioned within the second print head row 3157 of print heads 3156, and at least one actuator 3160 coupled to at least one of the plurality of print heads 3156 positioned within the third print head row 3256 of print heads 3156. In this instance, the actuator (i.e., the first actuator 3160) coupled to the at least one print head 3156 of the first print head row 3155 (i.e., the first print head 3156') is configured to move the first print head 3156' within the first print head row 3155 independent of the plurality of print heads 3156 of the first print head row 3155 and the plurality of print heads 3156 of the second print head row 3157 and the third print head row 3256.

Further, the actuator (i.e., the second actuator 3160') coupled to the at least one print head 3156 of the second print head row 3157 (i.e., the second print head 3156") is configured to move the second print head 3156" within the second print head row 3157 independent of the plurality of print heads 3156 of the second print head row 3157 and the plurality of print heads 3156 of the first print head row 3155 and the third print head row 3256. Similarly, the actuator (i.e., the third actuator 3160") coupled to the at least one print head 3156 of the third print head row 3256 (i.e., the third print head 3156'") is configured to move the third print head 3156'" within the third print head row 3256 independent of the plurality of print heads 3156 of the third print head row 3256 and the plurality of print heads 3156 of the first print head row 3155 and the second print head row 3157.

Still referring to FIG. 71, the first print head 3156', the second print head 3156", and the third print head 3156'" move relative to the support bracket 3152 of the printing assembly (See FIG. 58B). In particular, the actuators 3160, 3160', 3160" translate the print heads 3156, 3156', 3156" in a direction transverse to the working axis 3116 of the apparatus 3100 (i.e., in the +/−Y direction of the coordinate axes depicted in the figures) such that a relative position in the +/−Y direction between the print heads 3156, 3156', 3156" and the support bracket 3152 changes. As will be described in greater detail herein, in some embodiments, a relative distance between the print heads 3156, 3156', 3156" and the adjacent print heads 3156 of another print head row 3155, 3157, 3256 may also be adjusted in response to a translation of the print head 3156, 3156', 3156" within its respective print head row 3155, 3157, 3256.

In the present example, the first print head 3156' of the first print head row 3155 and the third print head 3156'" of the third print head row 3256 are depicted as being moved in the −Y direction of the coordinate axes while the second print head 3156" of the second print head row 3157 disposed therebetween is depicted as being moved in the +Y direction of the coordinate axes. In other embodiments, the first print head 3156' of the first print head row 3155 and/or the second print head 3156" of the second print head row 3157, and the other plurality of print heads 3156 within the print head rows 3155, 3157, respectively, may not include an actuator coupled thereto such that the first print head row 3155 and/or the second print head row 3157 of the plurality of print heads 3156 are securely fixed relative to at least the third print head 3156'" of the third print head row 3256.

Still referring to FIG. 71, in some embodiments the printing head 3254 of the printing assembly includes a plurality of actuators 3160, and in particular at least one actuator 3160 for each of the plurality of print heads 3156 of the first print head row 3155, the second print head row 3157, and the third print head row 3256. In this instance, and as described in greater detail herein, each of the plurality of print heads 3156 of the first print head row 3155, the second print head row 3157, and the third print head row 3256 may move relative to one another in response to an actuation of the respective actuator 3160 coupled thereto. In other words, each of the plurality of print heads 3156 of the first print head row 3155, the second print head row 3157, and the third print head row 3256 are movable independent of one another such that adjacent print heads 3156 may translate in opposite directions and/or at varying degrees (i.e., distances) relative to one another and the support bracket 3152 (See FIG. 58B) along the +/−Y direction of the coordinate axes. As described in greater detail herein, in other embodiments the plurality of print heads 3156 of the first print head row 3155, the second print head row 3157, and/or the third print head row 3256 may not include an actuator coupled thereto, respectively, such that the print head row of the plurality of print heads 3156 is securely fixed relative to one another and relative to the plurality of print heads 3156 of the other rows.

Figure 72:
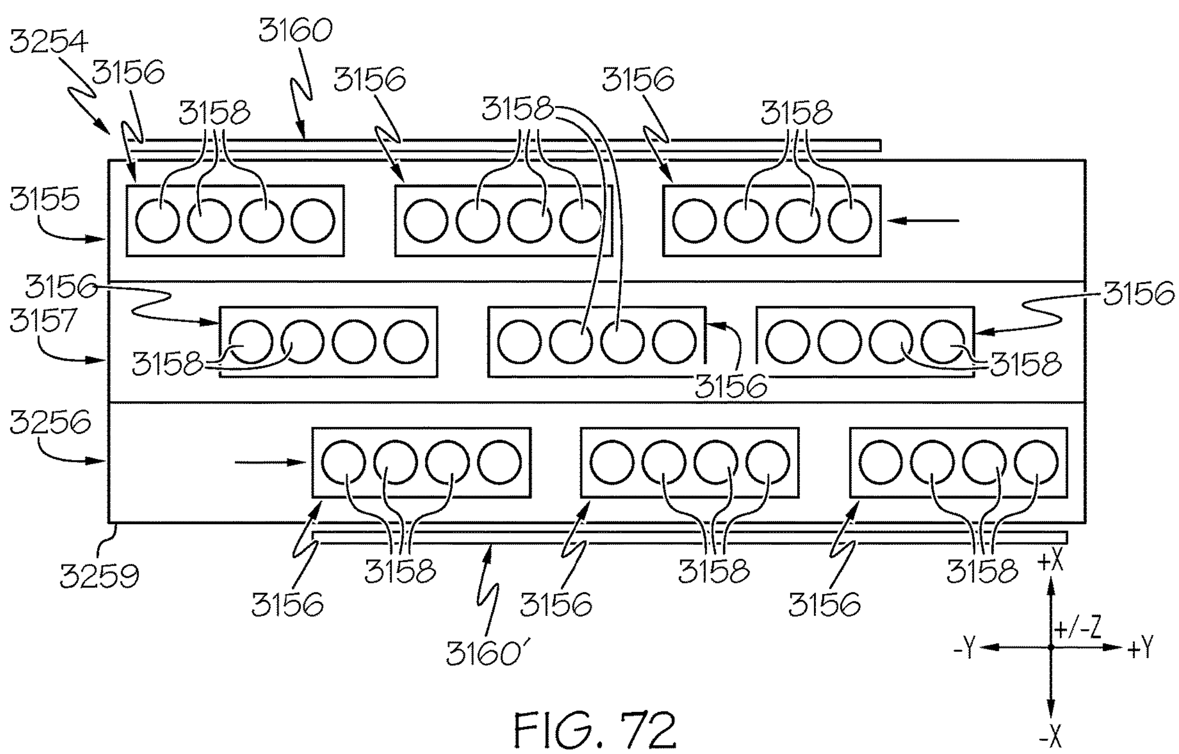
FIG. 72 schematically depicts an embodiment of a printing assembly for a manufacturing apparatus, with a pair of outer rows of print heads that are movable relative to a fixed center row according to one or more embodiments shown and described herein.

Referring now to FIG. 72, in some embodiments at least one of the rows of the plurality of print heads 3156 may not include an actuator 3160 coupled thereto such that the print head row of print heads 3156 is securely fixed relative to the remaining rows. In the present example, the plurality of print heads 3156 of the first print head row 3155 and the plurality of print heads 3156 of the third print head row 3256 include a single actuator 3160 coupled thereto, respectively, while the plurality of print heads 3156 of the second print head row 3157 do not include an actuator 3160. In this instance, the plurality of print heads 3156 of the first print head row 3155 and the plurality of print heads 3156 of the third print head row 3256 are movable relative to the plurality of print heads 3156 of the second print head row 3157. In particular, the actuators 3160 coupled to the first print head row 3155 and the third print head row 3256, respectively, translate the plurality of print heads 3156 of the first print head row 3155 and the third print head row 3256 in a direction transverse to the working axis 3116 of the apparatus 3100 (i.e., in the +/−Y direction of the coordinate axes depicted in the figures) .

Specifically, actuation of the actuators 3160 provides a simultaneous translation of the plurality of print heads 3156 included in each of the first print head row 3155 and the third print head row 3256, respectively, relative to the fixed configuration of the plurality of print heads 3156 of the second print head row 3157. In this instance, a relative distance between each of the plurality of print heads 3156 of the first print head row 3155 and the third print head row 3256 are maintained such that the offset (i.e. spacing) between adjacent print heads 3156 within the respective rows are not changed as the print head rows 3155, 3256 of print heads 3156 translate. In the present example, the plurality of print heads 3156 of the first print head row 3155 are depicted as being moved in the −Y direction of the coordinate axes and the plurality of print heads 3156 of the third print head row 3256 are depicted as being moved in the +Y direction, while the plurality of print heads 3156 of the second print head row 3157 disposed therebetween is depicted as being fixed.

With the first print head row 3155 translated in the −Y direction and the third print head row 3256 translated in the +Y direction, and the second print head row 3157 maintained in a fixed orientation therebetween, an effective printing width of the printing head 3254 may be increased. In other words, with one or more of the print head rows 3155, 3157, 3256 coupled to at least one actuator 3160, the printing head 3154 of the printing assembly may generate a variable printing width that is configured to expand or contract the print head rows 3155, 3157, 3256 as necessary. It should be understood that a direction of translation and/or positions of the first print head row 3155 and the third print head row 3256 may be interchangeable and/or at varying other degrees than that shown and described herein.

Figure 73:
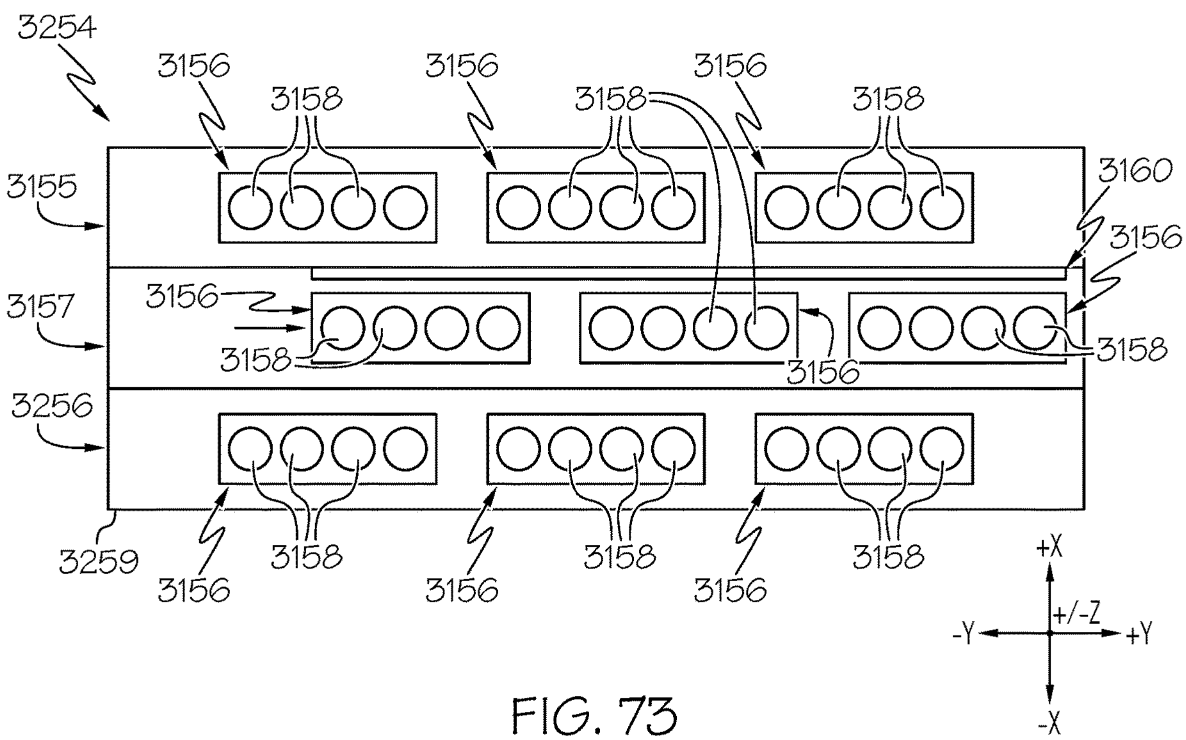
FIG. 73 schematically depicts an embodiment of a printing assembly for a manufacturing apparatus, with a pair of outer rows of print heads that are fixed relative to a movable center row according to one or more embodiments shown and described herein.

Referring now to FIG. 73, in other embodiments the second print head row 3157 of the plurality of print heads 3156 may include the actuator 3160 coupled thereto while the plurality of print heads 3156 of the first print head row 3155 and the third print head row 3256 do not include an actuator 3160, respectively. In this instance, the actuator 3160 is configured to move the plurality of print heads 3156 of the second print head row 3157 simultaneously and independent of the immovable print heads 3156 of the first print head row 3155 and the third print head row 3256. It should be understood that other arrangements and combinations of actuators 3160 coupled to the one or more rows of the printing assembly may be incorporated herein without departing from the scope of the present disclosure. For example, a single actuator 3160 may be coupled to the plurality of print heads 3156 defining all three rows (i.e., the first print head row 3155, the second print head row 3157 and the third print head row 3256) such that actuation of the actuator 3160 provides for a simultaneous translation of all the plurality of print heads 3156 of the printing head 3254 relative to the support bracket 3152 of the printing assembly (See FIG. 58B). It should further be understood that additional rows of print heads 3156 along the printing heads 3154, 3254 may be included in the printing assemblies in other embodiments. Although the multiple rows of the printing assemblies shown and described herein are identified as a first, second, and third row positioned in sequential order relative to one another, it should be understood that a location of the rows of the printing assemblies are interchangeable with one another such that various other arrangements and orientations of the rows may be included within the printing heads 3154, 3254 without departing from the scope of the present disclosure.

In some embodiments, the actuators 3160 of the printing head 3254 are configured to move one or more of the plurality of print heads 3156 of the first print head row 3155, the second print head row 3157, and/or the third print head row 3256 in various other directions other than those shown and described above. For example, the actuators 3160 of the printing head 3254 may be configured to move one or more of the plurality of print heads 3156 of the first print head row 3155, the second print head row 3157, and/or the third print head row 3256 in a direction parallel to the working axis 3116 of the apparatus 3100 (i.e., in the +/−X direction of the coordinate axes depicted in the figures), in another direction transverse to the working axis 3116 (i.e., in the +/−Z direction of the coordinate axes depicted in the figures), and the like. It should be understood that other combinations of printing assemblies including one or more rows of movable and fixed print heads 3156 may be included in the printing head 3254 without departing from the scope of the present disclosure.

Referring now to FIGS. 74A-74G, in some embodiments the actuator 3160 of the printing assembly may comprise a fine actuator, a coarse actuator, and/or both. The fine actuator and the coarse actuator are each configured to move at least one print head 3156, and/or the plurality of print heads 3156, of a particular row (e.g., the first print head row 3155) relative to the support bracket 3152 of the printing assembly in a direction that is transverse to the working axis 3116 of the apparatus 3100 (i.e., in the +/−Y direction of the coordinate axes depicted in the figures). In particular, the fine actuator is operable to move the print head(s) 3156 of the first print head row 3155 at a degree of movement resolution that is greater than a relative degree of movement resolution of the coarse actuator. In other words, the fine actuator is configured to move the plurality of print heads 3156 at a fine movement degree of resolution that provides for precise movement tracking ability with high precision. The coarse actuator is configured to move the plurality of print heads 3156 at a coarse movement degree of resolution that provides for large stroke movement tracking ability with lower precision relative to the fine actuator. It should be understood that in some embodiments a single actuator 3160 may comprise both a fine actuator and a coarse actuator such that the actuator 3160 is operable to move the print heads 3156 of the first print head row 3155 at both a fine movement degree of resolution and coarse movement degree of resolution such that the actuator 3160 provides precise and large stroke movement tracking capabilities.

The fine actuator may comprise various devices, such as, for example, a piezoelectric linear positioner, a mechanical actuator, an electro-mechanical actuator, a pneumatic actuator, a hydraulic actuator, linear stages, a belt-driven actuator, or any other actuator suitable for providing linear motion. The coarse actuator 3164 may comprise various devices, such as, for example, a magnetic linear drive, a mechanical actuator, an electro-mechanical actuator, a pneumatic actuator, a hydraulic actuator, linear stages, a belt-driven actuator, or any other actuator suitable for providing linear motion. It should be understood that although the present examples shown and described herein illustrate the fine actuator and the coarse actuator utilized with the printing assembly 3150, the actuators may similarly be incorporated other printing assemblies that include additional and/or fewer rows of print heads 3156 without departing from the scope of the present disclosure.

The following figures and description provide illustrative examples of printing assemblies including at least one of a fine actuator or coarse actuator and a corresponding movement degree of resolution of a plurality of print heads 3156 defining a print head row 3155 provided by the actuator.

Specifically referring to FIG. 74A, as a first example, the printing assembly 3150 includes a fine actuator 3162 coupled to the first print head row 3155 of the plurality of print heads 3156 and a coarse actuator 3164 coupled to the second print head row 3157 of the plurality of print heads 3156. In this instance, the fine actuator 3162 is configured to move the plurality of print heads 3156 of the first print head row 3155 in a direction that is transverse to the working axis 3116 of the apparatus 3100 at a fine movement degree of resolution. In particular, actuation of the fine actuator 3162 provides for a translation of the plurality of print heads 3156 of the first print head row 3155 in the +Y direction of the coordinate axes of the figures by an incremental distance "A" that is equivalent to approximately one-third of a diameter of a jet nozzle 3158. In other words, the plurality of print heads 3156 of the first print head row 3155 are laterally offset relative to the plurality of print heads 3156 of the second print head row 3157 from a default position to an actuated position, where the lateral offset is approximately one-third a width of a jet nozzle 3158. It should be understood that the fine actuator 3162 may be configured to translate the plurality of print heads 3156 from the default position to an actuated position at various other incremental distances that are greater than or less than the one-third distance "A" and in various other directions than the +Y direction shown and described herein.

Referring to FIG. 74B, as another example, a fine actuator 3162 is coupled to the first print head row 3155 of the plurality of print heads 3156 and is configured to move the plurality of print heads 3156 of the first print head row 3155 in a direction that is transverse to the working axis 3116 at a fine movement degree resolution that is equivalent to an incremental distance "B" that is approximately one-half a diameter of a jet nozzle 3158. In other words, the plurality of print heads 3156 of the first print head row 3155 are laterally offset relative to the plurality of print heads 3156 of the second print head row 3157 by the fine actuator 3162 from a default position to an actuated position, where the lateral offset is approximately one-half a width of a jet nozzle 3158. Although not shown, it should be understood that additional actuators may be included, such as, for example, the coarse actuator 3164 coupled to the first print head row 3155 and/or the second print head row 3157 of the plurality of print heads 3156.

Referring to FIG. 74C, as a further example, a fine actuator 3162 is coupled to the first print head row 3155 of the plurality of print heads 3156 and is configured to move the plurality of print heads 3156 of the first print head row 3155 in a direction that is transverse to the working axis 3116 at a fine movement degree resolution that is equivalent to an incremental distance "C" that is approximately one full diameter of a jet nozzle 3158. In other words, the plurality of print heads 3156 of the first print head row 3155 are laterally offset relative to the plurality of print heads 3156 of the second print head row 3157 by the fine actuator 3162 from a default position to an actuated position, where the lateral offset is approximately a full width of a jet nozzle 3158. It should be understood that the fine actuator 3162 is configured to translate the plurality of print heads 3156 from the default position to an actuated position at various other incremental distances that may be greater than or less than those shown and described herein and/or in various other directions. Although not shown, it should be understood that additional actuators may be included, such as, for example, the coarse actuator 3164 coupled to the first print head row 3155 and/or the second print head row 3157 of the plurality of print heads 3156.

Referring now to FIG. 74D, the printing assembly 3150 includes a coarse actuator 3164 coupled to the first print head row 3155 of the plurality of print heads 3156. In this instance, the coarse actuator 3164 is configured to move the plurality of print heads 3156 of the first print head row 3155 in a direction that is transverse to the working axis 3116 of the apparatus 3100 at a coarse movement degree of resolution. In particular, actuation of the coarse actuator 3164 provides for a translation of the plurality of print heads 3156 of the first print head row 3155 in the +Y direction of the coordinate axes of the figures by an incremental distance "D" that is equivalent to approximately one-half a width of a print head 3156. In other words, the plurality of print heads 3156 of the first print head row 3155 are laterally offset relative to the plurality of print heads 3156 of the second print head row 3157 from a default position to an actuated position, where the lateral offset is approximately half a width of a print head 3156. It should be understood that the coarse actuator 3164 is configured to translate the plurality of print heads 3156 from the default position to an actuated position at various other incremental distances that are greater than or less than the one-half distance "D" and/or in various other directions other than the +Y direction shown and described herein. Although not shown, it should be understood that additional actuators may be included, such as, for example, the fine actuator 3162 coupled to the first print head row 3155 and/or the second print head row 3157 of the plurality of print heads 3156.

Referring to FIG. 74E, as another example, a coarse actuator 3164 is coupled to the first print head row 3155 of the plurality of print heads 3156 and is configured to move the plurality of print heads 3156 of the first print head row 3155 in a direction that is transverse to the working axis 3116 at a coarse movement degree resolution. In the present example, the coarse movement degree resolution is equivalent to an incremental distance "E" that is approximately a full width of a print head 3156. In other words, the plurality of print heads 3156 of the first print head row 3155 are laterally offset relative to the plurality of print heads 3156 of the second print head row 3157 by the coarse actuator 3164 from a default position to an actuated position, where the lateral offset is approximately one width of a print head 3156. Although not shown, it should be understood that additional actuators may be included, such as, for example, the fine actuator 3162 coupled to the first print head row 3155 and/or the second print head row 3157 of the plurality of print heads 3156.

Referring to FIG. 74F, as a further example, a coarse actuator 3164 is coupled to the first print head row 3155 of the plurality of print heads 3156 and is configured to move the plurality of print heads 3156 of the first print head row 3155 in a direction that is transverse to the working axis 3116 at a coarse movement degree resolution. In the present example, the coarse movement degree resolution is equivalent to an incremental distance "F" that is approximately 1.5× a width of a print head 3156. In other words, the plurality of print heads 3156 of the first print head row 3155 are laterally offset relative to the plurality of print heads 3156 of the second print head row 3157 by the coarse actuator 3164 from a default position to an actuated position, where the lateral offset is approximately 150% a width of a print head 3156. Although not shown, it should be understood that additional actuators may be included, such as, for example, the fine actuator 3162 coupled to the first print head row 3155 and/or the second print head row 3157 of the plurality of print heads 3156.

Referring to FIG. 74G, as another example, a coarse actuator 3164 is coupled to the first print head row 3155 of the plurality of print heads 3156 and is configured to move the plurality of print heads 3156 of the first print head row 3155 in a direction that is transverse to the working axis 3116 at a coarse movement degree resolution. In the present example, the coarse movement degree resolution is equivalent to an incremental distance "G" that is approximately a width of two print heads 3156. In other words, the plurality of print heads 3156 of the first print head row 3155 are laterally offset relative to the plurality of print heads 3156 of the second print head row 3157 by the coarse actuator 3164 from a default position to an actuated position, where the lateral offset is approximately 200% a width of a print head 3156. It should be understood that the coarse actuator 3164 is configured to translate the plurality of print heads 3156 from the default position to an actuated position at various other incremental distances that may be greater than or less than those shown and described herein and/or at various other directions. Although not shown, it should be understood that additional actuators may be included, such as, for example, the fine actuator 3162 coupled to the first print head row 3155 and/or the second print head row 3157 of the plurality of print heads 3156.

Referring now to FIGS. 75A-75B in conjunction with the flow diagram of FIG. 81, an exemplary method 3300 of actuating the multiple print head rows 3155, 3157 of the printing assembly 3150 as the manufacturing apparatus 3100 builds an object is schematically depicted. More specifically, movement of the multiple print head rows 3155, 3157 of the plurality of print heads 3156 for depositing binder material 3050 and/or other materials 3114, 3115 along the build area 3120 serves to reduce an occurrence of a resolution defect on the printed object or part during the image transfer process due to lack of jetting redundancy. The depiction of FIGS. 75A-75B and 81, and the accompanying description below, is not meant to limit the subject matter described herein or represent an exact description of how materials may be deposited from the printing assembly 3150, but instead is meant to provide a simple schematic overview to illustrate the general movement of multiple print head rows 3155, 3157 of print heads 3156 of the printing assembly 3150 to improve jetting redundancy as described herein.

Referring to FIG. 75A and at step 3302, the computer readable and executable instructions stored within the non-transitory memory of the control system 3010, when executed by the processor of the control system 3010, transmits a signal to the first actuator assembly 3102 to initiate movement of the printing assembly 3150 across the build area 3120 in a first pass. In particular, the printing assembly 3150 translates across the rail 3104 of the apparatus 3100 and along the working axis 3116 (see FIG. 58A) thereby moving the printing head 3154 over the build area 3120 in the +X direction of the coordinate axes of the figures. The control system 3010 transmits a signal to the plurality of print heads 3156 of the first print head row 3155 and the second print head row 3157 to release a material from the plurality of jet nozzles 3158 as the printing head 3154 of the printing assembly 3150 moves over the build area 3120. The material (e.g., the binder material 3050, the first material 3114 from the first fluid reservoir 3110, the second material 3115 from the second fluid reservoir 3112, and the like) is transferred to the printing head 3154 and deposited onto the build area 3120 through the plurality of jet nozzles 3158 of the plurality of print heads 3156 in both the first print head row 3155 and the second print head row 3157.

In the present example, the plurality of print heads 3156 of the first print head row 3155 and the plurality of print heads 3156 of the second print head row 3157 deposit material along the build area 3120. Accordingly, each of the plurality of jet nozzles 3158 of the plurality of print heads 3156 from the first print head row 3155 and the second print head row 3157 may be mapped to trajectory across the build area 3120. The trajectory defines a plurality of pixels that may or may not receive binder deposited from one or more of the plurality of jet nozzles 3158 as the printing assembly 3150 traverses the build area 3120. It should be understood that a "pixel" refers to a 2-dimensional spatial portion of the object or part to-be-printed by the apparatus 3100, and in particular a current slice or layer of the three-dimensional part relative to its positioning along the build area 3120. Similarly, it is understood that a "voxel" refers to a 3-dimensional spatial portion of the build material that is combined with binder forming a physical portion of the component printed by the apparatus 3100. In some embodiments, a plurality of pixels and/or voxels defining spatial portions of the build material 3040 within the build area 3120 may be defined based on a digital build file (e.g., defining deposition patterns and/or apparatus control instructions stored and/or uploaded to the control system 3010) of the component to be built by the apparatus 3100. The pixels per layer of a build may be defined along to a trajectory the printing assembly 3150 is configured to traverse over the build area 3120. Accordingly, the control system 3010 may map one or more jet nozzles to a trajectory and the corresponding design deposition pattern for the current layer of the build such that the jet nozzles deposit prescribed drop volumes of binder at prescribed locations on the build material 3040 in the build area 3120. When the printing assembly 3150 and/or print heads 3156 are shifted, to achieve sub-pixel printing and/or jetting redundancy, the control system 3010 remaps trajectory-to-jet nozzle relationships so that the design deposition pattern defining the binder to be applied to the build material is associated with the new jet nozzles aligned with their new trajectories across the build area 3120 in response to indexing operations.

Still referring to FIG. 75A, the computer readable and executable instructions, when executed by the processor of the control system 3010 determines whether the printing assembly 3150 has reached a translated position 3253 located in the +/−X direction at or past an edge of the build area 3120 where material is to be deposited by the printing assembly 3150 in the first pass. The control system 3010 determines whether the printing assembly 3150 has reached the translated position 3253 by, for example, monitoring a relative position of the printing assembly 3150 along the rail 3104 as the printing assembly 3150 translates along the working axis 3116 of the apparatus 3100 (i.e., +X direction of the coordinate axes of the figures) to the translated position 3253. In response to determining that the printing assembly 3150 is not positioned at the translated position 3253, the control system 3010 transmits a signal to the first actuator assembly 3102 to continue translating the printing assembly 3150 across the build area 3120 at step 3302. The control system 3010 further transmits a signal to the printing assembly 3150 to continue releasing material from the plurality of jet nozzles 3158 of the print heads 3156 of the first print head row 3155 and the second print head row 3157.

Alternatively, in response to determining that the printing assembly 3150 is positioned at the translated position 3253, the computer readable and executable instructions, when executed by the processor of the control system 3010 transmits a signal to the printing assembly 3150 to terminate release of material from the plurality of jet nozzles 3158 of the print heads 3156 of the first print head row 3155 and the second print head row 3157. Additionally and/or simultaneously, the control system 3010 transmits a signal to the first actuator assembly 3102 to terminate movement of the printing assembly 3150 along the working axis 3116 by ceasing actuation of the first actuator assembly 3102. With the printing assembly 3150 positioned at the translated position 3253, the plurality of pixels along the build area 3120 have received material thereon from at least the first print head row 3155 or the second print head row 3157 during the first pass of the printing assembly 3150 over the build area 3120 in the +X direction of the coordinate axes.

Referring now to FIG. 75B and at step 3304, the control system 3010 determines whether an additional layer of material (e.g., binder) is to be deposited and/or released from the printing assembly 3150. This determination by the control system 3010 may be performed via various means and/or systems, such as, for example, by referring to a part to be built with the apparatus 3100, by user input, image sensors, weight sensors, and the like. In response to determining that an additional layer of material (e.g., binder) is not to be released from the printing assembly 3150 at step 3304, the control system 3010 transmits a signal to the apparatus 3100 to end the additive manufacturing process of method 3300 at step 3306.

Alternatively, in response to determining that an additional layer of material (e.g., binder) is to be deposited from the printing assembly 3150 at step 3304, the computer readable and executable instructions, when executed by the processor of the control system 3010 transmits a signal to the actuator(s) 3160 of the printing assembly 3150 to actuate at least one of the plurality of print heads 3156 of the first print head row 3155 and/or the second print head row 3157 relative to the support bracket 3152 of the printing assembly 3150 (See FIG. 58B) at step 3308. In particular, actuation of at least one actuator 3160 that is coupled to at least one of the first print head row 3155 and/or the second print head row 3157 of the plurality of print heads 3156 provides for a translation of the print heads 3156 of said row relative to at least the other row of print heads 3156 in a direction that is transverse to the working axis 3116 of the apparatus 3100 (i.e., +/−Y direction of the coordinate axes of the figures). In the present example, the printing assembly 3150 includes one actuator 3160 coupled to the first print head row 3155 of print heads 3156 and one actuator 3160 coupled to the second print head row 3157 of print heads 3156, such that both print head rows 3155, 3157 are movable relative to one another and relative the support bracket 3152 of the printing assembly 3150.

Still referring to FIG. 75B, the plurality of jet nozzles 3158 of each of the plurality of print heads 3156 included in the first print head row 3155 and the second print head row 3157 is repositioned from a default position to an actuated position (e.g., to an indexed position) that differs from the default position by at least some incremental distance (e.g., incremental distances “A”-“G” of FIGS. 74A-74G). Accordingly, during a second pass (i.e., either a return pass over a current layer of powder or a pass over a new layer of powder applied on top of the previous layer) of the printing assembly 3150 over the build area 3120, at least some of the pixels positioned along the build area 3120 will receive material from at least one jet nozzle 3158 that is different from the jet nozzle 3158 that was mapped to deposited material to said pixel during the first pass.

In some embodiments, during a first pass a first pixel receives binder from a first jet nozzle 3158, while during a second pass the first pixel receives binder from a second jet nozzle 3158 as a result of a repositioning of one or more of the print heads 3156 between the passes. In some instances, the first pass may be configured to deposit a first amount of binder, which is a portion of a total amount prescribed for a portion of powder within a current layer to receive, and the second pass may be configured to deposit a second amount of binder that is the remainder amount of binder prescribed for a portion of powder within the current layer to receive. As described above, delivery of the first amount of binder may be accomplished by a first jet nozzle 3158, while the delivery of the second amount of binder may be accomplished by a second jet nozzle 3158.

It should be understood that lateral movement of the print heads 3156 of the first print head row 3155 and/or the second print head row 3157 relative to one another, and relative to a prior position of said print head rows 3155, 3157 from the default position, provides an enhanced jetting redundancy in the manufacturing process by increasing a reliability that a complete resolution of each of the plurality of pixels on the build area 3120 receives an adequate deposition of material thereon.

It should be understood that in some embodiments movement of the print head rows 3155, 3157 of print heads 3156 at step 3308 may be at an arbitrary fraction, where the control system 3010 transmit a signal to the actuators 3160 to move the first print head row 3155 and/or the second print head row 3157 of print heads 3156 to a randomly generated position relative to one another. In this embodiment, a jetting redundancy by the printing assembly 3150 is passively provided through the repositioning of the plurality of print heads 3156 of each print head row 3155, 3157 in an uncalculated manner such that the plurality of pixels along the build area 3120 are effectively aligned with a randomly aligned jet nozzle 3158 during a second pass of the printing assembly 3150.

In other embodiments, movement of the print head rows 3155, 3157 relative to one another, and relative to a prior position of said print head rows 3155, 3157 during a first pass of the printing assembly 3150, may be predetermined to predefined locations by the control system 3010. In this instance, the compute readable and executable instructions, when executed by the processor of the control system 3010, transmits a signal to the actuators 3160 to move the first print head row 3155 and/or the second print head row 3157 of print heads 3156 to a measured position that varies relative to a prior position of the print head rows 3155, 3157 during the first pass. In this embodiment, a jetting redundancy by the printing assembly 3150 is actively provided through the repositioning of the plurality of print heads 3156 of each print head row 3155, 3157 in a calculated manner such that the plurality of pixels along the build area 3120 are specifically aligned with a jet nozzles 3158 during a second pass of the printing assembly 3150 that is intentionally varied from the first pass. For example, the control system 3010 may transmit a signal to the actuators 3160 coupled to the print head rows 3155, 3157, respectively, to translate the print heads 3156 of the print head rows 3155, 3157 in a manner such that the print head rows 3155, 3157 trade positions relative to one another.

The control system 3010 may determine the calculated positions of the plurality of print heads 3156 of the print head rows 3155, 3157 through various systems, such as, for example, a camera image, a sensor output, a calibration pattern, and the like. In either instance, movement of the print head rows 3155, 3157 of print heads 3156 for a second pass (i.e., either a return pass over a current layer of powder or a pass over a new layer of powder applied on top of the previous layer) of the printing assembly 3150 provides an enhanced, material jetting redundancy of the manufacturing process by increasing a reliability that a complete resolution of each of the plurality of pixels on the build area 3120 receives an adequate deposition of material thereon from more than one jet nozzle 3158. It should be understood that in other embodiments movement of the plurality of print heads 3156 of the first print head row 3155 and/or the second print head row 3157 may occur prior to a first pass of the printing assembly 3150 over the build area 3120 at step 3302.

Turning now to FIGS. 78A-79B, further embodiments and functionality of the apparatus 3100 are depicted and described. For example, FIGS. 78A to 78E depict and describe a technique implementing sub jet-spacing indexing of the printing assembly to enable a low resolution print head to operate and deliver material such as binder to powder layers with an increased resolution that further improves green strength uniformity and more refined geometries of a built component. Binder jet printing generally applies binder in discrete increments due to the discretely fixed geometry of the inkjet head configured to dispense binder. However, embodiments described herein provide systems and methods that remove the limitation of the inkjet head geometry by enabling longitudinal and latitudinal motion control and grayscaling-based sub-pixel deposition of binder onto the build material 3040 (FIG. 58B) (e.g., powder).

In one instance, an apparatus may be equipped with print heads 3156 configured to deliver a drop of binder material in 400 DPI (dots per inch) intervals along a latitudinal axis. However, by enabling the printing assembly 3150 with a second actuator assembly 3103, the printing assembly may be configured to deliver drops of binder material in much finer increments over subsequent passes along the longitudinal axis by implementing sub-pixel index distances of the printing assembly 3150. For example, a 400 DPI print head may be configured to dispense drops of binder between two passes along the longitudinal axis by implementing a sub jet-spacing index of the printing assembly 3150 of about one-half a jet-spacing achieving the equivalence of an 800 DPI print head.

In other words, the space between adjacent jet nozzles 3158 is fixed therefore there is a fixed spacing between placement of binder across a layer of powder in a single pass. However, by implementing a mechanical shift (e.g., referred to herein as an "index" along the latitudinal axis) of the printing assembly 3150, a corresponding index of the jet nozzles 3158 is achieved and a second deposition of binder on the same layer or a subsequent layer of powder may be performed thereby increasing the resolution in which binder may be deposited. Correspondingly, build instructions generated for building the component may define pixels having sub-pixels with a higher resolution than the mechanical resolution defined by the jet-spacing (d). Jet-spacing (d) is the center-to-center lateral distance between adjacent jets in the same row of the same print head.

To achieve printing of a higher resolution design deposition pattern (e.g., 3125 FIG. 78C) as compared to the mechanical resolution defined by the jet-spacing (d) of the printing assembly, latitudinal indexing of the printing assembly 3150 between passes over the build area 3120 are implemented as shown and described herein.

In further embodiments, the implementation of a second actuator assembly 3103 configured to index the printing assembly 3150 along a latitudinal axis enables methods of random redundancy within a build to reduce or remove a compounding effect of a malfunctioning jet. Such embodiments, will be described in more detail with reference to FIGS. 79A-79B.

Suitable actuators may include, without limitation, linear stages, worm drive actuators, ball screw actuators, pneumatic pistons, hydraulic pistons, electro-mechanical linear actuators, or the like. By way of example, the second actuator assembly 3103 may comprise a linear stage actuator such as a 150 MM linear motor stage with at least a 4 um accuracy. In some instances, the first actuator assembly 3102 and/or the second actuator assembly 3103 may include a position sensor **3102*a* and/or 3103*a*, respectively, that provides the electronic control unit with position information in a feedback control signal such that the electronic control unit may track the position of the printing assembly 3150 in response to the provided control signals. In some instances, the electronic control unit may make adjustments to the control signal provided to the first actuator assembly 3102 and/or the second actuator assembly 3103 based on the position information provided by the position sensor 3102*a* and/or 3103*a*. In embodiments, the position sensor 3102*a* and/or 3103*a* may be an encoder, an ultrasonic sensor, a light-based sensor, a magnetic sensor, or the like embedded in or coupled to the first actuator assembly 3102 and/or the second actuator assembly 3103**.

Turning now to FIGS. 78A-78E, a printing assembly 3150 is depicted as implemented with a second actuator assembly 3103 for latitudinal axis indexing. Similar to the functionality described with reference to FIGS. 74A-74G the printing assembly 3150 may be configured to be indexed (e.g., moved laterally with respect to the latitudinal axis) along with offsetting one or more of the plurality of print heads 3156 using actuator(s) or independently from the whether or not the plurality of print heads 3156 are movable or moved. That is, in some embodiments, the printing assembly 3150 is moveably coupled to the support bracket 3152 via a second actuator assembly 3103. The second actuator assembly 3103, when instructed, for example, by the electronic control unit, moves the printing assembly 3150 along a latitudinal axis by an index distance. As described in more detail herein, the term "index distance" may refer to a fractional amount of a jet-spacing (d), an integer multiple of a fractional jet-spacing (d), or a multiple of the jet-spacing (d) (e.g., 1.1×, 1.2×, 1.3×, 1.4×, 1.5×, 1.6×, 1.7×, 1.8×, 1.9×, 2×, 3×, 4×, 5×, 6×, 7×, 8×, 9×, 10×, 50×, 75×, 100×, 200×, 500×, or more jet-spacing (d) units). In some embodiments, the index distance may be, for example, 1 mm, 2 mm, 3 mm, 4 mm, 5 mm, 6, mm, 7 mm, 8 mm, 9 mm, 10 mm, 11 mm, 12 mm, 13 mm, 14 mm, 15 mm, 16 mm, 17 mm, 18 mm, 19 mm, 20 mm, or more or an value between 1.1× and 500× or more. In some embodiments, the index distance may be 5 mm to 20 mm or any value therebetween.

As referenced above the space from one jet nozzle 3158 to an adjacent jet nozzle 3158 defines a jet-spacing (d) which correlates to the an image pixel. To increase the resolution of a deposition pattern (e.g., 3125, 3126, or 3127, FIGS. 78C-78E, respectively) of binder across the build material (e.g., powder) on the build area 3120 having a layer of powder, the second actuator assembly 3103 may index the printing assembly 3150 comprising a plurality of print heads 3156 and plurality of jets by a sub jet-spacing index distance between subsequent passes to and fro along the longitudinal axis.

For example, for a first pass along the working axis (i.e., longitudinal axis) the printing assembly 3150 may be indexed at a position $I_0$ and a second pass, for example, in the opposite direction to the first pass may be indexed to a position $I_1$ as depicted in FIGS. 78A and 78B. The index distance (i.e., the distance from position $I_0$ to position $I_1$ may be a non-integer multiple of the jet-spacing (d), for example, $\frac{1}{10}$×, $\frac{1}{5}$×, $\frac{1}{4}$×, $\frac{1}{3}$×, $\frac{1}{2}$×, or any distance greater than zero and less than the jet-spacing (d).

FIG. 78C depicts a top down view of a build area 3120 having a layer of powder (e.g., build material 3040) deposited therein and an illustrative representation of a design deposition pattern 3125 defining the pixels 3180 and sub-pixels 3181A-3181F a numerical value depicting the a drop volume illustrating a grayvalue amount of binder for deposition at predefined locations. As used herein, "grayvalue" refers to the integer multiple of a smallest unit of drop volume achievable for the print head. FIG. 78C further depicts a printing assembly 3150 having a plurality of jet nozzles 3158-1 to 3158-8. The printing assembly 3150 located at the top of the figure is positioned at position $I_0$ with the plurality of jet nozzles 3158-1 to 3158-8 mapped to traverse a first pass trajectory across the build area 3120. The printing assembly 3150 located at the bottom of the figure has been index an index distance to position $I_1$ with the plurality of jet nozzles 3158-1 to 3158-8 mapped to traverse a second pass trajectory across the build area 3120.

The center location of a pixel 3180 and an adjacent pixel corresponds to the jet-spacing (d) of one jet nozzle 3158 to an adjacent jet nozzle 3158. Whereas the center of a sub-pixel 3181A-3181F may be defined within the build instructions as an incremental amount of the jet-spacing (d), thus optionally defining one or more sub-pixel centers 3181A-3181F within a pixel 3180. The sub-pixels 3181A-3181F may further be assigned a drop volume of binder for deposition by a jet nozzle 3158 during a build operation. The size (or foot print) of the sub-pixel may depend on the drop volume of a droplet of binder to be deposited on the corresponding portion of the layer of powder (e.g., build material 3040) that the center of the sub-pixel 3181A-3181F maps to according to the design deposition pattern 3125. In some embodiments, the size sub-pixel may be based on the speed the printing assembly 3150 traverses the build area 3120, the nature or type of the build material 3040 (FIG. 58B), the temperature of the build environment, and the like.

Still referring to FIG. 78C, a sub jet-spacing index distance of the printing assembly 3150 is implemented between a first pass and a second pass to deposit binder with an increased resolution across the layer of powder within the build area 3120. As depicted, a portion of the build material 3040 on the build area 3120 corresponding to a pixel 3180 defined in the deposition pattern 3125 receives a first volume of binder along a first pass trajectory within a first sub-pixel 3181B and a second volume of binder within second sub-pixel 3181E along a second pass trajectory that is indexed from the first pass trajectory by an index distance greater than zero and less than the jet-spacing (d). The binder droplet makes a spot that has a size or diameter with the build material 3040 that corresponds to the jet nozzle 3158 as it traverses the build area 3120. However, in some instances the release of a binder droplet from a jet nozzle 3158 must account for the speed at the printing assembly 3150 is moving because as the droplet travels from the jet nozzle 3158 to the build material 3040 the trajectory of the droplet includes a velocity vector in the direction of the printing assembly 3150 as well as a velocity component in the direction from the jet nozzle to the build material. That is, compensation with respect to where binder is released with respect to where it is expected to impact the build material may be needed depending on the speed at which the printing assembly 3150 traverses the build area 3120.

Turning to FIG. 78D, an illustrative applied deposition pattern 3125A resulting from the deposition of binder according to the design deposition pattern depicted in FIG. 78C is depicted. As the binder disperses within the build material 3040, the binder may overlap with binder and powder within adjacent sub-pixels. Additionally, as the binder disperses, the binder may seep and/or wick into and/or throughout a volume of the porous layer of powder defining a voxel 3030 (FIG. 58A). Depending on the drop volume of the droplet of binder, the thickness (depth along the Z-axis) of the layer of powder, the density of the powder and other variables, the binder may disperse into lower layers of powder further curing a lower layer to an upper layer. It is understood that once the binder finishes wicking and/or curing that the part While a predefined amount of binder for a pixel may be deposited at once within a pixel during a single pass, by dividing the predefined amount of binder for a pixel up into one or more sub-pixel regions during one or more passes of the printing assembly 3150 with indexing of the printing assembly 3150 between passes binder may be more uniformly integrated with neighboring voxels of build material (e.g., powder) in the build area 3120.

Referring to FIG. 78E, another illustrative build area 3120 is depicted where the same drop volumes per pixel 3180 depicted in FIG. 78C are now dispensed using a multiple smaller drop volumes of binder at varying locations within the pixel 3180. For example, in FIG. 78C, the design deposition pattern 3125 prescribes one large drop volume (3) in a single location as shown in sub-pixel 3182B whereas the design deposition pattern 3126 depicted in FIG. 78E for the same layer of a build instead now defines the three smaller drop volumes of binder for placement in three different sub-pixels 3182A-3182C within the pixel 3180 during traversal of a first pass trajectory of the printing assembly 3150. The three smaller drops may each be ⅓ the volume of one large volume drop. In other words, the 3-unit drop volume defined for dispensing in one location within a pixel may be allocated into 1-unit drop volumes whose centers are at three different locations within the same pixel as evidenced when comparing the deposition pattern 3125 of FIG. 78C with the deposition pattern 3126 of FIG. 78E. The size or amount of binder dispensed may be proportional to volume of the voxel defined, in part, by the pixel, which may also be referred to as the region of influence of a drop in the powder. The amount of binder dispensed for a particular pixel may be determined based on the desired saturation of the particular pixel. The desired saturation of a particular pixel may be determined based on the location of the pixel with respect to the edge of a component that is being built and/or the number of vertically adjacent layers to be built on top of the particular pixel.

Turning to FIG. 78F, an illustrative applied deposition pattern 3126A resulting from the deposition of binder according to the design deposition pattern depicted in FIG. 78D is depicted. Again, as the binder disperses within the build material 3040, the binder may overlap with binder and powder within adjacent sub-pixels. Additionally, as the binder disperses, the binder may seep and/or wick into and/or throughout a volume of the porous layer of powder defining a voxel 3030 (FIG. 58A). Depending on the drop volume of the droplet of binder, the thickness (depth along the Z-axis) of the layer of powder, the density of the powder and other variables, the binder may disperse into lower layers of powder further curing a lower layer to an upper layer. When viewing the applied deposition pattern 3126A of FIG. 78F with the applied deposition pattern 3125A of FIG. 78D, it can be observed that a more uniform distribution of binder may be achieved by further varying the drop volume and drop location, which is possible because the jet nozzles may be indexed by sub jet-spacing index distances between passes. It is understood that indexing of the jet nozzles may be accomplished by indexing individual print heads and/or indexing the printing assembly 3150.

More specifically, this is accomplished by the fine and coarse motion control of the printing assembly provided by the printing head position control assembly comprising a first actuator assembly 3102 configured to move the printing head along the longitudinal axis and a second actuator assembly 3103 configured to move the printing head along a latitudinal axis. FIG. 78G provides yet another example of a deposition pattern of binder material over the build area 3120 using a combination of large and small drops at varying locations within the pixel.

In further embodiments of the apparatus, the printing assembly 3150 may be indexed between passes over a single layer of powder or between layers of powder to randomize the location of a jet nozzle 3158 or print head 3156 that may be malfunctioning. The indexing may be accomplished by moving the printing assembly 3150 along the latitudinal axis with the second actuator assembly 3103. The indexing motion of the printing assembly 3150 may be predetermined by the slicing engine when determining the deposition pattern for building the component or on-the-fly by the electronic control unit of the apparatus when, for example, a malfunctioning jet nozzle 3158 or print head 3156 is detected. An advantage of predefining the random indexing of the printing assembly 3150 with the slicing engine is that the association of a jet nozzle 3158 with various a trajectories along the longitudinal axis may be known through a build process of a component. For example, a history of jet nozzle 3158 and trajectory alignment for each pass during a build process may be generated and used for post-production analysis of a component should one or more jet nozzles or print heads is determined to have malfunctioned during the build.

As used herein, the term "predefined random index" or "predefined random indexing" refers to the randomized indexing values defined by the slicing engine when developing the executable instructions for the apparatus to execute during a build. Furthermore, the term "predefined" refers to the prior planning of indexing the printing assembly 3150 by the slicing engine and the term "random" refers to the aspect that the amount a printing assembly 3150 is indexed, in one instance, may be different from the amount the printing assembly 3150 is indexed in a second instance and may not be bound to any functional relationship except, for example, a build size of a component. That is, if a build size of a component has a build width of 3100 units and the printing assembly 3150 has jet nozzles 3158 positioned along a latitudinal axis to cover a build width up to 150 units, the randomly chosen index value may be 1 to 50 units so that the entire build width which requires deposition of binder during a pass of the printing assembly over the build area may be associated with a jet nozzle 3158. The term "units" used herein may refer to any know unit of measure used by the apparatus, for example inches, meters, millimeters, etc. Additionally, the unit values used herein are merely for explanatory purposes and not intended to limit the disclosure.

Moreover, the randomness of the indexing values may be determined by the slicing engine so that a jet nozzle corresponding to a first trajectory along a longitudinal axis during a first pass may be randomly assigned to a second trajectory along a longitudinal axis during a second pass (e.g., a consecutive pass with respect to the first pass). It is understood that indexing of the printing assembly 3150 may not be executed between every pass of the printing assembly 3150 over the build area 3120. However, in some instances the slicing engine may be configured, for example, by an engineer or operator when developing the executable instructions, to include an indexing command or step between each consecutive pass of the printing assembly 3150 over the build area or at less frequent intervals, such as every other pass, every second pass or any randomly chosen number of passes between 1 and the total number of passes defined to build a component.

In some instances, the electronic control unit of the apparatus 3100 may be configured to execute indexing of the printing assembly 3150 independently from the predefined random indexes determined by the slicing engine. That is, the electronic control unit of the apparatus 3100 may "on-the-fly," between passes, implement an indexing operation of the printing assembly 3150. Such an operation may be triggered by a sensor or other indication that a print head or a jet nozzle is malfunctioning. In some instances, however, the electronic control unit may implement a random amount of indexing of the printing assembly 3150 after a predetermined number of passes over the build area 3120.

Referring to FIGS. 79A and 79B, an illustrative depiction of an index of a printing assembly 3150 having malfunctioning jet nozzles 3195*a* and 3195*b* is shown. As depicted in FIG. 79A, the malfunctioning jet nozzles 3195*a* and 3195*b* fail to deposit binder along corresponding trajectories 3190*a* and 3190*b*, respectively, as the printing assembly 3150 traverses the build area 3120 having a first layer of powder. However, during a subsequent pass, which may be a return pass along the same layer, or a pass over a subsequently laid layer of powder, the printing assembly 3150 is indexed an index distance, for example, the distance of one or more jet-spacing (d) (i.e., the spacing from one jet nozzle to an adjacent jet nozzle) so that the malfunctioning jet corresponds to a different trajectory. Prior to the printing assembly 3150 traversing the build area, the control system 3010 maps build instructions for pixels defined in the deposition pattern to the jet nozzles 3158 configured to traverse the build area 3120 based on their planned trajectory such that a jet nozzle 3158 is configured to deposit binder according to the build instructions associated with their current latitudinal position along the latitudinal axis.

After at least one pass over the build area 3120, the control system may execute an instruction in the build instructions to index the printing assembly 3150 a predefined random index causing the jet nozzles 3158 of the printing assembly 3150 to move a lateral distance along the latitudinal axis in a first direction. Now that the jet nozzles 3158 align with new trajectories over the build area 3120 the control system 3010 remaps the build instructions for pixels defined in the deposition pattern to the jet nozzles configured to traverse the build area 3120 based on their new trajectory after indexing such that a jet nozzle 3158 is configured to deposit binder according to the build instructions associated with their current latitudinal position along the latitudinal axis. Remapping of the deposition pattern include digitally shifting the deposition pattern in a second direction opposite the first direction which the jet nozzles were indexed so that jet nozzles may be assigned the build instructions for the portion of the component that corresponds to their new trajectory after being indexed. In other words, in response to a mechanical shift in a first direction a digital shift in a second direction, opposite the first direction, but in the same absolute amount is needed to continue to build the component on the build area 3120.

Turning to FIG. 79B, the first malfunctioning jet nozzle 3195*a* is now positioned along a non-build trajectory (that is not used for the subsequent pass) and the second malfunctioning jet nozzle 3195*b* now corresponds to a different trajectory 3191 after a mechanical indexing of the printing assembly 3150 and/or individual print heads 3156 occurs. A different functioning jet nozzle 3158 now corresponds to the prior trajectory 3190*b* previously executed by the second malfunctioning jet nozzle 3195*b*, which now receives binder from the functioning jet nozzle 3158 rather than being further deprived of binder should the malfunctioning jet nozzle 3195*b* have subsequently traversed the same trajectory. The randomized shifting of the plurality of jets with respect to the trajectories along the longitudinal axis minimizes repeated passes of a malfunctioning jet over a particular section of the build area thereby improving the resulting green strength and integrity of the component. That is, a functioning jet may apply binder to a trajectory that a malfunctioning jet failed to apply binder to in a prior pass.

In operation, the control system 3010 maps build instructions for pixels defined in the deposition pattern to the jet nozzles 3158 configured to traverse the build area 3120 based on their planned trajectory such that a jet nozzle 3158 is configured to deposit binder according to the build instructions associated with their current latitudinal position along the latitudinal axis. Furthermore, the control system 3010 of the apparatus 3100 may cause select ones of the plurality of jet nozzles to dispense one or more drops of binder on a powder layer based on a deposition pattern defined by a slicing engine as the printing head traverses along the longitudinal axis applying binder, where the first jet of the plurality of jets corresponds to a first trajectory assigned by the slicing engine.

The control system 3010 of the apparatus 3100 may then index the printing head by an integer number of pixels along the latitudinal axis such that the first jet corresponds to a second trajectory and another jet corresponds to the first trajectory assigned by the slicing engine and subsequently cause the indexed printing head to traverse along the longitudinal axis and apply binder to the powder layer in the deposition pattern defined by the slicing engine. The control system 3010, in response to the indexing, remaps build instructions for pixels defined in the deposition pattern to the jet nozzles 3158 configured to traverse the build area 3120 based on their new trajectory such that a jet nozzle is configured to deposit binder according to the build instructions associated with their current latitudinal position along the latitudinal axis after indexing.

In some embodiments, an image processing device 3014 (FIG. 58B) (e.g., an in situ monitoring system) may be utilized to examine the build area between passes to determine whether a print head or jet nozzle is malfunctioning by identifying trajectories that did or did not receive the predefined amounts of binder. The electronic control unit may be configured to then adjust a prescribed trajectory of a jet nozzle that has been identified to be malfunctioning on subsequent build passes to minimize the effect of the malfunctioning jet nozzle of the overall build. More specifically, an in situ monitoring system configured to may determine a malfunction of one or more jets of the plurality of jets, and provide a notification signal to the electronic control unit identifying the one or more malfunctioning jets. The electronic control unit may then develop one or more indexing commands for indexing the printing head between predefined passes such that a malfunctioning jet is configured to not traverse the same trajectory during consecutive passes while determined to be in a malfunctioning state.

The prior embodiments describe and depict systems and methods for controlling binder or other material application to a build area by implement additional control of the printing assembly 3150 through a second actuator assembly 3103 that controls positioning of printing assembly 3150 along the latitudinal axis. A further consideration when applying binder is the bleed effect. That is, binder jet printing involves layerwise deposition of drops of liquid binder into powder. Drops of binder penetrate the powder and undergo a phase change (curing) to bind the powder particles together layer by layer. However, as it becomes desirable to increase the speed at which layers are built, deposited binder may not have sufficient energy and/or time to undergo a phase change before additional binder is added in subsequent print layers. That is, binder cure time may be rate limiting. This results in downward flow of binder beyond that layer in which the binder is deposited. Printed geometry with regions having downward-facing surfaces are at risk of having areas that become excessively wet resulting in surface defects and weak green strengths.

The following provides a solution to this issue of binder bleed by controlling the amount of binder that is deposited in layers having one or more layers applied above (along the Z-axis). Turning now to FIGS. 80A-80B, an apparatus 3100 may be configured to deposit an increasing amount of binder in adjacent vertical layers such that binder bleed between layers does not negatively affect downward-facing surfaces of components and/or the green strength of a component. FIG. 80A depicts an illustrative component 3200 for building with the apparatus 3100. FIG. 80B depicts a cross-section of the component 3200 represented by build layer 3210 and portions 3220 per layer.

A slicing engine or similar tool configured to generate executable instructions defining print head movements, design deposition patterns, and amounts for binder or other materials may define a layer to layer amount of binder to apply to vertically adjacent portions 3220 of powder estimating a voxel when binder is received. The amount of binder to apply to vertically adjacent portions 3220 of powder may be defined by the total number of adjacent layers over an attenuation length. For example, a first portion of powder in a stack of multiple layers (e.g., 2 or more, 3 or more, 4 or more, 5 or more) may be receive a first amount of binder that is less that the amount of binder deposited in a second portion of powder positioned above the first voxel. The amount of binder deposited in successive vertically aligned voxels of powder in subsequent layers of powder progressively increases to a predetermined volume. In some embodiments, the amount of binder dispensed in successive vertically aligned portions 3220 of powder in subsequent layers of powder progressively increases over an attenuation length defined by a predetermined number of layers of powder. Similarly, the amount of binder dispensed in successive vertically aligned portions 3220 of powder in subsequent layers of powder may progressively increase over an attenuation length defined by a predetermined number of layers of powder when the predetermined number of layers is greater than a predetermined thickness threshold. That is, the slicing engine may be configured to only apply bleed control for layers having greater than a predetermined thickness threshold (i.e., greater than a predetermined number of layers).

The amount of binder dispensed in successive vertically aligned portions of powder in subsequent layers may be based upon one or more properties. These may include, but are not limited to, a property of the powder material such as a packing density of a powder material, an amount of time a binder wicks before setting or curing, the type of binder or type of powder, an exposure time of a curing energy source (e.g., an infrared, ultraviolet or other energy source) and/or other properties.

In operation, controlling binder bleed as disclosed herein, enables an apparatus to apply more layers of a build more efficiently and at a faster pace without being limited by a binder's curing rate.

Referring back to FIG. 81, the computer readable and executable instructions, when executed by the processor of the control system 3010, returns the method 3300 to step 3302 and repeats the steps shown and described herein for the second pass (e.g., a return pass over the current layer of powder on the build area 3120). In particular, the computer readable and executable instructions, when executed by the processor of the control system 3010, transmits a signal to the first actuator assembly 3102 of the apparatus 3100 to translate the printing assembly 3150 from the translated position 3253 to the home position 3151, such that the printing head 3154 moves over the build area 3120 during the second pass. The computer readable and executable instructions, when executed by the processor of the control system 3010, transmits a signal to the printing head 3154 to release material from the plurality of print heads 3156 of the first print head row 3155 and the second print head row 3157 to thereby deposit additional material onto the pixels of the build area 3120 as the printing head 3154 moves over the build area 3120 in the second pass. Accordingly, in this instance the printing head 3154 moves over the build area 3120 from the translated position 3253 to the home position 3151 as additional material is released from the printing head 3154 during the second pass.

In other embodiments, the control system 3010 transmits a signal to the first actuator assembly 3102 of the apparatus 3100 to translate the printing assembly 3150 from the translated position 3253 to the home position 3151 prior to initiating the second pass, such that the printing head 3154 again moves over the build area 3120 from the home position 3151 to the translated position 3253 during the second pass. In this instance, the printing head 3154 moves over the build area 3120 from the home position 3151 to the translated position 3253 as additional material is released from the printing head 3154 during the second pass. The control system 3010 repeats the steps described in detail above until the three-dimensional part to be printed by the apparatus 3100 is complete and no additional material is to be deposited at step 3306.

Although the present example of the exemplary method 3300 depicts and describes the printing assembly 3150 of the apparatus 3100 being initially positioned at the home position 3151 prior to moving to the translated position 3253, and the plurality of print heads 3156 of the first print head row 3155 and/or the second print head row 3157 being arranged in the default position (FIG. 75A) prior to the actuated position (FIG. 75B), it should be understood that in other embodiments the printing assembly 3150 may initially be positioned at the translated position 3253 and the plurality of print heads 3156 of the print head rows 3155, 3157 arranged in the actuated position without departing from the scope of the present disclosure. Moreover, it should be understood that the exemplary method 3300 described and shown herein may be performed by various other printing assemblies other than the printing assembly 3150, such as, for example, the three-row printing assembly described above. It should further be understood that in some embodiments one or more steps of the method 3300 described above may be adjusted, varied, and/or omitted entirely, including but not limited to steps of releasing materials from the plurality of jet nozzles 3158 onto the plurality of pixels of the build area 3120, determining whether the printing assembly 3150 is at the translated position 3253, ceasing material release from the plurality of jet nozzles 3158, ceasing movement of the printing assembly 3150, and/or the like.

Referring now to FIGS. 75A-75B in conjunction with the flow diagram of FIG. 82, an exemplary method 3400 of actuating the multiple print head rows 3155, 3157 of the printing assembly 3150 as the manufacturing apparatus 3100 builds an object is schematically depicted. More specifically, movement of the multiple print head rows 3155, 3157 of the plurality of print heads 3156 for depositing binder material 3050 and/or other materials 3114, 3115 along the build area 3120 serves to reduce an occurrence of a resolution defect on the printed object or part during the image transfer process due to lack of jetting redundancy. The depiction of FIGS. 75 and 82, and the accompanying description below, is not meant to limit the subject matter described herein or represent an exact description of how materials may be deposited from the printing assembly 3150, but instead is meant to provide a simple schematic overview to illustrate the general movement of multiple print head rows 3155, 3157 of print heads 3156 of the printing assembly 3150 to improve jetting redundancy as described herein.

Referring to FIG. 75A and at step 3402, the computer readable and executable instructions, when executed by the processor of the control system 3010, transmits a signal to the first actuator assembly 3102 to move the printing assembly 3150 across the build area 3120 in a first pass. In particular, the printing assembly 3150 translates across the rail 3104 of the apparatus 3100 and along the working axis 3116, thereby moving the printing head 3154 over the build area 3120 in the +X direction of the coordinate axes of the figures. The control system 3010 transmits a signal to the plurality of print heads 3156 of the first print head row 3155 and the second print head row 3157 to release a material from the plurality of jet nozzles 3158 as the printing head 3154 of the printing assembly 3150 moves over the build area 3120. The material (e.g., the binder material 3050, the first material 3114, the second material 3115, and the like) is transferred to the printing head 3154 and deposited onto the build area 3120 through the plurality of jet nozzles 3158 of the plurality of print heads 3156 in both the first print head row 3155 and the second print head row 3157.

In the present example, the plurality of print heads 3156 of the first print head row 3155 and the plurality of print heads 3156 of the second print head row 3157 deposit material along the build area 3120. Accordingly, at least some of the plurality of jet nozzles 3158 of the plurality of print heads 3156 from the first print head row 3155 and the second print head row 3157 jet material on at least one pixel positioned along the build area 3120. In this instance, the plurality of print heads 3156 of the first print head row 3155 and the second print head row 3157 are in a default position relative to one another as the printing assembly 3150 deposits its material onto the build area 3120 of the apparatus 3100. As will be described in greater detail herein, in other embodiments the plurality of print heads 3156 of the first print head row 3155 may deposit a different material than the plurality of print heads 3156 of the second print head row 3157 (see FIG. 84).

Still referring to FIG. 75A, the computer readable and executable instructions, when executed by the processor of the control system 3010, determines whether the printing assembly 3150 has reached the translated position 3253 located in the +/−X direction at or past an edge of the build area 3120 where material is to be deposited by the printing assembly 3150 in the first pass. The control system 3010 determines whether the printing assembly 3150 has reached the translated position 3253 by, for example, monitoring a relative position of the printing assembly 3150 along the rail 3104 as the printing assembly 3150 translates along the working axis 3116 of the apparatus 3100 (i.e., +X direction of the coordinate axes of the figures) to the translated position 3253. In response to determining that the printing assembly 3150 is not positioned at the translated position 3253, the control system 3010 transmits a signal to the first actuator assembly 3102 to continue translating the printing assembly 3150 across the build area 3120 at step 3402. The control system 3010 further transmits a signal to the printing head 3154 to release material from the plurality of jet nozzles 3158 of the plurality of print heads 3156 of the first print head row 3155 and the second print head row 3157.

Alternatively, in response to determining that the printing assembly 3150 is positioned at the translated position 3253, the computer readable and executable instructions, when executed by the processor of the control system 3010, transmits a signal to the printing head 3154 to terminate release of the material from the plurality of jet nozzles 3158 of the plurality of print heads 3156 of the first print head row 3155 and the second print head row 3157. Additionally and/or simultaneously, the control system 3010 transmits a signal to the first actuator assembly 3102 to terminate movement of the printing assembly 3150 along the working axis 3116 by ceasing actuation of the first actuator assembly 3102. With the printing assembly 3150 positioned at the translated position 3253, the plurality of pixels positioned along the build area 3120 have received material thereon from at least the first print head row 3155 or the second print head row 3157 during the first pass of the printing assembly 3150 over the build area 3120 in the +X direction of the coordinate axes.

Referring now to FIG. 75B and at step 3404, the control system 3010 determines whether binder or other material is to be deposited from the printing assembly 3150. This determination by the control system 3010 may be performed via various means and/or systems as described in detail above. In response to determining that an additional layer of material (e.g., binder) is not to be deposited from the printing assembly 3150 at step 3404, the control system 3010 transmits a signal to the apparatus 3100 to end the additive manufacturing process of method 3400 at step 3406, if the part being built is complete.

Alternatively, in response to determining that an additional layer of material (e.g., binder) is to be deposited from the printing assembly 3150 at step 3404, the computer readable and executable instructions, when executed by the processor of the control system 3010, transmits a signal to the image processing device 3014 of the apparatus 3100 (see FIG. 58B) to scan the build area 3120 at step 3408. In particular, the image processing device 3014 captures one or more images of the three-dimensional part produced by the apparatus 3100 along the build area 3120 to identify a progressive development of the part during the additive manufacturing process. The image processing device 3014 is positioned above the build area 3120 (i.e., in the +Z direction of the coordinate axes of the figures) to effectively image the part printed (see FIG. 58B). The image processing device 3014 may comprise various devices or systems capable of generating a visual rendition of the contents positioned within a focal range of the image processing device 3014.

Referring to FIG. 82 at step 3410, with the image scan of the build area 3120 captured by the image processing device 3014, the computer readable and executable instructions, when executed by the processor of the control system 3010, maps the plurality of pixels positioned along the build area 3120. In particular, each of the plurality of pixels along the build area 3120 are mapped based on the image scan generated by the image processing device 3014 to determine a print/production progress of the three-dimensional part. In this instance, the control system 3010 may identify the build characteristics of particular pixels along the build area 3120 to determine if any may have not adequately received material thereon. For instance, the pixel may have been aligned with a particular jet nozzle 3158 that did not effectively deposit material at said pixel during the prior pass of the printing assembly 3150 (e.g., a first pass). For example, a jet nozzle 3158 that may have experienced a misfire, or clogging, during the prior pass may have been inhibited from depositing an adequate amount of material to one or more pixels that were aligned with said jet nozzle 3158 due to a relative position of the print head row 3155, 3157 including said jet nozzle 3158.

Accordingly, the computer readable and executable instructions, when executed by the processor of the control system 3010, perform a mapping of the plurality of pixels to identify a necessary development of the part at each of the plurality of pixels. By mapping the plurality of pixels and determining the progressive development of the part at each pixel thus far, the control system 3010 of the apparatus 3100 may adjust a position and/or arrangement of the plurality of print heads 3156 of the printing assembly 3150 for the subsequent pass (e.g., a second pass) to increase a likelihood that the plurality of pixels receive an adequate quantity of material disposed thereon from one or more different jet nozzles 3158 of the plurality of jet nozzles 3158.

Referring back to FIG. 75B and at step 3412, the computer readable and executable instructions, when executed by the processor of the control system 3010, transmits a signal to at least one actuator 3160 in the printing head 3154 to actuate at least one of the plurality of print heads 3156 of the first print head row 3155 and/or the second print head row 3157 relative to one another. In particular, the actuation of the first print head row 3155 and/or the second print head row 3157 is based on the mapping of the plurality of pixels at step 3410. Actuation of at least one actuator 3160 that is coupled to at least one of the first print head row 3155 and/or the second print head row 3157 of the plurality of print heads 3156 provides for a translation of said row of print heads 3156 relative to at least the other row of print heads 3156 in a direction that is transverse to the working axis 3116 of the apparatus (i.e., +/−Y direction of the coordinate axes of the figures). In the present example, the printing assembly 3150 includes a pair of actuators 3160 coupled to the first print head row 3155 and the second print head row 3157 of print heads 3156, respectively, such that both print head rows 3155, 3157 are movable relative to one another and relative the support bracket 3152 of the printing assembly 3150. It should be understood that in some embodiments actuation of the image processing device 3014 to scan the build area 3120 and map the plurality of pixels positioned thereon may be performed during a first pass of the printing assembly 3150. In this instance, the control system 3010 may actuate the print heads 3156 of at least one of the print head rows 3155, 3157 prior to step 3402 and 3404.

In this instance, the plurality of jet nozzles 3158 of each of the plurality of print heads 3156 included in the first print head row 3155 and the second print head row 3157 is repositioned from a default position to an actuated position that differs from the default position by at least some incremental distance (e.g., incremental distances “A”-“G” of FIGS. 74A-74G). Accordingly, during a second pass of the printing assembly 3150 over the build area 3120, at least one of the pixels positioned along the build area 3120 will receive material from at least one jet nozzle 3158 of the plurality of jet nozzles 3158 that is different from the jet nozzle 3158 that previously deposited, or attempted to deposit, material to said pixel during the first pass. It should be understood that lateral movement of the print heads of the first print head row 3155 and the second print head row 3157 relative to one another, and relative to a prior position of said print head rows 3155, 3157 from the default position, provides an enhanced jetting redundancy of the manufacturing process by increasing a reliability that a complete resolution of each of the plurality of pixels on the build area 3120 receives an adequate deposition of material thereon.

Referring back to FIG. 82, the computer readable and executable instructions, when executed by the processor of the control system 3010, returns the method 3400 to step 3402 and repeats the steps shown and described herein for the second pass. In particular, the computer readable and executable instructions, when executed by the processor of the control system 3010, transmits a signal to the first actuator assembly 3102 to translate the printing assembly 3150 from the translated position 3253 to the home position 3151, such that the printing head 3154 moves over the build area 3120 during the second pass. The computer readable and executable instructions, when executed by the processor of the control system 3010, transmits a signal to the plurality of print heads 3156 to release material from the first print head row 3155 and the second print head row 3157, respectively, to thereby deposit additional material onto the plurality of pixels of the build area 3120 as the printing head 3154 moves over the build area 3120 in the second pass. Accordingly, in this instance the printing head 3154 moves over the build area 3120 from the translated position 3253 to the home position 3151 as additional material is released from the printing head 3154 during the second pass.

In other embodiments, the control system 3010 transmits a signal to the first actuator assembly 3102 of the apparatus 3100 to translate the printing assembly 3150 from the translated position 3253 to the home position 3151 prior to initiating the second pass, such that the printing head 3154 again moves over the build area 3120 from the home position 3151 to the translated position 3253 during the second pass. In this instance, the printing head 3154 moves over the build area 3120 from the home position 3151 to the translated position 3253 as additional material is released from the printing head 3154 during the second pass.

As described in greater detail above, in some embodiments the control system 3010 may actuate the plurality of print heads 3156 of the first print head row 3155 and/or the second print head row 3157 relative to one another and the support bracket 3152 during a first pass and/or a second pass in various manners. For example, such movement of the print heads 3156 may be randomly generated by the control system 3010 or predetermined based on calculated measurements of the previous positions of the plurality of print heads 3156 during the prior pass of the printing assembly 3150. In either instance, movement of the print head rows 3155, 3157 of print heads 3156 prior to each pass of the printing assembly 3150 provides an enhanced, material jetting redundancy of the manufacturing process by increasing a reliability that a complete resolution of each of the plurality of pixels on the build area 3120 receives an adequate deposition of material thereon from more than one jet nozzle 3158. The control system 3010 proceeds to repeats the steps described in detail above until the three-dimensional part to be printed by the apparatus 3100 is complete and no additional material is to be deposited at step 3406.

Although the present example of the exemplary method 3400 depicts and describes the printing assembly 3150 of the apparatus 3100 being initially positioned at the home position 3151 prior to moving to the translated position 3253, and the plurality of print heads 3156 of the first print head row 3155 and/or the second print head row 3157 being arranged in the default position (FIG. 75A) prior to the actuated position (FIG. 75B), it should be understood that in other embodiments the printing assembly 3150 may initially be positioned at the translated position 3253 and the plurality of print heads 3156 of the print head rows 3155, 3157 arranged in the actuated position without departing from the scope of the present disclosure. Moreover, it should be understood that the exemplary method 3400 described and shown herein may be performed by various other printing assemblies other than the printing assembly 3150, such as, for example, the three-row printing assembly described above. It should further be understood that in some embodiments one or more steps of the method 3400 described above may be adjusted, varied, and/or omitted entirely, including but not limited to steps of releasing materials from the plurality of jet nozzles 3158 onto the plurality of pixels of the build area 3120; determining whether the printing assembly 3150 is at the translated position 3253; ceasing material release from the plurality of jet nozzles 3158; ceasing movement of the printing assembly 3150; and/or the like.

Referring now to FIGS. 76A-76B in conjunction with the flow diagram of FIG. 83, an exemplary method 3500 of actuating the multiple print head rows 3155, 3157 of the printing assembly 3150 as the manufacturing apparatus 3100 builds an object is schematically depicted. More specifically, movement of the multiple print head rows 3155, 3157 of the plurality of print heads 3156 for depositing binder material 3050 and/or other materials 3114, 3115 along the build area 3120 serves to reduce an occurrence of a resolution defect on the printed object or part during the image transfer process due to lack of jetting redundancy. The depiction of FIGS. 76A-76B and 83, and the accompanying description below, is not meant to limit the subject matter described herein or represent an exact description of how materials may be deposited from the printing assembly 3150, but instead is meant to provide a simple schematic overview to illustrate the general movement of multiple print head rows 3155, 3157 of print heads 3156 of the printing assembly 3150 to improve jetting redundancy as described herein.

Referring to FIG. 76A and at step 3502, the computer readable and executable instructions, when executed by the processor of the control system 3010, transmits a signal to the first actuator assembly 3102 to move the printing assembly 3150 across the build area 3120 in a first pass. In particular, the printing assembly 3150 translates across the rail 3104 of the apparatus 3100 and along the working axis 3116, thereby moving the printing head 3154 over the build area 3120 in the +X direction of the coordinate axes of the figures. The control system 3010 transmits a signal to the plurality of print heads 3156 of the first print head row 3155 and the second print head row 3157 to release a material from the plurality of jet nozzles 3158 as the printing head 3154 of the printing assembly 3150 moves over the build area 3120. The material (e.g., the binder material 3050, the first material 3114, the second material 3115, and the like) is transferred to the printing head 3154 and deposited onto the build area 3120 through the plurality of jet nozzles 3158 of the plurality of print heads 3156 in both the first print head row 3155 and the second print head row 3157.

In the present example, the plurality of print heads 3156 of the first print head row 3155 and the plurality of print heads 3156 of the second print head row 3157 deposit material along the build area 3120. Accordingly, at least some of the plurality of jet nozzles 3158 of the plurality of print heads 3156 from the first print head row 3155 and the second print head row 3157 jet material on at least one pixel positioned along the build area 3120. In this instance, the plurality of print heads 3156 of the first print head row 3155 and the second print head row 3157 are in a default position relative to one another as the printing assembly 3150 deposits its material onto the build area 3120 of the apparatus 3100. As will be described in greater detail herein, in other embodiments the plurality of print heads 3156 of the first print head row 3155 may deposit a different material than the plurality of print heads 3156 of the second print head row 3157 (see FIG. 84).

Still referring to FIG. 76A and at step 3504, the compute readable and executable instructions executed by the processor causes the control system 3010 to monitor a release of material from the plurality of jet nozzles 3158 of the plurality of print heads 3156 from both the first print head row 3155 and the second print head row 3157 as material is jet onto the build area 3120. In particular, a release of material may be monitored by detecting and measuring a quantity, volume, velocity, and the like of material being jetted from the plurality of print heads 3156. In embodiments, the apparatus 3100 may include one or more sensors (not shown) that are configured to detect the release of material from the plurality of print heads 3156. In this instance, the control system 3010 measures an output of the print heads 3156, and in particular a material output from the plurality of jet nozzles 3158 for each of the print heads 3156 within the first print head row 3155 and the second print head row 3157, respectively.

The compute readable and executable instructions executed by the processor causes the control system 3010 to determine whether the printing assembly 3150 has reached the translated position 3253 located in the +/−X direction at or past an edge of the build area 3120 where material is to be deposited by the printing assembly 3150 in the first pass. The control system 3010 determines whether the printing assembly 3150 has reached the translated position 3253 by, for example, monitoring a relative position of the printing assembly 3150 along the rail 3104 as the printing assembly 3150 translates along the working axis 3116 of the apparatus 3100 (i.e., +X direction of the coordinate axes of the figures) to the translated position 3253.

Referring to FIG. 83, in response to determining that the printing assembly 3150 is not positioned at the translated position 3253, the computer readable and executable instructions executed by the processor causes the control system 3010 to transmit a signal to the first actuator assembly 3102 to continue translating the printing assembly 3150 across the build area 3120 at step 3502. The control system 3010 further transmits a signal to the printing head 3154 to release material from the plurality of jet nozzles 3158 of the plurality of print heads 3156 of the first print head row 3155 and the second print head row 3157 and to monitor an output of material released from the plurality of jet nozzles 3158 at step 3504.

Alternatively, in response to determining that the printing assembly 3150 is positioned at the translated position 3253, the control system 3010 transmits a signal to the printing head 3154 to terminate release of material from the plurality of jet nozzles 3158 of the plurality of print heads 3156. Additionally and/or simultaneously, the instructions executed by the processor causes the control system 3010 to transmit a signal to the first actuator assembly 3102 to terminate movement of the printing assembly 3150 along the working axis 3116 by ceasing actuation of the first actuator assembly 3102. With the printing assembly 3150 positioned at the translated position 3253, the plurality of pixels positioned along the build area 3120 have received material thereon from at least the first print head row 3155 or the second print head row 3157 during the first pass of the printing assembly 3150 over the build area 3120 in the +X direction of the coordinate axes.

Still referring to FIG. 83 at step 3506, the computer readable and executable instructions, when executed by the processor of the control system 3010, determines whether an output of the printing head 3154 is equal to a predetermined threshold output. In some embodiments, the control system 3010 may determine whether an output of a particular print head row 3155, 3157 of print heads 3156 is equal to a predetermined threshold of said print head row 3155, 3157. In other embodiments, the control system 3010 may determine whether an output of each individual print head 3156 of each print head row 3155, 3157 satisfies the predetermined output threshold. In further embodiments, the control system 3010 may determine whether an output of each jet nozzle 3158 of each of the plurality of print heads 3156 within the print head rows 3155, 3157 have released material equivalent to a predetermined threshold.

This determination by the control system 3010 may be performed via various devices and/or systems capable of detecting, monitoring, and/or measuring an output of the material from the plurality of jet nozzles 3158. In the present example, the printing assembly 3150 includes at least one sensor (e.g., a camera) for each of the plurality of print heads 3156 of the first print head row 3155 and the second print head row 3157, such that the plurality of sensors are configured to monitor a material output from each of the plurality of jet nozzles 3158. In response to the control system 3010 determining that the output of material from the plurality of jet nozzles 3158 of each of the plurality of print heads 3156 of the first print head row 3155 and the second print head row 3157 are equal to the predetermined threshold, the computer readable and executable instructions executed by the processor causes the control system 3010 to determine whether an additional layer of material (e.g., binder) is to be deposited from the printing assembly 3150 at step 3508.

Still referring to FIG. 83, in response to determining that an additional layer of material (e.g., binder) is not to be deposited at step 3508, the control system 3010 transmits a signal to the apparatus 3100 to end the additive manufacturing process of method 3500 at step 3510. Alternatively, in response to determining that an additional layer of material (e.g., binder) is required to be deposited at step 3508, the computer readable and executable instructions executed by the processor causes the control system 3010 to return to step 3502 and repeat the steps shown and described herein for the second pass.

Referring now to FIG. 76B and at step 3512, in response to the control system 3010 determining that the output of material from the plurality of jet nozzles 3158 of each of the plurality of print heads 3156 of the first print head row 3155 and the second print head row 3157 are not equal to the predetermined threshold, the control system 3010 actuates at least one of the plurality of print heads 3156 of the first print head row 3155 or the second print head row 3157. In particular, by identifying that the material output from the plurality of jet nozzles 3158 did not meet the predetermined output threshold the control system 3010 determines that the material released from the printing assembly 3150 onto the plurality of pixels along the build area 3120 was not sufficient such that a printing defect and/or error may have occurred during the prior pass of the printing assembly 3150.

As discussed in detail above, such defects and/or errors may be caused by a misfire and/or clog of one or more of the plurality of jet nozzles 3158 of the plurality of print heads 3156. In this instance, moving the first print head row 3155 and/or the second print head row 3157 of the plurality of print heads 3156 relative to one another and relative to the support bracket 3152 realigns the plurality of jet nozzles 3158 with the plurality of pixels. In this instance, the plurality of print heads 3156 are actuated only in response to the control system 3010 determining the occurrence of a possible error such that the plurality of print heads 3156 of the print head rows 3155, 3157 otherwise remain in a fixed arrangement relative to one another. Accordingly, each of the pixels along the build area 3120 may receive material from at least a different jet nozzle 3158 during a second pass than from the jet nozzle 3158 that was aligned with said pixel during a first pass of the printing assembly 3150.

Still referring to FIG. 76B, with the plurality of jet nozzles 3158 realigned in response to the plurality of print heads 3156 of the first print head row 3155 and the second print head row 3157 moving from, for example, a default position to an actuated position, a jetting resolution of the apparatus 3100 may be enhanced. In other words, maintaining a jet nozzle 3158 that may not have released an adequate quantity of material onto a particular pixel in identical alignment with said pixel during a subsequent pass of the printing assembly 3150 over the build area 3120 may be reduced. The computer readable and executable instructions executed by the processor causes the control system 3010 to return to step 3502 and repeat the steps shown and described herein for the second pass.

Although the present example of the exemplary method 3500 depicts and describes the printing assembly 3150 of the apparatus 3100 being initially positioned at the home position 3151 prior to moving to the translated position 3253, and the plurality of print heads 3156 of the first print head row 3155 and/or the second print head row 3157 being arranged in the default position (FIG. 61) prior to an actuated position (FIGS. 2-11), it should be understood that in other embodiments the printing assembly 3150 may initially be positioned at the translated position 3253 and the plurality of print heads 3156 of the print head rows 3155, 3157 arranged in the actuated position without departing from the scope of the present disclosure. Moreover, it should be understood that the exemplary method 3500 described and shown herein may be performed by various other printing assemblies other than the printing assembly 3150, such as, for example, the three-row printing assembly described above. It should further be understood that in some embodiments one or more steps of the method 3500 described above may be adjusted, varied, and/or omitted entirely, including but not limited to steps of releasing materials from the plurality of jet nozzles 3158 onto the plurality of pixels of the build area 3120, determining whether the printing assembly 3150 is at the translated position 3253; ceasing material release from the plurality of jet nozzles 3158, ceasing movement of the printing assembly 3150, and/or the like.

Referring now to FIGS. 77A-77B in conjunction with the flow diagram of FIG. 84, an exemplary method 3600 of actuating the multiple print head rows 3155, 3157 of the printing assembly 3150 as the manufacturing apparatus 3100 builds an object is schematically depicted. More specifically, movement of the multiple print head rows 3155, 3157 of the plurality of print heads 3156 for depositing the binder material 3050 and/or other materials 3114, 3115 along the build area 3120 serves to reduce an occurrence of a resolution defect on the printed object or part during the image transfer process. The depiction of FIGS. 77A-77B and 84, and the accompanying description below, is not meant to limit the subject matter described herein or represent an exact description of how materials may be deposited from the printing assembly 3150, but instead is meant to provide a simple schematic overview to illustrate the general movement of multiple print head rows 3155, 3157 of print heads 3156 of the printing assembly 3150 to jet multiple materials as described herein.

Referring to FIG. 77A and at step 3602, the computer readable and executable instructions, when executed by the processor of the control system 3010, transmits a signal to the first actuator assembly 3102 to translate the printing assembly 3150 across the build area 3120 in a first pass. In particular, the printing assembly 3150 translates across the rail 3104 of the apparatus 3100 and along the working axis 3116, thereby moving the printing head 3154 over the build area 3120 in the +X direction of the coordinate axes of the figures. In the present example, the plurality of print heads 3156 of the first print head row 3155 are communicatively coupled with the first fluid reservoir 3110 via the first conduit line 3111 (see FIG. 58B) such that the plurality of print heads 3156 of the first print head row 3155 are operable to deposit the first material 3114 along the build area 3120. Further, the plurality of print heads 3156 of the second print head row 3157 are communicatively coupled with the second fluid reservoir 3112 via the second conduit line 3113 (see FIG. 58B) such that the plurality of print heads 3156 of the second print head row 3157 are operable to deposit the second material 3115 along the build area 3120. It should be understood that in other embodiments, the print heads 3156 of both the first print head row 3155 and the second print head row 3157 may be coupled to the same reservoir and/or the material stored within the first fluid reservoir 3110 and the second fluid reservoir 3112 may be the same.

At step 3604, the computer readable and executable instructions, when executed by the processor of the control system 3010, transmits a signal to the plurality of print heads 3156 of the first print head row 3155 to release the first material 3114 from the first fluid reservoir 3110 through the plurality of jet nozzles 3158 of the print heads 3156 defining the first print head row 3155. The first material 3114 is transferred to the print heads 3156 and deposited onto the build area 3120 through the plurality of jet nozzles 3158 as the printing assembly 3150 moves across the build area 3120. At step 3606, the control system 3010 transmits a signal to the plurality of print heads 3156 of the second print head row 3157 to release the second material 3115 from the second fluid reservoir 3112 through the plurality of jet nozzles 3158 of the print heads 3156 defining the second print head row 3157. The second material 3115 is transferred to the print heads 3156 and deposited onto the build area 3120 through the plurality of jet nozzles 3158 as the printing assembly 3150 moves across the build area 3120.

Accordingly, each of the plurality of jet nozzles 3158 of the plurality of print heads 3156 from the first print head row 3155 and the second print head row 3157 deposits at least one of the materials 3114, 3115 on at least one pixel positioned along the build area 3120. In this instance, the plurality of print heads 3156 of the first print head row 3155 and the second print head row 3157 are in a default position relative to one another (see FIG. 61) as the printing assembly 3150 deposits the first material 3114 and the second material 3115 onto the build area 3120 of the apparatus 3100.

Referring now to FIG. 77B, the computer readable and executable instructions, when executed by the processor of the control system 3010, determines whether the printing assembly 3150 has reached the translated position 3253 located in the +/−X direction at or past an edge of the build area 3120 where material is to be deposited by the printing assembly 3150 in the first pass. The control system 3010 determines whether the printing assembly 3150 has reached the translated position 3253 by, for example, monitoring a relative position of the printing assembly 3150 along the rail 3104 as the printing assembly 3150 translates along the working axis 3116 of the apparatus 3100 (i.e., +X direction of the coordinate axes of the figures) to the translated position 3253.

In response to determining that the printing assembly 3150 is not positioned at the translated position 3253, the control system 3010 transmits a signal to the first actuator assembly 3102 to continue translating the printing assembly 3150 across the build area 3120 at step 3602; releasing the first material 3114 from the plurality of print heads 3156 of the first print head row 3155; and releasing the second material 3115 from the plurality of print heads 3156 of the second print head row 3157.

Alternatively, in response to determining that the printing assembly 3150 is positioned at the translated position 3253, the computer readable and executable instructions, when executed by the processor of the control system 3010, transmits a signal to the printing head 3154 to terminate release of the first material 3114 and the second material 3115 from the plurality of print heads 3156 of the first print head row 3155 and the second print head row 3157, respectively. Additionally and/or simultaneously, the control system 3010 transmits a signal to the first actuator assembly 3102 to terminate movement of the printing assembly 3150 along the working axis 3116.

Still referring to FIG. 77B, with the printing assembly 3150 positioned at the translated position 3253 the plurality of pixels positioned along the build area 3120 have at least received one of the first material 3114 and the second material 3115 thereon during the first pass of the printing assembly 3150 based on a relative position of the pixel. Accordingly, with the first print head row 3155 and the second print head row 3157 of print heads 3156 remaining in a relatively fixed position during the first pass of the printing assembly 3150 over the build area 3120, each of the plurality of pixels along the build area 3120 may only receive one of either the first material 3114 or the second material 3115 based on an alignment of the pixel to a jet nozzle 3158 of a print head 3156 of either the first print head row 3155 or the second print head row 3157.

Referring to FIG. 84 at step 3608, with movement of the printing assembly 3150 ceased and release of the materials 3114, 3115 from the print head rows 3155, 3157 of print heads 3156 terminated, the computer readable and executable instructions executed by the processor of the control system 3010 causes the apparatus 3100 to determine whether an additional layer of material (e.g., binder) is to be deposited by the printing assembly 3150. This determination by the control system 3010 may be performed via various means and/or systems as described in detail above. In response to determining that additional layers of material are not required to be deposited at step 3608, the control system 3010 transmits a signal to the apparatus 3100 to end the additive manufacturing process of method 3600 at step 3610.

Referring back to FIG. 77B and in response to determining that additional binder or other material is required to be deposited by the printing assembly 3150 at step 3608, the control system 3010 transmits a signal to at least one actuator 3160 coupled to the plurality of print heads 3156 of the first print head row 3155 at step 3612. In this instance, the plurality of jet nozzles 3158 of the plurality of print heads 3156 defining the first print head row 3155 are moved relative the plurality of jet nozzles 3158 of the plurality of print heads 3156 defining the second print head row 3157. At step 3614, the control system 3010 transmits a signal to at least one actuator 3160 coupled to the plurality of print heads 3156 of the second print head row 3157. In this instance, the plurality of jet nozzles 3158 of the plurality of print heads 3156 defining the second print head row 3157 are moved relative the plurality of jet nozzles 3158 of the plurality of print heads 3156 defining the first print head row 3155. It should be understood that in other embodiments the plurality of print heads 3156 of the second print head row 3157 does not include an actuator coupled thereto such that step 3614 is omitted.

Referring back to FIG. 84, the computer readable and executable instructions, when executed by the processor of the control system 3010, returns the method 3600 to step 3602 and repeats the steps shown and described herein for the second pass. In particular, the computer readable and executable instructions, when executed by the processor of the control system 3010, transmits a signal to the first actuator assembly 3102 to translate the printing assembly 3150 across the build area 3120 in a second pass. In particular, the printing assembly 3150 translates across the rail 3104 of the apparatus 3100 and along the working axis 3116, thereby moving the printing head 3154 over the build area 3120 in the −X direction of the coordinate axes of the figures. The computer readable and executable instructions, when executed by the processor of the control system 3010, transmits a signal to the plurality of print heads 3156 of the first print head row 3155 to release the first material 3114 through the plurality of jet nozzles 3158 of the print heads 3156 defining the first print head row 3155. The control system 3010 transmits a signal to the plurality of print heads 3156 of the second print head row 3157 to release the second material 3115 through the plurality of jet nozzles 3158 of the print heads 3156 defining the second print head row 3157.

Accordingly, the first material 3114 is transferred from the first fluid reservoir 3110 to the print heads 3156 of the first print head row 3155 and deposited onto the build area 3120 through the plurality of jet nozzles 3158 as the printing assembly 3150 moves across the build area 3120 in the second pass. The second material 3115 is transferred from the second fluid reservoir 3112 to the print heads 3156 of the second print head row 3157 and deposited onto the build area 3120 through the plurality of jet nozzles 3158 as the printing assembly 3150 moves across the build area 3120 in the second pass. As seen in FIG. 77B, the first material 3114 may be deposited during the second pass on pixels along the build area 3120 that received the second material 3115 during the first pass. Additionally, the second material 3115 may be deposited during the second pass on pixels of the build area 3120 that received the first material 3114 during the first pass. In this instance, the apparatus 3100 is operable to deposit multiple materials 3114, 3115 on the build area 3120, and in particular along similar pixels of the build area 3120 such that one or more pixels may receive multiple materials 3114, 3115 thereon. The control system 3010 proceeds to repeats the steps described in detail above until the three-dimensional part to be printed by the apparatus 3100 is complete and no additional layers of material are to be deposited at step 3608.

Although the present example of the exemplary method 3600 depicts and describes the printing assembly 3150 of the apparatus 3100 being initially positioned at the home position 3151 prior to moving to the translated position 3253, and the plurality of print heads 3156 of the first print head row 3155 and/or the second print head row 3157 being arranged in the default position prior to moving to a plurality of actuated positions, it should be understood that in other embodiments the printing assembly 3150 may initially be positioned at the translated position 3253 and the plurality of print heads 3156 of the print head rows 3155, 3157 arranged in a position other than the default position without departing from the scope of the present disclosure. Moreover, it should be understood that the exemplary method 3600 described and shown herein may be performed by various other printing assemblies other than the printing assembly 3150, such as, for example, the three-row printing assembly described above. It should further be understood that in some embodiments one or more steps of the method 3600 described above may be adjusted, varied, and/or omitted entirely, including but not limited to steps of releasing materials from the plurality of jet nozzles 3158 onto the plurality of pixels of the build area 3120, determining whether the printing assembly 3150 is at the translated position 3253; ceasing material release from the plurality of jet nozzles 3158, ceasing movement of the printing assembly 3150, and/or the like.

Referring now to the flow diagram of FIG. 85, an exemplary method 3700 of actuating the multiple print head rows 3155, 3157 of the printing assembly 3150 as the manufacturing apparatus 3100 builds an object is schematically depicted. More specifically, movement of the multiple print head rows 3155, 3157 of the plurality of print heads 3156 for depositing binder material 3050 and/or other materials 3114, 3115 along the build area 3120 serves to reduce an occurrence of a resolution defect on the printed object or part during the image transfer process due to lack of jetting redundancy. The depiction of FIG. 85, and the accompanying description below, is not meant to limit the subject matter described herein or represent an exact description of how materials may be deposited from the printing assembly 3150, but instead is meant to provide a simple schematic overview to illustrate the general movement of multiple print head rows 3155, 3157 of print heads 3156 of the printing assembly 3150 to improve jetting redundancy as described herein.

At step 3702, the computer readable and executable instructions, when executed by the processor of the control system 3010, transmits a signal to the first actuator assembly 3102 to translate the printing assembly 3150 across the build area 3120 in a first pass. In particular, the printing assembly 3150 translates across the rail 3104 of the apparatus 3100 and along the working axis 3116, thereby moving the printing head 3154 over the build area 3120 in the +X direction of the coordinate axes of the figures. The computer readable and executable instructions, when executed by the processor of the control system 3010, further transmits a signal to the plurality of print heads 3156 of the first print head row 3155 and the second print head row 3157 to release a material from the plurality of jet nozzles 3158 of each, as the printing head 3154 moves over the build area 3120. The material (e.g., the binder material 3050, the first material 3114, the second material 3115, and the like) is transferred to the printing head 3154 and deposited onto the build area 3120 through the plurality of jet nozzles 3158 of the plurality of print heads 3156 in both the first print head row 3155 and the second print head row 3157.

In the present example, the plurality of print heads 3156 of the first print head row 3155 and the plurality of print heads 3156 of the second print head row 3157 deposit the same material (e.g., the binder material 3050, the first material 3114, the second material 3115, and the like) along the build area 3120. Accordingly, each of the plurality of jet nozzles 3158 of the plurality of print heads 3156 from the first print head row 3155 and the second print head row 3157 jet the material on at least one pixel positioned along the build area 3120. In this instance, the plurality of print heads 3156 of the first print head row 3155 and the second print head row 3157 are in a default position (see FIG. 61) relative one another as the printing assembly 3150 begins to deposit the material onto the build area 3120 of the apparatus 3100.

Still referring to FIG. 85 and at step 3704, the computer readable and executable instructions, when executed by the processor of the control system 3010, transmits a signal to at least one actuator 3160 of the printing head 3154 to move at least one of the first print head row 3155 and/or the second print head row 3157 of the plurality of print heads 3156 relative one another. In other words, as the printing assembly 3150 moves across the build area 3120 at step 3702, and as the plurality of print heads 3156 release material through the plurality of jet nozzles 3158 onto the pixels of the build area 3120, at least one actuator 3160 that is coupled to at least one of the first print head row 3155 and/or the second print head row 3157 is simultaneously actuated. The first print head row 3155 and/or the second print head row 3157 is translated along a plurality of directions that are transverse to the working axis 3116 of the apparatus (i.e., +/−Y direction of the coordinate axes of the figures) to thereby move the plurality of jet nozzles 3158 of the print heads 3156 located in the respective print head row 3155, 3157 from the default position (see FIG. 61) to a plurality of positions.

It should be understood that the first print head row 3155 and/or the second print head row 3157 of the plurality of print heads 3156 are continuously actuated (i.e. translated) to the plurality of positions at step 3704 as the printing assembly 3150 moves across the build area 3120 and releases the material thereon along the plurality of pixels of the build area 3120. Accordingly, the first print head row 3155 and/or the second print head row 3157 is positioned in a plurality of arrangements relative one another at step 3704 during the material deposition process. In the present example, the printing assembly 3150 includes an actuator 3160 coupled to each of the first print head row 3155 and the second print head row 3157 of print heads 3156, respectively, such that both print head rows 3155, 3157 are movable relative one another and relative the support bracket 3152 of the printing assembly 3150. In this instance, the plurality of jet nozzles 3158 of each of the plurality of print heads 3156 defining the first print head row 3155 and the second print head row 3157 are continuously repositioned from a default position to an actuated position that differs from the default position by at least some incremental distance (e.g., incremental distances A-G of FIGS. 74A-74G). Accordingly, during a first pass of the printing assembly 3150 over the build area 3120 the plurality of pixels positioned along the build area 3120 will receive material thereon from multiple jet nozzles 3158 during the first pass.

It should be understood that in some embodiments movement of the first print head row 3155 and the second print head row 3157 relative one another, and relative to a prior position of said print head rows 3155, 3157 during the current pass of the printing assembly 3150 over the build area 3120, may be arbitrary. In this instance, the computer readable and executable instructions, when executed by the processor of the control system 3010, transmits a signal to the actuators 3160 to move the first print head row 3155 and the second print head row 3157 of the plurality of print heads 3156 to a plurality of randomly generated positions relative one another. In this embodiment, a jetting redundancy by the printing assembly 3150 is provided through the continuous repositioning of the plurality of print heads 3156 of each print head row 3155, 3157 in an uncalculated manner such that the plurality of pixels along the build area 3120 are effectively aligned with a plurality of jet nozzles 3158 during a current pass of the printing assembly 3150.

In other embodiments, movement of the first print head row 3155 and the second print head row 3157 relative one another, and relative to a prior position of said print head rows 3155, 3157 during the current pass of the printing assembly 3150, may be predetermined by the control system 3010. In this instance, the computer readable and executable instructions, when executed by the processor of the control system 3010, transmits a signal to the actuators 3160 to move the first print head row 3155 and/or the second print head row 3157 of the plurality of print heads 3156 to a plurality of measured positions that vary relative to a prior position of the print head rows 3155, 3157 during said current pass. In this embodiment, a jetting redundancy by the printing assembly 3150 is provided through the continuous repositioning of the plurality of print heads 3156 of each print head row 3155, 3157 in a calculated manner such that the plurality of pixels along the build area 3120 are effectively aligned with a plurality of jet nozzles 3158 during a current pass of the printing assembly 3150.

The control system 3010 may determine the calculated positions of the plurality of print heads 3156 of the print head rows 3155, 3157 through various systems, such as, for example, a camera image, a sensor output, a calibration pattern, and the like. In either instance, the continuous movement of the first print head row 3155 and the second print head row 3157 of print heads 3156 during the first pass of the printing assembly 3150 provides an enhanced, material jetting redundancy of the manufacturing process by increasing a reliability that a complete resolution of each of the plurality of pixels on the build area 3120 receives an adequate deposition of material thereon from more than one jet nozzle 3158.

Still referring to FIG. 85, the computer readable and executable instructions, when executed by the processor of the control system 3010, determine whether the printing assembly 3150 has reached the translated position 3253 (see FIG. 1). The control system 3010 determines whether the printing assembly 3150 has reached the translated position 3253 by, for example, monitoring a relative position of the printing assembly 3150 along the rail 3104 as the printing assembly 3150 translates along the working axis 3116 of the apparatus 3100 (i.e., +X direction of the coordinate axes of the figures) to the translated position 3253. In response to determining that the printing assembly 3150 is not positioned at the translated position 3253, the computer readable and executable instructions, when executed by the processor of the control system 3010, transmits a signal to the first actuator assembly 3102 to continue translating the printing assembly 3150 across the build area 3120 at step 3502; releasing the material from the plurality of print heads 3156 of the first print head row 3155 and the second print head row 3157; and moving the first print head row 3155 and the second print head row 3157 to a plurality of positions at step 3704.

Alternatively, in response to determining that the printing assembly 3150 is positioned at the translated position 3253, the computer readable and executable instructions, when executed by the processor of the control system 3010, transmits a signal to the printing head 3154 to terminate release of the material from the plurality of jet nozzles 3158 of the plurality of print heads 3156. Additionally and/or simultaneously, the computer readable and executable instructions, when executed by the processor of the control system 3010, transmits a signal to the first actuator assembly 3102 to terminate movement of the printing assembly 3150 along the working axis 3116. With the printing assembly 3150 positioned at the translated position 3253, the plurality of pixels positioned along the build area 3120 have received the material from more than one jet nozzle 3158 during the first pass of the printing assembly 3150 over the build area 3120 due to the continuous movement of the first print head row 3155 and the second print head row 3157 during said first pass.

Still referring to FIG. 85, the computer readable and executable instructions, when executed by the processor of the control system 3010, transmits a signal to each of the actuators 3160 coupled to the first print head row 3155 of print heads 3156 and the second print head row 3157 of print heads 3156, respectively, to terminate movement of the print head rows 3155, 3157 relative one another. With movement of the printing assembly 3150 ceased and actuation of the print head rows 3155, 3157 of print heads 3156 terminated, the computer readable and executable instructions executed by the processor of the control system 3010 causes the apparatus 3100 to determine whether an additional layer of material (e.g., binder) is to be printed at step 3706. This determination by the control system 3010 may be performed via various means and/or systems as described in detail above. In response to determining that additional layers of material are not to be deposited by the apparatus 3100 at step 3706, the computer readable and executable instructions, when executed by the processor of the control system 3010, transmits a signal to the apparatus 3100 to end the manufacturing process of method 3700 at step 3708.

Alternatively, in response to determining that additional layers of material are to be deposited by the apparatus 3100 at step 3706, the computer readable and executable instructions, when executed by the processor of the control system 3010, returns the method 3700 to step 3702 and repeats the steps shown and described herein for the second pass. In this instance the instructions by the processor of the control system 3010 causes the apparatus 3100 to repeat the steps described in detail above until the three-dimensional model to be printed by the apparatus 3100 is complete and no additional layers are to be printed at step 3706.

Although the present example of the exemplary method 3700 depicts and describes the printing assembly 3150 of the apparatus 3100 being initially positioned at the home position 3151 prior to moving to the translated position 3253, and the plurality of print heads 3156 of the first print head row 3155 and/or the second print head row 3157 being arranged in the default position prior to moving to a plurality of actuated positions, it should be understood that in other embodiments the printing assembly 3150 may initially be positioned at the translated position 3253 and the plurality of print heads 3156 of the print head rows 3155, 3157 arranged in a position other than the default position without departing from the scope of the present disclosure. Moreover, it should be understood that the exemplary method 3700 described and shown herein may be performed by various other printing assemblies other than the printing assembly 3150, such as, for example, the three-row printing assembly described above. It should further be understood that in some embodiments one or more steps of the method 3700 described above may be adjusted, varied, and/or omitted entirely, including but not limited to steps of releasing materials from the plurality of jet nozzles 3158 onto the plurality of pixels of the build area 3120, determining whether the printing assembly 3150 is at the translated position 3253, ceasing material release from the plurality of jet nozzles 3158, ceasing movement of the printing assembly 3150, and/or the like.

Referring now to the flow diagram of FIG. 86, an exemplary method 3800 of actuating the multiple print head rows 3155, 3157 of the printing assembly 3150 as the manufacturing apparatus 3100 builds an object is schematically depicted. More specifically, movement of the multiple print head rows 3155, 3157 of the plurality of print heads 3156 for depositing binder material 3050 and/or other materials 3114, 3115 along the build area 3120 serves to reduce an occurrence of a resolution defect on the printed object or part during the image transfer process due to lack of jetting redundancy. The depiction of FIG. 86, and the accompanying description below, is not meant to limit the subject matter described herein or represent an exact description of how materials may be deposited from the printing assembly 3150, but instead is meant to provide a simple schematic overview to illustrate the general movement of multiple print head rows 3155, 3157 of print heads 3156 of the printing assembly 3150 to improve jetting redundancy as described herein.

At step 3802, the computer readable and executable instructions, when executed by the processor of the control system 3010, receives an input of a programmable build size for the printing assembly 3150 to employ prior to initiating the material deposition process. As briefly described above, the printing assembly 3150 is configured to dynamically adjust an effective build size of the printing head 3154 in response to moving at least one of the plurality of print heads 3156 defining the first print head row 3155 and/or the second print head row 3157. It should be understood that a build size of the printing head 3154 corresponds to a lateral width (in the +/−Y axes of the coordinate axes of the figures) of a jetting range and/or field of view of the plurality of print heads 3156 disposed therein. A jetting range of the printing head 3154 may be dynamically adjusted (e.g., increased or decreased) by moving the plurality of print heads 3156 of the first print head row 3155 and the second print head row 3157 relative to one another and the support bracket 3152 of the printing assembly 3150 to a plurality of arrangements (in the +/−Y axes of the coordinate axes of the figures).

For example, a build size and/or width of the printing head 3154 may be relatively minimal by substantially aligning the plurality of print heads 3156 of the first print head row 3155 and the second print head row 3157 with one another, in the +/−Y axes of the coordinate axes of the figures, such that an overall jetting range of the printing head 3154 (in the +/−Y axes of the coordinate axes of the figures) is minimized. In other words, the plurality of print heads 3156 of the first print head row 3155 and the second print head row 3157 are translated in the +/−Y axes of the coordinate axes of the figures to substantially overlap with one another in the +/−X axes of the coordinate axes of the figures. Examples of the printing head 3154 of the printing assembly 3150 including a relatively minimal build size in response to actuating the plurality of print heads 3156 of the first print head row 3155 and the second print head row 3157 to form an overlap of the plurality of jet nozzles 3158 (in the +/−Y axes of the coordinate axes of the figures) is shown in FIGS. 74A-74C.

By way of further example, a build size and/or width of the printing head 3154 may be relatively great by substantially offsetting the plurality of print heads 3156 of the first print head row 3155 and the second print head row 3157 with one another, in the +/−Y axes of the coordinate axes of the figures, such that an overall jetting range of the printing head 3154 (in the +/−Y axes of the coordinate axes of the figures) is maximized. In other words, the plurality of print heads 3156 of the first print head row 3155 and the second print head row 3157 are translated in the +/−Y axes of the coordinate axes of the figures to be substantially offset with one another in the +/−X axes of the coordinate axes of the figures. Examples of the printing head 3154 of the printing assembly 3150 including a relatively maximum build size in response to actuating the plurality of print heads 3156 of the first print head row 3155 and the second print head row 3157 to laterally extend the plurality of jet nozzles 3158 (in the +/−Y axes of the coordinate axes of the figures) is shown in FIGS. 74D-74G.

Still referring to FIG. 86 at step 3804, the computer readable and executable instructions, when executed by the processor of the control system 3010, actuates the first print head row 3155 and/or the second print head row 3157 of the plurality of print heads 3156 in accordance with the build size input at step 3802. It should be understood that a build size input may be arbitrary such that the effective print width of the printing assembly 3150 is randomly generated; it may be precalculated by the control system of the apparatus 3100 such that the effective print width of the printing assembly 3150 is predefined; and/or it may be manually identified by an operator of the apparatus 3100. At step 3806, the computer readable and executable instructions, when executed by the processor of the control system 3010, transmits a signal to the first actuator assembly 3102 to translate the printing assembly 3150 across the build area 3120 in a first pass. In particular, the printing assembly 3150 translates across the rail 3104 of the apparatus 3100 and along the working axis 3116, thereby moving the printing head 3154 over the build area 3120 in the +X direction of the coordinate axes of the figures. The computer readable and executable instructions, when executed by the processor of the control system 3010, further transmits a signal to the plurality of print heads 3156 of the first print head row 3155 and the second print head row 3157 to release a material from the plurality of jet nozzles 3158 of each, as the printing head 3154 moves over the build area 3120. The material (e.g., the binder material 3050, the first material 3114, the second material 3115, and the like) is transferred to the printing head 3154 and deposited onto the build area 3120 through the plurality of jet nozzles 3158 of the plurality of print heads 3156 in both the first print head row 3155 and the second print head row 3157.

In the present example, the plurality of print heads 3156 of the first print head row 3155 and the plurality of print heads 3156 of the second print head row 3157 deposit the same material (e.g., the binder material 3050, the first material 3114, the second material 3115, and the like) along the build area 3120. Accordingly, each of the plurality of jet nozzles 3158 of the plurality of print heads 3156 from the first print head row 3155 and the second print head row 3157 jet the material on at least one pixel positioned along the build area 3120. In this instance, the plurality of print heads 3156 of the first print head row 3155 and the second print head row 3157 are in an actuated position relative one another, in accordance with the inputted build size of step 3802, as the printing assembly 3150 begins to deposit the material onto the build area 3120 of the apparatus 3100.

Still referring to FIG. 86, the computer readable and executable instructions, when executed by the processor of the control system 3010, determines whether the printing assembly 3150 has reached the translated position 3253 located in the +/−X direction at or past an edge of the build area 3120 where material is to be deposited by the printing assembly 3150 in the first pass. The control system 3010 determines whether the printing assembly 3150 has reached the translated position 3253 by, for example, monitoring a relative position of the printing assembly 3150 along the rail 3104 as the printing assembly 3150 translates along the working axis 3116 of the apparatus 3100 (i.e., +X direction of the coordinate axes of the figures) to the translated position 3253. In response to determining that the printing assembly 3150 is not positioned at the translated position 3253, the control system 3010 transmits a signal to the first actuator assembly 3102 to continue translating the printing assembly 3150 across the build area 3120 at step 3802. The control system 3010 further transmits a signal to the printing head 3154 to release material from the plurality of jet nozzles 3158 of the plurality of print heads 3156 of the first print head row 3155 and the second print head row 3157.

Alternatively, in response to determining that the printing assembly 3150 is positioned at the translated position 3253, the computer readable and executable instructions, when executed by the processor of the control system 3010, transmits a signal to the printing head 3154 to terminate release of the material from the plurality of jet nozzles 3158 of the plurality of print heads 3156 of the first print head row 3155 and the second print head row 3157. Additionally and/or simultaneously, the control system 3010 transmits a signal to the first actuator assembly 3102 to terminate movement of the printing assembly 3150 along the working axis 3116 by ceasing actuation of the first actuator assembly 3102. With the printing assembly 3150 positioned at the translated position 3253, the plurality of pixels positioned along the build area 3120 have received material thereon from at least the first print head row 3155 or the second print head row 3157 during the first pass of the printing assembly 3150 over the build area 3120 in the +X direction of the coordinate axes.

Still referring to FIG. 86 and at step 3808, the control system 3010 determines whether a layer of material (e.g., binder) is to be deposited from the printing assembly 3150. This determination by the control system 3010 may be performed via various means and/or systems as described in detail above. In response to determining that an additional layer of material (e.g., binder) is not to be deposited from the printing assembly 3150 at step 3808, the control system 3010 transmits a signal to the apparatus 3100 to end the manufacturing process of method 3800 at step 3810. Alternatively, in response to determining that an additional layer of material (e.g., binder) is to be deposited from the printing assembly 3150 at step 3808, the computer readable and executable instructions, when executed by the processor of the control system 3010, verifies whether an identical build size of the printing assembly 3150 is to be utilized by the apparatus 3100 for a second pass of the printing assembly 3150 across the build area 3120 at step 3812.

In response to the control system 3010 of the apparatus 3100 determining that a different build size is to be effectively employed by the printing assembly 3150 at step 3812, the instructions executed by the processor of the control system 3010 returns the method 3800 to step 3802 and repeats the steps shown and described herein for the second pass determine a new effective build size of the printing assembly 3150. Alternatively, in response to the control system 3010 of the apparatus 3100 determining that an identical build size is to be effectively employed by the printing assembly 3150 at step 3812, the executed by the processor of the control system 3010 returns the method 3800 to step 3806 and repeats the steps shown and described herein for the second pass. In either instance, the instructions causes the apparatus 3100 to repeat the steps described in detail above until the three-dimensional model to be printed by the apparatus 3100 is complete and no additional layers of material are to be deposited at step 3808.

Although the present example of the exemplary method 3800 depicts and describes the printing assembly 3150 of the apparatus 3100 being initially positioned at the home position 3151 prior to moving to the translated position 3253, and the plurality of print heads 3156 of the first print head row 3155 and/or the second print head row 3157 being arranged to define a selected build size prior to the printing assembly 3150 moving across the build area 3120, it should be understood that in other embodiments the printing assembly 3150 may initially be positioned at the translated position 3253 and the build size of the printing assembly 3150 employed during and/or after the printing assembly 3150 moves across the build area 3120 during a first pass. Additionally, the plurality of print heads 3156 of the print head rows 3155, 3157 may be arranged in a plurality of other positions other than those shown and described in FIGS. 74A-74G above without departing from the scope of the present disclosure. Moreover, it should be understood that the exemplary method 3800 described and shown herein may be performed by various other printing assemblies other than the printing assembly 3150, such as, for example, the three-row printing assembly described above. It should further be understood that in some embodiments one or more steps of the method 3800 described above may be adjusted, varied, and/or omitted entirely, including but not limited to steps of releasing materials from the plurality of jet nozzles 3158 onto the plurality of pixels of the build area 3120, determining whether the printing assembly 3150 is at the translated position 3253; ceasing material release from the plurality of jet nozzles 3158, ceasing movement of the printing assembly 3150, and/or the like.

Referring now to the flow diagram of FIG. 87, an exemplary method 3900 of indexing a printing assembly 3150 using a second actuator assembly as described and depicted with reference to FIGS. 78A-78E is depicted. More specifically, the method 3900 may be implemented by a control system 3010 (e.g., an electronic control unit) of the apparatus 3100 depicted and described herein. It should be understood that while FIGS. 81-32 depict and describe various methods, each of the methods and steps thereof may be combined to form logic and operations that are carried out by the apparatus 3100 described herein.

Referring to FIG. 87, in particular, at block 3902, an electronic control unit may receive build instructions for building a component. The build instructions may be generated by a computing device 3015 (FIG. 58B) implementing logic such as a slicing engine that defines how an apparatus may operate and what materials to use to build a particular component based on an inputted a model or drawing.

The slicing engine may define a plurality of pixels and/or sub-pixel centers. Once the layers, pixels, and/or sub-pixel centers are defined, a slicing engine may begin determining the amount of binder to deposit within each pixel within each layer. The predetermined amount of binder and the pixels defining a binder-receiving surface of a layer are combined to define a design deposition pattern for the layer of the component to be built. The build instructions may include a deposition pattern (e.g., 3125, 3126, or 3127, FIGS. 78C-78E, respectively) defining the locations and amounts of binder to be deposited on layers of powder on the build area 3120. The build instructions further include predefined motion controls for the first and second actuator assemblies 3102 and 3103.

At block 3904, the electronic control unit of the apparatus may actuate the printing head position control assembly (e.g., the first actuator assembly 3102, the second actuator assembly 3103, and other components) in accordance with the received build instructions. For example, the electronic control unit transmits one or more control signals that cause the first actuator assembly 3102 and/or the second actuator assembly 3103 to perform a movement defined by the build instructions. As described above, the actuators may include, without limitation, a worm drive actuator, a ball screw actuator, a pneumatic piston, a hydraulic piston, an electro-mechanical linear actuator, or the like. As such, a control signal from the electronic control unit may cause a motor associated with a worm drive actuator or a ball screw actuator to energize for a period of time or until a number of revolutions are completed to cause the predetermined motion defined by the build instructions. In some instances, the first actuator assembly 3102 and/or the second actuator assembly 3103 may include a position sensor (e.g., 3102*a* and/or 3103*a*) that provides the electronic control unit with position information in a feedback control signal such that the electronic control unit may track the position of the printing assembly 3150 in response to the provided control signals. In some instances the electronic control unit may make adjustments to the control signal provided to the first actuator assembly 3102 and/or the second actuator assembly 3103 based on the position information provided by the position sensor (e.g., 3102*a* and/or 3103*a*). In embodiments, the position sensor (e.g., 3102*a* and/or 3103*a*) may be an encoder, an ultrasonic sensor, a light based sensor, a magnetic sensor, or the like embedded in or coupled to the first actuator assembly 3102 and/or the second actuator assembly 3103.

At block 3906, the electronic control unit causes the printing assembly 3150 including at least one printing head 3154 to traverse the build area 3120 in a first pass trajectory along the longitudinal axis in a first direction. Moreover, the electronic control unit causes select ones of the plurality of jet nozzles 3158 to dispense one or more drops of binder or other material onto the build area 3120. The electronic control unit is communicatively coupled to one or more of the plurality of print heads 3156 such that control signals generated by the electronic control unit cause the jet nozzles associated with the print heads 3156 to dispense binder or other material at predefined locations in predefined amounts as the printing assembly 3150 traverses the build area 3120 as defined by a deposition pattern for a layer of powder of a build (e.g., 3125, FIG. 78C). Referring briefly back to FIG. 78C the first pass of the printing assembly 3150 may deposit binder in locations and amounts as depicted by an illustrative representation of a deposition pattern 3125. During the first pass, the jet nozzles 3158 (e.g., depicted in FIG. 78A) are aligned with the first pass trajectories depicted with hash markings and deposit amounts of binder as indicated by the values within each sub-pixel region along the first pass trajectory.

Once a pass of the build area is completed by the printing assembly 3150, the electronic control unit, based on the build instructions, determines whether indexing of the printing assembly 3150 along the latitudinal axis is required, at block 3908. If indexing is required, ("YES" at block 3908) the electronic control unit transmits a control signal to the second actuator assembly 3103 to index the printing assembly 3150 a predefined amount (e.g., an index distance), for example, greater than zero and less than a jet-spacing (d) (or any integer multiple of the fractional jet-spacing (d) thereof) as defined by the build instructions, at block 3910. Referring to FIGS. 78A and 78B the index distance is the distance from positon $I_0$ to position $I_1$.

The method 3900 of FIG. 87 moves from block 3910 to block 3912. The printing assembly 3150 is again moved across the build area 3120, this time in a second pass in a second direction opposite the first direction along the longitudinal axis, and the electronic control unit causes select ones of the plurality of jet nozzles 3158 to dispense one or more drops of binder onto the build area 3120, at block 3912. As described above, the binder may be dispensed in multiple locations and in various amounts at locations on the layer of powder corresponding to a pixel defined in the deposition pattern as the printing assembly traverse the longitudinal axis (e.g., the working axis 3116).

As described above, the electronic control unit is communicatively coupled to one or more of the plurality of print heads 3156 such that control signals generated by the electronic control unit cause the jet nozzles associated with the print heads 3156 to dispense binder or other material at predefined locations in predefined amounts as the printing assembly 3150 traverses the build area 3120 as defined by a deposition pattern (e.g., 3125, FIG. 78C) for a layer of powder of a build. Referring briefly back to FIG. 78C the first pass of the printing assembly 3150 may deposit binder in locations and amounts as depicted by the illustrative representation of a deposition pattern 3125. During the second pass, the jet nozzles 3158 (e.g., depicted in FIG. 78B) are aligned with the second pass trajectories depicted with no hash markings in FIG. 78B and deposit amounts of binder as indicated by the values annotated within each sub-pixel region along the second pass trajectory.

If indexing of the printing assembly is not required, ("NO" at block 3908), then the method 3900 proceeds to block 3912, where the printing assembly 3150 may move across the build area in a second pass in a second direction opposite the first direction along the longitudinal axis as described herein. The method 3900 depicted in FIG. 87 may be repeated throughout the build of a component.

In some embodiments, either independent of or in conjunction with the method 3900 depicted and described with reference to FIG. 87, the method 31000 depicted and described with reference to FIG. 88 may implement a predefined random index of the printing assembly during a build to reduce the impact of a potentially malfunctioning printing head 3154 or jet nozzle 3158 on the overall quality and strength of the component being built.

Referring to FIG. 88, a flow diagram of an exemplary method 31000 of randomly indexing a printing assembly 3150 using a second actuator assembly as described and depicted with reference to FIGS. 79A-79B is depicted. For brevity and to reduce repetition, blocks 31002-31004 of method 31000 correspond to blocks 3902-3904 of method 3900 depicted and described with reference to the flow diagram of FIG. 87.

At block 31006, the electronic control unit causes the printing assembly 3150 including at least one print head 3156 and jet nozzle 3158 to traverse the build area 3120 in a first pass trajectory along the longitudinal axis in a first direction. Moreover, the electronic control unit causes select ones of the plurality of jet nozzles 3158 to dispense one or more drops of binder or other material onto the build area 3120. The electronic control unit is communicatively coupled to one or more of the plurality of print heads 3156 such that control signals generated by the electronic control unit cause the jet nozzles 3158 associated with the print heads 3156 to dispense binder or other material at predefined locations in predefined amounts as the printing assembly 3150 traverses the build area 3120 as defined by a deposition pattern for a layer of powder of a build (e.g., 3125, FIG. 78C). However, from time to time, and for various reasons a jet nozzle 3158 or a print head 3156 may malfunction causing binder or other material to not be applied in the prescribed manner. For example, referring to FIG. 79A, jet nozzles 3195*a* and 3195*b* are both malfunctioning and as they traverse the build area 3120 they fail to deposit binder along their respective trajectories 3190*a* and 3190*b*. In other words, the malfunctioning jet nozzles 3195*a* and 3195*b* fail to deposit binder at prescribed locations based on the deposition pattern defining pixels, sub-pixels, and amounts of binder to deposit in each. To reduce the impact of the component not receiving binder or other material during a pass due to a malfunctioning print head 3156 or jet nozzle 3158, the build instructions defined by the slicing engine may include random shifting or indexing of the printing assembly 3150 so that the same jet nozzle 3158 does not traverse the same trajectory on a consecutive pass or at least from time to time is aligned with a different trajectory.

Accordingly, the electronic control unit, at block 31008, determines whether an index of the printing assembly is prescribed by the build instructions and the corresponding predefined random index distance. If no index is prescribed at the completion of a pass of the printing assembly 3150 over the build area 3120, ("NO" at block 31008), then the method advances to block 31012. If indexing is prescribed at the completion of a pass of the printing assembly 3150 over the build area 3120, ("YES" at block 31008), then the method advances to block 31010. At block 31010, the electronic control unit transmits a control signal to the second actuator assembly 3103 to index the printing assembly 3150 a predefined amount (e.g., the predefined random index distance), for example, a predefined integer multiple of a jet-spacing (d) such that a first jet nozzle 3158 of the plurality of jet nozzles 3158 that corresponds to a first trajectory assigned by the build instructions during one pass of the printing assembly along the longitudinal axis is moved to corresponds to a second trajectory and another jet nozzle 3158 corresponds to the first trajectory for a subsequent pass. Referring to FIG. 79B in view of FIG. 79A, the printing assembly is indexed five jet-spacing (d) units such that the jet nozzle 3158 moves in a lateral direction five jet-spacing (d) units. More specifically, the second malfunctioning jet nozzle 3195*b* now corresponds to a new trajectory 3191 as opposed to its previous trajectory 3190*b*.

The method 31000 of FIG. 88 moves from block 31010 to block 31012. The printing assembly 3150 is again moved across the build area 3120, this time in a second pass in a second direction opposite the first direction along the longitudinal axis, and the electronic control unit causes select ones of the plurality of jet nozzles 3158 to dispense one or more drops of binder onto the build area 3120, at block 31012. As described above, the binder may be dispensed in multiple locations and in various amounts within a pixel as the printing assembly traverse the longitudinal axis (e.g., the working axis 3116). The method 31000 depicted in FIG. 88 may be repeated throughout the build of a component and in some instances be combined with the method 3900 described in FIG. 87.

Referring now to FIG. 89, an illustrative flow diagram of a method 31100 for controlling binder bleed within a component build is depicted. In addition to controlling the location and amounts of binder within a layer of a component being built by the apparatus 3100, there may also be a need to control binder bleed. Binder bleed refers to the occasions where binder from an upper layer of a component propagates into a lower layer before having time to cure or bond with the powder layer in which it was applied. As discussed above with reference to FIGS. 80A-80B, this can be a rate limiting parameter with respect to how fast subsequent layers may be built. However, the methods described herein provide a solution that reduce or eliminate the rate limiting effect of binder bleed during a build operation with the apparatus. Accordingly, components may be built at faster rates than those without implementing such methods and apparatuses.

The method described herein may be performed by an electronic control unit or computing device 3015 implementing a slicing engine and/or other motion control generating code for building a component with the apparatus 3100. Referring in particular to FIG. 89, at block 31102 a slicing engine may receive a model or drawing of the component 3200 (FIG. 80A) of a component to build. The slicing engine incorporates logic that defines build instructions including generating executable instructions for the apparatus 3100 to execute and build the modeled component. The slicing engine may first slice the model into a plurality of layers 3210 (FIG. 80B), at block 31104. Each layer may have a predetermined thickness and one or more assigned material types. At block 31106, the slicing engine may define a plurality of portions 3220 per layer. A portion 3220 is a three-dimensional portion that defines a unit volume of the component to be built where build material and binder are designed to combine to form a voxel. The portion 3220 may be an estimation of the actual dispersion behavior within the selected build material. Accordingly, the portion 3220 may be estimated to have a thickness that is equal to, or less than, or greater than the layer thickness and have a surface area about the size of the jet-spacing (d). It is understood that the portion 3220 may be further defined based on the properties of the binder and build material, the environment in which the component is built (e.g., temperature, pressure, curing energy source, etc.), the predicted or modeled interaction of the binder and build material. For purposes of explanation, the portions 3220 are assumed to have a cubic shape, however, this is only for purposes of explanation. The slicing engine may further identify portions 3220 that define a downward facing surface 3221 of the component, at block 31108. These portions 3220 defining the downward facing surface may be considered important with respect to controlling binder bleed as excess binder within these portions may result in poor surface finishes. Once the layers, image voxels, and surface defining voxels are defined, a slicing engine may determine the drop volume of binder to deposit within each portion of powder (e.g., to achieve the desired voxel) within each layer of the component. At block 31110, the slicing engine determines the quantity of vertically adjacent voxels positioned above each first portion defining a downward facing surface 3221.

At block 31112, the slicing engine determines how to treat each of the vertically adjacent voxels with respect to the amount of binder that should be applied. The determination may be made based on whether a series of vertically adjacent portions is less than, equal to, or greater than a predetermined thickness threshold. The thickness threshold is predetermined based on characteristics of the binder, powder, build speed, component features, whether a curing energy is applied, the amount of time the curing energy is applied, the energy at which it is applied and/or other aspects of the build. Referring back to block 31112, if the quantity of vertically adjacent portions 3222 is less than or equal to a predetermined thickness threshold, then the method 31100 advances to block 31114. On the other hand, at block 31112, if the quantity of vertically adjacent voxels is not less than a predetermined thickness threshold, then the method 31100 advances to block 31116.

At block 31114, the slicing engine assigns a predetermined amount of binder per portion for deposition within the first portion and each vertically adjacent portion. If the thickness threshold 3240 is three, as depicted for example in FIG. 80, then each of the vertically adjacent portions 3222 are determined to receive the same amount of binder per voxel amount. However, if the quantity of vertically adjacent portions is not less than a predetermined thickness threshold, then at block 31116 the slicing engine assigns an increasing amount of binder for deposition from the first portion to each of the vertically adjacent portions over an attenuation length 3230 up to a predetermined amount of binder per portion. For example, the binder per portion assigned in each of the vertically adjacent portions may be assigned in a linear, exponential, or other algorithmic proportion based on the vertically adjacent portions distances from the portion defining the downward facing surface. Using the method 31100 or variations thereof to determine drop volumes of binder per portion for portions extending from a downward facing surface 3221, the slicing engine at block 31118 generates a design deposition pattern (e.g., 3125 of FIG. 78C) for binder for each layer based on the vertically adjacent portions. The design deposition pattern may be executed by one or more of the methods and apparatuses described herein.

It should be understood that steps of the aforementioned processes may be omitted or performed in a variety of orders while still achieving the object of the present disclosure. The functional blocks and/or flowchart elements described herein may be translated onto machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

Based on the foregoing, it should be understood that a printing assembly, includes a support bracket and a first print head row comprising a first plurality of print heads that are sequentially spaced apart from one another in a direction that is transverse to a working axis of the printing assembly. Each of the first plurality of print heads includes a plurality of jet nozzles thereon. The printing assembly further includes a second print head row comprising a second plurality of print heads sequentially spaced apart from one another in the direction transverse to the working axis. Each of the second plurality of print heads includes a plurality of jet nozzles, and the first print head row and the second print head row are spaced apart along the working axis. The printing assembly further includes an actuator coupled to a first print head of the first plurality of print heads, and is configured to move the first print head relative to the support bracket in the direction transverse to the working axis.

It is also understood that a manufacturing apparatus may include a printing head having a plurality of jets spaced apart from one another in a direction transverse to a longitudinal axis, where a distance from a first jet to a second jet positioned adjacent the first jet of the plurality of jets defines a jet-spacing. The manufacturing apparatus may further include a printing head position control assembly having a first actuator assembly configured to move the printing head along the longitudinal axis and a second actuator assembly configured to move the printing head along a latitudinal axis and an electronic control unit communicatively coupled to the printing head position control assembly. The electronic control unit may be configured to cause select ones of the plurality of jets to dispense one or more drops of binder while the printing head traverses a first pass trajectory along the longitudinal axis in a first direction, index the printing head to a second pass trajectory along the latitudinal axis by an index distance greater than zero and less than the jet-spacing, and cause select ones of the plurality of jets to dispense one or more drops of binder while the printing head traverses the second pass trajectory along the longitudinal axis in a second direction opposite the first direction.

In further embodiments, the manufacturing apparatus may include at least one printing head comprising a plurality of jets spaced apart from one another in a direction transverse to a longitudinal axis, where a distance from a first jet to a second jet positioned adjacent the first jet of the plurality of jets defines a jet-spacing. A printing head position control assembly of the manufacturing apparatus includes a first actuator configured to move the printing head along the longitudinal axis and a second actuator configured to move the printing head along a latitudinal axis. An electronic control unit communicatively coupled to the printing head position control assembly is configured to: cause select ones of the plurality of jets to dispense one or more drops of binder to a powder layer in a deposition pattern defined by a slicing engine as the printing head traverses along the longitudinal axis applying binder, where the first jet of the plurality of jets corresponds to a first trajectory assigned by the slicing engine. The electronic control unit may further index the printing head by an integer number of pixels along the latitudinal axis such that the first jet corresponds to a second trajectory and another jet corresponds to the first trajectory assigned by the slicing engine, and cause the indexed printing head to traverse along the longitudinal axis and apply binder to the powder layer in the deposition pattern defined by the slicing engine.

In yet further embodiments, it is understood that a manufacturing apparatus may include a printing head comprising a plurality of jets spaced apart from one another in a direction transverse to a longitudinal axis, a printing head position control assembly having a first actuator configured to move the printing head along the longitudinal axis; and an electronic control unit communicatively coupled to the printing head position control assembly. The electronic control unit is configured to cause select ones of the plurality of jets to dispense a predetermined volume of binder to a powder layer in a deposition pattern defined by a slicing engine as the printing head traverses the longitudinal axis applying binder, where an amount of binder dispensed in a first portion of powder in a first layer is less than the amount of binder dispensed in a portion of powder in a second layer located above the first portion of powder in the first layer.

As noted herein, the printing assembly 3150 and methods for using the printing assembly 3150 may be used in conjunction with one or more of the embodiments of the additive manufacturing apparatuses described herein, including the method of operating an additive manufacturing apparatus as described herein with respect to FIGS. 7A-7D.

Cleaning Station

Turning now to FIGS. 90A and 90B, an embodiment of the cleaning station 110 is shown in greater detail. Although described in various embodiments as being associated with the additive manufacturing apparatus 100 of FIGS. 2 and 3, it is contemplated that the cleaning station 110 and fluid management system coupled thereto may be used with other types of additive manufacturing apparatuses known and used in the art. Moreover, the cleaning station 110 embodiments are contemplated to be incorporated or utilized in conjunction with the various additive manufacturing apparatus embodiments and components described herein.

The cleaning station 110 may comprise a cleaning station vessel 4314 positioned proximate at least one binder purge bin 4302. As shown in FIGS. 84A and 84B, the cleaning station 110 is positioned between two binder purge bins 4302, each of which is configured to receive material, such as contaminants and binder material, discharged by the print head. Although shown in FIGS. 84A and 84B as including two binder purge bins 4302, it is contemplated that in embodiments, only one binder purge bin, or more than two binder purge bins, may be included. In embodiments, the binder purge bin 4302 optionally includes a purge wiper 4303 (FIG. 90B) positioned between the binder purge bin 4302 and the wet wipe cleaner section 4304. When included, the purge wiper 4303 can contact the print head after contaminants and binder material are discharged into the binder purge bin 4302 to remove loose contaminants and binder material from the face of the print head before the print head is introduced to the wet wipe cleaner section 4304. In embodiments, the purge wiper 4303 redirects the loose contaminants and binder material into the binder purge bin 4302 for disposal, thereby reducing the amount of contaminants and binder material introduced into the cleaning station 110 during the cleaning process.

Further as shown, the cleaning station vessel 4314 is a container which includes a wet wipe cleaner section 4304, a dry wipe cleaner section 4306, and a capping section 4308. In various embodiments, the wet wipe cleaner section 4304, the dry wipe cleaner section 4306, and the capping section 4308 are sections of a cleaning station vessel 4314 containing a volume of cleaning fluid. The wet wipe cleaner section 4304 applies cleaning fluid to the print head, specifically, a faceplate of the print head. The dry wipe cleaner section 4306, which in some embodiments is downstream of the wet wipe cleaner section 4304, removes excess liquid (e.g., cleaning fluid and contaminants) from the print head in advance of binder jetting. The capping section 4308, which may be also considered an idle section, is a location where the print head may be temporarily placed in advance of binder jetting. In embodiments, the capping section 4308 supplies cleaning fluid to the print head faceplate to prevent binder from drying on the print head. Without being limited to theory, maintaining the wet wipe cleaner section 4304, the dry wipe cleaner section 4306, and the capping section 4308 within a single cleaning station vessel 4314 is highly advantageous as it streamlines cleaning fluid management by eliminating the need to control three separate cleaning station vessels. In this embodiment, cleaning fluid maintenance is limited to a single cleaning station vessel 4314.

In embodiments, the cleaning station vessel 4314 includes at least one movable wall 4316 extending vertically upward (e.g., +/−Z) from the cleaning station vessel 4314 and in a direction parallel to a direction of movement of the print head 150 through the cleaning station 110 (e.g., +/−X). When included, the movable wall 4316 redirects cleaning fluid into the cleaning station vessel 4314. For example, cleaning fluid that is splashed, such as from the movement of the wet wipe member 4310 and/or the dry wipe member 4312 into and out of the cleaning station vessel 4314, may be redirected back into the cleaning station vessel 4314 rather than being lost into the environment (e.g., onto the floor). In embodiments, the movable wall 4316 may be coupled to one or more actuators to enable movement of the wall. For example, the movable wall 4316 may be moved in the +Z direction when the print head 150 enters the cleaning station 110, and in the −Z direction when the print head 150 leaves the cleaning station 110. Additionally or alternatively, the movable wall 4316 may be moved along the +/−X direction through the cleaning station 110 along a path parallel to the path of the print head 150.

In embodiments, the movable wall 4316 is coupled to the wall of the cleaning station vessel 4314 through a guide slot (not shown), and is movable within the guide slot. Accordingly, in the event that the print head 150 or another item contacts the movable wall 4316, the movable wall 4316 will yield (e.g., move) rather than causing damage to the print head 150 or other part of the additive manufacturing apparatus 100. It is contemplated that the movable wall 4316 could be coupled to the wall of the cleaning station vessel 4314 in other ways, including through the use of magnetic mounts, bolts, or slotted holes, for example.

In embodiments, the cleaning station vessel 4314 is in fluid communication with an overflow vessel 4318, as shown in FIG. 90C, such as through a fluid level wall 4320. Accordingly, the cleaning fluid may be continuously pumped into the cleaning station vessel 4314, as will be described in greater detail below. When the cleaning fluid in the cleaning station vessel 4314 reaches the top of the fluid level wall 4320, the cleaning fluid flows over the fluid level wall 4320 and into the overflow vessel 4318. In embodiments, the overflow vessel 4318 includes at least two fluid level sensors 4322, each positioned at a different vertical position within the overflow vessel 4318. Accordingly, cleaning fluid is pumped into the cleaning station vessel 4314, flows over the fluid level wall 4320 and into the overflow vessel 4318 until both of the fluid level sensors 4322 detect cleaning fluid, indicating that the fluid level of the cleaning fluid within the overflow vessel 4318 is at or above the vertical position of the fluid level sensor 4322 that is closer to the top of the overflow vessel 4318. In response to both of the fluid level sensors 4322 detecting the fluid, cleaning fluid is pumped out of the overflow vessel 4318, such as through an active drain 4824 in the overflow vessel 4318, until neither of the fluid level sensors 4322 detects the fluid, indicating that the fluid level of the cleaning fluid within the overflow vessel 4318 is below the vertical position of the fluid level sensor 4322 that is closer to the bottom of the overflow vessel 4318. In embodiments, the fluid level wall 4320 can be adjusted to control the vertical height of the top of the fluid level wall 4320 and, accordingly, the fluid level within the cleaning station vessel 4314.

In the embodiments described herein, the print head 150 may deposit the binder material 500 on a layer of build material 400 distributed on the build platform 120 through an array of nozzles 172 located on the underside of the print head 150 (i.e., the surface of the print head 150 facing the build platform 120). In one or more embodiments, the nozzles 172 may be piezoelectric print nozzles and, as such, the print head 150 is a piezo print head. In alternative embodiments, the nozzles 172 may be thermal print nozzles and, as such, the print head 150 is a thermal print head.

In general, after the print head 150 has deposited the binder material 500 on the layer of build material 400 positioned on the build platform 120 (FIG. 2), it is moved to the binder purge bin 4302, where contaminants are dislodged via backpressure and, in embodiments, using binder material 500 ejected from the print head nozzles. In embodiments including a purge wiper 4303 (FIG. 90B), the print head 150 is wiped by the purge wiper 4303 as it is moved from the binder purge bin 4302 toward the wet wipe cleaner section 4304 to direct loose contaminants and binder material from the face of the print head 150 into the binder purge bin 4302. Next, the print head 150 is moved to the wet wipe cleaner section 4304 where a cleaning fluid is applied to the print head 150 and contaminants are mechanically removed from the print head 150. The print head 150 is then moved to the dry wipe cleaner section 4306 where the cleaning fluid and remaining contaminants are removed, before the print head 150 is moved to the second binder purge bin 4302. At the second binder purge bin 4302, any remaining contaminants are dislodged and the binder meniscus is reestablished by ejecting binder material 500 from the print head nozzles. In embodiments in which the print head 150 is idle, instead of moving to the second binder purge bin 4302, the print head 150 may be moved to the capping section 4308 where it is kept moist to prevent the binder material from drying out and clogging the nozzles of the print head 150. Each of the sections of the cleaning station 110 will now be described in greater detail.

Cleaning Station—Wet Wipe Cleaner Section

Various suitable embodiments are contemplated for the wet wipe cleaner section 4304. As shown in FIGS. 84A and 84B, the wet wipe cleaner section 4304 comprises a wet wipe member 4310. The wet wipe member 4310 comprises any suitable mechanism for passively applying cleaning fluid to a print head, for example, a brush, a squeegee, and the like. As used herein, "passively applying" means the wet wipe member 4310 contacts the print head as it traverses the wet wipe cleaner section 4304. The wet wipe member 4310 is connected to one or more actuators 4311 that raise or lower the wet wipe member within the wet wipe cleaner section 4304 of the cleaning station vessel 4314. The actuators may comprise linear actuators, rotary actuators, or electric actuators. While various actuators and actuator locations are considered suitable, the actuators 4311 depicted in FIGS. 84A and 84B are disposed primarily outside the cleaning station vessel 4314. Without being bound by theory, minimizing actuator 4311 contact with the cleaning fluid, especially contact with any electronic components of the actuators 4311, may be beneficial in maintaining actuator performance. Thus, some embodiments will include the actuators 4311 primarily positioned outside the cleaning station vessel 4314.

Referring now to FIGS. 91A-E, additional embodiments of the wet wipe cleaner section 4304 are schematically depicted. Specifically as shown in FIGS. 91A-91E, a wet wipe member 4310 for applying cleaning fluid to the print head 150 is depicted. The wet wipe member 4310 includes at least one wiper blade 4406 vertically extending from the top side 4402 of the wet wiper body 4401. In the embodiment shown in FIGS. 91A and 91B, the wet wipe member 4310 includes a first wiper blade **4406*a* and a second wiper blade 4406*b* (collectively, the wiper blades 4406), spaced apart from one another. In the embodiment shown in FIG. 91C, the wet wipe member 4310 includes a single wiper blade 4406. Accordingly, any number wiper blades may be included in the wet wipe member 4310**.

Although the wet wipe member 4310 is described in various embodiments as including at least one wiper blade 4406, in embodiments, the wet wipe member 4310 does not include wiper blades, as shown in FIG. 91E.

A fluid channel 4408 extends horizontally from a first end 4410 of the wet wiper body 4401 to a second end 4412 of the wet wiper body 4401, as shown in FIGS. 91A-91C, and defines a recessed path within the wet wiper body 4401. The fluid channel 4408 has an open top to allow cleaning fluid to flow out of the fluid channel 4408. The rate of the flow of the cleaning fluid through the fluid channel 4408 is controlled in embodiments, thereby enabling control of the height of a fluid wall 4418 created by the cleaning fluid, shown in FIG. 91E. In embodiments, such as the embodiment shown in FIGS. 91A and 91B, the fluid channel 4408 is positioned between the first wiper blade **4406*a* and the second wiper blade 4406*b*. Although the wiper blades 4406 and the fluid channel 4408 are described herein as extending from a first end 4410 to the second end 4412 of the wet wiper body 4401, in embodiments, the wet wiper body 4401 has a length from the first end 4410 to the second end 4412 that is greater than a length of the wiper blades 4406 and/or the fluid channel 4408. For example, in embodiments, the wiper blades 4406 and/or the fluid channel 4408 may be positioned within the wet wiper body 4401 with the wet wiper body 4401 extending about 1 mm, about 2 mm, about 5 mm, or about 10 mm on each end. This additional length of the wet wiper body 4401 can enable, for example, the wet wiper body 4401 to extend from end to end of the cleaning station while the wiper blades 4406 and/or the fluid channel 4408** are sized to have substantially the same length as the print head.

As shown in FIG. 91E, in embodiments in which the wet wipe member 4310 does not include wiper blades 4406, the flow of the cleaning fluid through the fluid channel 4408 is controlled to provide a touchless wiping system that uses the fluid wall 4418 to wipe contaminants from the print head without requiring the use of wiper blades. Moreover, in embodiments, a vacuum wipe member 4420 (FIG. 91F) may be included. The vacuum wipe member 4420 may be similar in structure to the wet wipe member 4310, including a channel 4422 and optionally one or more wiper blades 4406. However, the channel 4422 in the vacuum wipe member 4420 enables process gasses (e.g., air, argon, nitrogen, or the like) to be drawn through the channel, thereby generating a vacuum effective to pull liquids and contaminants off of the print head as it passes over the vacuum wipe member 4420. When included, the vacuum wipe member 4420 is coupled to a pump (not shown) for generating the vacuum as well as at least one filter (not shown) to prevent contaminants from being pulled into the pump. In embodiments, the vacuum wipe member 4420 can be included with a wet wipe member 4310, such as the wet wipe member 4310 shown in any of FIGS. 91A-E, or can be independently included in the cleaning station 110.

In embodiments, each of the wiper blades **4406*a* has the same vertical (e.g., +/−Z) position as the other blades 4406*b*, as shown in FIG. 91A. Accordingly, all of the wiper blades 4406*a*, 4406*b* has the same engagement distance with the print head 150 during wiping operations. As is known in the art, the "engagement distance" refers to the amount by which the vertical position of the print head 150 and the vertical position of an undeflected wiper blade 4406 overlap. However, in embodiments, one or more wiper blades 4406*a* are positioned at a first vertical position while one or more wiper blades 4406*b* are positioned at a second vertical position, as shown in FIG. 91G. In such embodiments, a least one wiper blade 4406*a* has a different engagement distance than the wiper blades 4406*b*. For example, the wiper blades 4406 may be positioned such that the engagement distance with the print head 150 increases along the path of the print head 150** during the wet wiping process.

As shown in FIGS. 91A-C, the wet wipe member 4310 further includes a cleaning manifold 4414 that extends below the fluid channel 4408 within the wet wiper body 4401. The cleaning manifold 4414 is in fluid communication with the fluid channel 4408 through at least one fluid port 4407 to provide cleaning fluid from the cleaning manifold 4414 to the top side 4402 of the wet wiper body 4401, e.g., via the fluid channel 4408. In the embodiment shown in FIG. 91B, twelve fluid ports 4407 provide cleaning fluid from the cleaning manifold 4414 to the fluid channel 4408. Each fluid port 4407 may have a circular cross-section, a square cross-section, or other cross-section suitable for fluid flow. However, in the embodiment shown in FIG. 91D, one fluid port 4407 provides cleaning fluid from the cleaning manifold 4414 to the fluid channel 4408. The fluid port 4407 in FIG. 91D extends from the first end 4410 to the second end 4412 of the wet wiper body 4401 and has a substantially rectangular cross-section. Other shapes, sizes, and quantities of fluid ports are possible and contemplated. In embodiments, such as the embodiment shown in FIG. 91B where the fluid channel 4408 is positioned between first and second wiper blades 4406, the fluid port 4407 is also disposed between the first and second wiper blades 4406.

In various embodiments, the cleaning fluid is provided to the cleaning manifold 4414 through a plurality of cleaning fluid inlets 4416 that are fluidly coupled to a cleaning fluid reservoir or cleaning fluid management system, described in greater detail below. The plurality of cleaning fluid inlets 4416 may be, for example, fluid conduits that extend vertically upward through the bottom side 4404 of the wet wiper body 4401. However, in embodiments, the plurality of cleaning fluid inlets 4416 additionally or alternatively extend from a side 4403 of the wet wiper body 4401 adjacent to the top side 4402 and the bottom side 4404 of the wet wiper body 4401. The plurality of cleaning fluid inlets 4416 are operable to receive the cleaning fluid and provide the cleaning fluid to the cleaning manifold 4414. The cleaning fluid inlets 4416 are in fluid communication with the fluid port 4407 through the cleaning manifold 4414 such that cleaning fluid enters the cleaning manifold 4414 through the cleaning fluid inlets 4416 and exits the cleaning manifold 4414 through the fluid port 4407.

As stated above, the wet wipe member 4310 is coupled to one or more actuators 4311 which are operable to raise or lower the wet wipe member 4310 into and out of the volume of the cleaning fluid. For example, the wet wipe member 4310 may be actuated just prior to the print head 150 moving to the wet wipe cleaner section 4304 such that the wet wipe member 4310 is raised out of the volume of the cleaning fluid and contacts the print head 150 as it is moved through the wet wipe cleaner section 4304. In various embodiments, the wet wipe member 4310 is actuated as close to the time that it will make contact with the print head 150 as possible, so as to ensure that the wiper blades 4406 are wet with cleaning fluid, although it is contemplated that some period of time may pass between the wet wipe member 4310 being raised out of the volume of the cleaning fluid and making contact with the print head 150.

As another example, the wet wipe member 4310 may be actuated after the print head 150 has moved to the dry wipe cleaner section 4306 such that the wet wipe member is lowered into the volume of the cleaning fluid. The lowering of the wet wipe member into the cleaning fluid may wash away contaminants on the surface of the wiper blades 4406 and clean the wet wipe member 4310, thereby reducing the likelihood that the wet wipe member 4310 will introduce contaminants to the print head 150. Additional details on the actuation of wet wipe member 4310 embodiments are described below.

In various embodiments, the cleaning manifold 4414 fills with the cleaning fluid and feeds the fluid channel 4408, which fills from the bottom of the fluid channel 4408. In embodiments in which the fluid channel 4408 is positioned between the wiper blades 4406, the cleaning fluid forms a pool of cleaning fluid between the wiper blades 4406. In one or more embodiments, the cleaning fluid flows over the sides of the fluid channel 4408 and into overflow drains, which return the cleaning fluid to the cleaning manifold 4414. In further embodiments, the cleaning fluid is fed through the wet wipe member 4310 continuously during operation of the additive manufacturing apparatus. After the wet wipe member applies liquid to the print head, the liquid then overflows back into the cleaning station vessel 4314. As described more below, within the cleaning station vessel 4314, there is a drain 4824 (see FIG. 90B), which directs cleaning fluid into a cleaning fluid reservoir 4816 (see FIG. 95), and is then pumped back into the wet wipe member 4310. The continuous cleaner circulation and recirculation is described more below.

Accordingly, when the wet wipe member 4310 is actuated, cleaning fluid is supplied to the print head 150 to dissolve contaminants while the wiper blades 4406 mechanically remove contaminants. While the cleaning fluid may dissolve the contaminants in some cases, the contaminants may also be considered as mixed or suspended within the cleaning fluid. The cleaning manifold 4414 and the fluid channel 4408 ensure that cleaning fluid can be directly applied to the print head 150 during cleaning while compensating for any delay that may result from the use of pumps in the fluid management system, as will be discussed in greater detail below. In particular, the cleaning manifold 4414 and the fluid channel 4408 provide a local reservoir of cleaning fluid that can be used even when the pumps are not actively providing cleaning fluid to the wet wipe member 4310.

In the embodiment depicted in FIG. 91A, the cleaning fluid does not flow to the top of the wiper blades 4406. However, it is contemplated that in other embodiments, a pair of walls extends between the first wiper blade 4406*a* and the second wiper blade 4406*b* from the top side 4402 of the wet wiper body 4401 to a top of each of the first wiper blade 4406*a* and the second wiper blade 4406*b*. The pair of walls thus extends the depth of the fluid channel 4408 to the top of the wiper blades 4406, enabling the cleaning fluid to fill up to the top of the wiper blades 4406. Such embodiments may enable greater dissolution of contaminants on the print head 150, and may facilitate the wiping by further wetting both the wiper blades 4406 and the print head 150.

Cleaning Station—Dry Wipe Cleaner Section

Similar to the wet wipe cleaner section 4304, various suitable embodiments are contemplated for the dry wipe cleaner section 4306. Referring to the embodiments depicted in FIGS. 90A-90B, the dry wipe cleaner section 4306 comprises a dry wipe member 4312. The dry wipe member 4312 comprises any suitable mechanism (e.g., brush, a squeegee, and the like) for removing cleaning fluid and contaminants. For example, the dry wipe member 4312 may remove cleaning fluid and contaminants from the print head. Like the wet wipe member, the dry wipe member 4312 is coupled to one or more actuators 4313 that raise or lower the dry wipe member 4312 within the dry wipe cleaner section 4306 of the cleaning station vessel 4314. While various actuators and actuator locations are considered suitable, the actuators 4313 depicted in FIGS. 90A-90B are disposed primarily outside the cleaning station vessel 4314. Without being bound by theory, minimizing actuator 4313 contact with the cleaning fluid, especially contact with any electronic components of the actuators 4313, may be beneficial in maintaining actuator performance. Thus, some embodiments will include the actuators 4313 primarily positioned outside the cleaning station vessel 4314. The actuators 4313 can be linear actuators, rotary actuators, pneumatic actuators, or electric actuators. Additional details on the actuators 4313 is provided hereinbelow.

An embodiment of the dry wipe member 4312 is depicted in FIG. 92A. The dry wipe member 4312 may define a wiper array, which includes a wiper mounting member 4501 and a plurality of dry wiper blades 4502 mounted to the wiper mounting member 4501. Each of the plurality of dry wiper blades 4502 may include a body member 4514 and a blade 4516 extending from the body member 4514. The wiper mounting member 4501 extends along a longitudinal axis LA, and a length l of each of the plurality of dry wiper blades 4502 extends in a direction that is at an angle θ that is greater than 0 and less than 90° relative to the longitudinal axis LA. In some embodiments, each of the plurality of dry wiper blades 4502 extends in a direction that is at an angle θ of from 5° to 50°, from 5° to 45°, or from 10° to 30° relative to the longitudinal axis LA. The angle θ may be varied to provide for additional contact with the print head 150, as may be desired in embodiments.

As described above, each of the plurality of dry wiper blades 4502 has an overlap of at least part of its length l with the length l of an adjacent dry wiper blade 4502 in a direction orthogonal to the longitudinal axis LA. In embodiments, each of the plurality of dry wiper blades 4502 has an overlap of at least 30% of its length l with the length of an adjacent dry wiper blade in a direction orthogonal to the longitudinal axis LA. For example, in some embodiments, each of the plurality of dry wiper blades 4502 may have an overlap of from 30% to 70% of its length with the length of an adjacent dry wiper blade in a direction orthogonal to the longitudinal axis LA. Such an arrangement enables the dry wipe member 4312 to contact the print head 150 with at least two blades 4516 over the entire length of the print head 150. Other arrangements are contemplated, such as arrangements that enable the dry wipe member 4312 to contact the print head 150 with three or more blades 4516 over the entire length of the print head 150. Without being bound by theory, it is believed that because the dry wiper blades are angled with respect to the longitudinal axis LA and their lengths overlap with adjacent dry wiper blades, the dry wipe member 4312 imparts less drag on the print head 150 as it wipes cleaning fluid from the print head 150 and is thereby more effective in wiping off the cleaning fluid. Additionally, the use of the array of angled dry wiper blades may result in the cleaning fluid being drained away from the print head 150 in less time compared to a single wiper blade extending along the longitudinal axis LA.

In embodiments, each of the blades 4516 has the same vertical (e.g., +/−Z) position as the other blades 4516. Accordingly, all of the blades 4516 has the same engagement distance with the print head 150 during wiping operations. As is known in the art, the "engagement distance" refers to the amount by which the vertical position of the print head 150 and the vertical position of an undeflected blade 4516 overlap. However, as shown in FIG. 92D, in embodiments, one or more blades 4516 are positioned at a first vertical position $Z_1$ while one or more blades 4516 are positioned at a second vertical position $Z_2$. In such embodiments, a least one blade 4516 has a different engagement distance than the blades 4516. For example, the blade 4516 positioned at the first vertical position $Z_1$ has a smaller engagement distance than the blade 4516 positioned at the second vertical position $Z_2$. In embodiments, the blades 4516 may be positioned such that the engagement distance with the print head 150 increases along the path of the print head 150 during the dry wiping process. Such embodiments can, for example, reduce the amount of cleaning fluid that is expelled from the cleaning station 110 during the cleaning process.

In some embodiments, the wiper mounting member 4501 includes channels 4504, as shown in FIG. 92B. Each channel 4504 is formed in a top face 4506 of the wiper mounting member 4501 and is shaped to receive one of the plurality of dry wiper blades 4502. The formation of the channels 4504 to receive the plurality of dry wiper blades 4502 may enable the plurality of dry wiper blades 4502 to be securely and accurately coupled to the wiper mounting member, which may ease manufacturing of the dry wipe member 4312 and prevent movement of the dry wiper blades 4502 with respect to the wiper mounting member 4501 during use.

As depicted in FIG. 92B, in embodiments, each channel may include a hole 4508 extending through the thickness of the wiper mounting member 4501. In embodiments in which the wiper mounting member 4501 does not include channels, a plurality of holes 4508 may be positioned along the length of the wiper mounting member 4501, with each of the plurality of holes 4508 extending through the thickness from the top face 4506 to a bottom face 4510 of the wiper mounting member 4501, as shown in FIG. 92C. In various embodiments, an attachment member 4512, such as a screw, bolt, or other attachment mechanism, may be coupled to the body member 4514 of each of the plurality of dry wiper blades 4502 through the hole 4508. Although in various embodiments, the plurality of dry wiper blades 4502 are coupled to the wiper mounting member 4501 by coupling an attachment member 4512 to the body member 4514, other methods of mounting the plurality of dry wiper blades 4502 to the wiper mounting member 4501 are possible and contemplated. For example, each of the plurality of dry wiper blades 4502 can be secured within the wiper mounting member 4501 using end caps that are bolted in place. While the above wiper array of FIGS. 92A-86D is discussed for use as a dry wipe member 4312, it is further contemplated that the wiper array could also be included as a wet wiper member 4310 or a purge wiper 4303 (FIG. 90B).

In further embodiments, the dry wipe member 4312 is coupled to two actuators (e.g., actuators 4313) which are operable to raise or lower the dry wipe member 4312 into and out of the volume of the cleaning fluid. For example, the dry wipe member 4312 may be actuated such that the dry wipe member 4312 is raised out of the volume of the cleaning fluid with sufficient time to allow the cleaning fluid to drain away from the dry wiper blades 4502. The dry wipe member 4312 contacts the print head 150 as it is moved through the dry wipe cleaner section 4306 to remove cleaning fluid, contaminants and other debris from the print head 150 after the print head 150 is cleaned by the wet wipe member 4310.

As another example, the dry wipe member 4312 may be actuated after the print head 150 has moved to the capping section 4308 or the build platform 120 such that the dry wipe member 4312 is lowered into the volume of the cleaning fluid. The lowering of the dry wipe member 4312 into the cleaning fluid may wash away contaminants on the surface of the dry wiper blades 4502 and clean the dry wipe member 4312, thereby reducing the likelihood that the dry wipe member 4312 will introduce (or reintroduce) contaminants to the print head 150. In some embodiments, the dry wipe member 4312 is lowered into the volume of the cleaning fluid for a period of time sufficient to rinse the dry wipe member 4312, and then is raised out of the volume of the cleaning fluid until it has been used to wipe the print head 150 again.

Cleaning Station—Capping Section

As described with reference to FIGS. 90A-90C, in various embodiments, the cleaning station 110 includes a capping section 4308 including a cover 4701 to create or maintain a non-curing environment around the print head 150. As used herein, a "non-curing environment" means an environment in which the binder material does not cure within or on the surface of the nozzles of the print head 150. The non-curing environment may be maintained, for example, by maintaining a particular humidity level, temperature, or the like, that prevents the binder material from curing. Various suitable embodiments are contemplated.

An example embodiment of a capping section 4308 is shown in greater detail in FIG. 94A. In particular, the capping section 4308 includes a cover 4701 in the form of a sponge 4702 supported by a sponge support 4704 coupled to an actuator 4706 operable to raise and lower the sponge 4702 into and out of the cleaning fluid within the cleaning station 110. Accordingly, the sponge 4702 may be used to soak up cleaning fluid from the cleaning station 110 and the sponge 4702 may be applied to the print head 150 while the print head 150 is idle. Without being bound by theory, the application of the wet sponge 4702 to the print head 150 may reduce evaporation of binder material in one or more jet nozzles of the print head 150 and/or prevent the curing thereof. In other words, when the print head 150 is in an idle state, the print head 150 may be located at the capping section 4308 to maintain the print head 150 in a non-curing environment, which, in embodiments, includes maintaining the print head 150 in a humid, moist, wet, or submerged state.

The sponge 4702 can be formed of any suitable material capable of absorbing and holding the cleaning fluid for a predetermined period of time. In some embodiments, the sponge 4702 may be made from cellulose wood fibers or foamed plastic polymers. In some particular embodiments, the sponge 4702 may be made from a silicone material, such as a foamed silicone, a polyurethane, a polyimide, or combinations thereof.

The sponge support 4704 can be a metal or plastic plate sized to support the sponge 4702. In some embodiments, the sponge 4702 may be coupled to the sponge support 4704, such as through the use of an adhesive layer between the sponge 4702 and the sponge support 4704, or an attachment member, such as a bolt, screw, or other mechanism to attach the sponge 4702 to the sponge support 4704. In some embodiments, the sponge 4702 may be removably coupled to the sponge support 4704 such that the sponge 4702 can be easily replaced without also replacing the sponge support 4704 and actuator 4706.

As shown in FIG. 94A, in some embodiments, the sponge support 4704 may include edges 4704*a* that extend in an upward direction from a base 4704*b*. However, it is contemplated that in other embodiments, the sponge support 4704 includes only the base 4704*b*, and does not include raised edges 4704*a*. In embodiments, the sponge support 4704 may be perforated or otherwise include one or more holes through the thickness of the sponge support 4704 to enable cleaning fluid in the cleaning station to be absorbed by the sponge 4702. In other embodiments, the sponge 4702 and sponge support 4704 may be positioned such that the fluid level 4600 of the cleaning fluid is above the edges 4704*a* (if any) of the sponge support 4704 such that the cleaning fluid is in contact with the sponge 4702.

The sponge support 4704 is coupled to an actuator 4706 that is operable to raise and lower the sponge 4702 within the cleaning fluid. The actuator 4706 may be a linear actuator, a rotary actuator, a pneumatic actuator, an electric actuator, or any other suitable type of actuator selected based on the particular embodiment. Although depicted in FIG. 94A as being coupled to the sponge 4702 through the sponge support 4704, it is contemplated that in some embodiments, the actuator 4706 may be directly coupled to the sponge 4702, and a sponge support 4704 may not be included. Such embodiments, for example, may be employed when the sponge 4702 is made from a stiff, yet absorbent, material.

In the embodiment shown in FIG. 94A, the actuator 4706 is coupled to a passive resistance mechanism 4708, which biases the sponge 4702 toward a raised position such that at least a portion of the sponge 4702 is above the fluid level 4600 of the cleaning fluid and able to contact the print head 150. The passive resistance mechanism 4708 may be, by way of example and not limitation, a spring biased in an upward direction. The incorporation of a passive resistance mechanism 4708, though optional, serves as a fail-safe to ensure that, in the event of an actuator failure, the sponge 4702 is positioned for use to maintain the print head 150 in a non-curing environment. Additionally or alternatively, the incorporation of the passive resistance mechanism 4708 may enable energy savings by enabling power to the actuator 4706 to be reduced or turned off while the print head 150 is idle without causing the sponge 4702 to be retracted below the fluid level of the cleaning fluid.

In various embodiments, when the print head 150 is located at the capping section 4308 of the cleaning station 110, the sponge 4702 is at least partially submerged in the cleaning fluid. In other words, some or all of the sponge 4702 extends below the fluid level 4600 of the cleaning fluid to enable the sponge 4702 to be constantly absorbing cleaning fluid from the cleaning station 110. In some such embodiments, at least a portion of the sponge 4702 extends above the fluid level 4600 of the cleaning fluid such that the sponge 4702 is in contact with the print head 150 without submerging the print head 150 in the cleaning fluid. In embodiments, 1%, 5%, 10%, 20%, 30%, 40%, 50%, 60%, 70%, 80%, 90%, 95%, or even 99% of the volume of the sponge 4702 may extend above the fluid level 4600 of the cleaning fluid.

In practice, to clean the print head 150, cleaning fluid is applied to the print head 150 using the wet wipe member 4310 by passing the print head 150 through the wet wipe cleaner section 4304. Then, cleaning fluid is removed from the print head 150 using the dry wipe member 4312 by passing the print head 150 through the dry wipe cleaner section 4306. Then, when the print head 150 will be idle or the additive manufacturing apparatus 100 is undergoing maintenance, the print head 150 is moved to the capping section 4308 and into contact with the sponge 4702 that is at least partially submerged in the cleaning fluid. In other embodiments (not shown), it is not required for the sponge to be submerged in the cleaning fluid. The sponge 4702 is maintained in contact with the print head 150 while the print head 150 is idle or the additive manufacturing apparatus 100 is undergoing maintenance, thereby reducing evaporation of binder material in the nozzles of the print head 150, preventing the curing of the binder material around the print head 150, and the like.

Although described above as including a sponge 4702, in some embodiments, the cover 4701 of the capping section

4308 is a cap 4710, as shown in FIG. 94B. In embodiments, the cap 4710 may be sealed around the print head 150 when the print head 150 is idle to prevent the evaporation of binder material from the nozzles of the print head 150, to maintain a humidity level around the print head 150, and/or to maintain or create a non-curing environment around the print head 150. As shown in FIG. 94B, in embodiments, the cap 4710 may include a volume of cleaning fluid, thereby forming a smaller cleaning vessel within the cleaning station vessel 4314, so as to create a humid, non-curing environment around the nozzles of the print head 150, although in some embodiments, the cap 4710 may not include a volume of fluids.

As with the sponge 4702, the cap 4710 is coupled to an actuator 4706 that is operable to raise and lower the cap 4710 within the cleaning fluid. The actuator 4706 may be a linear actuator, a rotary actuator, a pneumatic actuator, an electric actuator, or any other suitable type of actuator selected based on the particular embodiment. In the embodiment shown in FIG. 94B, the actuator 4706 is coupled to a passive resistance mechanism 4708, which biases the cap 4710 toward a raised position such that at least a portion of the cap 4710 is above the fluid level 4600 of the cleaning fluid and able to contact the print head 150. The passive resistance mechanism 4708 may be, by way of example and not limitation, a spring biased in an upward direction. The incorporation of a passive resistance mechanism 4708, though optional, serves as a fail-safe to ensure that, in the event of an actuator failure, the cap 4710 is positioned for use to maintain the print head 150 in a non-curing environment. Additionally or alternatively, the incorporation of the passive resistance mechanism 4708 may enable energy savings by enabling power to the actuator 4706 to be reduced or turned off while the print head 150 is idle without causing the cap 4710 to be retracted below the fluid level of the cleaning fluid.

In embodiments, the actuator 4706 enables the height of the cap 4710 to be adjusted relative to the print head 150. Accordingly, the cap 4710 may be positioned to contact the print head 150 with fluid contained within the cap 4710, or the cap 4710 may be positioned to cap the print head 150 such that the face of the print head 150 is not contacted by the fluid.

In embodiments, the cap 4710 may further include one or more gaskets or seals 4712 to create a seal between the cap 4710 and the print head 150 when the cap 4710 is in use. The creation of a seal may minimize or even eliminate evaporation of the cleaning fluid in the cap 4710, the binder material in the print head 150, or both. Moreover, in embodiments, the cap 4710 may include one or more ports 4714 (e.g., inlet and outlet ports) to enable cleaning fluid to be flowed through the cap 4710 during use. Accordingly, the cleaning fluid in the cap 4710 can be replenished or refreshed.

In still other embodiments, the cap 4710 of FIG. 94B may be combined with the capping section 4308 shown and described with respect to FIG. 94A, such that the sponge 4702 may be actuated into and out of the cap 4710, which seals around the print head 150. In such embodiments, the cap 4710 may be selectively sealed around the print head 150 and may be actuated independent of the sponge 4702. For example, the sponge may be actuated such that it is in contact with the print head 150 during relatively short periods of idleness, while the sponge may be retracted and the cap may be actuated and sealed around the print head 150 during longer periods of idleness, such as when the additive manufacturing apparatus 100 is powered off or undergoing maintenance.

In embodiments, as an alternative to a dedicated capping section 4308, the cleaning station vessel 4314 itself may form a cover for the print head. In such embodiments, the cleaning station vessel 4314 is coupled to one or more actuators 4706 to move the cleaning station vessel 4314 in a vertical direction with respect to the print head 150, as shown in FIG. 94C. Accordingly, the cleaning station vessel 4314 can serve as a capping section 4308 in such embodiments, and the print head 150 is capped by the entire cleaning station vessel 4314. In embodiments, the cleaning station vessel 4314 may be equipped with seals 4712 that may be actuated, either independently (FIG. 94D) or with the cleaning station vessel 4314 (FIG. 94C) to create a seal between the cleaning station vessel 4314 and the print head 150. In addition to, or as an alternative to, actuation of the seals 4712, it is contemplated that the seals 4712 around the perimeter of the cleaning station vessel 4314 may be inflatable seals that are inflated to provide a seal between the cleaning station vessel and the print head 150, as shown in FIGS. 94E and 94F.

It is further contemplated that, in embodiments, the print head 150 is actuatable in the vertical direction for sealing with the cleaning station vessel 4314. Accordingly, depending on the particular embodiment, one or more of the cleaning station vessel 4314, seals positioned around the perimeter of the cleaning station vessel 4314, and the print head 150 are moved in a vertical direction to enable a seal to be formed between the cleaning station vessel 4314 and the print head 150. As with the previously-described embodiments of the capping section 4308, in embodiments, vertical movement of one or more of the cleaning station vessel 4314, seals positioned around the perimeter of the cleaning station vessel 4314, and the print head 150 is effective to maintain the print head 150 in a non-curing environment.

Cleaning Station—Motion of Components

As has been described herein, various components of the cleaning station 110, including the wet wipe member 4310, the dry wipe member 4312, and the capping section 4308, are configured to move in a vertical (e.g., +/−Z) direction during the cleaning of the print head 150. Although described herein with reference only to the vertical component of the movement, it is contemplated that, in embodiments, the motion of the various components may have motion in other directions in addition to the vertical direction. For example, the motion may be in the form of an arc that includes both horizontal and vertical motion.

In general, the various components of the cleaning station 110 each independently moves between an extended position, in which the component is positioned to engage with or clean the print head 150, and a retracted position, in which the component is submerged within the cleaning fluid within the cleaning station vessel 4314. For example, in embodiments, and with reference to FIGS. 90A and 90B, the print head 150 enters the cleaning station 110 from the right hand side of the figure, passing over the second binder purge bin 4302 first. In embodiments, as the print head 150 proceeds from right to left, the capping section 4308, the wet wipe member 4310, and the dry wipe member 4312 are in the retracted position such that they do not contact or clean the print head 150. The print head 150 arrives at the first binder purge bin 4302, where backpressure is applied to the print head 150 to discharge contaminants from the print head 150 into the first binder purge bin 4302. In embodiments, during an additive manufacturing process, the print head 150 discharges contaminants into the first binder purge bin 4302 while the recoat head 140 is moving in the −X direction (e.g., a forward direction) in FIG. 2, supplying build material to a working surface of the build platform 120. The print head 150 then moves to the right, where the print head 150 is introduced to the wet wipe member 4310. The wet wipe member 4310 is in an extended position to apply cleaning fluid to the print head 150. Next, the print head 150 is introduced to the dry wipe member 4312, which has moved to an extended position to wipe excess cleaning fluid from the print head 150, as described herein. In embodiments, the wet wipe member 4310 and/or the dry wipe member 4312 are vertically raised out of the cleaning fluid before the completion of the discharge of the contaminants from the print head 150 over the first binder purge bin 4302. The wet wipe member 4310 and/or the dry wipe member 4312 are retracted into the cleaning fluid in the cleaning station vessel 4314 after the print head 150 proceeds past them. For example, the wet wipe member 4310 may be submerged in the cleaning fluid while the print head 150 is being wiped by the dry wipe member 4312. In embodiments, during an additive manufacturing process, the wet wiping and dry wiping steps performed by the wet wipe member 4310 and the dry wipe member 4312, respectively, are performed while the recoat head 140 is moving in the +X direction (e.g., a reverse direction) from the build platform 120 toward a recoat home position 148.

After being wiped, the print head 150 may be capped in the capping section 4308, or it may proceed to the second binder purge bin 4302, where it is prepared for printing. For example, back pressure may be applied to the print head 150 to equilibrate the print head 150 for printing. In embodiments, the print head 150 then returns to the build platform 120 to deposit binder material onto the powder layer, as described hereinabove.

Alternative orders in the operations of the components of the cleaning station 110 are contemplated. For example, in embodiments, the print head 150 enters the cleaning station 110 from the right hand side of the figure, passing over the second binder purge bin 4302 first. However, as the print head 150 proceeds from right to left, the wet wipe member 4310, the dry wipe member 4312, or the wet wipe member 4310 and the dry wipe member 4312 are in the extended position such that they contact the print head 150 along its path to the first binder purge bin 4302. In such embodiments, this can be a pre-cleaning step to remove surface contaminants prior to the discharging of additional contaminants over the first binder purge bin 4302.

In some embodiments, the wet wipe member 4310 and/or the dry wipe member 4312 may be actuated using a two-stage actuation process to raise and lower the members out of and into the volume of cleaning fluid. Without being bound by theory, the two stage actuation improves cleaning fluid draining from one or both of the dry and wet wipe members, because the cleaning fluid easily flows back into the cleaning station vessel 4314 when only one side of the wipe member is raised above the cleaning fluid level in stage one of the two-stage actuation process. Because the dry wipe member 4312 is directed to removing cleaning fluid, not applying it, ensuring the cleaning fluid is quickly drained from the dry wipe member 4312 in the two stage actuation process is desirable. However, in embodiments, other actuation processes, including single-stage actuation processes, are contemplated and possible.

The embodiment shown in FIGS. 93A-93C schematically depict a two-stage actuation process for raising the dry wipe members 4312 out of the cleaning fluid of the cleaning station vessel 4314. As shown in FIG. 93A, the dry wipe member 4312 may be submerged in the cleaning station vessel 4314 of the cleaning station 110 such that the dry wipe member 4312 is below a fluid level 4600 of the cleaning fluid within the cleaning station 110. Each of the wet wipe member 4310 and the dry wipe member 4312 are coupled to a first actuator **4602*a* and a second actuator 4602*b*, respectively, for raising and lowering the members. Actuators 4602*a*, 4602*b* in embodiments, may correspond to actuators 4311 and 4313 described in accordance with FIGS. 90A and 90B. The first actuator 4602*a* is coupled proximate a first end of the wet wipe member 4310 or the dry wipe member 4312 and the second actuator 4602*b* is coupled proximate a second end of the wet wipe member 4310 or the dry wipe member 4312. By “coupled proximate,” it is meant that the actuator is coupled at or near the respective end of the member. In embodiments, the first actuator 4602*a* is coupled to the wet wipe member 4310 or the dry wipe member 4312 at a point that is closer to the first end than the second end of the corresponding member, and the second actuator 4602*b* is coupled to the wet wipe member 4310 or the dry wipe member 4312 at a point that is closer to the second end than the first end of the corresponding member. Each of the actuators 4602*a* and 4602*b* are independently operable to raise or lower the corresponding end of the dry wipe member 4312** to which they are coupled into and out of the volume of the cleaning fluid.

In FIG. 93A, dry wipe member 4312 is not shown, as it is positioned behind, and obscured by, the wet wipe member 4310 in this view. As shown in FIG. 93B, the first actuator **4602*a* coupled to the dry wipe member 4312 is actuated to raise a first end 4604 of the dry wipe member 4312 above the fluid level 4600 of the cleaning fluid while a second end 4606 of the dry wipe member 4312 remains below the fluid level 4600. Although depicted in FIG. 93B as raising the first end 4604 of the dry wipe member 4312 to completely remove the first end 4604 from the volume of cleaning fluid, it is contemplated that in some embodiments, the dry wipe member 4312 may be raised such that the dry wiper blades 4502 (not shown in FIGS. 93A-93C) are above the fluid level while at least a portion of the wiper mounting member 4501 remains submerged in the cleaning fluid, below the fluid level 4600. After the first end 4604 of the dry wipe member 4312 is raised, the second actuator 4602*b* coupled to the dry wipe member 4312 is actuated to raise the second end 4606 of the dry wipe member 4312 above the fluid level 4600 of the cleaning fluid, as shown in FIG. 93C. As would be understood, lowering the dry wipe member 4312 into the cleaning fluid may be achieved by reversing the process described above and depicted in FIGS. 93A-93C. In embodiments, actuators 4602*a* and 4602*b* may be actuated simultaneously to lower the first end 4604 and the second end 4606 of the dry wipe member 4312** at the same time, or during overlapping time periods.

Similarly, the embodiment shown in FIGS. 93D and 93E schematically depict a two-stage actuation process for raising the wet wipe member 4310 out of the cleaning fluid of the cleaning station vessel 4314. In particular, as shown in FIG. 93D, the first actuator **4602*a* coupled to the wet wipe member 4310 is actuated to raise the first end 4410 of the wet wipe member 4310 above the fluid level 4600 of the cleaning fluid while the second end 4412 of the wet wipe member 4310 remains below the fluid level 4600. Although depicted in FIG. 93D as raising the first end 4410 of the wet wipe member 4310 to completely remove the first end 4410 from the volume of cleaning fluid, it is contemplated that in some embodiments, the wet wipe member 4310 may be raised such that the wiper blades 4406 are above the fluid level while at least a portion of the wet wiper body 4401 remains submerged in the cleaning fluid, below the fluid level 4600. After the first end 4410 of the wet wipe member 4310 is raised, the second actuator 4602***b* coupled to the wet wipe member 4310 is actuated to raise the second end 4412 of the wet wipe member 4310 above the fluid level 4600 of the cleaning fluid, as shown in FIG. 93E. As above, the wet wipe member 4310 can be resubmerged in the cleaning fluid by reversing the process, actuating the second actuator 4602*b* and then actuating the first actuator 4602*a* of the wet wipe member 4310. Alternatively, in embodiments, actuators 4602*a* and 4602*b* may be actuated simultaneously to lower the first end 4410 and the second end 4412 of the wet wipe member 4310 at the same time, or during overlapping time periods.

In some embodiments, the two-stage actuation process may occur for both the dry wipe members 4312 and the wet wipe members 4310. This embodiment, which is sequentially illustrated in FIGS. 93A-93E, may be completed before or while the print head 150 is moved to the binder purge bin 4302. After the print head 150 is moved passed the wet wipe cleaner section 4304 and the dry wipe cleaner section 4306, the wet wipe member 4310 and the dry wipe member 4312 may be returned to the cleaning fluid. In particular, after the print head 150 is passed over the wet wipe member 4310 and the dry wipe member 4312, the actuators 4602*a*-4602*b* may be actuated to lower the wet wipe member 4310 and the dry wipe member 4312 below the fluid level 4600 of the cleaning fluid. In some embodiments, two or more of the actuators may be actuated simultaneously to lower the wet wipe member 4310 and the dry wipe member 4312 into the cleaning fluid, while in other embodiments, each of the actuators is independently actuated.

For example, in embodiments, the actuator 4602*b* is actuated while the first actuator 4602*a* is actuated to lower the first and second ends of the wet wipe member 4310 or the dry wipe member 4312 at substantially the same time or during an overlapping time period. In embodiments, such as the embodiment shown in FIGS. 93D and 93E, the actuator 4602*a* is actuated to lower the first end 4410 of the wet wipe member 4310 into the volume of cleaning fluid, then the actuator 4602*b* is actuated to lower the second end 4412 of the wet wipe member 4310 into the cleaning fluid. Then, as shown in FIGS. 93A-93C, the actuator 4602*a* is actuated to lower the second end 4606 of the dry wipe member 4312 into the volume of cleaning fluid, and finally, the actuator 4602*b* is actuated to lower the first end 4604 of the dry wipe member 4312 into the cleaning fluid. Alternatively as shown in to FIGS. 93D and 93E, the actuator 4602*a* is actuated to lower the first end 4410 of the wet wipe member 4310 into the volume of cleaning fluid, then the actuator 4602*b* is actuated to lower the second end 4412 of the wet wipe member 4310 into the cleaning fluid. As shown in FIGS. 93A-93C, then the actuator 4602*a* is actuated to lower the first end 4604 of the dry wipe member 4312 into the volume of cleaning fluid, and finally, the actuator 4602*b* is actuated to lower the second end 4606 of the dry wipe member 4312 into the cleaning fluid. In still other embodiments, the order of the lowering of the first end 4410 and the second end 4412 of the wet wipe member 4310 is reversed, and in still other embodiments, the dry wipe member 4312 is lowered into the cleaning fluid before the wet wipe member 4310 is lowered into the cleaning fluid. In embodiments, some or all of the actuators may be actuated simultaneously.

In embodiments, the first and second actuators 4602*a*, 4602*b* (and, accordingly, actuators 4311 and 4313) are electric actuators that are independently operable to raise or lower the corresponding end of the wipe member (e.g., wet wipe member 4310 or dry wipe member 4312) at a plurality of speeds. Accordingly, in embodiments, the first actuator 4602*a* is actuated to raise a first end of the wipe member at a first speed $r_1$, the second actuator 4602*b* is actuated to raise a second end of the wipe member at a second speed $r_2$, the second actuator 4602*b* is actuated to lower the second end of the wipe member at a third speed $r_3$, and the first actuator 4602*a* is actuated to lower the first end of the wipe member at a fourth speed $r_4$, with at least one of the speeds differing from at least one of the other speeds. For example, the wet wipe member 4310 or the dry wipe member 4312 may be raised at one speed and lowered at another speed (e.g., $r_1=r_2$, $r_3=r_4$, $r_4 \neq_3$), the first side may be actuated at one speed and the second side may be actuated at another speed (e.g., $r_1=r_4$, $r_2=r_3$, $r_1 \neq_3$), each actuation may be at a different speed from each other actuation (e.g., $r_1 \neq r_2 \neq r_3 \neq r_4$), or the like. Such actuation can enable, for example, the wet wipe member 4310 to emerge from the cleaning fluid quickly to project cleaning fluid toward the print head and to be submerged in the cleaning fluid to reduce or prevent splashing.

Although the wet wipe member 4310 and the dry wipe member 4312 are described herein as being coupled to two actuators, it is contemplated that in other embodiments, each wipe member may be coupled to a single actuator, or to more than two actuators. Moreover, although the actuators are described herein as being operable to raise and lower the corresponding wipe member, it is contemplated that the actuators may be used in embodiments to cause additional movement of the wipe member. For example, in embodiments in which the actuators are electric actuators, the actuators may be actuated to cause agitation of the wipe member within the cleaning station vessel 4314, to adjust the position of the wipe member within the cleaning station vessel 4314 or with respect to the print head 150, or the like. Electric actuators may further enable "just in time" positioning of the wipe member and/or automatic calibration routines. Other features and advantages are possible, depending on the particular embodiment. Commercially available electric actuators suitable for use include, by way of example and not limitation, ERD electric cylinders available from Tolomatic, Inc. (Hamel, MN).

Although it is contemplated in embodiments that the actuators are controlled using a controller, such as control system 5000, in embodiments, one or more additional mechanisms may be included to monitor, set, or limit the motion of the various components of the cleaning station 110. Such mechanisms may be desired, for example, to ensure that the print head 150 is not damaged by the components of the cleaning station 110, while enabling the components to contact the print head 150 as may be necessary to clean the print head 150. Accordingly, in embodiments, an adjustable hard stop 4614 (FIG. 93F) may be present to limit the vertical movement of one or more of the components within the cleaning station vessel 4314.

In embodiments, a member 4610 is coupled to an actuator 4602 through a motion coupler 4608 to provide or control of the upper position of the member 4610 within the cleaning station 110, and specifically, the cleaning station vessel 4314, as shown in FIG. 93F. The member 4610 can be, for example, the wet wipe member 4310, the dry wipe member 4312, and/or the cover of the capping section 4308 (described in greater detail below), and the actuator 4602 can be, for example, the one or more corresponding actuators (e.g., actuators 4311, 4313, and 4706, respectively). The at least one motion coupler 4608 extends from the member 4610 and is configured to couple the member 4610 to the cleaning station vessel 4314 for vertical motion (e.g., along the +/−Z axis shown in the FIGS.) therein. In embodiments, the motion coupler 4608 may be made from metal coated with polytetrafluoroethylene (e.g., TEFLON™) or other suitable materials.

In the embodiment shown in FIG. 93F, the member 4610 moves up and down within the cleaning station vessel 4314 on a rail 4612 through the motion coupler 4608. The rail 4612 is coupled to an adjustable hard stop 4614. The adjustable hard stop 4614 includes a threaded portion through which the adjustable hard stop 4614 is coupled with a controlling bolt 4616. The controlling bolt 4616 is additionally coupled with a rail cap 4618 that is fixedly mounted on the rail 4612. For example, the rail cap 4618 may include a clearance hole through which the controlling bolt 4616 passes before it is coupled with the adjustable hard stop 4614 through the threaded portion of the adjustable hard stop 4614. A nut 4620 may be used to prevent the controlling bolt 4616 from moving upward. To adjust the adjustable hard stop 4614, the controlling bolt 4616 is tightened (to move the adjustable hard stop 4614 in the upward direction) or loosened (to move the adjustable hard stop 4614 in the downward direction). Accordingly, the position of the adjustable hard stop 4614 is set to the desired maximum height for the member 4610. When the member 4610 reaches to the desired maximum height, the adjustable hard stop 4614 prevents the motion coupler 4608 from continuing in the upward direction on the rail 4612.

Although only one end of the member 4610 is shown in FIG. 93F, it is contemplated in such embodiments, the member 4610 includes a motion coupler 4608 on each end and, accordingly, each end of the member 4610 may be controlled in this fashion. In embodiments, a gauge or other indicia (not shown) may be included (e.g., machined into the rail 4612 or cleaning station vessel 4314) to enable the position of each end of the member 4610 to be set at an equivalent position. Such indicia may additionally enable multiple members 4610 to be set at a common desired position relatively easily.

In addition to, or as an alternative to, the hard stop, in embodiments a gauge 5100 on the underside of the print head 150 is used to vertically align one or more of the components of the cleaning station 110, as shown in FIG. 98. In FIG. 98, the gauge 5100 is affixed to the bottom face 5102 of the print head 150, such as through the use of bolts, clips, or another attachment mechanism. When affixed to the print head 150 the gauge 5100 includes a first section 5104 at a first vertical position $Z_1$ and a second section 5106 at a second vertical position $Z_2$. As shown in FIG. 98, the first vertical position $Z_1$ is vertically higher than, or above, the second vertical position $Z_2$. In embodiments, the first section 5104 and the second section 5106 can have different indicia or colors to enhance visual differentiation between the first and second vertical positions.

In practice, the print head 150 may be moved over the cleaning station 110, and the member 4610 (e.g., wet wipe member 4310, dry wipe member 4312, or cap 4710) is raised to an initial maximum vertical position. As used herein, the "maximum vertical position" of a member refers to the vertical position of the top edge 5108 of the member 4610 when the member 4610 is at a set maximum vertical height out of the cleaning station vessel 4314. The print head 150 may be positioned directly over the member 4610, or the print head 150 may be located elsewhere over the cleaning station 110 to enable visual comparison of the vertical position of the member 4610 with the gauge 5100. The maximum vertical position $Z_m$ of the member 4610 is then adjusted such that the top edge 5108 of the member 4610 is vertically below or lower than the first vertical position $Z_1$. In embodiments, the maximum vertical position $Z_m$ of the member 4610 is also greater than or equal to the second vertical position $Z_2$. Put another way, the member 4610 is adjusted such that the maximum vertical position $Z_m$ of the member 4610 is $Z_1 > Z_m \geq Z_2$. Adjustments of the maximum vertical position $Z_m$ of the member 4610 can be made by adjusting an adjustable hard stop, as shown and described herein above, adjusting one or more parameters or settings of an actuator coupled to the member 4610, or by other methods that will be known to those of skill in the art, depending on the particular embodiment. In embodiments, adjustments can be made using the gauge 5100 to any or all of the components of the cleaning station 110.

Having described various sections of a cleaning station 110, a fluid management system suitable for providing cleaning fluid to the cleaning station 110 and binder material to the print head 150 will now be described in detail.

Fluid Management System

Turning to FIG. 95, the fluid management system embodiments as described herein may be utilized in combination with the various additive manufacturing apparatus embodiments and components described herein. Referring now to FIG. 95 in combination with FIG. 2, a fluid management system 4800 includes a binder material pathway for providing binder material 500 to a print head 150 and for recycling binder material 500 not deposited on build material 400 positioned on the build platform 120 and a cleaning fluid pathway for providing cleaning fluid to the cleaning station 110 for cleaning the print head 150 between depositing operations and recycling and reconditioning cleaning fluid to minimize the amount of cleaning fluid that is wasted.

In general, the binder material pathway includes a binder reservoir 4802 that is in fluid communication with the print head 150 and at least one binder purge bin 4302. As depicted in FIGS. 90A and 90B, the cleaning station 110 includes two binder purge bins 4302. The binder purge bins 4302 may each include an active drain 4806, which allows binder flow from the binder purge bin 4302 into the binder reservoir 4802. Further, as shown, the binder purge bins 4302 may each include an overflow drain 4812 disposed on the sidewall of the binder purge bin 4302, which releases binder from the binder purge bin 4302 if a level of binder in the binder purge bin 4302 exceeds a desired binder fluid level. In some embodiments, level sensors may be included to ensure binder fluid level is properly monitored and maintained.

Referring again to FIG. 95, the binder material pathway enables recirculation of the binder material to reduce or even eliminate clogging of the binder material in the nozzles of the print head 150. In the binder material pathway depicted in FIG. 95, two binder purge bins 4302 are included. In embodiments, one of the binder purge bins 4302 may receive binder material and contaminants discharged from the print head 150 via backpressure prior to cleaning of the print head 150 at the cleaning station 110.

In embodiments including multiple binder purge bins, the first binder purge bin is located upstream from the cleaning station vessel 4314 and the second binder purge bin is positioned downstream of the cleaning station vessel 4314 and the dry wipe cleaner section of the cleaning station 110 along a path of the print head 150. In embodiments, the second binder purge bin is positioned upstream of the build area in order to receive binder material ejected (i.e., "spit") from the print head 150 during preparation of the print head 150 before printing. The second binder purge bin 4302, in some embodiments, can include a non-porous medium (e.g., thermal, pH, hydrochromic or wax paper, cloth media, etc.) for receiving a pattern test printed by the print head 150 when the print head 150 is positioned over the additional binder purge bin 4302. The pattern can be inspected, such as by using a camera configured to capture an image of the pattern, to determine if the printed pattern is suitable. For example, if the printed pattern matches a predetermined reference pattern, the printed pattern may be determined to be suitable. As another example, if the printed pattern differs from the predetermined reference pattern, the printed pattern may be determined to be unsuitable. In such embodiments, the print head may be prevented from supplying binder material to a working surface of the build area, or adjusted prior to supplying the binder material.

The binder material is provided from the binder reservoir 4802 to an ink delivery system 4804 which in turn delivers the binder material to the print head 150. The ink delivery system 4804 enables the separation of storage of the binder material from the print head 150 and allows for the binder material to be replaced or refilled while the additive manufacturing apparatus 100 is actively printing. The print head 150 discharges the binder material through nozzles into, for example, the build area and the binder purge bins 4302.

Binder material discharged into the binder purge bin 4302 passes through an active drain 4806. In the embodiment depicted in FIG. 95, the active drain 4806 is located at or near a bottom of the binder purge bin 4302 to enable the binder material to be recirculated without requiring the accumulation of the binder material in the binder purge bins 4302. In embodiments, the active drain 4806 is in fluid communication with a pump 4808 that actively moves the binder material from the active drain 4806 through a filter 4810 and back to the binder reservoir 4802. The filter 4810 may remove contaminants or large particles, such as polymers that have agglomerated as a result of partial evaporation of the binder material, to ensure that the binder material that is returned to the binder reservoir 4802 is suitable for recirculation through the binder material pathway.

As shown in FIG. 95, each binder purge bin 4302 further includes an overflow drain 4812 located through a sidewall of the binder purge bin 4302. In embodiments, the overflow drain 4812 is located within the top half of the height of the sidewall of the binder purge bin 4302. The overflow drain 4812 is in fluid communication with a waste reservoir 4814. Accordingly, in the event that the active drain 4806 becomes clogged or binder material otherwise accumulates to a level greater than or equal to the position of the overflow drain 4812, the binder material can be drained from the binder purge bin 4302 and removed from the binder material pathway via the waste reservoir 4814. In the event of a clog in the active drain 4806, the binder material removed from the binder purge bin 4302 is directed from the overflow drain 4812 to the waste reservoir 4814 so as to minimize the amount of contaminants recirculated through the system, although in some embodiments, it is contemplated that the overflow drain 4812 may be in fluid communication with the binder reservoir 4802, such as through the filter 4810.

In embodiments, the binder material pathway may optionally include an overflow tank 4813 fluidly coupled to the overflow drain 4812 of the binder purge bin 4302. The overflow tank 4813, when included, is fluidly coupled to the binder reservoir 4802 and the waste reservoir 4814. In embodiments, the overflow tank 4813 is coupled to the binder reservoir 4802 and the waste reservoir 4814 through a valve 4815, although other pathways are contemplated. Valve 4815 can be, for example, a pinch valve, a three-way valve, or a four-way valve, although other types of valves are contemplated. It is further contemplated that the overflow tank 4813 can be fluidly coupled to another part of the main circulation path instead of being fluidly coupled to the binder reservoir 4802.

In embodiments including the overflow tank 4813, binder material overflowing from the binder purge bin 4302 flows through the overflow drain 4812 into the overflow tank 4813. Binder material in the overflow tank 4813 is evaluated and, if verified that the binder material in the overflow tank 4813 is still usable, the binder material is returned to the binder reservoir 4802. If, however, the binder material in the overflow tank 4813 is not still suitable for use (e.g., it contains too many contaminants or does not otherwise meet specifications for use), the binder material is sent to the waste reservoir 4814. In embodiments including the valve 4815, the valve 4815 can be controlled by a computing device, such as control system 5000 that is configured to verify the suitability of the binder material for use and send a signal to the valve 4815 to direct the binder material to the binder reservoir 4802 or the waste reservoir 4814.

Turning now to the cleaning fluid pathway depicted in FIG. 95, the cleaning fluid pathway generally includes a cleaning fluid reservoir 4816 that is in fluid communication with the cleaning station vessel 4314 of the cleaning station 110. The cleaning fluid pathway enables cleaning fluid to be applied to the print head 150 to fluidize particles deposited on the print head 150, such as build material particles and binder material particles, while further enabling the cleaning fluid to be recirculated and reconditioned to reduce the amount of cleaning fluid that is wasted.

In embodiments, the cleaning fluid is provided from the cleaning fluid reservoir 4816 through a filter 818 to a pump 4820, which in turn delivers the cleaning fluid to the cleaning station vessel 4314 through a cleaning fluid inlet 4822. As shown in FIG. 95, the cleaning fluid inlet 4822 may be positioned in the bottom of the cleaning station vessel 4314, although in other embodiments, the cleaning fluid inlet 4822 may be provided in another location along one of the sidewalls of the cleaning station vessel 4314. Additionally or alternatively, multiple cleaning fluid inlets 4822 may be positioned within the cleaning station vessel 4314 along with one or more cleaning fluid outlets to enable a directional flow of cleaning fluid through the cleaning station vessel 4314. The directional flow of cleaning fluid can, for example, agitate the cleaning fluid and debris in the cleaning station vessel 4314 and prevent the debris from settling at the base of the cleaning station vessel 4314 where it may clog the active drain. In embodiments, tubes are connected to one or more cleaning fluid inlets 4822 to direct the cleaning fluid within the cleaning station vessel 4314. It is further contemplated that the contents of the cleaning station vessel 4314 can be agitated using ultrasonic waves, oscillating or other non-static jets, turbulators or other vortex generators, or the like.

As the cleaning fluid is pumped into the cleaning station vessel 4314, the volume of the cleaning fluid accumulates to a fluid level 4600 within the cleaning station vessel 4314. The volume of cleaning fluid is used to supply cleaning fluid to the wet wipe member 4310 and the capping section 4308, as described hereinabove, and to supply cleaning fluid to the dry wipe cleaner section 4306 for cleaning the dry wipe member 4312 between uses. In embodiments, the cleaning fluid inlet 4822 can be left open to simply fill the cleaning station vessel 4314. Alternatively, the cleaning fluid inlet 4822 can be connected to the cleaning fluid inlets 4416 of the wet wipe member 4310 which then fills the fluid ports 4407 and then fills the area between the wiper blades 4406. In this setup, cleaning fluid is constantly fed when the machine is in operation and is then overflowed into the cleaning station vessel 4314.

The cleaning station vessel 4314 includes a drain 4824 that is in fluid communication with the cleaning fluid reservoir 4816. The drain 4824, which is also depicted in FIGS. 90A and 90B, is positioned within the cleaning station vessel 4314 to maintain the fluid level 4600 at a predetermined level. Accordingly, when the volume of cleaning fluid rises above the predetermined level, cleaning fluid is drained from the cleaning station vessel 4314 via the drain 4824 and returned to the cleaning fluid reservoir 4816. In one or more embodiments, the drain 4824 may be a passive drain, which allows the cleaning fluid to pass out of the cleaning station vessel 4314 without the use of a pump or other active mechanism.

In the embodiment shown in FIG. 95, the cleaning station vessel 4314 further includes an activate drain 4826 that is in fluid communication with the waste reservoir 4814. The activate drain 4826 can be activated to allow at least a portion of the cleaning fluid that is in the cleaning station vessel 4314 to be removed from the cleaning station vessel 4314 and directed to the waste reservoir 4814. As will be described in greater detail below, a portion of the cleaning fluid may be removed from the cleaning fluid pathway via the waste reservoir 4814 in response to determining that the cleaning fluid contains an unsuitable amount of contaminants or that the cleaning fluid should otherwise be replaced, either partially or fully.

In various embodiments, the cleaning station vessel 4314 further includes a level sensor 4828. The level sensor 4828 is used to maintain a constant height of cleaning fluid within the cleaning station vessel 4314. For example, the level sensor 4828 can determine that the fluid level 4600 of the cleaning fluid is low and, responsive to the determination, additional cleaning fluid can be pumped into the cleaning station vessel 4314 using the pump 4820. The level sensor may be any suitable type of sensor. In some embodiments, the level sensor comprises a sensor that it is able to withstand submersion within the cleaning fluid. In other embodiments, the level sensor is not disposed within the cleaning fluid, and can detect the fluid level via other means. For example, a laser level sensor may be used. In embodiments, the level sensor 4828 may be coupled to a control system 5000 which receives signals from the level sensor 4828 and provides signals to other system components, such as the pump 4820 and/or the activate drain 4826, as will be described in greater detail below. Additionally or alternatively, the level sensor 4828 may include the fluid level sensors 4322 positioned within the overflow vessel 4318, as described in accordance with FIG. 90C above. Accordingly, it is contemplated that the fluid level sensors 4322 can be incorporated into the cleaning fluid pathway, and coupled to the control system 5000, as has been described with respect to the level sensor 4828.

In various embodiments, one or more additional components (not shown in FIG. 95) may be included in the fluid management system 4800 as part of one or both of the binder material pathway or the cleaning fluid pathway. For example, additional level sensors, flow sensors, cameras, heaters, cooling units, temperature sensors, pumps, filters, valves, or the like may be included in the fluid management pathways to enable monitoring, control, and adjustment of the fluids in the pathways. Such additional components may be included in any of a variety of locations within the fluid management system 4800 and may be communicatively coupled to the control system 5000. For example, in embodiments, the cleaning fluid path includes a heater heat the cleaning fluid prior to it entering the cleaning station vessel 4314. When included, the heater may be positioned at any of a number of points along the cleaning fluid path, such as between the pump 4820 and the cleaning station vessel 4314, or within the cleaning station vessel 4314 or the cleaning fluid reservoir 4816.

As another example, in embodiments a three-way or four-way valve may be positioned within the drain 4824 and the cleaning fluid reservoir 4816 to redirect a predetermined amount of the cleaning fluid to the waste reservoir 4814. Accordingly, in embodiments, the three-way or four-way valve may replace or replicate the functionality of the active drain 4826. Moreover, it is contemplated that one or more on/off valves (e.g., pinch valves) may be used in place of or in addition to the three- or four-way valves described herein.

In embodiments, one or more of the pumps described herein, including but not limited to pump 4808 and pump 4820, are capable of moving ferrous metals as well as other types of metals. Moreover, in embodiments, one or more of the pumps described herein may include a tunable flow rate, such as through flow regulators, which enable the flow rate to be tuned, such as to enable cleaning fluid to be provided to the wet wipe member at a first flow rate and to the inlet of the cleaning station vessel at a second flow rate.

Having described a fluid management system 4800 for use in providing binder material and cleaning fluid to various components of the additive manufacturing apparatus 100, and specifically, the cleaning station 110, the binder material and cleaning fluid will now be described in detail.

Binder Materials

In various embodiments, the binder material is a reversible binder. As defined herein, a "reversible binder" is intended to denote a thermoplastic or thermoset polymer that, during decomposition, is broken down into oligomers and other molecules that are similar or identical to the monomers used to derive the polymer. The reversible binder may be polymerized via radical chain reactions to bond particles and layers of a powder used to print the article. While many of the embodiments described below are directed to metal powder, it is contemplated that other non-metal powders are suitable, for example, for sand, ceramic, and polymer binder jetting.

Although reference is made to a "metal powder" in various embodiments herein, it is contemplated that the material used to print the article may vary depending on the type of the article and the end use of the article. In embodiments in which a metal powder is employed, the metal powder may include nickel alloys, cobalt alloys, cobalt-chromium alloys, cast alloys, titanium alloys, aluminum-based materials, tungsten, steel, stainless steel, or any other suitable material and combinations thereof.

Following deposition of a layer of the metal powder, the binder material is selectively deposited into the layer of metal powder in a pattern representative of the structure of the article being printed. According to various embodiments, the binder material may include polymers derived from unsaturated monomers. For example, the binder material may include one or more polymers having the following formulas: $(CH_2CHR)_n$, where R=—H, —OH, phenyl, alkyl, aryl. The binder material may also include one or more monofunctional acrylic polymers having the formula $(CH_2—CR^2COOR^1)_n$, where $R^1$ is an alkyl or aryl, and $R^2$ is H or $CH_3$; di-acrylic polymers having the formula $[(CH_2—CR^2COO)_2—R^3]_n$, where $R^2$ is H or $CH_3$ and $R^3$ is a divalent hydrocarbon radical; tri-acrylic polymers having the following formula $[(CH_2CR^1COO)_3—R^4]_n$, where $R^1$ is H or $CH_3$ and $R^4$ is a trivalent hydrocarbon radical and/or poly(alkylene carbonates) including co-polymeric alkylene carbonates, such as poly(ethylene-cyclohexene carbonate) and those having the following formulas:

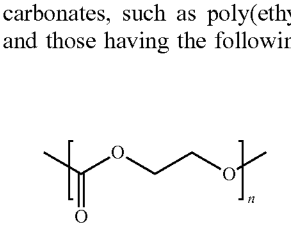

poly(ethylene carbonate)

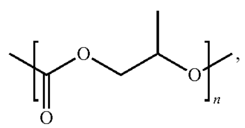

poly(propylene carbonate)

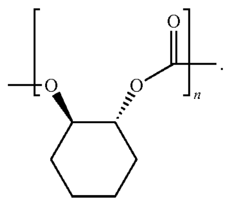

poly(cyclohexane carbonate)

By way of example and not limitation, the binder material may include poly (methylmethacrylate) (PMMA), polystyrene (PS), poly (vinyl alcohol) (PVA), polyacrylic acid (PAA), Poly vinyl pyrrolidone (PVP), poly (alkylene carbonates), and polymers derived from hexanediol diacrylate (HDDA), trimethylolpropane triacrylate (TMPTA), and diethylene glycol diacrylate (DGD), derivatives of any of the above, or combinations of the above.

In some embodiments described herein, the binder material further includes one or more fluorescent dyes. The inclusion of the fluorescent dyes enables an otherwise clear binder material (e.g., a binder material including PVA and water) to be detectable under certain lighting conditions, as will be described in greater detail below. In specific embodiments, the fluorescent dyes/pigments should be photochromic dyes that respond to specific light intensities, for example near IR or UV (including UVA, UVB, or UVC) light. In embodiments including the fluorescent dye, the intensity of the fluorescence is a function of the concentration of the fluorescent dye. Accordingly, the inclusion of a fluorescent dye can provide information regarding where the binder material has been deposited, how much binder material has been deposited, and/or the extent to which the binder material has cured. Moreover, the fluorescence of the binder material can enable detection of leaks or spills, fluid management applications, such as monitoring tank levels, binder material concentration, and contamination, and part detection. Specific embodiments of using the fluorescent dye in process control are provided below.

In various embodiments, the fluorescent dye in the binder material may be any suitable fluorescent dye that is compatible with the binder material. In some embodiments, the fluorescent dye is not quenched by the metal powder. Moreover, the fluorescent dye should not negatively impact the material properties of the green body, brown body, or final part. Examples of fluorescent binders are fluorescent inorganic pigments and solid solutions of fluorescent dyes in transparent synthetic resins, polymer encapsulated fluorescent dyes.

Fluorescent pigments are solid solutions of fluorescent dyes. These fluorescent dyes may include polyenes, rhodamines, coumarins, naphthalimides, fluoresceins, diazonium salt, acridines, benzoxanthenes, or combinations thereof. The fluorescent color achieved can be from a combination of a single fluorescent dye embedded in a medium (e.g., polymer or resin carrier) or by combining multiple fluorescent dyes at different ratio. When incorporated in a resin dispersion, it is contemplated that the dispersion may be water or solvent based. The dyes may be proteins or non-proteins, and may be organic or synthetic. It is contemplated that the particular dye selected will vary based on the particular embodiment employed. Examples of suitable fluorescent dyes are described in PCT Publication WO 03/029340, which is incorporated by reference herein in its entirety.

Various sizes are contemplated for the fluorescent pigment. For example, the fluorescent pigment or fluorescent dye resin may have a typical average particle size from about 0.01 to about 1 μm. The amount of fluorescent pigment or fluorescent dye resin may be in the typical range of 0.01 to 5% by weight, or from 0.1 to 2% by weight.

The binder material may further include one or more additives that facilitate deposition of the binder material into the layer of metal powder. For example, the binder material may include one or more additives such as viscosity modifiers, dispersants, stabilizers, surfactants (e.g., surface active agents) or any other suitable additive that may facilitate the jettability of the binder material and deposition of the binder material into the layer of metal powder. The surfactants may be ionic (e.g., zwitterionic, cationic, or anionic) or non-ionic, depending on the properties of the binder material and/or the metal powder.

In some embodiments, the additive(s) may improve the wettability of the metal powder to facilitate coating the metal powder with the binder material. The additive(s) may also modify the surface tension of the binder material to facilitate jettability of the binder material. For example, in embodiments, the binder material is considered jettable if the Ohnesorge number (e.g., the ratio of viscous forces to inertial and surface tension forces) is between approximately 0.01 and approximately 2.

In embodiments, the additive(s) may also include a solvent that dissolves the binder material. The solvent may be aqueous or non-aqueous, depending on the particular polymers selected and other additives that may be in the binder material. The solvent is generally non-reactive (e.g., inert) such that it does not react with the metal powder, the polymers in the binder material, or any other additives that may be in the binder material. Additionally, the solvent should readily evaporate after selective deposition of the binder material into the layer of metal powder to facilitate bonding of the binder-coated particles and the printed layers. Example solvents that may be used in the binder material include, but are not limited to, water, methylene chloride ($CH_2Cl_2$), chloroform ($CHCl_3$), toluene, xylenes, mesitylene, anisole, 2-methoxy ethanol, Butanol, diethylene glycol, tetrahydrofuran (THF), methyl ethyl ketone (MEK), trichloroethylene (TCE), or any other suitable solvent.

The binder material may include the reversible binder, one or more monomers used to derive the reversible binder, or both. For example, in some embodiments, the reversible binder is polymerized before selective deposition into the layer of metal powder. Accordingly, in such embodiments, the binder material may include the reversible binder as a pre-formed, dissolved polymer. The reversible binder may be solubilized in a suitable solvent to facilitate jettability and deposition into the layer of the metal powder. Following deposition, the solvent may evaporate and the reversible binder may coalesce and bond the binder-coated particles and the printed layers to form the green body part.

In other embodiments, the reversible binder is polymerized after depositing the binder solution into the layer of metal powder. That is, the reversible binder may be polymerized in situ. For such embodiments, the binder material may include one or more polymerizable monomers (e.g., reactive monomers) that react to form the reversible binder. In one particular embodiment, the binder material includes the one or more polymerizable monomers and a suitable solvent. In other embodiments, the binder material does not include a solvent. Rather, the binder material may be a neat liquid of the one or more polymerizable monomers. Once the binder solution is deposited onto the layer of metal powder, the one or more polymerizable monomers may be polymerized to form the reversible binder within the layer of metal powder to form the printed layer of the green body part. In certain embodiments, the binder material may include initiators such as, for example, azobis (isobutyronitrile) (AIBN), to facilitate in situ polymerization of the one or more polymerizable monomers in the layer of metal powder.

By way of non-limiting example, in some embodiments, the binder material may include between about 0.5 weight percent (wt. %) and about 30 wt. % of the polymerized reversible binder or the polymerizable monomers used to derive the reversible binder in situ. In one embodiment, the binder material include from about 3 wt. % to about 7 wt. % of the polymer or polymerizable monomers. Additionally, the binder material may include suitable viscosity modifiers to enable a viscosity of the binder material that is from about 2 centipoise (cP) and about 200 cP. For example, depending on the viscosity of the mixture of the solvent and polymer/polymerizable monomer solution or the neat polymerizable monomer solution, the binder material may have from about 0.1 wt. % to about 15 wt. % of a viscosity modifier, such that the viscosity of the binder material is within the desired range for efficient and effective jettability.

Following deposition of the metal powder and printing of the binder material, the reversible binder is cured to form a layer of the green body part. While a portion of the solvent in the binder material may be evaporated during deposition (e.g., printing) of the binder material, a certain amount of the solvent may remain within the layer of metal powder. Therefore, in certain embodiments, the green body part may be thermally cured at a temperature that is suitable for evaporating the solvent remaining in the printed layer and allowing efficient bonding of the printed layers of the green body part.

In embodiments, the green body part may be cured to allow polymerization of the polymerizable monomers in the binder material to yield the reversible binder. For example, as discussed above, the reversible binder may be polymerized in situ after printing the binder material into the layer of metal powder. Following deposition of the binder material, the one or more polymerizable monomers in the binder material may be cured to polymerize the one or more monomers and form the printed layer of the green body part. For example, the printed layers may be exposed to heat, moisture, light, or any other suitable curing method that polymerizes the one or more polymerizable monomers in the binder material before the next layer of metal powder is deposited on top of the printed layer. In certain embodiments, the binder material may include a radical initiator (e.g., AIBN) to facilitate polymerization of the one or more polymerizable monomers. In one embodiment, the one or more polymerizable selectively deposited may be cured immediately after forming the printed layer. In other embodiments, the one or more polymerizable monomers may be cured after a desired number of printed layers has been formed. Excess metal powder (e.g., the metal powder that is not bonded by the reversible binder) may be removed after curing to prepare the green body for post-printing processing. After curing, the green body may undergo a drying step to remove any solvent and/or other volatile materials that remain in the green body part. For example, the green body may be dried in a vacuum, under an inert atmosphere (e.g., nitrogen or argon), or air.

Additional details on binder materials suitable for use in the embodiments described herein may be found in U.S. Patent Application Publication No. 2018/00714820 to Natarajan et al., entitled "Reversible binders for use in binder jetting additive manufacturing techniques" and filed on Sep. 9, 2016, the entire contents of which is hereby incorporated by reference. Moreover, it is contemplated that other binder materials may be used with the cleaning station and/or additive manufacturing apparatus described herein, depending on the particular embodiment.

Cleaning Fluids

In various embodiments, the cleaning fluid is compatible with the binder material (e.g., capable of dissolving or otherwise enabling with binder material to be wiped away) and is safe for the components of the additive manufacturing apparatus 100 (e.g., does not cause rust the need for excessive maintenance or cleaning). In some embodiments, such as embodiments in which the binder material is water-based, the cleaning fluid is a water-miscible cleaning fluid.

In various embodiments, the cleaning fluid includes from 0.1 wt. % to 20 wt. % of a cleaning agent. For example, the cleaning fluid can include from 0.5 wt. % to 10 wt. %, from 1 wt. % to 10 wt. %, or from 1 wt. % to 5 wt. % of the cleaning agent. In embodiments, the cleaning agent is an organic solvent. Suitable organic solvents for use in the cleaning fluid include dimethyl formamide (DMF), dimethyl sulfoxide (DMSO), methylpyrrolidone (NMP), N—N-dimethylacetamide (DMAc), 1,3-dimethyl-2-imidazolidnone (DMI), 1,3-dimethyl-3,4,5,6-tetrahydro-2(1H)-pyrimidinone (DMPU), ethylene glycol, diethyl glycol, dipropylene glycol dimethyl ether, cyrene, dimethyl isosorbide, propylene glycol, and mixtures thereof. In particular embodiments, the cleaning agent is DMF, NMP, DMSO, dipropylene glycol dimethyl ether, cyrene, dimethyl isosorbide, ethylene glycol, or combinations thereof.

It is contemplated that in some embodiments, the cleaning fluid may include one or more additives, although in other embodiments, the cleaning fluid includes the cleaning agent and water. Accordingly, in various embodiments, the cleaning fluid includes from 80 wt. % to 99.9 wt. % water, from 90 wt. % to 99.5 wt. % water, from 90 wt. % to 99 wt. % water, or from 95 wt. % to 99 wt. % water.

The cleaning fluid of various embodiments has a viscosity that enables the cleaning fluid to flow through the cleaning fluid pathway without issue. In embodiments, the cleaning fluid has a viscosity of less than 10 cP or less than 5 cP at 25° C. For example, the cleaning fluid may have a viscosity of from 0.5 cP to 5 cP, 0.5 cP to 3 cP, from 1 cP to 2 cP, or from 1 cP to 1.5 cP.

Additionally, or alternatively, the cleaning fluid of various embodiments has a boiling point that is greater than or equal to the boiling point of water. By having a boiling point that is greater than or equal to that of water, the cleaning fluid can resist evaporation and keep the print head 150 moist by preventing the binder material from drying. In various embodiments, the cleaning fluid has a boiling point that is greater than or equal to 100° C. at 1 atm, greater than or equal to 110° C. at 1 atm, greater than or equal to 125° C. at 1 atm, or even greater than or equal to 150° C. at 1 atm.

In embodiments, the cleaning fluid is formulated such that the density of the cleaning fluid is close to the density of water (e.g., 1 $g/cm^3$). In such embodiments, contaminants within the cleaning fluid, such as binder material and other debris, can be detected based on a change in density of the cleaning fluid, as will be described in greater detail below. Accordingly, in various embodiments, the cleaning fluid has a density of from 0.900 $g/cm^3$ to 1.400 $g/cm^3$ from 0.900 $g/cm^3$ to 1.200 $g/cm^3$ or from 0.900 $g/cm^3$ to 1.100 $g/cm^3$. For example, the cleaning fluid may have a density of from 0.905 $g/cm^3$ to 1.195 $g/cm^3$, from 0.910 $g/cm^3$ to 1.175 $g/cm^3$, from 0.950 $g/cm^3$ to 1.150 $g/cm^3$, from 0.905 $g/cm^3$ to 1.095 $g/cm^3$, from 0.910 $g/cm^3$ to 1.075 $g/cm^3$, or from 0.950 $g/cm^3$ to 1.050 $g/cm^3$.

The cleaning fluid may be heated, such as by a heater positioned along the cleaning fluid pathway, although in other embodiments, the cleaning fluid may be applied to the print head 150 at approximately ambient temperature. As used herein, "ambient temperature" within the machine may differ from room temperature outside the machine. For example, the temperature of the machine may be elevated. In other embodiments, the cleaning fluid may be cooled to a temperature below ambient temperature before application to the print head 150. For example, the cleaning fluid may be cooled to a temperature sufficient to cool the print head. Cooling of the cleaning fluid may be accomplished using a cooling apparatus, or simply by recirculation of the cleaning fluid through the cleaning fluid pathway.

As described herein, the cleaning fluid can be applied to the print head 150 to dissolve precipitant (e.g., resulting from partial evaporation of binder material) and other debris deposited on the print head 150 and within the nozzles of the print head 150. Because the cleaning fluid is recirculated through the system and is also specially formulated to be compatible with the cleaning station 110, the print head 150, and the binder material ejected from the print head 150, in various embodiments, the cleaning fluid is monitored to determine when the cleaning fluid should be reconditioned or replaced. An example method 4900 of monitoring a status of the cleaning fluid is described in FIG. 96. In some embodiments, the method 4900 or similar methods may be used to check the "health" of the cleaning fluid by determining the potency of the cleaning fluid.

In the method depicted in FIG. 96, the method 4900 begins by obtaining an initial value of a physical property of the cleaning fluid (block 4902). The physical property can be, for example, a density of the cleaning fluid, a viscosity of the cleaning fluid, a haze measurement, a surface tension of the cleaning fluid, a color of the cleaning fluid, a pH of the cleaning fluid, a conductivity of the cleaning fluid, or a fluorescence of the cleaning fluid. The initial value can be obtained in any one of a number of suitable ways, including through the use of sensors, cameras, or user input into a control system, such as control system 5000. In various embodiments, the initial value can be stored in the memory of the control system 5000.

Next, the cleaning fluid is circulated through the cleaning fluid pathway for a predetermined amount of time (block 4904). In embodiments, circulation of the cleaning fluid through the cleaning fluid pathway includes using the cleaning fluid to clean the print head 150. The predetermined period of time can vary depending on the particular embodiment. For example, the "predetermined time" may be the sampling rate of an instrument, which would ostensibly yield an effective "continuous" monitoring system. In other embodiments, the predetermined period of time can be a period of 1 minute, 5 minutes, 10 minutes, 30 minutes, an hour, 2 hours, or the like. After the passage of the predetermined period of time, a subsequent value corresponding to the physical property of the cleaning fluid is obtained (block 4906). The subsequent value can be determined in the same way as the initial value was determined, or by a different method. For example, a user may input the initial value for a cleaning fluid when the cleaning fluid is introduced to the system, but a sensor may be used to obtain subsequent values corresponding to the physical property.

Next, an amount of contaminant in the cleaning fluid is estimated based on the initial value and the subsequent value corresponding to the physical property of the cleaning fluid (block 4908). For example, the initial and subsequent values may be stored in a look up table (LUT) stored in the memory of the control system 5000 along with an estimated contaminant amount. Alternatively, the control system 5000 may perform one or more calculations to determine the amount of contaminant in the cleaning fluid. The contaminant may include, for example, dissolved, mixed and/or suspended binder material removed from the print head 150, dissolved, mixed and/or suspended build material (e.g., metal powder), or the like. As used herein, "contaminant" includes, but is not limited to, precipitant deposited on the print head. In embodiments, the contaminant comprises polyvinyl alcohol (PVA), polyvinyl pyrrolidone (PVP), polyacrylic acid (PVA), or derivatives thereof. In embodiments, as an alternative to or in addition to determining an estimated contaminant amount, an amount of evaporation is estimated. For example, the initial and subsequent values may be stored in a look up table (LUT) stored in the memory of the control system 5000 along with an estimated evaporation amount. Based on the amount of contaminant in the cleaning fluid, the amount of evaporation of the cleaning fluid, or both, a cleaning fluid maintenance process is selected from a plurality of available maintenance processes (block 4910). In some embodiments, available maintenance processes may include adding water (or another solvent) to the cleaning fluid, replacing a portion of the cleaning fluid containing contaminants with fresh cleaning fluid, replacing a majority of the volume of the cleaning fluid with fresh cleaning fluid, or returning the cleaning fluid containing the contaminants to the cleaning fluid reservoir. Finally, the selected cleaning fluid maintenance process is performed (block 4912).

By way of illustration, the process may include using a density meter to automatically determine an initial density of the cleaning fluid. Then, after the cleaning fluid has been used for a period of about 15 minutes, the density meter again measures the density of the cleaning fluid. Various time periods are considered suitable and can be tailored based on print cycles, cleaning cycles, and the like. In one or more embodiments, the density of the cleaning fluid may be measured as frequently as every 30 seconds or after 15 minutes, or in a further embodiment, density may be measured every 30-60 seconds. The density meter transmits both the initial density and the subsequent density of the cleaning fluid to the control system 5000, which then estimates an amount of contaminant in the cleaning fluid based on the change in density. When the estimated amount of contaminant is within a suitable range, the cleaning fluid recirculated through the cleaning fluid pathway. When the estimated amount of contaminant is moderate, water may be added to the cleaning fluid, or a portion of the cleaning fluid may be diverted to the waste reservoir by activating a three-way valve (described above) while new cleaning fluid is added to the cleaning fluid reservoir. Alternatively, when the estimated amount of contaminant is high, the entire volume of the cleaning fluid is diverted to the waste reservoir and fresh cleaning fluid is added to the cleaning fluid reservoir.

As another example, the process may include using a camera to detect an initial fluorescence of the cleaning fluid. Then, after the cleaning fluid has been used for a period of about an hour, the camera again measures the fluorescence of the cleaning fluid. In embodiments in which the binder material includes a fluorescent dye, an increase in the fluorescence of the cleaning fluid can indicate the presence of binder material in the cleaning fluid. The camera transmits both the initial fluorescence and the subsequent fluorescence of the cleaning fluid to the control system 5000, which then estimates an amount of contaminant in the cleaning fluid based on the change in fluorescence. When the estimated amount of contaminant is within a suitable range, the cleaning fluid recirculated through the cleaning fluid pathway. When the estimated amount of contaminant is moderate, water may be added to the cleaning fluid, or a portion of the cleaning fluid may be diverted to the waste reservoir by activating a three-way valve (described above) while new cleaning fluid is added to the cleaning fluid reservoir. Alternatively, when the estimated amount of contaminant is high, the entire volume of the cleaning fluid is diverted to the waste reservoir and fresh cleaning fluid is added to the cleaning fluid reservoir.

Although various embodiments are described herein with reference to measurement of a single physical property of the cleaning fluid, it is contemplated that in other embodiments, more than one physical property can be monitored and used to determine a cleaning fluid maintenance process to be performed. For example, both density and viscosity can be used to select a cleaning fluid maintenance process. By way of example, the control system 5000 may select a maintenance process that includes adding water to the cleaning fluid based on a change in the density of the cleaning fluid, but the control system 5000 may instead select a maintenance process that includes partial replacement of the cleaning fluid or replacement of the majority of the volume of the cleaning fluid when the density has decreased too much, indicating that the cleaning fluid may be becoming too diluted to function properly. In embodiments, the selection of the cleaning fluid maintenance process can be based on the viscosity, the surface tension, or both, of the cleaning fluid.

Cleaning Station Control System

Referring now to FIG. 97, FIG. 97 schematically depicts a control system 5000 for controlling the components of the cleaning station and the binder and cleaning fluid pathways. The control system 5000 is communicatively coupled to at least the print head, the pump 4808, the pump 4820, the activate drain 4826, and the level sensor 4828. In embodiments, the control system 5000 may additionally be communicatively coupled to at least one additional sensor 5006, such as a sensor for monitoring one or more physical properties of the cleaning fluid, as described in greater detail above, the actuators 4602*a*, 4602*b* coupled to the wet wipe member 4310 and the dry wipe member 4312, and the actuator 4706 coupled to the sponge support 4704 or cap 4710. In the embodiments described herein, the control system 5000 comprises a processor 5002 communicatively coupled to a memory 5004. The processor 5002 may include any processing component(s), such as a central processing unit or the like, configured to receive and execute computer readable and executable instructions stored in, for example, the memory 5004. In the embodiments described herein, the processor 5002 of the control system 5000 is configured to provide control signals to (and thereby actuate) the print head 150, the pump 4808, the pump 4820, and the activate drain 4826.

In embodiments, the control system 5000 may be configured to receive signals from one or more sensors of the fluid management system and, based on these signals, actuate one or more of the print head 150, the pump 4808, the pump 4820, the activate drain 4826, or other valves, pumps, and drains that may be included in the fluid management system. In some embodiments, the control system 5000 may be configured to receive signals from one or more additional sensors in the additive manufacturing apparatus 100 and, based on these signals, actuate one or more of the actuators 4602*a*, 4602*b* coupled to the wet wipe member 4310 and the dry wipe member 4312, and the actuator 4706 coupled to the sponge support 4704 or cap 4710 to raise and/or lower the components of the cleaning station 110 for use.

In various embodiments, the control system 5000 is configured to receive signals from and send signals to one or more components described herein. Accordingly, the control system 5000, in embodiments, can enable one or more of the functions described herein, including, without limitation, movement of any or all of the components of the cleaning station (e.g., the wet wipe member, the dry wipe member, the capping section, and the cleaning station vessel), adjustment of one more components described herein, monitoring the status of binder material and/or cleaning fluid described herein, monitoring performance of the additive manufacturing apparatus or any component thereof, measurements of various components, opening and closing of ports and valves, and the like. In embodiments, the control system 5000 is configured to control motion of the recoat head, the print head, and other components of the additive manufacturing device described herein.

Moreover, it is contemplated that, although control system 5000 is shown in FIG. 97 as being a single computing device, the control system 5000 may be a distributed system that includes multiple computing devices interconnected to perform the functions herein.

In the embodiments described herein, the computer readable and executable instructions for controlling the additive manufacturing apparatus 100, and particularly, the cleaning station 110 and the fluid management system, are stored in the memory 5004 of the control system 5000. The memory 5004 is a non-transitory computer readable memory. The memory 5004 may be configured as, for example and without limitation, volatile and/or nonvolatile memory and, as such, may include random access memory (including SRAM, DRAM, and/or other types of random access memory), flash memory, registers, compact discs (CD), digital versatile discs (DVD), and/or other types of storage components.

Various methods have been described herein that may be executed by the control system 5000. For example, the monitoring of the status of the cleaning fluid and the selection and implementation of a cleaning fluid maintenance process, the actuation of the wet wipe member, the dry wipe member, and the sponge, and the ejection of binder material from the print head may each be performed through execution of computer readable and executable instructions stored in the memory 5004 by the processor 5002. It is contemplated that one or more of these functions may alternatively be performed by one or more additional computing devices, which may be communicatively coupled to the control system 5000. For example, the monitoring of the status of the cleaning fluid and the selection and implementation of a cleaning fluid maintenance process may be performed from a computing device that is separate from, but communicatively coupled to, the control system 5000. It is also contemplated that additional functions may be performed by the control system 5000 and/or additional computing devices communicatively coupled thereto.

For example, in some embodiments in which the binder material includes a fluorescent dye, as described above, the control system 5000 (or other computing device communicatively coupled thereto) may determine an amount of cure of the printed part (e.g., through storage and execution of computer readable and executable instructions). A UV camera, a visible or other detection system can be used to detect the fluorescence of the binder.

During the operation of an additive manufacturing apparatus, it may be difficult to assess the quantity, geometric fidelity, and extent of cure of binder deposited into the powder bed. Powder soaked with binder often provides poor visual contrast for reliable optical observation of each layer or multiple layers of the green body part. However, the present embodiments address this problem by including in the binder composition one or more fluorescent photochromic dyes. After layerwise jetting deposition into the powder and any subsequent thermal treatment, the subsequent exposure of the binder-powder surface to UV or other electromagnetic radiation will cause the fluorescent dyes to emit light.

Based on the emitted light, a control system including a UV camera can be used to image each layer of the 3D print. Using the control system, the acquired image(s) at specified time(s) can be compared to the expected quantity of binder jetted and identify spatial defects including binder jet print head misfires, inaccurate binder quantity deposition (saturation), as well as insufficient binder cure.

In one embodiment, the control system can determine the presence of binder solvent increases the quantum yield of emitted light as compared to a solvent free sample. If there is solvent in the binder-powder layer, the control system can pinpoint locations where solvent has not been effectively removed. Improper solvent removal may thus indicate areas of incomplete curing. Alternatively, the control system may detect areas of low binder based on the emitted light. This could indicate the clogging of the print head.

After detecting these defects, the control system enables the operator of the apparatus to troubleshoot or perform diagnostic checks on the additive manufacturing device, for example, by checking the recoat head and/or print head for clogging issues. In one embodiment, the detection of a defect may trigger a pattern test to determine if one or more print head nozzles are clogged.

In one embodiment for monitoring the performance of an additive manufacturing device using a fluorescent binder, the method comprise exposing at least one layer comprising the fluorescent binder to electromagnetic radiation. The fluorescent binder includes fluorescent material which emits light in response to the electromagnetic radiation. Next, the method includes recording the emitted light intensity of the at least one layer after exposure, and computing a level of binder, solvent, or both within the layer by utilizing a control system which correlates the recorded emitted light intensity to the level of binder, solvent, or both in the layer versus time. Defects may be located in the layer when the recorded emitted light intensity deviates from expected emitted light intensity values, or when the level of binder, solvent or both deviates from expected levels.

Further aspects of the invention are provided by the subject matter of the following clauses:

1. A method for forming an object, the method comprising: moving a recoat assembly in a coating direction over a build material, wherein the recoat assembly comprises a first roller and a second roller that is spaced apart from the first roller; rotating the first roller of the recoat assembly in a counter-rotation direction, such that a bottom of the first roller moves in the coating direction; contacting the build material with the first roller of the recoat assembly, thereby fluidizing at least a portion of the build material; irradiating, with a front energy source coupled to a front end of the recoat assembly, an initial layer of build material positioned in a build area; subsequent to irradiating the initial layer of build material, spreading the build material on the build area with the first roller, thereby depositing a second layer of the build material over the initial layer of build material; and subsequent to spreading the second layer of the build material, irradiating, with a rear energy source positioned rearward of the front energy source, the second layer of build material within the build area.

2. The method of any preceding clause, wherein the second roller is positioned above the first roller in a vertical direction, such that the second roller does not contact the build material.

3. The method of any preceding clause, wherein the first roller is a front roller and the second roller is a rear roller positioned rearward of the first roller.

4. The method of any preceding clause, further comprising: rotating the rear roller in a rotation direction that is the opposite of the counter-rotation direction; and contacting the second layer of the build material within the build area with the rear roller.

5. The method of any preceding clause, wherein rotating the rear roller in the rotation direction comprises rotating the rear roller at a rotational velocity that corresponds to a linear velocity of the recoat assembly.

6. The method of any preceding clause, further comprising, subsequent to at least one of irradiating the initial layer of build material with the front energy source and irradiating the second layer of build material with the rear energy source, detecting a temperature of the irradiated build material with a temperature sensor.

7. The method of any preceding clause, further comprising changing at least one parameter of the front energy source or the rear energy source based at least in part on the detected temperature.

8. The method of any preceding clause, wherein at least one of irradiating the initial layer of build material with the front energy source and irradiating the second layer of build material with the rear energy source comprises applying a predetermined power to the front energy source or the rear energy source, the method further comprising changing the predetermined power based at least in part on the detected temperature.

9. A method for forming an object of any preceding clause, the method comprising: moving a recoat assembly over a build material, wherein the recoat assembly comprises a first roller and a second roller that is spaced apart from the first roller; moving the second roller above the first roller in a vertical direction; rotating the first roller of the recoat assembly in a counter-rotation direction, such that a bottom of the first roller moves in a coating direction; contacting the build material with the first roller of the recoat assembly, thereby fluidizing at least a portion of the build material, while the second roller is spaced apart from the build material in the vertical direction; and moving the fluidized build material with the first roller, thereby depositing a second layer of the build material over an initial layer of build material positioned in a build area.

10. The method of any preceding clause, further comprising, subsequent to depositing the second layer of build material, moving the first roller upward in the vertical direction such that the first roller is spaced apart from the second layer of build material and moving the recoat assembly to a home position in a direction that is the opposite of the coating direction.

11. The method of any preceding clause, wherein moving the recoat assembly to the home position comprises moving the recoat assembly at a return speed, and wherein moving the fluidized build material comprises moving the recoat assembly in the coating direction at a coating speed, wherein the return speed is greater than the coating speed.

12. The method of any preceding clause, further comprising, prior to moving the recoat assembly to the home position, lowering the second roller such that the second roller contacts the second layer of build material.

13. The method of any preceding clause, further comprising rotating the second roller in the counter-rotation direction.

14. The method of any preceding clause, wherein rotating the second roller in the counter-rotation direction comprises rotating the second roller at a rotational velocity that corresponds to a linear velocity of the recoat assembly moving to the home position.

15. The method of any preceding clause, wherein the second roller comprises a second roller diameter and the first roller comprises a first roller diameter, wherein the second roller diameter is greater than the first roller diameter.

16. The method of any preceding clause, further comprising irradiating, with a front energy source coupled to a front end of the recoat assembly, the initial layer of build material positioned in the build area.

17. The method of any preceding clause, further comprising subsequent to moving the second layer of the build material, irradiating, with a rear energy source coupled to the recoat assembly, the second layer of build material within the build area.

18. A recoat assembly for an additive manufacturing system of any preceding clause, the recoat assembly comprising: a base member; a front roller rotatably coupled to the base member; a rear roller rotatably coupled to the base member, wherein the front roller is spaced apart from the rear roller; a front energy source coupled to the base member and positioned forward of the front roller, wherein the front energy source emits energy forward of the front roller; and a rear energy source coupled to the base member and positioned rearward of the front energy source, wherein the rear energy source emits energy rearward of the front energy source.

19. The recoat assembly of any preceding clause, further comprising a vertical actuator coupled to at least one of the front roller and the rear roller, and the base member, wherein the vertical actuator moves the at least one of the front roller and the rear roller in a vertical direction with respect to the base member.

20. The recoat assembly of any preceding clause, further comprising a hard stop that restricts movement of the at least one of the front roller and the rear roller in a vertical direction.

21. The recoat assembly of any preceding clause, further comprising a dust shield that at least partially encapsulates the hard stop.

22. The recoat assembly of any preceding clause, further comprising a vertical actuator coupled to the front roller and the rear roller such that the front roller and the rear roller are movable with respect to the base member independently of one another.

23. The recoat assembly of any preceding clause, wherein the vertical actuator is a first vertical actuator coupled to the front roller, and the recoat assembly further comprises a second vertical actuator coupled to the rear roller, wherein the second vertical actuator moves the rear roller in a vertical direction with respect to the base member.

24. The recoat assembly of any preceding clause, wherein the front roller has a front roller diameter and the rear roller has a rear roller diameter, wherein the front roller diameter and the rear roller diameter are different.

25. The recoat assembly of any preceding clause, further comprising a powder engaging member coupled to the base member and positioned forward of the front roller at a height that is within a roller window defined by the front roller.

26. A recoat assembly for an additive manufacturing system of any preceding clause, the recoat assembly comprising: a base member; a first roller rotatably coupled to the base member, the first roller having a first roller diameter; and a second roller rotatably coupled to the base member, wherein the second roller is spaced apart from the first roller and has a second roller diameter, wherein the second roller diameter is greater than the first roller diameter.

27. The recoat assembly of any preceding clause, wherein the first roller is a front roller and the second roller is a rear roller, wherein the front roller is positioned forward of the rear roller.

28. The recoat assembly of any preceding clause, further comprising a front energy source coupled to the base member and positioned forward of the front roller, wherein the front energy source emits energy forward of the front roller; and a rear energy source coupled to the base member and positioned rearward of the front energy source.

29. The recoat assembly of any preceding clause, further comprising a powder engaging member coupled to the base member and positioned forward of the front roller at a height that is within a roller window defined by the front roller.

30. The recoat assembly of any preceding clause, further comprising a cleaning member engaged with at least one of the first roller and the second roller.

31. A recoat assembly for an additive manufacturing system any preceding clause, the recoat assembly comprising: a base member that is movable in a lateral direction; a powder spreading member coupled to the base member, wherein the base member at least partially encapsulates the powder spreading member; and a vacuum in fluid communication with at least a portion of the base member.

32. The recoat assembly of any preceding clause, further comprising an agitation device configured to vibrate the recoat assembly.

33. The recoat assembly of any preceding clause, wherein the base member comprises a primary containment housing that at least partially encapsulates the powder spreading member and a secondary containment housing that at least partially encapsulates and is spaced apart from the primary containment housing.

34. The recoat assembly of any preceding clause, wherein the vacuum is in fluid communication with a cavity defined by the primary containment housing and the secondary containment housing.

35. The recoat assembly of any preceding clause, wherein the powder spreading member is a doctor blade.

36. The recoat assembly of any preceding clause, wherein the powder spreading member is a roller rotatably coupled to the base member.

37. The recoat assembly of any preceding clause, wherein the roller is a first roller, and the recoat assembly further comprises a second roller rotatably coupled to the base member and at least partially encapsulated by the base member.

38. The recoat assembly of any preceding clause, wherein the recoat assembly further comprises a cleaning member selectively engagable with at least one of the first roller and the second roller.

39. The recoat assembly of any preceding clause, wherein the base member comprises a primary containment housing that at least partially encapsulates the powder spreading member.

40. A method for forming an object of any preceding clause, the method comprising: moving a recoat assembly over a build material a coating direction, wherein the recoat assembly comprises a powder spreading member; contacting the build material with the powder spreading member, causing at least a portion of the build material to become airborne; and drawing airborne build material out of the recoat assembly with a vacuum in fluid communication with the recoat assembly.

41. The method of any preceding clause, further comprising moving build material over a build area with the powder spreading member, thereby depositing a second layer of the build material over an initial layer of build material.

42. The method of any preceding clause, wherein drawing the airborne build material out of the recoat assembly comprises applying a vacuum pressure to a containment housing that at least partially encapsulates the powder spreading member.

43. The method of any preceding clause, further comprising, subsequent to moving the recoat assembly over the build material, directing process gas to the recoat assembly.

44. The method of any preceding clause, wherein drawing the airborne build material out of the recoat assembly comprises applying a vacuum pressure to a secondary containment housing that is spaced apart from and at least partially encapsulates a primary containment housing that at least partially encapsulates the powder spreading member.

45. The method of any preceding clause, further comprising, irradiating, with a front energy source coupled to an end of the recoat assembly, an initial layer of build material.

46. The method of any preceding clause, further comprising, subsequent to irradiating the initial layer of build material, moving the fluidized build material to a build area, thereby depositing a second layer of the build material over the initial layer of build material.

47. An additive manufacturing system of any preceding clause comprising: a recoat assembly comprising: a base member that is movable in a lateral direction; a powder spreading member coupled to the base member, wherein the base member at least partially encapsulates the powder spreading member; and a vacuum in fluid communication with at least a portion of the base member; an electronic control unit communicatively coupled to the vacuum; and a build area positioned below the recoat assembly.

48. The additive manufacturing system of any preceding clause, wherein the build area comprises a build receptacle positioned below the recoat assembly.

49. The additive manufacturing system of any preceding clause, further comprising a supply receptacle spaced apart from the build area.

50. The additive manufacturing system of any preceding clause, further comprising a build material hopper.

51. The additive manufacturing system of any preceding clause, wherein the electronic control unit directs the vacuum to draw build material out of the recoat assembly.

52. The additive manufacturing system of any preceding clause, wherein the base member comprises a primary containment housing that at least partially encapsulates the powder spreading member and a secondary containment housing that at least partially encapsulates and is spaced apart from the primary containment housing.

53. The additive manufacturing system of any preceding clause, further comprising a recoat assembly transverse actuator coupled to the base member and communicatively coupled to the electronic control unit.

54. The additive manufacturing system of any preceding clause, wherein the electronic control unit directs the recoat assembly transverse actuator to move the base member in the lateral direction to move build material with the powder spreading member, thereby depositing a second layer of the build material over an initial layer of build material positioned in the build area.

55. The additive manufacturing system of any preceding clause, wherein the electronic control unit directs the vacuum to draw airborne build material out of the recoat assembly while directing the recoat assembly transverse actuator to move the build material.

56. A recoat assembly for an additive manufacturing system of any preceding clause, the recoat assembly comprising: a first roller support; a second roller support; a first roller disposed between and supported by the first roller support and the second roller support; a first rotational actuator operably coupled to the first roller and configured to rotate the first roller about a first rotation axis; and a first sensor mechanically coupled to and in contact with the first roller support, wherein the first sensor outputs a first output signal indicative of a first force incident upon the first roller.

57. The recoat assembly of any preceding clause, wherein the first sensor is a strain gauge mechanically coupled to the first roller support, and wherein the strain gauge is oriented in order to measure a strain in at least one of a vertical direction transverse to the first rotation axis of the first roller or a horizontal direction transverse to the first rotation axis of the first roller.

58. The recoat assembly of any preceding clause, wherein the first sensor is a load cell mechanically coupled to the first roller support and configured to measure a force in a vertical direction transverse to the first rotation axis of the first roller.

59. The recoat assembly of any preceding clause, wherein the first roller support includes a flexure to which the first sensor is coupled.

60. The recoat assembly of any preceding clause, further comprising a second sensor mechanically coupled to and in contact with the second roller support.

61. The recoat assembly of any preceding clause, further comprising: a third roller support; a fourth roller support; a second roller disposed between and supported by the third roller support and the fourth roller support; a second rotational actuator operably coupled to the second roller and configured to rotate the second roller about a second rotation axis, the second rotation axis being parallel to the first rotation axis; and a third sensor mechanically coupled to and in contact with the third roller support, wherein the third sensor outputs a third output signal indicative of a second force incident upon the second roller.

62. The recoat assembly of any preceding clause, further comprising an accelerometer mechanically coupled to the first roller support.

63. An additive manufacturing system of any preceding clause comprising: a recoat assembly comprising: a first roller support; a second roller support; a first roller disposed between and supported by the first roller support and the second roller support; a first rotational actuator operably coupled to the first roller and configured to rotate the first roller about a first rotation axis; a first sensor mechanically coupled to and in contact with the first roller support, wherein the first sensor outputs a first output signal indicative of a first force incident upon the first roller; and an electronic control unit configured to: receive the first output signal of the first sensor; determine a first force on the first roller based on the first output signal of the first sensor; and adjust at least one operating parameter of the additive manufacturing system in response to the determined first force.

64. The additive manufacturing system of any preceding clause, further comprising: a build area; a transverse actuator operably coupled to the recoat assembly and operable to move the recoat assembly relative to the build area to spread a build material on the build area; and a current sensor configured to sense a current driving the transverse actuator, wherein the electronic control unit is configured to adjust the at least one operating parameter of the additive manufacturing system based on the sensed current.

65. The additive manufacturing system of any preceding clause, wherein the at least one parameter of the additive manufacturing system comprises a speed with which the transverse actuator moves the recoat assembly relative to the build area.

66. The additive manufacturing system of any preceding clause, further comprising: a build area; and a vertical actuator for moving the first roller in a vertical direction transverse to the rotation axis of the first roller, wherein the at least one parameter of the additive manufacturing system comprises a height of the first roller relative to the build area set by the vertical actuator.

67. The additive manufacturing system of any preceding clause, further comprising: a build area; a print head for depositing binder material; and a print head actuator operably coupled to the print head and operable to move the print head relative to the build area to deposit binder material on the build area, wherein the at least one parameter of the additive manufacturing system comprises a speed with which the print head actuator moves the print head relative to the build area.

68. A method of adjusting at least one operating parameter of an additive manufacturing system of any preceding clause, the method comprising: distributing a layer of a build material on a build area with a recoat assembly, the recoat assembly comprising a first roller disposed between and supported by a first roller support and a second roller support, a first rotational actuator operably coupled to the first roller and configured to rotate the first roller about a first rotation axis, and a first sensor mechanically coupled to and in contact with the first roller support; receiving a first output signal from the first sensor as the layer of the build material is distributed on the build platform with the recoat assembly; determining a first force on the first roller based on the first output signal of the first sensor; and adjusting the at least one operating parameter of the additive manufacturing system in response to the determined first force.

69. The method of any preceding clause, wherein the at least one operating parameter of the additive manufacturing system comprises one or more of: (i) a speed with which a transverse actuator moves the recoat assembly relative to the build area; (ii) a speed of rotation of the first rotational actuator; (iii) a target thickness of a subsequent layer of the build material; and (iv) a height of the first roller relative to the build area.

70. The method of any preceding clause, wherein: the at least one operating parameter of the additive manufacturing system is adjusted based on a comparison of an expected force on the first roller to the first force on the first roller determined based on the first output signal of the first sensor.

71. The method of any preceding clause, further comprising: determining a type of defect based on the comparison of the expected force on the first roller to the first force on the first roller determined based on the first output signal of the first sensor; and adjusting the at least one operating parameter of the additive manufacturing system based on the type of defect.

72. The method of any preceding clause, wherein adjusting the at least one operating parameter of the additive manufacturing system in response to the determined first force comprises one or more of: (i) adjusting the at least one operating parameter of the additive manufacturing system while the layer is being distributed by the recoat assembly; and (ii) adjusting the at least one operating parameter of the additive manufacturing system when a next layer is distributed by the recoat assembly.

73. The method of any preceding clause, further comprising determining a wear parameter of the first roller based on the determined first force.

74. The method of any preceding clause, wherein the recoat assembly further comprises a second sensor mechanically coupled to and in contact with the second roller support, the method further comprising: receiving a second output signal from the second sensor as the layer of the build material is distributed on the build area with the recoat assembly; and determining the first force on the first roller based on the first output signal of the first sensor and the second output signal of the second sensor.

75. The method of any preceding clause, wherein the recoat assembly further comprises a second roller disposed between a third roller support and a fourth roller support, a second rotational actuator operably coupled to the second roller and configured to rotate the second roller about a second rotation axis, and a third sensor mechanically coupled to and in contact with the third roller support, the method further comprising: receiving a third output signal from the third sensor as the layer of the build material is distributed on the build area with the recoat assembly; determining a second force on the second roller based on the third output signal of the third sensor; and adjusting the at least one operating parameter of the additive manufacturing system in response to the determined first force and the determined second force.

76. The method of any preceding clause, further comprising: sensing a current driving a transverse actuator that moves the recoat assembly relative to the build area; and adjusting the at least one operating parameter of the additive manufacturing system based on the sensed current.

77. The method of any preceding clause, further comprising: determining a roller collision event based on an output of at least one accelerometer; and adjusting the at least one operating parameter of the additive manufacturing system when the roller collision event is determined to have occurred.

78. A cleaning station for an additive manufacturing system of any preceding clause, wherein the cleaning station comprises: a cleaning station vessel comprising a wet wipe cleaner section and a dry wipe cleaner section downstream of the wet wiper section, wherein: the wet wipe cleaner section comprises a wet wipe member coupled to an actuator, the actuator being operable to vertically raise and lower the wet wipe member into the cleaning station vessel; and the dry wipe cleaner section comprises a dry wipe member coupled to an actuator, the actuator being operable to vertically raise and lower the dry wipe member into the cleaning station vessel, wherein the wet wipe cleaner section and the dry wipe cleaner section are arranged sequentially such that the wet wipe member is configured to apply cleaning fluid to a print head and the dry wipe member is configured to remove excess cleaning fluid from the print head after cleaning by the wet wipe cleaner section.

79. The cleaning station of any preceding clause, further comprising a capping section operable to maintain a print head in a wet state when the print head is idle.

80. The cleaning station of any preceding clause, wherein the capping section comprises a sponge coupled to an actuator, the actuator being operable to vertically raise and lower the sponge into the cleaning station vessel.

81. The cleaning station of any preceding clause, wherein at least a portion of the sponge extends above a fluid level of the cleaning fluid.

82. The cleaning station of any preceding clause, wherein the capping section is coupled to an actuator operable to vertically raise and lower the capping section into the cleaning station vessel.

83. The cleaning station of any preceding clause, wherein the cleaning station vessel comprises a plurality of inlet ports located within the cleaning station vessel to circulate the cleaning fluid within the cleaning station vessel and a drain located within the cleaning station vessel through which contaminants and cleaning fluid exit the cleaning station vessel.

84. The cleaning station of any preceding clause, wherein the cleaning station vessel is in fluid communication with an overflow vessel comprising a first fluid level sensor and a second fluid level sensor, wherein cleaning fluid is pumped out of the overflow vessel responsive to the first fluid level sensor and the second fluid level sensor detecting the cleaning fluid until neither of the first fluid level sensor and the second fluid level sensor detects the cleaning fluid.

85. A method of cleaning a print head used in an additive manufacturing system of any preceding clause, the additive manufacturing system comprising a cleaning station and a build platform, wherein the cleaning station comprises: a binder purge bin; and a cleaning station vessel comprising a wet wipe cleaner section, and a dry wipe cleaner section, wherein the cleaning station vessel comprises cleaning fluid, and wherein the method comprises: passing the print head over the binder purge bin to facilitate discharge of contaminants from the print head via backpressure; introducing the print head to the wet wipe cleaner section so that cleaning fluid is applied to the print head by a wet wipe member; and introducing the print head to the dry wipe cleaner section so that cleaning fluid is removed by a dry wipe member and the print head is thereby cleaned.

86. The method of any preceding clause, further comprising introducing the print head to an additional purge bin downstream of the dry wipe cleaner section and upstream of the build platform.

87. The method of any preceding clause, wherein the dry wipe member is vertically raised out of the cleaning fluid before completion of discharge of contaminants from the print head.

88. The method of any preceding clause, wherein the wet wipe member is vertically raised out of the out of the cleaning fluid when discharge of contaminants from the print head is complete.

89. The method of any preceding clause, wherein excess binder is discharged into the binder purge bin while a recoat head is operating in a direction supplying build material to a working surface of the build platform.

90. The method of any preceding clause, wherein the steps of introducing the print head to the wet wipe cleaner section and introducing the print head to the dry wipe cleaner section are performed while a recoat head is traveling in a direction from the build platform toward a recoat home position.

91. The method of any preceding clause, further comprising removing cleaning fluid from the cleaning station vessel if a fluid level of cleaning fluid exceeds a maximum fluid level.

92. The method of any preceding clause, further comprising adjusting one or more components of the cleaning station, the adjusting comprising: adjusting a vertical position of one or more of a top edge of the wet wipe member and a top edge of the dry wipe member to a position such that the one or more of the top edge of the wet wipe member and the top edge of the dry wipe member is vertically lower than a first section of a height gauge having a first vertical position and vertically higher than a second section of the height gauge having a second vertical position; wherein the height gauge is affixed to a print head assembly comprising the print head.

93. The method of any preceding clause, further comprising: prior to passing the print head over the binder purge bin, introducing the print head to at least one of the dry wipe cleaner section and the wet wipe cleaner section to pre-clean the print head.

94. The method of any preceding clause, further comprising: introducing the print head to a purge wipe member after the discharge of contaminants from the print head so that binder fluid discharged from the print head with the contaminants are wiped from a face of the print head prior to introducing the print head to the wet wipe cleaner section.

95. A method for storing a print head of any preceding clause comprising: applying cleaning fluid to the print head using a wet wipe member; removing cleaning fluid from the print head using a dry wipe member; and applying a cover to the print head to create a non-curing environment around the print head.

96. The method of any preceding clause, wherein applying the cover comprises actuating an actuator coupled to a wet sponge to raise the wet sponge within a cleaning station vessel into contact with the print head.

97. The method of any preceding clause, wherein applying the cover comprises bringing the print head into contact with a cleaning vessel containing the cleaning fluid to maintain a humidity level between the print head and the cleaning vessel.

98. A method of cleaning a print head of any preceding clause comprising: applying a cleaning fluid comprising from 70 wt % to 99.9 wt % water and 0.1 wt % to 30 wt % of one or more organic solvents selected from the group consisting of dimethyl formamide (DMF), N-methyl-2-pyrrolidone (NMP), dimethyl sulfoxide (DMSO), N,N-dimethylacetamide (DMAc), 1,3-dimethyl-2-imidazolidinone (DMI), 1,3-dimethyl-3,4,5,6-tetrahydro-2(1H)-pyrimidinone (DMPU), ethylene glycol, diethyl glycol, dipropylene glycol dimethyl ether, cyrene, dimethyl isosorbide, and propylene glycol to a surface of the print head having precipitant from a binder fluid comprising polyvinyl alcohol or a derivative thereof thereon; and removing used cleaning fluid from the surface of the print head after the cleaning fluid at least partially dissolves the precipitant from the surface.

99. The method of any preceding clause, wherein the cleaning fluid comprises from 0.5 wt % to 10 wt % of the one or more organic solvents.

100. The method of any preceding clause, wherein the organic solvent comprises DMF, NMP, DMSO, dipropylene glycol dimethyl ether, cyrene, dimethyl isosorbide, ethylene glycol, and combinations thereof.

101. The method of any preceding clause, wherein the cleaning fluid has a viscosity of less than 10 cP at 25° C.

102. The method of any preceding clause, wherein the cleaning fluid has a boiling point that is greater than or equal to 100° C. at 1 atm.

103. The method of any preceding clause, wherein the density of the cleaning fluid is from 0.900 to 1.400 g/cm$^3$.

104. The method of any preceding clause, further comprising: passing at least a portion of the cleaning fluid through the print head having the precipitant from a binder fluid comprising polyvinyl alcohol (PVA), polyvinyl pyrrolidone (PVP), polyacrylic acid (PAA), or derivatives thereof therein.

105. The method of any preceding clause, further comprising: removing the used cleaning fluid from the print head after the cleaning fluid at least partially dissolves the precipitant from within the print head.

106. A method for monitoring a status of a cleaning fluid in a cleaning fluid system of any preceding clause, the method comprising: obtaining an initial value corresponding to at least one physical property selected from the group consisting of a density of the cleaning fluid, a viscosity of the cleaning fluid, a haze measurement, a surface tension, a color, a pH, a conductivity, and fluorescence of the cleaning fluid; obtaining a subsequent value corresponding to the at least one physical property of the cleaning fluid after a predetermined period of time of usage of the cleaning fluid to clean a print head; estimating one of an amount of contaminant in the cleaning fluid and an amount of evaporation of the cleaning fluid based on the difference between the subsequent value and the initial value of the physical property; selecting a cleaning fluid maintenance process is selected from a plurality of available maintenance processes based on the estimated one of the amount of contaminant and the amount of evaporation in the cleaning fluid; and performing the cleaning fluid maintenance process selected.

107. The method of any preceding clause, wherein performing the cleaning fluid maintenance process selected comprising adding water to the cleaning fluid.

108. The method of any preceding clause, wherein performing the cleaning fluid maintenance process selected comprises replacing a portion of the cleaning fluid containing contaminants with fresh cleaning fluid.

109. The method of any preceding clause, wherein performing the cleaning fluid maintenance process selected comprises replacing a majority of a volume of the cleaning fluid with fresh cleaning fluid.

110. The method of any preceding clause, wherein performing the cleaning fluid maintenance process selected comprises returning the cleaning fluid containing contaminants to a cleaning fluid reservoir in the cleaning fluid system.

111. The method of any preceding clause, wherein the at least one physical property is the density of the cleaning fluid, and wherein selecting the cleaning fluid maintenance process is further based on a viscosity, a surface tension, or both, of the cleaning fluid after the predetermined period of time.

112. The method of any preceding clause, wherein the cleaning fluid initially comprises from 70 wt % to 99.9 wt % water and 0.1 wt % to 30 wt % of one or more organic solvents selected from the group consisting of dimethyl formamide (DMF), N-methyl-2-pyrrolidone (NMP), dimethyl sulfoxide (DMSO), N,N-dimethylacetamide (DMAc), 1,3-dimethyl-2-imidazolidinone (DMI), 1,3-dimethyle-3,4,5,6-tetrahydro-2(1H)-pyrimidinone (DMPU), ethylene glycol, diethyl glycol, dipropylene glycol dimethyl ether, cyrene, dimethyl isosorbide, and propylene glycol.

113. The method of any preceding clause, wherein the contaminants comprise polyvinyl alcohol (PVA), polyvinyl pyrrolidone (PVP), polyacrylic acid (PAA), or derivatives thereof.

114. A method for monitoring the performance of an additive manufacturing device of any preceding clause using a fluorescent binder, the method comprising: exposing at least one layer comprising the fluorescent binder to electromagnetic radiation wherein the fluorescent binder includes fluorescent material which emits light in response to the electromagnetic radiation; sensing the emitted light intensity of the at least one layer after exposure; and computing a level of binder, solvent, or both within the layer versus time by utilizing a control system which correlates the sensed emitted light intensity to the level of binder, solvent, or both in the layer.

115. The method of any preceding clause, further comprising locating defects in the layer when the recorded emitted light intensity deviates from expected emitted light intensity values, or when the level of binder, solvent, or both deviates from expected levels.

116. The method of any preceding clause, further comprising performing diagnostic checks on the additive manufacturing device when defects are located.

117. The method of any preceding clause, wherein the electromagnetic radiation is UV radiation.

118. A fluid management system for supplying at least a binder fluid and a cleaning fluid of any preceding clause, the system comprising: a cleaning fluid path comprising at least one cleaning fluid reservoir, a pump configured to deliver the cleaning fluid from the at least one cleaning fluid reservoir to at least one cleaning station vessel, and a drain coupling the at least one cleaning station vessel to the at least one cleaning fluid reservoir; and a binder fluid path comprising at least one binder reservoir, a pump configured to deliver the binder fluid from the at least one binder reservoir through an ink supply system to a print head manifold, and a binder purge bin configured to receive binder fluid discharged by a print head coupled to the print head manifold.

119. The fluid management system of any preceding clause, wherein the binder purge bin is a first binder purge bin, the binder fluid path further comprising a second binder purge bin, wherein the first binder purge bin is located upstream from the at least one cleaning station vessel and the second binder purge bin is located downstream from the at least one cleaning station vessel along a path of the print head.

120. The fluid management system of any preceding clause, wherein the cleaning fluid path further comprises a filter positioned between the at least one cleaning fluid reservoir and the pump.

121. The fluid management system of any preceding clause, wherein the binder fluid path further comprises a filter positioned between the binder purge bin and the at least one binder reservoir.

122. The fluid management system of any preceding clause, wherein the binder fluid path further comprises an additional pump configured to pump fluid from the binder purge bin to the at least one binder reservoir.

123. The fluid management system of any preceding clause, wherein the cleaning fluid path further comprises a heater to heat the cleaning fluid.

124. The fluid management system of any preceding clause, wherein the cleaning fluid path further comprises a controller configured to send a signal to a valve positioned in the cleaning fluid path between the at least one cleaning station vessel and the at least one cleaning fluid reservoir to redirect a predetermined amount of the cleaning fluid flowing from the at least one cleaning station vessel to the at least one cleaning fluid reservoir to a waste tank, wherein the predetermined amount of the cleaning fluid contains at least some binder fluid.

125. The fluid management system of any preceding clause, wherein the controller is further configured to send a signal to the pump of the cleaning fluid path to adjust a flow rate of the cleaning fluid from the at least one cleaning fluid reservoir to the at least one cleaning station vessel.

126. The fluid management system of any preceding clause, wherein the controller is further configured to send a signal to a heater positioned between the pump and the at least one cleaning station vessel to adjust a temperature of the cleaning fluid.

127. The fluid management system of any preceding clause, wherein at least one of the pump of the cleaning fluid path and the pump of the binder fluid path is configured to move ferrous metals.

128. A method of using a fluid management system of any preceding clause comprising: continuously recirculating a binder fluid through a binder fluid path comprising at least one binder reservoir, a pump, and a binder purge bin, wherein: the pump delivers the binder fluid from the at least one binder reservoir through an ink supply system to a print head manifold; and the binder purge bin receives binder fluid discharged by a print head coupled to the print head manifold; delivering, using a pump, a cleaning fluid from at least one cleaning fluid reservoir to at least one cleaning station vessel; receiving, at a waste tank, a first portion of the cleaning fluid from the at least one cleaning station vessel; returning a second portion of the cleaning fluid from the at least one cleaning station vessel to the at least one cleaning fluid reservoir; and diverting a predetermined amount of the second portion of the cleaning fluid to the waste tank based on a level of contamination of the cleaning fluid with the binder fluid.

129. The method of any preceding clause, wherein diverting the predetermined amount of the second portion of the cleaning fluid comprises sending a signal to a valve positioned between the at least one cleaning station vessel, the at least one cleaning fluid reservoir, and the waste tank to divert the predetermined amount of the second portion of the cleaning fluid flowing from the at least one cleaning station vessel to the at least one cleaning fluid reservoir to the waste tank.

130. The method of any preceding clause, wherein the binder purge bin comprises an overflow outlet for redirecting the binder fluid from the binder purge bin to the at least one binder reservoir.

131. The method of any preceding clause, wherein continuously recirculating the binder fluid comprises pumping the binder fluid from the binder purge bin to the at least one binder reservoir.

132. The method of any preceding clause, wherein the binder fluid path further comprises a filter positioned between the binder purge bin and the at least one binder reservoir.

133. The method of any preceding clause, wherein the filter is positioned between the binder purge bin and the pump of the binder fluid path.

134. A wet wiper apparatus of any preceding clause comprising: a wet wiper body having a top side and a bottom side; a first wiper blade vertically extending from the top side of the wet wiper body; and a fluid channel horizontally extending from a first end of the wet wiper body to a second end of the wet wiper body, the fluid channel having an open top to allow fluid flow out of the fluid channel.

135. The wet wiper apparatus of any preceding clause, further comprising a second wiper blade vertically extending from the top side of the wet wiper body and spaced apart from the first wiper blade.

136. The wet wiper apparatus of any preceding clause, wherein the fluid channel is positioned between the first wiper blade and the second wiper blade.

137. The wet wiper apparatus of any preceding clause, wherein the first wiper blade and the second wiper blade extend from a first end of the wet wiper apparatus to a second end of the wet wiper apparatus.

138. The wet wiper apparatus of any preceding clause, further comprising a pair of walls extending between the first wiper blade and the second wiper blade from a base of the wet wiper apparatus to a top of each of the first wiper blade and the second wiper blade.

139. The wet wiper apparatus of any preceding clause, wherein fluid channel defines a recessed path within the wet wiper body.

140. The wet wiper apparatus of any preceding clause, further comprising a cleaning manifold extending below the fluid channel within the wet wiper body, wherein the cleaning manifold comprises a plurality of fluid ports configured to provide cleaning fluid to the fluid channel.

141. The wet wiper apparatus of any preceding clause, further comprising a plurality of cleaning fluid inlets operable to receive the cleaning fluid and provide the cleaning fluid to the cleaning manifold.

142. The wet wiper apparatus of any preceding clause, wherein the plurality of cleaning fluid inlets comprise fluid conduits extending vertically upward through the bottom side of the wet wiper body.

143. The wet wiper apparatus of any preceding clause, wherein the plurality of cleaning fluid inlets comprise fluid conduits extending from a side of the wet wiper body adjacent to the top side and the bottom side of the wet wiper body.

144. The wet wiper apparatus of any preceding clause, further comprising a cleaning manifold extending below the fluid channel within the wet wiper body, wherein the cleaning manifold comprises a fluid port extending from the first end of the wet wiper apparatus to the second end of the wet wiper apparatus configured to provide cleaning fluid to the fluid channel.

145. The wet wiper apparatus of any preceding clause, further comprising at least one motion coupler extending from the wet wiper apparatus and configured to couple the wet wiper apparatus to a cleaning station for vertical motion therein.

146. A wet wiper apparatus of any preceding clause comprising: a wet wiper body having a top side and a bottom side; a wiper blade vertically extending from a top side of the wet wiper body; a manifold comprising at least one fluid port, the manifold being configured to deliver cleaning fluid to the top side of the wet wiper body; and cleaning fluid inlets extending through the wet wiper body, wherein the cleaning fluid inlets are in fluid communication with the at least one fluid port of the manifold.

147. The wet wiper apparatus of any preceding clause, wherein the wiper blade is a first wiper blade, and the wet wiper apparatus further comprises a second wiper blade vertically extending from a top side of the wet wiper body.

148. The wet wiper apparatus of any preceding clause, wherein the at least one fluid port is disposed between the first and second wiper blades along the wet wiper body.

149. The wet wiper apparatus of any preceding clause, further comprising a fluid channel formed in the wet wiper body and positioned between the first wiper blade and the second wiper blade, wherein the fluid channel is in fluid communication with the at least one fluid port of the manifold.

150. The wet wiper apparatus of any preceding clause, wherein the fluid channel comprises an open top to allow fluid flow out of the fluid channel.

151. The wet wiper apparatus of any preceding clause, wherein the cleaning fluid inlets extend vertically upward through the bottom side of the wet wiper body.

152. The wet wiper apparatus of any preceding clause, further comprising a pair of walls extending between the first wiper blade and the second wiper blade from the top side of the wet wiper apparatus to a top of each of the first wiper blade and the second wiper blade.

153. The wet wiper apparatus of any preceding clause, further comprising at least one motion coupler extending from the wet wiper apparatus and configured to couple the wet wiper apparatus to a cleaning station for vertical motion therein.

154. A wiper array of any preceding clause comprising: a wiper mounting member extending along a longitudinal axis; and a plurality of wiper blades mounted to the wiper mounting member, wherein a length of each of the plurality of wiper blades extends in a direction that at an angle of greater than 0 and less than 90° relative to the longitudinal axis; wherein each of the plurality of wiper blades has an overlap of at least part of its length with the length of an adjacent wiper blade in a direction orthogonal to the longitudinal axis.

155. The wiper array of any preceding clause, wherein a length of each of the plurality of wiper blades is oriented at an angle of from 5 to 50° with respect to the longitudinal axis.

156. The wiper array of any preceding clause, wherein the wiper mounting member comprises a plurality of channels formed in a top face of the wiper mounting member, each channel shaped to receive one of the plurality of wiper blades.

157. The wiper array of any preceding clause, wherein each of the plurality of wiper blades has an overlap of at least 30% of its length with the length of an adjacent wiper blade in a direction orthogonal to the longitudinal axis.

158. The wiper array of any preceding clause, wherein each of the plurality of wiper blades comprises a blade and a body member from which the blade extends.

159. A cleaning station of any preceding clause comprising: a cleaning station vessel containing a volume of a cleaning fluid therein; a wiper assembly comprising a wiper mounting member extending along a longitudinal axis; a first actuator coupled proximate a first end of the wiper assembly; and a second actuator coupled proximate a second end of the wiper assembly; wherein the first actuator and the second actuator are independently operable to raise or lower a corresponding end of the wiper assembly into the volume of the cleaning fluid.

160. The cleaning station of any preceding clause, the wiper assembly being a first wiper assembly, wherein the cleaning station further comprises a second wiper assembly.

161. The cleaning station of any preceding clause, wherein at least one of the first wiper assembly and the second wiper assembly further comprises: a plurality of wiper blades mounted to the wiper mounting member, wherein a length of each of the plurality of wiper blades extends in a direction that at an angle of greater than 0 and less than 90° relative to the longitudinal axis; wherein each of the plurality of wiper blades has an overlap of at least part of its length with the length of an adjacent wiper blade in a direction orthogonal to the longitudinal axis.

162. The cleaning station of any preceding clause, wherein each of the plurality of wiper blades comprises a blade and a body member from which the blade extends.

163. The cleaning station of any preceding clause, wherein the first and second actuators are linear actuators.

164. The cleaning station of any preceding clause, wherein the first and second actuators are electric actuators.

165. The cleaning station of any preceding clause, wherein the electric actuators are operable to agitate the wiper assembly.

166. The cleaning station of any preceding clause, wherein the electric actuators are independently operable to raise or lower the corresponding end of the wiper assembly at a plurality of speeds.

167. A method of cleaning a print head of any preceding clause comprising: actuating a first actuator coupled proximate a first end of a wiper assembly to raise the first end of the wiper assembly above a volume of a cleaning fluid in a cleaning station vessel; after the first end of the wiper assembly is raised above the volume of the cleaning fluid, actuating a second actuator coupled proximate a second end of the wiper assembly to raise the second end of the wiper assembly above the volume of the cleaning fluid in the cleaning station vessel; passing the print head over the cleaning station vessel and the wiper assembly, thereby enabling the wiper assembly to remove cleaning fluid from the print head; actuating the first and second actuators to lower the first and second ends of the wiper assembly into the volume of the cleaning fluid in the cleaning station vessel.

168. The method of any preceding clause, wherein the wiper assembly comprises a wiper mounting member and a plurality of wiper blades mounted to the wiper mounting member, wherein a length of each of the plurality of wiper blades extends in a direction that at an angle of greater than 0 and less than 90° relative to a longitudinal axis along which the wiper mounting member extends; wherein each of the plurality of wiper blades has an overlap of at least part of its length with the length of an adjacent wiper blade in a direction orthogonal to the longitudinal axis; and wherein passing the print head over the cleaning station vessel and the wiper assembly comprises passing the print head in a direction orthogonal to the longitudinal axis.

169. The method of any preceding clause, wherein actuating the second actuator to lower the second end of the wiper assembly into the volume of the cleaning fluid in the cleaning station vessel is completed before or after actuating the first actuator to lower the first end of the wiper assembly into the volume of the cleaning fluid in the cleaning station vessel.

170. The method of any preceding clause, wherein actuating the second actuator to lower the second end of the wiper assembly into the volume of the cleaning fluid in the cleaning station vessel is completed while actuating the first actuator to lower the first end of the wiper assembly into the volume of the cleaning fluid in the cleaning station vessel.

171. The method of any preceding clause, wherein the first and second actuators are electric actuators.

172. The method of any preceding clause, further comprising actuating the electric actuators to agitate the wiper assembly.

173. A manufacturing apparatus any preceding clause, comprising: a printing head comprising a plurality of jet nozzles spaced apart from one another in a direction transverse to a longitudinal axis, wherein a distance from a first jet nozzle to a second jet nozzle positioned adjacent the first jet nozzle of the plurality of jet nozzles defines a jet-spacing; a printing head position control assembly comprising a first actuator assembly configured to move the printing head along the longitudinal axis and a second actuator assembly configured to move the printing head along a latitudinal axis; and an electronic control unit communicatively coupled to the printing head position control assembly, the electronic control unit is configured to: cause select ones of the plurality of jet nozzles to dispense one or more drops of binder while the printing head traverses a first pass trajectory along the longitudinal axis in a first direction, index the printing head to a second pass trajectory along the latitudinal axis by an index distance greater than zero and less than the jet-spacing, and cause select ones of the plurality of jet nozzles to dispense one or more drops of binder while the printing head traverses the second pass trajectory along the longitudinal axis in a second direction opposite the first direction.

174. The manufacturing apparatus of any preceding clause, wherein multiple drops of binder are dispensed within a pixel defining a 2-dimensional spatial portion of a layer of build material traversed by the printing head.

175. The manufacturing apparatus of any preceding clause, wherein the multiple drops of binder dispensed within the pixel vary in drop volume.

176. The manufacturing apparatus of any preceding clause, wherein the multiple drops of binder dispensed within the pixel vary in drop volume and location within the pixel.

177. The manufacturing apparatus of any preceding clause, wherein a total amount of binder predefined for dispensing within a pixel is dispensed in fractions of the total amount of binder over at least two passes of the printing head.

178. The manufacturing apparatus of any preceding clause, wherein the index distance is one-half the jet-spacing.

179. The manufacturing apparatus of any preceding clause, wherein the index distance is an integer multiple of a fractional value of the jet-spacing.

180. The manufacturing apparatus of any preceding clause, wherein the printing head comprises a first print head row comprising a plurality of print heads sequentially spaced apart from one another in a direction transverse to a working axis, the manufacturing apparatus further comprising: an actuator coupled to a first print head of the plurality of print heads, the actuator configured to move the first print head along a latitudinal axis.

181. The manufacturing apparatus of any preceding clause, wherein the electronic control unit is further configured to: index one or more of the plurality of print heads to the second pass trajectory along the latitudinal axis by an index distance greater than zero and less than the j et-spacing.

182. The manufacturing apparatus of any preceding clause, wherein the actuator is one of a plurality of actuators, wherein each actuator of the plurality of actuators is coupled to a print head of the plurality of print heads.

183. A manufacturing apparatus of any preceding clause, comprising: at least one printing head comprising a plurality of jet nozzles spaced apart from one another in a direction transverse to a longitudinal axis, wherein a distance from a first jet nozzle to a second jet nozzle positioned adjacent the first jet nozzle of the plurality of jet nozzles defines a jet-spacing; a printing head position control assembly comprising a first actuator configured to move the printing head along the longitudinal axis and a second actuator configured to move the printing head along a latitudinal axis; and an electronic control unit communicatively coupled to the printing head position control assembly, the electronic control unit is configured to: cause select ones of the plurality of jet nozzles to dispense one or more drops of binder to a powder layer in a deposition pattern defined by a slicing engine as the printing head traverses along the longitudinal axis applying binder, wherein the first jet nozzle of the plurality of jet nozzles corresponds to a first trajectory assigned by the slicing engine, index the printing head by an index distance along the latitudinal axis such that the first jet nozzle corresponds to a second pass trajectory and another jet nozzle corresponds to the first trajectory assigned by the slicing engine, and cause the indexed printing head to traverse along the longitudinal axis and apply binder to the powder layer in the deposition pattern defined by the slicing engine.

184. The manufacturing apparatus of any preceding clause, wherein the step of indexing the printing head along the latitudinal axis occurs between a first pass and a second pass over the same layer of powder.

185. The manufacturing apparatus of any preceding clause, wherein the step of indexing the printing head along the latitudinal axis occurs between after application of binder to a first layer of powder and before application of binder to a subsequent layer of powder.

186. The manufacturing apparatus of any preceding clause, further comprising an in situ monitoring system configured to: determine a malfunction of one or more jet nozzles of the plurality of jet nozzles, and provide a notification signal to the electronic control unit identifying the one or more malfunctioning jet nozzles.

187. The manufacturing apparatus of any preceding clause, wherein the electronic control unit is further configured to: develop one or more indexing commands for indexing the printing head between predefined passes such that a malfunctioning jet nozzle is configured to not traverse the same trajectory during consecutive passes while determined to be in a malfunctioning state.

188. The manufacturing apparatus of any preceding clause, wherein the electronic control unit is further configured to: develop a one or more indexing commands for indexing the printing head between predefined passes such that a malfunctioning jet nozzle does not traverse a trajectory defining an edge of the deposition pattern for a printed part.

189. The manufacturing apparatus of any preceding clause, wherein the slicing engine defines at least the predetermined number of layers and the deposition pattern of binder for printing a part.

190. The manufacturing apparatus of any preceding clause, further comprising: wherein the printing head comprises a first print head row comprising a plurality of print heads sequentially spaced apart from one another in a direction transverse to a working axis; and an actuator coupled to a first print head of the plurality of print heads, the actuator configured to move the first print head along a latitudinal axis.

191. The manufacturing apparatus of any preceding clause, wherein the electronic control unit is further configured to: index one or more of the plurality of print heads to the second pass trajectory along the latitudinal axis by an index distance along the latitudinal axis such that the first jet nozzle corresponds to the second pass trajectory and another jet nozzle corresponds to the first trajectory assigned by the slicing engine.

192. The manufacturing apparatus of any preceding clause, wherein the actuator is one of a plurality of actuators, wherein each actuator of the plurality of actuators is coupled to a print head of the plurality of print heads.

193. A manufacturing apparatus of any preceding clause, comprising: a printing head comprising a plurality of jet nozzles spaced apart from one another in a direction transverse to a longitudinal axis; a printing head position control assembly comprising a first actuator configured to move the printing head along the longitudinal axis; and an electronic control unit communicatively coupled to the printing head position control assembly, the electronic control unit configured to: cause select ones of the plurality of jet nozzles to dispense a predetermined volume of binder to a powder layer in a deposition pattern defined by a slicing engine as the printing head traverses the longitudinal axis applying binder, wherein an amount of binder dispensed in a first portion of powder in a first layer is less than the amount of binder dispensed in a portion of powder in a second layer located above the first portion of powder in the first layer.

194. The manufacturing apparatus of any preceding clause, wherein the amount of binder dispensed in successive vertically aligned portions of powder in subsequent layers of powder progressively increases to a predetermined volume.

195. The manufacturing apparatus of any preceding clause, wherein the amount of binder dispensed in successive vertically aligned portions of powder in subsequent layers of powder progressively increases over an attenuation length defined by a predetermined number of layers of powder.

196. The manufacturing apparatus of any preceding clause, wherein the amount of binder dispensed in successive vertically aligned portions of powder in subsequent layers of powder progressively increases over an attenuation length defined by a predetermined number of layers of powder when the predetermined number of layers is greater than a predetermined thickness threshold.

197. The manufacturing apparatus of any preceding clause, wherein the amount of binder dispensed in successive vertically aligned portions of powder in subsequent layers is based upon one or more properties of a powder material.

198. The manufacturing apparatus of any preceding clause, wherein the amount of binder dispensed in successive vertically aligned portions of powder in subsequent layers is based upon a packing density of a powder material.

199. The manufacturing apparatus of any preceding clause, wherein the amount of binder dispensed in successive vertically aligned portions of powder in subsequent layers is based upon an amount of time a binder wicks before setting.

200. An actuator assembly for distributing build material and depositing binder material in an additive manufacturing apparatus of any preceding clause comprising an upper support; a lower support spaced from the upper support in a vertical direction, the upper support and the lower support extending in a horizontal direction; a recoat head for distributing build material; a print head for depositing binder material; a recoat head actuator coupled to the recoat head and one of the upper support and the lower support, the recoat head actuator comprising a recoat motion axis, wherein the recoat head actuator is bi-directionally actuatable along the recoat motion axis thereby effecting bi-directional movement of the recoat head; and a print head actuator coupled to the print head and the other of the upper support and the lower support, the print head actuator comprising a print motion axis, wherein the print head actuator is bi-directionally actuatable along the print motion axis thereby effecting bi-directional movement of the print head, wherein the recoat motion axis and the print motion axis are parallel to one another and spaced apart from one another in the vertical direction.

201. The actuator assembly of any preceding clause, wherein the upper support and the lower support are positioned on opposite sides of a support rail.

202. The actuator assembly of any preceding clause, wherein the recoat motion axis and the print motion axis are in the same vertical plane.

203. The actuator assembly of any preceding clause, wherein the actuator assembly further comprises an intermediate support positioned between the upper support and the lower support, the intermediate support extending in the horizontal direction; a process accessory; and an accessory actuator coupled to the process accessory and the intermediate support, the accessory actuator comprising an accessory motion axis, wherein the accessory actuator is bi-directionally actuatable along the accessory motion axis thereby effecting bi-directional movement of the process accessory, wherein the recoat motion axis, the print motion axis, and the accessory motion axis are parallel to one another and spaced apart from one another in the vertical direction.

204. The actuator assembly of any preceding clause, wherein the process accessory comprises a sensor, an energy source, an end effector or combinations thereof.

205. The actuator assembly of any preceding clause, wherein the sensor is at least one of an image sensor, a thermal detector, a pyrometer, a profilometer, and an ultrasonic detector.

206. The actuator assembly of any preceding clause, wherein sensor is at least one of an infrared heater, an ultraviolet lamp, and a laser light source.

207. The actuator assembly of any preceding clause, wherein: the recoat head comprises a recoat home position; the print head comprises a print home position spaced apart from the recoat home position in the horizontal direction; and a control system is communicatively coupled to the recoat head actuator and the print head actuator, the control system comprising a processor and a non-transitory memory storing computer readable and executable instructions that, when executed by the processor, cause: the recoat head actuator to advance the recoat head from the recoat home position towards the print home position at a recoat advance rate; the recoat head actuator to return the recoat head to the recoat home position at a recoat return rate; the print head actuator to advance the print head from the print home position of the print head towards the recoat home position at a print advance rate; and the print head actuator to return the print head to the print home position at a print return rate.

208. The actuator assembly of any preceding clause, wherein the recoat return rate is greater than the recoat advance rate.

209. The actuator assembly of any preceding clause, wherein the print return rate is greater than or equal to the print advance rate.

210. The actuator assembly of any preceding clause, wherein the print return rate is less than or equal to the print advance rate.

211. The actuator assembly of any preceding clause, wherein the recoat advance rate comprises: an initial recoat advance rate; and a distribution advance rate, wherein the initial recoat advance rate is greater than the distribution advance rate.

212. The actuator assembly of any preceding clause, wherein the print advance rate comprises: an initial print advance rate; and a deposition advance rate, wherein the initial print advance rate is greater than the deposition advance rate.

213. The actuator assembly of any preceding clause, wherein the print return rate comprises: a deposition return rate; and a print complete return rate, wherein the print complete return rate is greater than the deposition return rate.

214. The actuator assembly of any preceding clause, wherein the print head is advanced from the print home position towards the recoat home position while the recoat head is returned to the recoat home position.

215. The actuator assembly of any preceding clause, wherein the recoat head is advanced from the recoat home position towards the print home position while the print head is returned to the print home position of the print head.

216. The actuator assembly of any preceding clause, wherein the recoat head comprises at least one of a wiper and a roller for distributing build material.

217. The actuator assembly of any preceding clause, wherein the recoat head comprises a leading roller and a trailing roller for distributing build material.

218. The actuator assembly of any preceding clause, wherein the leading roller rotates in a first direction and the trailing roller rotates in a second direction opposite the first direction.

219. The actuator assembly of any preceding clause, wherein the recoat head and/or the print head comprises at least one energy source.

220. The actuator assembly of any preceding clause, wherein the print head is a thermal print head or a piezo print head.

221. The actuator assembly of any preceding clause, wherein the print head is fixed in directions orthogonal to the print motion axis.

222. An additive manufacturing apparatus of any preceding clause, comprising: a cleaning station comprising a cleaning station cycle time; a build platform; a recoat head for distributing build material, the recoat head coupled to a recoat head actuator comprising a recoat motion axis, the recoat head and recoat head actuator comprising a recoat cycle time; and a print head for depositing binder material, the print head coupled to a print head actuator comprising a print motion axis, the print head and the print head actuator comprising a print cycle time, wherein: the recoat motion axis and the print motion axis are parallel to one another and spaced apart from one another in a vertical direction; and the additive manufacturing apparatus comprises an overall build cycle time that is less than the sum of cleaning station cycle time, the recoat cycle time, and the print cycle time.

223. The apparatus of any preceding clause, wherein: the cleaning station cycle time overlaps with both the print cycle time and the recoat cycle time $T_{RH}$; and the overall build cycle time is less than the sum of the recoat cycle time and the print cycle time.

224. The apparatus of any preceding clause, wherein: the recoat head actuator is coupled to one of an upper support and a lower support; and the print head actuator is coupled to the other of the upper support and the lower support, wherein the upper support and the lower support are positioned above the build platform and extend in a horizontal direction.

225. The apparatus of any preceding clause, wherein the recoat motion axis and the print motion axis are located in the same vertical plane.

224. The apparatus of any preceding clause, wherein: the recoat head comprises a recoat home position; the print head comprises a print home position spaced apart from the recoat home position in a horizontal direction; and further comprising a control system communicatively coupled to the recoat head actuator and the print head actuator, the control system comprising a processor and a non-transitory memory storing computer readable and executable instructions that, when executed by the processor, cause: the recoat head actuator to advance the recoat head from the recoat home position towards the print home position at a recoat advance rate; the recoat head actuator to return the recoat head to the recoat home position at a recoat return rate; the print head actuator to advance the print head from the print home position of the print head towards the recoat home position at a print advance rate; and the print head actuator to return the print head to the print home position at a print return rate, wherein: the recoat return rate is greater than the recoat advance rate; and the print return rate is greater than the print advance rate.

225. The apparatus of any preceding clause, wherein the recoat advance rate comprises: an initial recoat advance rate; and a distribution advance rate, wherein the initial recoat advance rate is greater than the distribution advance rate.

226. The apparatus of any preceding clause, wherein the print advance rate comprises: an initial print advance rate; and a deposition advance rate, wherein the initial print advance rate is greater than the deposition advance rate.

227. The apparatus of any preceding clause, wherein the print return rate comprises: a deposition return rate; and a print complete return rate, wherein the print complete return rate is greater than the deposition return rate.

228. The apparatus of any preceding clause, wherein the print head is advanced from the print home position towards the recoat home position while the recoat head is returned to the recoat home position.

229. The apparatus of any preceding clause, wherein the recoat head is advanced from the recoat home position towards the print home position while the print head is returned to the print home position of the print head.

230. The apparatus of any preceding clause, further comprising a supply platform bi-directionally actuatable along a vertical axis, wherein the build platform is positioned between the cleaning station and the supply platform.

231. The apparatus of any preceding clause, further comprising a build material hopper coupled to the recoat head.

232. The apparatus of any preceding clause, further comprising a build material hopper positioned over the build platform.

233. A method of building an object by additive manufacturing of any preceding clause, the method comprising: distributing a new layer of build material on a build platform with a recoat head coupled to a recoat head actuator, the recoat head actuator comprising a recoat motion axis whereby actuation of the recoat head actuator along the recoat motion axis in a first recoat direction causes the recoat head to distribute the new layer of build material on the build platform; and depositing a binder material on the new layer of build material with a print head coupled to a print head actuator, the print head actuator comprising a print motion axis whereby the binder material is deposited with the print head by actuating the print head actuator along the print motion axis in a first print direction opposite the first recoat direction, wherein the recoat motion axis and the print motion axis are parallel to one another and spaced apart from one another in a vertical direction.

234. The method of any preceding clause, wherein: the recoat head and recoat head actuator comprise a recoat cycle time during which the new layer of build material is distributed on the build platform; and the print head and print head actuator comprise a print cycle time during which the binder material is deposited on the new layer of build material, wherein the print cycle time overlaps with the recoat cycle time.

235. The method of any preceding clause, wherein the recoat motion axis and the print motion axis are in the same vertical plane.

236. The method of any preceding clause, wherein: the recoat head is actuated by the recoat head actuator along the recoat motion axis at a recoat advance rate; and the print head is actuated by the print head actuator along the print motion axis at a print advance rate, wherein the print advance rate is greater than the recoat advance rate.

237. The method of any preceding clause, wherein the recoat advance rate comprises: an initial recoat advance rate; and a distribution advance rate, wherein the initial recoat advance rate is greater than the distribution advance rate.

238. The method of any preceding clause, wherein the print advance rate comprises: an initial print advance rate; and a deposition advance rate, wherein the initial print advance rate is greater than the deposition advance rate.

239. The method of any preceding clause, wherein: after the distributing the new layer of build material on the build platform, the recoat head is actuated by the recoat head actuator along the recoat motion axis in a second recoat direction opposite the first recoat direction at a recoat return rate.

240. The method of any preceding clause, wherein the recoat return rate is greater than the recoat advance rate.

241. The method of any preceding clause, wherein the print head is actuated by the print head actuator along the print motion axis in the first print direction as the recoat head is actuated by the recoat head actuator along the recoat motion axis in the second recoat direction.

242. The method of any preceding clause, wherein: after the depositing the binder material on the new layer of build material, the print head is actuated by the print head actuator along the print motion axis in a second print direction opposite the first print direction at a print return rate.

243. The method of any preceding clause, wherein the print return rate is greater than the print advance rate.

244. The method of any preceding clause, wherein the print head deposits binder material on the new layer of build material as the print head is actuated by the print head actuator along the print motion axis in the second print direction.

245. The method of any preceding clause, wherein the print return rate comprises: a deposition return rate; and a print complete return rate, wherein the print complete return rate is greater than the deposition return rate.

246. The method of any preceding clause, wherein the distributing the new layer of build material on the build platform comprises spreading build material from a supply platform to the build platform with at least one of a wiper or a roller coupled to the recoat head.

247. The method of any preceding clause, wherein the distributing the new layer of build material on the build platform comprises: spreading build material from a supply platform to the build platform with a first roller coupled to the recoat head; and compacting build material on the build platform with a second roller coupled to the recoat head, wherein the first roller and the second roller are rotated in opposite directions.

248. The method of any preceding clause, wherein the distributing the new layer of build material on the build platform further comprises heating the new layer of build material with an energy source coupled to the recoat head.

249. The method of any preceding clause, wherein the new layer of build material is distributed over a previous layer of build material disposed on the build platform and the method further comprises curing binder material deposited on the previous layer of build material prior to the distributing the new layer of build material.

250. The method of any preceding clause, wherein the binder material deposited on the previous layer of build material is cured with an energy source coupled to the recoat head.

251. An actuator assembly for distributing build material and depositing binder material in an additive manufacturing apparatus of any preceding clause, the assembly comprising: a support extending in a horizontal direction; a recoat head for distributing build material; a print head for depositing binder material; a recoat head actuator coupled to the recoat head and the support, the recoat head actuator comprising a recoat motion axis, wherein the recoat head actuator is bi-directionally actuatable along the recoat motion axis thereby effecting bi-directional movement of the recoat head; and a print head actuator coupled to the print head and the support, the print head actuator comprising a print motion axis, wherein the print head actuator is bi-directionally actuatable along the print motion axis thereby effecting bi-directional movement of the print head, wherein the recoat motion axis and the print motion axis are co-linear and bi-directional actuation of the print head actuator on the print motion axis and bi-directional actuation of the recoat head actuator on the recoat motion axis are independent of one another.

252. The actuator assembly of any preceding clause, wherein: the support is positioned in a first vertical plane; and the recoat motion axis and the print motion axis are positioned in a second vertical plane parallel to the first vertical plane.

253. The actuator assembly of any preceding clause, wherein: the print head is cantilevered from the support; and the recoat head is cantilevered from the support.

254. An actuator assembly for distributing build material and depositing binder material in an additive manufacturing apparatus of any preceding clause, the assembly comprising: an upper support; a lower support spaced from the upper support in a vertical direction; an intermediate support positioned between the upper support and the lower support and space from the upper support and the lower support in a vertical direction, the upper support, the lower support, and the intermediate support extending in a horizontal direction; a recoat head for distributing build material; a print head for depositing binder material; a process accessory; a recoat head actuator coupled to the recoat head and one of the upper support, the lower support, and the intermediate support, the recoat head actuator comprising a recoat motion axis, wherein the recoat head actuator is bi-directionally actuatable along the recoat motion axis thereby effecting bi-directional movement of the recoat head; a print head actuator coupled to the print head and another of the upper support, the lower support, and the intermediate support, the print head actuator comprising a print motion axis, wherein the print head actuator is bi-directionally actuatable along the print motion axis thereby effecting bi-directional movement of the print head; and an accessory actuator coupled to the process accessory and the other of the upper support, the lower support, and the intermediate support, the accessory actuator comprising an accessory motion axis, wherein the accessory actuator is bi-directionally actuatable along the accessory motion axis thereby effecting bi-directional movement of the process accessory, wherein the recoat motion axis, the print motion axis, and the accessory motion axis are parallel to one another and spaced apart from one another in the vertical direction.

255. The actuator assembly of any preceding clause, wherein the process accessory comprises a sensor, an energy source, an end effector or combinations thereof.

256. The actuator assembly of any preceding clause, wherein the sensor is at least one of an image sensor, a thermal detector, a pyrometer, a profilometer, and an ultrasonic detector.

257. The actuator assembly of any preceding clause, wherein the energy source is at least one of an infrared heater, an ultraviolet lamp, and a laser light source.

258. A build receptacle for an additive manufacturing apparatus which may be used in conjunction with the actuator assemblies, additive manufacturing apparatuses, and methods of any preceding clause, comprising a housing comprising a sidewall at least partially enclosing a build chamber, and a build platform positioned within the build chamber. A position of the build platform is slidably adjustable within the build chamber in a vertical direction from a lower position to one of a plurality of upper positions and from the one of the plurality of upper positions to the lower position. The build receptacle further comprises a plurality of heating elements disposed around the build chamber.

259. The build receptacle of any preceding clause, wherein a seal is disposed between the build platform and an interior surface of the sidewall.

260. The build receptacle of any preceding clause, wherein the seal comprises a core portion and an enveloping portion. The enveloping portion at least partially encloses the core portion, the core portion comprises polytetrafluoroethylene, and the enveloping portion comprises fibrous material.

261. The build receptacle of any preceding clause, wherein the enveloping portion comprises felt.

262. The build receptacle of any preceding clause, wherein the core portion comprises a braided polytetrafluoroethylene packing seal.

263. The build receptacle of any preceding clause, wherein the build platform comprises a seal seat in an edge of the build platform, the seal positioned in the seal seat such that the seal is disposed between the build platform and the interior surface of the sidewall.

264. The build receptacle of any preceding clause, further comprising a seal frame enclosing at least a portion of the seal seat.

265. The build receptacle of any preceding clause, wherein the housing further comprises a plurality of retention tabs extending from the sidewall into the build chamber proximate a bottom of the sidewall.

266. The build receptacle of any preceding clause, wherein the build platform is seated on the retention tabs when the build platform is in the lower position.

267. The build receptacle of any preceding clause, wherein the housing comprises a flange extending from the sidewall proximate a top of the sidewall.

268. The build receptacle of any preceding clause, further comprising a plurality of lift points located on the flange, the sidewall, or both, the lift points facilitating lifting and lowering the build receptacle.

269. The build receptacle of any preceding clause, wherein each lift point of the plurality of lift points comprises a handle extending from the flange, the sidewall, or both.

270. The build receptacle of any preceding clause, wherein each lift point of the plurality of lift points comprises a lift flange extending from the sidewall.

271. The build receptacle of any preceding clause, wherein the plurality of heating elements are disposed on an exterior surface of the sidewall.

272. The build receptacle of any preceding clause, wherein the plurality of heating elements are disposed within the sidewall.

273. The build receptacle of any preceding clause, wherein the plurality of heating elements are arranged in heating zones and each heating zone is independently actuatable.

274. The build receptacle of any preceding clause, wherein each heating zone is spaced apart from an adjacent heating zone in the vertical direction.

275. The build receptacle of any preceding clause, wherein each heating zone comprises at least one heating element arranged in a horizontal band.

276. The build receptacle of any preceding clause, further comprising at least one cover affixed to an exterior surface of the sidewall such that the plurality of heating elements are disposed between the cover and the exterior surface of the sidewall.

277. The build receptacle of any preceding clause, further comprising insulation positioned between the at least one cover and the plurality of heating elements.

278. The build receptacle of any preceding clause, wherein an exterior surface of the sidewall comprises grooves and the plurality of heating elements are positioned in the grooves.

279. The build receptacle of any preceding clause, further comprising a plurality of temperature sensors arranged around the build chamber.

280. The build receptacle of any preceding clause, further comprising a plurality of temperature sensors arranged around the build chamber.

281. The build receptacle of any preceding clause, wherein the temperature sensors are disposed within the sidewall.

282. The build receptacle of any preceding clause, wherein the temperature sensors are resistance temperature detectors coupled to individual ones of the plurality of heating elements.

283. The build receptacle of any preceding clause, wherein two resistance temperature detectors are coupled to individual ones of the plurality of heating elements.

284. The build receptacle of any preceding clause, wherein two resistance temperature detectors are coupled to individual ones of the plurality of heating elements.

285. The build receptacle of any preceding clause, wherein the electrical connectors supply power to the plurality of heating elements and transmit electrical signals from the build receptacle indicative of a temperature of the sidewall of the build receptacle.

286. The build receptacle of any preceding clause, further comprising a lid at least partially enclosing the build chamber.

287. The build receptacle of any preceding clause, wherein a bottom surface of the build platform further comprises connectors for coupling the build platform to a lift system for actuating the build platform from the lower position to one of the plurality of upper positions and from the one of the plurality of upper positions to the lower position.

287. The build receptacle of any preceding clause, further comprising a second plurality of heating elements positioned below a top surface of the build platform.

288. The build receptacle of any preceding clause, wherein the second plurality of heating elements are positioned below a bottom surface of the build platform.

289. An additive manufacturing apparatus comprising a build receptacle and a lift system which may be used in conjunction with the apparatuses, assemblies, and methods of any preceding clause. The build receptacle comprises a housing comprising a sidewall at least partially enclosing a build chamber, and a build platform positioned within the build chamber. A position of the build platform is slidably adjustable within the build chamber in a vertical direction from a lower position to one of a plurality of upper positions and from the one of the plurality of upper positions to the lower position. The lift system is a position of the build platform is slidably adjustable within the build chamber in a vertical direction from a lower position to one of a plurality of upper positions and from the one of the plurality of upper positions to the lower position.

290. The additive manufacturing apparatus of any preceding clause, wherein the build platform actuator comprises a ball screw coupled to a motor.

291. The additive manufacturing apparatus of any preceding clause, wherein the build platform actuator further comprises a drive linkage connecting the ball screw to an armature of the motor such that the ball screw is rotatably coupled to the armature of the motor.

292. The additive manufacturing apparatus of any preceding clause, wherein when the lift system is coupled to the build platform a bottom surface of the build platform is in contact with an upper surface of the heating platen.

293. The additive manufacturing apparatus of any preceding clause, wherein the lift system further comprises a plurality of vertical guides coupled to the heating platen.

294. The additive manufacturing apparatus of any preceding clause, wherein the lift system further comprises a heating platen position sensor for detecting a vertical position of the heating platen.

295. The additive manufacturing apparatus of any preceding clause, wherein the heating platen position sensor is positioned proximate to a lower end of the lift system and comprises a limit switch.

296. The additive manufacturing apparatus of any preceding clause, wherein the lift system further comprises a build platform position sensor for detecting a vertical position of the build platform.

297. The additive manufacturing apparatus of any preceding clause, wherein the lift system further comprises a build platform position sensor for detecting a vertical position of the build platform.

298. The additive manufacturing apparatus of any preceding clause, wherein a bottom surface of the build platform further comprises connectors to couple to the lift system; and an upper surface of the heating platen comprises corresponding connectors to couple to the bottom surface of the build platform.

299. The additive manufacturing apparatus of any preceding clause, wherein the housing comprises a flange extending from the sidewall proximate a top of the sidewall.

300. The additive manufacturing apparatus of any preceding clause, wherein a seal is disposed between the build platform and an interior surface of the sidewall.

301. The additive manufacturing apparatus of any preceding clause, wherein the build platform comprises a seal seat in an edge of the build platform, the seal positioned in the seal seat such that the seal is disposed between the build platform and the interior surface of the sidewall.

302. The additive manufacturing apparatus of any preceding clause, wherein the build platform comprises a seal seat in an edge of the build platform, the seal positioned in the seal seat such that the seal is disposed between the build platform and the interior surface of the sidewall.

303. The additive manufacturing apparatus of any preceding clause, wherein the build platform is seated on the retention tabs when the build platform is in the lower position.

304. The additive manufacturing apparatus of any preceding clause, further comprising a second plurality of heating elements disposed on an exterior surface of the sidewall.

305. The additive manufacturing apparatus of any preceding clause, further comprising a plurality of sensors disposed throughout the plurality of heating elements.

306. The additive manufacturing apparatus of any preceding clause, wherein the plurality of heating elements are communicatively coupled to at least one electrical connector disposed on the exterior surface of the sidewall.

307. The additive manufacturing apparatus of any preceding clause, wherein the electrical connectors supply power to the heating elements and transmit electrical signals from the build receptacle indicative of a temperature of the sidewall of the build receptacle.

308. A method of building an object by additive manufacturing that may be used in conjunction with any of the methods, apparatuses, or assemblies of any preceding clause. The method includes pre-heating a deposition region of a build chamber to a pre-heat temperature, distributing a layer of build material on a build platform positioned within the build chamber, depositing a layer of binder material on the layer of build material, and adjusting a position of the build platform such that a portion of build material and binder is within a curing region of the build chamber. The curing region of the build chamber is below the deposition region of the build chamber. The method further includes heating the curing region of the build chamber to a curing temperature, wherein the curing temperature is greater than the pre-heat temperature. The method further includes curing the portion of binder within the lower portion of the build chamber, and distributing a new layer of build material above the portion of build material and binder on the build platform.

309. The method of any preceding clause, wherein the heating and pre-heating are achieved with a plurality of heating elements positioned around the build chamber.

310. The method of any preceding clause, wherein the heating and pre-heating are achieved with a plurality of heating elements positioned around the build chamber.

311. The method of any preceding clause, wherein the pre-heat temperature is from 25° C. to 130° C.

312. The method of any preceding clause, wherein the pre-heat temperature is less than or equal to 70° C.

313. The method of any preceding clause, the curing temperature is from 100° C. to 250° C.

314. The method of any preceding clause, wherein the curing temperature is from 100° C. to 250° C.

315. The method of any preceding clause, further comprising detecting a temperature of the curing region and adjusting the curing temperature based on the detected temperature of the curing region.

316. An additive manufacturing apparatus that may be used in conjunction with the apparatuses, assemblies and methods of any preceding clause. The additive manufacturing apparatus comprises: a support chassis comprising a print bay, a build bay, and a material supply bay, each bay comprising an upper compartment and a lower compartment; and a working surface separating each of the print bay, the build bay, and the material supply bay into the upper compartment and the lower compartment, wherein: the build bay is disposed between the print bay and the material supply bay; and the lower compartment of the build bay comprises bulkheads sealing the lower compartment of the build bay from the lower compartment of the print bay and the lower compartment of the material supply bay.

317. The additive manufacturing apparatus of any preceding clause, further comprising: a high voltage electrical supply cabinet; and a low voltage electrical supply cabinet, wherein the high voltage electrical supply cabinet is located at a first end of the support chassis and the low voltage supply cabinet is located at a second end of the support chassis opposite the first end.

318. The additive manufacturing apparatus of any preceding clause, wherein: the support chassis comprises a front and back; low voltage supply lines are directed through cable trays at the front or the back of the support chassis; and high voltage supply lines are directed through cable trays at the other of the front and back of the support chassis.

319. The additive manufacturing apparatus of any preceding clause, wherein the cable trays comprising low voltage supply lines further comprise at least on of air lines, vacuum lines, and liquid lines.

320. The additive manufacturing apparatus of any preceding clause, wherein the cable trays are positioned proximate a top of the support chassis, a bottom of the support chassis, or proximate both a top and bottom of the support chassis.

321. The additive manufacturing apparatus of any preceding clause, wherein the cable trays, low voltage supply lines, and high voltage supply lines extend through the lower compartment of the build bay and are sealed to the bulk heads of the build bay with sealing glands.

322. The additive manufacturing apparatus of any preceding clause, wherein: the print bay comprises a cleaning station; a cleaning solution supply tank is positioned in the lower compartment of the print bay and fluidly coupled to the cleaning station; and a binder supply tank positioned in the lower compartment of the print bay, wherein the binder supply tank is fluidly coupled to a print head of the additive manufacturing apparatus.

323. The additive manufacturing apparatus of any preceding clause, further comprising a cleaning solution recovery tank is positioned in the lower compartment of the print bay and fluidly coupled to the cleaning station.

324. The additive manufacturing apparatus of any preceding clause, wherein: the working surface in the build bay comprises an opening for removably receiving a build receptacle; and a lift system is positioned in the lower compartment of the build bay, the lift system for raising and lowering a build platform of the build receptacle when the build receptacle is positioned in the opening of the working surface of the build bay.

325. The additive manufacturing apparatus of any preceding clause, further comprising a build temperature sensor positioned in the build bay and oriented to detect a temperature of a surface of the build platform of the build receptacle when the build receptacle is positioned in the opening of the working surface of the build bay.

326. The additive manufacturing apparatus of any preceding clause, further comprising a build bay temperature sensor positioned in the lower compartment of the build bay, the build receptacle temperature sensor configured to detect a temperature of the lower compartment of the build bay.

327. The additive manufacturing apparatus of any preceding clause, further comprising a camera system oriented to capture images of a surface of the build platform of the build receptacle when the build receptacle is positioned in the opening of the working surface of the build bay.

328. The additive manufacturing apparatus of any preceding clause, further comprising an environmental sensor positioned within the build bay, the material supply bay, or the print bay, the environmental sensor configured to detect at least one of an air temperature within the support chassis and humidity within the support chassis.

329. The additive manufacturing apparatus of any preceding clause, wherein: the working surface in the material supply bay comprises an opening for receiving a supply receptacle; and a lift system is positioned in the lower compartment of the material supply bay, the lift system for raising and lowering a supply platform of the supply receptacle when the supply receptacle is positioned in the opening of the working surface of the material supply bay.

330. The additive manufacturing apparatus of any preceding clause, wherein the print bay, the build bay, and the material supply bay each comprise at least one access panel coupled to the lower compartment and at least one access panel coupled to the upper compartment.

331. The additive manufacturing apparatus of any preceding clause, further comprising: air inlets in the lower compartment of the build bay; and a lower exhaust system coupled to the lower compartment of the build bay, wherein air is drawn into the lower compartment of the build bay through the air inlets and exhausted out of the build bay with the lower exhaust system.

332. The additive manufacturing apparatus of any preceding clause, wherein the air inlets are positioned proximate a top of the lower compartment of the build bay and the lower exhaust system is coupled to the lower compartment of the build bay proximate a bottom of the lower compartment of the build bay.

333. The additive manufacturing apparatus of any preceding clause, wherein the lower exhaust system is coupled to a floor panel of the build bay.

334. The additive manufacturing apparatus of any preceding clause, wherein the lower exhaust system comprises a filter.

335. The additive manufacturing apparatus of any preceding clause, wherein: the support chassis comprises a top panel enclosing a top of the support chassis; and an upper exhaust system is coupled to the top panel.

336. The additive manufacturing apparatus of any preceding clause, wherein the upper exhaust system comprises a filter.

337. The additive manufacturing apparatus of any preceding clause, further comprising: a powder recovery slot extending through the working surface in one of the build bay and the material supply bay; a recovery funnel coupled to the powder recovery slot; and a vacuum system coupled to the recovery funnel, the vacuum system applying a negative pressure to the recovery funnel and the powder recovery slot.

338. The additive manufacturing apparatus of any preceding clause, wherein a sidewall of the powder recovery slot comprises a cone angle of less than or equal to 60 degrees with respect to a vertical axis.

339. The additive manufacturing apparatus of any preceding clause, wherein the vacuum system couples the powder recovery slot and recovery funnel to the sieve system.

340. The additive manufacturing apparatus of any preceding clause, further comprising: an actuator assembly comprising a recoat head, the recoat head comprising a containment housing; and a vacuum system coupled to the containment housing, whereby the vacuum system applies a negative pressure to the containment housing.

341. The additive manufacturing apparatus of any preceding clause, wherein the vacuum system couples the containment housing to the sieve system.

342. The additive manufacturing apparatus of any preceding clause, further comprising: an actuator assembly comprising a print head, the print head comprising a print head housing; and an air pump coupled to the print head housing, the air pump providing an overpressure to the print head housing.

343. An actuator assembly for distributing build material and depositing binder material in an additive manufacturing apparatus of any preceding clause comprises an upper support; a lower support spaced from the upper support in a vertical direction, the upper support and the lower support extending in a horizontal direction; a recoat head for distributing build material; a print head for depositing binder material; a recoat head actuator coupled to the recoat head and one of the upper support and the lower support, the recoat head actuator comprising a recoat motion axis, wherein the recoat head actuator is bi-directionally actuatable along the recoat motion axis thereby effecting bi-directional movement of the recoat head; a print head actuator coupled to the print head and the other of the upper support and the lower support, the print head actuator comprising a print motion axis, wherein the print head actuator is bi-directionally actuatable along the print motion axis thereby effecting bi-directional movement of the print head, wherein the recoat motion axis and the print motion axis are parallel to one another and spaced apart from one another in the vertical direction; and a control system communicatively coupled to the recoat head actuator and the print head actuator, the control system comprising a processor and a non-transitory memory storing computer readable and executable instructions that, when executed by the processor, cause: the recoat head actuator and the print head actuator to independently move the recoat head and the print head along a working axis during a build cycle, wherein, during the build cycle, the recoat head and the print head occupy an overlapping position on the working axis; and the processor to abort the build cycle in response to the processor determining that the print head and the recoat head are separated by less than a minimum separation distance.

344. The actuator assembly of any preceding clause, wherein the minimum separation distance is determined based on maximum velocities of the print head and the recoat head during the build cycle.

345. The actuator assembly of any preceding clause, wherein the processor calculates the minimum separation distance during the build cycle based on velocities of the print head and the recoat head during the build cycle.

346. The actuator assembly of any preceding clause, wherein the print head actuator comprises a first linear encoder and the recoat head actuator comprises a second linear encoder, wherein the processor determines that the print head and the recoat head are separated by less than the minimum separation distance based on measurements by the first and second linear encoders.

347. The actuator assembly of any preceding clause, further comprising a proximity sensor disposed on one of the print head and the recoat head, wherein the processor determines that the print head and the recoat head are separated by less than the minimum separation distance based on a signal generated by the proximity sensor.

348. An additive manufacturing apparatus of any preceding clause comprising: a cleaning station comprising a cleaning station cycle time; a build platform; a recoat head for distributing build material, the recoat head coupled to a recoat head actuator comprising a recoat motion axis, the recoat head and recoat head actuator comprising a recoat cycle time; a print head for depositing binder material, the print head coupled to a print head actuator comprising a print motion axis, the print head and the print head actuator comprising a print cycle time; and a control system is communicatively coupled to the recoat head actuator and the print head actuator, the control system configured to cause independent motion of the print head and the recoat head during a build cycle, the build cycle having an overall build cycle time that is less than the sum of cleaning station cycle time, the recoat cycle time, and the print cycle time, wherein, during the build cycle time, the control system is configured to abort the build cycle in response to determining that the print head and the recoat head are separated by less than a minimum separation distance.

349. The additive manufacturing apparatus of any preceding clause, wherein the minimum separation distance is determined based on maximum velocities of the print head and the recoat head during the build cycle.

350. The additive manufacturing apparatus of any preceding clause, wherein the control system calculates the minimum separation distance during the build cycle based on velocities of the print head and the recoat head.

351. A method of building an object by additive manufacturing of any preceding clause, the method comprising: distributing a new layer of build material on a build platform with a recoat head coupled to a recoat head actuator, the recoat head actuator comprising a recoat motion axis whereby actuation of the recoat head actuator along the recoat motion axis in a first recoat direction causes the recoat head to distribute the new layer of build material on the build platform; and depositing a binder material on the new layer of build material with a print head coupled to a print head actuator, the print head actuator comprising a print motion axis whereby the binder material is deposited with the print head by actuating the print head actuator along the print motion axis in a first print direction opposite the first recoat direction, wherein a timing of the actuating the print head actuator along the print motion axis in the first print direction is determined based on a minimum separation between the print coat head and the recoat head.

352. The method of any preceding clause, further comprising determining that the print head and the recoat head are separated by less than the minimum separation distance; and responsive to the determination, returning the print head to a print home position and the recoat head to a recoat home position.

353. The method of any preceding clause, wherein determining that the print head and the recoat head are separated by less than the minimum separation distance comprises determining a position of the print head along the print motion axis and a position of the recoat head along the recoat motion axis using linear encoders of the print head actuator and the recoat head actuator, respectively.

354. The method of any preceding clause, wherein determining that the print head and the recoat head are separated by less than the minimum separation distance comprises measuring a proximity of the print head to the recoat head via a proximity sensor disposed on the print head or the recoat head.

355. The method of any preceding clause, further comprising calculating the minimum separation distance prior to distributing the new layer of build material or depositing the binder material by determining a maximum relative velocity at which the print head and the recoat head are moved towards each other during the distribution of the new layer of build material and the deposition of the binder material.

356. The method of any preceding clause, further comprising calculating the minimum separation distance during the distribution of the new layer of build material and the deposition of the binder material based on rates at which the print head and the recoat head are actuated.

357. A method of building an object by additive manufacturing of any preceding clause, the method comprising: pre-heating a deposition region of a build chamber to a pre-heat temperature; distributing a layer of build material on a build platform positioned within the build chamber with a recoat assembly moving in a coating direction; depositing a layer of binder material on the layer of build material; irradiating the layer of build material with an energy source coupled to the recoat assembly; adjusting a position of the build platform such that a portion of build material and binder is within a curing region of the build chamber, wherein the curing region of the build chamber is below the deposition region of the build chamber; heating the curing region of the build chamber to a curing temperature, wherein the curing temperature is greater than the pre-heat temperature; curing the binder within the curing region of the build chamber; and distributing a new layer of build material above the portion of build material and binder on the build platform.

358. The method of any preceding clause, wherein the layer of build material is irradiated with the energy source coupled to the recoat assembly before depositing the layer of binder material on the layer of build material.

359. The method of any preceding clause, wherein the layer of build material is irradiated with the energy source coupled to the recoat assembly after depositing the layer of binder material on the layer of build material.

360. The method of any preceding clause, wherein the layer of build material is irradiated with the energy source coupled to the recoat assembly both before and after depositing the layer of binder material on the layer of build material.

361. The method of any preceding clause, wherein the heating and pre-heating are achieved with a plurality of heating elements positioned around the build chamber, below the build platform or both around the build chamber and below the build platform.

362. A method of building an object by additive manufacturing of any preceding clause, the method comprising: moving a recoat assembly over a build material with a recoat head actuator, the recoat head actuator comprising a recoat motion axis, whereby actuation of the recoat head actuator along the recoat motion axis in a first recoat direction causes the recoat assembly to move in the first recoat direction, and wherein the recoat assembly comprises a first roller and a second roller that is spaced apart from the first roller; rotating the first roller of the recoat assembly in a counter-rotation direction, such that a bottom of the first roller moves in the first recoat direction; contacting the build material with the first roller of the recoat assembly, thereby fluidizing at least a portion of the build material; irradiating, with a front energy source coupled to a front end of the recoat assembly, an initial layer of build material positioned in a build area; subsequent to irradiating the initial layer of build material, spreading the build material on the build area with the first roller, thereby depositing a second layer of the build material over the initial layer of build material; subsequent to spreading the second layer of the build material, irradiating, with a rear energy source positioned rearward of the front energy source, the second layer of build material within the build area; and depositing a binder material on the second layer of build material with a print head coupled to a print head actuator, the print head actuator comprising a print motion axis whereby the binder material is deposited with the print head by actuating the print head actuator along the print motion axis in a first print direction opposite the first recoat direction, wherein the recoat motion axis and the print motion axis are parallel to one another and spaced apart from one another in a vertical direction.

363. The method of any preceding clause, wherein a timing of the actuating the print head actuator along the print motion axis in the first print direction is determined based on a minimum separation between the print coat head and the recoat assembly.

364. The method of any preceding clause, further comprising, subsequent to at least one of irradiating the initial layer of build material with the front energy source and irradiating the second layer of build material with the rear energy source, detecting a temperature of the irradiated build material with a temperature sensor.

365. The method of any preceding clause, further comprising changing at least one parameter of the front energy source or the rear energy source based at least in part on the detected temperature.

366. The method of any preceding clause, further comprising engaging a cleaning member with at least one of the first roller and the second roller.

367. A method for forming an object with an additive manufacturing system of any preceding clause comprising a supply platform, a cleaning station, and a build area horizontally positioned between the cleaning station and the supply platform, wherein the cleaning station comprises a binder purge bin and a cleaning station vessel having cleaning fluid therein and comprising a wet wipe cleaner section, and a dry wipe cleaner section, the method comprising: distributing a new layer of build material on the build area with a recoat assembly coupled to a recoat head actuator, the recoat head actuator comprising a recoat motion axis whereby actuation of the recoat head actuator along the recoat motion axis in a first recoat direction causes the recoat assembly to distribute the new layer of build material on the build area; depositing a binder material on the new layer of build material with a print head coupled to a print head actuator, the print head actuator comprising a print head motion axis whereby the binder material is deposited with the print head by actuating the print head actuator along the print head motion axis in a first print direction opposite the first recoat direction, where the recoat motion axis and the print head motion axis are parallel to one another and spaced apart from one another in a vertical direction; passing the print head over the binder purge bin to facilitate discharge of contaminants from the print head via backpressure; introducing the print head to the wet wipe cleaner section so that cleaning fluid is applied to the print head by a wet wipe member; and introducing the print head to the dry wipe cleaner section so that cleaning fluid is removed by a dry wipe member and the print head is thereby cleaned.

368. The method of any preceding clause, wherein the dry wipe member is vertically raised out of the cleaning fluid before completion of discharge of contaminants from the print head.

369. The method of any preceding clause, wherein the wet wipe member is vertically raised out of the out of the cleaning fluid when discharge of contaminants from the print head is complete.

370. The method of any preceding clause, wherein binder material is discharged into the binder purge bin while a recoat head is operating in a direction supplying build material to a working surface of the build platform.

371. The method of any preceding clause, wherein prior to passing the print head over the binder purge bin, introducing the print head to at least one of the dry wipe cleaner section and the wet wipe cleaner section to pre-clean the print head.

372. A method of building an object by additive manufacturing of any preceding claim, the method comprising: distributing a layer of build material on a build platform with a recoat head that is coupled to a recoat head actuator configured to move the recoat head along a longitudinal axis during distribution of the layer of build material; depositing binder through select ones of a plurality of jet nozzles of a printing head onto the layer of build material as the printing head traverses a first pass trajectory along a longitudinal axis in a first direction; indexing the printing head along a latitudinal axis to a second pass trajectory by an index distance; depositing binder through select ones of the plurality of jet nozzles of the printing head as the printing head traverses the second pass trajectory along a longitudinal axis in a second direction opposite the first direction; and distributing a new layer of build material above the layer of build material and binder on the build platform.

373. The method of any preceding clause, wherein: a distance from a first jet nozzle to a second jet nozzle positioned adjacent the first jet nozzle of the plurality of jet nozzles defines a jet-spacing, and the index distance is greater than zero and less than the jet-spacing.

374. The method of any preceding clause, wherein: a distance from a first jet nozzle to a second jet nozzle positioned adjacent the first jet nozzle of the plurality of jet nozzles defines a jet-spacing, and the index distance is an integer multiple of a fractional value of the jet-spacing.

375. The method of any preceding clause, wherein: a distance from a first jet nozzle to a second jet nozzle positioned adjacent the first jet nozzle of the plurality of jet nozzles defines a jet-spacing, and the index distance is an integer multiple of the jet-spacing.

376. The method of any preceding clause, wherein the printing head comprises a first print head row comprising a plurality of print heads sequentially spaced apart from one another in a direction transverse to a working axis, an actuator is coupled to a first print head of the plurality of print heads, and the actuator is configured to move the first print head along the latitudinal axis.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

The invention claimed is:

1. A method of building an object by additive manufacturing, the method comprising:

pre-heating a deposition region of a build chamber to a pre-heat temperature;

distributing a layer of build material on a build platform positioned within the build chamber with a recoat assembly moving in a coating direction;

depositing a layer of binder material on the layer of build material;

irradiating the layer of build material with an energy source coupled to the recoat assembly;

adjusting a position of the build platform such that a portion of build material and binder is within a curing region of the build chamber, wherein the curing region of the build chamber is below the deposition region of the build chamber;

heating the curing region of the build chamber to a curing temperature, wherein the curing temperature is greater than the pre-heat temperature;

curing the binder within the curing region of the build chamber; and distributing a new layer of build material above the portion of build material and binder on the build platform.

2. The method of claim 1, wherein the layer of build material is irradiated with the energy source coupled to the recoat assembly before depositing the layer of binder material on the layer of build material.

3. The method of claim 1, wherein the layer of build material is irradiated with the energy source coupled to the recoat assembly after depositing the layer of binder material on the layer of build material.

4. The method of claim 1, wherein the layer of build material is irradiated with the energy source coupled to the recoat assembly both before and after depositing the layer of binder material on the layer of build material.

5. The method of claim 1, wherein the heating and pre-heating are achieved with a plurality of heating elements positioned around the build chamber, below the build platform or both around the build chamber and below the build platform.

6. The method of claim 1, wherein the distributing the layer of build material on the build platform positioned within the build chamber with the recoat assembly comprises:

moving the recoat assembly over the layer of build material with a recoat head actuator, the recoat head actuator comprising a recoat motion axis, whereby actuation of the recoat head actuator along the recoat motion axis in a first recoat direction causes the recoat assembly to move in the first recoat direction, and wherein the recoat assembly comprises a first roller and a second roller that is spaced apart from the first roller;

rotating the first roller of the recoat assembly in a counter-rotation direction, such that a bottom of the first roller moves in the first recoat direction; and contacting the build material with the first roller of the recoat assembly, thereby fluidizing at least a portion of the build material.

7. The method of claim 6, wherein the irradiating comprises irradiating, with a front energy source coupled to a front end of the recoat assembly, the layer of build material.

8. The method of claim 7, further comprising irradiating, with a rear energy source positioned rearward of the front energy source, the new layer of build material.

9. The method of claim 8, further comprising, subsequent to at least one of the irradiating with the front energy source and the irradiating with rear energy source, detecting a temperature of the irradiated build material with a temperature sensor.

10. The method of claim 9, further comprising changing at least one parameter of the front energy source or the rear energy source based at least in part on the detected temperature.

11. The method of claim 6, further comprising engaging a cleaning member with at least one of the first roller and the second roller.

12. The method of claim 1, wherein the depositing the layer of binder material on the layer of build material comprises depositing binder material through select ones of a plurality of jet nozzles of a printing head onto the layer of build material as the printing head traverses a first pass trajectory along a longitudinal axis in a first direction.

13. The method of claim 12, wherein the depositing the layer of binder material on the layer of build material further comprises:

indexing the printing head along a latitudinal axis to a second pass trajectory by an index distance; and depositing binder material through select ones of the plurality of jet nozzles of the printing head as the printing head traverses the second pass trajectory along a longitudinal axis in a second direction opposite the first direction.

14. The method of claim 12, further comprising passing the printing head over a binder purge bin to facilitate discharge of contaminants from the print head via backpressure.

15. The method of claim 14, further comprising:

applying cleaning fluid to the printing head with a wet wipe member; and removing cleaning fluid from the printing head with a dry wipe member.

* * * * *